United States Patent [19]
Van Huben et al.

[11] Patent Number: 5,920,867
[45] Date of Patent: Jul. 6, 1999

[54] DATA MANAGEMENT SYSTEM HAVING DATA MANAGEMENT CONFIGURATION

[75] Inventors: Gary Alan Van Huben; Joseph Lawrence Mueller; Joyce Chang Mak, all of Poughkeepsie, N.Y.

[73] Assignee: International Business Machines Corporation, Armonk, N.Y.

[21] Appl. No.: 08/762,236

[22] Filed: Dec. 6, 1996

[51] Int. Cl.⁶ .................................................. G06F 17/30
[52] U.S. Cl. ............................... 707/101; 707/8; 707/203
[58] Field of Search ................................. 395/703; 707/8, 707/9, 200, 201, 203, 101

[56] References Cited

U.S. PATENT DOCUMENTS

| | | | |
|---|---|---|---|
| 5,201,047 | 4/1993 | Maki et al. | 395/600 |
| 5,267,175 | 11/1993 | Hooper | 364/489 |
| 5,276,867 | 1/1994 | Kenley et al. | 395/600 |
| 5,280,612 | 1/1994 | Lorie et al. | 395/600 |
| 5,321,605 | 6/1994 | Chapman et al. | 364/402 |
| 5,333,310 | 7/1994 | Sakai | 395/600 |
| 5,333,312 | 7/1994 | Wang | 395/600 |
| 5,333,315 | 7/1994 | Saether et al. | 395/600 |
| 5,333,316 | 7/1994 | Champagne et al. | 395/600 |
| 5,347,653 | 9/1994 | Flynn et al. | 395/600 |
| 5,418,949 | 5/1995 | Suzuki | 395/600 |
| 5,469,560 | 11/1995 | Beglin | 395/439 |
| 5,526,517 | 6/1996 | Jones et al. | 395/600 |
| 5,530,857 | 6/1996 | Gimza | 395/600 |
| 5,548,756 | 8/1996 | Tantry et al. | 395/600 |

(List continued on next page.)

OTHER PUBLICATIONS

Kim et al. "A Database Server for Distributed Real–Time Systems: Issues and Experiences" IEEE, 1994, pp. 66–75.
Paul et al. "Massive Data Management in Parallel Machines" IEEE, 1994, pp. 326–331.
Stathatos et al. "Consistency and Performance of Concurrent Interactive Database Applications" IEEE, pp. 602–609, Feb. 1996.
Marlow et al. "Concurrent Engineering Enablers–Engineering Libraries" 1994 Proceedings Annual Reliability and Maintainability Symposium, pp. 315–319, Jan. 1994.
Austin "Creating a Mixed–Signal Simulation Capability for Concurrent IC Design and Test Program Development" International Test Conference, pp. 125–132, Aug. 1993.
Polamraju et al. "Databases for Engineering Applications" IEEE, pp. 685–689, Mar. 1991.

(List continued on next page.)

*Primary Examiner*—Paul V. Kulik
*Assistant Examiner*—Michael J. Wallace, Jr.
*Attorney, Agent, or Firm*—Lynn L. Augspurger

[57] ABSTRACT

A data management system for file and database management including a design control system suitable for use in connection with the design of integrated circuits and other elements of manufacture having many parts which need to be developed in a concurrent engineering environment with inputs provided by users and or systems which may be located anywhere in the world providing a set of control information for coordinating movement of the design information through development and to release while providing dynamic tracking of the status of elements of the bills of materials in an integrated and coordinated activity control system utilizing a control repository which can be implemented in the form of a database (relational, object oriented, etc.) or using a flat file system. Once a model is created and/or identified by control information design libraries hold the actual pieces of the design under control of the system without limit to the number of libraries, and providing for tracking and hierarchical designs which are allowed to traverse through multiple libraries. Data Managers become part of the design team, and libraries are programmable to meet the needs of the design group they service. A control repository communicates with users of the design control system for fulfilling requests of a user and with data repositories of said data management control system through a plurality of managers. Each manager performs a unique function. Managers act as building blocks which can be combined in a plurality of manners to support an environment for suitable for multiple users of a user community.

18 Claims, 263 Drawing Sheets

U.S. PATENT DOCUMENTS

| | | | |
|---|---|---|---|
| 5,581,473 | 12/1996 | Rusu et al. | 364/490 |
| 5,642,503 | 6/1997 | Reiter | 395/608 |
| 5,649,200 | 7/1997 | Leblang et al. | 395/703 |
| 5,675,802 | 10/1997 | Allen et al. | 395/703 |
| 5,678,040 | 10/1997 | Vasudevan et al. | 395/608 |
| 5,706,499 | 1/1998 | Kleewin et al. | 395/610 |
| 5,745,902 | 4/1998 | Larsson et al. | 707/203 |

OTHER PUBLICATIONS

Oliver Tegel, "Integrating Human Knowledge Into The Product Development Process" published in Proceedings of ASME Database Symposium Eng–Data Mgmt, Integrating the Engineering Enterprise ASME Database Symposium 1994, ASCE NY USA, pp. 93–100.

"Beyond EDA" published in Electronic Business, vol. 19, No. 6, Jun. 1993 pp. 42–46, 48.

FIGURE 2

File Return Filter Owner Status — Help

235 — NAME
236 — LIBRARY
237 — TYPE
238 — VERSION
239 — LEVEL

MODEL STATUS: VALID        MODEL OWNER: FORD

| NAME | TYPE | LIB | VERS | LEVEL | STATUS |
|---|---|---|---|---|---|
| 0001 A ALU | SCHEM | CP_LIB | BASE | ENGIN | VALID |
| 0002 I ALU | VHDL | CP_LIB | BASE | ENGIN | VALID |
| 0003 O ALU | SYNTHES | CP_LIB | BASE | ENGIN | VALID |
| 0004 I ADDER | LAYOUT | TECH | HIPWR | QUAL | INVAL |
| 0005 A MULT_DIV | LAYOUT | TECH | LOPWR | QUAL | VALID |
| 0006 I MULT1 | GATE | TECH | LOPWR | QUAL | VALID |
| 0007 I DIV1 | GATE | TECH | LOPWR | QUAL | VALID |
| 0008 | | | | | |
| 0009 | | | | | |

240

FIGURE 5a
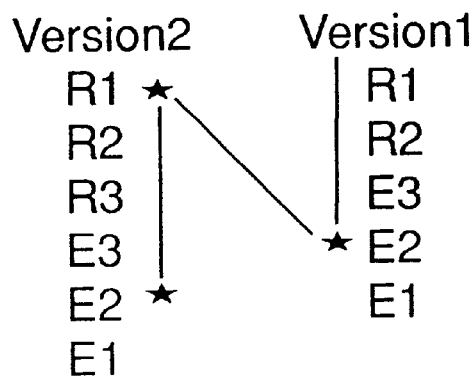
Starting at Version 2
Level E2
Search resumes at same
level in Version 1
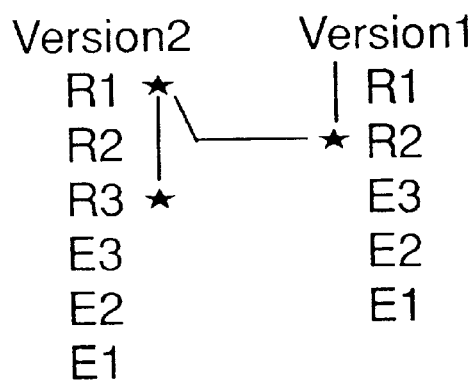
Starting at Version 2
Release Level R3
Search resumes at most
recent release level
in Version 1
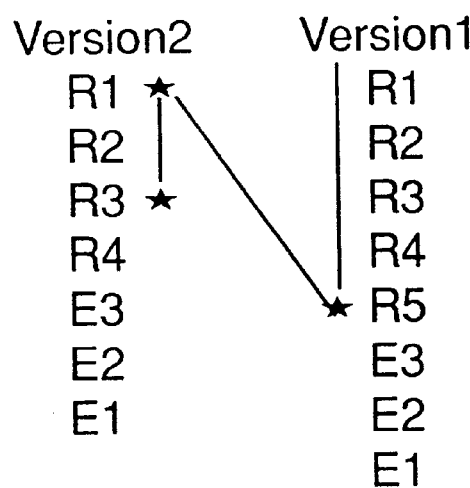
Starting at Version 2
Release Level R3
Search resumes at most
recent release level
in Version 1

FIGURE 15

| | | | |
|---|---|---|---|
| XXX/XX/00 | WL1 | NONE | NONE |
| XXX/XX/WL1 | VL1 | YY | REPOS1 |
| XXX/XX/VL1 | VL2 | NY | REPOS1 |
| ASIC/XX/CD1 | CD3 | YY | REPOS1 |
| ASIC/XX/CD2 | CD3 | YY | REPOS1 |
| ASIC/XX/CD3 | VL1 | NY | REPOS1 |
| ASIC/XX/WL2 | WL3 | YY | REPOS1 |
| ASIC/XX/WL3 | VL2 | NY | REPOS1 |
| ASIC/V1/VL2 | AR3 | NY | REPOS2 |
| ASIC/V1/AR3 | AR2 | NN | REPOS2 |
| ASIC/V1/AR2 | AR1 | NN | REPOS2 |
| ASIC/V1/AR1 | *** | NN | REPOS2 |
| ASIC/V1/ARP3 | ARP2 | YN | REPOS2 |
| ASIC/V1/ARP2 | AR2 | YN | REPOS2 |
| ASIC/V1/ARP1 | AR1 | YN | REPOS2 |
| FIRM/XX/FD1 | FD2 | YY | REPOS1 |
| FIRM/XX/FD2 | VL1 | NY | REPOS1 |
| FIRM/V1/VL2 | FR2 | NY | REPOS3 |
| FIRM/V1/FR2 | FR1 | NN | REPOS3 |
| FIRM/V1/FRP1 | FR1 | YN | REPOS3 |
| FIRM/V1/FR1 | *** | NN | REPOS3 |

152 — rows 1–3
153 — ASIC/XX rows
154 — ASIC/V1 rows
155 — FIRM/XX rows
156 — FIRM/V1 rows

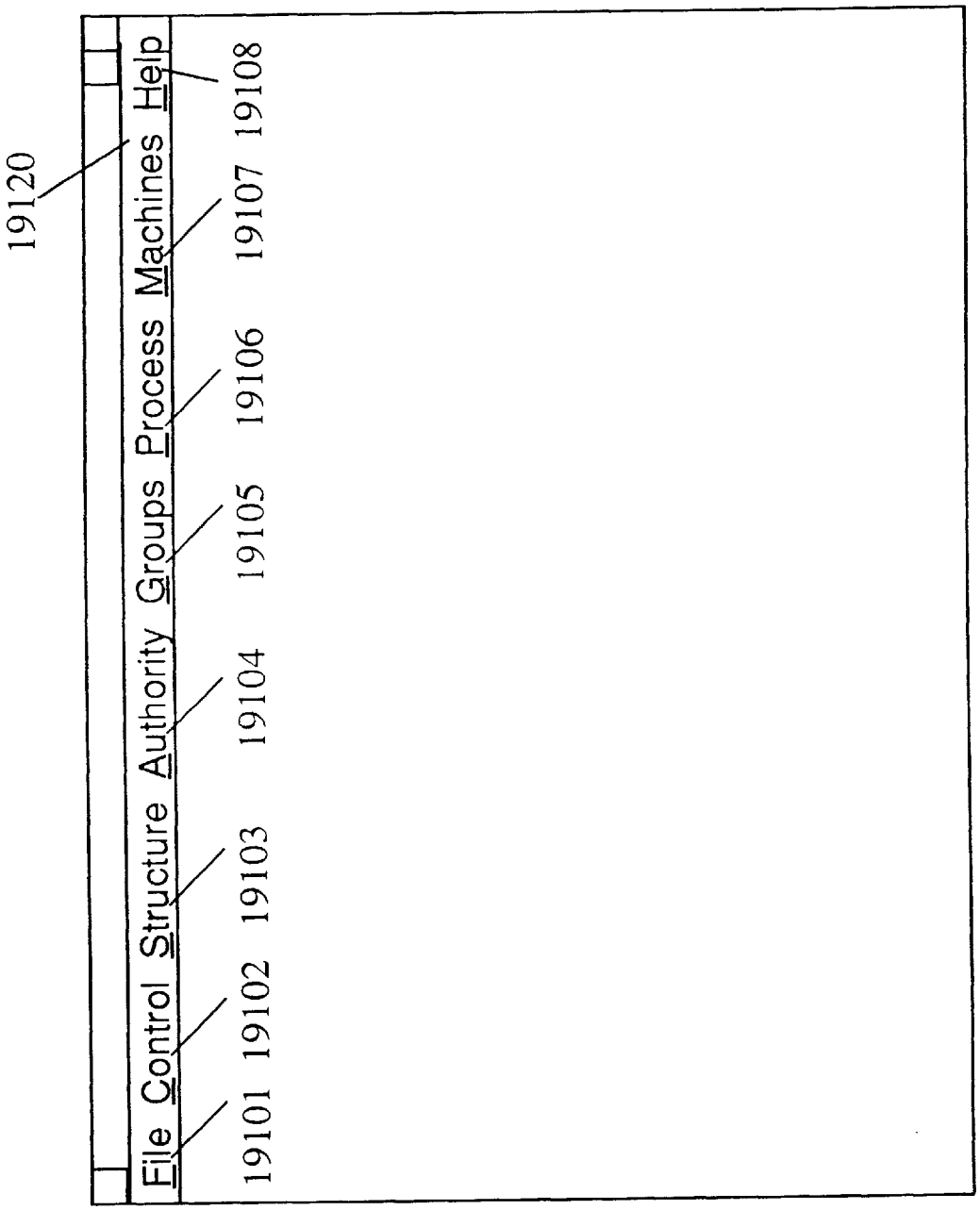

FIGURE 30

| USERS | DESIGNER | TECH_LEAD | COORDINATOR | MANAGER |
|---|---|---|---|---|
| FRAZIER | Y | - | - | - |
| MONROE | - | Y | Y | - |
| HOLTZMAN | - | - | - | Y |
| REED | Y | Y | Y | - |
| BRADLEY | Y | - | - | - |

Menu: EXIT PROCESS CUSTOMIZE EDITOR PROFILES    HELP

Labels: 18861, 18862, 18863, 18864, 18865

FIGURE 32

```
18951 ──── * TIMESTAMP    19930119104349       FULL
18952 ──── * USERID       EINSTEIN
         * PROFILE       /PROJ/LIBPROF/DES    01/19/93  14:02:03
         * PROFILE       /PROJ/LIBPROF/TECH   01/23/93  09:02:05
         * PROFILE       /PROJ/LIBPROF/COORD  03/23/93  19:20:14
18953 ──── * PROFILE       /PROJ/LIBPROF/MNGR   01/23/93  13:38:25
         *
         * USERIDS  DESIGN  TECH LD  COORD   MANAGER
18954 ──── FRAZIER    Y        -        -        -
         MONROE     -        Y        Y        -
         HOLTZMAN   -        -        -        Y
         REED       Y        Y        Y        -
18955 ──── BRADLEY    Y        -        -        -
```

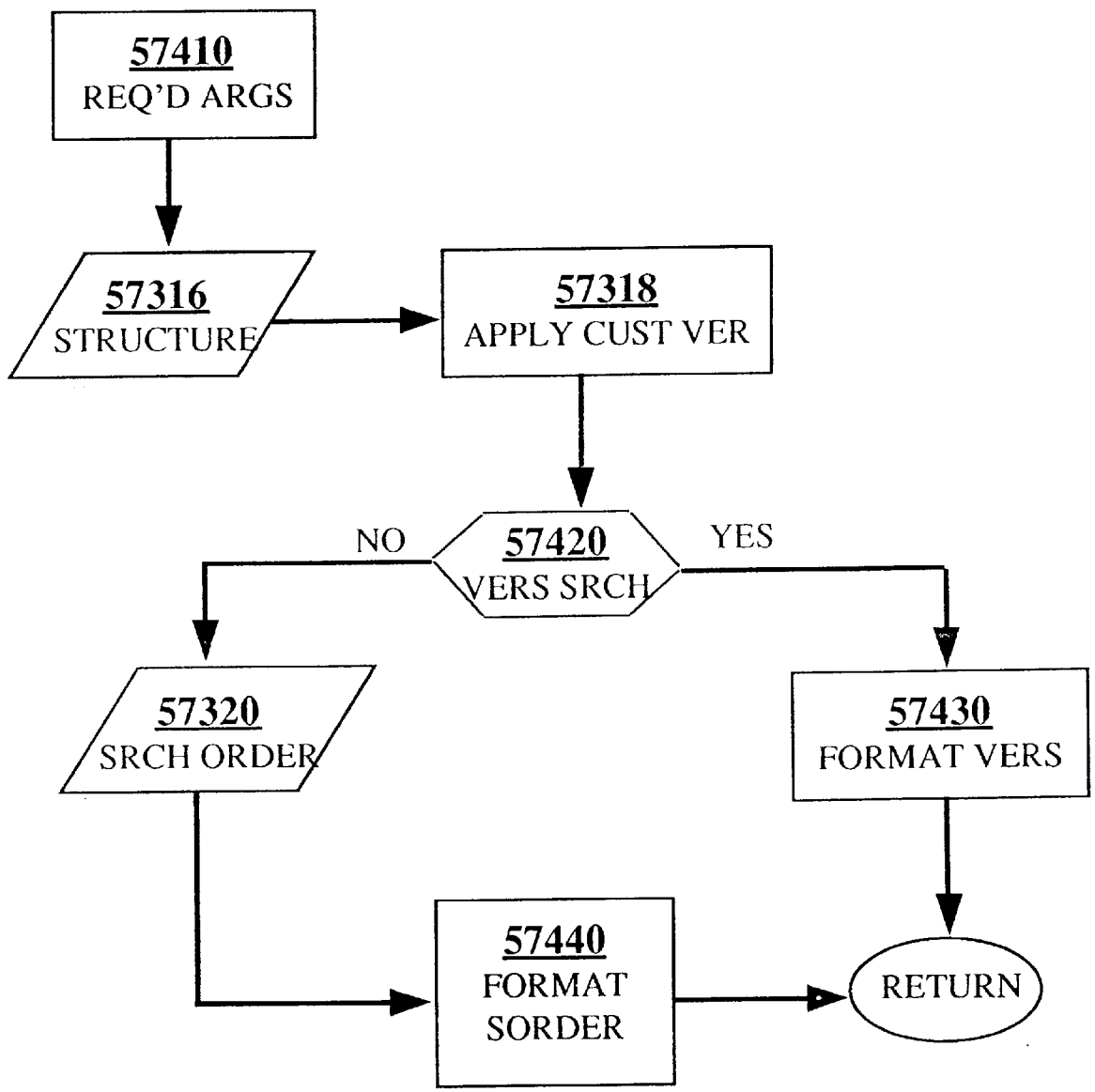

FIGURE 40

```
          SET LIBRARY LOCK
68101
     NAME  [              ]
68102                                    68107
     LIBRARY [            ]  ▽
                                         68108
68103  TYPE  [            ]  ▽
                                         68109
     VERSION [            ]  ▽
68104
     LEVEL   [            ]  ▽
68105                                    68110

● UPDT LOCK   ○ MOVE LOCK   ○ OVLY LOCK
68111   ── AVAILABLE TO CONTROLLED FILES ONLY ──

□ BOM LOCK  □ RET LOCK REF   □ RET BOM REF
68112  BOM LVL FILTER [            ]  ▽
                                         68110
68113
```

FIGURE 42

```
                    RESET LIBRARY LOCK
68301
       LOCK ID  [                        ]
68302
         ● BY FILE    ○ BY USER    ○ BY REF #    68107
       LIBRARY  [                        ] ▽
68102                                              68108
       TYPE     [                        ] ▽
68103                                              68109
       VERSION  [                        ] ▽
68104                                              68110
       LEVEL    [                        ] ▽
68105                                              68110
       CURRENT OWNER [                   ]
                                                   68312
68311  ○ UPDT LOCK  ○ MOVE LOCK  ○ OVLY LOCK  ● ALL
       ——— AVAILABLE TO CONTROLLED FILES ONLY ———
       ☐ BOM LOCK
68112
       BOM LVL FILTER [                  ] ▽
                                                   68110
              68113
```

| 44a | 44c |
|---|---|
| 44b | 44d |

FIG.44

| 45a | 45c |
|-----|-----|
| 45b | 45d |

FIG.45

| 46a | 46c |
|-----|-----|
| 46b | 46d |

| 47a | 47d | 47g |
|-----|-----|-----|
| 47b | 47e | 47h |
| 47c | 47f | 47i |

Figure 47h
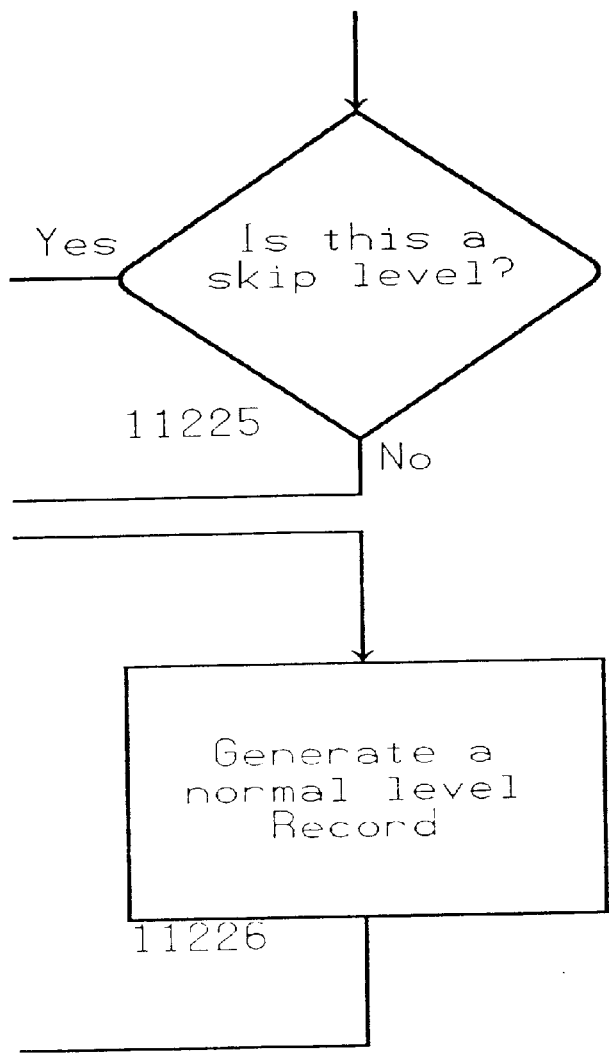
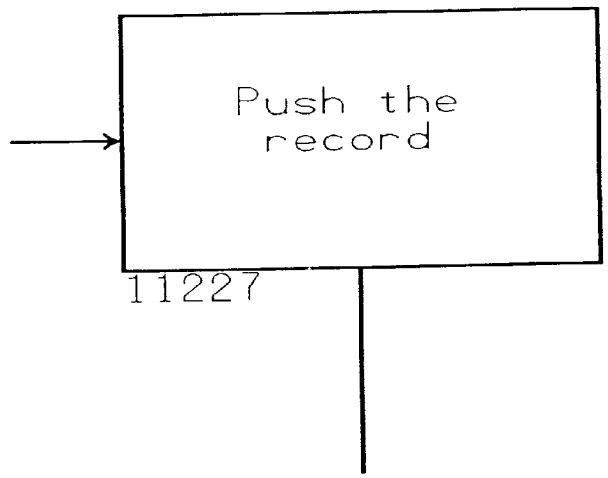

Figure 48

| 48a | 48c |
|-----|-----|
| 48b | 48d |

Figure 49

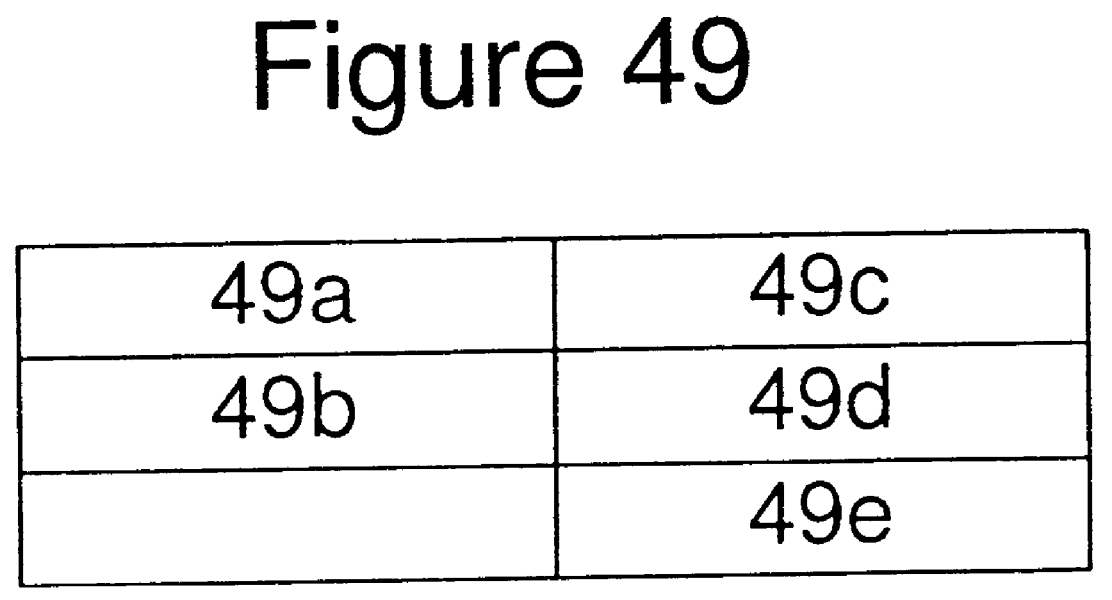

| 49a | 49c |
|-----|-----|
| 49b | 49d |
|     | 49e |

Figure 50

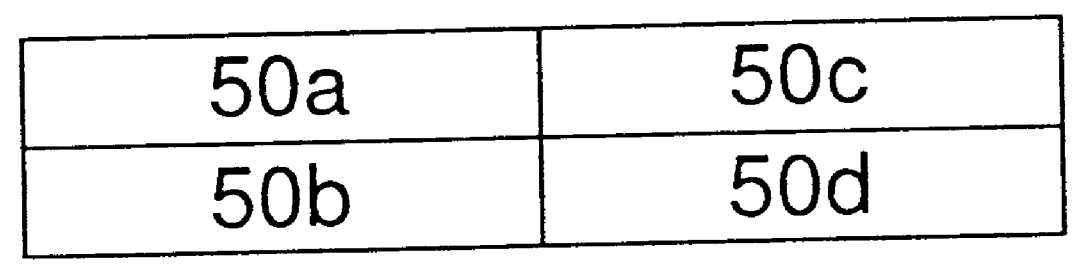

| 50a | 50c |
|-----|-----|
| 50b | 50d |

Figure 53

| 53a | 53c |
|-----|-----|
| 53b | |

Figure 54

| 54a |
|-----|
| 54b |

Figure 55

| 55a |
|-----|
| 55b |

Figure 56

| 56a | 56c |
|-----|-----|
| 56b |     |

Figure 58

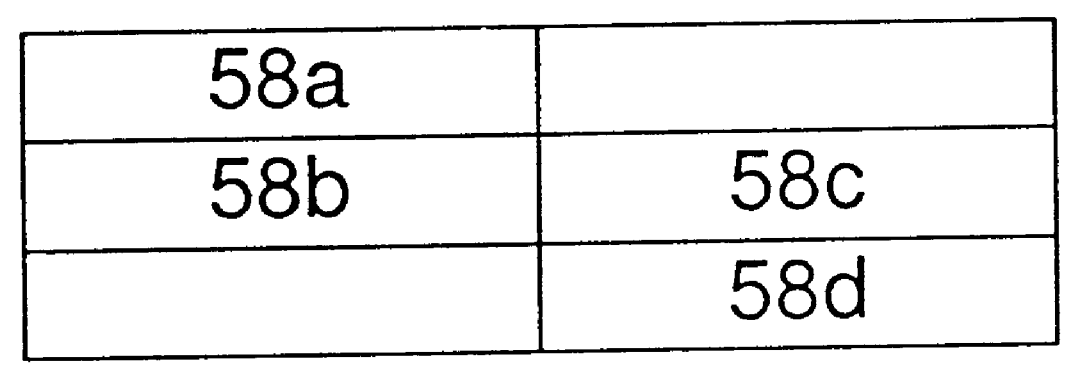

| 58a | |
|---|---|
| 58b | 58c |
| | 58d |

Figure 61

| 61a | 61c |
|-----|-----|
| 61b | 61d |

Figure 64

| 64a | |
|---|---|
| 64b | 64c |

Figure 65

| 65a |
|-----|
| 65b |

14684

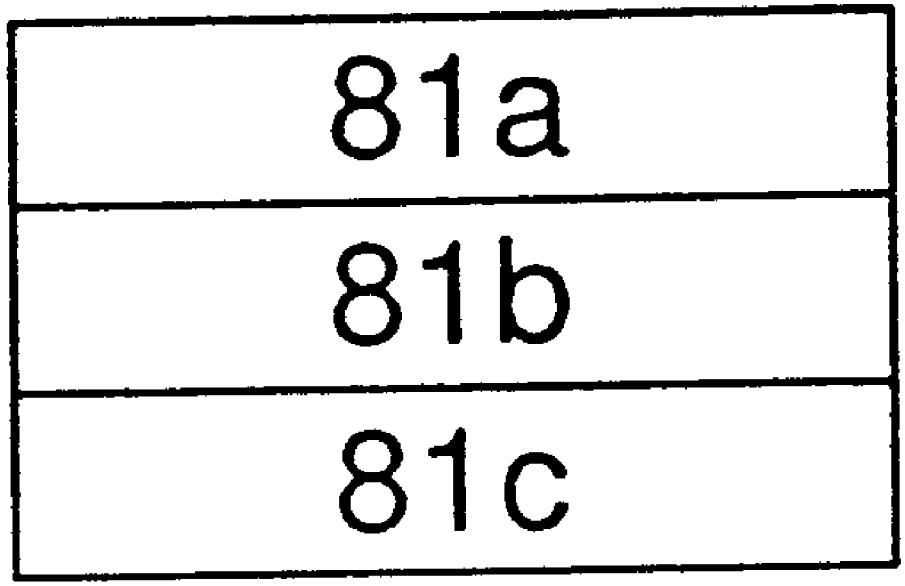

| 82a |
|---|
| 82b |

Figure 84

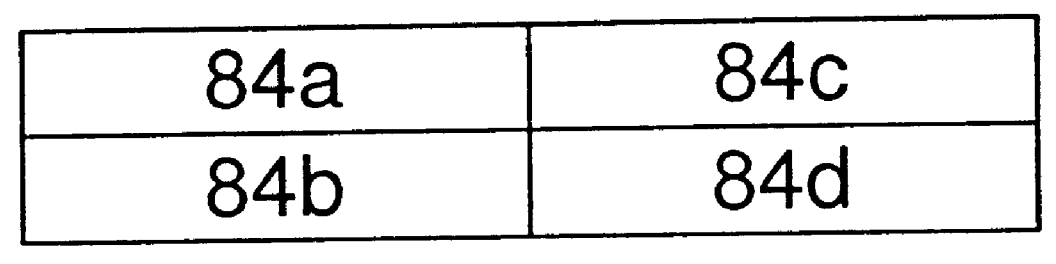

| 84a | 84c |
|-----|-----|
| 84b | 84d |

Figure 86

| 86a |
|-----|
| 86b |

Figure 88

| 88a |
|---|
| 88b |

Figure 89

| 89a | 89d |
|-----|-----|
| 89b | 89e |
| 89c | 89f |

Figure 90

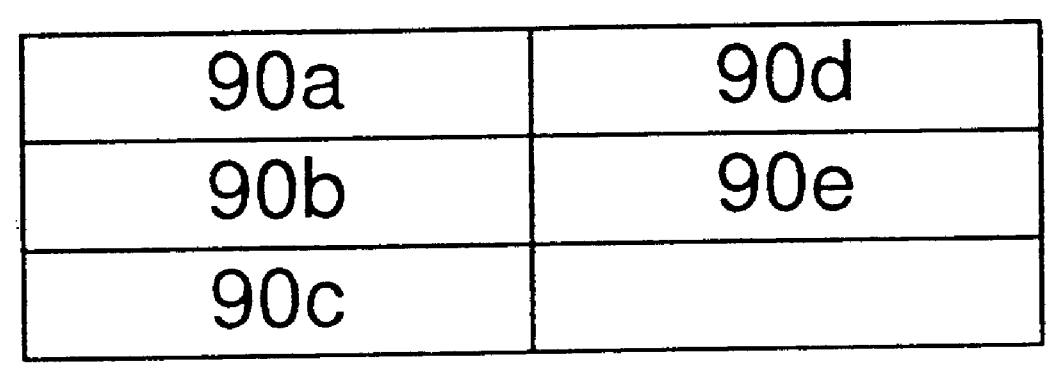

| 90a | 90d |
|-----|-----|
| 90b | 90e |
| 90c |     |

Figure 90e
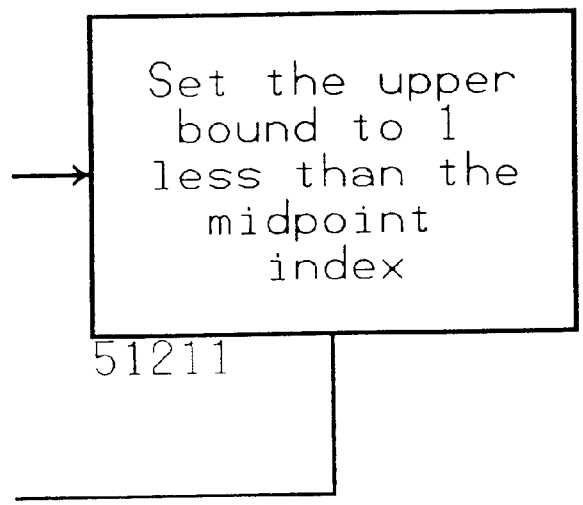
51211
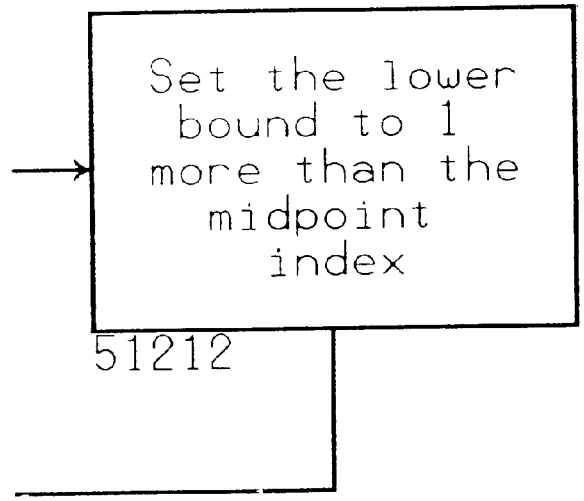
51212

Figure 91

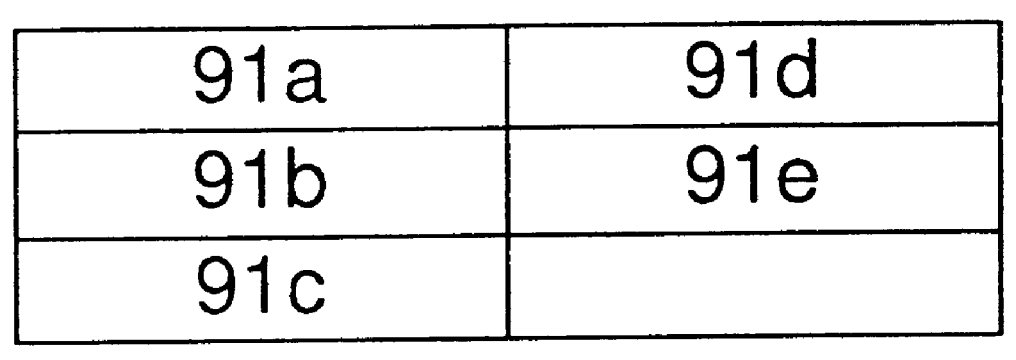

| 91a | 91d |
|-----|-----|
| 91b | 91e |
| 91c |     |

Figure 93

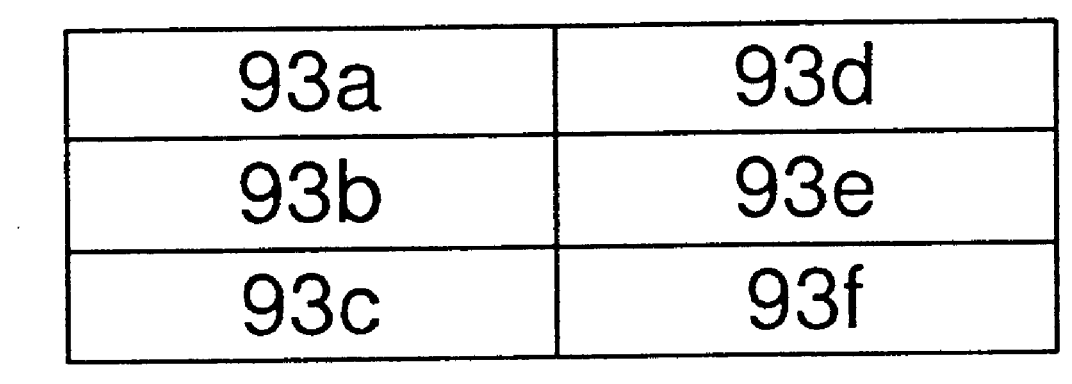

| 93a | 93d |
|-----|-----|
| 93b | 93e |
| 93c | 93f |

Figure 94

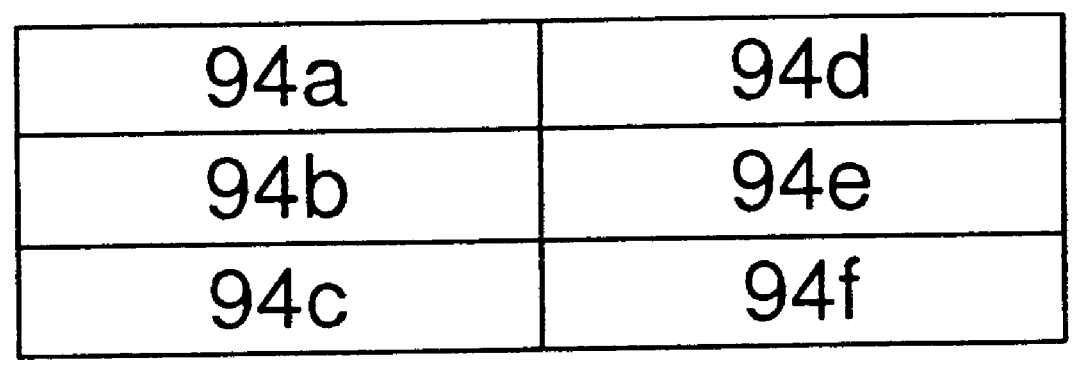

| 94a | 94d |
|-----|-----|
| 94b | 94e |
| 94c | 94f |

Figure 98:
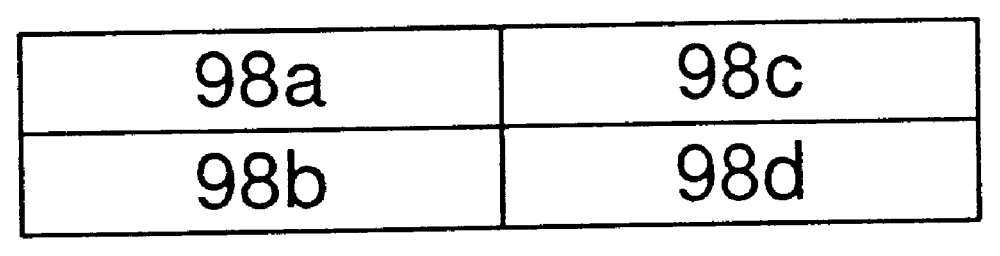

| 98a | 98c |
|-----|-----|
| 98b | 98d |

Figure 99

| 99a |
|---|
| 99b |

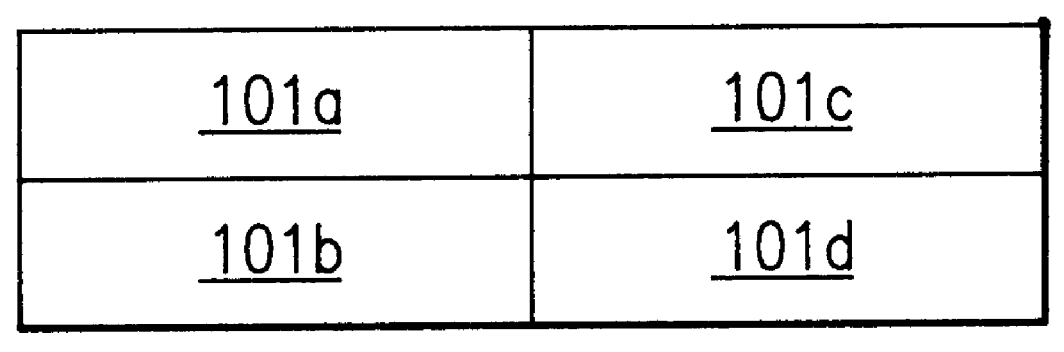

| 101a | 101c |
|------|------|
| 101b | 101d |

FIG.101

DATA MANAGEMENT SYSTEM HAVING DATA MANAGEMENT CONFIGURATION

COPYRIGHT NOTICE AND AUTHORIZATION

This patent document contains material which is subject to copyright protection.

(C) Copyright International Business Machines Corporation 1995, 1996 (Unpublished). All rights reserved. Note to US Government Users—Documentation related to restricted rights—Use, duplication, or disclosure is subject to restrictions set forth in any applicable GSA ADP Schedule Contract with International Business Machines Corporation.

The owner, International Business Machines Corporation, has no objection to the facsimile reproduction by any one of the patent disclosure, as it appears in the Patent and Trademark Office patent files or records of any country, but otherwise reserves all rights whatsoever.

FIELD OF THE INVENTION

In general this invention is related to a data management system for file and database management and is particularly useful in connection with such a system used in designing integrated circuit chips. In its general aspects, this invention is related to a Computer Integrated Design Control System and Method for concurrent engineering, and particularly to methods useful in connection with the design, development and manufacturing of complex electronic machines such as computer systems and their complex electronic parts. The invention allows management of a coherent set of data objects in such a computer environment.

Related Applications:

The preferred embodiment of our claimed invention is described in detail herein. Our preferred embodiment may desireably interact with other inventions which may be considered related applications filed concurrently herewith, having inventors in common with this our preferred embodiment of this invention.

For convenience of understanding, these other applications describe various systems, methods and processes for data management particularly suited for use with this invention, our Data Management System for Concurrent Engineering.

The related applications include the application entitled Data Management System and Method for Concurrent Engineering which provides greater detail about our Aggregation Manager for a Data Management system, and Data Management System for Problems, Releases and Parts for Computer Integrated Design Control which describes a method for managing problems, releases and multiple releases, and Data Management System and Processes describing how various processes and utilities interact, and Data Management System having Shared Libraries.

All of these related applications are filed concurrently herewith, and their disclosures are incorporated herein by this reference. All are commonly assigned to International Business Machines Corporation, Armonk, N.Y.

GLOSSARY OF TERMS

While dictionary meanings are also implied by certain terms used here, the following glossary of some terms may be useful.

AFS Andrew File System—File Management System developed by Transarc Inc. and used on Unix/AIX Networks.

API Application Program(ming) Interface.

ASC Accredited Standards Committee (ANSI)

BOM Bill of Materials

CIM Computer Integrated Manufacturing

CR Control Repository

CRC Cyclic Redundancy Check

CLSI Compiler VHDL Analyzer developed by Compass Design Systems

DCS Design Control System. Our Design Control System incorporates Data Management System processes, including interactive data management systems which supply processes which may be applicable in general data management systems, such as a process manager, a promotion manager, a lock manager, a release manager, and aggregation manager and the other processes we describe herein as part of a Computer Integrated Design Control System and, where the context applies, Data Management System, is a Data Management System functioning within an overall integrated design control system.

DILP Designer Initiated Library Process

DM Data Manager or Data Management

DMCU Data Management Control Utilities

DMS Data Management System

DR Data Repository

EC Engineering Change

EDA Electronic Design Automation

GUI Graphical User Interface

PDM Product Data Management

PIM Product Information Management

PN Part Number

RAS Random Access Storage sim static inline memory tape-out Delivery of a coherent set of design data to manufacturing. Also known as Release Internal Tape (RIT) within IBM.

TDM the Cadence Team Design Manager (most currently Version 4.4)

VHDL Very High-level Design Language—A high level language comprised of standards supported by IEEE and the EDA industry. The language is widely used in the electronics and computer industry and by the military as an alternative to Verilog and ADA, other high level computer coding languages.

BACKGROUND OF THE INVENTION

In the article entitled "Beyond EDA (electronic design automation)", published in Electronic Business Vol.19, No.6 June 1993 P42–46, 48, it was noted that while billions of dollars have been spent over the past (then and still last) five years for electronic design automation systems (EDA) and software to help companies cut their design cycle, a huge gulf remains between design and manufacturing. To eliminate the gulf and thus truly comply with the commandments, companies are extending the concept of concurrent engineering to enterprise wide computing. The concept, which calls for integrating all the disciplines from design to manufacturer j is becoming the business model of the 1990s. Achieving an enterprise wide vision requires tying together existing systems and programs and managing the data that flows among them. Software that makes that linkage possible is largely in the class known by two names: product data management (PDM) or product information management (PIM). Mr. Robinson, the author, described the experiences of several companies with PIM and PDM, in particular Sherpa and Cadence.

The design of complex parts, such as integrated circuits, computers, or other complex machines in a complete manufacturing operation like IBM's requires computer capability, with computers capable of processing multiple tasks, and allowing concurrent data access by multiple users. The IBM System 390 operating system known as Multiple Virtual Storage (MVS) allows such things as relational database management methods, such as the TIME system described by U.S. Pat. No. 5,333,316, to be used to reduce design time. The TIME system is used within IBM for the purposes described in the patent during circuit design. However, these prior efforts treated design as directed to an entity and did not achieve the efficiencies provided by the system detailed in our description of our invention, which also can run under MVS, but also under other operating systems. Our detailed description of our invention will illustrate that we have furthered the objects of the invention of Pat. No. 5,333,316 by increasing the flexibility of a number of circuit designers who may concurrently work on designing the same integrated circuit chip and reducing the interference between chip designers. With the prior system, a user (a person, processor or program capable of using data in a relational database) was given a private copy of the master table. Alteration of a row in the user table was not automatically updated in the master table, because a lock mechanism prevented the row update, but that was an great improvement at the time, because no longer did multiple users have to wait for copying of a table, each time data from a user needed to be updated. This row locking and treatment of data has become widespread in the relational database field, and it has been enabled for use with multiple instances of a platform even on Unix machines today. We should note that also in the MVS art, there have been proposed various library systems, e.g. those represented by U.S. Pat. Nos. 5,333,312 and 5,333,315 and others which relate to IBM's Image Object Distribution Manager in the ImagePlus product line of IBM, and IBM's Office Vision are examples of systems enabling control of a source document while allowing access by multiple users. Implementation of these patented ideas enable synchronous and asynchronous copying of a document into a folder in a target library. These methods provide for check out of a document and its placement in a target library while locking the document in the source library to prevent changes while the checked out document is out. But these steps are only some of the many things that are needed to bring a product to a release state. Bringing a product to a release state is an object of the current developments relating to design control in a manufacturing setting.

Concurrent engineering is required among many engineers working in parallel and at different locations worldwide. Furthermore, as noted by Oliver Tegel in "Integrating human knowledge into the product development process" as published in the Proceedings of the ASME Database Symposium, Engineering Data Management: Integrating the Engineering Enterprise ASME Database Symposium 1994. ASCE, New York, N.Y., USA. p 93–100, specialists who are not working directly together are often needed for solving the demanding tasks that arise during the development of today's advanced products. During product development, assistance is re(uired from other departments such as manufacturing, operations scheduling, etc. Even the vendors and customers should be integrated into the product development process to guarantee the product developed will be accepted in the market.

There is a need for integrators/coordinators/model builders and the designers to work together to create a next release. Information from different people in different forms must be collected aiming at a final good design. A problem occurring during product development is, how to know which people to contact for what kind of information, but that is only one. During all of the process concurrent engineering, particularly for the needs of complex very large scaled intcyraijd system design, needs to keep everything in order and on track, while allowing people to work on many different aspects of the project at the same time with differing authorizations of control from anywhere at anytime.

For the purpose of the following discussion, need to say that we call our system a "Computer Integrated Design Control System and Method" because it encompasses the ability to integrate CIM, EDA, PDM and PIM and because it has the modularity making it possible to fulfill these needs in a concurrent engineering environment particularly useful to the design of complex very large scaled integrated systems as employed in a computer system itself. The making of these systems is a worldwide task requiring the work of many engineers, whether they be employed by the manufacturer or by a vendor, working in parallel on many complete parts or circuits which are sub-parts of these parts. So as part of our development, we reviewed the situation and found that no-one that we have found is able to approach the creation of "Computer Integrated Design Control System" like ours or employ the methods needed for our environment. Our methods are modular and fulfill specific functions, and yet make it possible to integrate them within a complete "Computer Integrated Design Control System".

A patent literature review, especially one done with retrospective hindsight after understanding our own system and method of using our "Computer Integrated Design Control System" will show, among certainly others, aspects of DMS systems which somewhat approach some aspect of our own design, but are lacking in important respects. For instance, after review of our detailed description, one will come to appreciate that in modern data processing systems the need often arises (as we provide) to aggregate disparate data objects into a cohesive collection. These data objects may reside at various levels of completion, spanning multiple versions and/or repositories in a hierarchical, multi-tiered data management system. Additionally, these data aggregations may need to be hierarchical themselves, in order to enable the creation of large groupings of data with varying levels of granularity for the data included therein. In such a data management system, the end-users of the data aggregates are not necessarily the "owners" of all or any of the data objects comprising the data aggregate, but they have a need to manage the particular collection. Management of a data aggregation may include creating the aggregation, adding or deleting data objects, moving the aggregation through a hierarchical, multi-tiered data management system and tracking the status of the data aggregation in real-time while maintaining the coherence of the data aggregation. Creation of a data aggregation or the addition of a data object to an existing data aggregate may need to be accomplished within the data management system or via data objects imported into the data management system through application program interfaces for the data management system.

With such a focus, when one reviews the art, one will certainly find, currently, data management systems which provide means for grouping components of a data system to facilitate the retrieval thereof. However, these data management systems are insufficient and lacking because they fail to address the above-referenced need for grouping disparate data items, just to mention one aspect of our own developments.

Another example, U.S. Pat. No. 5,201,047 to Maki et al. (issued Apr. 6, 1993) teaches an attribute based classification and retrieval system wherein it is unnecessary to implement an artificial code for indexing classifications.

The patent teaches a method for defining unique, user-determined attributes for storing data which are capable of being readily augmented without necessitating the modification of the underlying query used for retrieval thereof. However, the Maki et al. patent requires that the data items being grouped share at least one common attribute to enable the grouping, and therefore fails to address the problems of managing data aggregates formed from disparate and unrelated data objects.

Other data management systems address the creation of data aggregates coupled to particular processes implemented in the data system. For example, U.S. Pat. No. 5,321,605 to Chapman et al. (issued Jun. 14, 1994) teaches the creation of a Bill of Resources table which represents the resources consumed in the performance of a given process. Attribute tables for the given resources are utilized to determine whether an additional processes which will consume some or all of the resources of a given process can be initiated. The patent to Chapman et al., requires that each process to be initiated have a particular Bill of Resources aggregate associated therewith. This tightly coupled construct does not permit the creation of data aggregates not related to a particular process implemented in the data management system. Furthermore, since a process must be contemplated in order to create a Bill of Resources table, Chapman et al. do not permit the creation of aggregates without foreknowledge of the process that requires the resource. Thus, in a manner similar to that described for Maki et al., Chapman et al. require that a relationship between the elements exist prior to the formation of the Bill of Resources grouping.

Also, unrelated DMS systems are known which are used for hardware implementations which enable related data in a computer memory, storage or I/O subsystem to be physically grouped in proximity to other such data so as to improve hardware performance, application performance, and/or to solve memory management issues are known. For example, U.S. Pat. No. 5,418,949 to Suzuki (issued May 23, 1995) teaches a file storage management system for a database which achieves a high level of clustering on a given page and teaches loading related data from a secondary storage unit at high speed. The patent uses map files including a metamap file for defining page to page relations of data. These hardware implementations are not related to the present invention, as they involve the management of the physical contents of a data object rather than the management of aggregations of data objects as we perform the methods of our present invention. It is contemplated, however, that such known hardware techniques may be implemented in a system comprising the aggregation management features disclosed herein, thereby further augmenting the overall system efficiency.

During our development process we have viewed the development of others. Even the best of the EDA (electronic design automation) design houses don't have an integrated approach like we have developed.

For the purposes of this background, we will discuss some of the various approaches already used specifically viewing them in light of our own separate developments which we will further elaborate in our detailed description of our invention which follows later in this specification.

In the field of EDA, there are today two preeminent vendors of development software, Cadence Design Systems, Inc. and ViewLogic, Inc. Of course there are others, but these two companies may have a greater range of capability than the others. Also, there are in house systems, such as IBM's ProFrame which we think is unsuitable for use. It will not function well as a stand-alone DM point tool for integration into a foreign framework. But even the largest microelectronic systems are customers of the two named vendors which we will compare. Today, a DCS, it will be seen, without our invention, would require fitting together pieces of disparate systems which don't interact, and even such a combination would not achieve our desirable results.

For the purposes of comparison, after our own description of our environment, our "Computer Integrated Design Control System", we will discuss the features of the Cadence Team Design Manager Version 4.4 and ViewLogic's View-Data in Sections which compare with and refer to the Sections of our own preferred "Computer Integrated Design Control System" as set forth at the beginning of our detailed description of our invention,. This comparison will show the shortcomings of these prior systems, as well as some changes which could be made to these prior systems to allow them to improve performance in our concurrent engineering environment by taking advantage of aspects of our own development as alternative embodiments of our invention.

Historically many attempts have been made to collect or group objects together in order to solve typical data management problems. These problems may include identifying all of the files used to create a model, or grouping files together to facilitate transport through a medium. The intent is usually to ensure the group remains together for a specified period of time.

The most common method in use today is to create a listing of files commonly referred to as a Bill of Materials. Many commercial products permit creation of such a BOM, but these BOM are static list BOM. For example, is one of the members of the BOM, disappears or gets changed, the user is unaware that the original data set used to create the BOM is no longer valid.

We have created a new process which we call an Aggregation Manager which can be used in Bill of Materials applications but which overcomes prior disadvantages and also one which can be used in our Computer Integrated Design Control System.

SUMMARY OF THE INVENTION

Our invention provides a design control system usable in a concurrent engineering process which can cooperate in a distributed environment worldwide to enable a design to be processed with many concurrent engineering people and processes. The system we employ uses a data management system for file and database management to provide a design control system for fulfilling requests of a user initiated from a computer system client system coupled to a network, including a data management control system for managing a plurality of projects. In order to provide the robust system we provide for each project to have a data repository for data records and a control repository comprising a common access intenace and one or more databases selected from a group of databases accessible for the project. These database may be either (a) a relational database having a collection of tables of data where the columns contain the attributes of related data and the rows are the instances of the data;

(b) an object oriented database having a collection of object instances of classes where the attributes are the members of the object class;

(c) a control file database having a collection of files where the records of the files are the instances of data and the attributes are arranged along the records; and (d) a directory database having a collection of file directories which may or may not contain files whose relationships are described by the directory structure, and whose instances can be either sub-directories or files; and any combination of (a) through (d).

Importantly, we provide that our control repository (CR) communicates with users of our design control system to fulfill requests of a user and the data repositories of said data management control system through a plurality of managers. Each manager performs a unique function. Our managers act as building blocks which can be combined in a plurality of manners to support an environment for suitable for multiple users of a user community.

We provide a data management model structure capable of tracking a plurality of data objects governed under similar or disparate processes, wherein all objects are classified as part of a library, having one or more types, each type having one or more versions, and each version having one or more levels.

A library is a grouping of objects which all have common characteristics causing them to belong to the same library grouping. Within a library, data is organized by version. A version allows parallel evolution of the same component data element to coexist in the same library enabling multiple versions of a component data element to be developed in tandem while using the same object name and residing in the same library and at the same level simultaneously.

With these facilities, concurrent engineering is enhanced, and after creation of a model, thereafter, our system provides continuous tracking of the created model while allowing a user to modify it by adding components, deleting components, changing the status or deleting said created model, and allowing promotion of a model in our data processing system through the libraries of our data processing system with our various management tools.

This, along with many other changes have been made as detailed in the description of our invention which follows.

Our solution to the problems of a highly customable Design Control System which can be tailored to grow from current methodologies is a highly modular arrangement which enables the user to install only those pieces which are necessary, and grow the design control system from a fairly simple implementation all the way to a system capable of controlling a large complex project such as the development of the ES/9000 mainframes. Our methods can be implemented on a variety of platforms (client/server, VM, etc) using almost any high Level language. In addition the centralized control repository can be any type of database, a relational database, an object-oriented database, or a file-based database.

We provide a Design Control Data Management System (DMS) capable of managing a coherent set of data objects in a computer environment. The objects are tracked in a controlled manner which permits all pieces to attain the necessary degree of completion. The system is designed to maintain data integrity while allowing multiple users to acquire shared access and ownership to the data objects. The invention works in a client/server domain and permits data to span multiple computer platforms.

The Data Management System may incorporate processes for hardware design, software development, manufacturing inventory tracking, or any related field which necessitates execution of repetitive tasks against multiple iterations of data in a quality controlled environment.

BRIEF DESCRIPTION OF THE DRAWINGS.

The subject matter which is regarded as the invention is particularly pointed out and distinctly claimed in the concluding portion of the specification. The invention, however, both as to organization and method of practice, together with further objects and advantages thereof, may best be understood by reference to the following description taken in connection with the accompanying drawings in which:

FIG. 2 illustrates our preferred embodiment's data entry.

FIG. 15 illustrates the Library Structure File

FIG. 16a thru 16b illustrates the main Data Management Configuration screen.

FIG. 30 illustrates the Authority Profile Editing screen.

FIG. 32 depicts a Master Authority List.

FIG. 37 illustrates the algorithm for Level, Version and Search Order information retrieval.

FIG. 40 illustrates the data entry screen for Setting Locks.

FIG. 42 illustrates the data entry screen for Viewing and Resetting Locks.

DETAILED DESCRIPTION OF THE INVENTION

Overview (Section 1.0)

In order to introduce our Design Control System we will describe it as it can be applied to development of complex circuit design and development projects such as microprocessor design projects. The implementation of our Design Control System can be implemented in a variety of ways using many computing platforms as is suitable for a concurrent engineer ing project. While we will describe our preferred embodiment, it should be recognized that with this teaching all or part of our exact implementation of user interfaces, methods, features, properties, characteristics and attributes may vary depending on the platform chosen and the surrounding design system. All of these variances will nevertheless employ those routines which implement our processes and which meet our requirements.

Platform (Section 1.1)

The Design Control System (DCS) in our preferred embodiment, even though it can be implemented with other platforms, runs on a network of RS/6000's (workstation class "personal" computers) with an AIX operating system arranged in a Client-Server fashion. Each client and server in our preferred embodiment, is able to implement cross platform code via interpretation, and thus can implement programs written in cross platform languages like Java and VRML. In such situations, Java can interact with VRML by describing extension modes, acting as scripts, and describing the actions and interactions of VRML objects.

Figure 1:
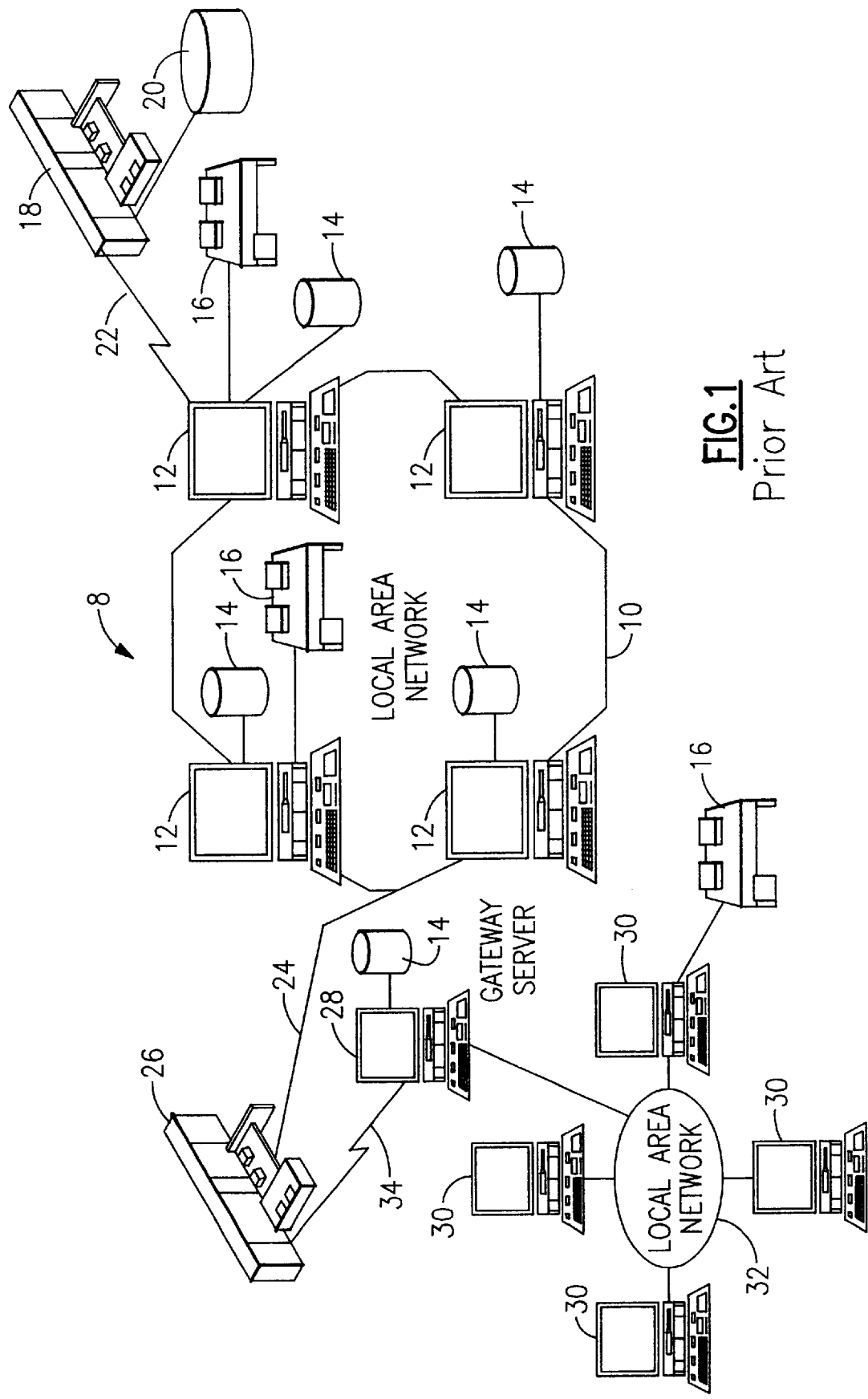
FIG. 1 illustrates a prior art system in which our present system can operate by changes made to the database and design control system, in accordance with our detailed description.

While more powerful situations are contemplated, the system can be installed in a prior art system, like that described in U.S. Pat. No. 5,333,312. Thus, as we show in FIG. 1, the prior art system of the earlier patent, can be employed in this application, by providing the system with new programs. However, such a system, as illustrated by FIG. 1 will be a data processing system 8, which may include a plurality of networks, such as Local Area Networks (LAN), 10 and 32, each of which preferably includes a plurality of individual computers 12 and 30 (which may be RS/6000 workstations or powerful PCs such as the IBM Aptiva's. As common in such data processing systems, each computer may be coupled to a storage device 14 and/or a printer/output device 16. One or more such storage devices 14 may be utilized, to store applications or resource objects which may be periodically accessed by a user within the data processing system 8. As we have said the system is provides with a repository, illustrated by main frame/server computer 18, which may be coupled to the Local Area Network 10 by means of communications links 22, and also to storage devices 20 which serve as remote storage for the LAN 10. Similarly, the LAN 10 may be coupled via communications links 24 supporting TCP/IP through a subsystem control unit/communications controller 20 and communications link 34 to a gateway server 28. Gateway server 28 is preferably an individual computer which serves to link the LAN 32 to LAN 10. The main system can be located anywhere in the world, and remotely from the various servers and clients coupled to it over communications links. The main system can accommodate hundreds of users making requests to the centralized repository (a large server 18, such as one of IBM's S/390 platforms or IBM's RISC System/6000 Scalable POWERparallel Systems (SP) platform for design control information. (AIX, S/390, RS/6000. RISC System/6000 and Scalable POWERparallel Systems are trademarks of International Business Machines Corporation, Armonk, N.Y.)

Since this repository 18 (a large server and its associated storage) is critical to the entire design team, it has the ability to remain available if a single server fails. In addition, the data is secured via a backup or archiving mechanism performed on a regular basis. Our DCS has important performance characteristics. It can handle a distributed computing environment with data being transmitted over LANs and telephone lines linking distant locations in real time. Users at one site experience no noticeable delays accessing data physically located at another site. Due to the complexily of the design, maximum throughput is attained by transferring only the control data necessary to carry out the specific task. For large projects design control information can be physically segregated by library, version and level to minimize the bottleneck caused by too many users accessing the same physical server. In the case of the design data, the physical data is tracked via pointers whenever possible, so as to minimize the amount of file movement between servers. Although, the "official" control information is centralized in one place, the DCS permits certain data to be cached locally on the users machine to improve performance by reducing traffic to the Design Control Repository. For example, much of the control information for private libraries can be cached locally in order to maximize performance for private library accesses. For public libraries, the DCS allows the user to take "snapshots" of a library in which the image of the library is refreshed locally. The user continues to work with his local image of the library until he deems it necessary to refresh the image. The amount of control data that is actually cached is dependant on the environment and the actual implementation. Many of the performance issues are discussed further in the Sections to which they pertain.

Libraries and Design Control Repository (Section 1.2)

The Design Control System has two important components. The Design Control Repository contains the control information for all components of the design. This includes such things as the names of all the pieces, the type of data, the level, the version, the owner, and any results which are deemed quality control records. These results indicate the "degree of goodness" of the design component and they are used by the DCS to make decisions regarding the type of actions which can be performed on a piece of data. This repository can be and is preferably implemented in the form, of a database (relational, object oriented, etc.) or using a flat-file system. The actual implementation is usually based on the environment.

As we have said, and as illustrated by the machine to person interface depicted by FIG. 2, our program of instructions executable by a supporting machine environment for performing method steps by an aggregation manager of a data management system having a library organization which receives a request of a user initiated from said displayed client screen as illustrated by FIG. 2 and fulfills the request by a providing a result which provides a dynamic way to track a model during its course through its design phase via our data management system's aggregation manager.

In order to make a common model, we display for creation of a model one or more control screen sections which provide our control information components 235, 236, 237, 238, and 239 as part of a control panel input screen allowing creation of a model by interactive user activity, by importing a file listing providing the data of screen sections 235, 236, 237, 238, and 239, by searching of a library of files in said data management system and importing a located file containing the data of screen sections 235, 236, 237, 238, and 239, or by use of an application program interface with a collection of model management utilities which provides the data of screen sections 235, 236, 237, 238, and 239. These data fields of our control screen which when created by a user comprise data entered in the form boxes (a form is a screen section entry field for representing a model) illustrated in FIG. 2, and when retrieved or otherwise obtained by the systumn by importing a file listing providing the data of screen sections, by searching of a library of files in said data management system and importing a located file containing the data of screen sections, or by use of an application program interface with a collection of model management utilities, all provide the data of a control screen panel sections which include:

(a) a display screen section displaying a first field representing the name (235) of an anchor name field of a model which is identical to the name of a data object which is serving as a named anchor;

(b) a display screen section displaying a second field representing a library (236) where said named anchor resides;

(c) a display screen section displaying a third field representing the type (237) of data object identified by said anchor name;

(d) a display screen section displaying a fourth field representing user entries for the version (238) of said named anchor;

(e) a display screen section displaying a fifth field representing user entries for the level (239) of said named anchor for use by a user or a third party tool for creating, modifying or deleting an aggregate collection of data objects, encompassing those used for items that are identified, tabulated, tracked, validated and invalidated, and promoted, as are bills of materials, by said data management system.

Furthermore, while, as in the other cases for entry section fields, the same screen does not have to, but can, display an additional field which displays status information. Thus, as illustrated by FIG. 2, the system provides a display screen section displaying a sixth field representing user entries for the status of said named anchor. Now each field can be display separately and various combinations can be made, but all fields are provided by and used by our system. At any time, the entire model schema can be displayed, as it is in the field 240, which displays several models names, as well as their anchor, type, library, version, level and status (which is dynamically tracked by our system).

Our model thus consists of one anchor (with a name 235) and one or more associated components, each of which is a data object in said data management system. This means that our components can belong to any level and version of any library in said data management system and said components are not restricted to the same library, level and version as the anchor, and our components can and do comprise multiple data types, including data generated by tools of said data management system and third party tools.

Now once a model is created or otherwise identified, it becomes part of our system. Indeed the second component is our Design Libraries. They hold the actual pieces of design under the control of the system. There is no limit to the number of libraries under the management of the Design Control Repository, and hierarchical designs are allowed to traverse through multiple libraries. The libraries are managed by Data Managers (Librarians) who are members of the design team. All major facets of the libraries are programmable so they can be tailored to the needs of the design group they service. Certain design groups require more data control than others, so the flexibility exists to widely vary the degree of data control. Libraries are categorized as Public or Private. Both can be shared, but the main difference is that a private library is managed by the actual designer. It's used to hold his daily updates and often will have no formal control. The DCS achieves this by defaulting all control information to a simple non-restrictive form. For example, any designer can create private libraries on their own. They automatically become the owner and have the right to make additional designers "backup" owners. As the owner they can edit, save, modify, or delete any data in their library. The DCS automatically establishes all the proper AFS and AIX permissions. Owners of private libraries control who can access their data with the system accommodating the use of default "access groups" (such as AFS groups) so the designer doesn't have to enter the userids of all his team members each time he creates a new library. Since Private Libraries are considered working areas, data control checks are minimized in order to maximize performance. For example, when a new data element is created, the DCS does not check the Control Repository to make sure the owner has the proper authorities, locks, etc. instead, a designer is permitted to work in a completely unrestricted fashion in his own work space. All controls are placed on public libraries. The only control checking required is to ensure there are no data conflicts within the Private Library. It is acceptable for two Private Libraries to contain the same design data, so no checks across libraries are done. Public Libraries are the official project data repositories. All data delivered to external customers comes from Public Libraries. Public Libraries are overseen by Data Managers who configure the libraries with varying degrees of control. Typically the libraries are organized with a level structure whereby the lowest levels have the least amount control. Control gets more stringent as the levels increase, and the highest level denotes data released to manufacturing. Almost every attribute concerning data integrity is programmable by the Data Manager. Through a Data Manager Utility, they configure the structure (the number of levels and versions, including the connections between them), the various authorities, the required criteria to enter each level, and the types of Library Controlled Processes required at each level. The system can handle numerous public libraries, and each public library can service unlimited users. In accordance with our preferred embodiment of our DCS architecture we provide an Automated Library Machine (ALM). More than merely a repository for data, the ALM is a userid capable of accepting, executing and dispatching tasks without any human intervention. This enables the designers to make requests of the ALM to promote data or run library processes without the need for a Data Manager to process it.

In order to improve throughput, the ALM can dispatch parallel tasks if the operating system (i.e. AFS) supports it and the situation allows it.

This concepts improves efficiency, and increases security, since the ALM is the only user that requires writable permissions to the data repositories. The physical location of the data residing in Public Libraries is determined by the Data Manager. The DCS along with the Data Manager (and his alternates) are the only means of writing data into or removing data from these physical locations. As a means of safety, the Data Manager does have the ability to access and overwrite data in these physical locations without using the DCS (i.e. thru the OS). This is necessary in the unlikely event the control information gets out of sync with the physical data, and the Data Manager has to manually complete a transaction. Physical locations are defined through the Data Manager Utility for setting up Public Libraries. More details on this are available in the Data Manager User Interface Section 15.

Data Types (Section 1.3)

Data may be identified by a filename (anchor name 235) and a filetype (236). The DCS automatically segregates all data by "type". Types are very useful to associate a piece of data with a tool or process. For example, UNIX/AIX uses extensions to qualify data such as using a ".ps" extension to denote a postscript file. The Cadence Design Management System uses Cell Views to segregate the various types of data within a particular Cell design component). This segregation is a fundamental building block to Design Control Systems since certain types of data require more design control than other types. Our DCS allows each individual type to be controlled on a level and version basis within a library. The DCS is capable of tracking any data type from any point tool, even third party vendors.

Levels (Section 1.4)

Each Public Library consists of II levels which are established by the Data Manager. The naming of the levels (239) are arbitrary, but each denotes a degree of quality of the design. Data moves into and out of levels via a "promotion" mechanism. There are two types of levels in the DCS, Engineering (or working) and Release Levels.

Figure 3:
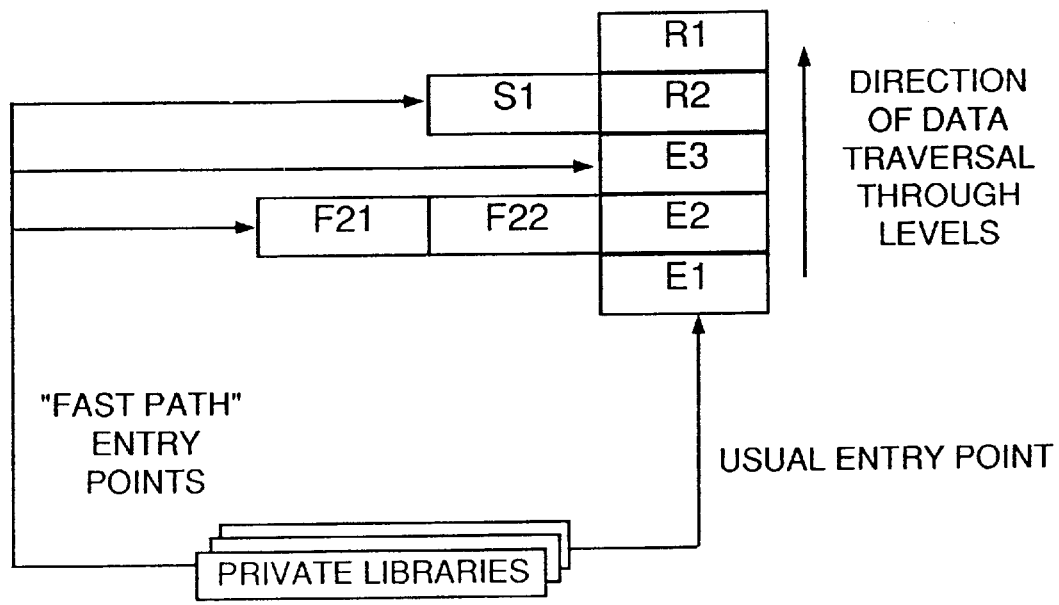
FIG. 3 illustrates our preferred Design Control System Level Structure.

FIG. 3 shows a typical level structure with 3 Engineering Levels denoted E1, E2 and E3, two main Release Levels denoted R1 and R2, a Sideways Release Level S1, and a Fast Path Stream consisting of F21 and F22. Data can be promoted into E1, F21, E3 and S1 from outside of the library, but it can only enter R2 from E3, E1, E2 and E3 are arranged in a serial fashion. The normal promotion path is for data to enter E1 (the least controlled level) and migrate up through E2, E3 and finally into R2 (the most tightly controlled level). The external paths into F21 and E3 are known as "fast paths" and exist to accommodate emergency updates to pieces of design residing at the higher levels. There are two different types of fast path arrangements:

Fast Path Entry means there is no fast path level associated with the Engineering level, just a "doorway" through which data can enter. Level E3 is an example of this where the user simply promotes data from the private library into E3. The DCS will run any preprocesses defined at E3, but any criteria that would normally be necessary to traverse through E1 and E2 is bypassed.

Fast Path Levels are staging areas where data is promoted into, and promoted through, in order to reach the target Engineering Level. There can be any number of Fast Path levels for any given Engineering Level. If there's more than 1, it's known as a Fast Path Stream since the data must migrate through all the Fast Path Levels before reaching the Engineering Level. F21 and F22 constitute a stream, which could've contained more than 2 levels. We have provided at least one level to provide an area where all the processing normally run at the E1 and E2 levels can be run to ensure that the fast path data meets all the same criteria.

Release Levels are handled in a different manner. R1 is the oldest release level and it's frozen, which means its contents can't be updated any longer. It contains a static snapshot of a design delivered to an external customer. R2 is now the active Release Level which is the destination of any data promoted from E3. The Data Manager programs the connection of E1 to E2 to E3 to Rn. The DCS automatically freezes the previous Release Level and connects E3 to the new Release Level whenever the Data Manager creates a new one. Unlike main Release Levels, Sideways Release Levels are always active and there can be n Sideways Levels for each Release Level. The purpose of the Sideways Levels is to hold post tape-out updates such as microcode patches to hardware under test. Since the Release Level corresponding to that level of hardware is probably frozen, and a new iteration of design is propagating through the Engineering Levels, the only path into a Sideways level is directly from a Private Library. The Data Manager has the ability to recon-figure the Engineering Levels at any time based on these rules:

The connections between levels can be changed at any time. (i.e. E1→E2→E3 can be changed to E1→E3→E2.)

A level can be removed as long as no data resides in that level.

A level can be added at any time.

The Data Manager can create a new Release Level at any time. Existing frozen Release Levels can be removed as long as no data resides in that level. A frozen level can become an active level again if no data resides in the current active Release Level. The DCS performs a "thaw", a step which removes the current Release Level (R2) and connects the previous level (R1) to E3. As shown in FIG. 3, the DCS supports the normal promotion path to E1 as well as "fast paths" into E2 and E3. The following minimum checks are performed at all entry points:

The owner attempting to send data to a Public Library must possess the update lock. If no lock exists, the sender obtains the lock by default. If another user has the lock and the sender is a surrogate, he can obtain the lock (the system immediately notifies the original owner). If the sender is not a surrogate, the action is halted, until ownership is properly transferred.

If the level to which the data is being promoted to has any entry criteria, it is checked to ensure the data passes the criteria.

Versions (Section 1.5)

Figure 4:
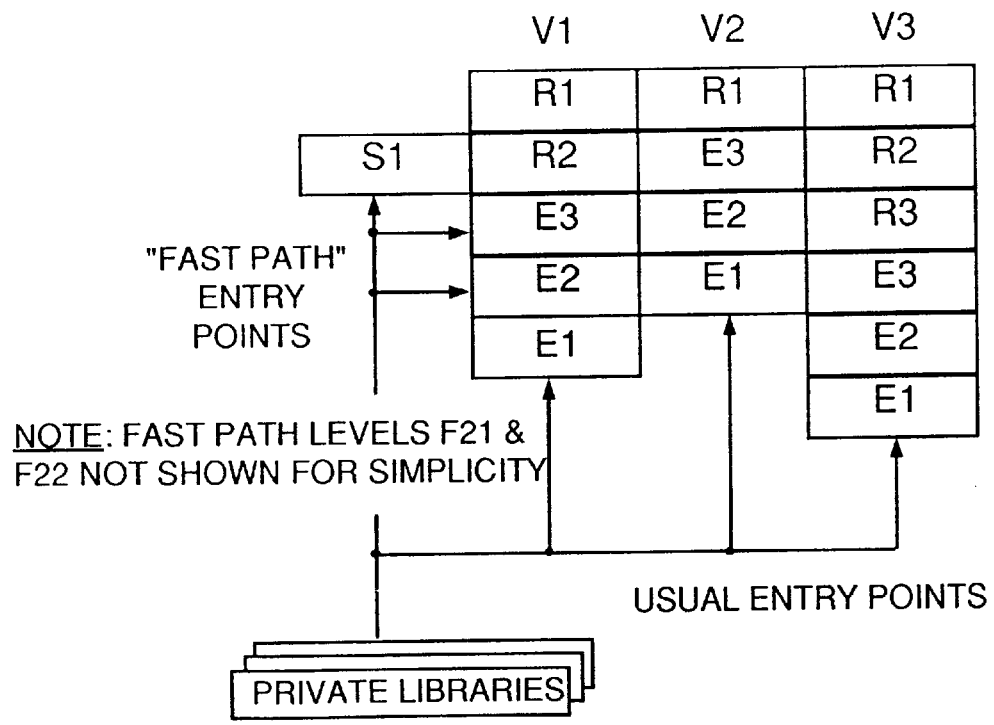
FIG. 4 illustrates our preferred Design Control System Level Structure with Versions.

Each public library consists of n versions which are defined by the Data Manager. The concept of versions exist to support parallel design efforts. All versions have the same Engineering (Working) Levels, but hive different Release Levels depending on the frequency of tape-outs for that version. Data in separate versions is permitted to traverse the levels at independent rates. For example, if a piece of design has 2 versions, 1 version may exist at E1 while the other version exists at E3. FIG. 4 is an extension of FIG. 3 in which library structure has been expanded to show 3 versions, V1, V2 and V3. In theory there's no limit to the number of versions just as there's no limit to the number of levels. Versions can be independent or dependent.

Independent versions are isolated and must ultimately contain the entire set of design components. Dependent versions are based on previous versions (which the Data Manager specifies when creating a new version). By supporting the concept of dependent versions, only the incremental data necessary for a new design variation needs to be libraried in the new version. The Library Search mechanism will be able to construct a complete design Bill of Materials by picking up data from both versions.

Library Search (Section 1.6)

Our preferred embodiment of the DCS provides support for "Library Searches". This allows data, which is used in multiple iterations of the design, to exist in only one place. In other words, if a design component is changed, only that component needs to be re-libraried at a lower level. A full model can still be constructed by starting the search at the lowest level where the component is known to exist. The library search mechanism will pick up the latest pieces at the lowest level, then search through the next highest level to pick up more pieces, and so on until it reaches the highest level where all components reside. In addition to searching through levels, the mechanism also searches through versions. The user provides a starting library level, version and either a single type or a list of types. If the version is based on a previous version, and all the necessary design components can't be located in the starting version, the mechanism searches the previous version based on the following two rules:

1. If the search begins at an Engineering Level in one version, it resumes at the same Engineering Level (not the lowest level) in the previous version.
2. If the search begins at a Release Level (including a Sideways Level) in one version, it resumes at the latest Release Level in the previous version. This may be older or more recent in time than the released data in the current version.

Figure 5B:
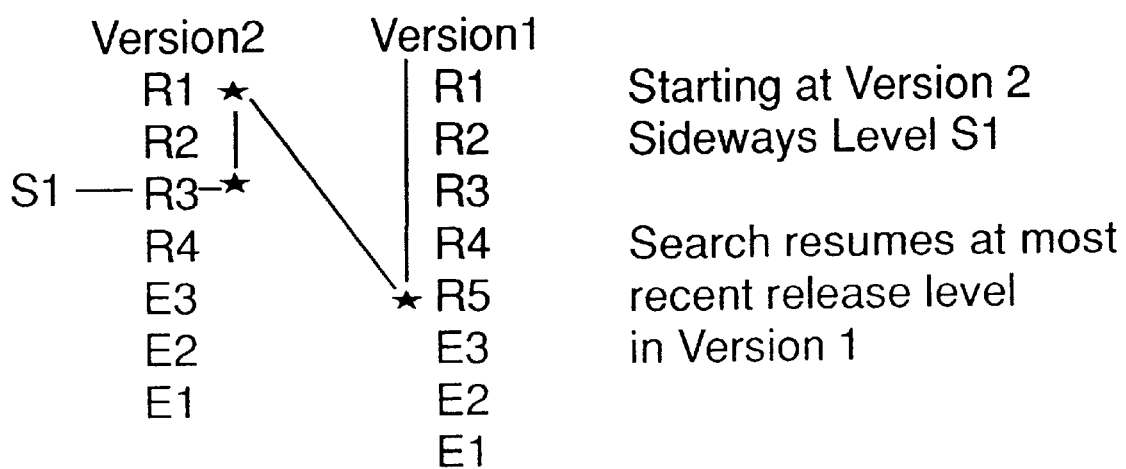
FIG. 5 (illustrated in parts FIG. 5a and 5b) illustrates our preferred Design Control System Library Search Examples.

FIG. 5 shows examples of the Library Search Mechanism. The library search utility is available to designers, Data Managers and third party tools. The interface is both command-line and menu driven to accommodate any environment. In addition to the required parameters of type, level and version, the user has the option of specifying the name of a data object. These additional options exist:

Noacc
  This allows the utility to use a temporary caches copy of the search order information for performance reasons. Since this information may be obsolete, the absence of the option results in the actual Design Control Repository being accessed and the search performed from within it.

File
  Write the results into an external file.

Various Sorts
  They control the way the output is sorted and displayed.

Nosearch
  Only list data found at the starting level.

First/All
  Indicates whether to include all existences of a particular design component or only the first one in the search order.

Select
  Presents a selection list of all candidates so the user can choose those of interest.

Noversion
  Prevents the search from tracing back across version boundaries.

Levels
  Displays the search order based on the existing level structure.

Versions
  Displays the search order based on the existing version structure.

Locks (Section 1.7)

In order to properly control shared data, the DCS supports several types of locking mechanisms. Two of the locks exist to control groupings of files that may comprise a model build. These are known as move and overlay locks. The user can set one of these locks using a utility which allows him to control the scope of the lock based on certain fields. The user can enter specific data or a wildcard, indicating "ALL", for Name of Design Components
  Type of Design Components
  Level of Design Components
  Version of Design Components
  Library Name By specifying only a library name and four wildcards, the user is requesting that all data in the library be locked. By filling in all five entries, a specific design component will be locked. Various degree of locking exist in between those extremes.

If the information corresponds to a Bill of Materials (BOM) and the user wants to set the lock on the entire BOM, a BOM Flag will exist allowing him to specify this action. Regardless of how these fields are filled in, all locks will be set individually so they may be removed individually. A lock does not have to be removed the same way it was set. The user will also specify the type of lock. Move, Overlay, or Update (Ownership). The following definitions exist:

Move Locks mean the data can't be overlaid by the same data at lower levels, nor can it be promoted to a higher level. This provides a method for completely freezing an Engineering Level while a model build or large scale checking run is in progress.

Overlay Locks are a subset of move locks. The data can't be overlaid by the same data from lower levels, but it can be promoted to higher levels.

Update (Ownership) Locks are the means by which a designer takes ownership of a piece of data. Update locks are designed to prevent multiple designers from updating the same design component in an uncontrolled way, thus resulting in data corruption or lost information. There are two types of Update locks, permanent and temporary.

A permanent Update lock exists when the designer specifically requests to own a piece of data. This is done through a utility, and the DCS keeps track of this ownership. Other designers may copy and modify the data in their private libraries, but any attempt to promote that data into the public library will fail, unless the designer is a designated surrogate of the owner. The only way these locks are removed are by the owner resigning the lock or a surrogate assuming the ownership of the data, and the corresponding lock. A temporary Update lock exists to facilitate sharing a piece of data among multiple designers. The user can either request a temporary Update lock in advance (i.e. when he begins editing the data), or he can wait until he initiates the promote into the public library. The DCS will first check to see if anyone has a permanent Update lock, and if so, it will only allow the promotion to continue if the user is a designated surrogate. If nobody has a permanent Update lock, then the DCS will issue a temporary Update lock for the time the data remains "en route" to the final promote destination. Once it arrives safely, the temporary Update lock is removed and the data can be claimed for ownership by someone else. Surrogates are "alternate" owners of data. For example, a project may be arranged such that each piece of design is owned by a primary designer, but also has a backup owner (designer) to take over the design during vacations, emergencies, etc. In this case, the owner can tell the DCS that the backup designer should be a surrogate, thus giving him the right to take ownership of a design component. The surrogate can either use the locking utility to specifically take ownership prior to making any updates, or he can wait until he initiates a promotion. The DCS will check to see if the design component is currently owned, and if so, check to see if the user is a defined surrogate. If both are true, it will give the user the chance to "take ownership" and allow the promote to continue. The original owner would be notified that his surrogate has taken ownership.

Figure 6:
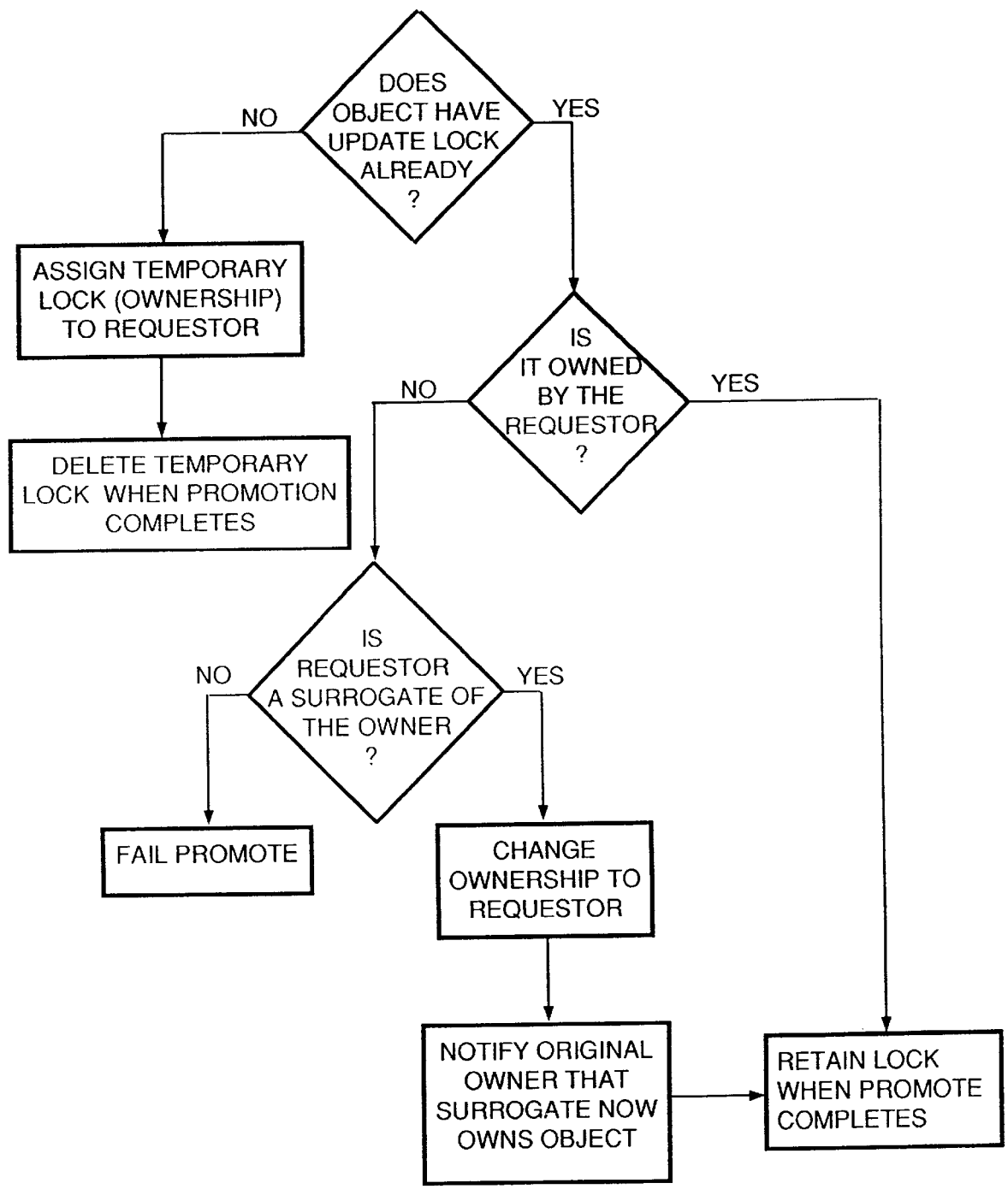
FIG. 6 illustrates our preferred Mechanism for Update Locks.

FIG. 6 illustrates the lock mechanisms for Update locks.

Bill of Materials Tracker (Section 1.8)

The DCS has a built-in Bill of Materials (BOM) Tracker to facilitate tracking many design components in large projects. The main objective of the BOM Tracker is to group certain design components to make it easier to promote them through the library and track their synchronization. This is crucial for data sets that contain some source and some derived files from that source. The following features exist in the BOM Tracker:

- It supports automatic data grouping, based on the design component name, with the notion of required and optional data types. One example might be a grouping which consists of a graphical symbol denoting the I/O of a design component, the corresponding piece of entity VHDL and the architectural VHDL. Any changes made to the symbol should be reflected in the entity, so the entity would be required. A change may also be made to the architecture, but it's not always necessary, so the architectural VHDL would be optional. When a promote is initiated to a public library, or between levels of a public library, the DCS checks to see whether a data grouping is defined for the data type being promoted. If so, then all required data types are checked to ensure they exist. In addition, any optional data types are checked for existence and they are also picked up. The entire grouping is promoted to the target level. If a required data type does not exist, the promotion fails. Automatic data groups are programmed into the DCS by the Data Manager. Since they are BOMs, all rules of BOM tracking, invalidation and promotion exist for the members of the grouping.
- BOMs are used for two main reasons. First they are used to group many smaller pieces of data into larger more manageable chunks to facilitate movement through the library and increase data integrity by reducing the risk of data getting out of sync. The other main reason is to track the components of a model (i.e. simulation, timing, noise analysis, etc.). The DCS offers a very flexible user interface for creating BOMs in order to satisfy the various scenarios. The user can manually create BOMs by selecting pieces of design interactively, filling in search criteria and initiating a library search, or importing a simple text list. In addition, an API exists for point tools to create a BOM listing and pass it into the DCS.
- The power of the BOM Tracker is augmented with our automatic invalidation routine. Once a BOM is created, the DCS constantly monitors for a change to the BOM. If any member is overlaid or deleted, a notification is sent to the owner of the BOM indicating that the BOM is no longer valid. The owner can continue to work with his model, but he is aware that he's no longer using valid data. Even though a BOM is invalid, it can still be moved through the library. This accommodates the occasion where a piece of a model had a relatively insignificant change. If the model builder deems it unnecessary to re-build the model, this feature allows him to continue his work and even move the BOM through the library.
- Status on BOMs is and should be accessible in two ways. The first is by automatic notification (e.g. e-mail) to the owner as soon as a BOM is invalidated. The second is by means of displaying the BOM either interactively or in report form. This listing shows the overall status of the BOM, and all members of the BOM with their individual status.
- The BOM Tracker also supports the concept of a "support" object. This can be a design component, a piece of information, documentation, etc., that can be associated and promoted with a BOM but never causes BOM invalidation.
- BOMs are hierarchical in nature and a BOM can be nested within a larger BOM. Whenever a piece of data is overlaid or deleted, the DCS looks to see if that piece belonged to a BOM. If so, it immediately checks to see if the BOM belongs to other BOMs. It recursively checks all BOMs it encounters until it's at the top of the hierarchy. All BOMs found will be invalidated (if they are currently valid) and the owners notified.
- BOMs support move and overlay locks. The user can set a move or overlay lock on a BOM, and the DCS will set individual locks on all the members. If a member is a BOM, all of its members will receive individual locks. These locks can be removed by using the main lock utility and specifying the top-level BOM or filling in the desired fields to individually reset locks.
- The DCS supports the concept of a BOM promote, which means the user can request that all the contents of the BOM be promoted simultaneously. This increases data integrity by helping to ensure a matching set of design data traverse through the library in sync.
- BOMs can contain members who reside at different levels, different versions and even different libraries. The DCS will only promote those members which exist in the current library, and reside in an Engineering Level below the target level. If a member exists in a different version and is also below the target level, it will also be promoted.
- There is separate authorizations for creating and promoting BOMs. This is set up by the Data Manager, so they can have complete flexibility in controlling who can create and move BOMs.

Promotion Criteria and Promotion Mechanism (Section 1.9)

Figure 7A:
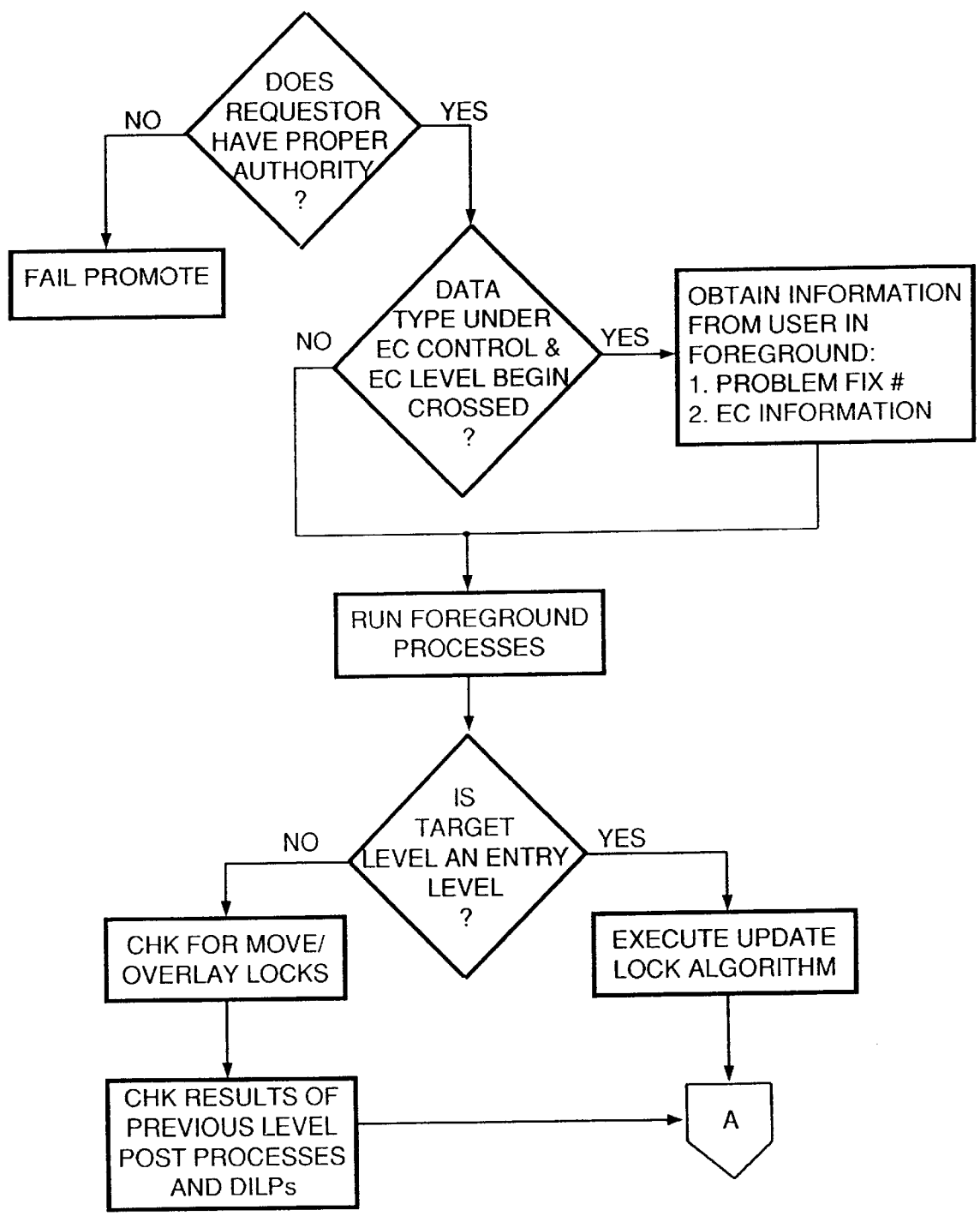
FIG. 7 (illustrated in parts FIG. 7a and 7b) illustrates our preferred Promotion Mechanism.
Figure 7B:
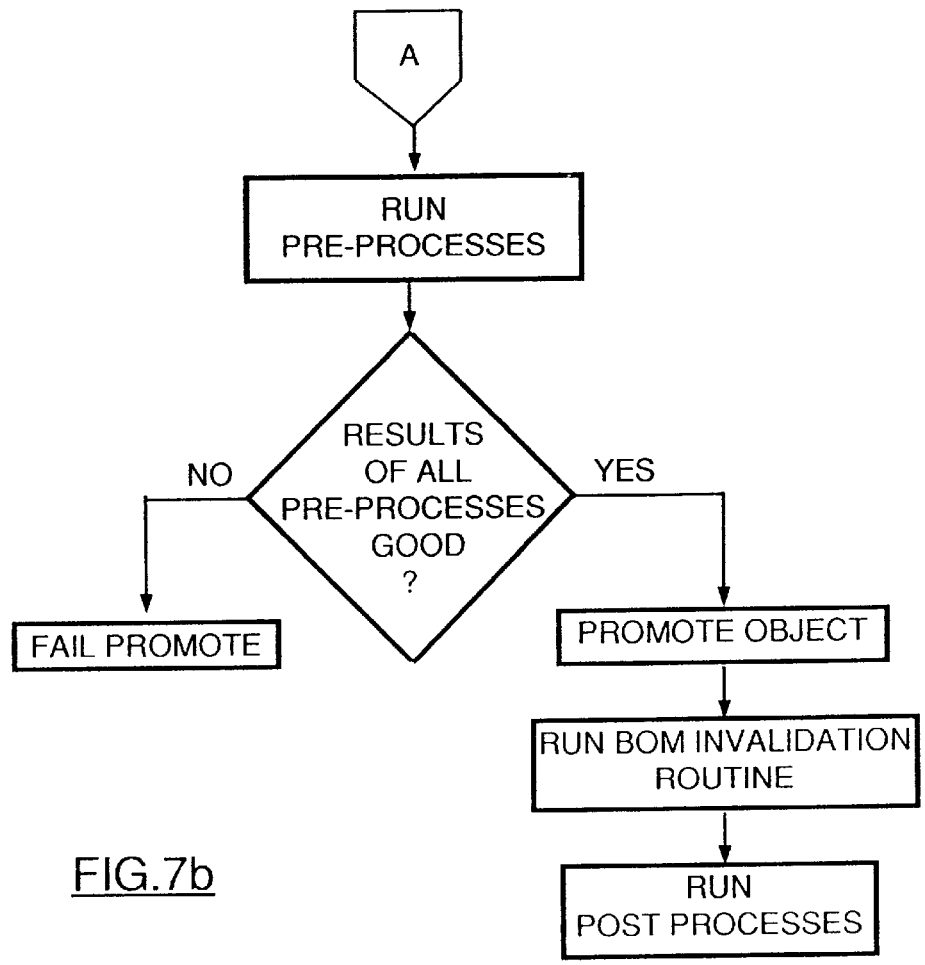

An important aspect of the DCS is that it provides a method for the design to traverse to different levels of goodness. As the design stabilizes at the higher levels, the number of pieces which need to be moved and tracked can be very large. The DCS uses the concept of promotion criteria and robust mechanisms to first determine what data can be promoted, then carry out the task in an expedient manner. The DCS supports two variations, "move" and "copy", promotes. In a "move" promote, data appears to the user like it only exists at the target level once the promote completes. The user is unable to access the copy that existed at the previous level. For example, if a design component is at level E2 and the user promotes it to E3, when the promote is finished and the user refreshes his image of the library, he sees the data at E3 only. In a "copy" promote, the data still appears at the previous level. The user can access it at either location. As new iterations of the same design component are promoted into a level, the old component is not truly overlaid. It is moved off to the side so it can be restored in an emergency. Promotion criteria usually exists in the form of library process or pseudo-process results, but in general it can be any condition that must be met by the the object(s) being promoted. It is defined by the Data Manager and can exist for any design component at any level and version. Certain design components don't undergo any formal checking or evaluation in the design process, so they may never have any promotion criteria. Other pieces may undergo the majority of checking so they may have lots of criteria. The objective of the DCS is to track actual results fog bash design component and use the promotion criteria to determine if the design can attain the next level of goodness. When a design component is overlaid or deleted, all corresponding results are deleted too. The DCS supports an emergency override mechanism which allows the Data Manager to promote data which does not meet the criteria. Invoking an emergency override cause a log entry to be written indicating criteria has been bypassed. The Data Manager determines which results are necessary for which types of design at each Engineering and Release Level. These results may get recorded through "library controlled" or "external" processing. At the time the promote is initiated (whether it be against individual design components or BOMs), the mechanism illustrated by FIG. 7a and FIG. 7b is invoked to determine what pieces should be promoted. There are three types of promote transactions:

1. Promotion of an Individual Design Component
2. Promotion of a Group of loosely-coupled Design Components
3. Promotion of a Group of tightly-coupled Design Components (i.e. BOMs)

Basically, the same mechanism is employed in all three cases, but cases 2 and 3 require additional optimization for high performance. In case 1, each step in the mechanism is executed once and the promotion either succeeds or fails. Case 2 is initiated by a user selecting a group of objects to be promoted. They may or may not have any relation to each other. In this case some optimization is done, but each object is basically treated as if it were initiated as an individual promote. For example, the authority check only needs to be done once since the same user is requesting the promotion for all the objects. However, since each object can have unique locks, criteria, processes defined, etc., most of the steps need to be repeated for each object. Case 3 is the most complicated because the DCS offers a great deal of flexibility. The actual implementation is dependant on the platform of the DCS and the type of control mechanism in place (file-based, object oriented database, relational database, etc.). If the user community wants to eliminate flexibility in return for increased performance, the DCS can enforce rules such as no library processing allowed for members of a BOM. In this scenario, the entire algorithm would be executed on the BOM itself to ensure the proper authority is in place, it meets the promotion criteria, and any processing that's defined is executed. However, each member could bypass some of the checks thus saving a significant amount of time. If the user community opts for flexibility, some optimization can still be performed. For example, if a BOM contains 10 members and the mechanism calls for five checks on each member, there doesn't need to be 50 requests for information. Depending on the platform, it may be optimal to either make one large request for each member (ten total requests) and obtain all five pieces of information in the request. In other cases it may be optimal to initiate a request for a piece of information, but solicit it on behalf of all ten members (five total requests). Since these BOMs can be extremely large, the various kinds of optimizations and trade-offs between flexibility and performance determine the exact implementation. As a convenience feature the DCS supports a multiple promote feature which allows the user to request a promote through multiple levels. For each level the promotion mechanism is followed as stated above. For example, when initiating a promote, the user can specify to move data from E1 to E3 with a single invocation. However, the DCS will internally break it into two separate promotes with the full mechanism being run for the E1 to E2 promote, then again for the E2 to E3 promote.

Library Controlled Processing (Section 1.10)

The concept of Library Controlled Processing allows tasks to be launched from a public library, against one or more design components, with the results being recorded against the components. This is an automated method to ensure that tasks, and checks deemed critical to the level of design are run and not overlooked. Since some of these tasks could be third party tools, the actual implementation can vary in sophistication. In its simplest form, Library Controlled Processing consists of the following constituent parts:

Foreground Processing:
  This is the conduit by which the user enters any information required to run the tool. Menus may be presented or the user may interact in some other way.

Pre-Processing:
  This refers to a library controlled process that is launched prior to the data being promoted to the target level. The process must finish and complete successfully, based on the promotion criteria of that process, if the promote is to continue. For example, if a pre-process is defined at level E2, then when the promote to E2 initiates, the process is launched and the promote "suspends" until the process completes. Once it finishes, the result is compared against the criteria to ensure it's satisfactory. The promote then resumes.

Post-Processing:
  This refers to a library controlled process that is launched after the data arrives at the target level. The results of the process are used as promotion criteria to the next level.

Designer Initiated Library Prcesses (DILP):
  This is very similar to a post process, but instead of the DCS launching the process, it's manually launched by the designer. DILPs usually exist to retry Post-Processes which failed. This eliminates the need for the user to re-promote the data just to initiate the processing. If a DILP is used to recover a failing Post- Process, and the DILP is successful, the good result will overwrite the bad result from the Post-Process. Just because DILPs are primarily used to recover failing Post-Processes, the DCS doesn't make this a restriction. The Data Manager can set up DILPs as stand-alone processes with no corresponding Post-Process. DILPs that exist to recover failed Post-Processes are optional in that they are not counted as required promotion criteria. Stand-alone DILPs can be optional or mandatory, with mandatory DILPs being required to run successfully in order for the data to promote to the next level. The DCS allows the Data Manager to designate which DILPs are mandatory and which are optional.

Level Independent Pseudo Processes:

These are special types of process which are more like process results than actual processes. They exist as a meaAs to record information outside of the scope of results from Library Controlled Processes or External Data Processing. For example, suppose a Library Process exists to run a layout checking program which checks for wiring and ground rule violations. Ultimately the program will return some pass/fail result, such as a return code, which the DCS uses as the process result. The tool may also return other useful information which the designer wants to save, such as the number of wires or cells in the design. Pseudo processes provide a repository for this kind of daid. Like DILPs, these can be used as mandatory criteria for promotion, or they can be optional and used solely for information. They can even serve as status indicators for design components progressing through a lengthy process at a particular level. The concept of level independence means the checking program could be run at the E2 level, but the pseudo process results can be stored at E3. In short, the DCS allows a pseudo process to be defined at any level, and it can be set by a process running at the same level, any other level or completely outside of the library. The DCS provides an API for setting level independent pseudo processes. The API can be used by designers, Data Managers or third party tools, and employs a "process search" similar to a library search. This means the API allows the user to specify the name of the process, the data type, level and version. The DCS will use this as a starting level and search for all matching pseudo processes defined at or above this level by following the same library search mechanism as in FIG. 5. A flag also exists to disable the search and set the result for the process specified at that level and version.

Any number of any type of process can be defined by the Data Manager for a given data type at a particular level and version. In addition, processes can be chained together in independent or dependent sequences. In a dependent sequence, each process must complete successfully before the next process in the chain can initiate. For example, when compiling VHDL, the entity must always be compiled prior to the architecture. Thus two compiles could exist as a dependent sequence where the entity is compiled, the result checked, and if successful, the architecture is compiled. In an independent chain, the first process initiates, and when it completes, the next process runs regardless of the outcome of the first process. Processes can also execute using input data other than the object used to initiate the promotion. Using the VHDL compile example, the actual object being promoted could be a simulation BOM which contains that entity and architecture VHDL. The DCS provides a robust system for the Data Manager to define the processes which should be run, and the type of data they should run on. Certain library controlled processes require special resources such as large machines, extra memory capacity, etc. Therefore, the DCS allows the Data Manager to specify a particular machine or pool of batch machines where the tasks can execute. Either the task is transferred to the specific machine or a request is queued up in the batch submission system. In the event that a task must run on a completely different platform, the DCS provides hooks to launch a library controlled process from one platform which initiates a task on a different platform (i.e. a mainframe). The results are returned back to the original Automated Library Machine and processed. This Cross-Platform capability allows the DCS to encompass a broad and sophisticated methodology utilizing tools on many platforms. Regardless of how the process is launched, the results must ultimately get recorded within the DCS. To accomplish this, the DCS provides an Application Program Interface (API) through which third party tools can communicate. When the task completes, the API is used to convey the results and the pedigree information back to the DCS. The DCS provides both an interactive means and a report generator to view process results. FIG. 7a and FIG. 7b illustrate the method by which promotions and library controlled processing interact.

External Data Processing (Section 1.11)

External Data Control is very similar to the Designer Initiated Library Process in that the user launches a task against some design component(s). However, unlike DILPs which require that the design components be under the control of a Public Library, this type of processing is done on data in Private Libraries and designer's work spaces. External processing is the mechanism whereby the DCS captures the results of the process along with pedigree information concerning the input data, output data and any necessary software support or execution code. This pedigree information is stored along with the design component for which the designer initiated the process. When the designer promotes that component at a later time, the DCS checks the pedigree information to ensure nothing has changed. It then checks to see if the external processing matches any of the defined library processes which are required for the promote. If so, and the external processing results meet the criteria, the library process results are set (as if the library process just ran automatically) and the promote proceeds. If no matching process can be found, the external results continue to be saved with the design component as they process may match that at a later level. The concept of External Data Processing exists to increase productivity by allying the designer to save, and later apply, results obtained during the normal course of design rules checking to the "official" results the DCS uses to determine the level of goodness. Overall data integrity can easily be breached if a proper mechanism for calculating pedigree information is not implemented. For this reason it's imperative for the DCS to ensure that all the proper input, output and software data are included in the pedigree information. External Data Processing occurs in two phases. In the first phase, the designer runs some tool or process and if the results are acceptable, he runs a utility to designate the data for external processing. The role of the utility is to create the Pedigree information which contains a listing of the input and output data, the results, and some type of data identification code for each member of the Pedigree and the Pedigree itself. A simple identification code is a cyclic redundancy check. The utility can be independent of or incorporated into the actual third party tool. The second phase consists of librarying the data and the results. The designer invokes a special form of a promote which first does the following:

1. Check the data identification code (i.e. CRC) of all members in the Pedigree
2. Check the data identification code of the Pedigree itself.

These 2 steps are designed to ensure the same data used to generate the result is indeed being libraried. The identification code of the Pedigree ensures that the contents of the Pedigree weren't manually altered. From this point on, the normal promotion mechanism in FIG. 7a and FIG. 7b is followed with one exception. The boxes where Foreground, Pre and Post Processing occur are all bypassed. Rather than simply checking existing results to see if they meet criteria, the DCS makes a list of all Pre-processes for the target level and Post processes for the previous level. It then checks the Pedigree information for evidence that equivalent processes were run and achieved acceptable results. If any processes exist in the DCS for which no corresponding Pedigree results exist, or any Pedigree result does not meet the prescribed criteria, the promote fails.

Authorities (Section 1.12)

The DCS permits the Data Manager to establish a wide variety of authorities which gives him great flexibility in managing the library. Each type of authority can be defined very loosely (the user is authorized for all design components, at all levels, in all versions) to very tightly (the user is authorized on an individual design component basis). The utility for granting authorities works in one of two modes:

In one mode the Data Manager is offered a screen in which he can fill in the design component name, type, level, version, user ids, and the type of authority. For any field, except for the user ids, he can default it to "ALL".

In the other mode an authority profile can be called up and executed. An authority profile allows the Data Manager to pre-define the types of authorities for a given type of job. For example, profiles may exist for Designer, Technical Leader, Model Builder, etc. This information is contained in an editable ASC file in which the Data Manager defines the kinds of authority to varying degrees of restriction. Once the profiles are created, the Data Manager uses this mode to either add/delete users to/from the profile and process the changes within the DCS.

Authorities exist for the following tasks:
  Setting Locks (Move, Overlay, Update, ALL)
  Promoting design components and/or BOMs into levels (Engineering Levels, Release Level.
  Creating BOMs
  Initiating Library Processes
  Setting Pseudo Process Results

Data Manager GUI User Interface (Section 1.13)

The DCS contains a robust Data Manager interface which is used to "program" the library. It's configured as a series of sub-menus arranged under higher level menus. Each sub-menu has fields to fill in and may employ Predefined Function (PF) keys for additional features. Graphical elements such as cyclic fields, radio buttons, scrollable windows, etc. may be used to further enhance usability. Utilities exist to:

Define the library properties
  The user is afforded a means to enter the path of the repository where the data resides, the userid of the Data Manager and any alternates, the userids of any Automated Library Machines, and whether the library is under Design Fix or Part Number and EC control. If the library is under any type of control, additional entries are made for the data types which should be tracked by Part Number, the data types which should be tracked by Design Fix number, the EC control level, and a field for a generic problem fix number. For any ALMs, the DCS will automatically add the proper authorities (including operating system authorities) to permit the ALM to store data and record results.

Define the structure (levels, versions and their interconnections).
  This is the means by which the Data Manager adds and deletes levels and versions. It also enables him to defined the interconnections of the levels, and the dependance of versions on other versions. A minimum interface consists of one screen for level structure and one for version structure. The level structure screen displays the current structure.

Define the types of data which will be under library control.
  For all data types known to the DCS, this enables the Data Manager to select those managed in this particular library. The screen displays all known data types in the system with a flag indicating whether it's being tracked by this library. Each data type also has a field for an alternate storage location. This solves the problem caused by certain data types that can be very large. Therefore, problems may arise in trying to store these data types along with the all the other types in a particular level. By specifying an alternate storage location, these large data types can be further segregated.

Manage Library Controlled Processes
  For each level, the Data Manager can add, modify or delete processes. For each process information is required about the type of machine it can run on, any necessary arguments, the result criteria, disposition instructions for the output, whether it's dependent on another process, and whether it should be deferred. The DCS provides Process Specific Boilerplates which can be used to manage process configurations for an entire project. Necessary and required information for each process can be programmed into the DCS, so when a Data Manager attempts to define that process to his library, some of the fields appear with default data already filled in. He can override any of the data.
  The information for each process can be entered/edited individually on a menu containing all the above fields or a utility exists to load "process groups" which are pre-defined library controlled processes. The Data Manager simply selects a process group and attaches it to the appropriate data type, level and version. The process groups are ASC based files which contain the necessary process information in a prescribed format. They can be created using any ASC editor.

Set up authorities.
  See the previous Section 1.12 for details.

Define automatic data groupings (Subset of BOM Tracking)
  This enables the Data Manager to define a data group which consists of a master object and member objects. Each member object can be required or optional. For each master object entered, the user must enter a list of member objects with their required/optional flag. In addition, an Erase-To-Level flag exists which determines the outcome of the following scenario: a data group, comprised of optional members, exists at a level. The same data group, without so me of the optional m embers, exists at the next lowest level. Upon promotion of the lower level data group, the DCS will either erase the members of the upper level data group or leave them, depending on the Erase-To-Level flag. By leaving them in place, it allows members of newer data groups to join with members of older data groups.

Design Fix Tracking (Section 1.14)

One of the most powerful aspects of our DCS is provided by the process used to track fixes to design problems. This is accomplished by tightly or loosely coupling the DCS to a problem management database. Typically, a problem is found and entered in the problem tracking database. Once the design components are identified which require updating, the DCS is used to attach the problem number to those design components. Ideally this should be done prior to the design components entering the library, but it can b e done as part of the promote. It's often redundant to track all design components with problem numbers, so the DCS can be programmed to only enforce Design Fix Tracking on certain data types. Whenever a promote is initiated, the DCS checks to see if the library is in Design Fix Tracking mode (which means some data types require Fix problem numbers to enter the library), and looks to see if any of the data types included in the promotion are being tracked. For those that are, a screen displays all known problem fix numbers for that design component. The user can select an existing one or add a new one to the list. At this time, the DCS will check to see if the EC control level is being crossed (or bypassed via a fast path promote). If so, it will attempt to associate the problem fix number to an EC identifier. If it can't automatically determine this association, the user is prompted to enter the EC identifier for the selected problem fix number.

If the designer chooses to do the association in advance, a utility exists which allows him to enter a problem fix number or choose a default number. The status is immediately reflected as "working". Once the promotion is initiated the status will switch to "libraried". The DCS offers utilities to view or print reports showing which design components exist for a problem or which problems are fixed by a design component. The report, generator allows the user to enter the problem number and see which design components are associated to it. Or the design component can be specified to see which problems it fixes. Finally, and EC identifier can be specified and all problem numbers and design components associated with the EC can be displayed.

Part Number/EC Control(Section 1.15)

In addition to tracking design fixes, the DCS can track the design by part number and/or EC. For projects which assign part numbers to various design components, the DCS provides utilities to generate and associate these part numbers to the design components. In addition, the DCS supports Engineering Changes where successive tape-outs are assigned an EC identifier. All design components participating in an EC are associated with the EC identifier. Since part numbers are assigned to specific design components, the DCS uses the links between components design fixes and EC's to track the association of part numbers to ECs. The DCS uses the concept of a PN/EC control level to permit the Data Manager to determine at which level PNs and Design Problem numbers get associated with EC numbers. As design components cross this level, the DCS checks to see whether a problem number or PN exists for the component. If so, and the system is able to determine which EC that number is associated with, it automatically connects the component to the EC. Otherwise, if no EC information can be found, the user is asked to enter it. The rules for Design Fix and EC control are as follows:

One EC can contain multiple Design Fixes;
Any single Design Fix # (number) can only be associated with a single EC;
One design component can have many Design Fix numbers, but they must all belong to the same EC; and
Variations of a design component can exist in multiple ECs, but each must have a unique set of Design Fixes.

Figure 8A:
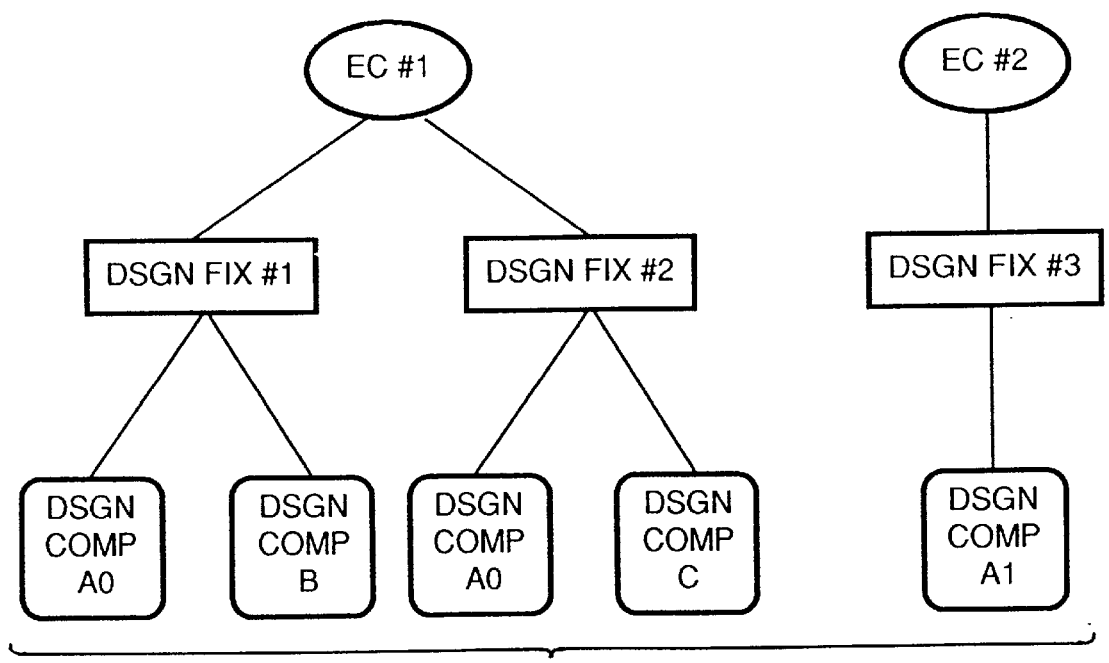
FIG. 8 (illustrated in parts FIG. 8a and 8b) illustrates our preferred Design Fix Management and EC Control.
Figure 8B:
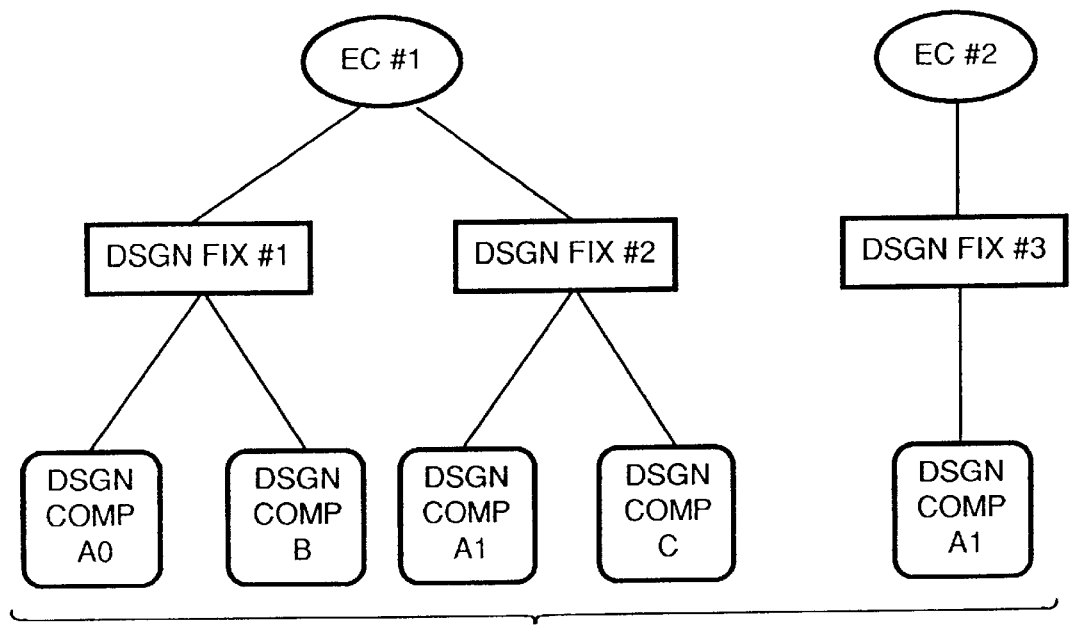

FIG. 8a illustrates a legal example. It shows two EC's where the first contains two design fixes and the second contains a single design fix. There are three design components, of which the one denoted A0 is associated with Design Fix #1 and Design Fix #2. Design component A1 is a different variation of design component A0 The example shows how the two versions of design component A must belong to separate ECs. In FIG. 8b the rules have been violated since design component A1 is associated with Design Fix #2 which belongs to EC #1. The DCS detects this condition and alerts the user to either move Design Fix #2 over to EC #2, or detach design component A1 from Design Fix #2. In addition to tracking all the part number and EC information the DCS is capable of generating a variety of reports including one listing all the part numbers for a given EC. This report can be sent to manufacturing in advance so the foundry can manage their resources.

RAS and Security (Section 1.16)

The DCS is designed in such a manner that provides maximum security for the control data. None of this data is present in simple ASC files residing in a writable repository. All updates to this information must be made through the proper utilities by authorized people. Libraried data only exists in repositories where the Data Managers or owners of the data have write permission. This prevents other users from modifying another designer's data outside of the DCS. Nearly continuous availability is achieved by implementing the DCS in the following manner:

> If the primary DCS server fails, the system can be brought up on another server with minimal human intervention. The physical locations of all libraries are determined by the Data Manager which permits the data to be strategically located throughout the network to improve availability.
>
> Multiple paths exist to request information from the Control Repository. They provide alternate routes in the event of network or router problems.

Archiving and backing up date is accomplished with the following features:

> The Design Control Repository can be archived onto tape or backed up to another repository by the Data Manager as often as deemed necessary. In the event of corruption, this back up copy can be restored into the primary repository.
>
> All libraries can be archived to tape or backed up to alternate repositories defined by the Data Manager as often as deemed appropriate.
>
> The DCS provides a utility which checks to see if a backed-up or archived copy of the Design Control Repository is in sync with a backed up or archived copy of a library. During the archiving procedure, the system assigns unique identification codes (i.e. CRC codes) to each data object. These codes are used during the recovery to ensure the data was not tampered with while dormant on the back-up repository.
>
> The system provides a method for restoring individual data objects from backed-up or archived repositories in the event the data object is deleted from the active library.

GUI User Interface (Section 1.17)

The User Interface consists of all the menus, dialog boxes, and screens by which the designers interact with the DCS. They all have the following characteristics in common:

They are user friendly with convenient on-line help.

They share a common look and feel to make it easy for the user to find common features.

When something fails or the user makes an entry error, the system clearly indicates the error with an English description of the problem, and suggestions on how to fix it.

A command line interface exists to perform any operation that can be done through the graphical user interface.

Various designer utilities exist to:

Initiate promote requests. The minimum interface requires the user to enter the name of a design component or select from a list, enter the level from which to begin the promote, the target level where the promote should terminate, a flag indicating whether it's a BOM promote, and the version.

Send results from External Data Processes to a library. This utility allows the user to enter the name of a Pedigree and the target level and version to which the Pedigree information should go.

Set up and manage a private library. The utility has fields where the user can specify the name of the library (if one is to be created), the library path where the repository will reside, the us-rids of the owners, and either the userids or authorization groups of those who can access it. These properties can be called up for modification at any time. Whenever the owner or access fields are altered, the DCS automatically updates the authority records within the Design Control Repository as well as the operating system (i.e. AFS) permissions of the directory where the library resides.

Create and monitor a Bill of Materials. The utility offers two modes of operation. In the first, the user identifies the Bill of Materials, and enters the names of all design components to be added as members. This same utility will display any existing information for a BOM, so members can be modified or deleted. For each member, the user must indicate whether it's an input, output or support member. For an existing BOM, a function exists to revalidate all members, but this can only be done by the BOM owner. The second mode builds the BOM by reading all the information from an ASC text file written in a prescribed format. This mode can be used by designers, Data Managers, and third party tools. Regardless of how the BOM is created, a newly created BOM will result in the valid flags being set for all members. The user who creates the BOM using the first mode is automatically the owner, whereas the input file used for the second mode contains the owner information.

View process and pseudo process results. The user specifies the design component, data type, level and version. He can specify the exact process or obtain a list of all processes. For each process, the display shows the result (if it exists), the date and time it was set, how it was set (library controlled process, external process, or manually) and the criteria. These results can only be changed by the Data Manager.

Associate design problem numbers to design components. The designer uses this to pre-associate problem fix numbe s to design components before they are promoted into the library. This way technical leaders and other designers can determine if a particular problem is being worked on. The interface requires the user to identify the component by name and type. Since it's not in the public library yet, it has no level or version. The user must also supply the problem fix number. The DCS automatically assigns the "working" status to it. Later, when the designer wants to promote the component, the problem fix number will appear on the selection list, and after the promote completes, the status will change to "libraried". The DCS allows the Data Manager to define a generic problem number which designers may select to associate with miscellaneous design changes that have no corresponding design problem.

WWW/Internet Access (Section 1.18)

The DCS provides a mechanism which permits access to all process and pseudo process results through the World Wide Web. Key quality control indicators can be exported out of the DCS into an accessible format by users on the WWW. Usually these results would exist in a secure repository which could only be accessed by WWW users who are working on the project. In addition to accessing information, the ALMs can receive special e-mail requests from users to perform these tasks:

Generate various status reports on topics such as PN-EC and Design Fix Tracking, Process & Pseudo Process Results, or BOM information. The DCS would generate the report on the fly and return it to the user's Internet or e-mail address.

If the user has the proper authority, he can submit e-mail requests to add pseudo-process information into the DCS. The contents of the mail would contain a specifically formatted command which the DCS can interpret to set the appropriate results. This could be used by people remotely connected to a project (such as the chip foundry) to send status information directly to the DCS.

The DCS permits an authorized user to send commands through the Internet Common Gateway Interface (CGI) to query information from the DCS or invoke Designer Initiated Library Processes (DILPs).

Actors & Objects (Section 1.19)

Figure 9:
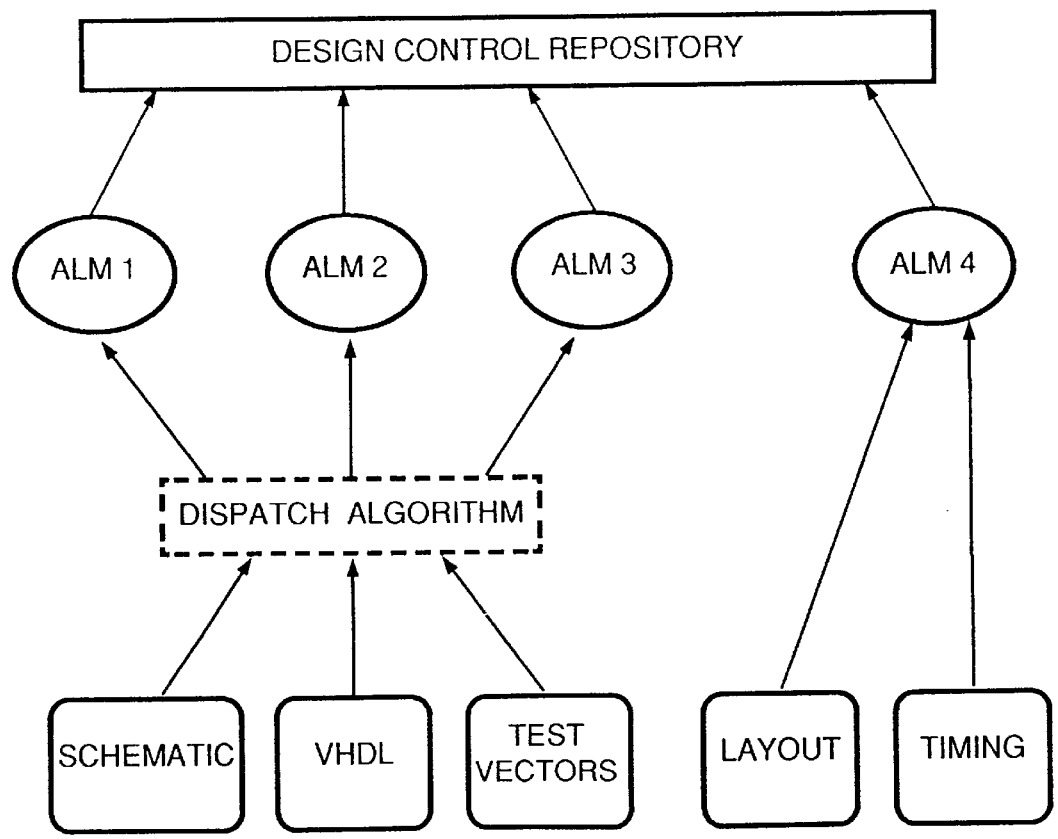
FIG. 9 illustrates our preferred DCS Using an Actor/Object Environment.

In the event of a project where a single large design team or multiple smaller ones, require their data to reside in a single repository, the potential exists for a performance bottleneck in the Automated Library Machine. The DCS offers a feature called Actors & Objects to combat this. Actors & Objects allow the Data Manager to define an alternate structure in which designers tasks are dispatched to a pool of Automated Library Machines (Actors). No design data is stored on any of them; they merely execute the tasks then store the results and data into the Design Control Repository (Object). The Data Manager can control the types of jobs each Actor is allowed to perform by creating Actor Lists. These lists contain information which the DCS uses to determine which ALM to route a particular job to. FIG. 9 shows an Actor/Object environment with four Actors. Jobs involving the data type of layout and timing are segregated to ALM4. All remaining work is sent to ALMs 1 through 3. The DCS determines which to use based on an mechanism which tries to find either a free ALM or choose one that may be able to spawn a parallel process (assuming the operating system supports it).

Importing and Tracking Data (Section 1.20)

Internally the DCS tracks all data by component name, data type, level, version, library and most importantly a file reference (fileref) number. These six attributes give every piece of data in the system a unique identity. In a private library, all data is tagged with a DCS identifier as part of the filename, but the identifier may or may not be unique. This is because private libraries don't have a concept of levels, versions or file references. They are merely working areas for the designer, and only require the data to be identified by name and type. The system permits the designers to have multiple copies of a design component by using iteration numbers to distinguish between recent and older data. However, even though the concepts don't apply, the DCS still assembles an identifier and tags the data. There are two methods by which a piece of data can appear into a private library.

1. The designer creates the data from within the private library using some tool (Schematic editor, text editor, circuit simulator).
2. The data is created by some tool completely outside of the private library, but the designer wishes to import it into the library.

In either case, the tool (or user) chooses the filename. By default, this is the design component name. In the first case, the designer will be asked to specify the data type either prior to, or during invocation of the tool. In the second case, the user will be prompted for the data type during the import. In both cases of a data type entry requirement the DCS will automatically default the version, level and file reference number in order to assemble a uniform identifier code. This code will be appended t, the design component name and will become the new name of the object. Upon promotion from a private library into a public library, the DCS will automatically assign a real file reference number to the object. Based on the destination version, and level, the DCS will assemble a new identifier and rename the object accordingly. The file reference number remains the same for the life of the object. As the object traverses through the levels of the library, the level is the only piece of the identifier that changes. In addition, the DCS maintains the same identifier information internally. This is considered the official tracking information and is always updated first during a promotion or installation of a new object into a public library. The object renaming is done afterwards. Appending the identifier to the object name serves two purposes:

It increases data security by providing a way for the DCS to check data integrity during promotions. The information contained internally must match the external identifier at the start of a promote. A mismatch signifies possible tampering of the data outside of the DCS, and the Data Manager is alerted to the mismatch.

It provides an alternate way for a user or another tool (such as the library search mechanism) to ascertain the version, level, and data type of an object simply by looking at it. This contributes to the availability by providing a means to locate and access data even if the Design Control Repository is unavailable (i.e. server down).

Figure 10:
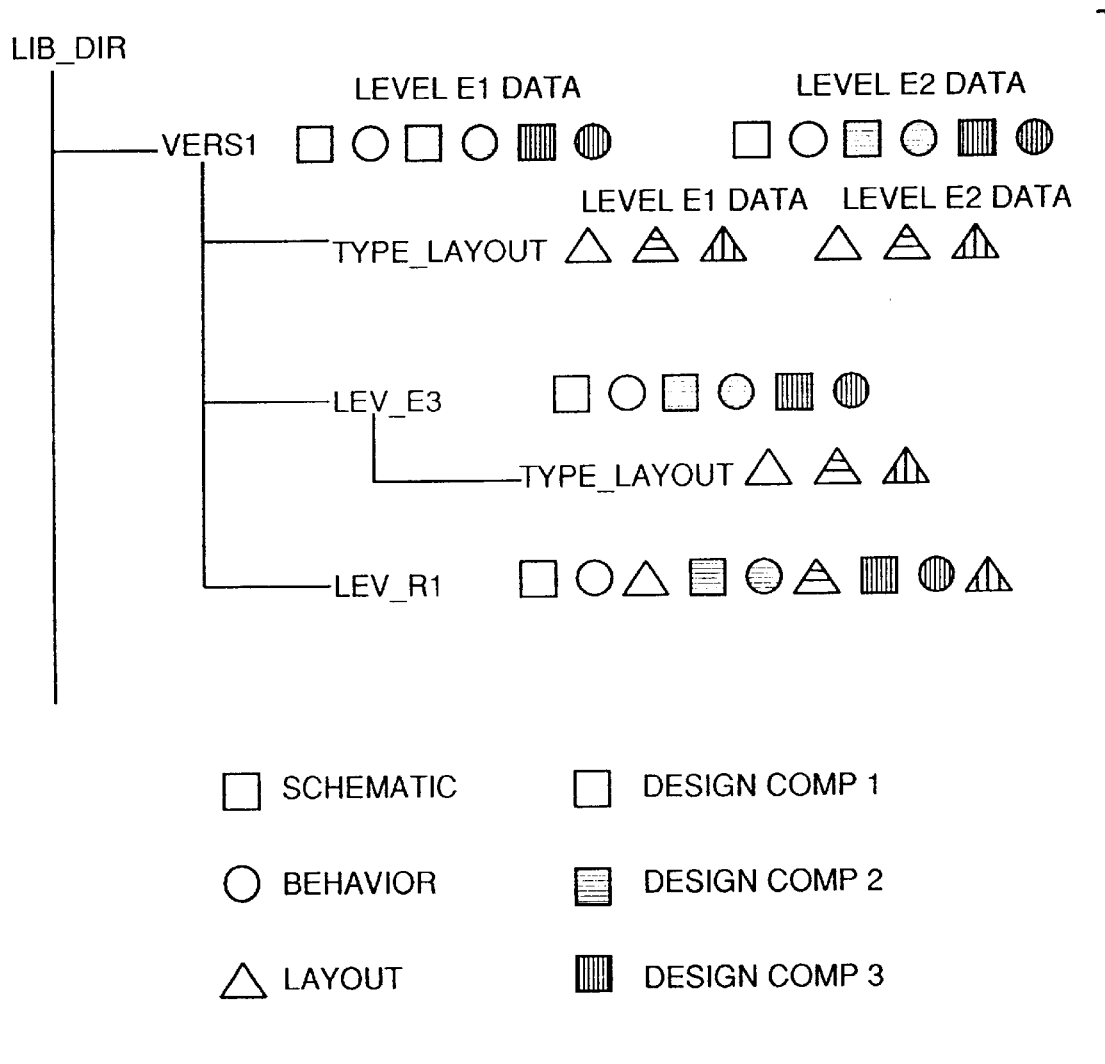
FIG. 10 illustrates our preferred Example of Location Independent Data Tracking.

One major advantage to this tracking scheme is it's independent of the physical location of the data. The DCS permits the Data Manager to establish as many repositories as he needs down to any level of granularity. For example, all data for a library could reside in one physical directory, the data could be segregated by version only, or there could be separate directories for each type of data. This level of flexibility allows the Data Manager to optimize the library to a given environment. For example, he can define his repositories in such a way that the data which moves most often is located on a single volume on his fastest server. Data which never moves (i.e. Release Level data) can be located on slow servers or spread out over multiple servers. As the Data Manager defines his library structure, he can specify the locations for every level of each version. In addition, if he has specific data types that he wishes to further segregate, he can specify a location for them. Finally, the DCS supports a feature called Automatic Component Grouping in which all data types for a given component name will automatically be located in a subdirectory off of the level directory. FIG. 10 illustrates a portion of a library directory structure with different levels of storage granularity. LIB_DIR is the primary directory for all data in the library. Under it, data is segregated by version where version 1 data resides in the subdirectory VERS1. At this point the diagram illustrates three examples of further segregation. In the VERS1 directory are are the schematics and behaviors which comprise level E1 and E2 for all 3 design components. Although they are physically mixed together, their unique identifiers allow the DCS and users to tell them apart. The diagram shows the circuit layouts to be further segregated by data type. So they reside in subdirectory TYPE_LAYOUT Once data reaches level E3, it is segregated by level and type. LEV_E3 contains all the schematics and behaviors for the E3 level, but the layouts reside in the TYPE_LAYOUT directory under LEV_E3 The final example shows data segregated only by level with no regard to type. This is seen in the release level repository LEV_R1 By offering this kind of flexibility, the DCS permits the Data Manager to group the data in the most advantageous way. In addition, the Data Manager could invoke Automatic Component Grouping, which would result in further subdirectories under VERS1, LEV_E3 and LEV_R1 to segregate the pieces by component name.

Note: This is unnecessary in the TYPE_LAYOUT directories since the only difference between the objects is the component name. In order to boost performance, every time a structural change is made to a library which involves repositories, the DCS automatically generates a master cross reference between library/level/version/type and physical location. This table is used by mechanisms such as the library search engine to locate data without requiring extensive querying of the Design Control Repository. It also enables library searches to occur in the event the Design Control Repository is unavailable.

Our preferred Design Control Repository and System Methods (2.0)

Figure 11:
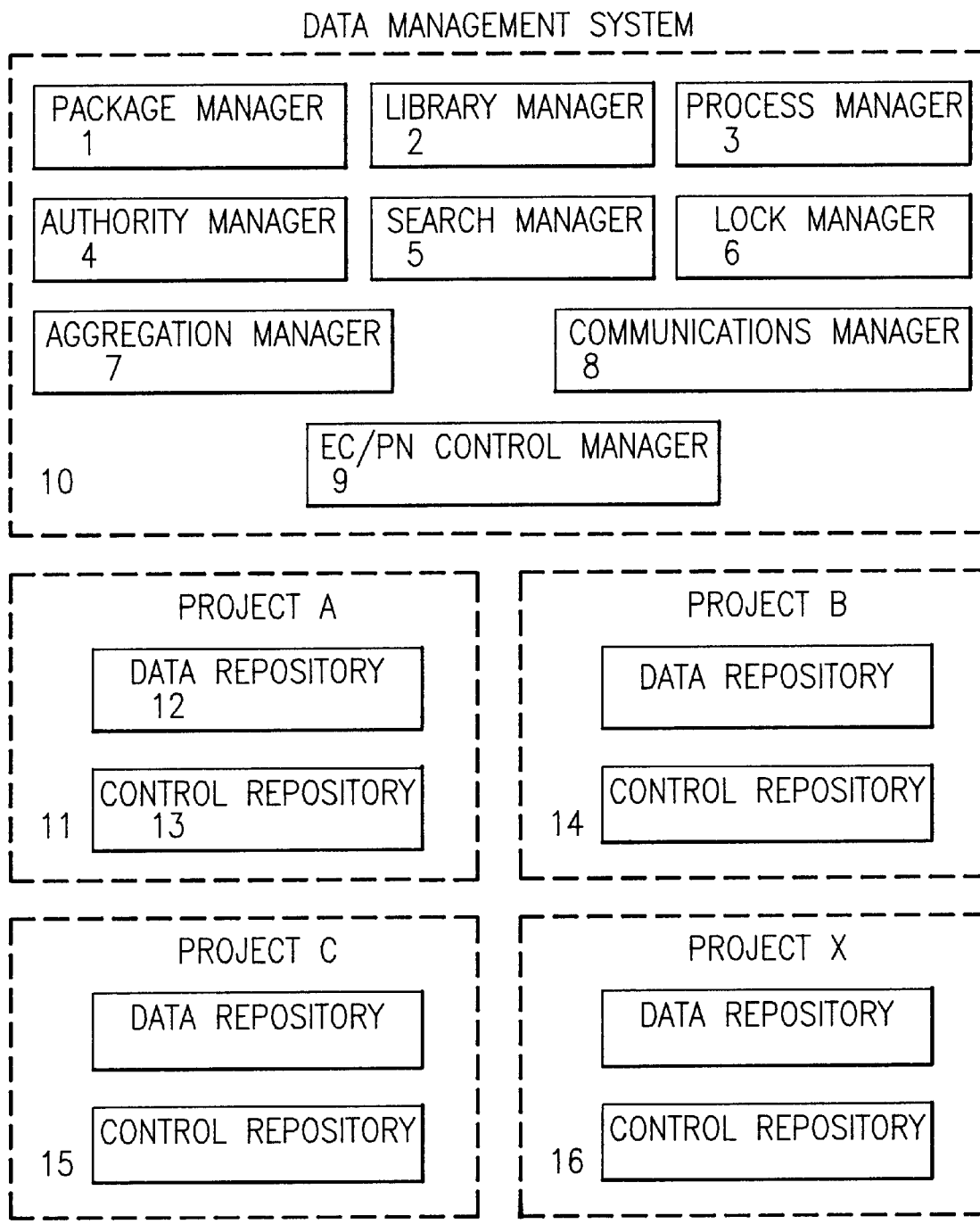
FIG. 11 illustrates the Overall Structure of our Design Control System's Data Management facilities.
Figure 12:
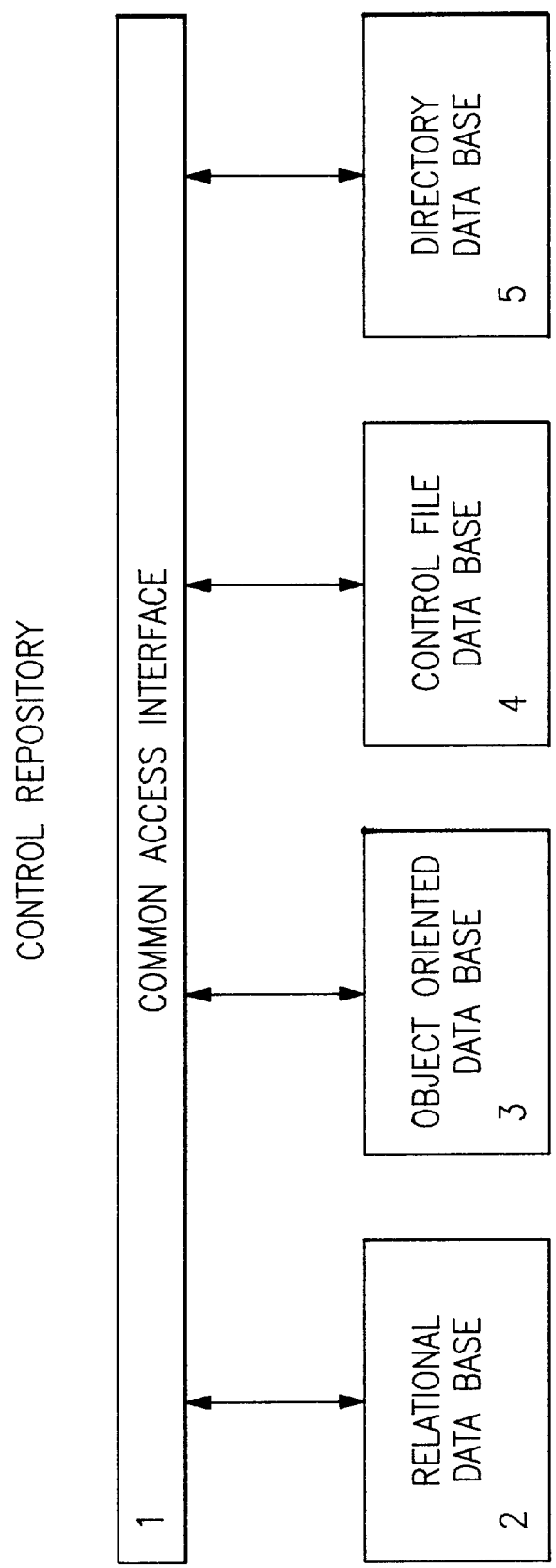
FIG. 12 illustrates the Control Repository.

The present embodiment describes a Data Management System (DMS) which is composed of a suite of function managers and one or more projects (see FIG. 11—Items 10, 11, 14,15 and 16). Each project is composed of a central Control Repository and one or more data repositories (see FIG. 11—Items 12 and 13) to store, manage, and manipulate virtually any type of data object. The Control Repository consists of a Common Access Interface and one or more data bases (see FIG. 12—Items 1 thru 5). These data bases may be:

A Relational Data Base consisting of a collection of tables of data where the columns contain the attributes of related data and the rows are the instances of the data.

An Object Oriented Data Base consisting of a collection of object instances of classes where the attributes are the class members.

A Control File Data Base consisting of a collection of files where the records are the instances of data and the attributes are arranged along the records.

A Directory Data Base consisting of a collection of file directories which may or may not contain files. Their relationships are described by the directory structure. The instances can be either sub-directories or files.

This repository communicates with users and the data repositories through a plurality of Managers, each performing a unique function. These Managers act as building blocks which can be combined in numerous ways to support environments ranging from a small user community to a global enterprise.

Our preferred embodiment employs a relational database to serve as the Control Repository. Each data object in the Data Management System (DMS) is assigned a unique identifier that permits all information about the object to be recorded and tracked by a multiplicity of relational tables. The physical data is stored using conventional storage management techniques which allow any type of data (text or binary) to be tracked in it's original form. The data may even reside on multiple platforms.

Users of the DMS communicate directly with the Control Repository, through a Communications Manager, to initiate some or all data management functions. Upon initiation, the Communication Manager employs one of the other Managers to complete the task. Our preferred embodiment contemplates the use of software service machines, known as Automated Library Machines, which execute requests on behalf of the users. These Automated Library Machines (ALMs) automatically enable the proper Manager to carry out the desired task, while freeing up the user's environment to perform other activities. The Communication Manager also enables the ALMs to communicate directly with the Control Repository.

In order optimize data storage, our embodiment uses a PFVL paradigm to identify all data in the DMS by Package, File Type, (Data Type), Version and Level. Packages are arbitrary divisions of data whereby all the data has some common association. A Data or Package Manager defines the structure for the Package and performs all data management administrative functions.

Levels are typically associated with "degrees of goodness" or quality. Data typically enters the DMS at low Levels with minimum entry criteria. As the quality improves, it is promoted to higher Levels until eventually being released as a finished product. Our system supports robust promotion criteria definitions which may exist for every PFVL in the DMS. Versions allow multiple variations of the same piece of data to be processed and managed simultaneously. One Version may be independent or based on another, which eliminates the need for common data to be repeated.

The present embodiment expands the PFVL paradigm into a means which enables the Data Manager to configure a Package under numerous structural arrangements. For example, the Data Manager may store all the data into a single physical repository, or segregate it by PFVL. The structure may contain multiple entry points, which enables data to be Fast-Pathed into non-entry Library Levels. This feature supports unlimited branching where any Level may have multiple lower Levels, each of which may have multiple lower Levels. Levels may be denoted Working Levels which constitute the minimum structure all data in a given Package and Version must traverse prior to release. Working Levels are transitory places where no data resides permanently. In addition, our embodiment permits the existence of Release Levels where data resides upon release as a finished product. These can be Regular Release Levels where data may only enter from the highest Working Level and remain permanently frozen. There is also a concept of a Sideways Release Level which serve as a repository for modifications made to data residing in Regular Release Levels.

In order to aid users and third party tools in locating data, our embodiment offers a Search Manager. The underlying utilities provide a means to search for data starting at a specified Level and Version. If the search fails to find the data at the starting location, it will traverse the structure ascending Levels until all Levels in the current Version are exhausted. If the current Version is based on a previous Version, the search will traverse the previous Version. The search engine will locate data stored on multiple platforms and a single invocation can find multiple data objects of the identical or different data types. The Search Manager offers a multitude of options and features to seek out data in public and private Libraries, to sort and filter the results, and to perform the search with or without the assistance of the Control Repository.

Our preferred embodiment describes the most sophisticated form of the DMS which incorporates a Communication Manager to manage all communications with the Control Repository. It employs a series of communications machines capable of queuing and prioritizing queries initiated by users or Automated Library Machines. The mechanism enables unlimited access to the Repository regardless of the number of simultaneous queries supported by the database. The Communication Manager also provides a medium of information exchange for all other Managers and the ALMs. Since the Communication Manager supports multiple platforms, it acts as an agent to provide remote access to the Control Repository through conduits such as the Internet.

The present embodiment provides data control and security through a Lock Manager which offers three types of locks. First, there are Out for Update or Ownership locks which permit a user to check out a data object and modify it without fear of another user making a simultaneous update. Our embodiment also provides a means for transferring ownership of a piece of data from the primary owner to a designates surrogate without the primary owner's intervention. Upon completion of the transfer, the primary owner is automatically notified of the ownership transfer. Additionally, the preferred embodiment provides an environment where multiple users can own the same piece of data at different Library Levels.

In addition to ownership locks, the Lock Manager offers Move and Overlay locks which can be used to prevent data from being moved through the DMS or overlaid by the data at lower Levels. It also interacts with the Aggregation Manager to provide locking of entire an Bill of Materials, and it interacts with the Process Manager to provide an interlocking mechanism for data undergoing Automated Library Processing.

Our embodiment contains an Authority Manager to provide various types of user authorities down to the PFVL granularity. Interaction with the other Managers affords, but is not limited to, the following authorities:

Data Promotion into and through public Libraries.

Bill of Material Promotion through public Libraries.

Creation of a Bill of Materials

Setting the three types of locks on data objects

Initiating Automated Library Processes

Setting Level Independent Pseudo Process results

Our embodiment even permits pattern matching on the names of the data objects to add another Level of granularity beyond the PFVL.

In order to aid the Data Manager in performing the multitude of administrative tasks, our embodiment contemplates a Package Manager which includes utilities and user interfaces to accomplish the following:

Set up Package Control Data such as Fix Management and P/N Control Levels.

Define or dynamically reconfigure the Library Structure, including selection of data types to be tracked under the DMS.

Define the physical repositories of the data (down to the PFVL if so desired).

Balance workloads among Automated Library Machines.

Define, manage and edit:
  Automated Library Processes
  Authorities
  Automated File Groups The Package Manager supports Authority Profiles which permit the Data Manager to assign users to a classification and apply authorities to the entire classification. It also incorporates the concept of pre-defined process groups and templates which allow process definitions to be standardized across multiple packages. In our preferred embodiment, these definitions can be stored in flat files called Progroups or within a sample Package in the Control Repository. The Package Manager also offers a variety of report generators for information about installed Levels, Versions, data types, Automated Library Machines, process definitions, process results, authorities, fix management and release control information. Upon completion of all interactive editing, the Package Manager employs a batch commit process which converts the changes into a series of Control Repository modification instructions.

Our Data Management System also employs various utilities to aid in performance tuning and automated recovery of the Control Repository, data archiving, Control information back-up, and a mechanism to generate performance tuning reports.

Additionally the DMS employs a Library Manager to execute all data movement, check out, manipulation, check in and deletion. It also contains a Process Manager to provide Automated Library Processing and External Data Control. Also present is a Problem Fix/Part Number/Release Control Manager to associate and track problems and part numbers to data as well as coordinate releases. Finally an Aggregation Manager is included for creating and tracking arbitrary collections of data objects.

Structure and Search Manager

Figure 13:
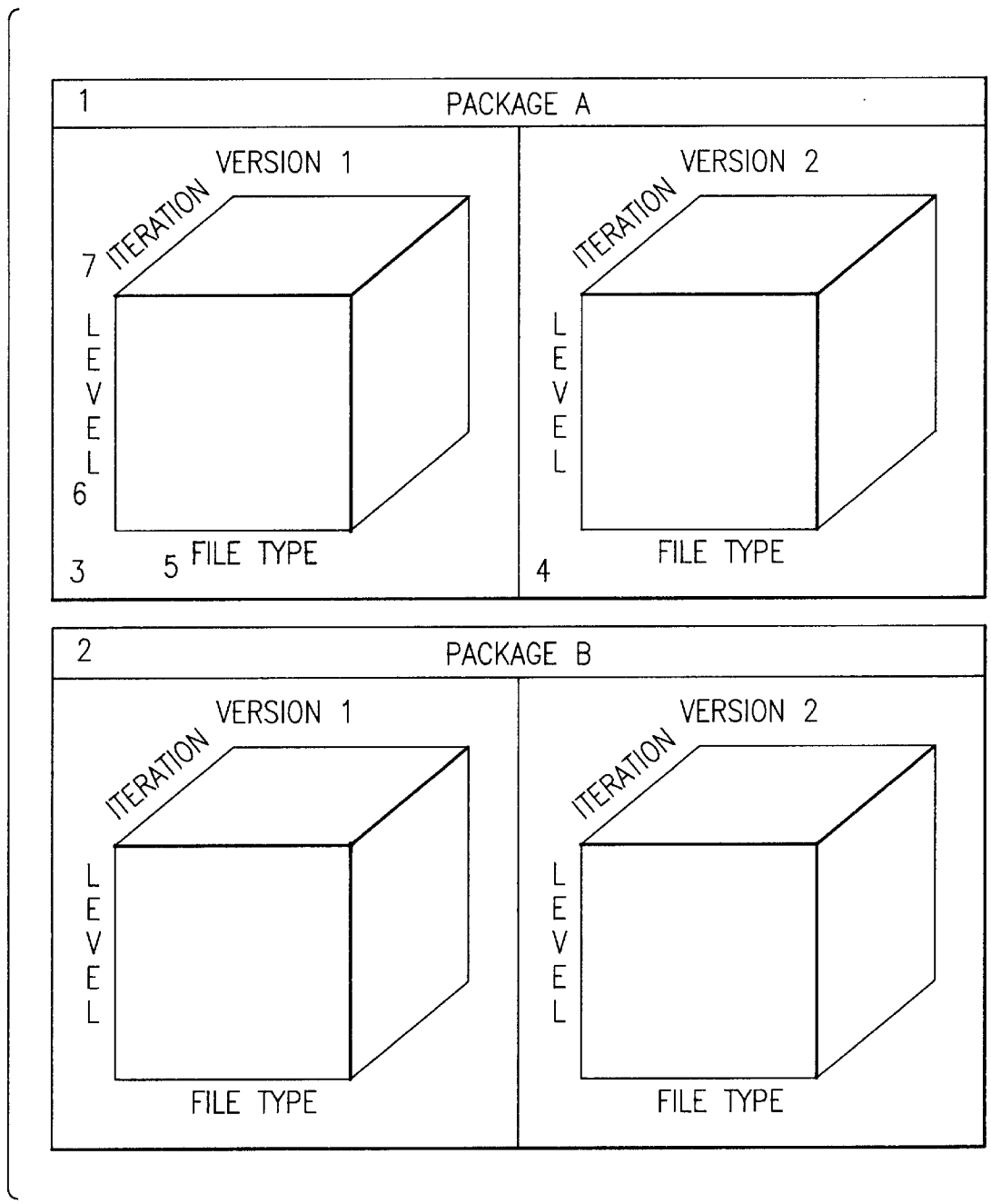
FIG. 13 illustrates the Data Repository.

The present embodiment incorporates a robust concept which permits a data management structure capable of tracking a plurality of data objects governed under similar or disparate processes. The concept is based on a paradigm in which all objects can be classified by Package or its synonym Library, Type of Object (Our preferred embodiment denotes this as File Type), Version and Quality Level. This paradigm is hereafter referred to as the PFVL paradigm. (See FIG. 13—Items 1 thru 7). Under this arrangement, a Package is simply defined as a grouping of objects with common characteristics. In some environments, such as Chip Design or Software Development, a Package is referred to as a Library. Commonality may be defined in numerous ways. For example, all the components in a Library may be members of the same higher level component (such as all the ASICs on a PC Board), and thus may be considered a single Package. Another example may be all the programming modules written by a particular software development team.

Within a Package or Library, data is organized by Version. Versions allow parallel evolution of the same components to coexist in the same Library. For example, two Versions of a Video Graphics chip may be developed in tandem, one for the PCI interface and one for VL-BUS. Our embodiment allows the two flavors of design to use the same object names, reside in the same Library, and even be at the same Level, simultaneously.

For each Version, there is a Level Structure. In our preferred embodiment, Levels denote a degree of completeness, stability or quality control. The definition of "degree of quality control" is left up to the Data Manager. Our embodiment simply affords the Data Manager a means to establish a Level structure commensurate with the goals and objectives of the user community.

All data objects are identified by name and type. Our preferred embodiment depicts all objects as files, but they can be any type of object that exists in a computer environment. The type of object serves as the fourth qualifier in the PFVL paradigm. In summary, an entity characterized by a single name may have multiple types of data objects, simultaneously residing in multiple Levels, of multiple Versions and spanning multiple Libraries.

In addition to denoting degrees of completeness, our embodiment permits Levels to be chained together to allow data to migrate from one Level to the next. Any or all of these Levels can be designated as Entry Levels whereby data may enter from a user's Private Library. Levels are also categorized as Working Levels or Release Levels. Data in Working Levels is transitory, and must eventually migrate to a Release Level. Release Levels serve as permanent storage vaults for a coherent set of data. Once the data is promoted into a Release Level, that Level is frozen and a new Release Level is opened. Data always migrates from the highest Working Level into the current, or open, Release Level. Any Working Level may be promoted to from another Working Level, or serve as an Entry Level for data coming from a Private Library. Release Levels are more restrictive. The current Release Level can be promoted to, but can't be an entry point for outside data. Frozen Release Levels are neither entry points nor are they promotable. Our embodiment does provide a means to thaw a frozen Release Level and delete data from it.

Our embodiment also discloses one special type of Release Level known as a Sideways Release Level. These Levels always branch out from a regular Release Level, but unlike regular Release Levels, data is permitted to enter from a Private Library. This arrangement permits updates and "fixes" to problems found with data residing in a frozen Release Level.

The PFVL structure lends itself to a powerful feature of the embodiment known as a Library Search Engine. In many commercial Data Management Systems, the means for establishing quality Levels often require physical segregation of data into a common repository. Usually this entails making copies of the data to multiple locations. Although our preferred embodiment will permit data to be copied as it migrates from one Level to the next, the default action is for the data to move to the higher Level. The Library Search Engine can be used to pick a starting location in the Library Structure and seek out a collection of coherent data objects, regardless of their current Library location or physical residence. The Search Engine and it's underlying algorithms are discussed in the Search Manager section.

Figure 14:
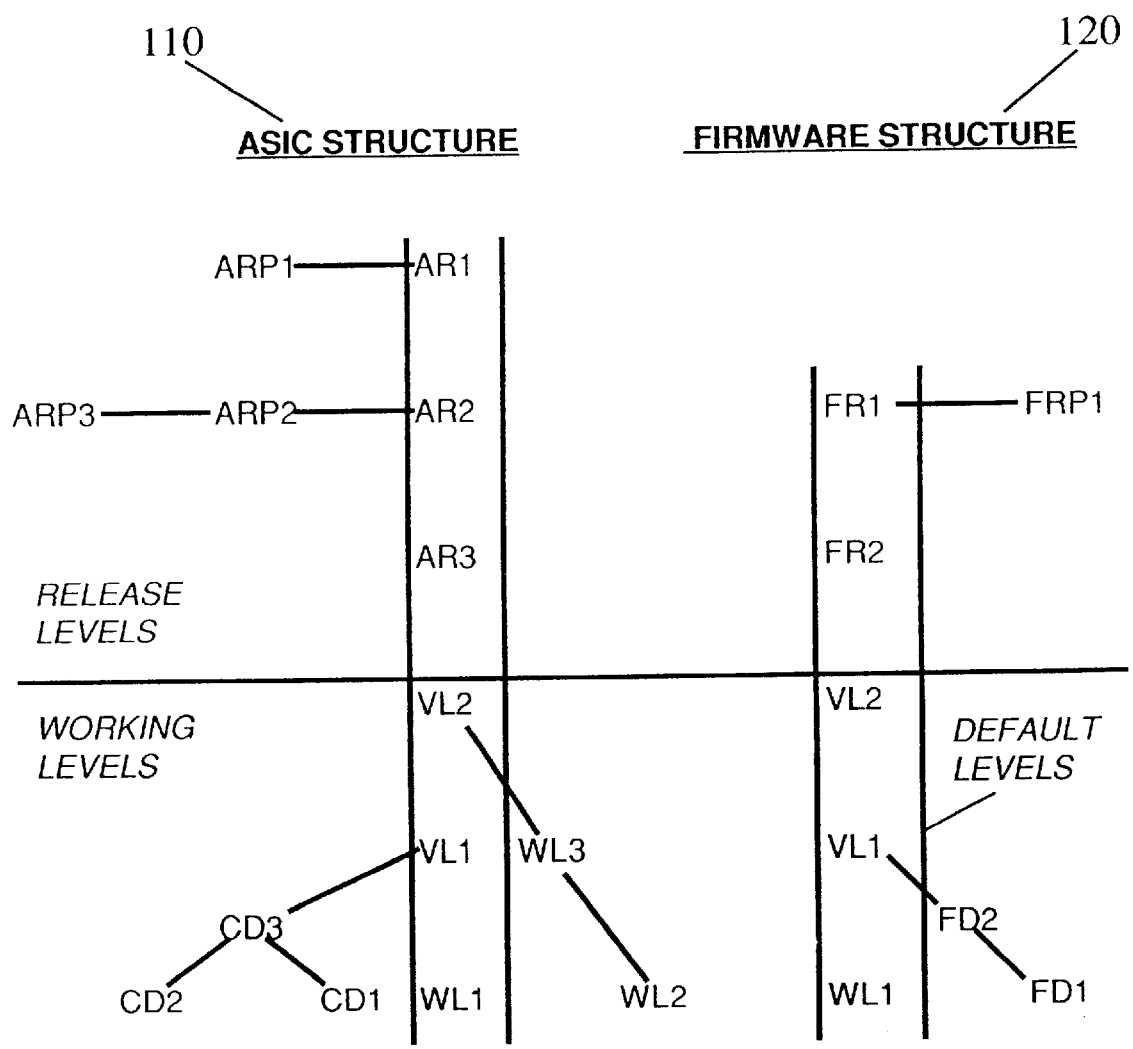
FIG. 14 illustrates the Inverted Tree Library Structure

FIG. 14 illustrates an example Library Structure. To clarify the example, the overall structure is segregated by Library File Type with inverted tree 110 denoting the ASIC structure, and inverted tree 120 denoting the Firmware structure. To begin with, both trees have Working Levels WL1, VL1 and VL2 in common. These are known as the Default Levels and these would exist for all LFTs in the Library. Turning our attention to the ASIC structure, it has additional unique Levels known as WL2, WL3, CD1, CD2 and CD3. This type of arrangement could be used to accommodate high Level design being done at the Default Levels, synthesized parts being processed on the WL2–WL3 branch, and custom design being done at the CD1, CD2 And CD3 Levels. Although our embodiment permits data to enter into any of these Levels, the Data Manager controls the Entry Levels. In this example ASIC data may enter CD1, CD2, WL1 or WL2.

The highest Working Level is VL2, and above that is the current Release Level known as AR3. Above that are frozen Release Levels AR2 and AR1. AR1 is the original release of the ASIC design, and AR3 will contain the most recent. To the left of Release Level AR1 is Sideways Release Level ARP1. Additionally, Release Level AR2 has Sideways Release Levels ARP2 and ARP3. As stated above, when data enters any of the Release Levels except AR3, it is "trapped" and can't move to another Level. However, it can be located with the Library Search Engine.

Since there are 7 entry points (CD1, CD2, WL1, WL2, ARP1, ARP2, and ARP3), there are 7 independent search paths. The user may initiate a search for data at any point in any of these 7 paths. A search initiated at a Working Level or regular Release Level will move towards the "tree trunk" and up to the oldest Release Level (AR1). The search path for CD2 would be:

CD2→CD3→VL1→VL2→AR3→AR2→AR1 (terminator)

Searches beginning at a Sideways Release Level will migrate towards the "tree trunk" then turn upward towards the oldest Release Level. A search beginning at ARP3 would look like:

ARP3→ARP2→AR2→AR1 (terminator)

Turning our attention to inverted tree structure 120, this represents the Firmware tree. In addition to the Default Working Levels, this tree has Working Levels FD1 (which is an Entry Level) and FD2. It also shows Release Levels FR2 and FR1 (which is frozen). FR1 has one Sideways Release Level known as FRP1.

Further unique structures can exist for each LFT in the Library, or an LFT can use the Default Structure. In addition, any structure may be replicated to form multiple Versions. In this way a single Library is equipped to handle a multitude of data management tasks. The only restriction on the present embodiment is that any given Level in the tree may migrate to one and only one higher Level. For example, CD3 may not point to both VL1 and VL2.

The entire structure of every Library in the DMS is stored in tables within the Control Repository. These tables show information about each Level denoting attributes such as Entry Level, Promotable Level and the physical location of the repository. In order to improve performance and availability, our preferred embodiment permits this structural information to exist in an external file for quick reference by users running applications in their Private Libraries. An example of a structure file is shown in FIG. 15.

The structure file in FIG. 15 is divided into 6 sections. Each section contains the following four tokens:

The first token contains three pieces of information delimited by a/in our preferred embodiment. The/can be used to parse the first token as follows:

1. The LFT where XXX denotes ALL LFTs in the Library.
2. The Version where XX denotes ALL Versions in the Library.
3. The Source Level where 00 is a special keyword denoting any user's Private Library.

The second token is the Target Level

The third token is a Put/Promote flag which decodes as follows:

NN Source Level not Puttable/No Promotion Path from Source to Target
NY Source Level not Puttable/Promotion Path from Source to Target
YN Source Level Puttable/No Promotion Path from Source to Target
YY Source Level Puttable/Promotion Path from Source to Target The name of the physical repository of the Target Level. This can be multiple tokens depending on the computer platform.

Section 152 of FIG. 15 describes the Default Level Structure. The first record is a special record which denotes the default entry path from any user's Private Library into this example Library. Any application requiring a Library Search, without a specified entry Level, will use Level WL1. Since this is a special record, the third and fourth tokens are unused, and the keyword NONE serves as a reminder. In addition, the first token contains XXX/XX which the preferred embodiment uses to signify All Levels/All Versions unless otherwise noted. As stated above, the third token is the Put/Promote flag, so the remainder of section 152 reveals that WL1 is puttable, but VL1 is not. Furthermore, the paths from WL1 to VL1 and VL1 to VL2 are both promotable.

Section 153 shows how a particular Library File Type car, have its own unique set of Default LFT Levels. The ASIC/XX in the first token signifies that all the information in this section pertains to all data of type ASIC. The Put/Promote flags and repository tokens work the same way.

Section 154 is a further subset of section 153 whereby the information only pertains to data of type ASIC within Version V1. Typically, all Release Level information is defined by LFT and Version since multiple Versions are unlikely to have identical Release structures. This section illustrates the use of a terminator which is seen in-the second token of the fourth record. Our embodiment uses * to signify that Level AR1 is the last Release Level in the search path, and is the original Release of the design. In addition, the second through fourth records have Put/Promote flags of NN indicating the Source Level is not Puttable and promotions can't be made from the Source to the Target Level. Our embodiment refers to this as a Frozen Release Level. Finally, sections 155 and 156 indicate the same type of information for the FIRMWARE LFT. Section 155 is the Default LFT Level information for the FIRMWARE data, while section 156** shows the Release Level information specific to Version V1 of the FIRMWARE.

It should be noted that our nomenclature rules permit the LFT, Version and Level identifiers to be as long and meaningful as the computer environment allows. Shortened names were chosen merely as an example. In addition there is no implied order of any of the records in the Structure file. In fact, the sections only exist for purposes of illustration and are not necessary either. Information for all LFTs, Versions and Levels can be intermixed and presented in any order. Our preferred embodiment requires ALL information for each LFT, Version and Level of a particular Library to reside in the same Structure file.

The present embodiment offers a method using nomenclature and standard repository media (directory structures, VM Minidisks, etc) to permit a wide variety of storage arrangements. All data objects governed by the Data Management System are required to follow a prescribed nomenclature. The actual nomenclature rules are driven by the type of computer platform, but the general rule requires all file identifiers to contain the following information:

File Name

Type of File

Library

Version

Level

The order of the information is not, important, as long as it's consistent. The type of computer platform dictates any further limitations on the nomenclature. For example, in systems such as Unix and MVS, where qualifiers can be used to extend file identifiers, it's feasible to permit meaningful names for Libraries, Versions, Levels, etc. However, systems such as VM and DOS have file name limitations which may require the Data Manager to restrict the nomenclature. In the most extreme cases, media such as sub-directories may be employed to act as qualifiers and segregate the data properly. Consider the following example illustrating how the same piece of data may be nomenclated under the various platforms. The example is for a DSP ASIC Layout residing in the Quality Level of the Custom Version of the V-Chip Library.

Unix(AIX) DSP.Layout.V-Chip.Custom.Quality

VM(File-Name File-Type) DSP LAYCVCQL

Note: File Type decoded as LAY=Layout C=Custom Version VC=V-Chip Library QL=Quality Level

DOS V-CHIP/CUSTOM/QUALITY/DSP.LAY

Note: Sub-directories are used as qualifiers for Library, Version, and Level.

The advantage of this method is it allows the Data Manager to exploit the power of platforms such as Unix (AIX) to further segregate data. For example, the Unix qualified file name contains all the information required by the DMS to track the file. This gives the Data Manager the flexibility to store all the data in the same physical directory or use directories to segregate the data by Library, Version, Level, File Hype or any combination thereof. Data can span an entire network and physically reside on multiple servers. Thus if critical data needs to be located in a particular directory, or on a specific server, the present embodiment can track it without modification to the architecture.

Physical segregation of data is accomplished through the Data Management Configuration Utility described later in this disclosure. Whenever a Data Manager establishes a new Library, the utility requires a default physical location to be entered. All data will reside here, unless further segregation is desired. Additionally, as each new Version, Level and File Type is defined to the Control Repository, the opportunity is presented to add sub-directories to increase any desired degree of PFVL segregation. Consider the following:

1./V-Chip/Custom

2./V-Chip/Custom/Quality

3./V-Chip/Custom/Quality/Layout

Case 1 is the default repository where all data resides unless otherwise noted. Case 2 is an exception indicating that all data in the Quality Level will reside in the Quality subdirectory under the Custom directory. Finally, Case 3 is a further exception which enables all Layouts at the Quality Level to reside in their own isolated space.

Our embodiment further contemplates a File Reference Number as an additional qualifier in environments which allow it (such as Unix). Although this is not required for any aspect of the Data Management System to function properly, it promotes additional convenience for the user community.

In order to handle Cross-Platform data management, our embodiment also permits hashing algorithms to be embedded in the DMS. These can be used to convert a long qualified Unix identifier into a more restrictive VM identifier. Although the actual hashing algorithm is independent of this embodiment, it must be embodied with some degree of customization to promote a proper file transfer. For example, if the above DSP ASIC file has to migrate from Unix(AIX) to VM, the File Name would have to be hashed down to 8 characters and the PFVL information would have to be encoded into an 8 character File Type. All the hashing information is stored in tables in the Control Repository so the file can be transferred back to Unix(AIX), if desired. Furthermore, the actual hash name conversion can be accomplished by code embedded in the Promotion and Installation Algorithms described in our Library Manager or via an Automated Library Process described in our Process Manager.

Data Management Configuration Utility

Our embodiment permits the Data Manager to configure their Libraries in numerous ways. This is accomplished through the use of a Data Management Configuration Utility (also known as the Package Manager Utility), which can be invoked as an independent program or launched from a design system framework. The only parameter required is the Package Identifier (Pkg. ID), commonly called the Library Name. All other information is entered into the user screens illustrated in FIG. 16 through FIG. 28.

The preferred embodiment presents all user screens in a graphical environment where the user engages pull down menus, pop-up menus, drop-down lists, radio buttons, push buttons, fill-in fields, and mouse interaction. It should be noted, however, that all functions discussed further in the preferred embodiment can be implemented using simple text screens, or more advanced data entry systems such as touch screens, voice commands or 3-D graphics. The preferred embodiment depicts the method most conducive to the Motif(tm), Windows(tm), and OS/2(tm) application environments.

Figure 16B:
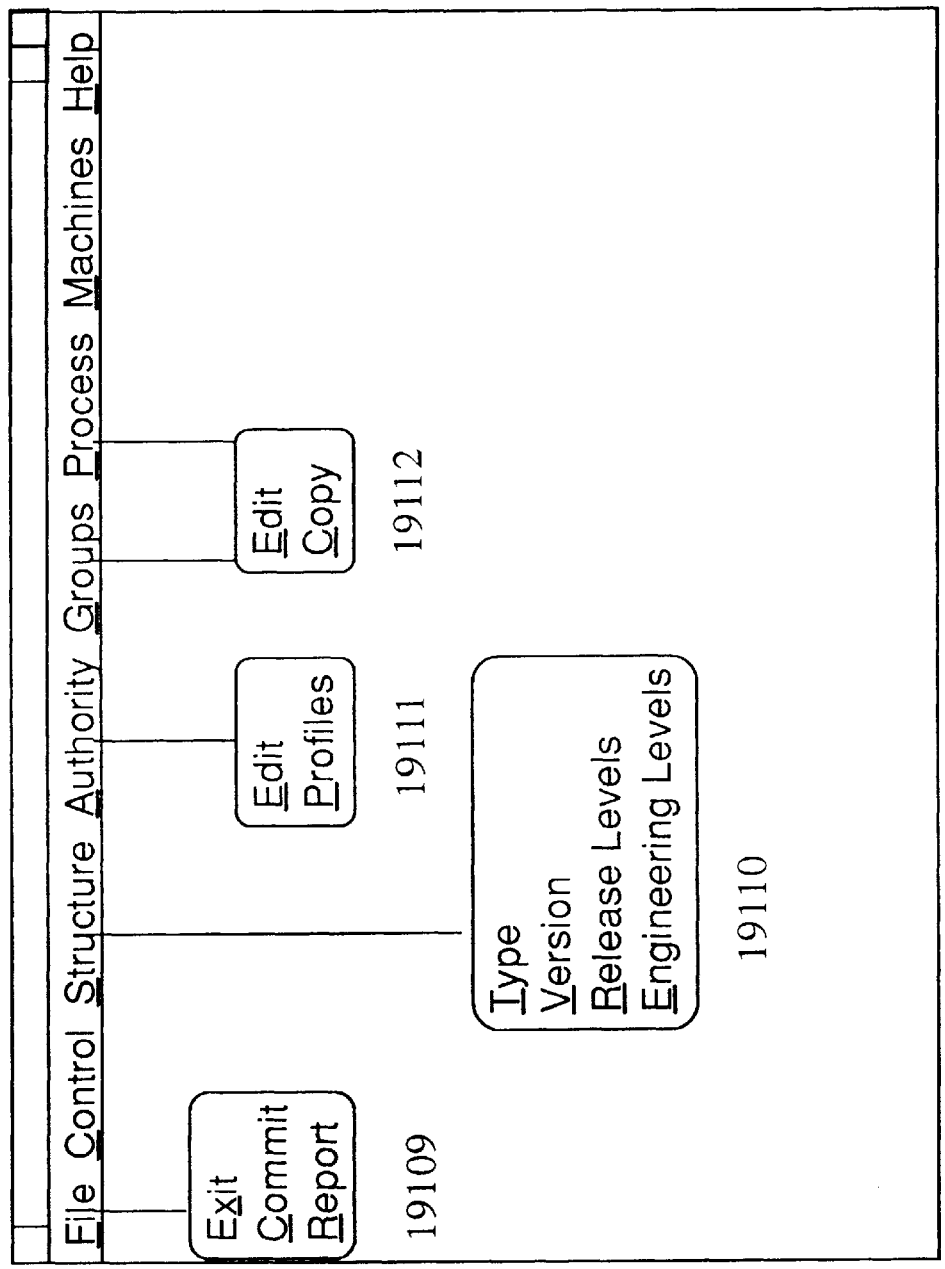

FIG. 16a shows the main screen upon first entering the utility. The screen is mostly blank with a single menu bar 19120 consisting of 8 choices 19101 thru 19108. The user positions the cursor over the choice of interest and hits the enter key or clicks the mouse to initiate that action. FIG. 16b shows the same user screen, but also indicates that selecting four of the choices results in pull down menus. The File choice 19101 results in drop down menu 19109 appearing on the screen. Structure 19103 results in drop down menu 19110. Authority 19104 results in drop down menu 19111 and Groups 19105 and Processes 19106 results in drop down menu 19112. All other choices, Control 19102, Machines 19107, and Help 19108 result in new user screens appearing, which will be discussed in further detail. Drop down menus 19109 thru 19112 can result in immediate actions or additional user screens depending on the action chosen. In all cases, the user makes a selection by positioning the cursor over the menu pick of interest and clicking or hitting the enter key.

Figure 17:
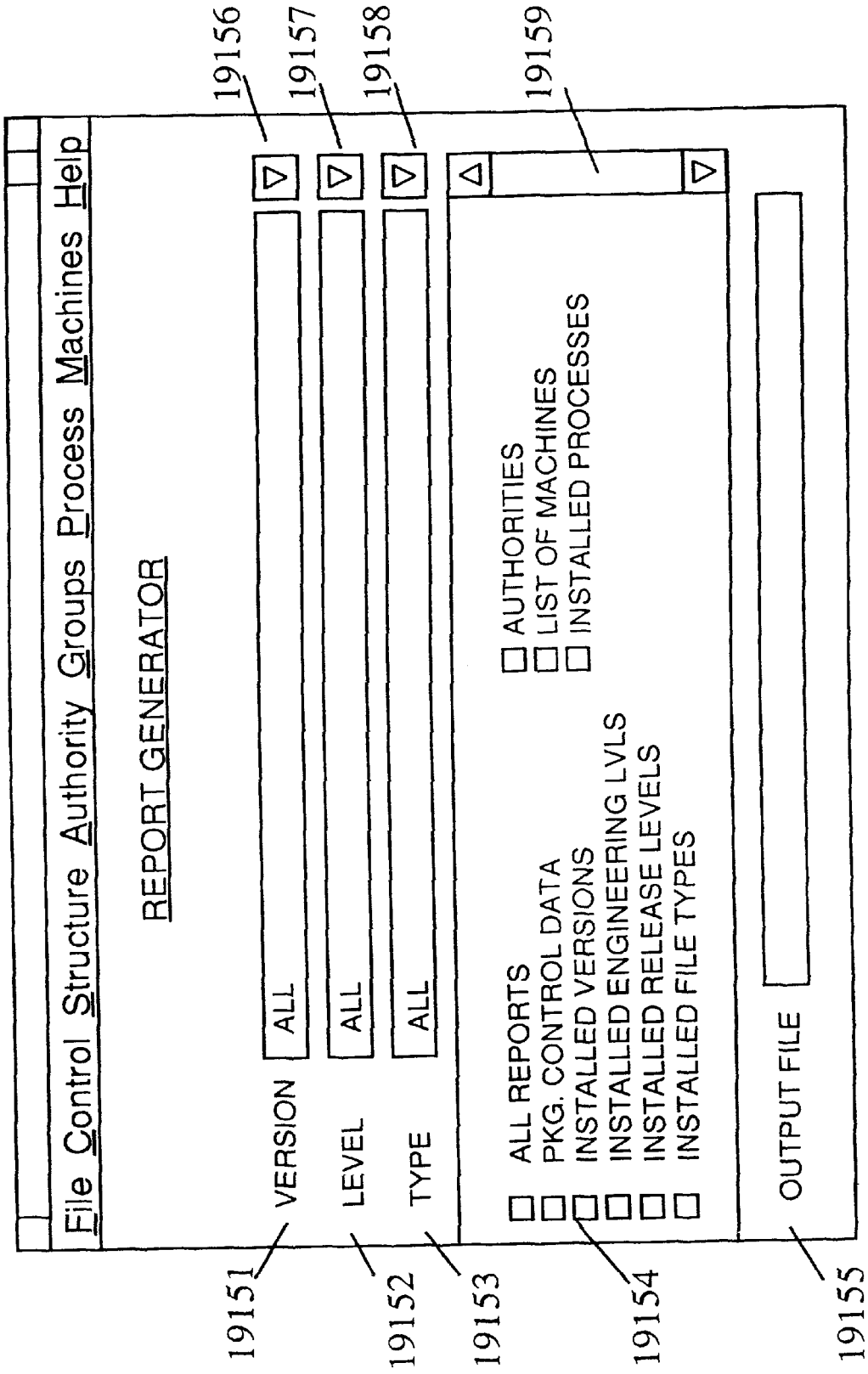
FIG. 17 illustrates the Report Generation screen.
Figure 18:
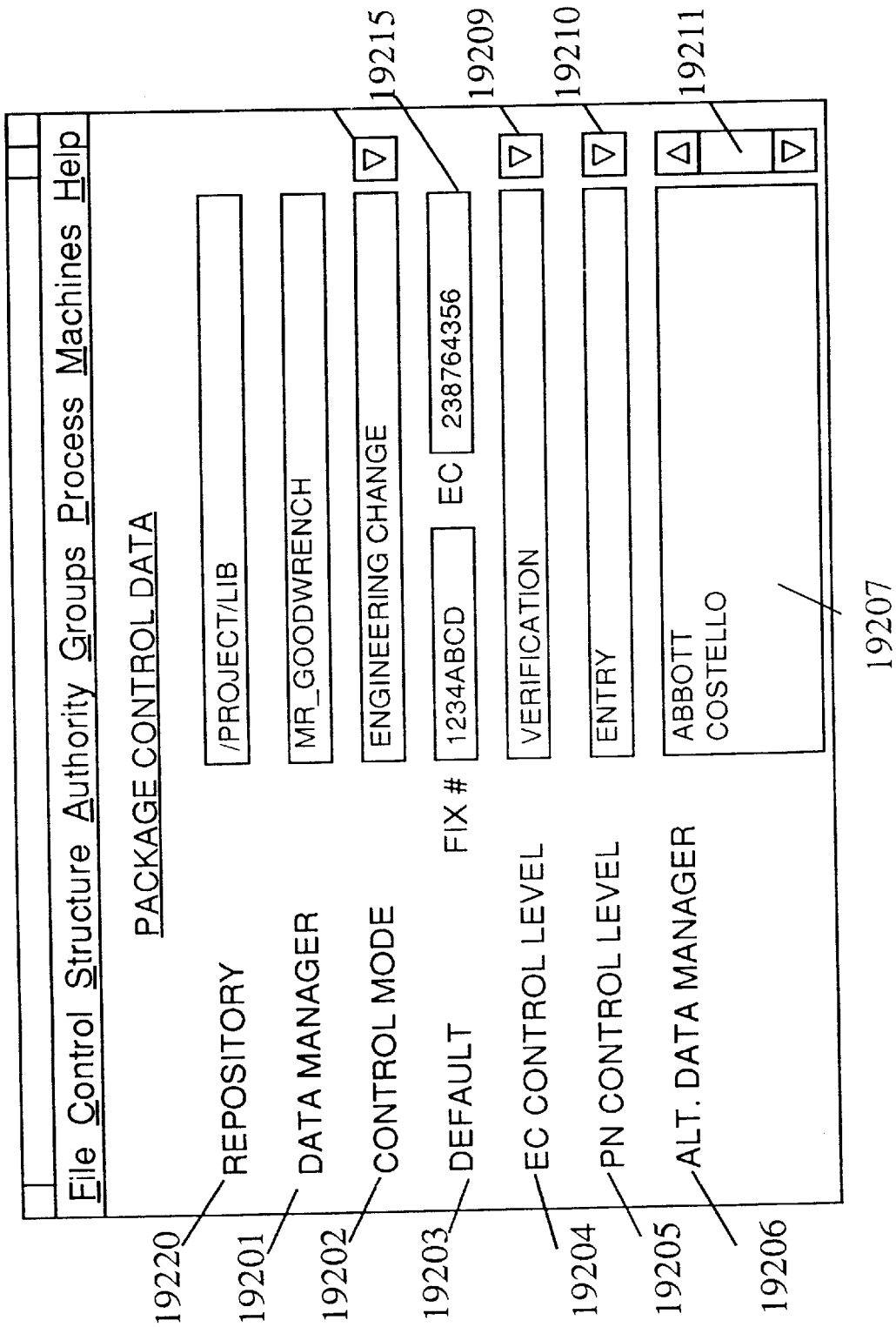
FIG. 18 illustrates the Package Control Data screen.
Figure 19:
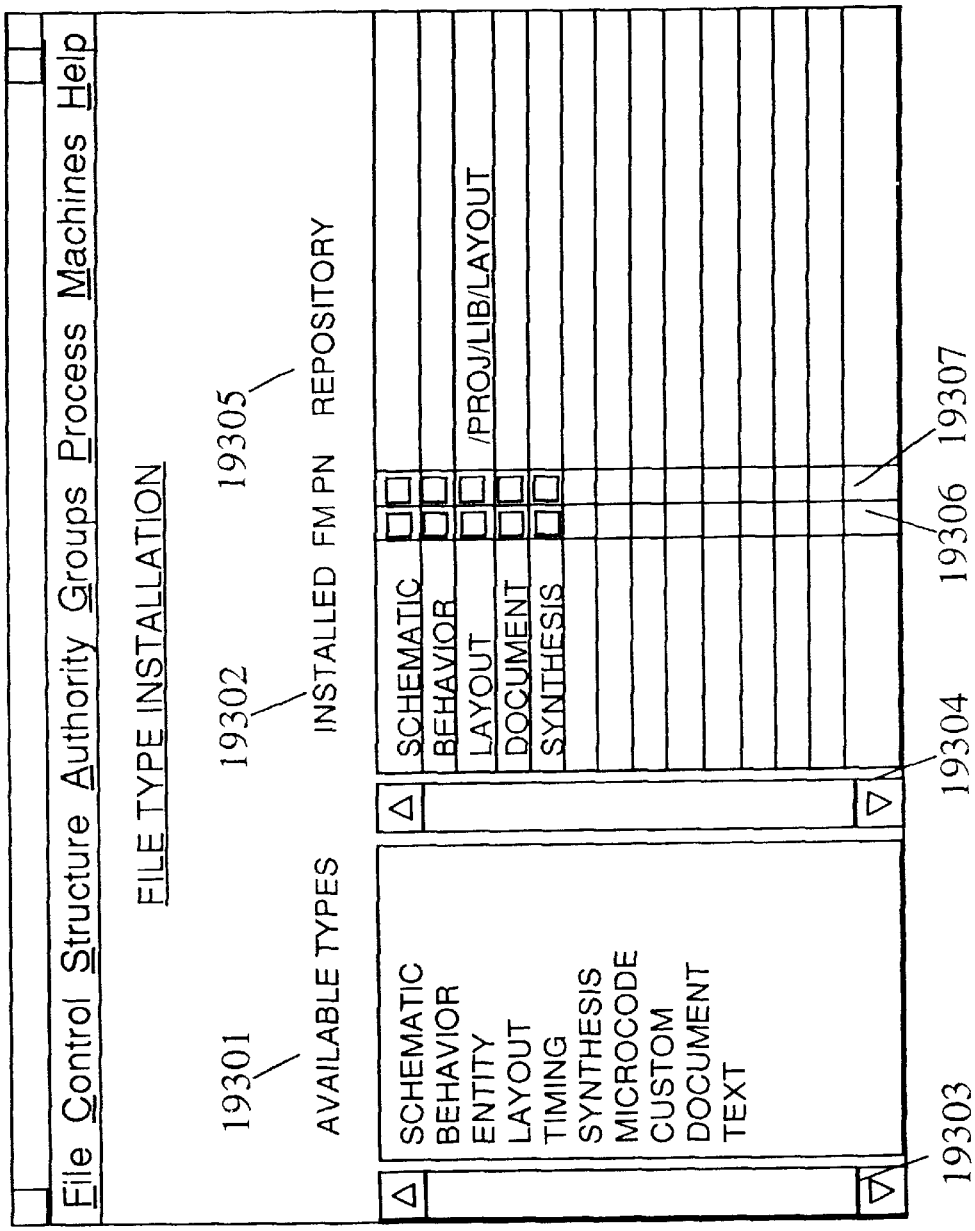
FIG. 19 illustrates the File Type Installation screen.

Turning our attention to each main menu bar pick 19101 thru 19108 in greater detail, we begin with File 19101. Upon selecting it, drop down menu 19109 appears. The user can select Exit, Commit or Report. Exit will cause the utility to end giving the user the chance to Commit any unsaved data before termination. Commit allows the user to permanently save all edits and additions into the Design Control Repository. The Commit process is described in detail in FIG. 49. Report results in the user screen depicted in FIG. 19150 to be displayed. This allows the user to request various types of reports regarding the Package configuration. As seen in FIG. 17, the user can select from a variety of reports using push buttons in window 19154. There is one button for each type of report, and the user may select multiple buttons. The first button causes all reports to be generated regardless of the positions of the other buttons. The user can limit the scope of the report using the various filters. There is a Version filter 19151, where the user can enter the name of the Version, the keyword ALL to denote-all available Versions, or select from available Versions using the drop-down menu button 19156. The name of the Level can be individually entered in the field 19152, or the keyword ALL can be used to denote all available Levels, or the Level can be selected from the list of available Levels using the drop-down menu button 19157. Lastly, the file type can be selected from the list of available installed types using the drop-down button 19158, it can be individually entered in the field 19153, or the keyword ALL can be entered to include all available file types. The default for fields 19151 thru 19153 is the keyword ALL. The last field 19155 is used to route the output using the name specified by the user. If no path information is provided, it will reside in the current path. The preferred embodiment illustrates the resulting reports as text based file, but the data can be output in a variety of formats ;including, but not limited to, HTML, printer data (ie. encapsulated postscript), IBM Application Systems format, or speech via a text to speech converter. Scroll bars, 19159, can be used to view more choices, if the entire list can't fit in window 19154. Returning to the main menu bar 19120, if the user selects Control choice 19102, the Package Control Data entry screen depicted in FIG. 18 is immediately displayed. It contains field 19220 for the main directory path under which all data pertaining to this package is stored. The user must fill in this field prior to saving this screen, or a warning dialog box will request the information. Field 19201 is for the user id of the Data Manager, and this must also be filled in for a successful save. Control Mode 19202 is a cyclic field. Upon hitting the drop down menu button 19208, the user will be presented with 3 choices, None, Single Fix Tracking, or Engineering Change The user may only select one of these choices. An attempt to fill in anything else will result in an error dialog box. If the user selects any choice other than None for Control Mode 19202, then Default Fix # 19203 will be active. Otherwise, it will be "greyed out" (inactive). The Default Fix # can be any character string. In addition to the Default Fix #, field 19215 exists for a Default EC identifier. This can also be any character string and works in conjunction with the Default Fix # field. Like fields 19203 and 19215, EC Control Level 19204 and PN Control Level 19205 will only be active under the same conditions as Default Fix # 19203. If they are active the user must enter the names of valid Levels for this package. To assist the user, drop-down menu buttons 19209 and 19210 can be used to select the Levels from a list of available Levels. User ids of alternate Data Managers can be entered in the Alt. Data Manager field 19206. As many user ids can be entered into the text entry window 19207 as desired, and if the list is not entirely visible on the screen, the user can scroll through the list using scroll bars 19211. Alternate Data Manager information is optional. Upon completing this data entry screen, the user may elect to commit the data using main menu choice File 19101 followed by selecting Commit or the user can select any other choice from the main menu bar to invoke another action. This is true of any of the underlying user screens for main menu bar 19120.

Our embodiment allows a very flexible Library configuration by using the PFVL concept of Package, File Type, Version, Level. This degree of flexibility is illustrated throughout the various Structure user screens. Upon selecting main menu bar 19120 choice Structure 19103, the user is presented with pull down menu 19110. From here, the user can select Type, Version, Release Levels, or Engineering Levels Selecting Type initiates the File Type Installation screen in FIG. 19. The preferred embodiment shows five main windows, 19301 thru 19302 and 19305 thru 19307. Window 19301 is the list of all available types defined in the Design Control Repository. In a large project, a given package would not usually require all the types of data, so performance is improved by only tracking the types required by a package. If more types exist than can fit in the window, the user can scroll the list using scroll bars 19303. The second window, 19302, is where the user installs a file type. The window is arranged in a spreadsheet format and the user may enter information or use a drag and drop operation to select it from the available list 19301. The second column, denoted window 19306, is the Fix Management flag. This indicates whether the data type will participate in Fix Management tracking. This is accomplished by pushing the button to indicate a positive selection. The third window 19307 is the Part Number column and determines whether the data type will require a Part Number when the package is under Part Number Control. It also consists of push buttons which function identically to those in column 19306. The fourth window 19305 is the Repository column and is completely optional. If the Data Manager wishes to further segregate the data by type within the storage hierarchy, this field can be filled in with the path to the directory where the data is to be stored. All columns default to blank. If too many types are installed, the user can view them using the scroll bars 19304. This causes all information contained in windows 19302, 19305, 19306 and 19307 to scroll in unison.

Figure 20:
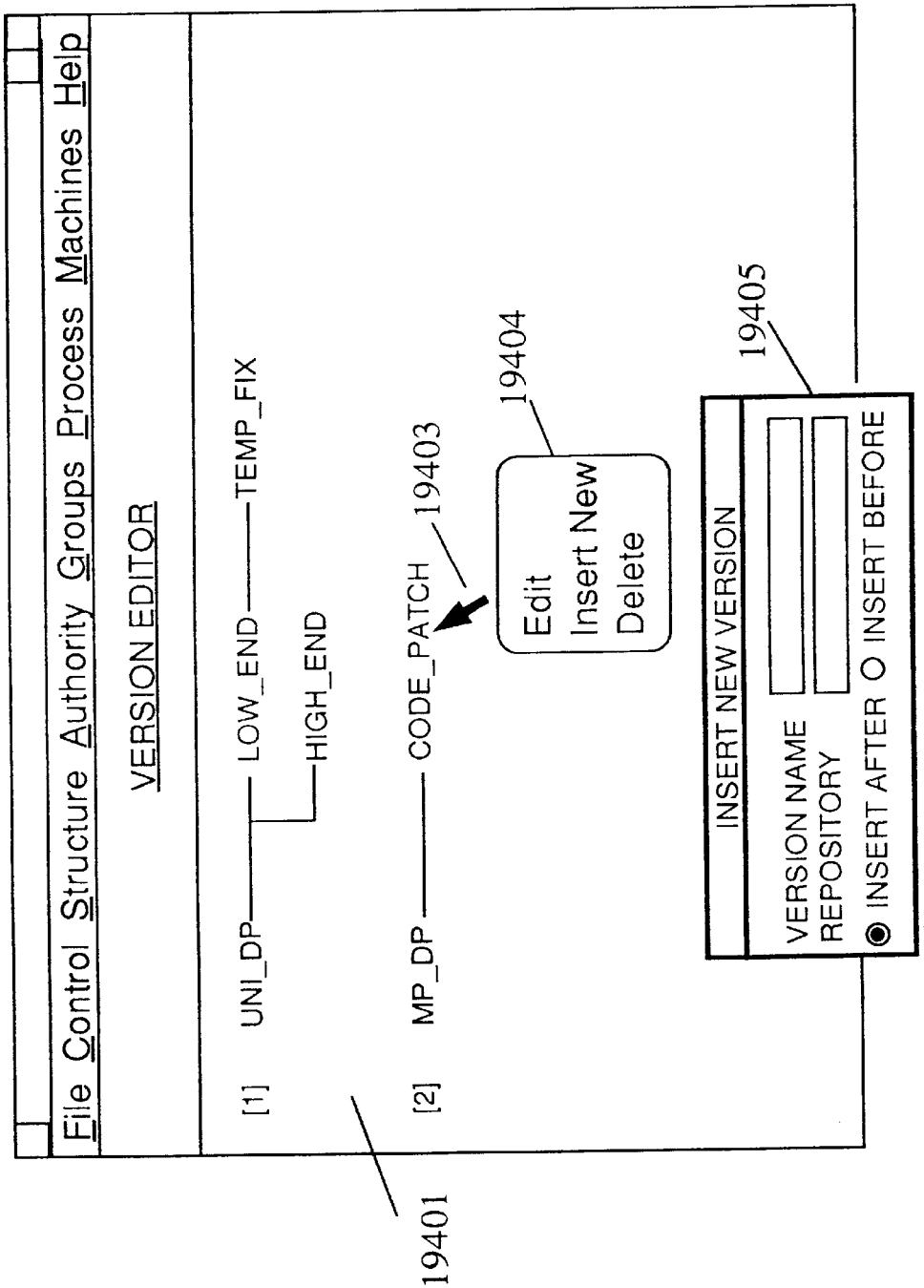
FIG. 20 illustrates the Version Editor.

Returning to pull down menu 19110, if the user selects Version, the Version Editor in FIG. 20 will appear. It consists of one main window 19401 which graphically displays a Version map of all installed Versions. For a given Version stream, the tree expands from left to right with the leftmost Version being the base Version. All Versions to the right are based on a Version to the left, with the solid lines showing the relationship. Each independent stream is numbered. The user can start a new Version stream or alter an existing stream by positioning the cursor 19403 over an open area or an existing Version name. Upon positioning the cursor 19403 and clicking the mouse, the pop up menu 19404 appears. To install a new-Version, the user selects Insert New which results in dialog box 19405. Here the user enters the name of the Version and the repository, if desired. The repository data is used to separate all data pertaining to this Version from other Versions. If left blank, the data is located under the package control data repository. If the user locates the cursor 19403 over an existing Version, the dialog box 19405 contains two radio buttons which allow the user to insert the new Version either before or after the existing one. If the user is starting a new Version stream, these radio buttons are absent. For existing Versions, the user may also select Edit or Delete. Selecting Edit results in the same dialog box 19405 with the radio buttons being absent. In addition, the Version name is filled in and the repository may be filled in. The user can change either field. If the user selects Delete, the system checks to ensure no data exists in that Version, then displays a confirmation dialog box which the user must OK in order to proceed. Regardless of the change (adding a new Version, editing an existing one, or deleting), the Version map 19401 is updated accordingly.

Figure 21:
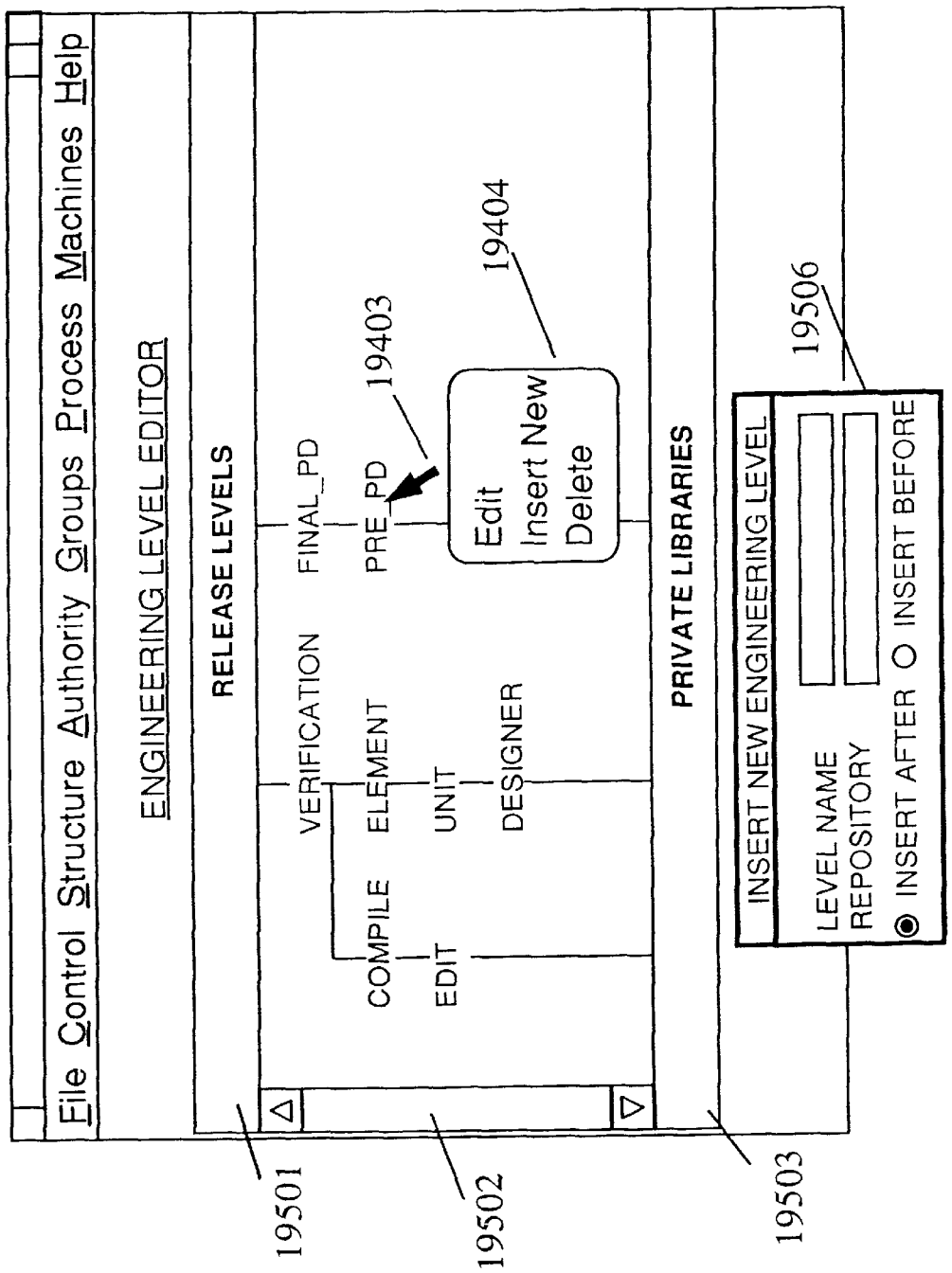
FIG. 21 illustrates the Engineering Level Editor.

Returning to the Structure pull down menu 19110, selecting Engineering Levels brings up the Engineering Level Editor in FIG. 21. Like the Version Editor in FIG. 20, this consists of a graphical window 19502 displaying a map of the installed Engineering Levels. The highest Levels are at the top and the lowest are at the bottom. The promotion paths are illustrated by solid lines connecting the Levels. Below the Levels is an informational graphic 19503 depicting the entry points from Private Libraries into the lowest Levels. Above the Engineering Levels sits a graphic 19501 which is both informational and active. It depicts the promotion path from the highest Levels into the Release Levels. It also serves as a hyperlink to the Release Level Editor illustrated in FIG. 22 by clicking on it. This enables the Data Manager to quickly switch between the Engineering Level and Release Level Editors to visualize the overall Level structure. As in the Version Editor in FIG. 20, the user can position the cursor 19403 over an existing Level to edit, delete or insert a new one. Likewise, the user can position the cursor 19403 over open space to start a new Level stream. In either case the same pop-up menu 19404 appears. If the user selects Insert New dialog box 19506 appears. It's almost identical to dialog box 19405 except for the radio buttons. The user enters the name of the Level, and an optional repository if data in this Level is to be isolated from data in all other Levels. When adding a new Level to an existing stream, radio buttons exist to permit the choice of adding the Level above or below the existing Level. As with the Version Editor, an attempt to delete a Level will result in the system checking to ensure no data exists in that Level, followed by a confirmation dialog box that must be OK'd to proceed.

In our preferred embodiment, adding new Engineering Levels automatically results in all the currently defined Library-File Types being activated for the new Engineering Level. Since the underlying architecture permits each Engineering Level to hold a different set of LFTs, the underlying Control Repository functions require a list of PFVLs, which is automatically generated by looping through the list of defined LFTs. However, one skilled in the art could envision an environment where different subsets of LFTs would be permitted at different Levels. In this type of environment, a subsequent dialog box could be employed to query the Data Manager for the list of LFTs to activate for the new Engineering Level.

Returning to pop-up menu 19404, if the user selects Edit on an existing Level, a dialog box similar to 19506 appears with the absence of the radio buttons at the bottom. The Level Name is filled in and the repository may be filled in. The user may change either one.

Figure 22:
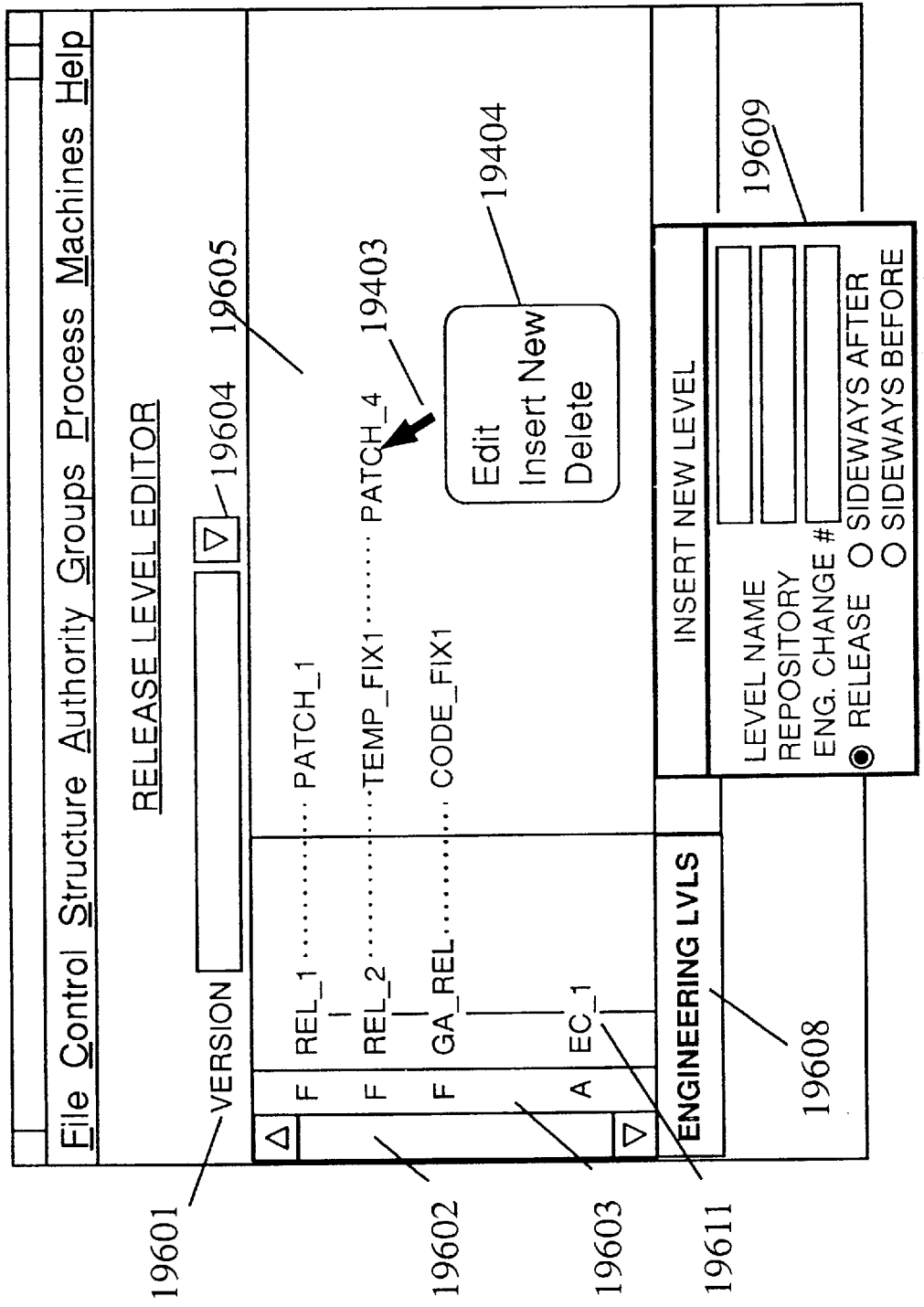
FIG. 22 illustrates the Release Level Editor.

Returning to the structure pull down menu 19110, the user may select Release Levels This invokes the Release Level Editor shown in FIG. 22. The screen is sub-divided into four regions. Window 19601 contains an entry field for the Version. The user may type in the name of any existing Version or use the drop down menu button 19604 to select the Version from a list of all installed Versions. Window 19611 shows a graphical map of all installed Release Levels with the most recent at the bottom. Status bar 19603 runs along the left edge of window 19611, and shows a one character status for each Release Level. An "F" indicates a frozen Level (which can't be updated any longer), while an "A" indicates an active Level which will accept new promotes from the highest engineering Levels. Sideways Levels are depicted graphically in Window 19605. Dashed lines show Library Search relationships between these Levels and Release Levels as well as within the Sideways Levels themselves. If either the map in window 19605 or 19611 becomes too large to view within the window, the user can scroll the field of view with scroll bars 19602. At the bottom of window 19611, a status field 19608 exists indicating that the active Release Level is connected to, and can be promoted from, the Engineering Levels. In addition, this field serves as a hyperlink, where the user can click on it to instantly invoke the Engineering Level Editor shown in FIG. 21. This permits the user to switch back and forth easily between the two editors in order to view the overall Level structure. The user can position the cursor 19403 over any existing Level (Release or Sideways) and click to bring up pop-up menu 19404. This menu is identical to the Engineering Level Editor and Version Editor. If the user selects Insert New, dialog box 19609 appears. There are two differences between this dialog box and dialog box 19506. The first is the addition of a field for the Eng. Change # which allows the user to associate an Engineering Chance number with a particular Release or Sideways Level. The second is the radio buttons at the bottom of the dialog box. Because of the different nature of Release Levels and Sideways Levels, the user must specify whether the new Level is a Release Level, a Sideways to be inserted after the existing Level, or a Sideways to be inserted before the existing Level. In the base of a Release Level, the DMS will automatically freeze the current active Level, and make the new one the active Level. Release Level window 19611 and status bar 19603 are updated accordingly.

In our preferred embodiment, a subsequent dialog box requires the user to enter a list of Library File Types expected to exist in the new Release Level. Since the underlying architecture permits each Release Level to hold a different set of LFTs, the underlying Control Repository functions require a list of PFVLs. However, one skilled in the art could envision an environment where all currently defined LFTs should be activated each time a Release Level is opened. In this case, the subsequent dialog box would be unnecessary.

Returning to pop-up menu 19404, if the user selects Edit, a similar dialog box to 19609 appears. The only difference is the radio buttons at the bottom are absent. The user is not permitted to change a Release Level to a Sideways or vice-versa, but can change the name, repository or Eng. Change #. As with the Version Editor, an attempt to delete a Level will result in the system checking to ensure no data exists in that Level, followed by a confirmation dialog box that must be OK'd to proceed.

Figure 23:
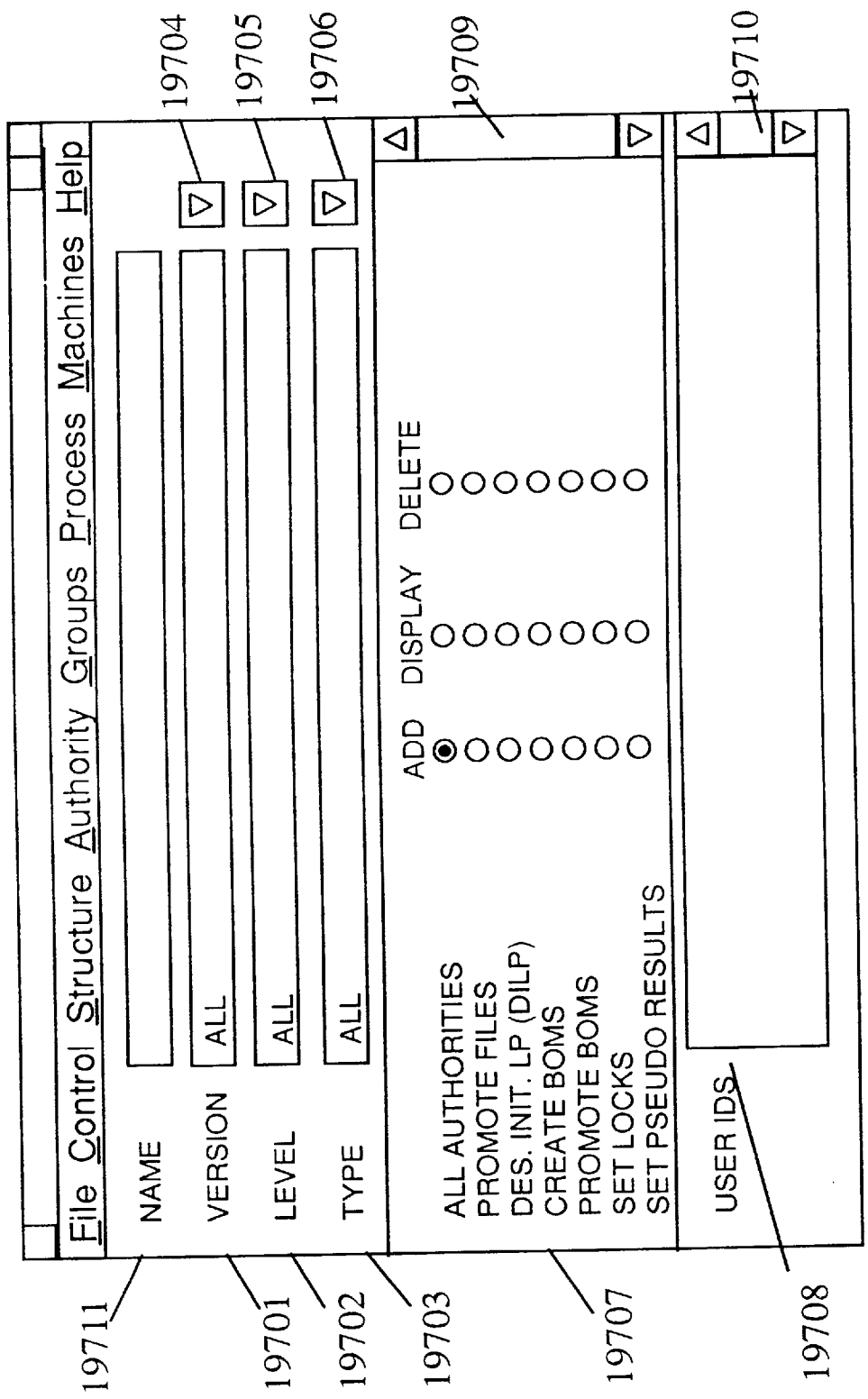
FIG. 23 illustrates the Basic Authority screen.
Figure 24:
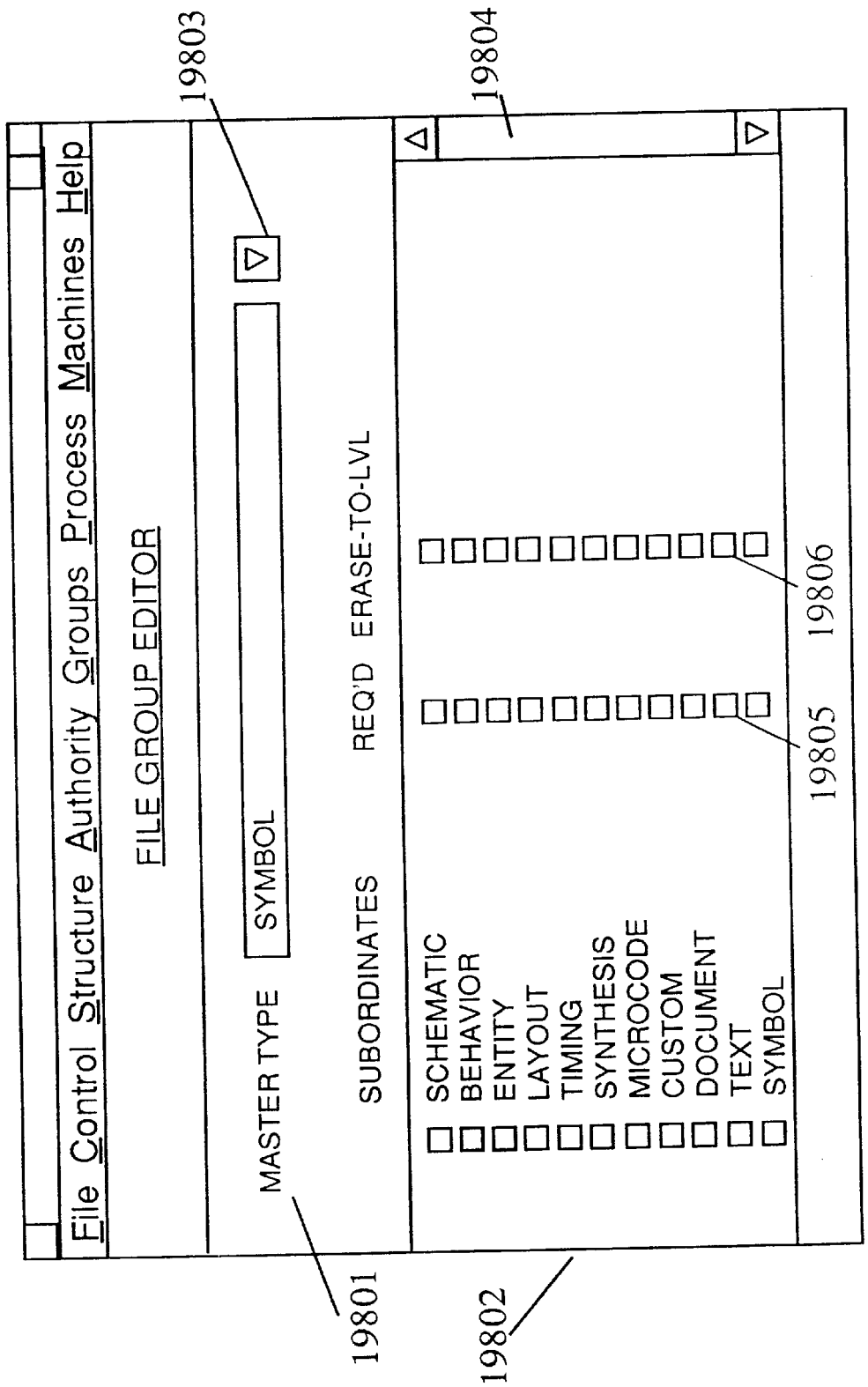
FIG. 24 illustrates the File Group Editor.
Figure 25:
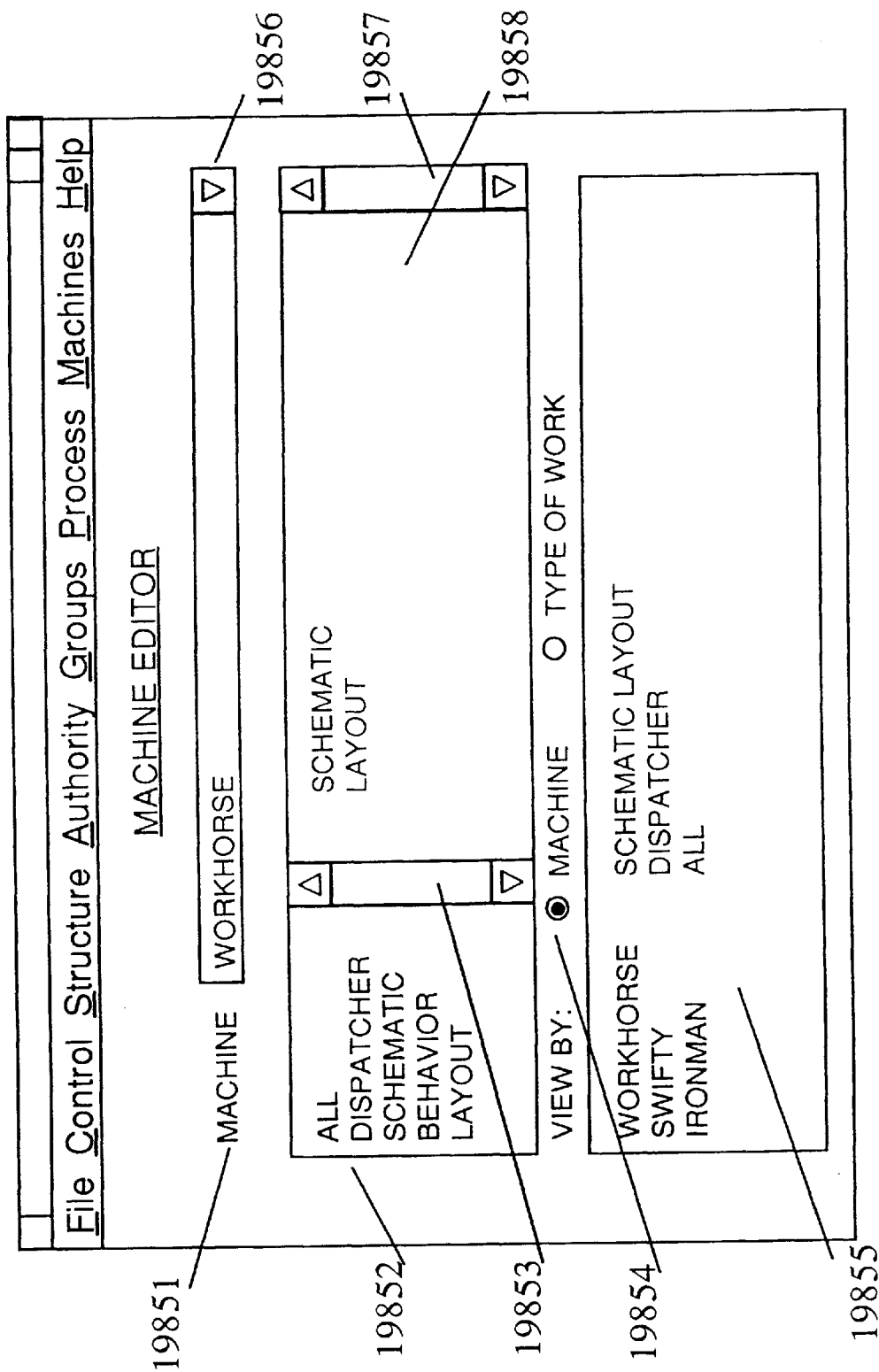
FIG. 25 illustrates the Automated Library Machine Editor.

Our embodiment allows a great deal of flexibility in authorizing who can use the Design Control System and how they can use it. All of the authorization privileges are controlled under drop down menu 19111 which is invoked by clicking on Authority choice 19104 of the main menu bar 19120. Upon selecting, the user may elect to Edit individual authority attributes or select Profiles to use the Authority Profiles. A detailed description of Authority Profiles is available in the Authority Manager section. Selecting Edit produces the screen shown in FIG. 23. FIG. 23 shows a filter comprised of the File Name field 19711, the Version field 19701, Level field 19702 and the Type field 19703. The user can limit the scope of the authority by filling in valid information for these fields. Drop down menu button 19704 can be used to obtain a list of all valid Version names. Drop down menu button 19705 provides the list of valid Level names, and drop down menu button 19706 displays all installed file types. The default for all 3 fields is the keyword ALL. Window 19707 is used to select the type of authority and the action. This window always lists the choice All Authorities followed by each individual type of authority. If the user selects an action for All Authorities, it automatically overrides any settings for the individual authorities. Each authority has three mutually exclusive actions, Add, Display and Delete The user selects the action using the radio buttons in window 19707. If more authorities exist than can be displayed, the user can scroll the window with scroll bars 19709. The bottom of the screen entails an entry window for user ids. The user specifies all the user ids for which the action pertains. If more ids are entered than can fit in the window, the user can use scroll bars 19710 to view them. Regardless of the action selected, a separate status window appears displaying the type of authority selected, each user id, and all Levels, Versions and file types that the authority exists for. In the case of adding new authorities, the status window clearly delineates which authorities will be added once the commit completes.

Figure 31A:
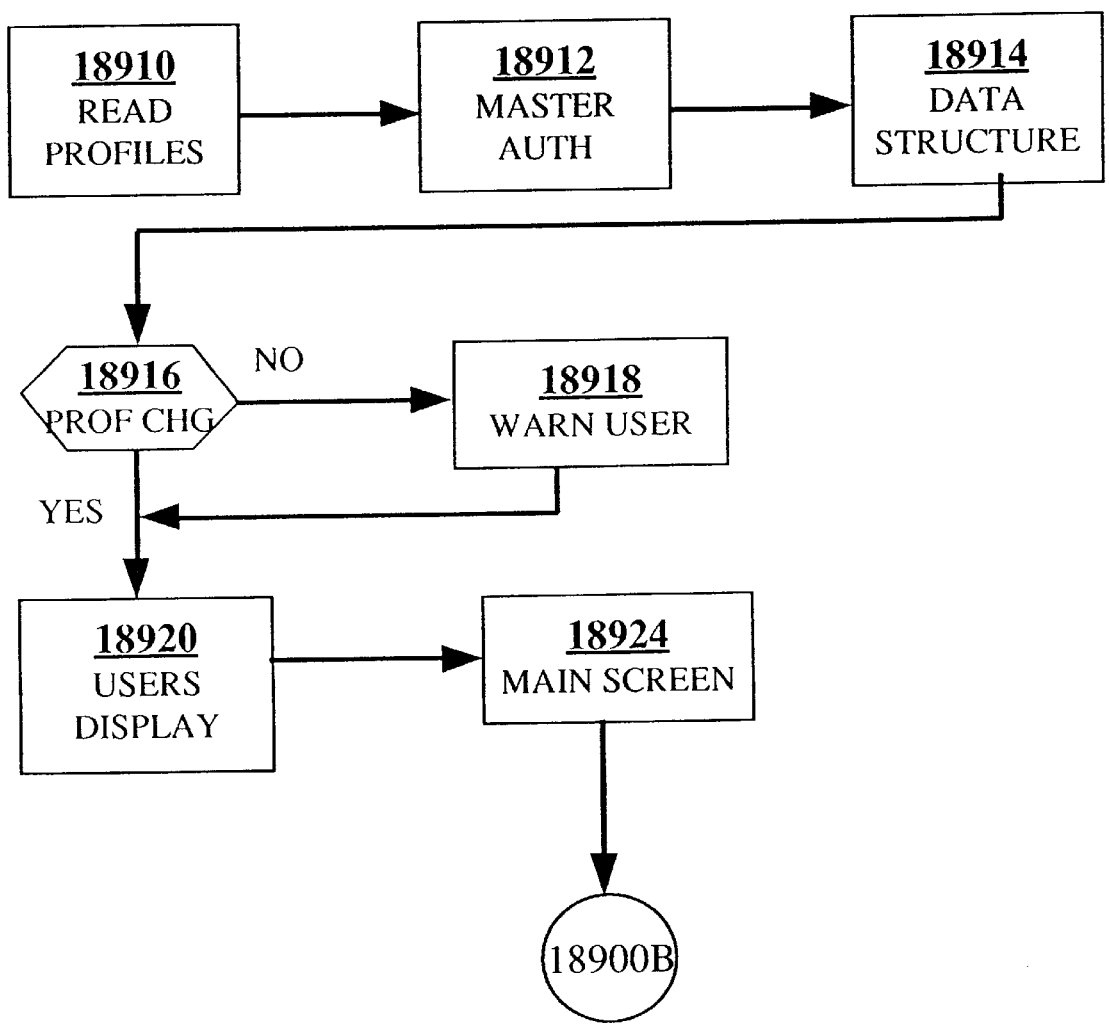
FIG. 31a thru 31b illustrates the algorithm for processing Authority Profiles.
Figure 31B:
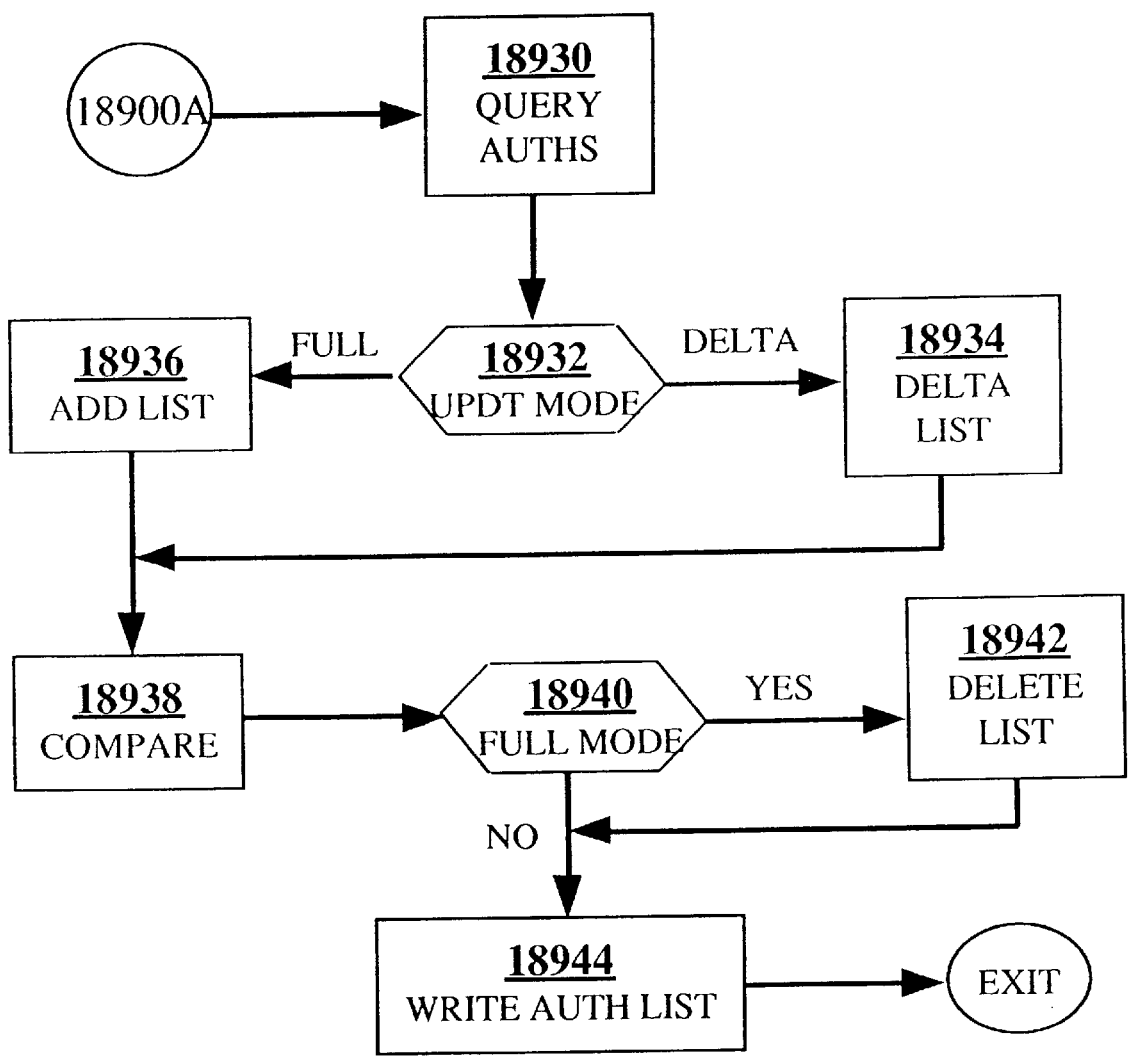

The user may wish to use the Profiles selection on drop down menu 19111 to edit and install authorities. The underlying algorithm for the Authority Profile Editor is described in FIG. 31. It begins with Step 18910 in FIG. 31a which Reads the Profiles. Here, the primary ALM is accessed and all existing Authority Profiles are parsed into a data structure. The editor also permits the user to configure the display of the profiles into a preferred arrangement, which is saved with the editors configuration information. Step 18910 also orders the profiles according to the preferred arrangement.

Once the profiles are read, Step 18912 reads the Master Authority List into data structures which contain each user with their corresponding profile information. An example of a Master Authority List is shown in FIG. 32. Record 18951 contains the Master Time Stamp along with a token indicating the last Update Mode used to build this list. Record 18952 holds the user id of the Data Manager who created the list. Records 18953 are the Profile records. There's a record for each profile, and within each record is the full path name of the profile, and its individual time stamp. Record 18954 is a header line to denote the titles of each column of data. The first column is the list of user ids, and the remaining columns represent each profile associated with this Library. Record 18955 illustrates the connection between user id and profile using a "Y/-" syntax. The "Y" indicates that the user has the authorities contained within that profile, while a "-" means the user does not have the authority in that profile.

Step 18914 creates a master Data Structure which contains all users for this Library along with the "Y/-" tokens indicating their profile associations. Step 18916 is then employed to make a list of all profiles whose time stamps are later than the Master Authority List. This indicates that a Profile has Changed, but has not been reflected into the DMS yet. Additionally, this step checks to ensure that each profile listed in section 18953 actually exists and was imported by step 18910.

If Step 18916 finds any outdated profiles, then Step 18918 Warns the Data Manager, about the profiles t hat are obsolete, and presents the opportunity to load all users in order to synchronize the differences. Also, if any profiles are missing, the Data Manager is notified of the discrepancy ant given an opportunity to continue or abort the process.

Figure 29:
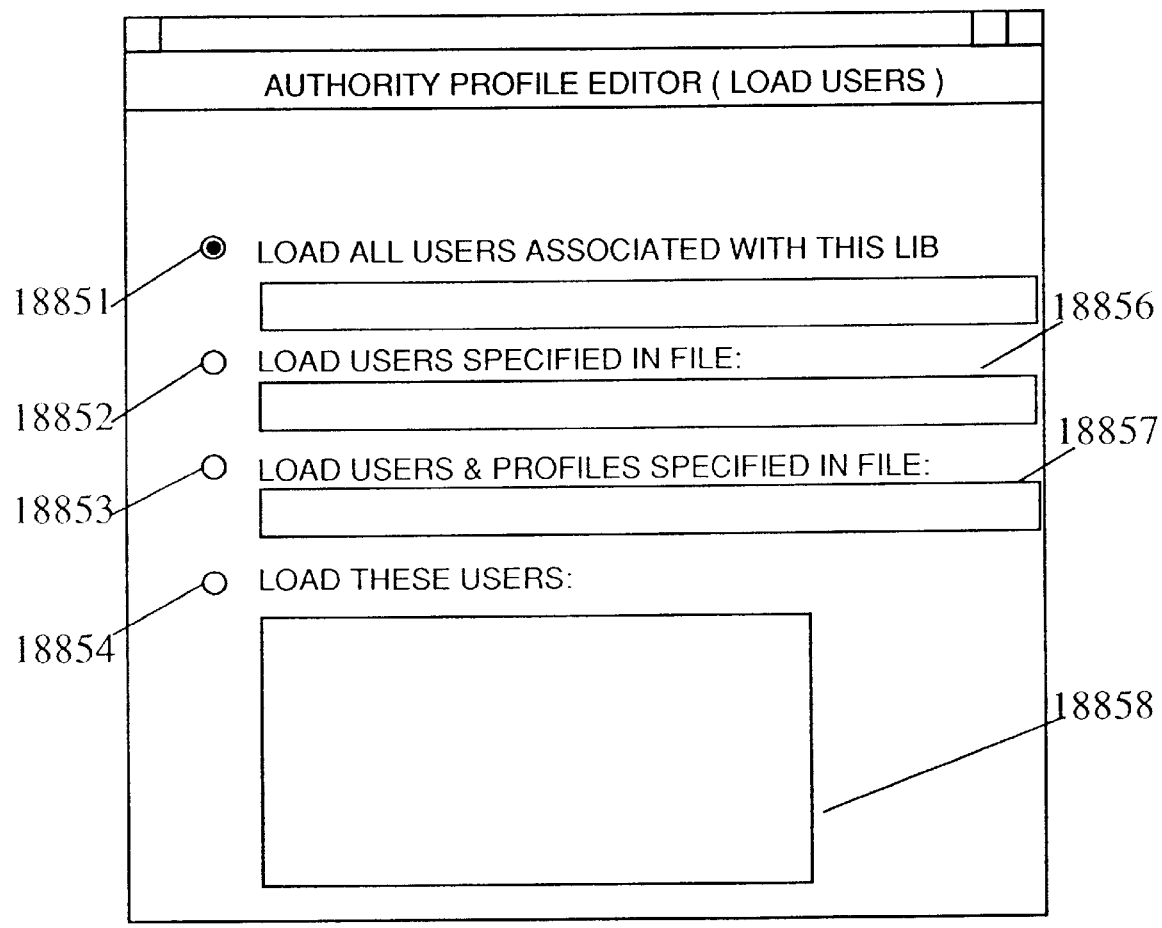
FIG. 29 illustrates the Authority Profile Load Users screen.

Once all authority info is loaded, Step 18920 invokes the Users Display. This data entry screen is illustrated in FIG. 29 and it affords the Data Manager four methods for selecting a working group of user ids. Radio buttons 18851 thru 18854 depict the four choices which are:

1. Load All Users Associated With This Library
2. Load Users Specified in File.
3. Load Users and Profile Updates Specified in File:
4. Load These Users The first choice results in all users listed in the Master Authority List being loaded into the editor. There is one Master Authority List for each Library. The second choice permits the Data Manager to enter the name of a file into data entry field 18856. This is a simple text file containing the user ids of the working group. The third option expands on the second by allowing the text file, entered in field 18857, to contain the names of the profiles that each user is associated with. Our preferred embodiment allows the two formats shown:

| userid1 | profile1 | profile2 | ... | profile 3 |
|---------|----------|----------|-----|-----------|
| *USERIDS | PROFILE1 | PROFILE2 | ... | PROFILE3 |
| userid1 | Y | — | | Y |
| userid2 | — | Y | | — |

Note: The - in the second format example indicate the user is NOT associated to that profile. Finally, the fourth option allows the Data Manager to enter a list of user ids into window 18858. These ids become the working group.

Upon selecting one of the four choices, the program matches the working group of user ids against the Master Data Structure created in Step 18914. If all users have been loaded, the Master Data Structure is copied into the working data structure. Otherwise, if the Data Manager specified a subset of users by way of the other three options, Step 18920 migrates the profile information for those users into the working data structure.

Next, Step 18924 displays the Main Screen depicted in FIG. 30. The screen consists of Main Menu Bar 18861, Profile Headings 18862, and the editable user area 18863. The profile Headings section displays the titles of each profile in the order specified by the Data Manager's customized configuration settings. The editable area, 18863, displays one user on each line, with the appropriate "Y/-" tokens to denote their association to each profile. The Data Manager can change any of the "Y/-" tokens, but can't change the names of any users from this screen. Data in this window can be scrolled horizontally and vertically via scroll bars 18864 and 18865 respectively.

In order to further assist the Data Manager, our preferred embodiment offers the Main Menu Bar, 18861 which contains the following selections:

Exit permits the Data Manager to leave the Authority Profile Editor. If any changes have not been processed, the Data Manager is given an opportunity to process them.

Process is used to leave Step 18924 and proceed with the remainder of the algorithm shown in FIG. 18990b.

Customize allows the Data Manager to rearrange the order of the profiles displayed on the screen. All profiles loaded into the editor can be displayed in any order, and the preference is saved in a configuration file for future use.

Editor migrates a snapshot of the editable window 18863 into a text editor specified in the configuration file. For large working groups with many profiles, this improves efficiency by affording the Data Manager the opportunity to use common editing functions such as copy, replicate, cut, paste, etc. to speed data entry. New users may be added to the working group.

Profile allows the Data Manager to browse any of the profiles for this Library. This enables the Data Manager to see what kinds of authorities are contained in a profile before associating a user to that profile.

Help displays on-line help for this data entry screen.

Upon editing all the profile associations, the Data Manager selects Process from Main Menu Bar 18861. Control then proceeds to Step 18930 in FIG. 31b. Here, the algorithm Queries the Control Repository for all existing authority information. Our preferred embodiment interacts with the Authority Manager and uses the QRFATGET routine which simply returns information in the Files Authority Tables. This routine can request information for all users in a Library or an individual user. The present embodiment uses a threshold to determine whether to perform one large single for all users, or multiple smaller queries for each individual in the working group.

Next, Step 18932 presents the Data Manager with a dialog box asking which Update Mode to use. The two modes offered are:

Delta where all new authorities are added to the Control Repository, but no existing authorities are removed. So, if a user had an authority prior to invoking the editor, and during the editing session the Data Manager removed that authority, Delta Mode will not process the deletion.

Full where all authorities are processed. Any necessary authorities are added, and extraneous authorities are removed. This enables the Data Manager to "clean house" and precisely synchronize the tables in the Control Repository with the various profiles.

If the Data Manager selects Delta Mode then Step 18934 is employed to create a Delta List. This list is generated by looping through all the users in the working group. For a given user, each profile association (Y or -) is examined in both the working group data structure and the Master Data Structure. In order for an authority to be added to the Delta List, one of these two conditions must be satisfied:

1. the profile must be outdated (indicating a modification was made since the last update to the DMS)
2. The Master Data Structure must have a "-" and the working data structure must have a "Y". This combination means the user is now associated to this profile, but was not previously associated to it.

If the Data Manager selects Full Mode, then Step 18936 creates a full Add List. This list contains all authorities where the profile association in the working group data structure is a "Y". Unlike Delta Mode, this mode does no comparison between the Master Data Structure and the working data structure, so users that already have an authority will be included in the list. Also, all profiles are examined whether they are outdated or not.

At this point, control proceeds to the Compare process in Step 18938. This step is designed to improve efficiency by taking advantage of implicit authorities within the Authority Manager. For example, Profile A contains promote authority for all schematics at all Levels and Versions, and Profile B contains promote authority for all schematics at a single Level and Version, then Profile B is a subset of Profile A. Any user associated with Profile A implicitly has the authority in Profile B, regardless of their association to Profile B.

If the user is associated with both profiles, it's redundant to have both entries in the Control Repository tables. Instead, Step 18938 is designed to detect these implicit situations. It does this, by ordering all authorities returned from the Control Repository in order of precedence ranging from most global authorities down to most restrictive authorities. Next, each entry in the Add or Delta List (depending on the update mode) is compared against the existing authorities. If it already exists either by exact match or by implicit coverage of a more global authority, then no further action is necessary. Otherwise, this entry is added to the precedence list, in the appropriate position, and with a flag indicating it is a new entry.

Also, when a new entry is added, the existing members of the list are examined to see if any can be removed because they are now implicitly covered by the new entry. If a member of the list can be removed, and it's also a new entry (i.e. added from a previous profile), it will be removed. On the other hand, if the entry exists in the Control Repository, then Step 18940 checks the Update Mode. If the program is currently running Full Mode, then entries are allowed to be deleted from the Control Repository. Therefore, Step 18942 adds an entry to a Delete List which corresponds to the entry being removed from the precedence list.

Once this process is complete for all profiles and all users, the result is a precedence list containing a mixture of existing entries and new entries to be added to the DMS. There should be no overlapping authorities between any of the entries. A simple filter eliminates all the existing authorities and leaves only those which need to be added to the Control Repository. Additionally, if the program is running the Full Update Mode, a separate list is created with all extraneous records that can be removed from the authority tables in the DMS. Since our preferred embodiment embeds the Authority Profile Editor within the Data Management Configuration Utility, the editor does not update the Control Repository directly instead, the list of additions and deletions are passed to the Commit Process described in FIG. 49 which, in turn, updates the tables in the Control Repository. The Data Manager must leave the Authority Profile Editor and select the Commit choice from the Main Menu Bar of the Data Management Configuration Utility. It would be appreciated by one skilled in the art that the Authority Profile Editor can exist as an independent entity and could easily incorporate those routines necessary to update the Control Repository.

Eventually control proceeds to Step 18944 which writes determines whether it's necessary to Write a New Master Authority List. If there are no changes necessary to the Control Repository, the Data Manager is given the option to rewrite the Master Authority List. Otherwise, if any changes exist, the entire file is rewritten with the updated information. This is the union of users in the working group and their current associations coupled with users listed in the old Master Authority List that were not updated in this session. The commit process is responsible for sending the updated Master Authority List to the Library.

Returning to main menu bar 19120, the user may select Groups 19105. This results in pull down menu 19112 being displayed. The user may select Edit or Copy If Edit is chosen, the system invokes the Automated File Group Editor shown in FIG. 24. The screen consists of a data entry field 19801 for the Master file where the user can type in the file type or choose from a list of all available file types using drop down menu button 19803. Below this field is the Subordinate selection window 19802. This window displays all installed file types for this package. The user clicks on the push button to the left of a type in order to include it in the automated file group. In addition, the user may elect to make the file type a Required type by selecting the Reqd button 19805. The user may also want the system to erase old copies of a file at the promotion target Level prior to promoting the new copy. This is accomplished by pushing the Erase-To-LvI button 19806. Both buttons (19805 and 19806) are optional for any file type. If the list of file types is too large to fit in the viewing area, scroll bars 19804 may be used. If the user selects Copy, a screen similar to FIG. 28 appears with the only difference being the absence of push buttons 19983 at the bottom of the window. The operation of this screen is described in further detail below.

Returning to Main Menu bar 19120, the user may select choice Process 19106. This results in pull down menu 19112 being displayed. If the user selects Edit the Process Editor depicted in FIG. 26 appears. It consists of a filter comprised of Version entry field 19901, Level entry field 19902, and File Type entry field 19903. The user may type in the valid names of Versions, Levels and file types or use drop down menu buttons 19904 thru 19906 to select from a list of available Versions, Levels and types respectively. The middle of the screen shows the Process Summary screen 19907. Once the user enters the above filter data, the system queries the Design Control Repository to find all processes which match the filter. They are displayed in window 19907. The user can use scroll bars 19908 to scroll through the process display. The user can edit any attributes visible in the window except for the process name. In addition, the cursor 19403 can be positioned over a process or in open space to invoke pop-up menu 19912. This offers the user the choice of Edit, Insert New, Delete, Cut, Copy, and Paste.

If the user selects Delete, a warning dialog appears requesting confirmation before proceeding. Upon accepting the confirmation, the DMS will delete the process definition. If the user selects Insert New the New Process Installation screen shown in FIG. 27 appears. It consists of an entry field for Process Name 19951, Machine 19952, Criteria 19953, Output Level 19954, and Arguments 19967. Process Name 19951 is required and must be typed in. Machine 19952 is optional and defaults to a "*" which means the process will run on the local Library machine. Criteria 19953 is required and must be in the form of a boolean expression that can evaluate to a true or false state. Output Level 19954 is optional and defaults to "*" indicating that any output files will be stored at the same Level where the process is defined. The arguments field 19967 is optional and is used to pass any necessary parameters to the Library process. Drop down menu button 19958 can be used to obtain a list of all known Library machines defined to this package. Drop down menu button 19959 will show a list of all available Levels for this package. The middle of the screen consists of 2 push buttons 19960 on the left side where the user can indicate whether the process is dependent and/or deferred. On the right side of the screen is Process Type field 19961 where the user can specify the type of process or use drop down menu button 19962 to invoke a cyclic field of valid process types. The lower section of FIG. 27 consists of the filter information. File Type field 19955 can be filled in or the user can invoke drop down menu button 19963 to obtain a list of available file types. Similarly, the Level field 19956 and Version field 19957 can be filled in, or drop down menu buttons 19964 and 19965 can be used to display lists of valid Level and Version names respectively. These fields default to the same values entered in the corresponding fields 19901 thru 19903 of FIG. 26. At the bottom of the screen are two radio buttons 19966 which the user pushes to indicate whether the new process should be installed before or after the process pointed to by the cursor 19403.

An alternate approach to clicking on Insert New of pop-up menu 19912 is to use a pre-defined progroup (Process Group) to load into the system. These are editable files which contain all the information necessary to install a process. Once created, the user can click on the Load Progroup button 19910 at the bottom of the screen in FIG. 26 and fill in the name of the Process Group in the data entry field. Drop down menu button 19911 can be used to obtain a list of all progroups in the search path. All processes defined in the Process Group will be displayed on the Process Summary screen 19907, with all appropriate attributes filled in.

Figure 26:
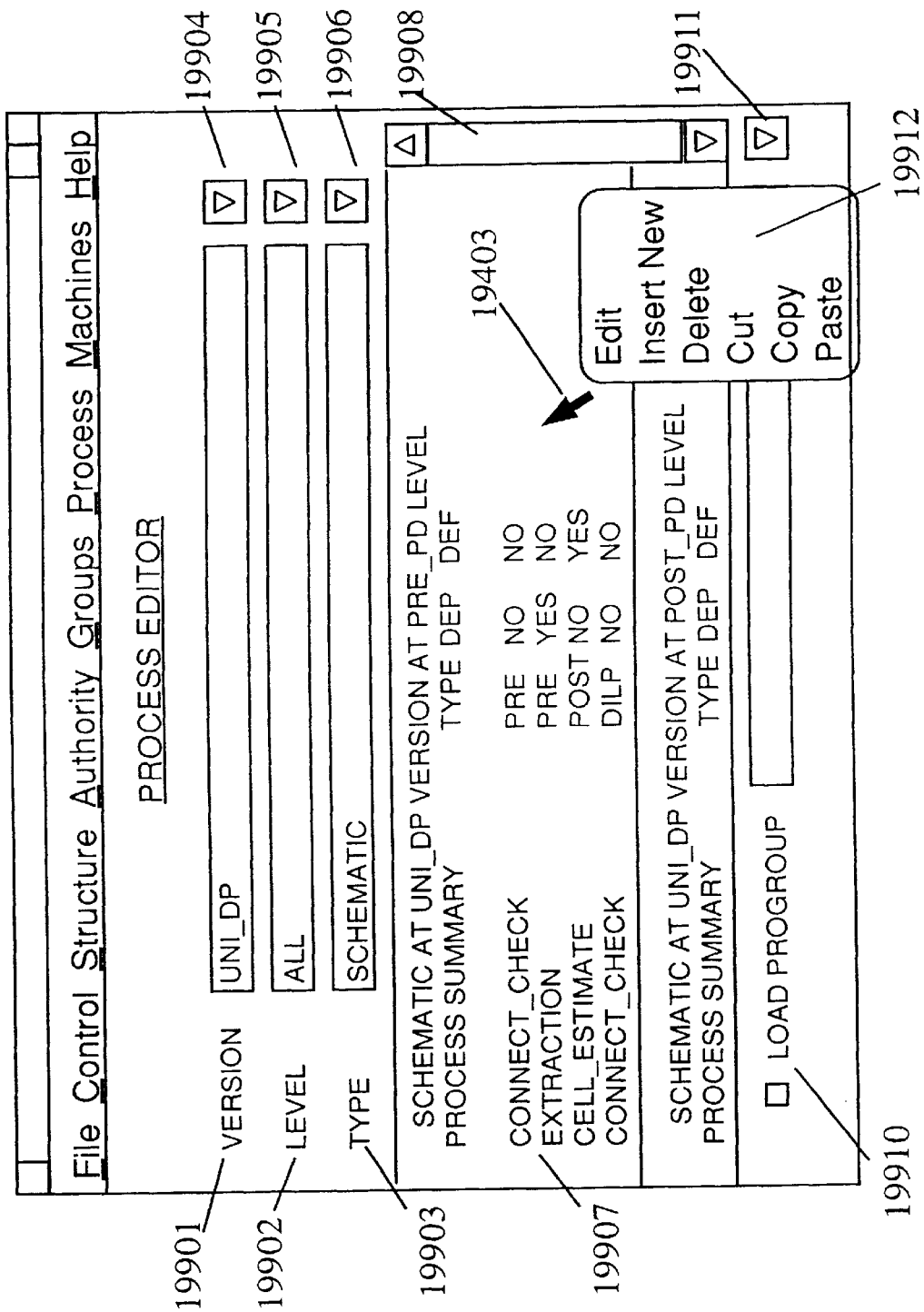
FIG. 26 illustrates the main Process Editing screen.
Figure 27:
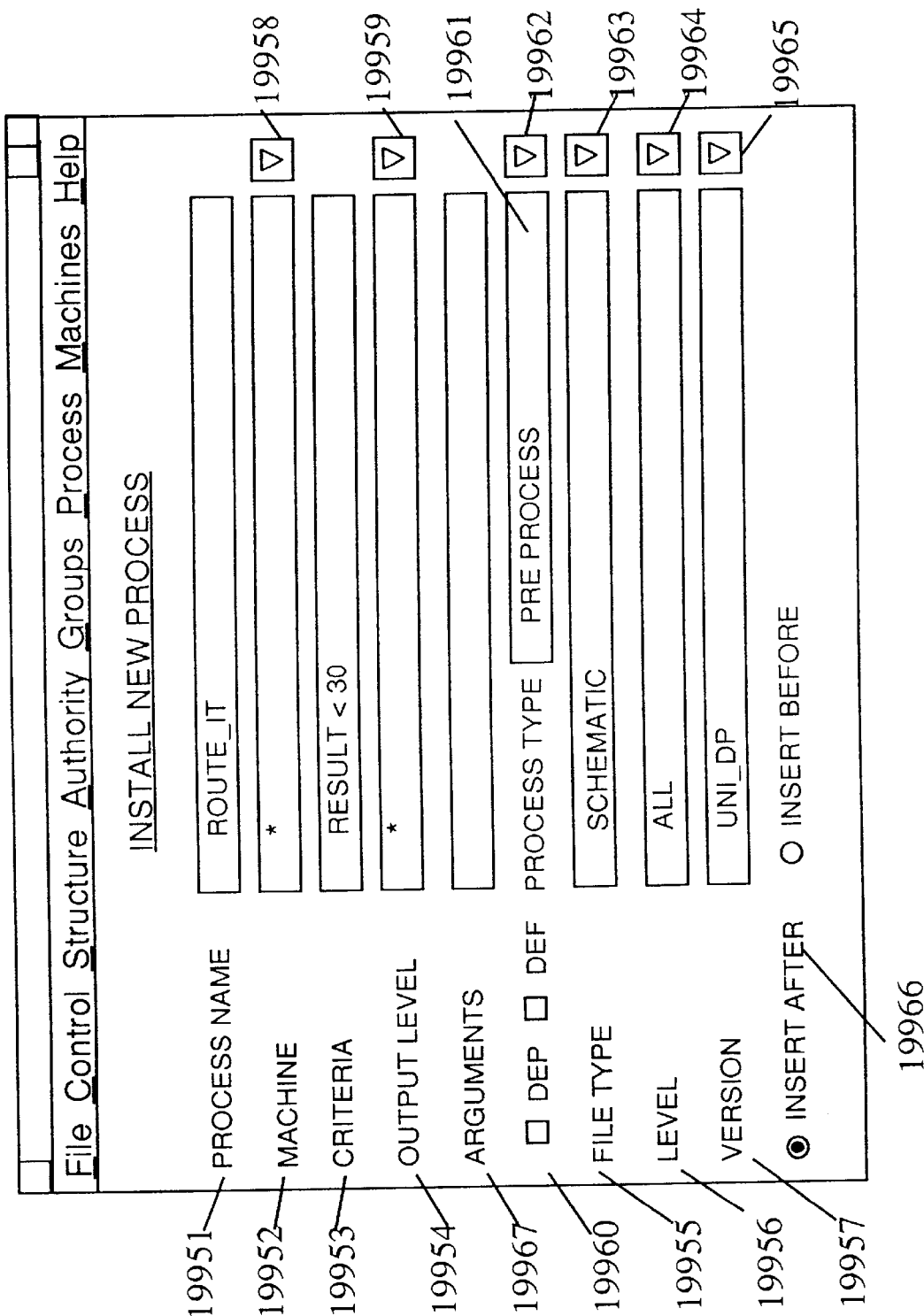
FIG. 27 illustrates the new Process Installation Utility
Figure 28:
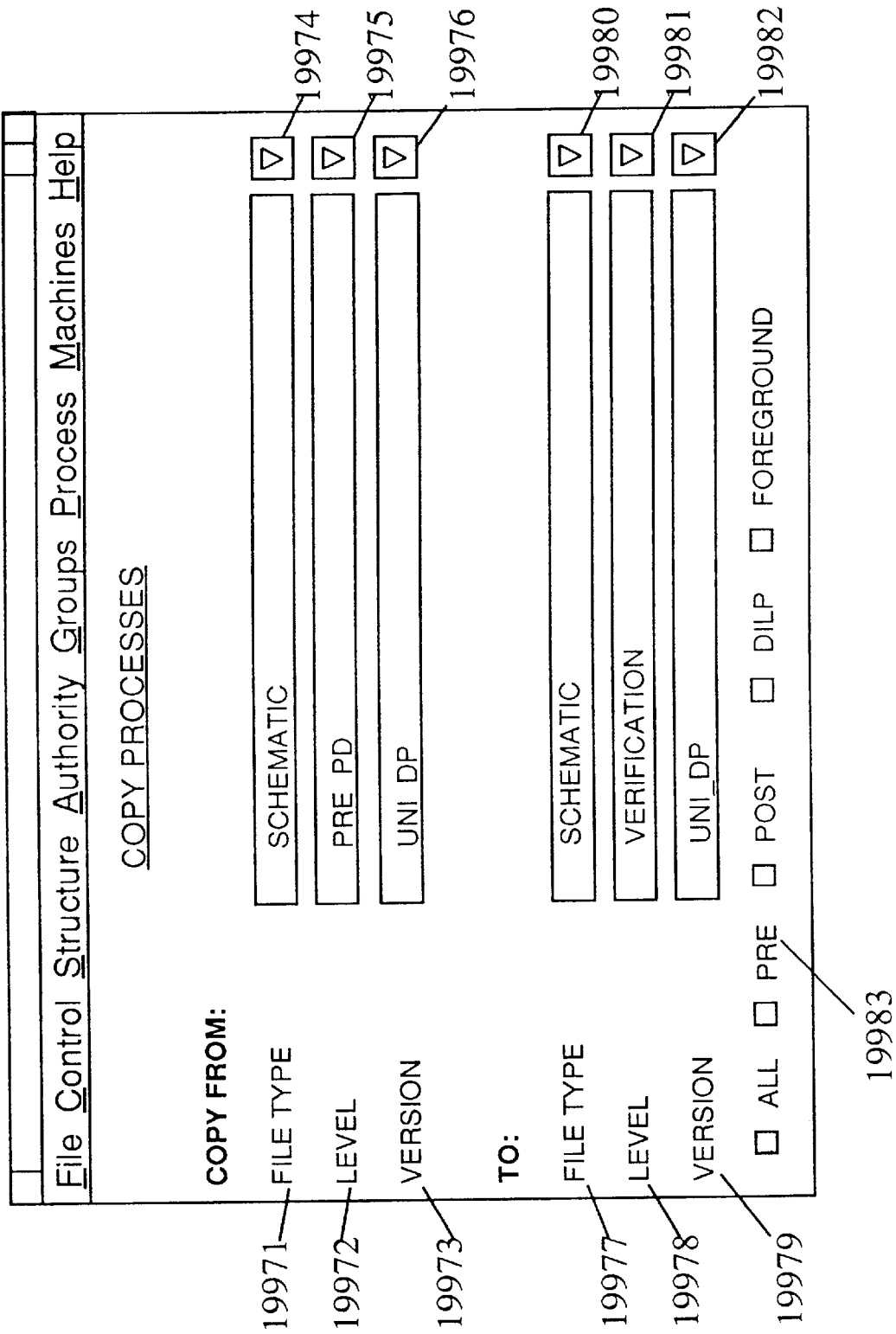
FIG. 28 illustrates the Process & File Group Copy Utility

Returning to pop-up menu 19912 in FIG. 26, if the user selects Edit a screen similar to FIG. 27 would appear. The radio buttons 19966 would be absent and all the fields would be filled in. The user can change any of the fields. In addition to editing the characteristics of a process definition, the user may want to change the arrangement or sequence of processes. This can be done with the aid of the Cut, Copy and Paste selections on pop-up menu 19912. Our preferred embodiment uses the "clipboard" metaphor to allow the user to Cut or Copy the processes listed in window 19907 into a clip board. The user can reposition the window using scroll bars 19908 and cursor 19403 to paste the contents of the clip board to the new location. The DMS will automatically update the sequence. If the user creates an invalid sequence such as a dependent post-process following a pre-process, the error will be not ed during the commit.

It should be noted that this function could be implemented in many other ways including use of a line-editor within window 19907 to allow each record to be moved or copied to another location. A drag and drop mechanism could also be employed to "grab" a process definition and drag it to its new location.

Returning to pull down menu 19112 in FIG. 16b, the user may select Copy for either the Groups 19105 choice or the Process 19106 choice. If it was selected from Process 19106, the screen depicted in FIG. 28 would appear. It consists of two sections where the user enters the "from" information and the "to" information. Fields 19971 thru 19973 are entered in the usual way with drop down menu buttons 19974 thru 19976 to assist the user in selecting valid names. Fields 19977 thru 19979 and drop down menu buttons 19980 thru 19982 function identically. At the bottom of the screen are 19005 push buttons 19983 which the user can push to filter the type of processes operated on. Upon committing this information, the system will copy all processes which match the filter 19983 from the source (19971 thru 19973) to the destination (19977 thru 19979). In the case of the Groups 19105 choice, selecting Copy would result in an almost identical screen to FIG. 28 with the absence of the push buttons 19983. The Screen Title would be Copy File Groups instead of Copy Processes. It would function in an identical manner except it would copy File Group information rather than processes.

Returning to main menu bar 19120, the user may select Machines 19107 to associate Automated Library Machines to the package. Upon selecting Machines 19107, the screen in FIG. 25 appears. The Machine 19851 field is where the user enters the name of the Automated Library Machine (ALM). A list of all known ALMs can be obtained by using drop down menu button 19856. The Data Manager then decides the type of work that will be processed by this ALM. The designation is by file type, and the user enters the file types in window 19858. If the user is adding a new machine to this package, this window is initially empty. The user can type the file types into window 19858 or drag and drop them from the list of available file types shown in window 19852. If the user enters the name of an existing ALM into Machine field 19851, window 19858 is automatically updated to show the current list of file types for that machine. If the user wants to delete an ALM from the package, this is done by blanking out window 19858. Upon hitting the enter key, a dialog box appears confirming that the user wants to delete the ALM and requires user input to proceed. Scroll bars 19853 and 19857 can be used to scroll the field of view in window 19852 and 19858 respectively. Window 19855 is the Machine Empire Viewer. It displays all ALMs doing work for this package with their respective types of work. Radio buttons 19854 can be used to determine the view mode. The default is to view by Machine name with one record showing each machine and the type of work. The other mode is View by Type of Work which shows one record for each type of work. Each record lists every ALM capable of handling that type of work. This window is updated as changes are made in the other windows and fields.

The final choice on menu bar 19120 is Help 19108. Our preferred embodiment would include a hypertexted system such as that found in OS/2(tm) or Windows(tm) where the user can click on highlighted words, phrases or topics to display additional information. In addition the system is sensitive to the user screen. This means it monitors the current active window or user screen, and if the user invokes the Help, it immediately jumps to that section. For example, if the user had the Authority Editor in FIG. 23 active, and clicked on Help 19108, a screen would appear explaining the concept of Authorities along with detailed descriptions of the fields in FIG. 23. The screen would also offer hypertext links to a master Table of Contents and searchable index of keywords.

Package Manager Process

This section describes the processes that take place behind the menu interface described in Data Management Control Utilities. The processes are depicted in FIGS. 44 to 74. To support these processes the Package Manager maintains the following tables in the Control Repository.

CRITERIA_EXCEPTION

TABLE 1

CRITERIA_EXCEPTION - Criteria exceptions

| Column | Description |
|---|---|
| REF | Reference |
| PROCESS_REF | Pointer to process for which there is an exception |
| PROCESS_LOG_REF | Pointer to process log reference for which there is an exception |
| LEVEL_REF | Pointer to level for which there is an exception |
| FILE_REF | Pointer to file for which there is an exception |
| LOG_REF | Pointer log entry |

CRITERIA

TABLE 2

CRITERIA - Promotion criteria

| Column | Description |
|---|---|
| REF | |
| LEVEL_REF | Pointer to level |
| PROCESS_REF | Pointer to process |
| OBSOLETE | Y if this process is obsolete |
| EXPRESSION | Expression to interpret result |

FILE_AUTHORITY

TABLE 3

FILE_AUTHORITY - File Authority

| Column | Description |
|---|---|
| REF | Reference number |
| FUNCTION | Function being performed |
| USERID | USERID that is authorized |
| PACKAGE | Package for which function is authorized - * indicates all |
| LIBTYPE | Lib. filetype for which function is authorized - * indicates all |
| VERSION | Versibn for which function is authorized - * indicates all |
| LEVEL | Lib. level for which function is authorized - * indicates all |
| FILENAME | Filename for which function is authorized - * indicates all |
| CREATOR | USERID who created entry |
| CDATE | Date entry was created |
| CTIME | Time entry was created |

FILE_GROUP

TABLE 4

FILE_GROUP - File Groups

| Column | Description |
|---|---|
| REF | Reference number |
| LEVEL_REF | Reference of master level |
| MASTER_LFT | Master library filetype |
| PACKAGE | Master Package id |
| VERSION | Master Version |
| LEVEL | Master Level id |
| SUB_LFT | Subordinate Library File type |
| REQUIRED | Y, if subordinate filetype is required. N, if not |
| PURGE | Y, if subordinate file is to be purged at "TO" level |
| SUB_LEVEL_REF | Reference of subordinate level |

LEVELS

TABLE 5

LEVELS - Library Levels

| Column | Description |
|---|---|
| REF | Reference number |
| LEVEL | Level id |
| PACKAGE | Package id |
| FILETYPE | Library file type |
| VERSION | Version |
| USERID | USERID where level resides |
| CUU | MINIDISK where level resides |

TABLE 5-continued

LEVELS - Library Levels

| Column | Description |
|---|---|
| LABEL | Label of MINIDISK where level resides |
| NEXTLVL_REF | Pointer to next level |
| PUTABLE | Files can be put to this level |
| PROMOTABLE | File can be promoted from this level |
| LOG_REF | Pointer to log entry |
| AUXDISK | If "Y", then level is on auxilliary disk |
| PLATFORM | Platform where level resides |
| DIRECTORY | DIRECTORY under which level resides |

LVLS

TABLE 6

LEVELS - Library Levels

| Column | Description |
|---|---|
| LVLSREF | Reference Number |
| LVLSNAME | Level Name |
| LVLSVER | Version |
| LVLSUSER | Userid |
| LVLSCUU | Minidisk Address |
| LVLSPROM | Promotable Flag |
| LVLSLAB | Minidisk Label |
| LVLSPLAT | Platform |
| LVLSDIR | Directory |
| LVLSNEXT | Next Level Reference |

MEC_LEVEL

TABLE 7

MEC_LEVEL - Relates MECS to levels

| Column | Description |
|---|---|
| REF | Reference number |
| MEC_REF | MEC reference number |
| LEVEL_REF | Reference number of associated level |
| FROZEN | Y if level is frozen |

MECS

TABLE 8

MECS - Relates MECS to previous MECs

| Column | Description |
|---|---|
| REF | Reference number |
| MEC_NO | MEC number |
| PREV_MEC | MEC on which this MEC is based |
| PACKAGE | Package id |
| IEC_PREFIX | No longer used |
| FINAL_IEC | No longer used |
| MFG_ID | Manufacturing ID |
| MAKE_FROM_MEC | No longer used |
| REMARKS | Remarks |
| MEC_TYPE | Type of MEC: NEWBUILD, EC, MAKEFROM or TEMPFIX |

PACKAGE

PACKAGES

TABLE 10

PACKAGES - Packages

| Column | Description |
|---|---|
| REF | Reference number |
| ID | Package id |
| MANAGER | Userid of package manager |
| ALTERNATE | Userid of alternate package manager |
| REC_LEVEL | Level at which REC control begins |
| PARTNO_LEVEL | Level at which part numbers are required |
| CURRENT_RECNO | Current default REC number |
| CURRENT_MECNO | Current default MEC number |
| BYPASS_REC | If "Y", then bypass REC processing |

PACKAGE_LFTS

TABLE 11

PACKAGE_LFTS - Package Library Filetype table

| Column | Description |
|---|---|
| REF | Reference number |
| PACKAGE | Package ID |
| LFT | Library filetype |

PROC_AUTHORITY

TABLE 12

PROC_AUTHORITY - Process Authority list

| Column | Description |
|---|---|
| REF | Reference number |
| FUNCTION | Function being performed |
| USERID | USERID that is authorized |
| PROCNAME | Process for which function is authorized |
| PACKAGE | Package for which function is authorized - * indicates all |
| LIBTYPE | Lib. filetype for which function is authorized - * indicates all |
| VERSION | Version for which function is authorized - * indicates all |
| LEVEL | Lib. level for which function is authorized - * indicates all |
| FILENAME | Filename for which function is authorized - * indicates all |
| CREATOR | USERID who created entry |
| CDATE | Date entry was created |
| CTIME | Time entry was created |

PROCESS

TABLE 13

PROCESS - Automatic Processes

| Column | Description |
|---|---|
| REF | Reference number |
| LEVEL_REF | Pointer to level |
| LOG_REF | Pointer to process log entry - used for consistency check |
| OBSOLETE | Y if this process is obsolete |
| NEXT | Pointer to next process in sequence |
| POSITION | B before promote, A after promote, F foreground, P sometime after promote |
| DEFER | Y process invocation can be deferred |
| ASYNCH | Y if this process is asynchronous |
| PROCNAME | Process name |
| OVERIDES | Parameter list overides |

REC_HEADER

TABLE 14

REC_HEADER - REC header information

| Column | Description |
| --- | --- |
| REF | Reference number |
| PACKAGE | Package Id |
| ORIGINATOR | Userid of Originator |
| MEC_REF | Pointer to MEC to which this REC is assigned |
| PROB_NO | Problem number which this REC fixes |
| DATE | Origination date |
| TITLE | REC title |
| MEC_NO | MEC number |
| REQUEST_NO | Request number |
| FIX_REASONS | FIX REASON CODES (CONCATENATED) |

VERS

TABLE 15

VERS - Local VERS table

| Column | Description |
| --- | --- |
| VERSVER | Version |
| VERSBASE | Base Version |

VERSIONS

TABLE 16

VERSIONS - Version

| Column | Description |
| --- | --- |
| REF | Reference number |
| PACKAGE | Package id |
| FILETYPE | Library file type |
| VERSION | Version |
| BASE_VER | Version on which this version is based |

Figure 44:
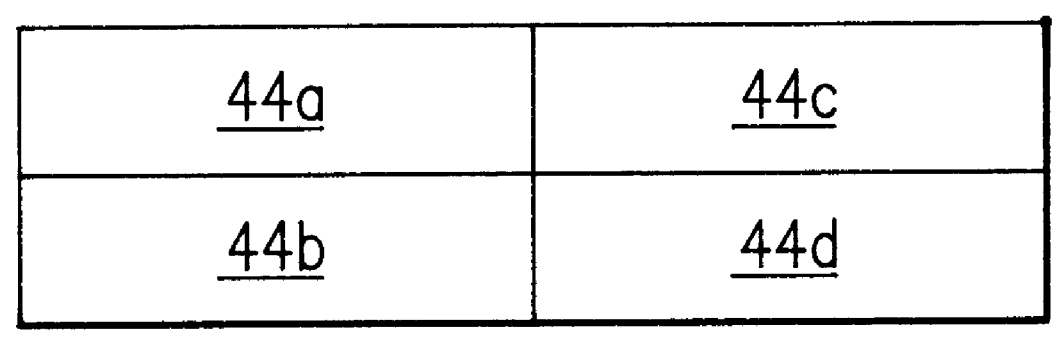

The DLPACMAN Process FIG. 44: After some initialization, an authorization check 10002 is made to insure that the invoker is either the Package Manager, the Alternate Package Manager or a Surrogate to the Alternate Package Manager. The Main menu is then presented 10003. Depending on the user's choice the process will flow to:

Edit the Package 10004 described in DNEDIT FIG. 50.

Figure 48:
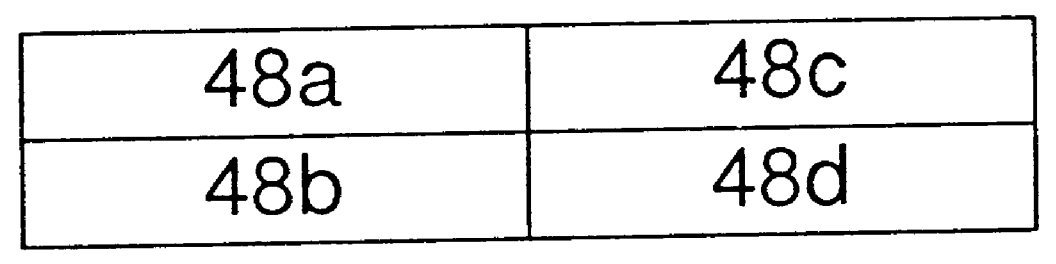

Generate Report 10005 described in DLREPORT FIG. 48,

Restoring the Session from a file 10006,

Saving a Session in a file 10007,

Queueing of all the Work Requests 10008, followed by Commit Changes 10009 described in DNCOMMIT FIG. 49, Upon completion of any of these processes the Main menu 10003 will be represented at which time the invoker may select another path or exit 10010.

Figure 45:
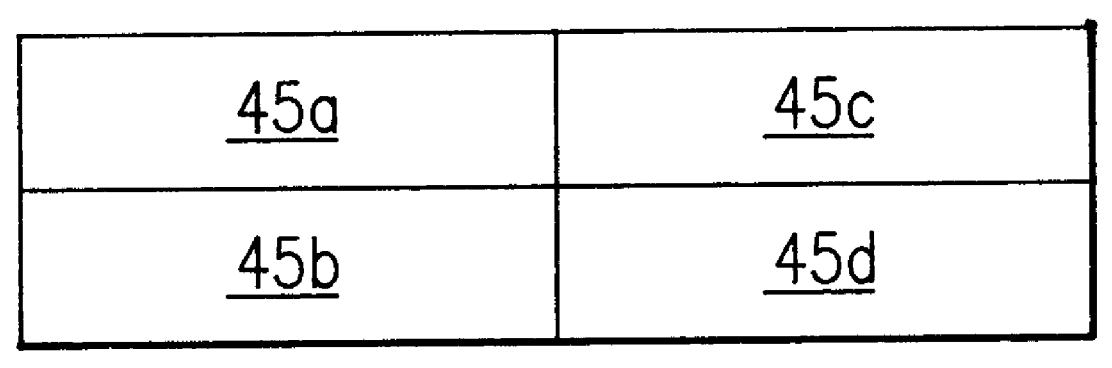

The QRDFRLST Process FIG. 45: This process is used to extract data to build a LIBxDEFR file for the specified package.

Figure 46:
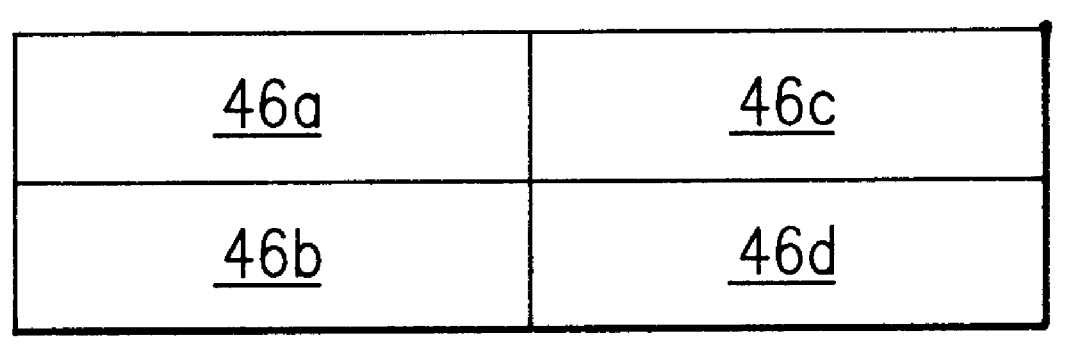
Figure 47:
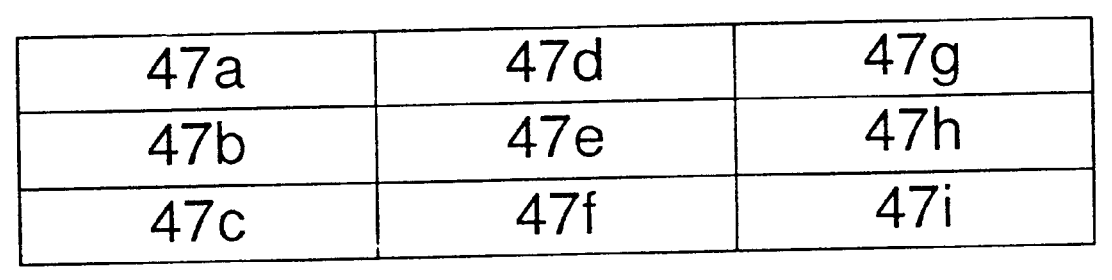

After initialization, set up 11001 the Level and NextLevel Trees. Next, a query 11002 is made to get and stack the entries in the VERSIONS table in the Control Repository. Next, a query 11003 is made to get the LEVELS table entries and insert then into the Level and NextLevel Trees. Then, the QRDFRLS1 Process described in FIG. 46 is invoked 11004. Upon return from the above process, prepare 11005 to scan all entries in the Level Tree. Next, reset 11006 the last generic level LastGLvl. Then get 11007 an entry from the Level Tree. Next, a check 11008 is made to determine if there was an entry. If so, the QRDFRLS2 Process described in FIG. 47 is invoked 11009. Upon return from the above process, the process flows back to 11007. If there was no entry, stack 11010 the row and version counts. Then, a check 11011 is made to determine if there were any entries. If not, an informational message is issued 11012 and the Return Code set to 4. In either case, the trees are cleaned up 11013 and the process returns 11014 to the caller.

The QRDFRLS1 Process FIG. 46; This process is used by the QRDFRLST Process to build the Standard Tree.

First, a query 11101 is made to get all entries for LibType "YYY" and Version "00" from the LEVELS table in the Control Repository. Next, insert 11102 these entries into the Standard Tree. Next, prepare to get all FROM-TO level pairs regardless of LibType ordered by most common to least common. Then, get 11104 an entry. Next, a check 11105 is made to determine if there was an entry. If not, the process returns 11107 to the caller. If so, insert 11106 the entry into the Standard Tree. Then, the process flows back to 11104.

The QRDFRLS2 Process FIG. 47: This process is used by the QRDFRLST Process to stack the DEFRLST entries.

After initialization, a check 11201 is made to determine if the level has a nonzero NextLvlRef. If not, the process returns 11214 to the caller. If so, resolve 11202 it by looking in the NextLevel Tree. Next, a check 11203 is made to determine if it was found. If not, set 11204 the NextLvlRef to zero. In either case, a check 11205 is made to determine if the level hds a non-zero NextLvlRef. If not, the process returns 11214 to the caller. If so, reset 11206 the SkipFlag. Next, search 11207 the Standard Tree for FROM-TO Level pair. Then, a check 11208 is made to determine if a FROM-TO pair was found. If not, reset 11209 the SkipFlag. In either case, a check 11210 is made to determine if a generic level has been previously processed. If so, a check 11211 is made to determine if this is an Auxiliary Level. If so, a check 11212 is made to determine if this is on an Auxiliary disk. If so, a check 11213 is made to determine if the SkipFlag is on. If not, the process returns 11214 to the caller.

If a generic level has not been previously processed, or this is an Auxiliary Level, or this is on an Auxiliary disk or the SkipFlag is on, a check 11215 is made to determine if this is a User ("00") level. If not, a check 11216 is made to determine if this level can be promoted. If so, a check 11217 is made to determine if this level has a next level. If so, a check 11218 is made to determine if the next level can be promoted. If so, create 11219 a generic record and save 11220 the level in LastGLvl. Then, complete 11221 the other fields of the record. If there is a next level use it otherwise use "**". Next, a check 11222 is made to determine if the LibType is "YYY". If so, the process returns 11214 to the caller. If not, push 11227 the record and increment 11228 the RowCount. Then, the process returns 11214 to the caller.

If this was not a User ("00") level, a check 11223 is made to determine if this level is on an Auxiliary disk. If not, a check 11224 is made to determine if this level is on a workstation. If not, a check 11225 is made to determine if this is a skip level. If not, the process flows back to 11219.

If this is not a user level and the level cannot be promoted or does not have a next level or its next level cannot be promoted generate 11226 a normal level record and the process flows back to 11221.

If this is a User level and the level is on an Auxiliary disk or the level is on a work station or the level is a skip level the process flows back to 11226.

The DLREPORT Process FIG. 48: After initialization, the work requests are pulled from the queue 12001 and saved in local storage 12006. A menu is presented to the invoker 12002 to obtain the desired elements to be contained in the report. These are saved in local storage 12007 If there were no work requests on the queue 12003, then data is retrieved from the repository 12004 and save in local storage 12006. The report header is then generated 12005. For each option 12007 12008, the selected data is queued 12009. It is then pulled from the queue, formatted and written to the report file 12010. This will loop back to 12008 until there are no more options 12011 at which point the report file will be closed 12012 and the process will return 12013 back to the DLPACMAN process 10003 in FIG. 10000.

The DNCOMMIT Process FIG. 49: After initialization, the work request are pulled from the queue 13001 and saved in local storage 13006. The current level, version, filetype data are retrieved from the repository 13002 and compared 13003 with the locally stored work requests 496 and a delta list 13007 is generated. The commit process is started 13004. For each level to be deleted, the associated processes are deleted and or each new level the associated processes are added 13005. The repository is then updated to reflect the:

added and deleted Levels 13008, added and deleted FileTypes 13009, added and deleted Versions 13010, new Processes 13011, updated Controls 13012, added and deleted Authorities 13013, added and deleted FileGroups 13014, Next, the Library control files are generated and set to their respective Library Machines. Finally, the process will return 13016 back to the DLPACMAN process 10003 in FIG. 10000.

The DNEDIT Process FIG. 50: After initialization, the work requests are pulled from the queue 14001 and saved in local storage 14012. A menu is presented to the invoker 14002 to determine what option the invoker wishes to execute.

Figure 51:
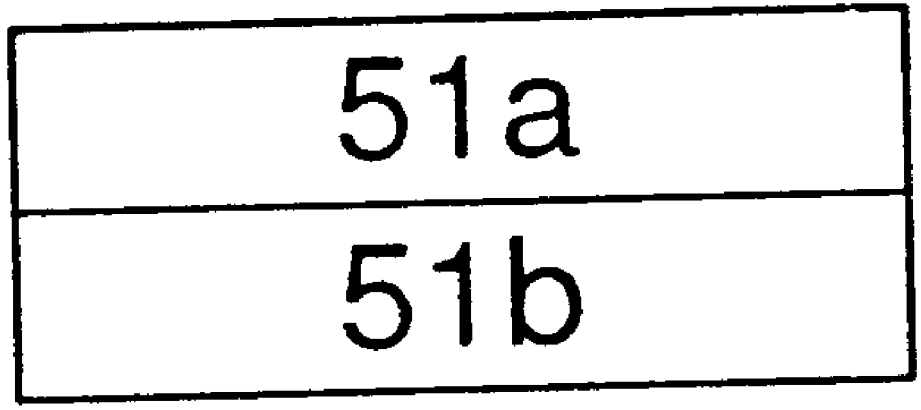
FIG. 51 which comprises FIGS. 51a thru 51b, describes the DNEDIT1 Process.
Figure 51A:
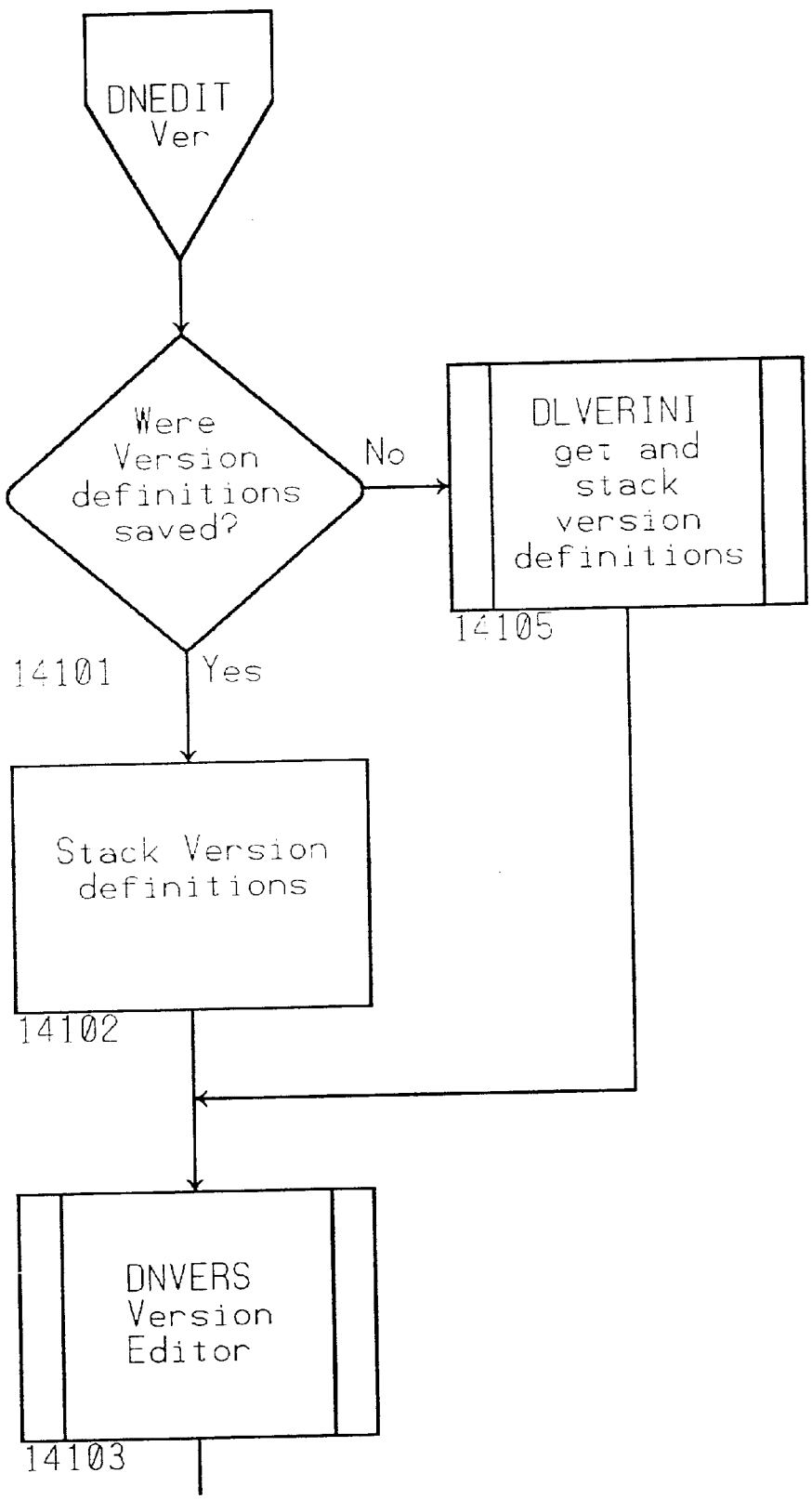
Figure 51B:
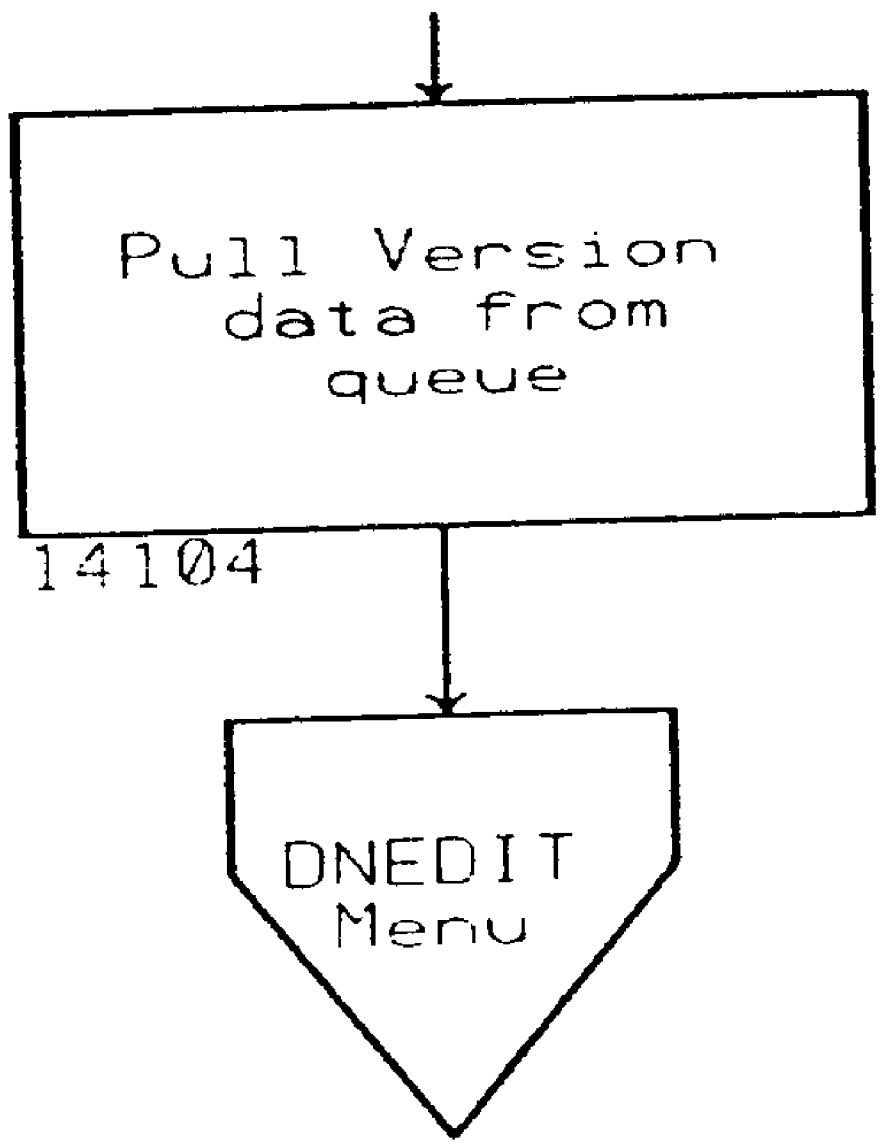
Figure 54A:
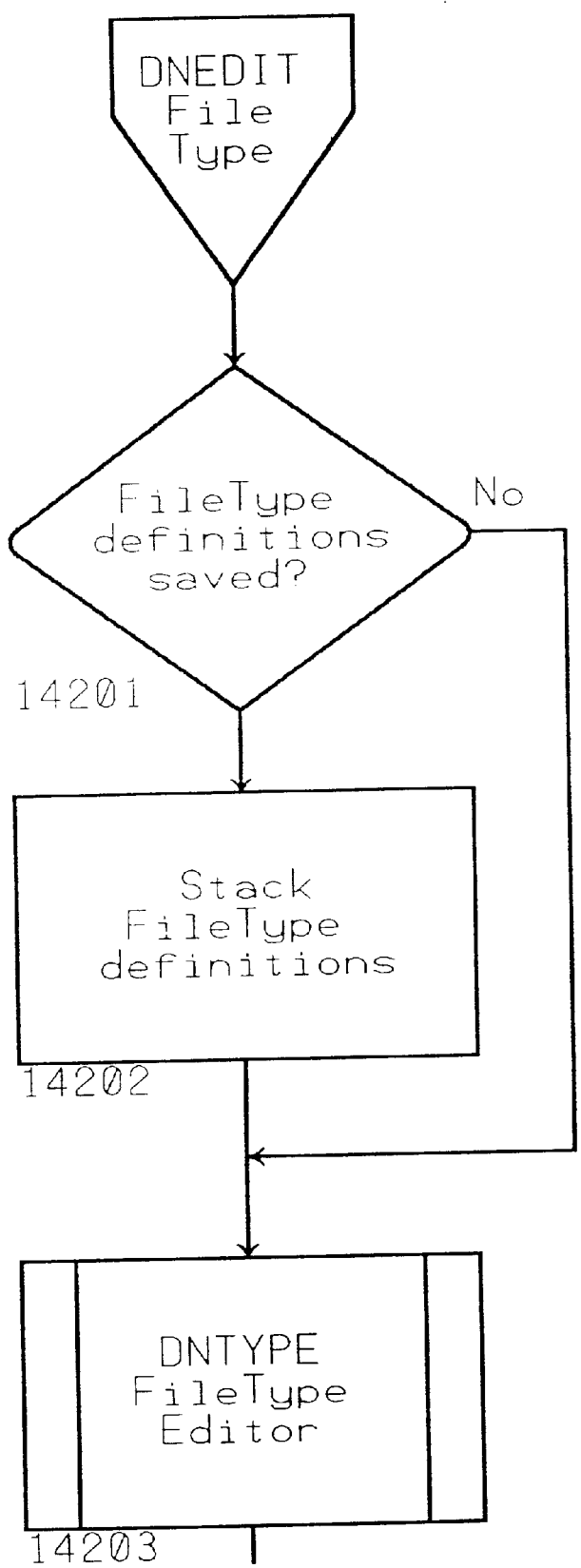
FIG. 54 which comprises FIGS. 54a thru 54b, describes the DNEDIT2 Process.
Figure 54B:
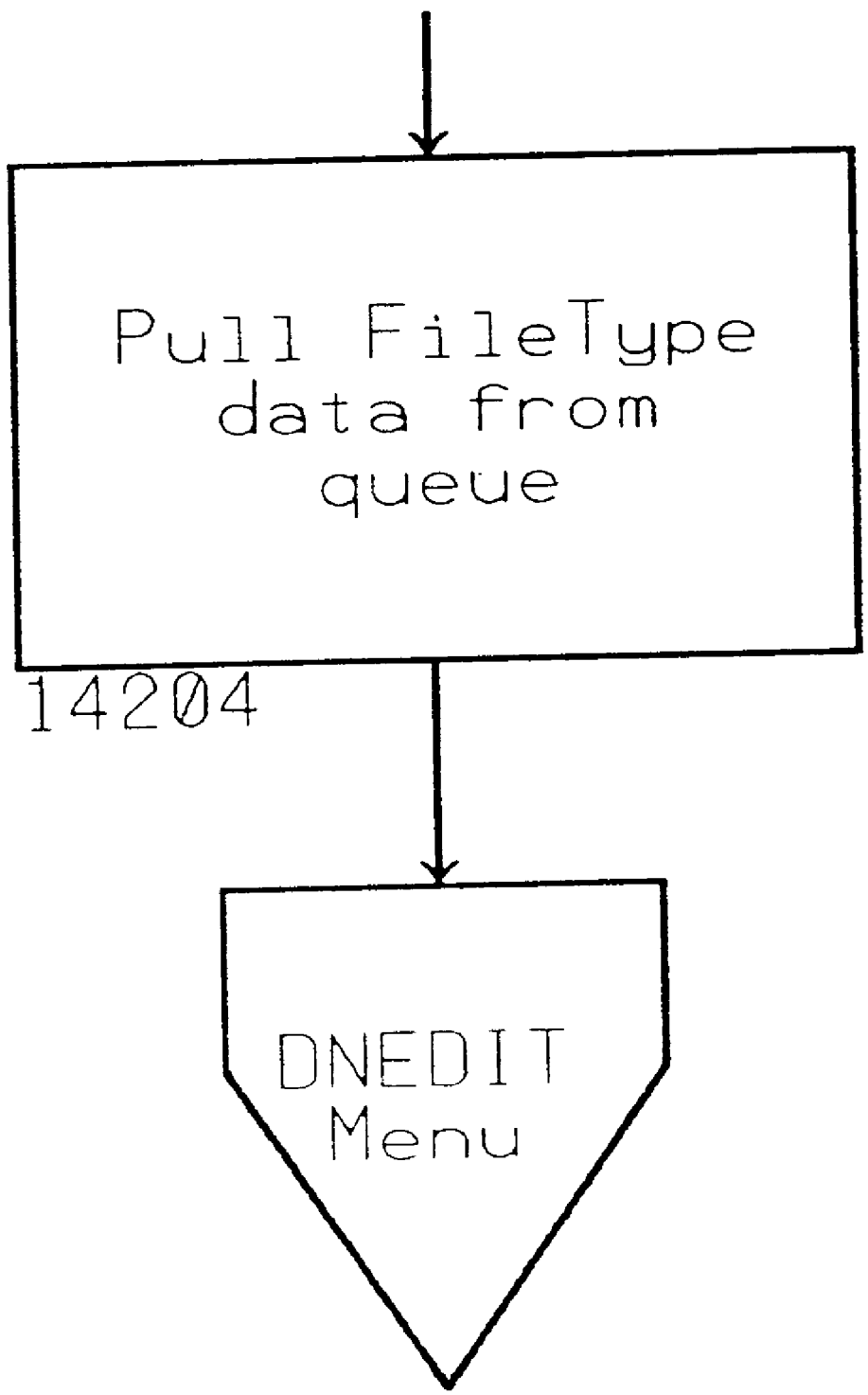
Figure 57:
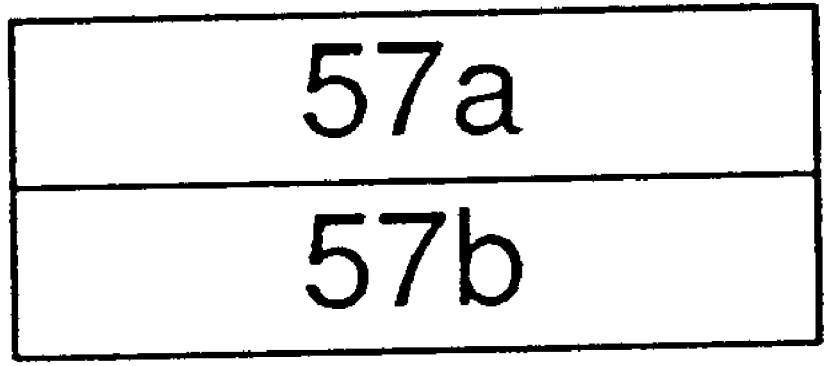
FIG. 57 which comprises FIG. 57a thru 57b, describes the DNEDIT3 Process.
Figure 57A:
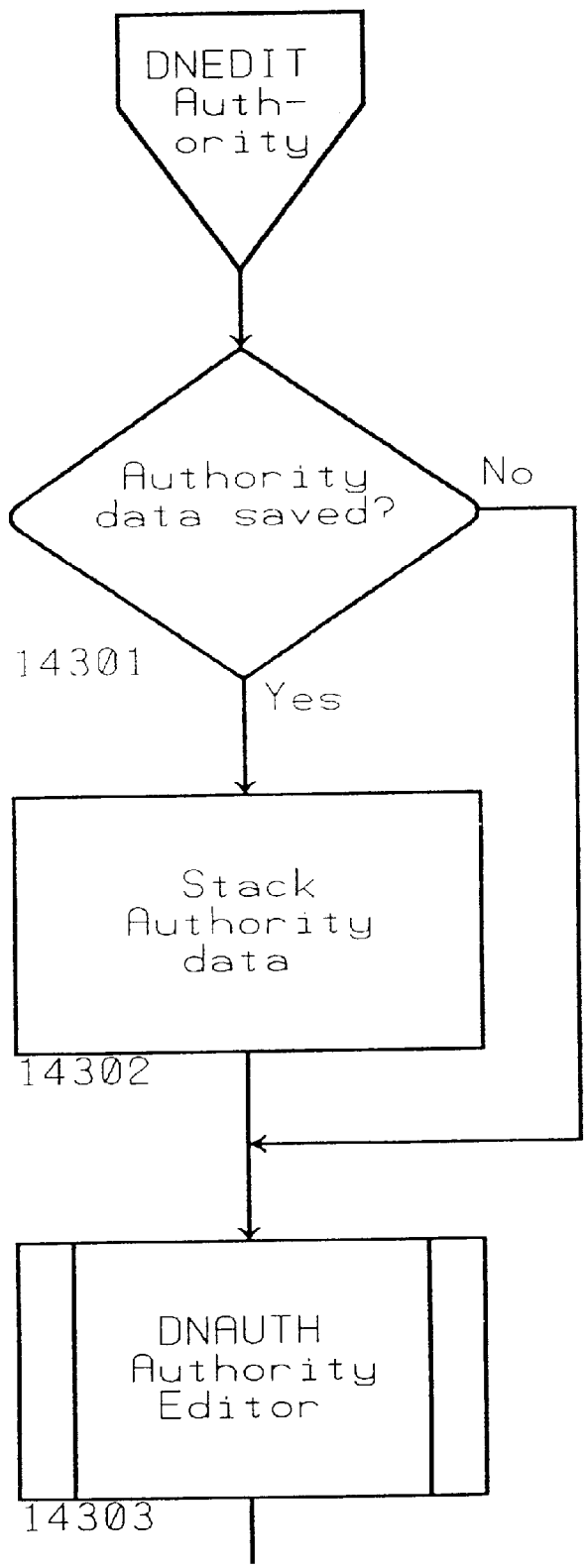
Figure 57B:
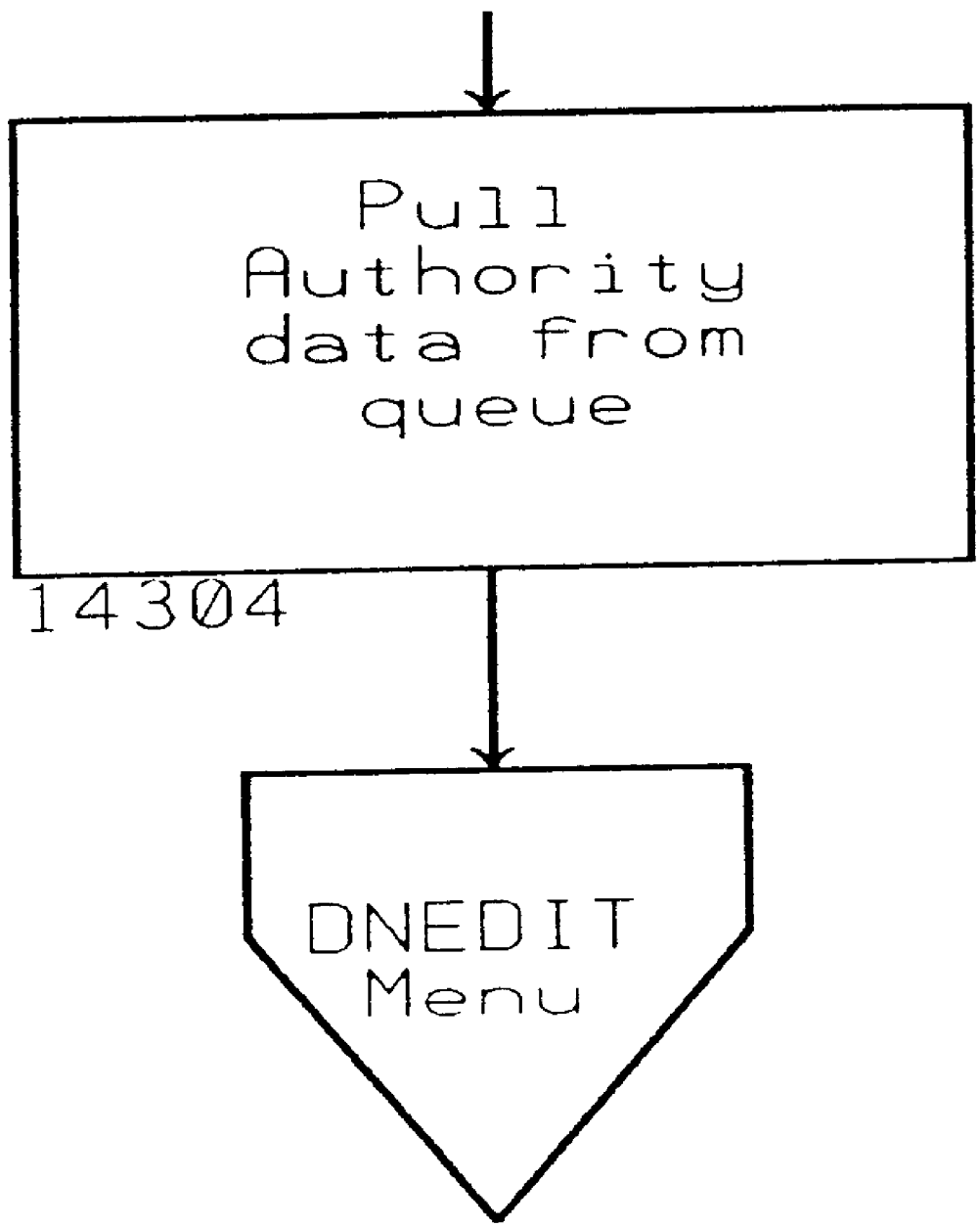
Figure 58A:
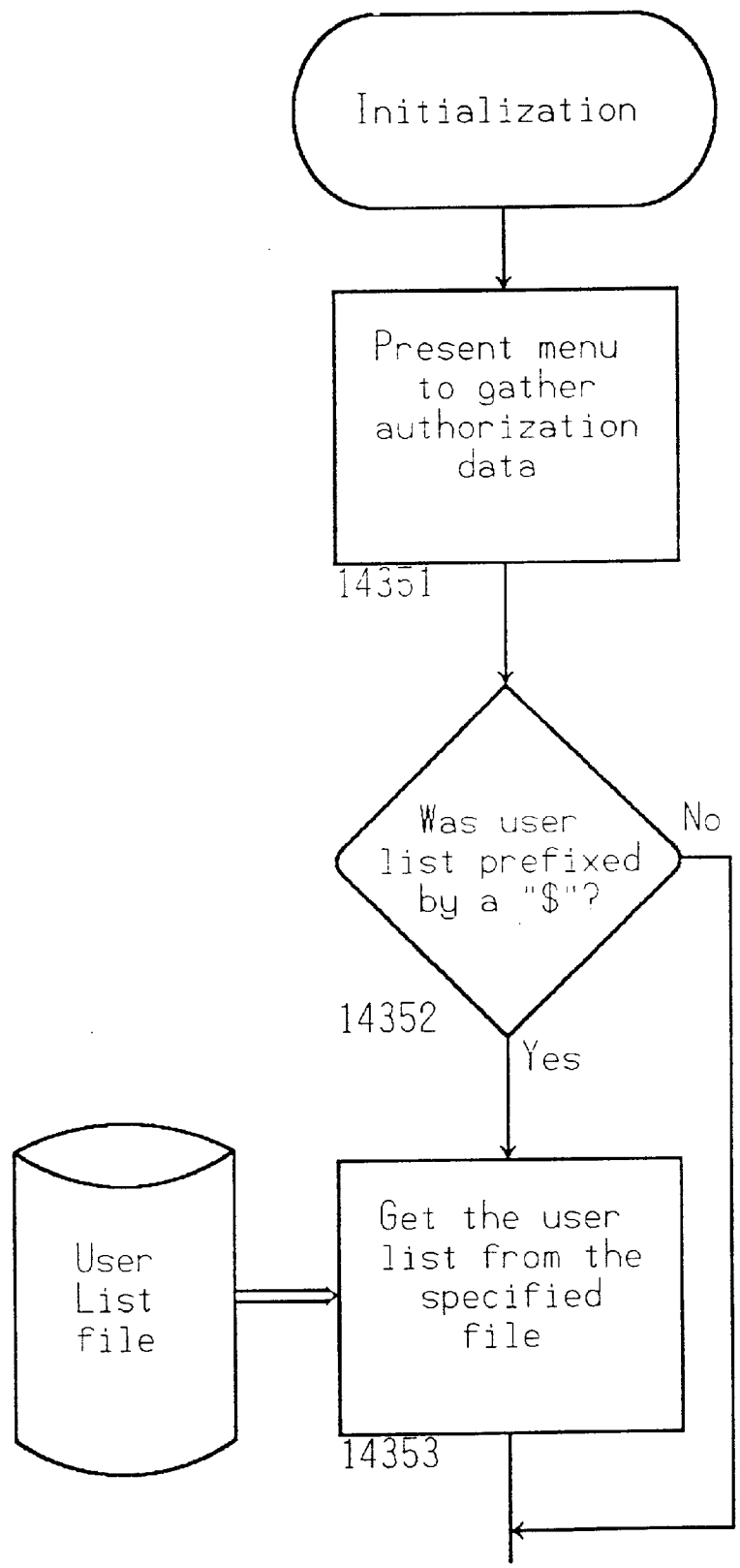
FIG. 58 which comprises FIG. 58a thru 59d, describes the DNAUTH Process.
Figure 58B:
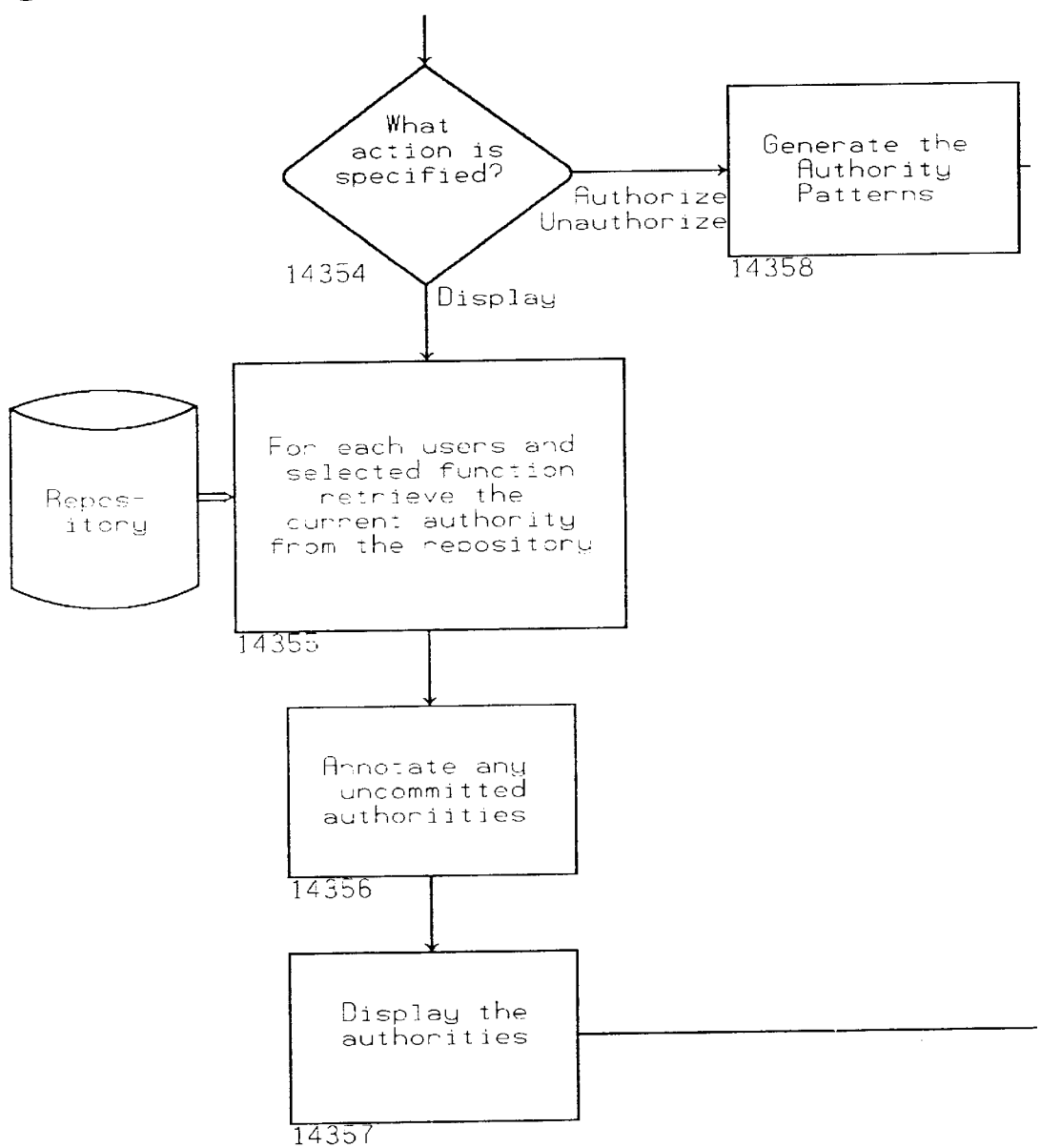
Figure 58C:
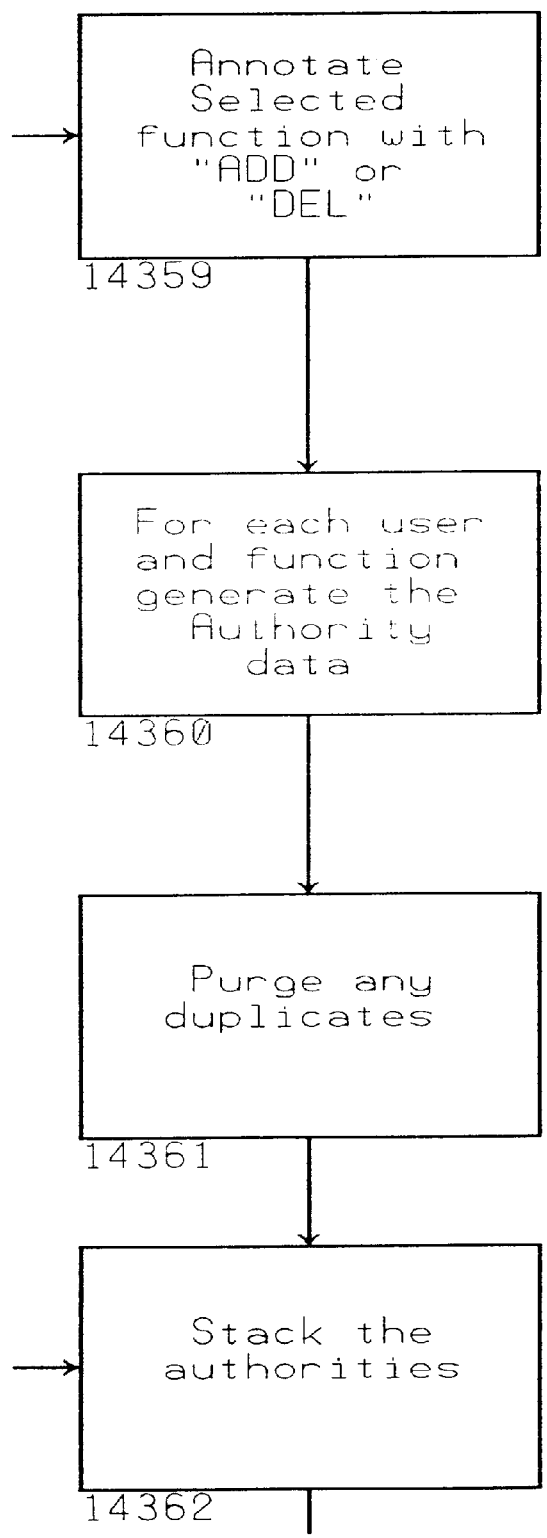
Figure 58D:
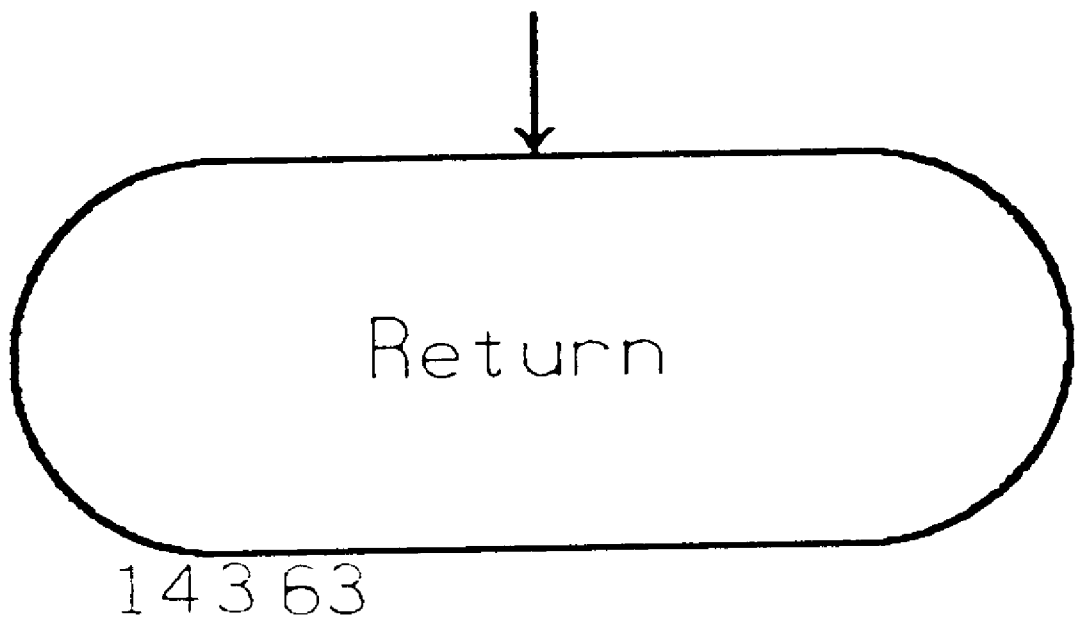
Figure 59:
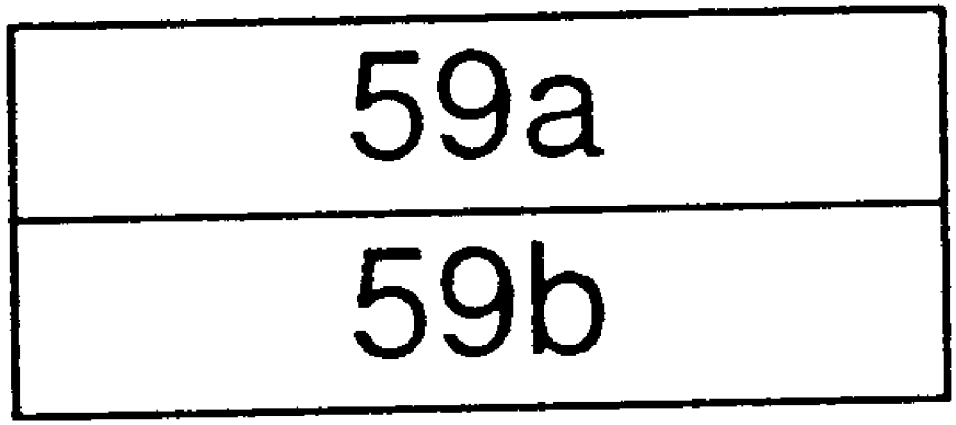
FIG. 59 which comprises FIG. 59a thru 59b, describes the DNEDIT4 Process.
Figure 59A:
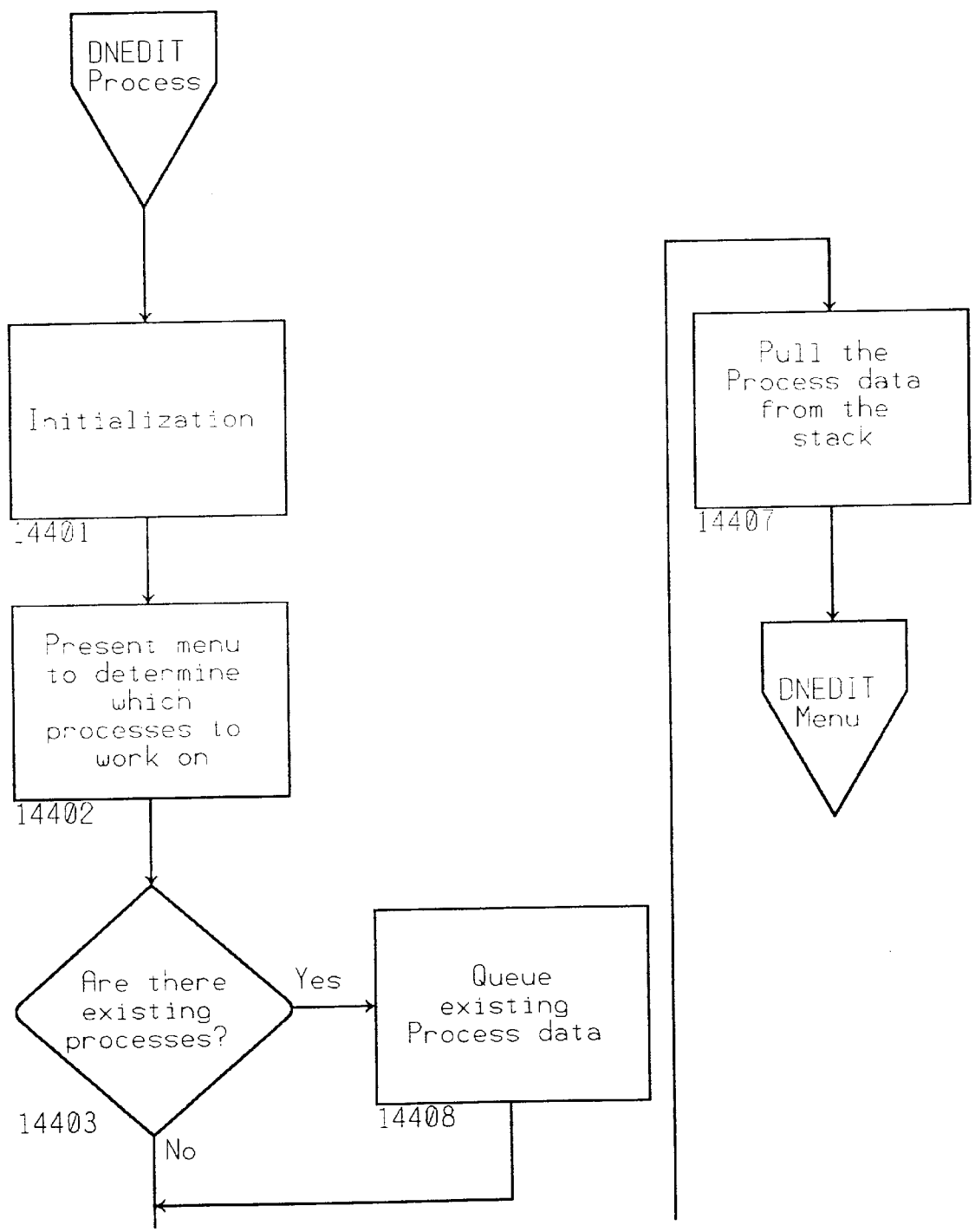
Figure 59B:
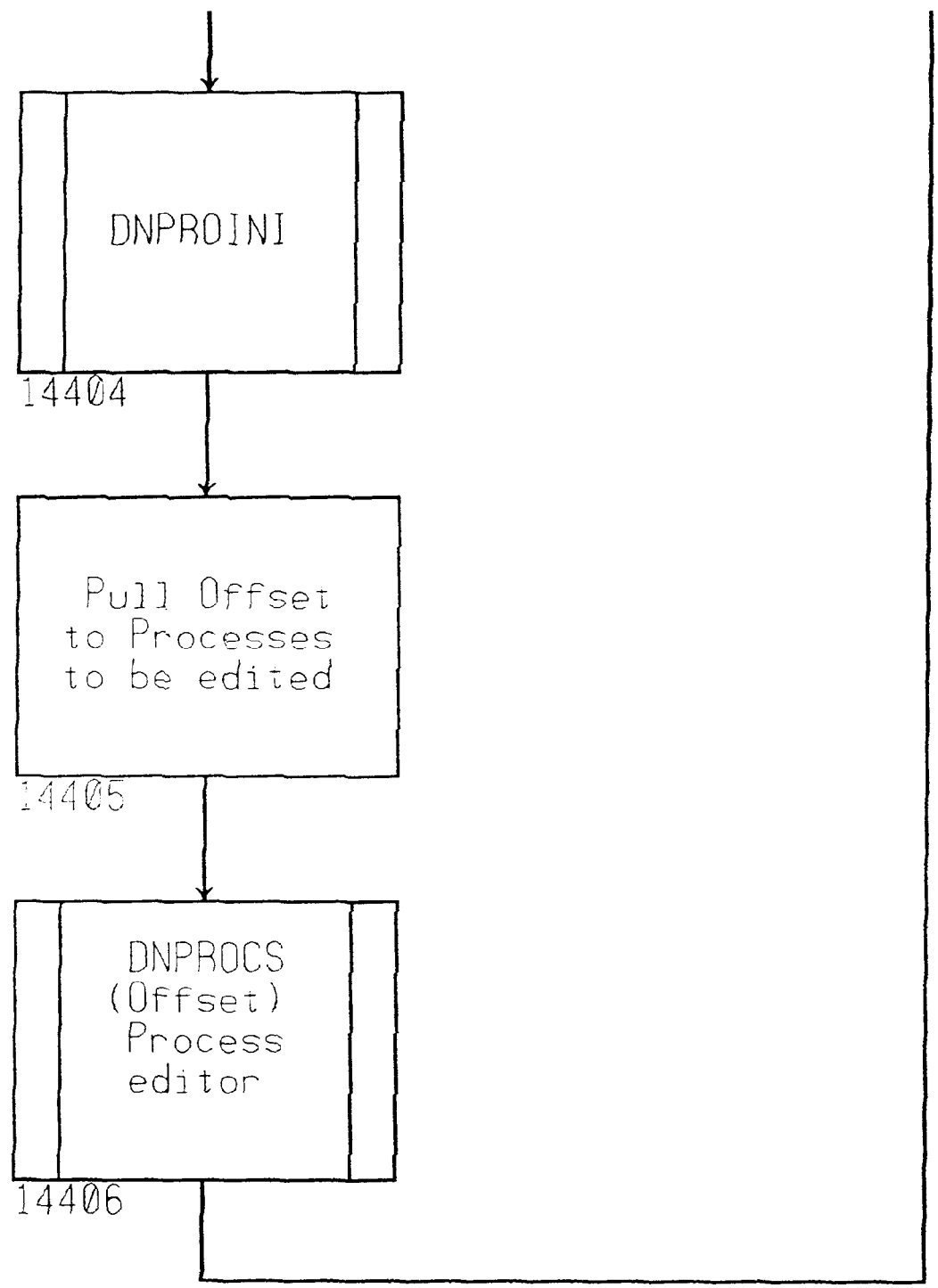
Figure 62:
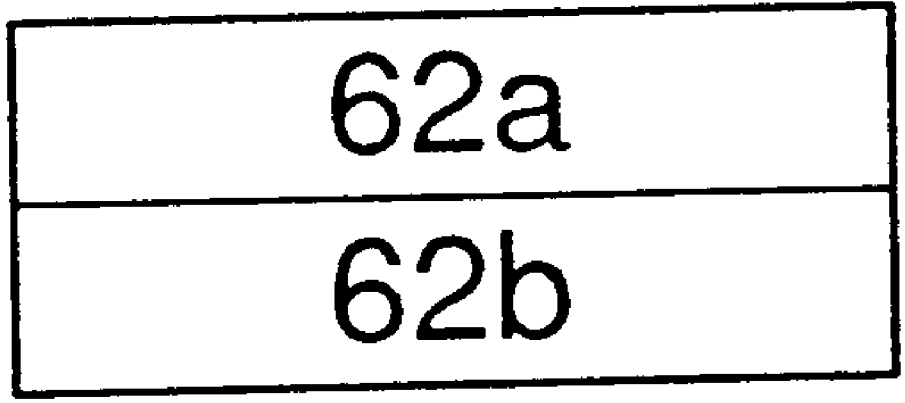
FIG. 62 which comprises FIG. 62a thru 62b, describes the DNEDIT5 Process.
Figure 62A:
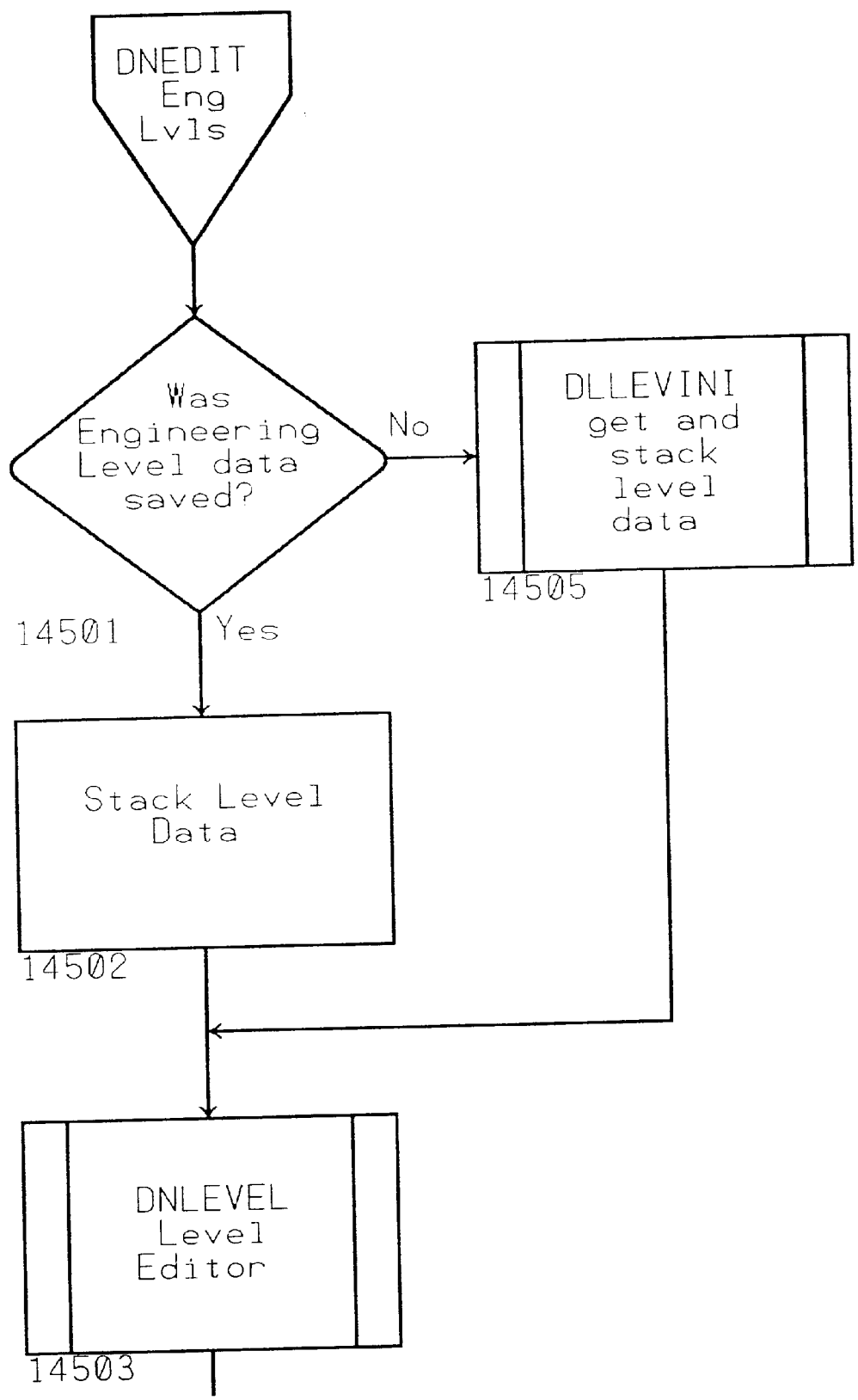
Figure 62B:
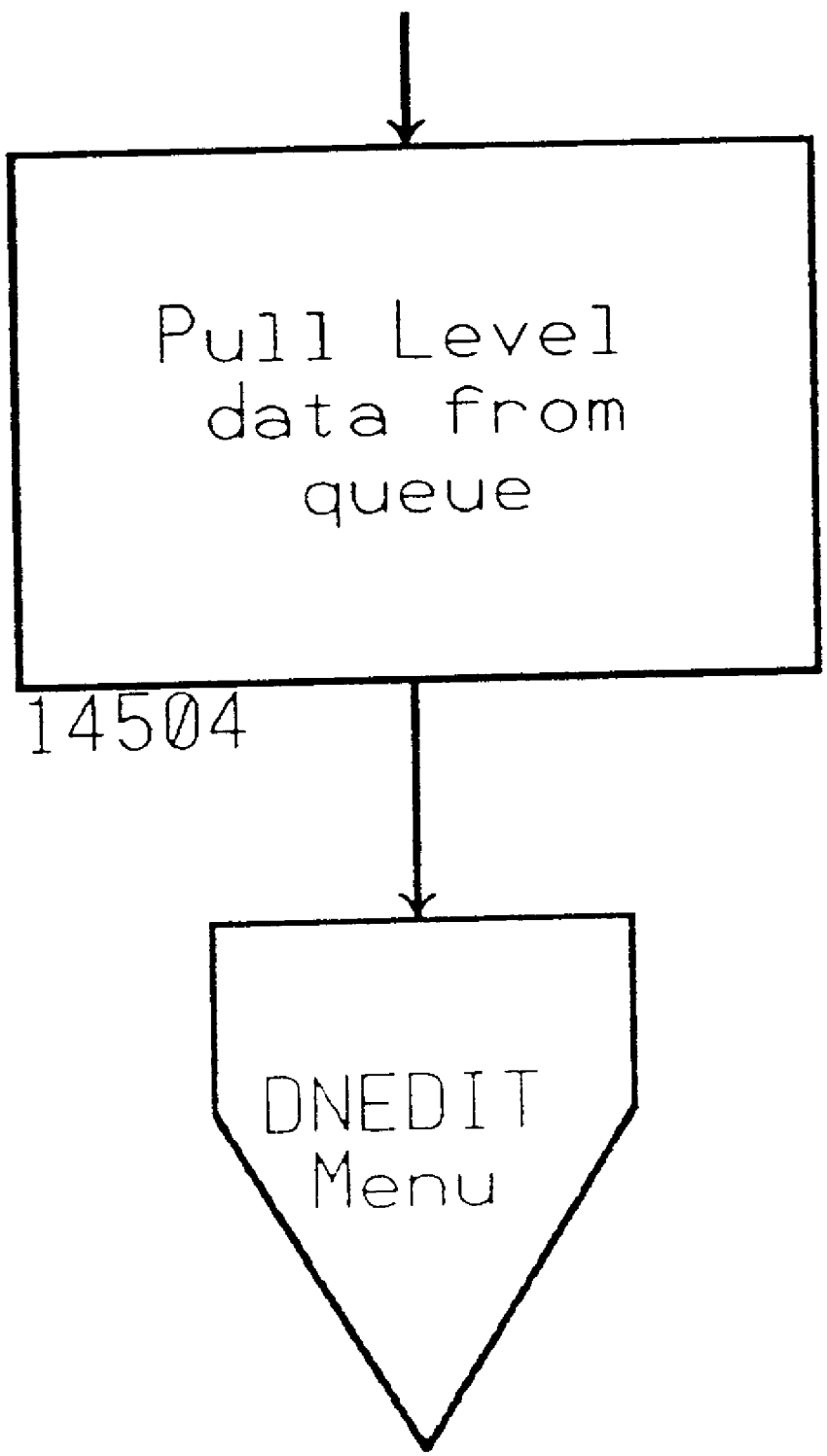
Figure 65A:
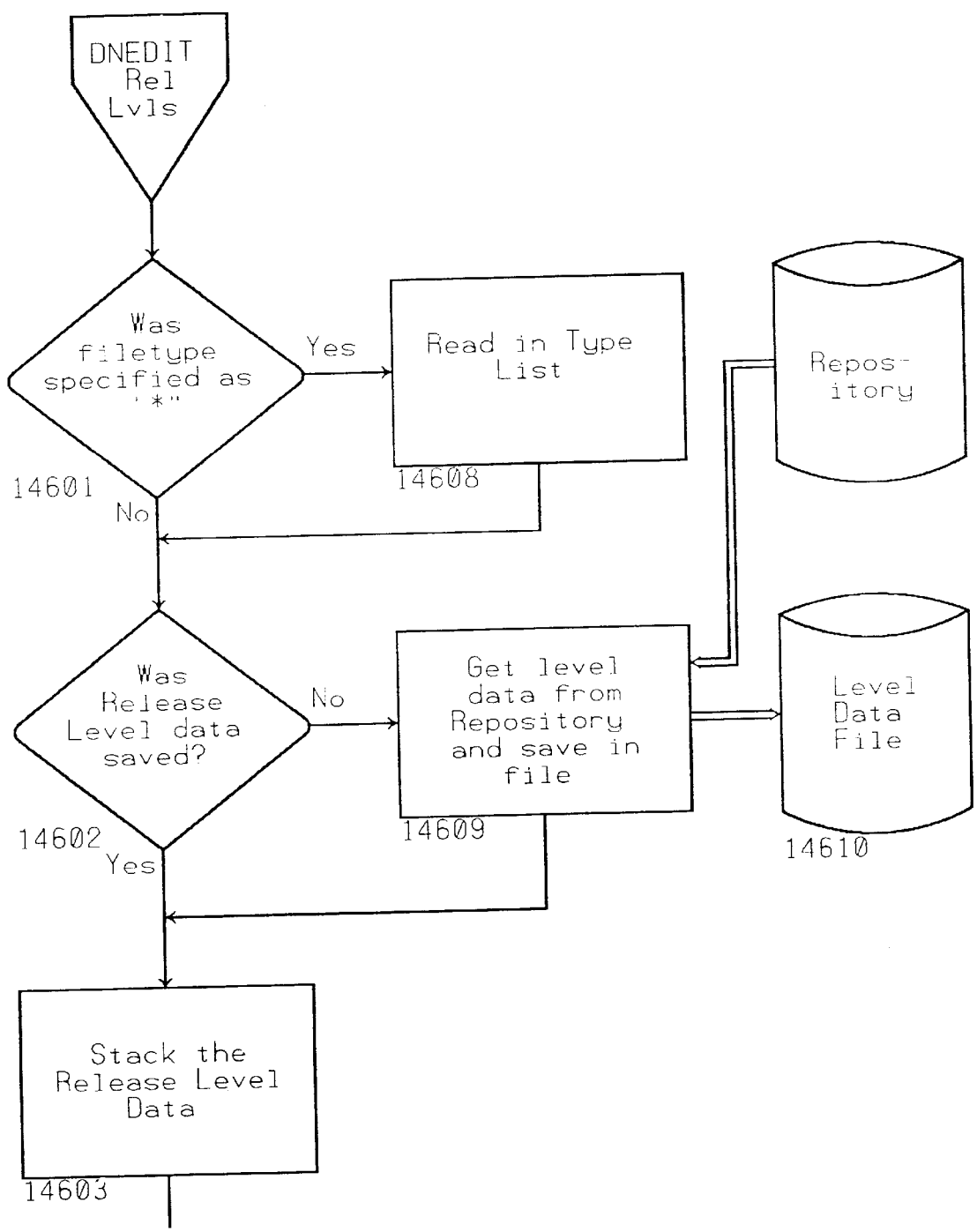
FIG. 65 which comprises FIG. 65a thru 65b, describes the DNEDIT6 Process.
Figure 65B:
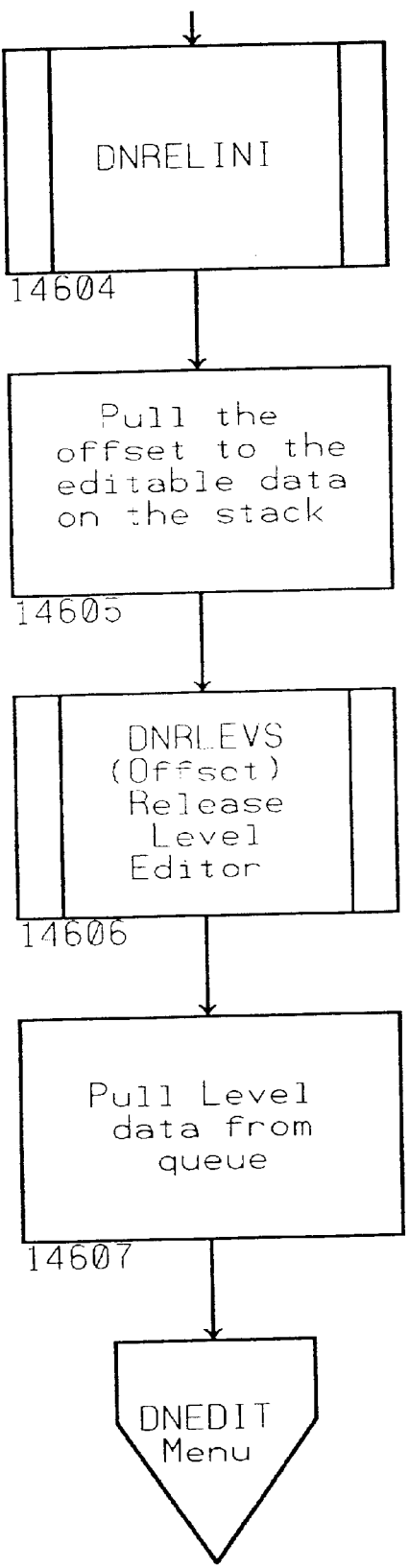
Figure 71:
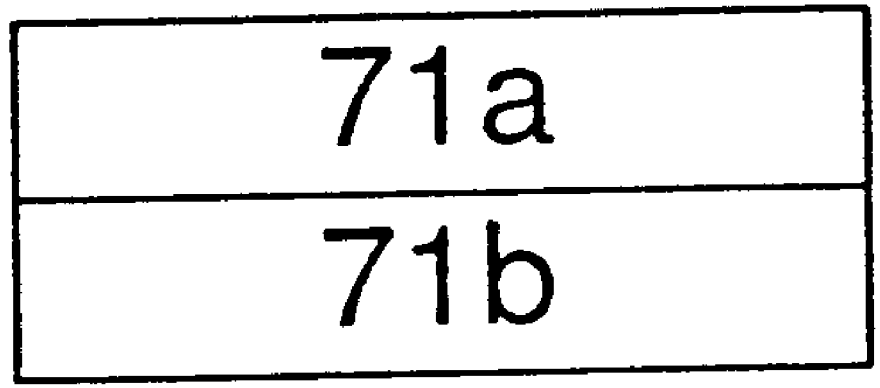
FIG. 71 which comprises FIG. 71a thru 71b, describes the DNEDIT7 Process.
Figure 71A:
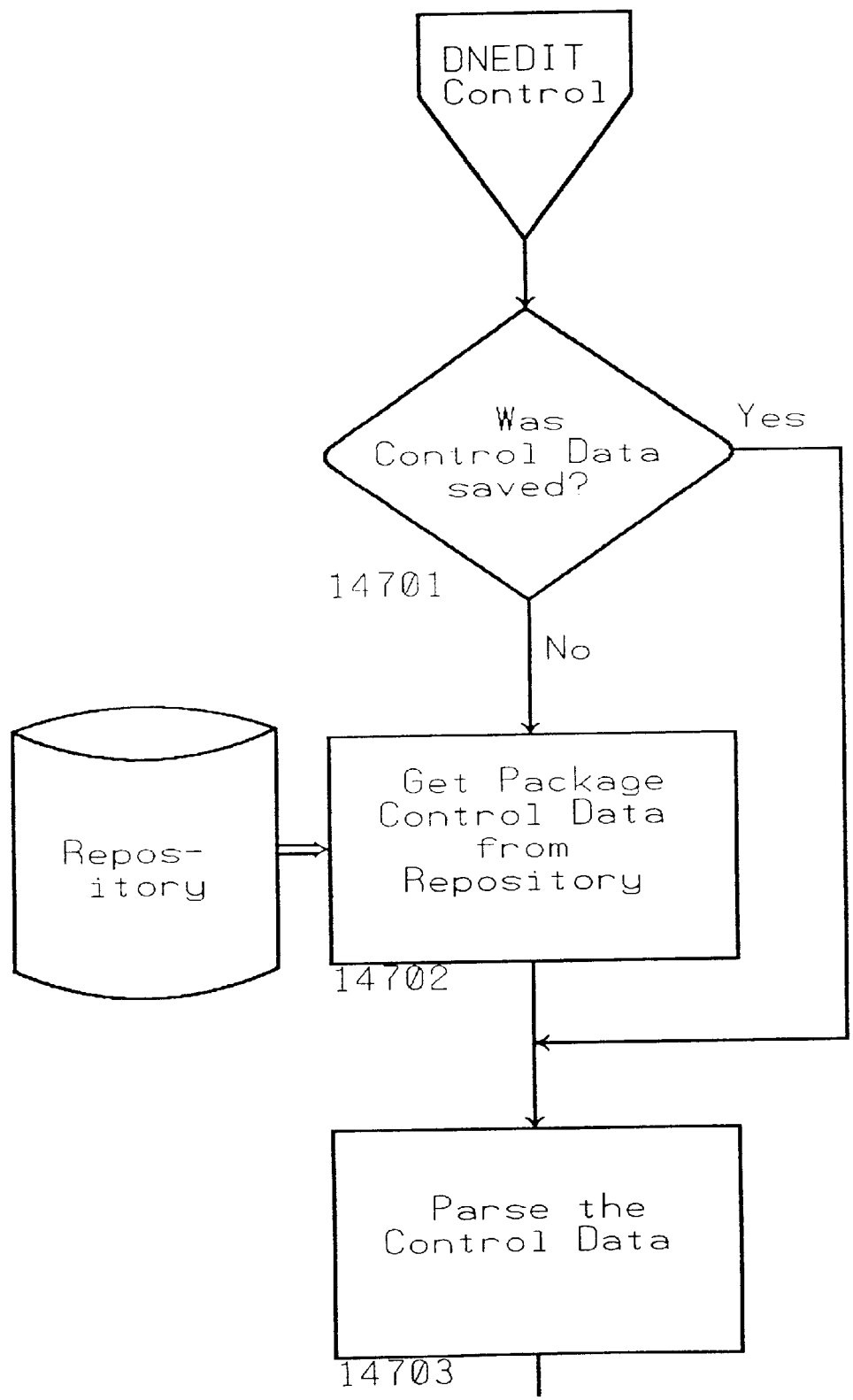
Figure 71B:
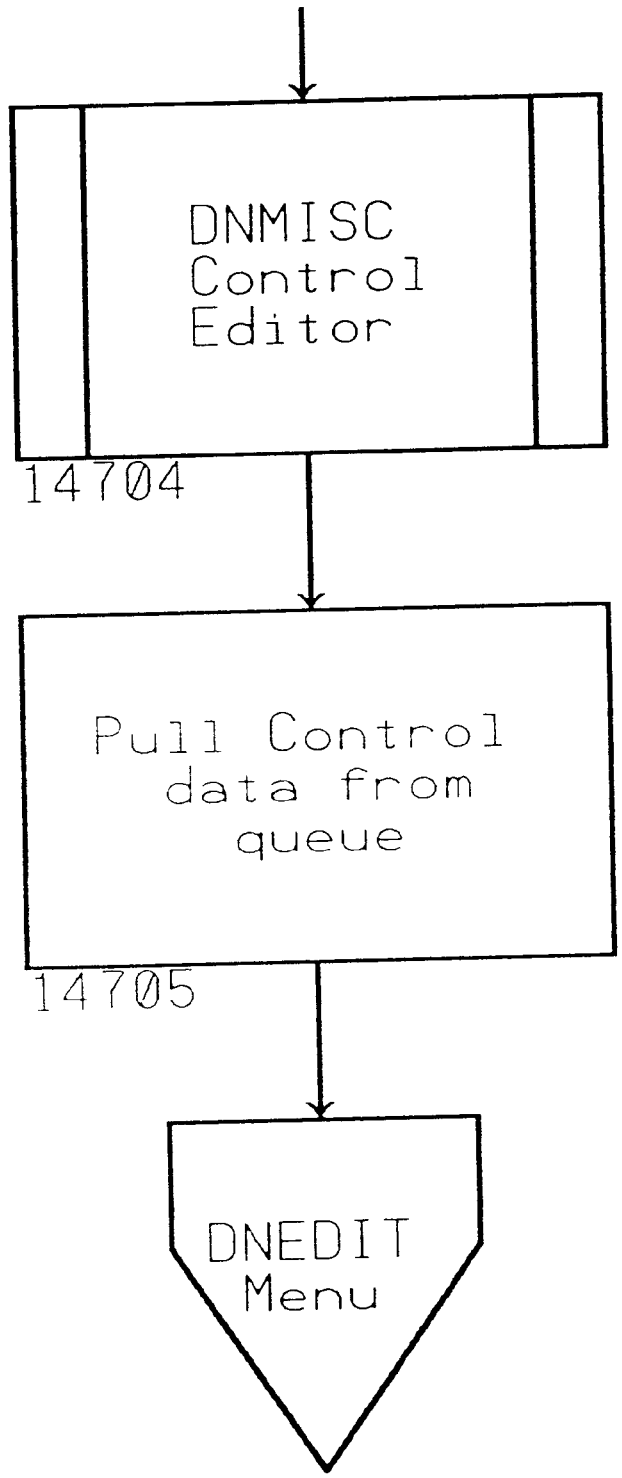
Figure 73:
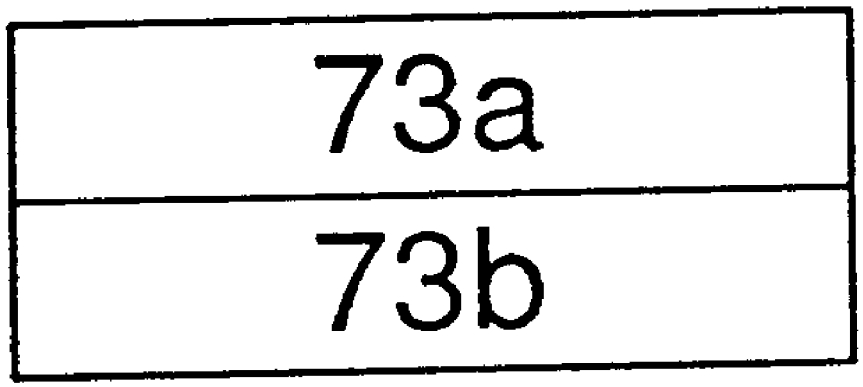
FIG. 73 which comprises FIG. 73a thru 73b, describes the DNEDIT8 Process.
Figure 73A:
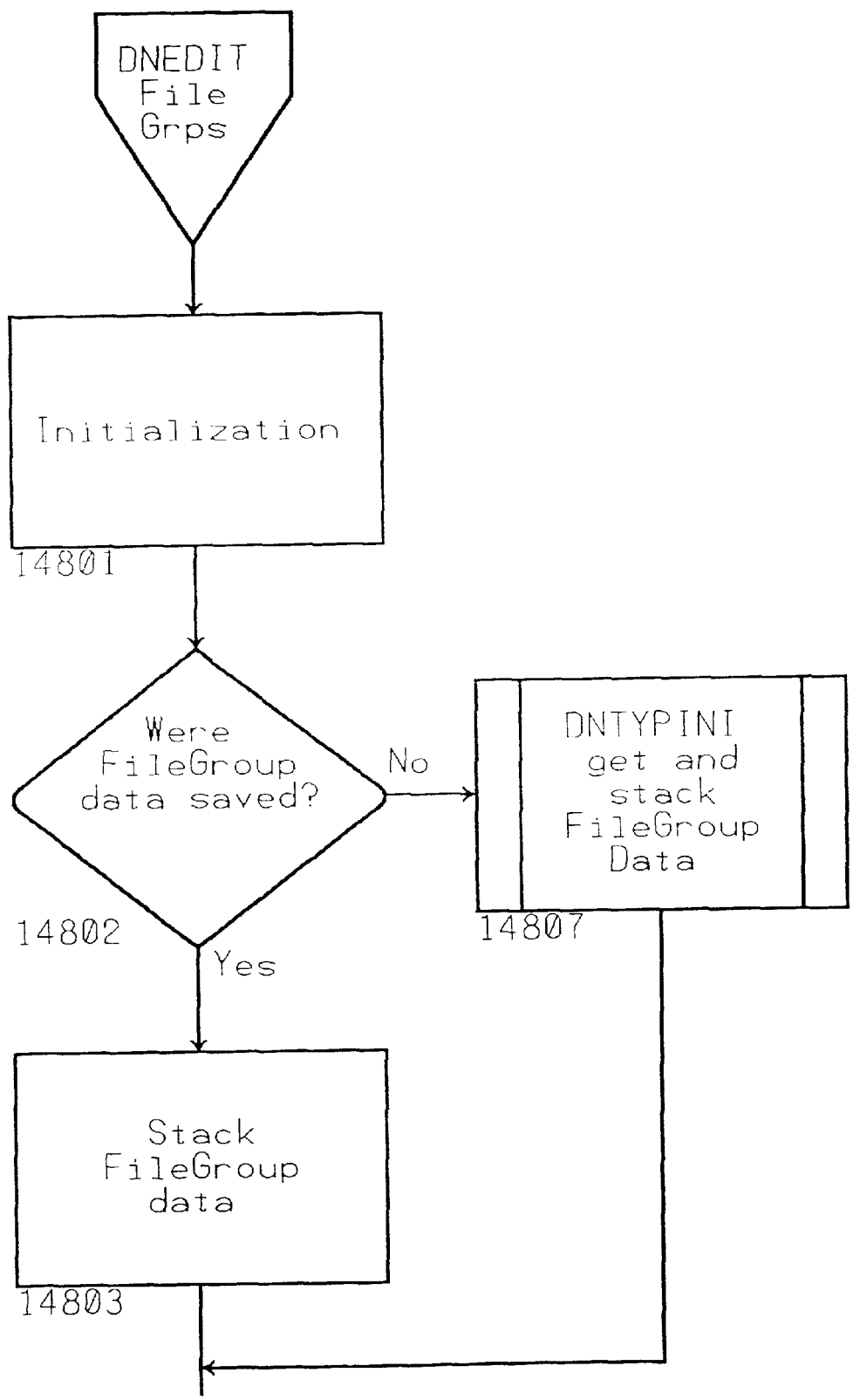
Figure 73B:
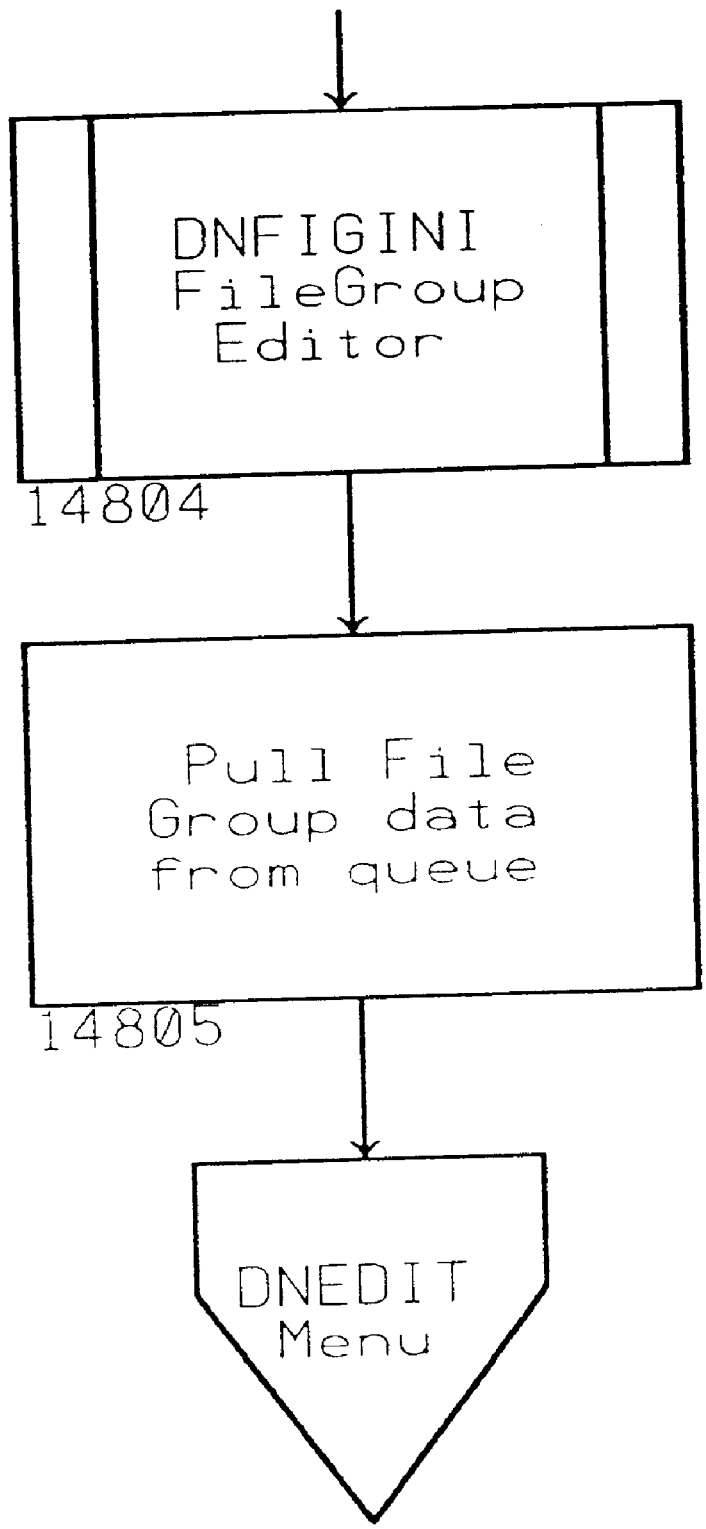

Depending on the user's choice the process will flow to:

Return 14023 to the DLPACMAN process present menu 10003 in FIG. 10000,

Editing Versions 14004 14014 described in DNEDIT1 FIG. 51,

Editing FileTypes 14005 14015 described in DNEDIT2 FIG. 54,

Editing Authorizations 14008 14018 described in DNEDIT3 FIG. 57,

Editing Process Configuration 14009 14019 described in DNEDIT4 FIG. 59,

Editing Engineering Levels 14006 14016 described :n DNEDIT5 FIG. 62,

Editing Release Levels 14010 140200 described in DNEDIT6 FIG. 65,

Editing Package Controls 14007 14017 described in DNEDIT7 FIG. 71,

Editing FileGroups 14011 14021 described in DNEDIT8 FIG. 73,

Upon completion of any of these processes the DNEDIT menu 14002 will be re-presented at which time the invoker may select another path or return 14022 to the DLPACMAN Present Main menu 10003 in FIG. 10000.

The DNEDIT1 Process FIG. 51. A check is made to see if Version definitions were saved in local storage 14101. If yes, the Version data will be stacked 14102. If not, the DLVERINI process described in FIG. 52 will be invoked. Next 14103 the DNVERS process described in FIG. 53 is invoked.

Upon return from that process the updated Version data is pulled from the queue to update the data in local storage 14104. The process will then flow back to the DNEDIT present menu 14002 in FIG. 50.

Figure 52:
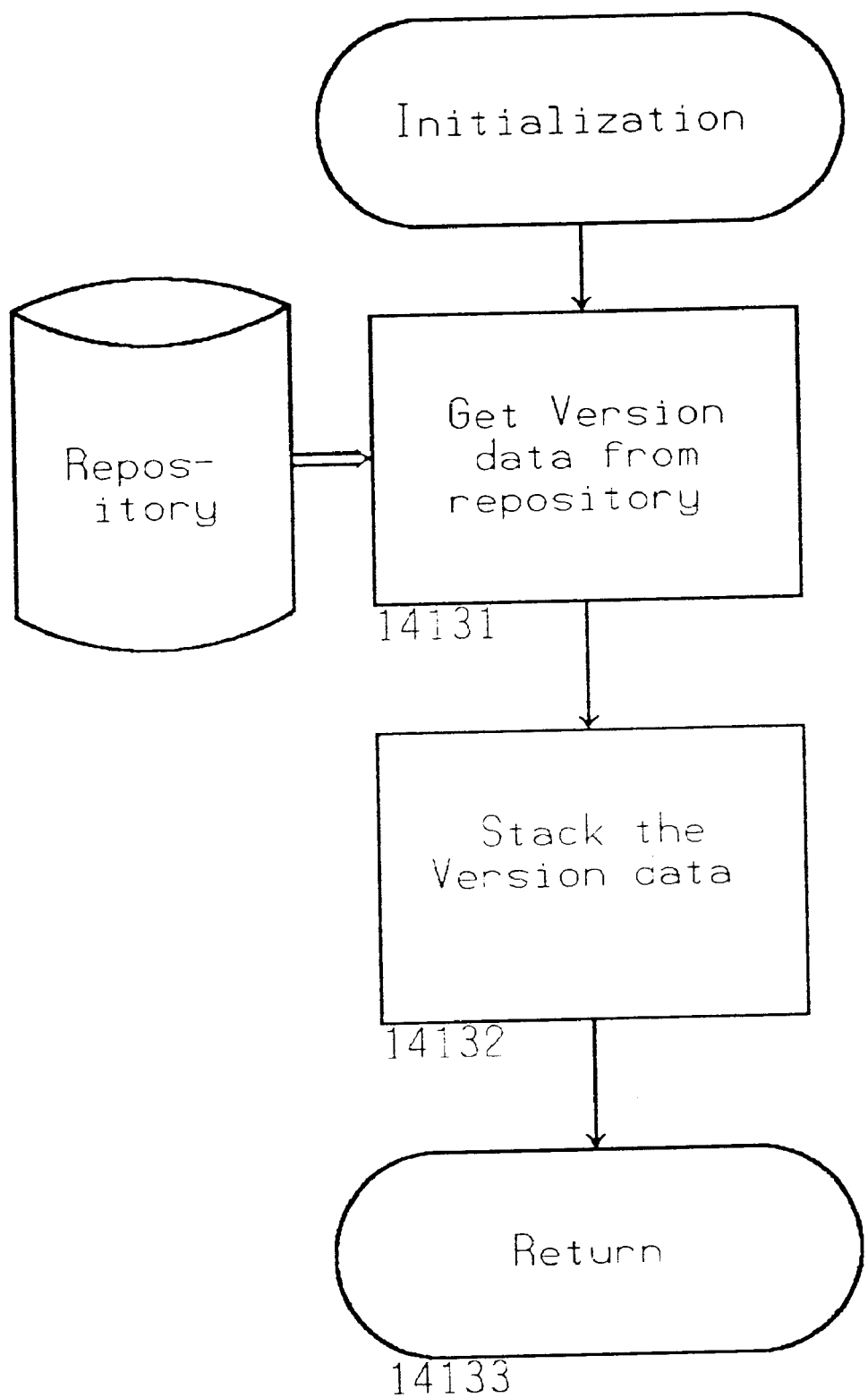
FIG. 52 describes the DNVERINI Process.

The DNVERINI Process FIG. 52: After initialization, the existing Version data is retrieved 14131 from the repository and stacked 140132. The process then returns 14033 to the DNEDIT1 Process at 14103 in FIG. 51.

Figure 53:
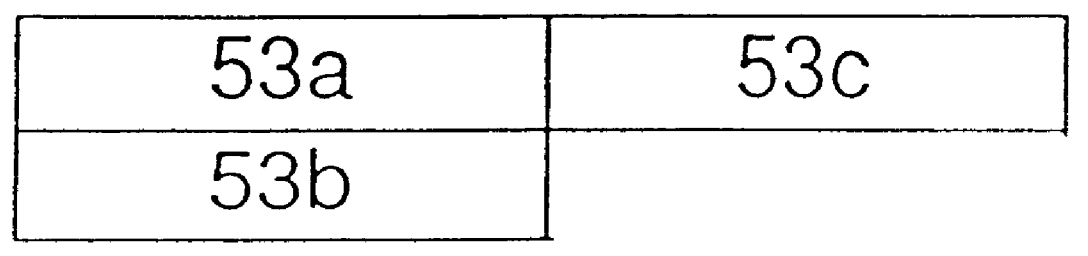
Figure 53A:
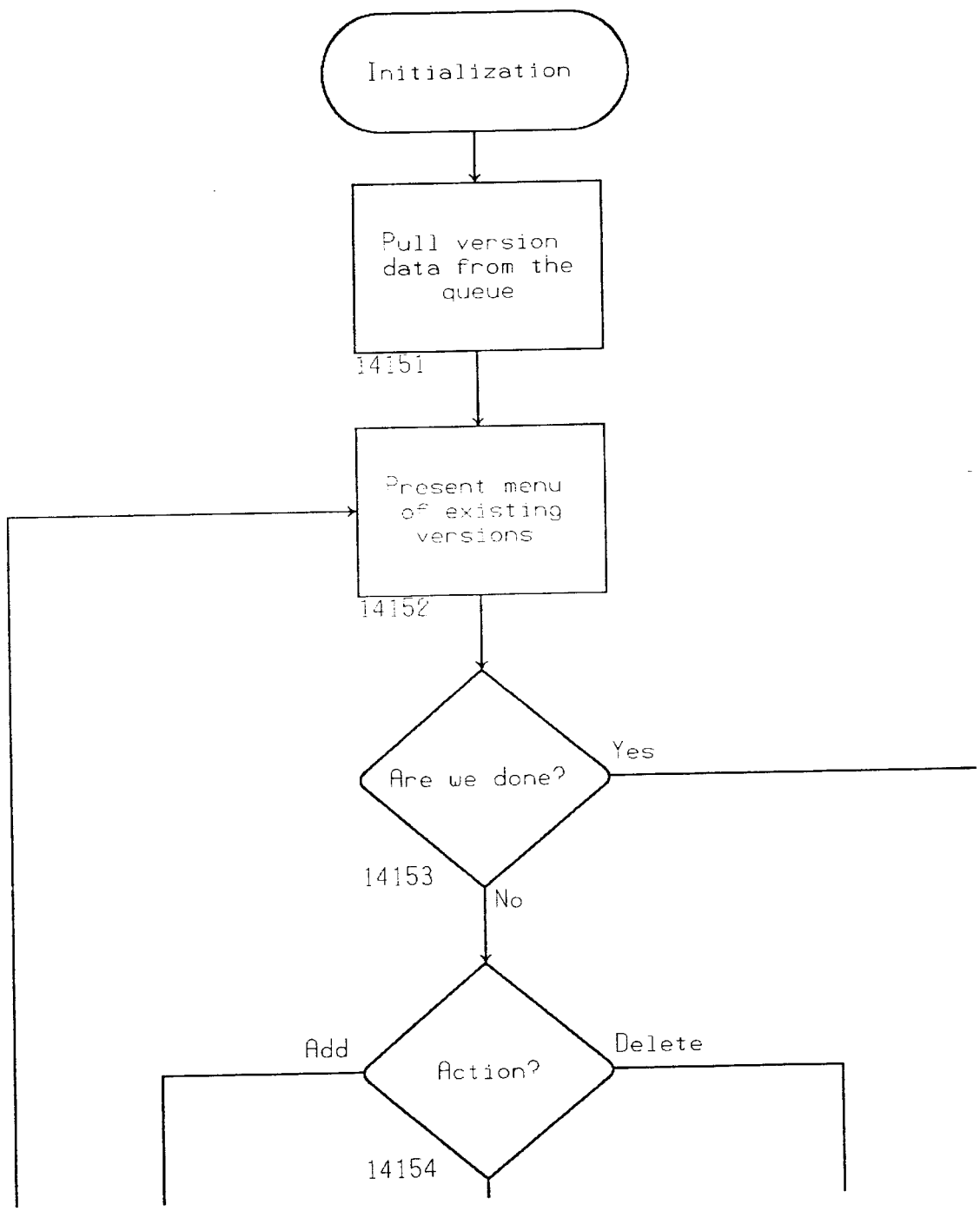
FIG. 53 which comprises FIGS. 53a thru 53c, describes the DNVERS Process.
Figure 53B:
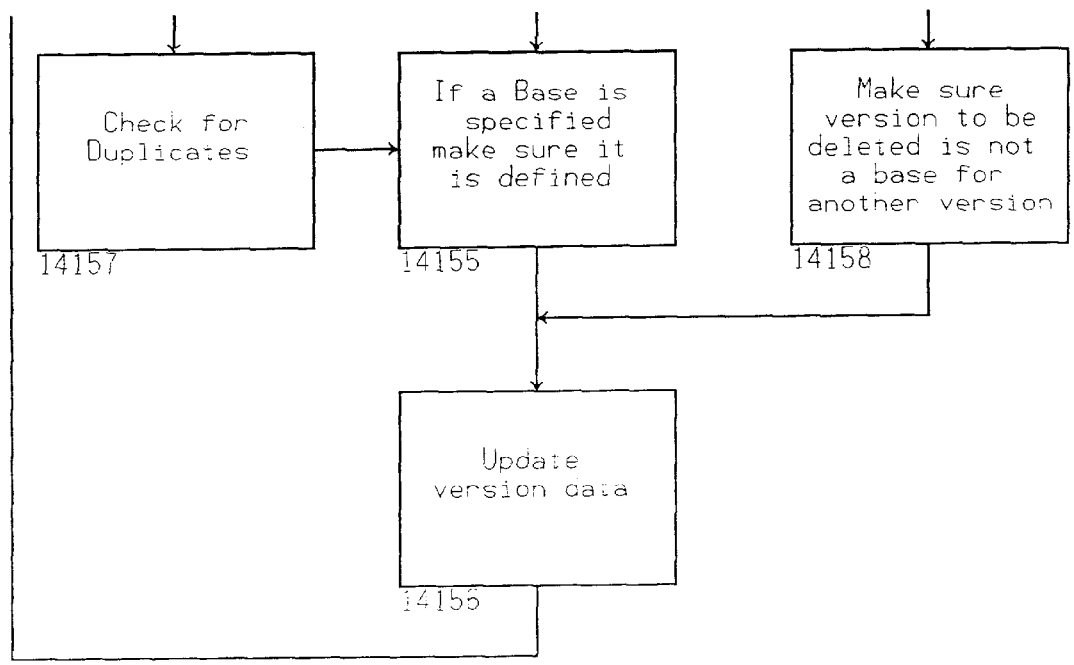
Figure 53C:
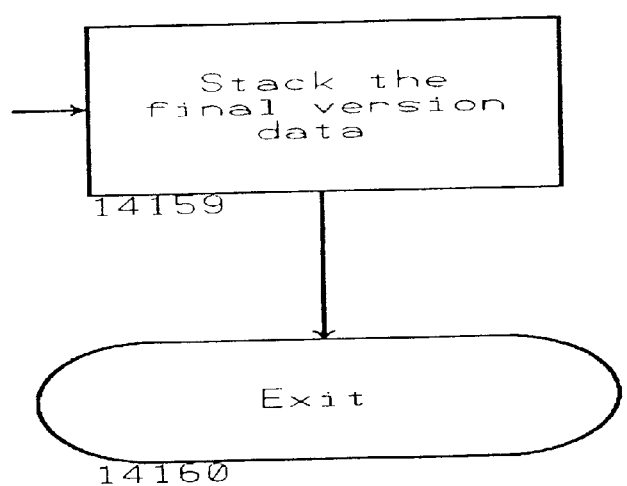

The DNVERS Process FIG. 53: After initialization, the work requests are pulled from the queue 14151 and a menu of the existing Versions is presented to the invoker 14152 who will add or delete Versions or indicate that this operation is complete.

Upon return from the menu a check is made to see if the operation is complete 14153. If so, the final Version data is stacked 14159 and the process will return 14160 to the DNEDIT1 process 14103 in FIG. 51. If not, a check is made 14154 to determine if the requested action is an Add, Delete or Modify Base. If the action is an Add, a check 14157 is made to make sure there are no duplicate Versions to be added. a further check 14155 is made to insure that any base Versions are already defined. If the action is an Modify Base, a check 14155 is made to insure that any base Versions are already defined. If the action is all Delete, a check 14158 is made to insure that the Version to be deleted is not a base for some other version.

In any case after the above checks are made the Version data in local storage is updated 14156 and the existing version menu 14152 is represented.

Figure 56:
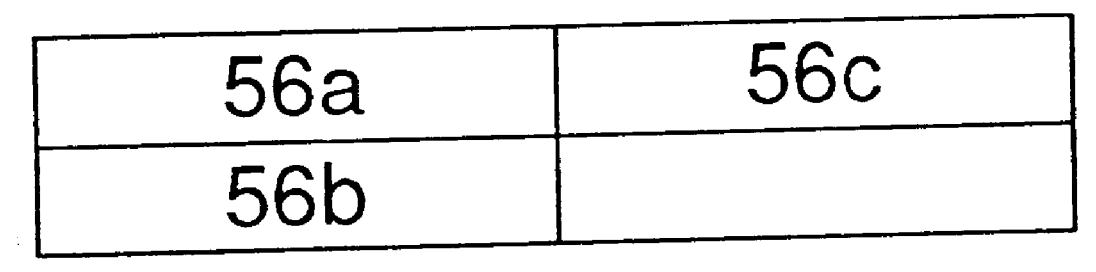
Figure 56A:
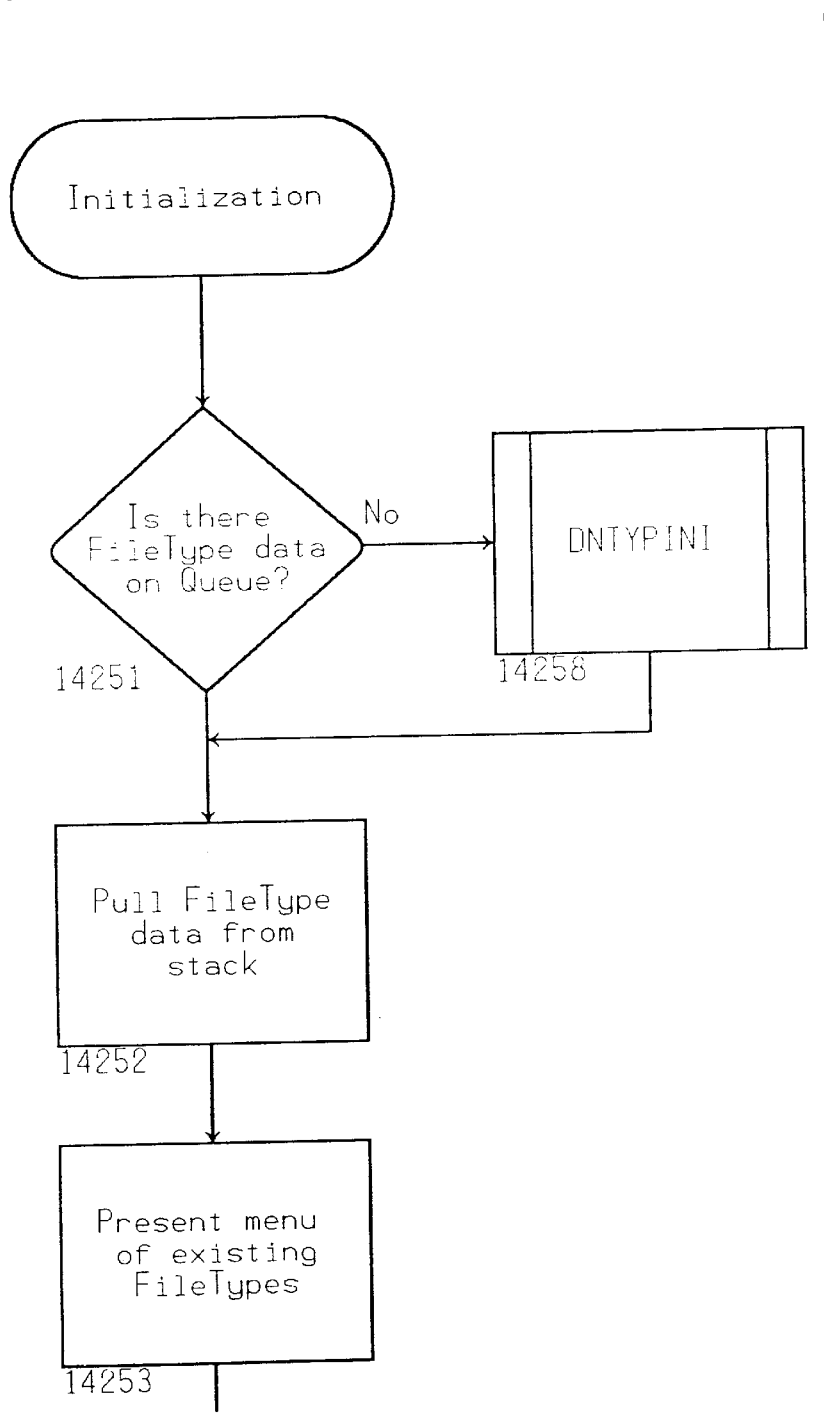
FIG. 56 which comprises FIG. 56a thru 56c, describes the DNTYPE Process.
Figure 56B:
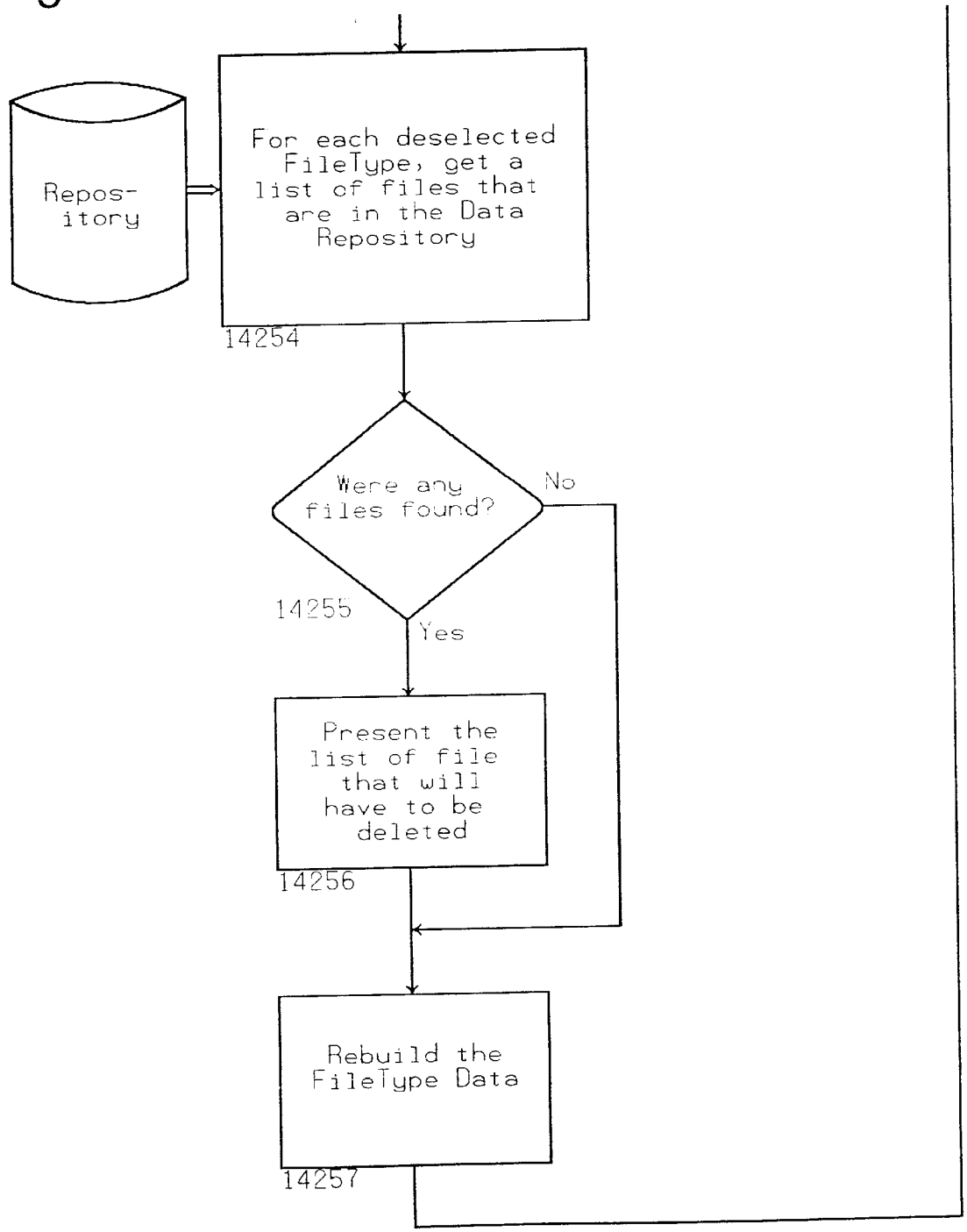
Figure 56C:
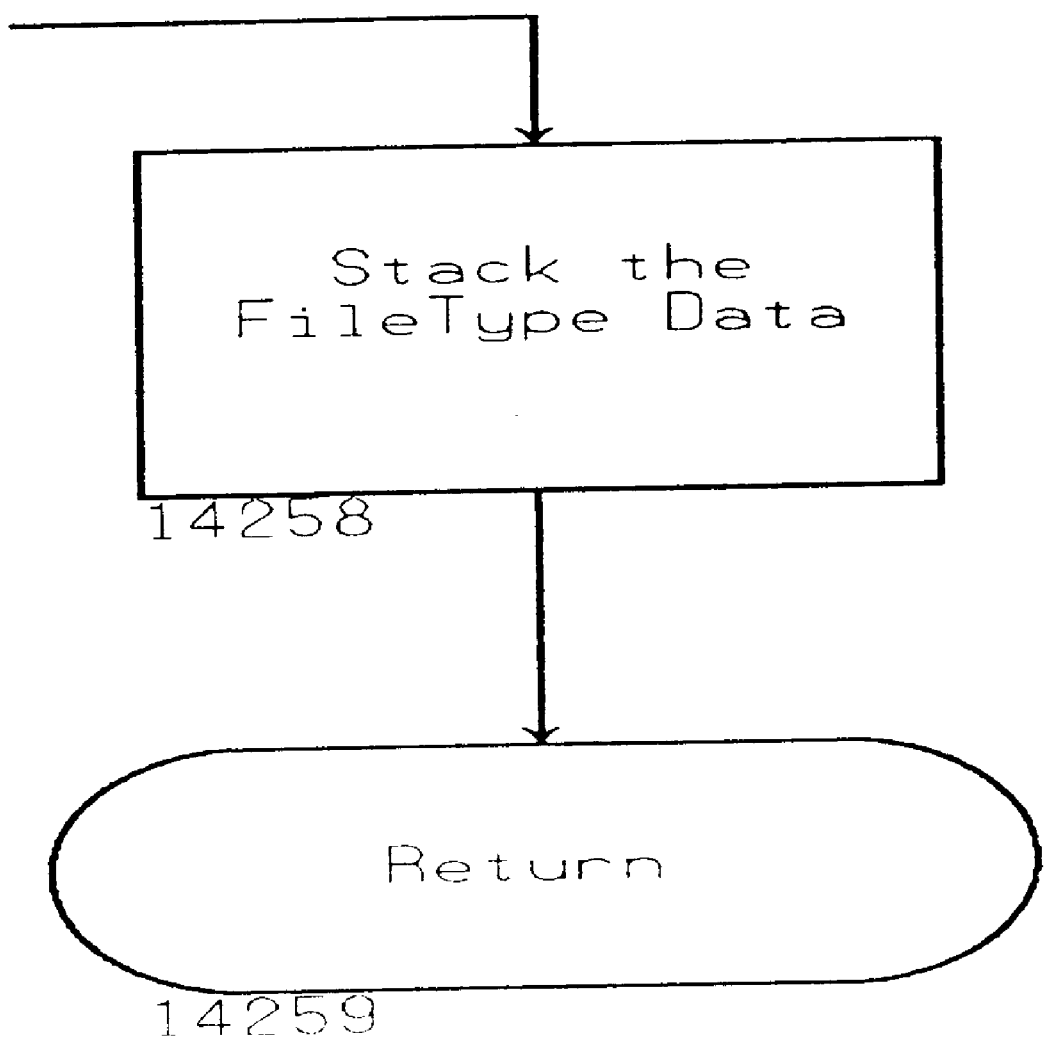

The DNEDIT2 Process FIG. 54: A check is made to see if FileType definitions were saved in local storage 14201. If yes, the FileType data will be stacked 14202. Next the DNTYPE process described in FIG. 56 is invoked 14103.

Upon return from that process the updated FileType data is pulled from the queue to update the data in local storage 14104. The process will then flow back to the DNEDIT present menu 14002 in FIG. 50.

Figure 55A:
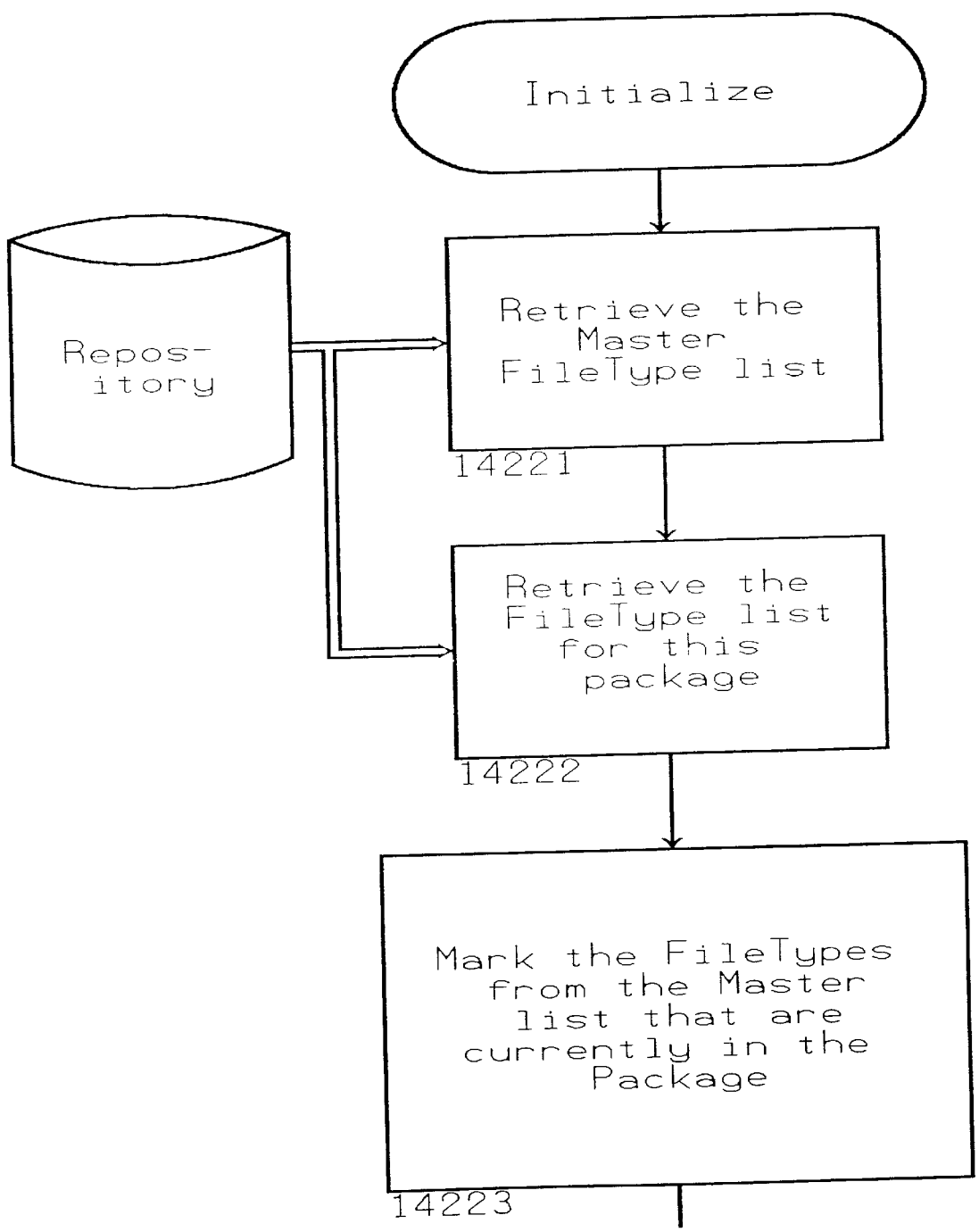
FIG. 55 which comprises FIGS. 55a thru 55b, describes the DNTYPINI Process.
Figure 55B:
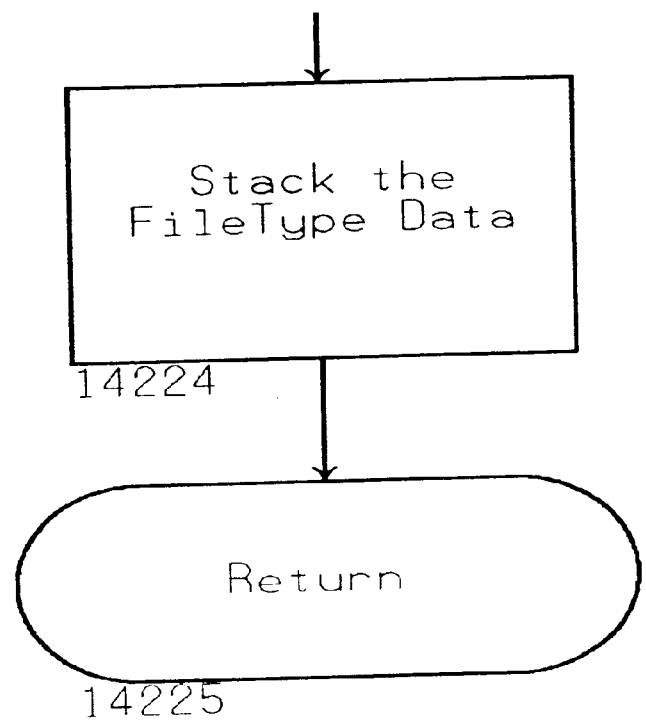

The DNTYPINI Process FIG. 55: After initialization, the Master FileType list is retrieved 14221 from the repository. Next the existing FileType data is retrieved 14222 from the repository. Then the local copy of the Master FileType is annotated 14223 to indicate which Filetype are currently defined.

The annotated FileType data is then stacked 14224. The process then returns 14225 to the DNEDIT2 Process at 14203 in FIG. 54.

The DNTYPE Process FIG. 56: After initialization, a check 14251 is made to determine if there is any FileType data on the queue. If not, the DNTYPINI process described in FIG. 55 will be invoked 14258. The FileType data then is pulled from the stack and placed in local storage 14252. Next, the menu of existing FileTypes is presented for possible change 14253. Now, for each FileType selected to be deleted, retrieve from the repository a list of files of that type that exist in the data repository 14254. A check 14255 is made to determine if any such files have been retrieved If there are files, present a list of file that the invoker must delete before proceeding and deselect the associated File-Types 14256. Then, rebuild the local storage copy of the FileType data to reflect the accepted changes above 14257. Stack the FileType data 14258 and return 14259 to the DNEDIT2 process at 14203 in FIG. 54.

The DNEDIT3 Process FIG. 57: A check is made to see if Authority data was saved in local storage 14301. If yes, the Authority data will be stacked 14302. Next the DNAUTH process described in FIG. 58 is invoked 14303.

Upon return from that process the updated Authority data is pulled from the queue to update the data in local storage 14304. The process will then flow back to the DNEDIT present menu 14002 in FIG. 50.

The DNAUTH Process FIG. 58: After initialization, a menu is presented to gather authorization data 14351. A check is made to determine if the user list contains the file flag "$" 14352. If so, then the user list is retrieved from the indicated file 14353. Next the menu data is check to determine what action was selected by the invoker 14354.

If the action was Display, then for each user in the user list the current authorities are retrieved form the repository 14355. Next any uncommitted authorities are annotated 13456 and then displayed 14357.

If the action was Authorize or Unauthorize, the resulting authority pattern are generated 14358. The authorities are annotated with ADD or DEL as appropriate. Then, for each user in the list generate the appropriate authority data 14360. Next, any resultant duplicate authorities are purged 14362.

In any case, the resultant Authority data is stacked 14362 and the process will return 14363 to the DNEDIT3 process in FIG. 57 at 14303.

The DNEDIT4 Process FIG. 59: After initialization 14401, a menu is presented to determine which process is to be worked on 14402. A check is then made to determine whether there are existing processes 14403. If so, the Process Data is placed on the stack 14408. Next the DNPROINI process described in FIG. 60 is invoked.

Figure 61:
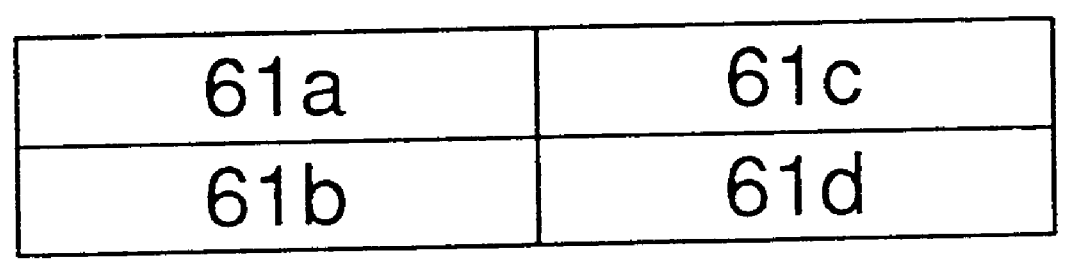

Upon return from that process the offset the process to be edited is pulled from the stack 14405 and passed to the DNPROCS process 14406 which is described in FIG. 61. Upon return from that process the Process data is pulled from the queue to update the data in local storage 14407. The process will then flow back to the DNEDIT present menu 14002 in FIG. 50.

Figure 60:
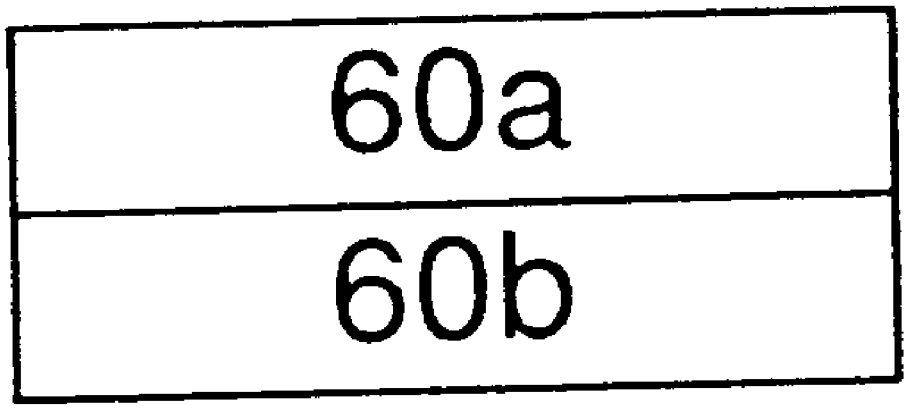
FIG. 60 which comprises FIG. 60a thru 60b, describes the DNPROINI Process.
Figure 60A:
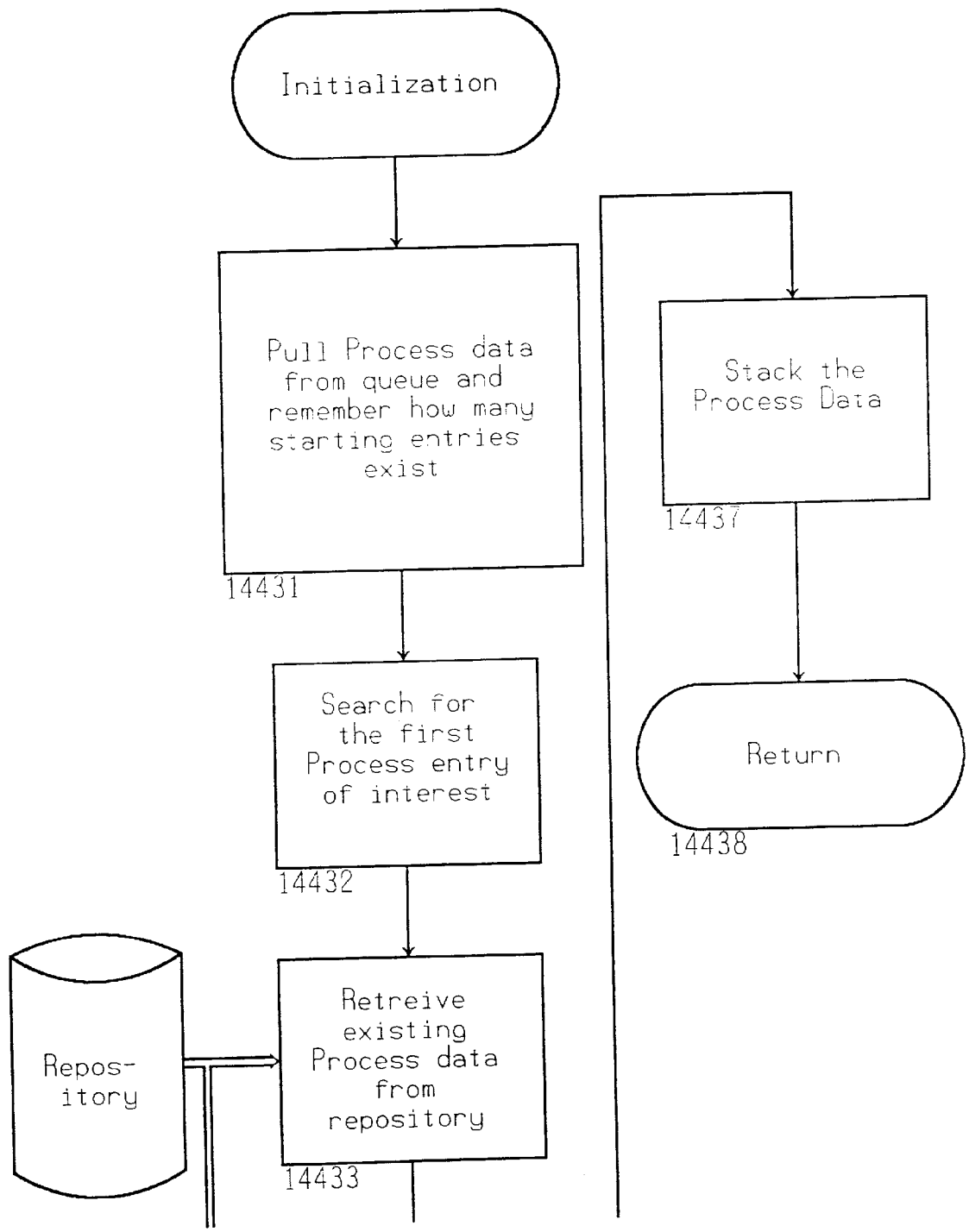
Figure 60B:
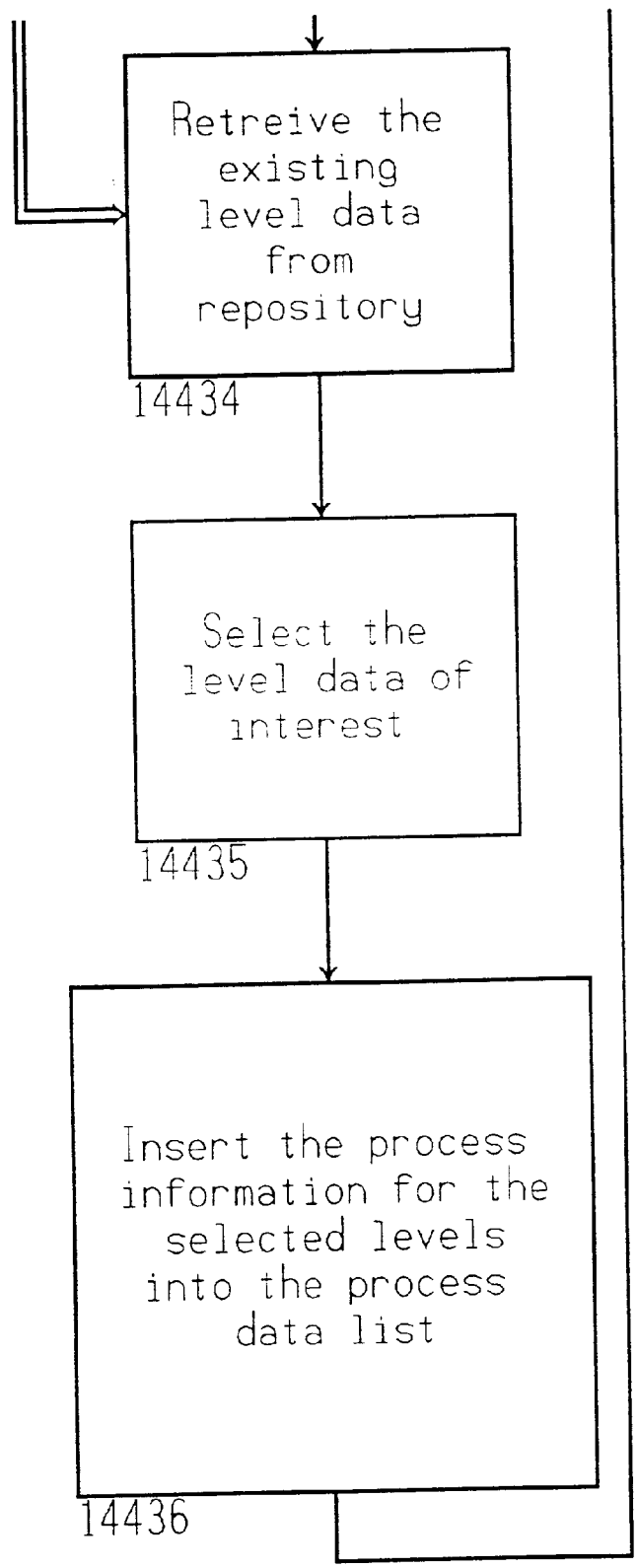
Figure 61A:
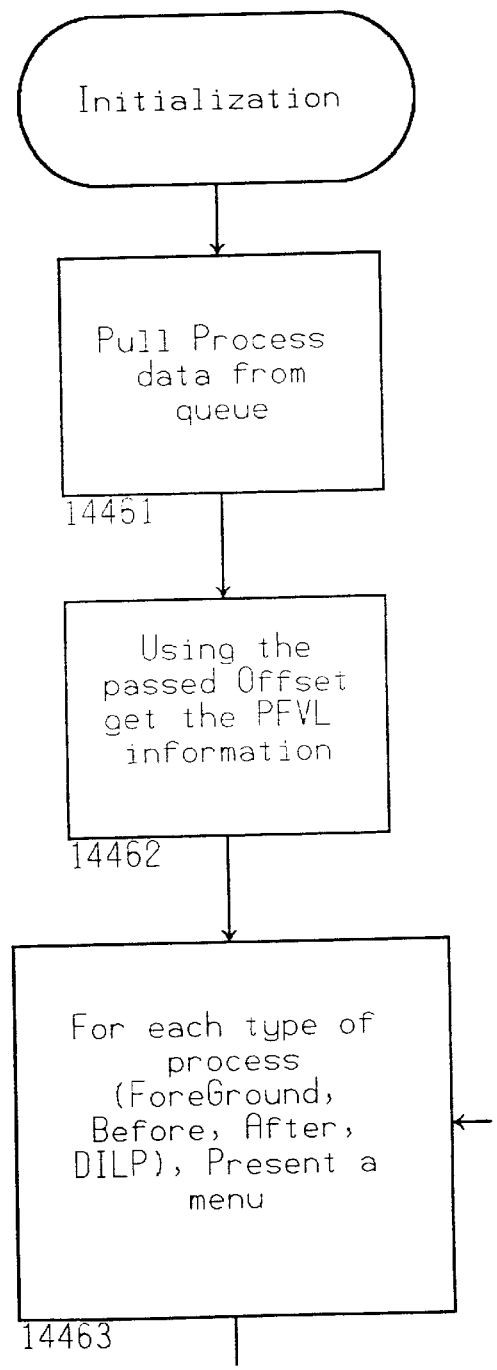
FIG. 61 which comprises FIG. 61a thru 61d, describes the DNPROCS Process.
Figure 61B:
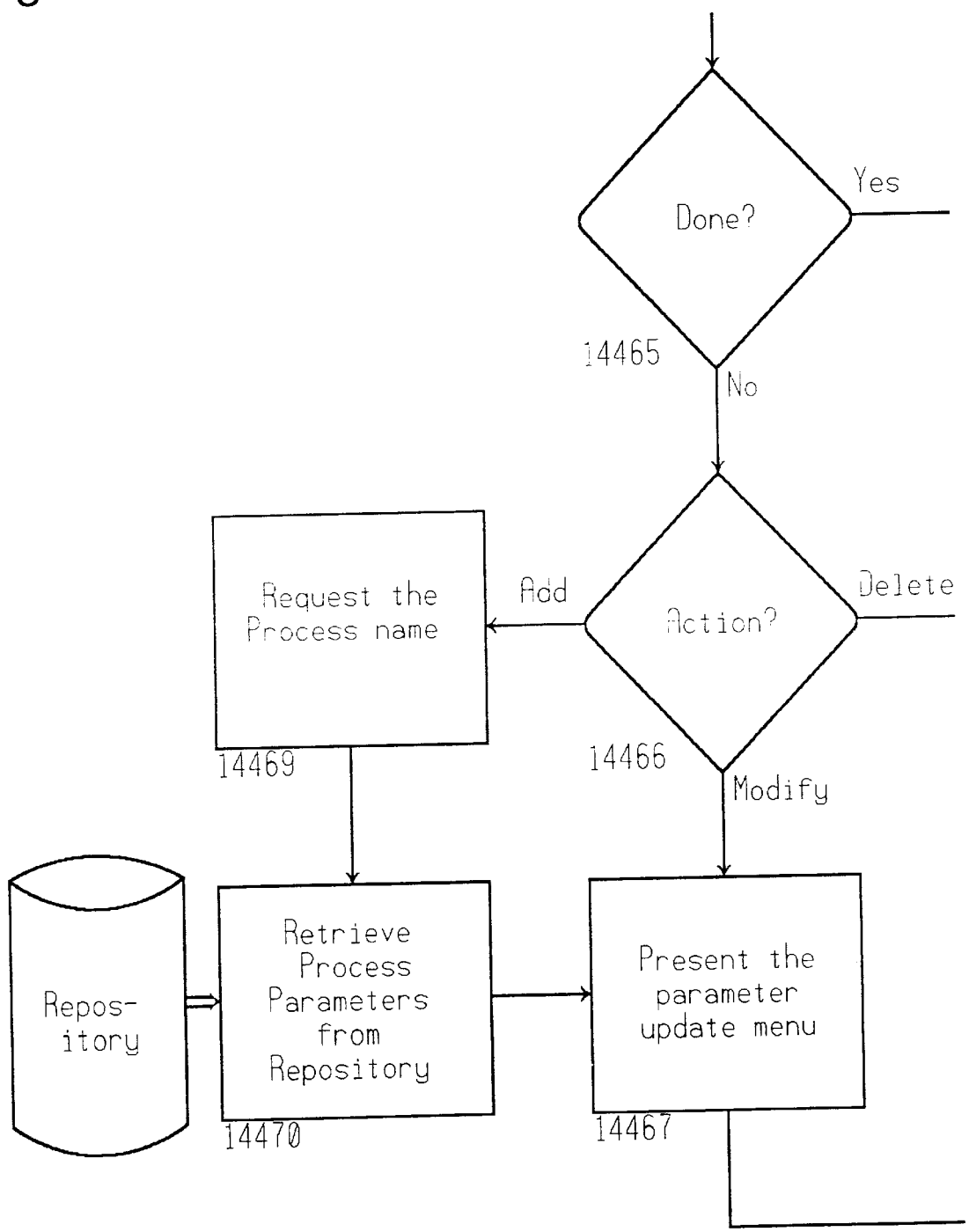
Figure 61C:
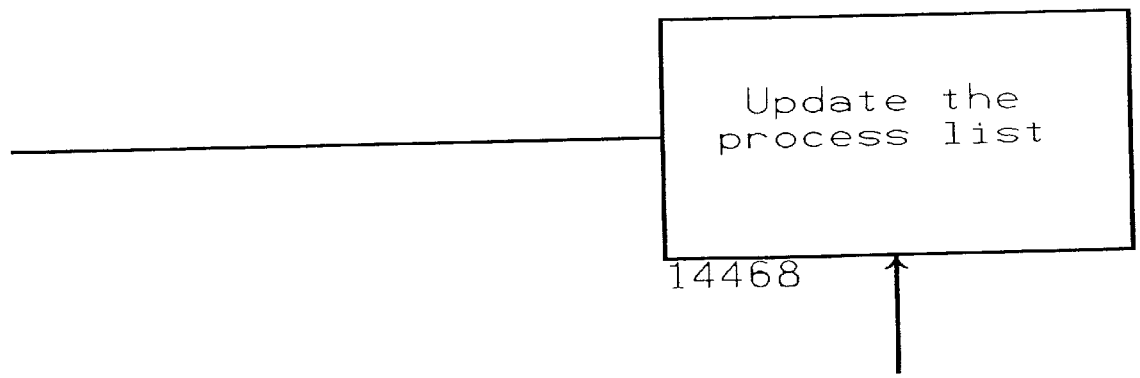
Figure 61D:
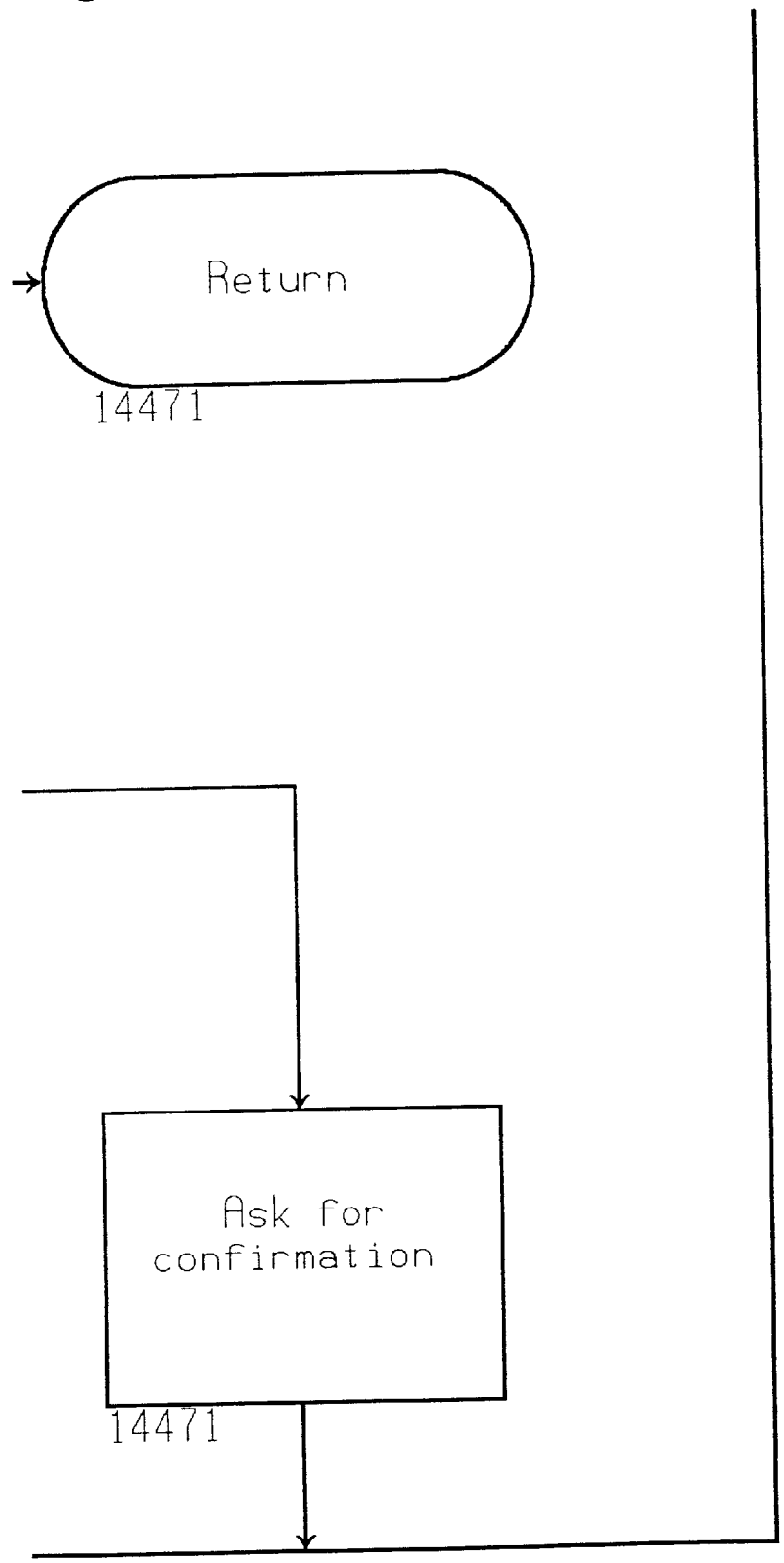

The DNPROINI Process FIG. 60: After initialization, the Process data is pulled from the queue and placed in local storage along with the count of processes 14431. Then a search is made for the first entry of interest 14432. Next, retrieve the existing Process data from the repository 14433 followed by the existing Level data 14344. Next, the Level data of interest is selected 14435, and the Process data for the selected Levels are inserted into the Process data 14436. The Process data is then stacked 14437 and the process returns 14438 to the DNEDIT4 process in FIG. 59 at 14404.

The DNPROCS Process FIG. 61. After initialization, the Process data is pulled from the queue and placed in local storage 14461. Using the passed offset get the PFVL information 14462. Now, for each type of process (i.e. ForeGround, Before, After or DILP) present a menu of data for update 14463. A check 14465 is made to see if all desired changes have been made. If so, the process returns 14471 to the DNEDIT4 process in FIG. 59 at 14406. Next a check 14466 is made to determine the action requested. If Add, request the Process name 14469, and retrieve the process parameters from the repository 14470. If Modify, present the update parameter menu 14467. If Delete, ask for confirmation 14471. In any case, update the Process data and continue at 14463.

The DNEDIT5 Process FIG. 62: After initialization, a check 14501 is made to determine if Engineering Level data has been saved. If not, the DNLEVINI process described in FIG. 63 will be invoked 14505. If yes, the Level data is stacked. 14502. In any case, the DNLEVEL process described in FIG. 64 will be invoked 14503. Upon return from that process, the Level data will be pulled from the queue and placed in local storage 14504. The process will then flow back to the DNEDIT present menu 14002 in FIG. 50.

Figure 63:
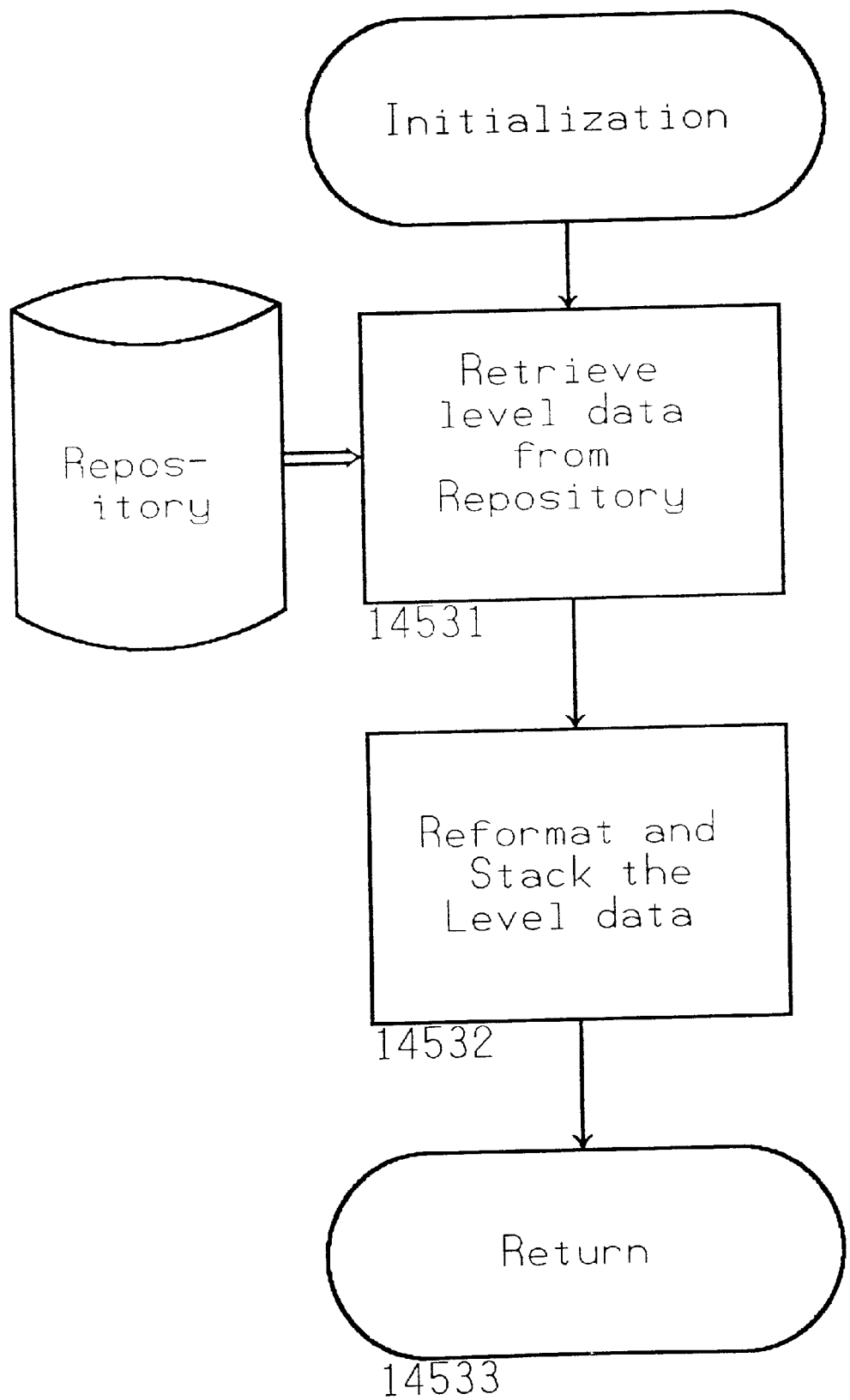
FIG. 63 describes the DNLEVINI Process.

The DNLEVINI Process FIG. 63: After initialization, the existing Level data is retrieved from the repository 14531. The Level data is then reformatted and stacked 14532. The process will then return 14533 to the DNEDIT5 process in FIG. 62 at 14505.

Figure 64:
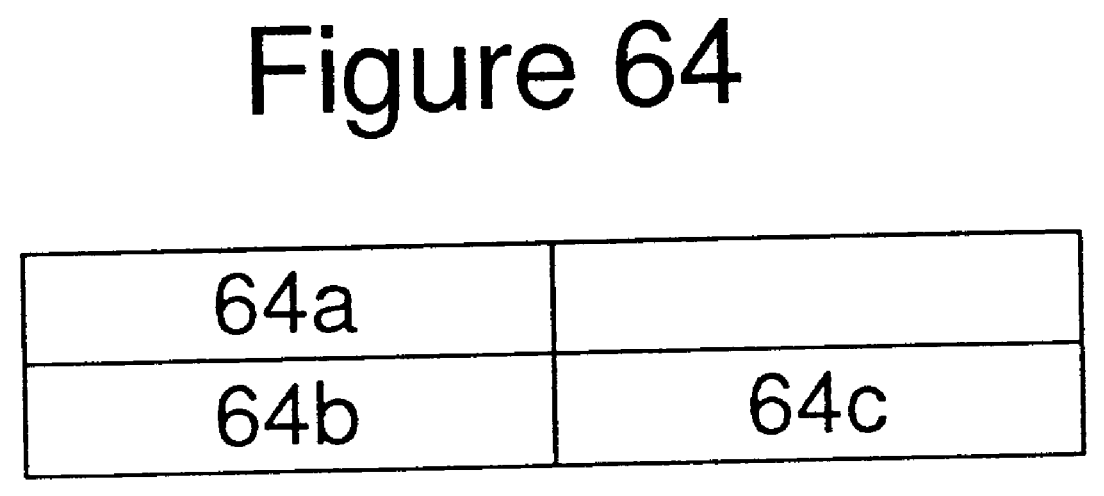
Figure 64A:
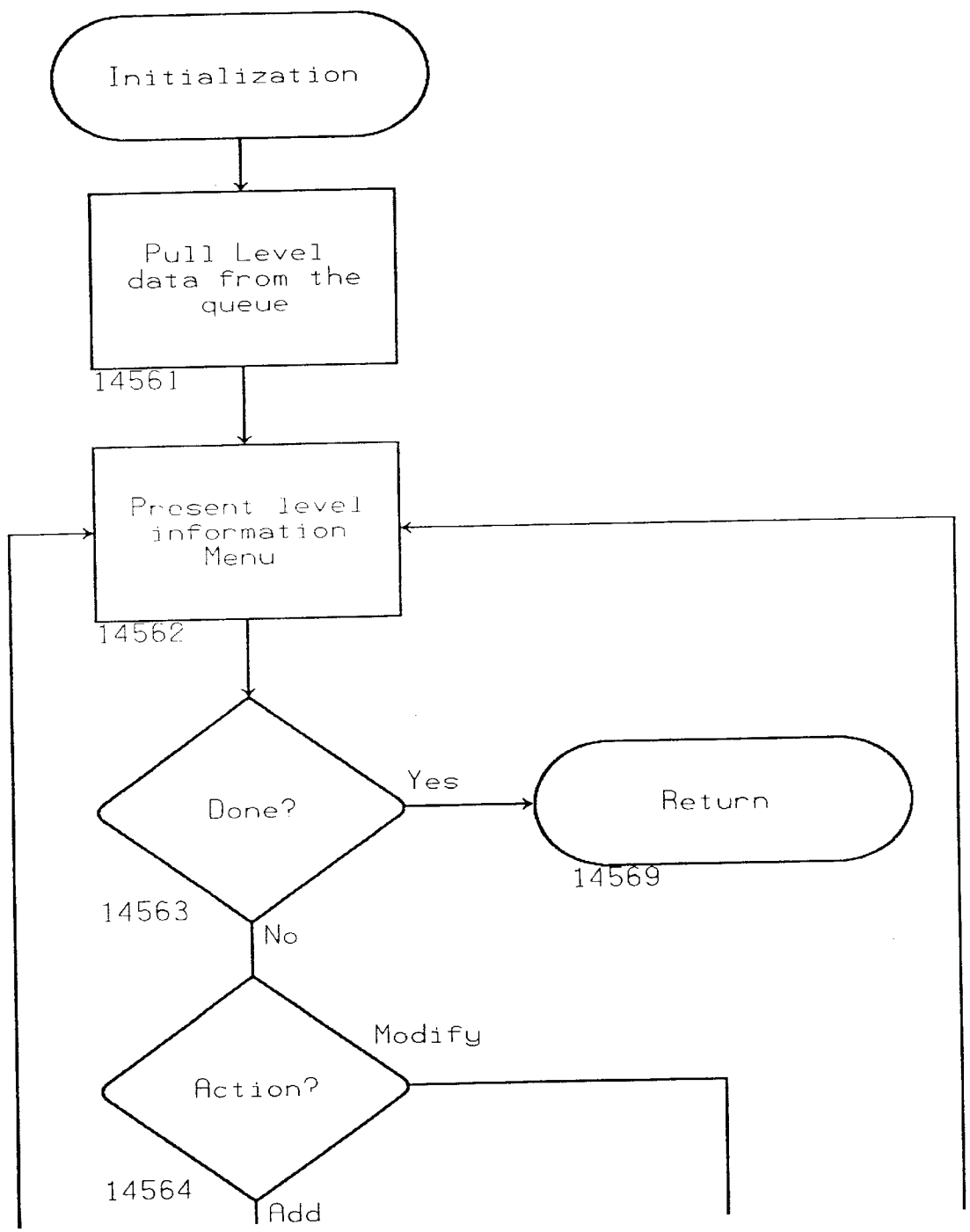
FIG. 64 which comprises FIG. 64a thru 64c, describes the DNLEVEL Process.
Figure 64B:
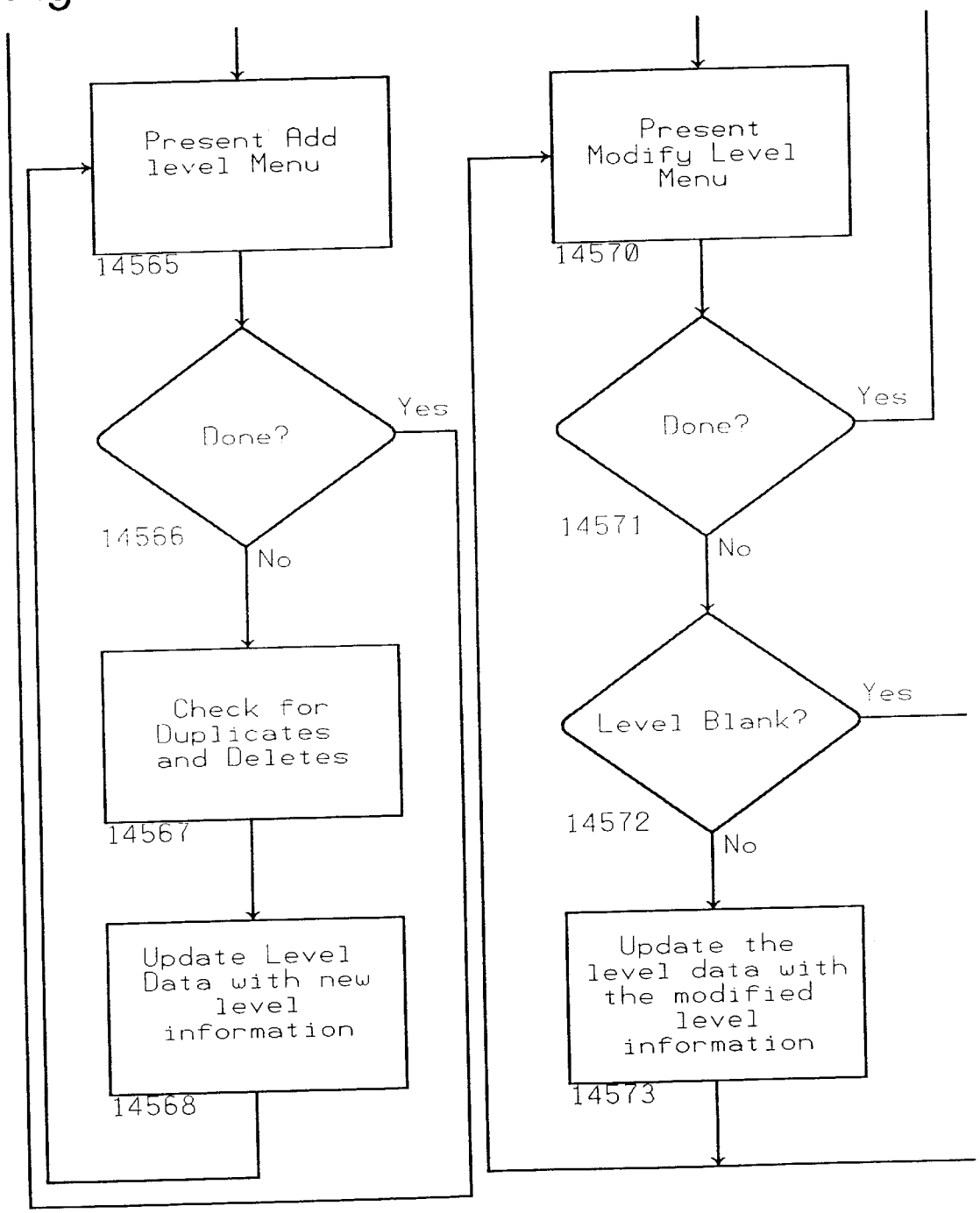
Figure 64C:
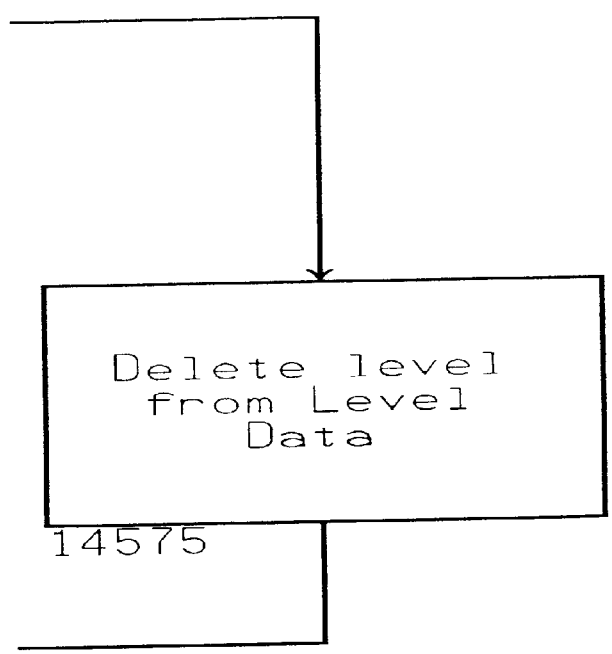

The DNLEVEL Process FIG. 64. After initialization, the Level data is pulled from the queue and placed in local storage 14561. Next, the Level information menu is presented 14562. A check 14563 is made to determine if there are any more changes to be made. The process will then return 14569 to the DNEDIT5 process in FIG. 62 at 14503. Next a check 14564 is made to determine the action requested.

If Add, present the Add Level Menu 14565. A check 14566 is made to determine if there are any more changes to be made. If none, the process flows back to present the Level information menu 14562. A check is made for duplicates Levels and Deleted Levels 14567. Then the local storage copy of the Level data is updated 14568 and the process flows back to present the Add Level Menu 14565.

If Modify, present the Modify Level Menu 14570. A check 14571 is made to determine if there are any more changes to be made. If none, the process flows back to present the Level information menu 14562. A check is to see if the level is blank 14572. If so, the Level is deleted from the local storage copy of the Level data 14575 and the process flows back to Modify Level Menu 14570. If not blank, the local storage copy of the Level data is updated with the modified information 14573 and the process flows back to Modify Level Menu 14570.

The DNEDIT6 Process FIG. 65: A check 14601 is made to determine if the FileType was specified as "*". If so, the read in the FileType list 14608. A check 146022 is made to determine if Release Level data has been saved in local storage. If not, the Level data is retrieved from the repository and save in the Level Data file 14610 In any case, the Release Level data is stacked 14603 and the DNRELINI process described in FIG. 66 will be invoked 14604. Upon return from that process, the offset to the editable data is pulled from the stack 14605. Then, the DNRLEVS process described in FIG. 67 is invoked with the offset 146096. Upon return from that process, the Release Level data will be pulled from the queue and placed in local storage 14607. The process will then flow back to the DNEDIT present menu 14002 in FIG. 50.

Figure 66:
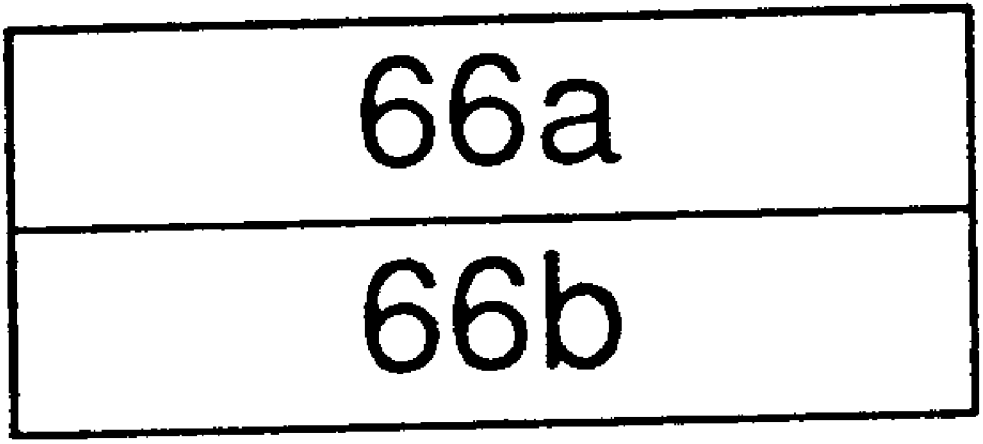
FIG. 66 which comprises FIG. 66a thru 66b, describes the DNRELINI Process.
Figure 66A:
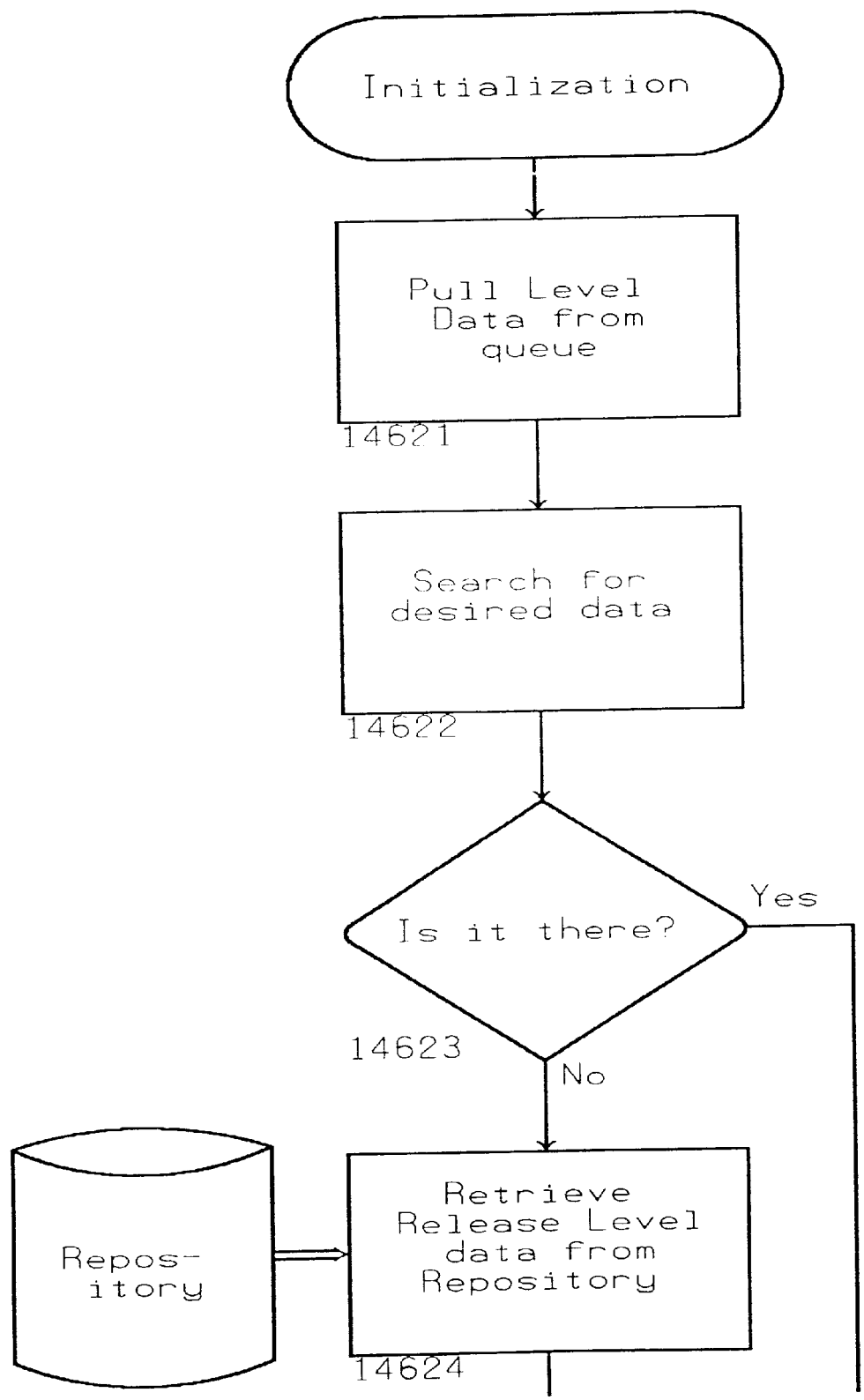
Figure 66B:
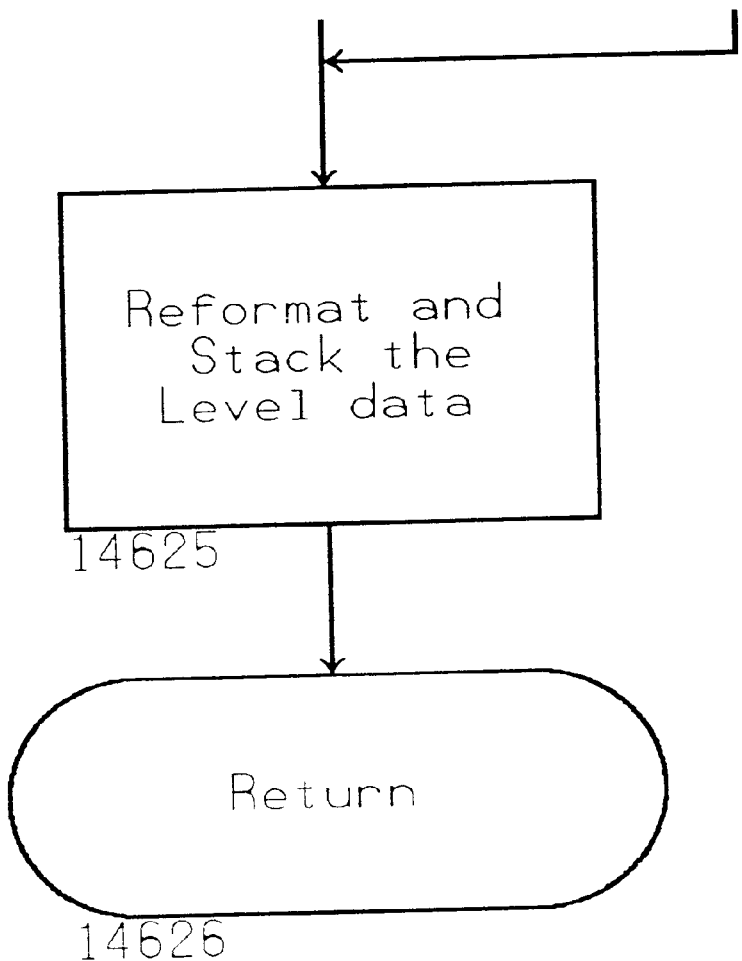
Figure 67:
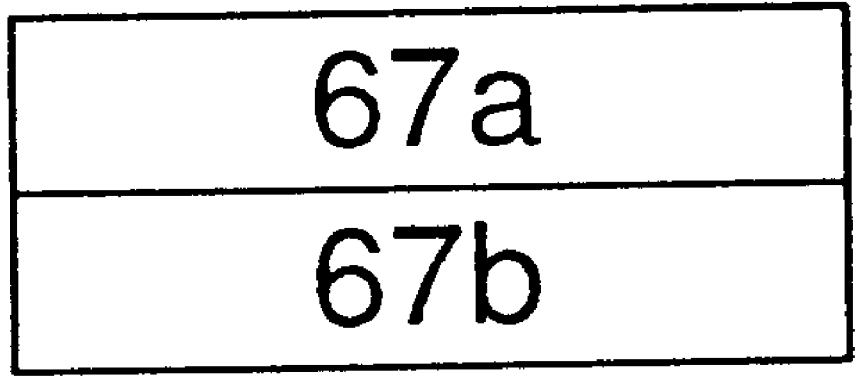
FIG. 67 which comprises FIG. 67a thru 67b, describes the DNRLEVS Process.
Figure 67A:
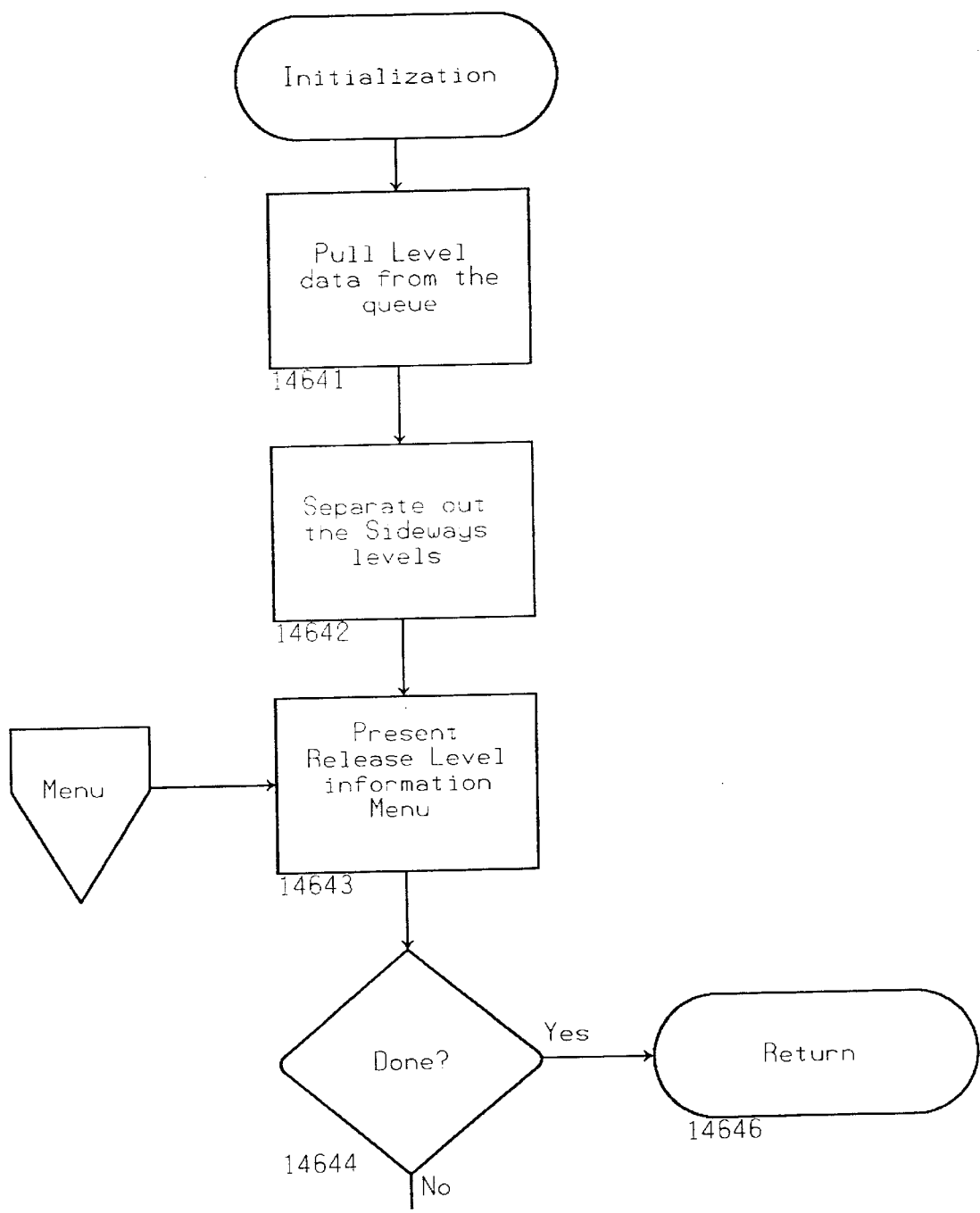
Figure 67B:
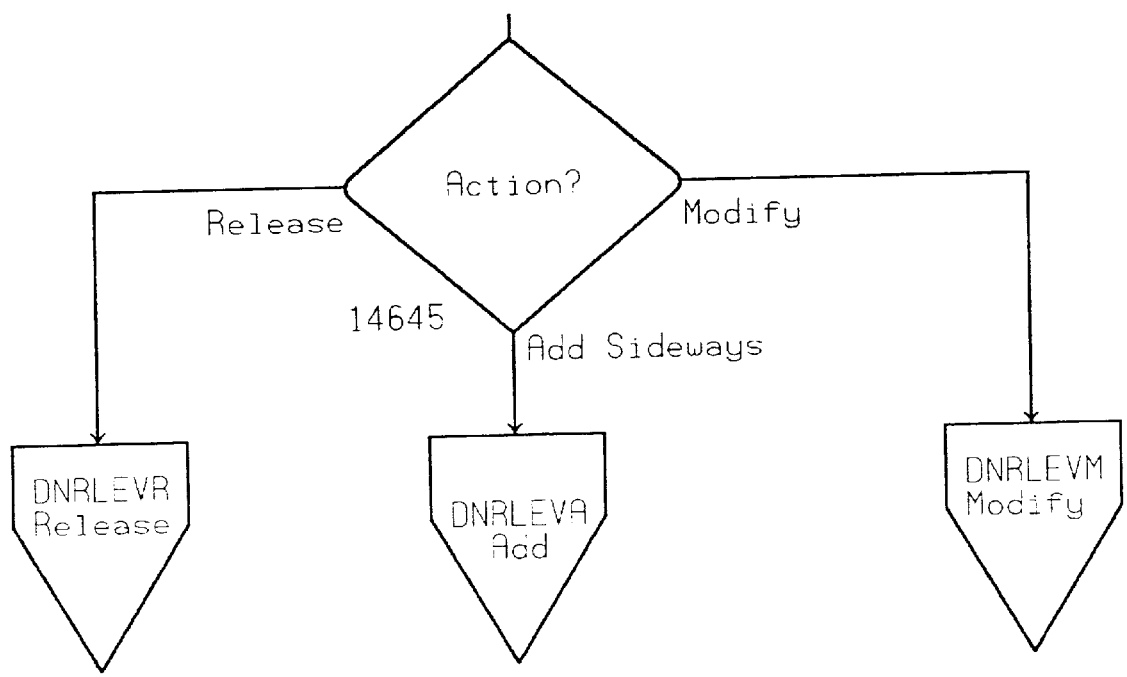

The DNRELINI Process FIG. 66: After initialization, the existing Release Level data is pulled from the queue 14621. A search is made for the desired data 14622. A check 14623 is made to determine if the desired data was found. If not, the Release Level data is retrieved from the repository 14634. The Release Level data is then reformatted and stacked 4625. The process will then return 14626 to the DNEDIT6 process in FIG. 65 at 14604.

The DNRLEVS Process FIG. 67: After initialization, the existing Release Level data is pulled from the queue and placed in local storage 14641. The sideways level data is then separated out 14642. The Release Level data is presented for modification 14643. A check 14644 is made to determine if there are no more changes to be made. If so, the process will then return 14646 to the DNEDIT6 process in FIG. 65 at 14606. A check 14645 is made to determine which action was selected. If Release was selected the process will flow to the DNRLEVR process described in FIG. 68. If Modify was selected the process will flow to the DNRLEVM process described in FIG. 69. If Add Sideways was selected the process will flow to the DNRLEVA process described in FIG. 70.

Figure 68:
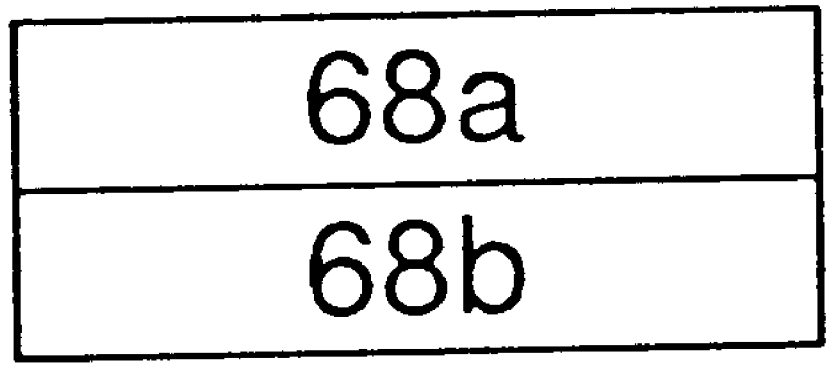
FIG. 68 which comprises FIG. 68a thru 68b, describes the DNRLEVR Process.
Figure 68A:
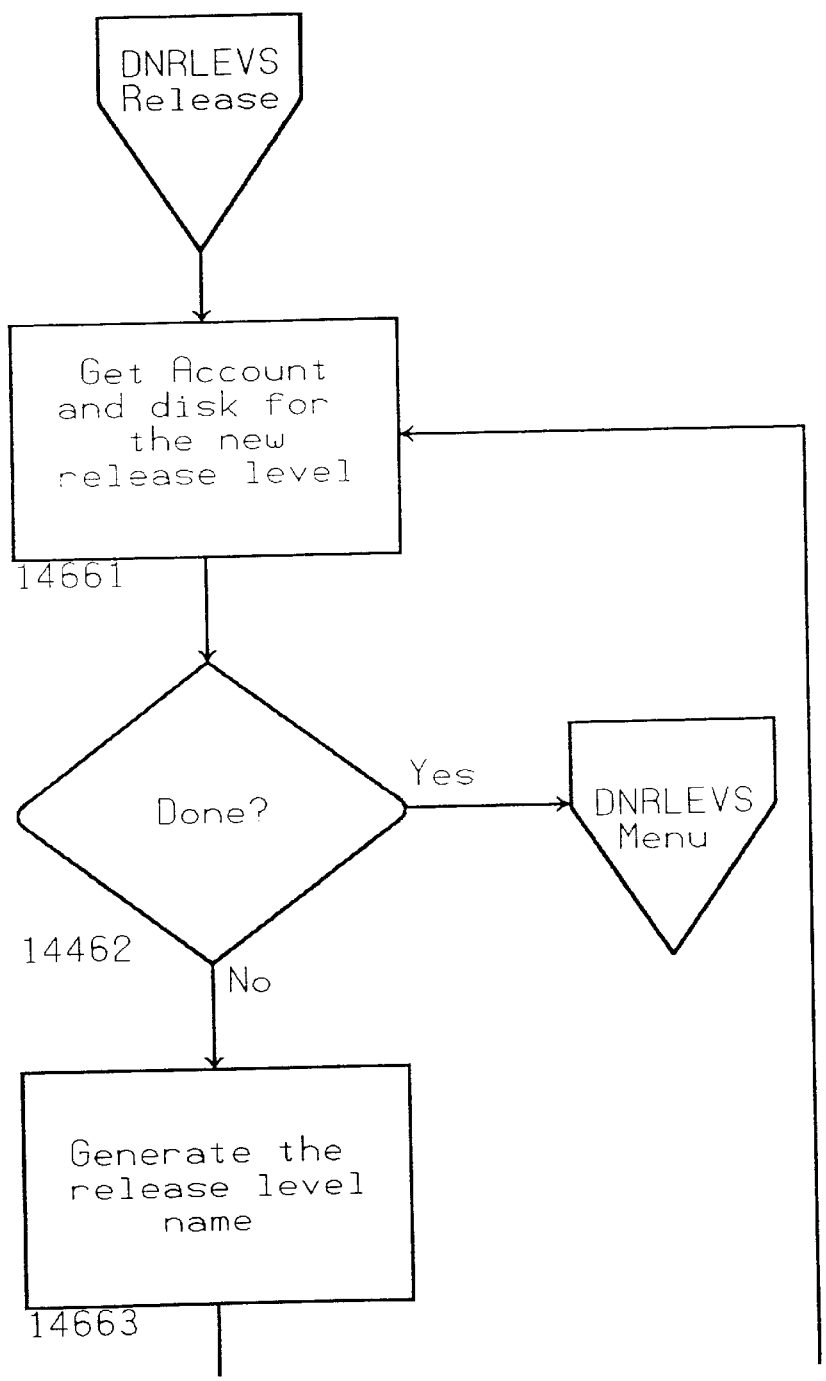
Figure 68B:
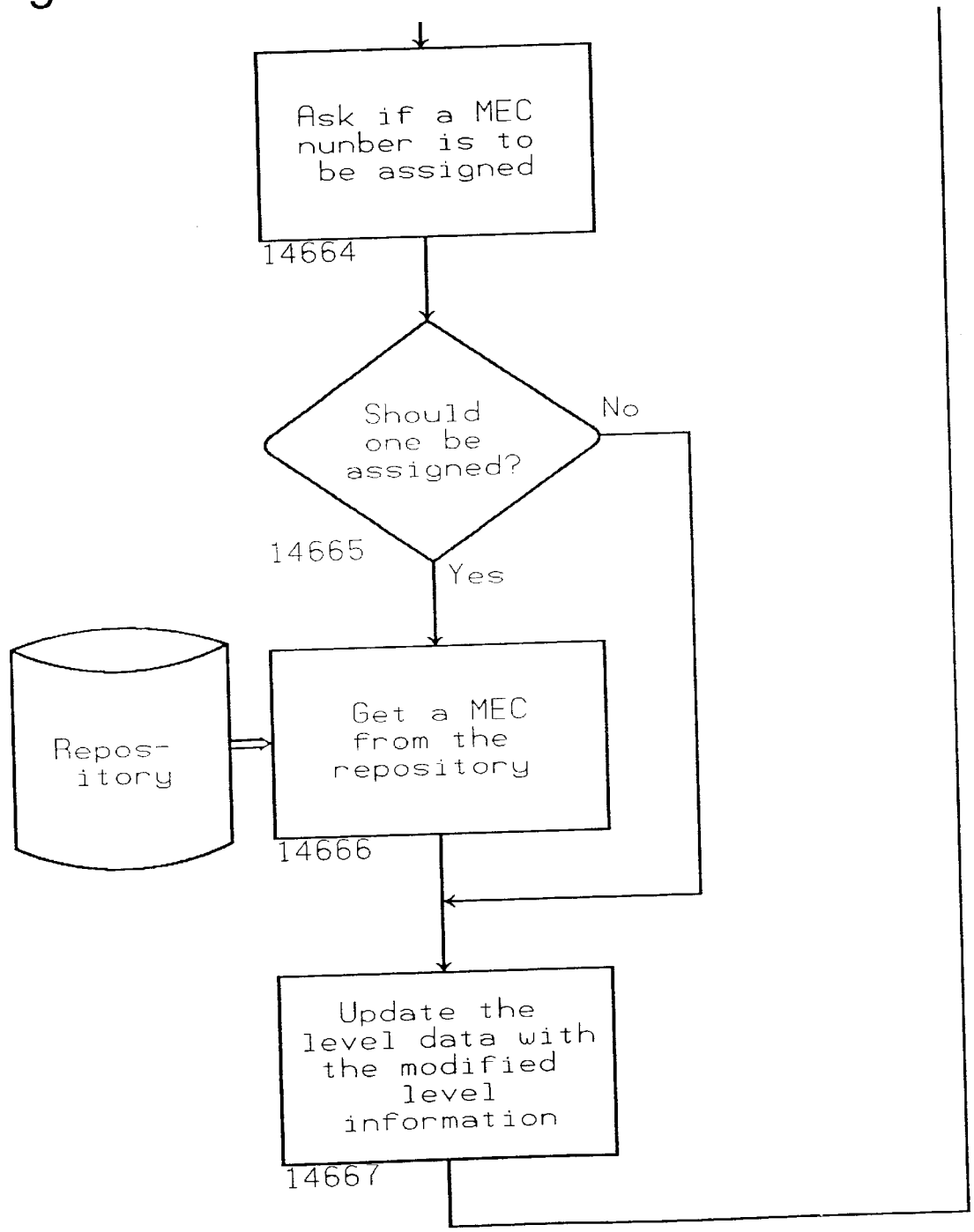

The DNRLEVR Process FIG. 68. The Add Release Level menu will be displayed to obtain the physical location for the new level 14661. A check 14662 will be made to determine if there are any more levels to add. If not, the process will flow to the DNRLEVS process in FIG. 67 at 14643. The release level name will then be generated 14663. Next the invoker is asked whether a MEC number should be assigned to this new level. A check 14665 is made to determine the answer. If yes, a MEC number is retrieved from the MEC number pool in the repository 14666. The Release Level data in local storage is then updated 14667. The process then flows back to 14661.

Figure 69:
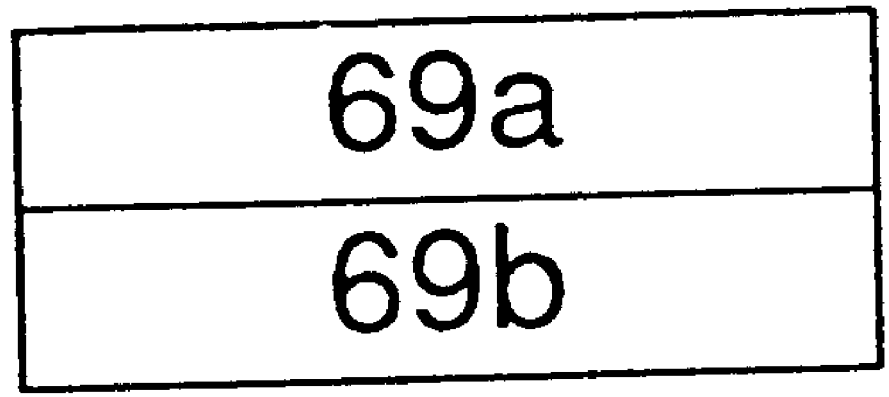
FIG. 69 which comprises FIG. 69a thru 69b, describes the DNRLEVM Process.
Figure 69A:
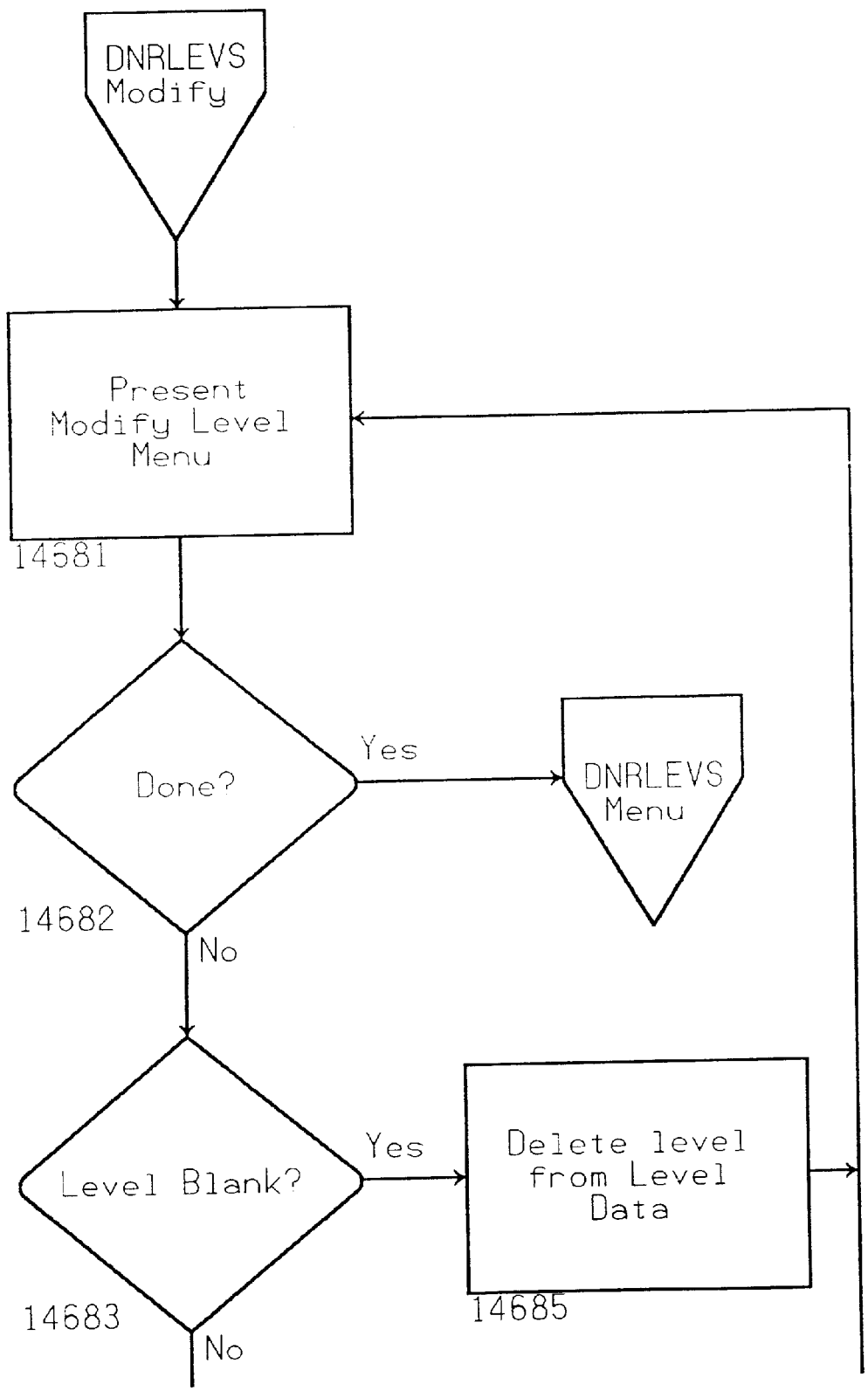
Figure 69B:
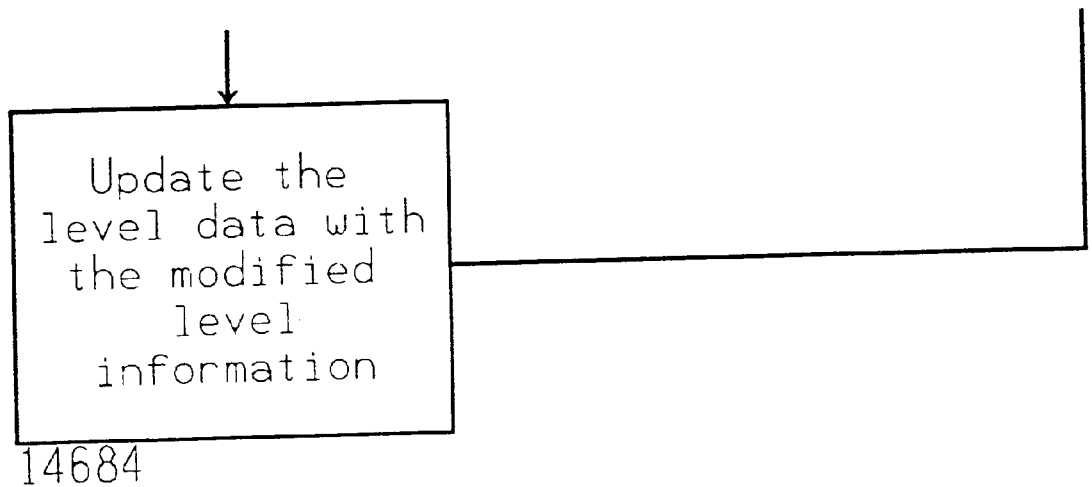

The DNRLEVM Process FIG. 69: The Modify Level menu is presented 14681. A check 14682 will be made to determine if there are any more levels to modify. If not, the process will flow to the DNRLEVS process in FIG. 67 at 14643. A check 14683 is made to see if the level name has been made blank. If so, the level is deleted from the Release Level data 14685. If not, the Release Level data is updated with the modified information 14684. In any case, the process then flows back to 14681.

Figure 70:
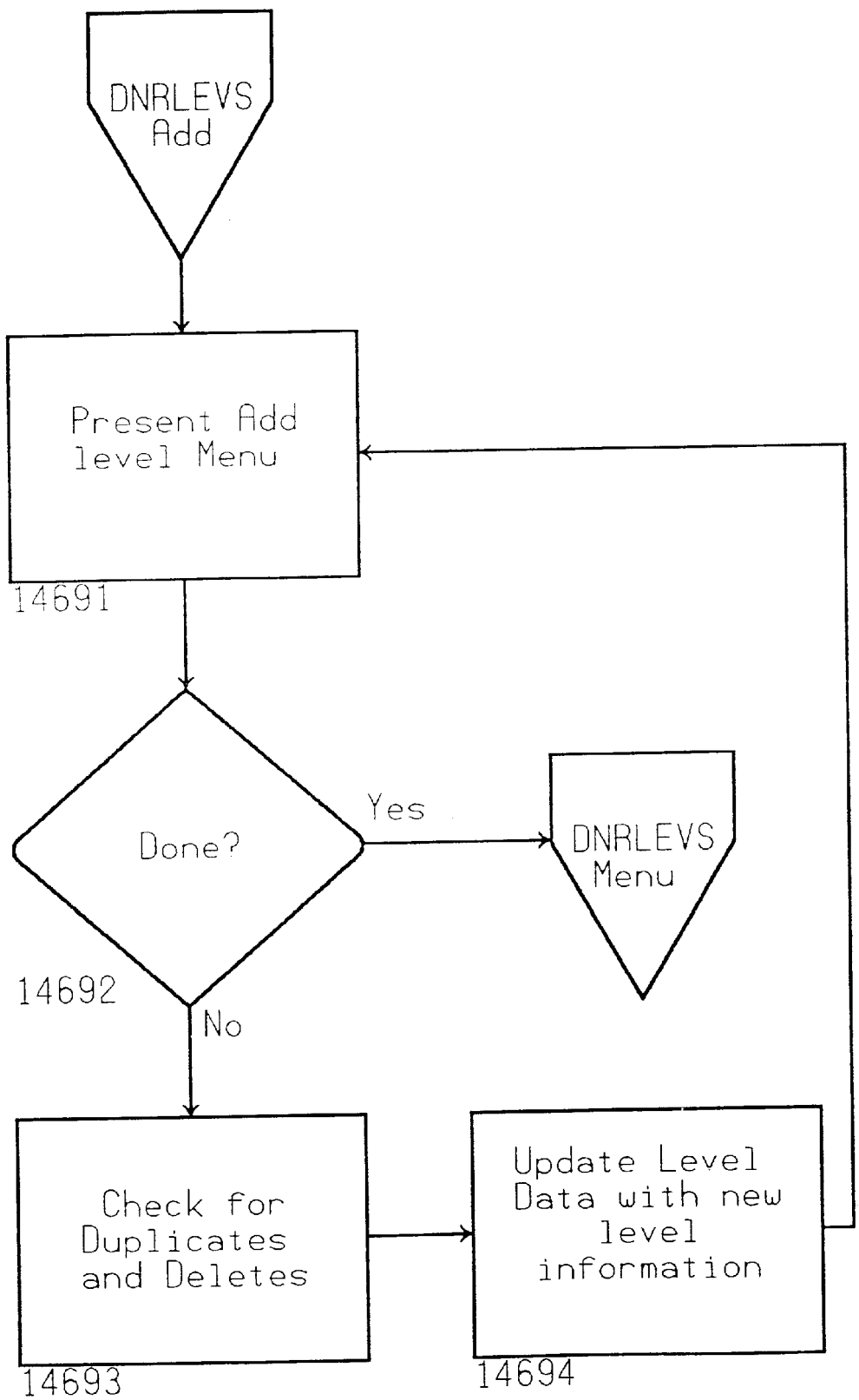
FIG. 70 describes the DNRLEVA Process.

The DNRLEVA Process FIG. 70: The Add Level menu is presented 14691. A check 14692 will be made to determine if there are any more levels to add. If not, the process will flow to the DNRLEVS process in FIG. 67 at 14643. A check is made to see if the added level is a duplicate or a level to be deleted 15693. The Release Level data is updated with the new level information 14694 and the process then flows back to 14691.

The DNEDIT7 Process FIG. 71. A check 14701 is made to determine if Control information was saved in local storage. If not, the existing Package Control information is retrieved from local storage 14702. The data is then reformatted 14703 and the process flows to the DNMISC process described in FIG. 72. Upon return from that process, the Control information is pulled from the stack and placed in local storage 14705. The process will then flow back to the DNEDIT present menu 14002 in FIG. 50.

Figure 72:
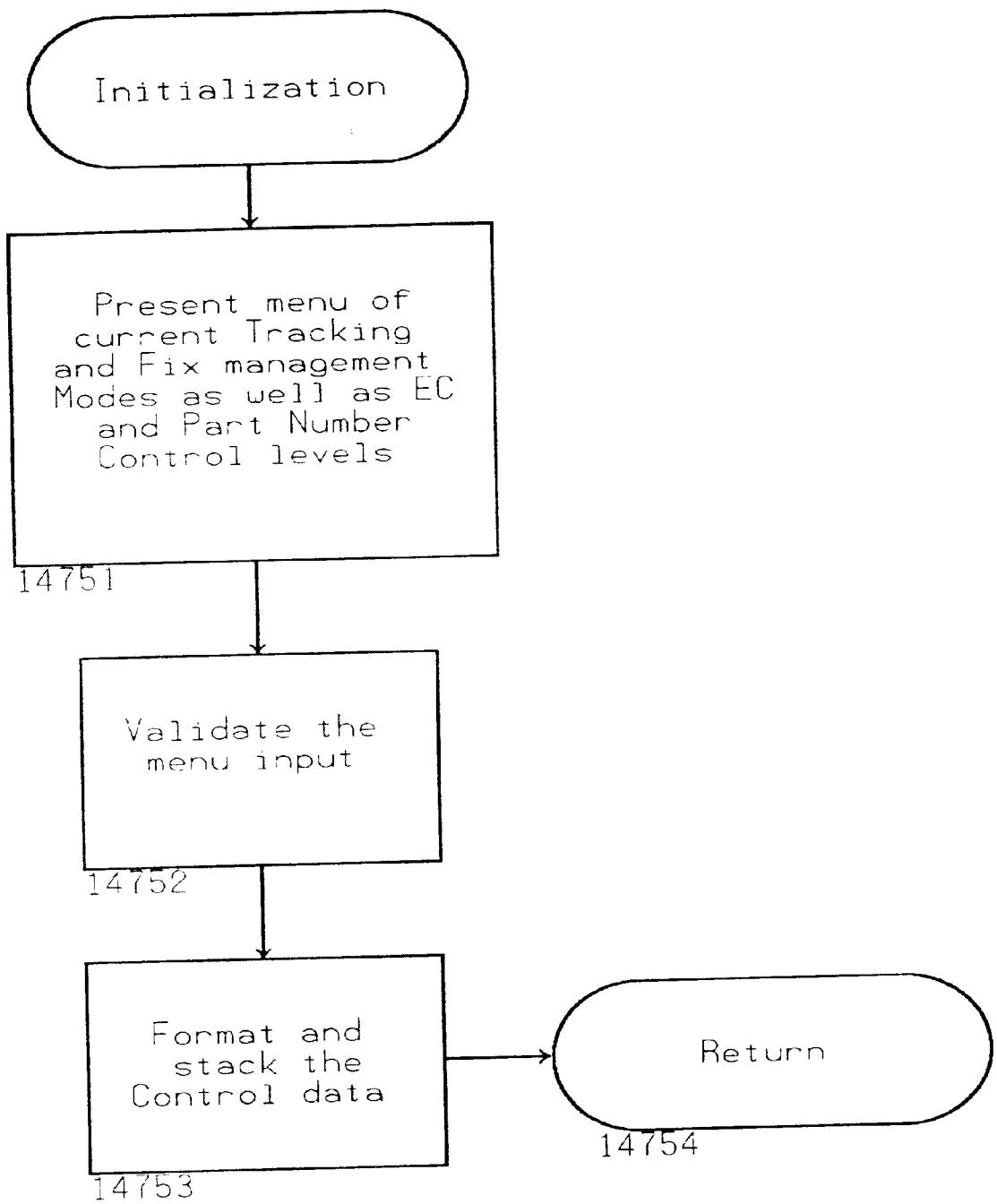
FIG. 72 which describes the DNMISC Process.

The DNMISC Process FIG. 72: After initialization, a menu is presented containing all the control information 14751. All the updated data is then validated 14572. The data is then reformatted and placed on the stack 14753. The process the returns 14754 to the DNEDIT7 process in FIG. 71 at 14704.

The DNEDIT8 Process FIG. 73: After initialization 14801, a check 14802 is made to determine if FileGroup data was saved in local storage. If not, the DNTYPINI process described in FIG. 55 is invoked. If it was, then the data is placed on the stack. In any case the DNFIGINI process described in 74 is invoked. Upon return from that process, the FileGroup data is pulled from the stack and placed in local storage 14805 The process will then flow back to the DNEDIT present menu 14002 in FIG. 50.

Figure 74:
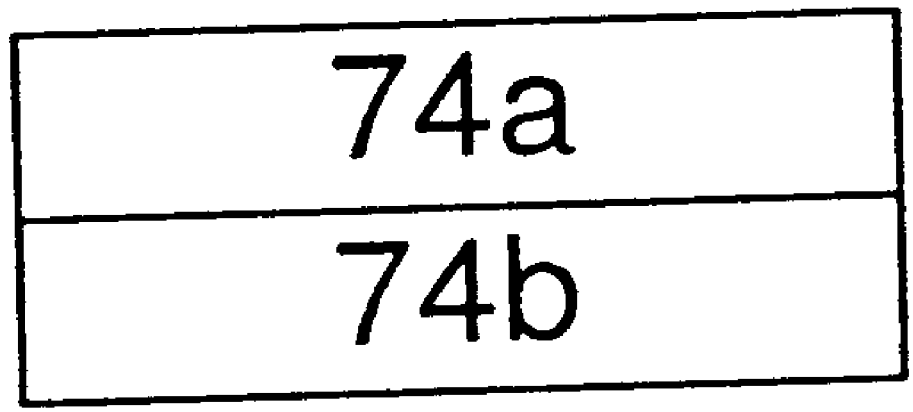
FIG. 74 which comprises FIG. 74a thru 74b, describes the DNFIGINI Process.
Figure 74A:
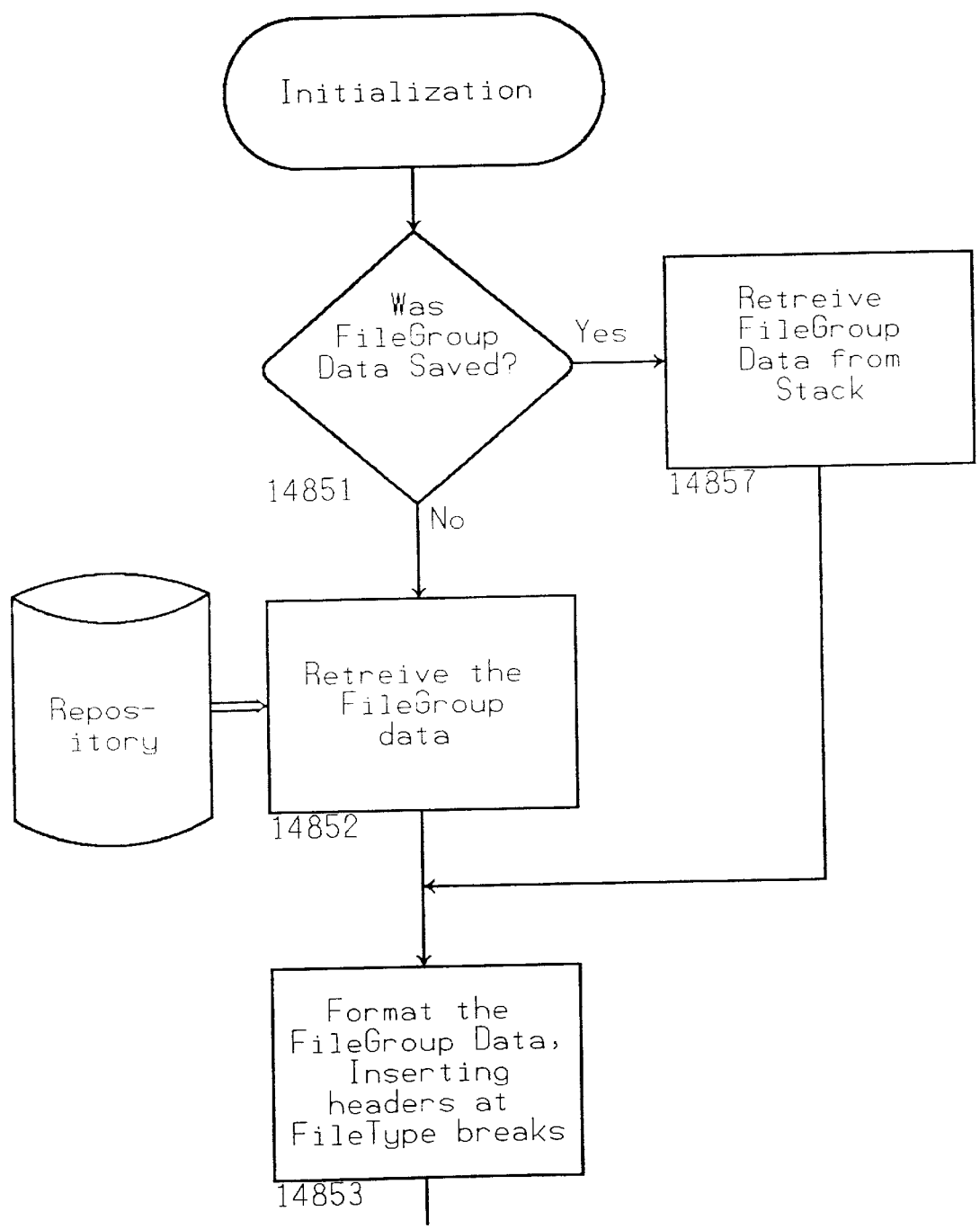
Figure 74B:
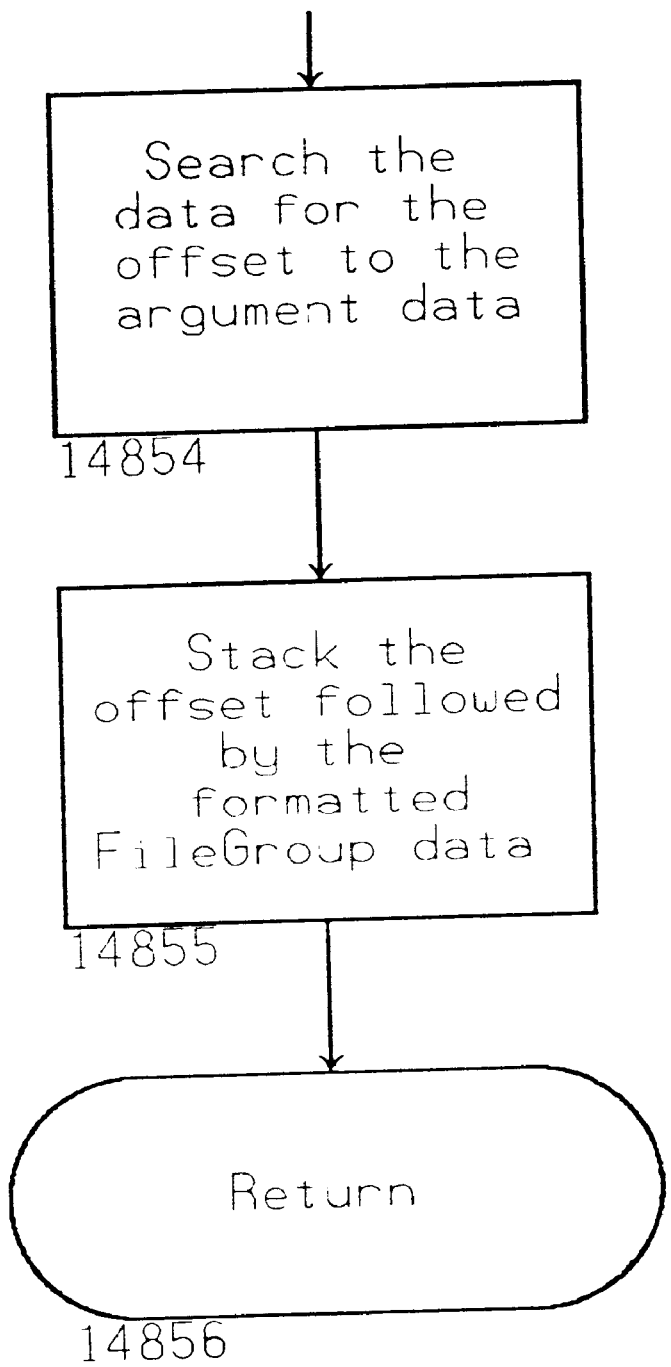

The DNFIGINI Process FIG. 74: After initialization, a check 14851 is made to determine if FileGroup was stacked. If it was, the data is pulled from the stack and placed into local storage 14857. If not, the existing FileGroup data is retrieved from the data base and placed into local storage 14852. In any case, the FileGroup data is reformatted and headers inserted at Filetype breaks 14853. A search is then made for the offset to the desired data as passed to this process 14854. The offset followed by the formatted FileGroup Data is then stacked 14855. The process will then return 14856 to the DNEDIT8 process in FIG. 73 at 14804.

Authority Manager

The present embodiment contemplates an Authority Manager which interacts with the other Managers in the Data Management System to control the relationship between the users and the tasks they execute. All authorities are registered and maintained by Authority tables within the Control Repository. Authorities are categorized by type and they are granted by Package, Filetype, Version and Level (PFVL). The preferred embodiment offers the following types of authority, although one skilled in the art would appreciate the ease by which our system could incorporate additional authorities:

Put (Promotion from Private Libraries into Public Libraries)

Promote (Promotion through Public Libraries)

BOM Create

BOM Promote

File Lock

Set/Edit Pseudo Process Results

Install/Store Data into the DMS

Data Management

The Authority Manager permits any or all parts of a PFVL to be specific or global in scope. It even extends beyond the PFVL paradigm by granting authority on a File Name basis as well. This enables Data Managers the flexibility to grant authorities ranging from every file in the DMS down to a single file in the system. Flexibility is further increased by the ability to perform pattern matching on File Name authorities. This enables Data Managers to authorize a user to manipulate groups of files with commonality in their names, such as all files whose first three characters are ABC.

Since the Data Manager is responsible for assigning and maintaining authorities, all user interfaces with the Authority Manager are contained within the Data Manager Configuration Utility described in FIGS. 16 thru 19970. The preferred embodiment illustrates two distinct user interfaces. The simplest permits the Data Manager to specify the type and granularity of authority on a user by user basis. A simple data entry screen exists whereby the user is identified, the authorities selected, and the Control Repository updated. A detailed description is presented as part of the Data Management Configuration Utility.

Our embodiment also provides an efficient means to process groups of authorities for a large number of users by employing a concept called Authority Profiles. This method permits the Data Manager to construct profiles which are formatted files containing various types of authorities. The format allows for any granularity of authority ranging from global authority across an entire Package, Filetype, Version and Level (PFVL), to a single PFVL. An example profile is shown below:

```
* Authorization profile for Designers
     :AUTH.PUT
        :VER.BASE
        :EVER.
     :EAUTH.
     :AUTH.PROMOTE
        :LFT.SCHEMATIC LAYOUT
           :LVL.WORKING QUALITY
              :VER.BASE
              :EVER.
              :ELVL.
        :ELFT.
     :EAUTH.
```

-continued

```
:AUTH.MDLCRE
    :VER.BASE
    .EVER.
:EAUTH.
:AUTH.MDLPROM
    :LFT.SCHEMATIC LAYOUT
        :LVL.WORKING QUALITY
            :VER.BASE
            :EVER.
        :ELVL.
    :ELFT.
    :LFT.DOCUMENT
    :ELFT.
:EAUTH.
```

The present embodiment uses a scripting format which uses sections delimited by keywords. The keywords are preceded by a : and terminated with a period. In our example, the keywords are arranged hierarchically for clarity.

Authority (:AUTH. :EAUTH.)
Library File Type (:LFT. :ELFT.)
Level (:LVL. :ELVL.)
Version (:VER. :EVER.)

Immediately following the keyword is the list of assignments for that keyword. Each section can be repeated as often as necessary in order to achieve the desired degree of granularity. For example there can be a Library File Type section for schematics with no underlying Level and Version sections, followed by an LFT section for layout with a Level section of Quality. This translates as: the subject authority pertains to schematics at all Levels and Versions, but only layouts at the Quality Level. The absence of a keyword implies global authority for all members of that keyword (ie. no :LVL. record means that authority applies to all Levels).

Each profile can be tailored for a specific group of people who share a common set of authorities. For example, one profile may exist for designers, a second for team leaders, a third for project coordinators, a fourth for managers, etc. Once a profile is created, the Data Manager uses a Master Authority List to associate individual users to one or more profiles. This provides a means to grant a large number of authorities to many users without much effort on the part of the Data Manager. Furthermore, this method guarantees that all users acquire identical authority since the individual authority information doesn't have to be entered for each user. Finally, maintenance is greatly simplified since the only change required is to a profile or the Master Authority List. For example, if a situation arises which requires all designers to have a new authority, the Data Manager only needs to change the Designer Profile, and the update will propagate to all individuals associated with that profile.

In order to preserve data integrity and safety, our embodiment requires all official authorizations to reside in the Authority Tables of the Control Repository. Although the Data Manager can create and edit the Master Authority List and the profiles using any text editor, our embodiment provides a special authority profile editor to facilitate the task. The editor is actually a user interface which interacts with a special algorithm that is responsible for coordinating all profile and Master Authority List changes with the Control Repository tables. As previously stated, the preferred embodiment describes this algorithm and the user interface as part of the Data Management Configuration Utility in FIGS. 16 thru 19970.

To facilitate the exchange of data ownership, our embodiment incorporates a concept known as Surrogates. Users may define other users as Surrogates to act on their behalf. A Surrogate is capable of setting and resetting locks, including ownership locks, without any intervention from the original owner (known as the Ward). This is an especially useful feature f multiple users are collaborating on a single piece of data. The Lock Manager and Library Manager interact with the Authority Manager during certain tasks where Surrogate checking is required. In any situation where a Surrogate successfully confiscates data from the Ward, the DMS automatically notifies the Ward of the event.

Figure 33:
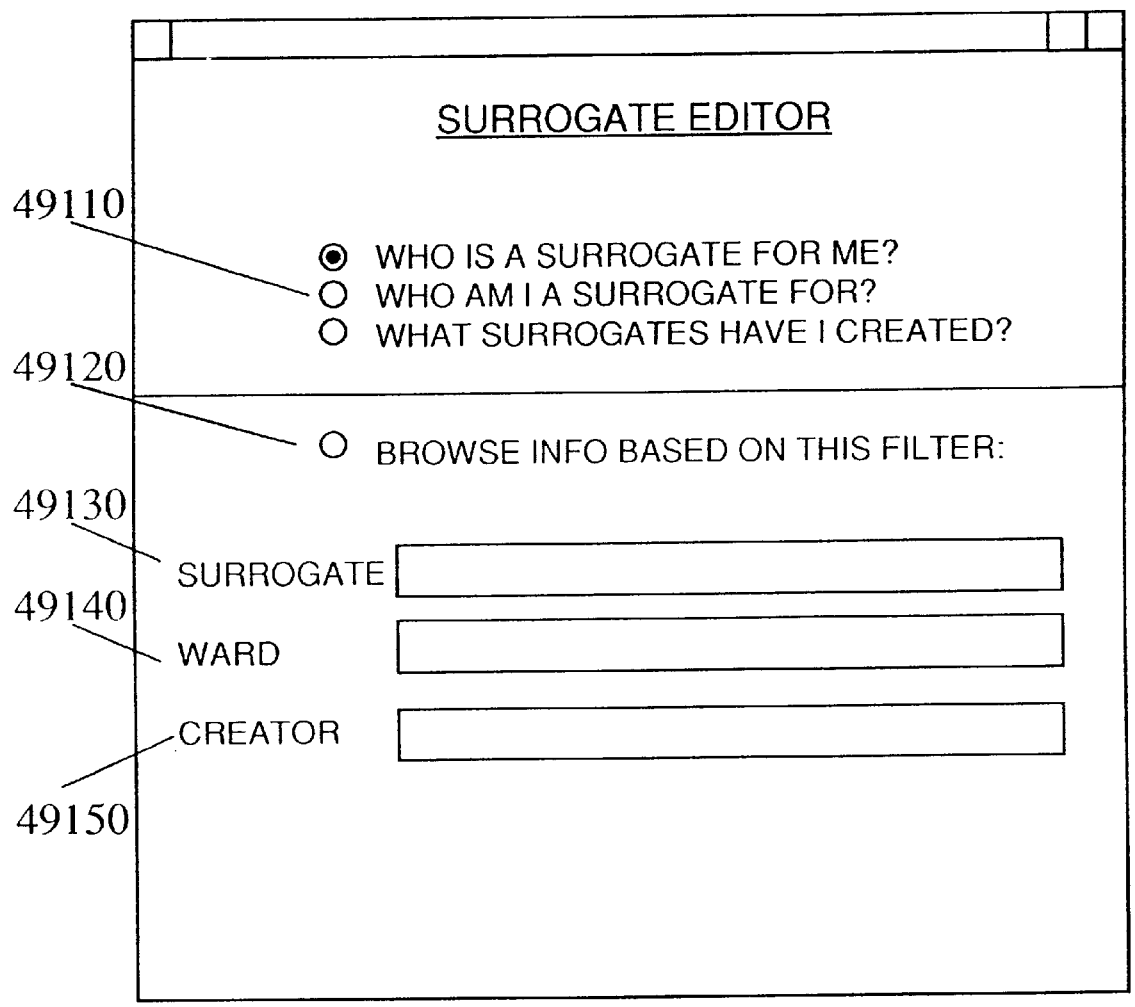
FIG. 33 illustrates the Surrogate Editor.

FIG. 33 illustrates the Surrogate Editor which is used to browse and assign Surrogates. In our preferred embodiment, only users may add Surrogates for themselves, or authorized Managers may create Surrogates for any users with whom they associate. Since the entire Surrogate apparatus is driven by control tables, our embodiment permits the users of the embodiment to designate the authorized Managers. They may be Data Managers, Personnel Managers, Technical Leaders, Supervisors, or anyone who has the responsibility for assigning data ownership. The single screen shown in FIG. 33 is used to perform all Surrogate editing functions. The top section contains radio buttons, 49110, which offer three choices. The user may ask the editor:

Who is a Surrogate for Me?

Who am I a Surrogate For?

What Surrogates Have I Created?

Upon selecting any of these choices, the corresponding information is extracted from the Control Repository using the QRSURGET function. The results are filtered to only retain information about the current user. These results are displayed on a subsequent screen which also offers the user the opportunity to delete any of the existing entries or add a new entry.

The lower section of the screen contains radio button 49120 which may be used in lieu of radio buttons 49110. Selection of this button indicates the user wants to work with information for someone else. In this case, fields 49130, 49140 and 49150 can be used to filter the resulting information. For example, the user may be the Data Manager who wants to see Surrogate information for a particular user. Either of these 3 fields may be filed in with a single user id, or combinations of fields can be filled in to see things like all occurrences where user A is a Surrogate created by user B. Field 49130 can be used to specify the Surrogate, 49140 can be filled in to specify the Ward and 49150 can be used to specify the Creator. Any of these fields can be left blank which indicates ALL. Upon entering the information, the results are displayed in an identical manner as stated above. The user is given the opportunity to delete existing Surrogate/Ward relationships or add new ones. If the user elects to add a new Surrogate/Ward relationship, they are prompted for the user id of the new Surrogate and Ward in a subsequent dialog box.

All removal of existing Surrogates and addition of new Surrogates is done through the QRSURDEL and QRSURADD functions. Our embodiment permits any user to act as a Ward and create their own Surrogates or delete their existing Surrogates. As previously stated, an authorized Manager may use this utility to define Surrogate/Ward relationships for any authorized users of their Library. QRSURDEL and QRSURADD incorporate algorithms which ensure that only these authorized Managers edit Surrogate information for users of their Package, and blocks ordinary users from modifying other users' Surrogate/Ward relationships.

Authority Manager Processes

This section describes the processes that support the Authority Manager functions in Data Management Control Utilities. The processes are depicted in FIGS. 75 to 87. To support these processes the Authority Manager maintains the following tables in the Control Repository.

AUTHORITY

TABLE 17

AUTHORITY-Authority list

| Column | Description |
|---|---|
| REF | Reference number |
| FUNCTION | Function being performed |
| USERID | USERID that is authorized |
| TARGET | Target of function |
| CREATOR | USERID who created entry |
| CDATE | Date entry was created |
| CTIME | Time entry was created |

AUTHORITY_LOG

TABLE 18

AUTHORITY_LOG Authority log

| Column | Description |
|---|---|
| REF | Reference number |
| FUNCTION | Function |
| USERID | USERID authorized to perform function |
| TARGET | Target for which user is authorized to perform function |
| ACTION | Add or delete |
| INVOKER | USERID who performed action |
| DATE | Date entry was created |
| TIME | Time entry was created |

DEPT_MANAGERS

TABLE 19

DEPT_MANAGERS - Department Managers

| Column | Description |
|---|---|
| REF | Reference number |
| DEPT | Department |
| USERID | Userid of Department Manager |

FILE_AUTHORITY

TABLE 20

FILE_AUTHORITY - File Authority

| Column | Description |
|---|---|
| REF | Reference number |
| FUNCTION | Function being performed |
| USERID | USERID that is authorized |
| PACKAGE | Package for which function is authorized - * indicates all |
| LIBTYPE | Lib. filetype for which function is authorized - * indicates all |
| VERSION | Version for which function is authorized - * indicates all |
| LEVEL | Lib. level for which function is authorized - * indicates all |
| FILENAME | Filename for which function is authorized - * indicates all |

TABLE 20-continued

FILE_AUTHORITY - File Authority

| Column | Description |
|---|---|
| CREATOR | USERID who created entry |
| CDATE | Date entry was created |
| CTIME | Time entry was created |

FILE_AUTHORITY_LOG

TABLE 21

FILE_AUTHORITY_LOG - Authority log

| Column | Description |
|---|---|
| REF | Reference number |
| FUNCTION | Function |
| USERID | USERID authorized to perform function |
| PACKAGE | Package for which function is authorized - * indicates all |
| LIBTYPE | Lib. filetype for which function is authorized - * indicates all |
| VERSION | Version for which function is authorized - * indicates all |
| LEVEL | Lib. level for which function is authorized - * indicates all |
| FILENAME | Filename for which function is authorized - * indicates all |
| ACTION | ADD or DEL(ete) |
| INVOKER | USERID who performed action |
| DATE | Date entry was created |
| TIME | Time entry was created |

PACKAGES

TABLE 22

PACKAGES - Packages

| Column | Description |
|---|---|
| REF | Reference number |
| ID | Package id |
| MANAGER | Userid of package manager |
| ALTERNATE | Userid of alternate package manager |
| REC_LEVEL | Level at which REC control begins |
| PARTNO_LEVEL | Level at which part numbers are required |
| CURRENT_RECNO | Current default REC number |
| CURRENT_MECNO | Current default MEC number |
| BYPASS_REC | If "Y", then bypass REC processing |

PROC_AUTHORITY

TABLE 23

PROC_AUTHORITY - Process Authority list

| Column | Description |
|---|---|
| REF | Reference number |
| FUNCTION | Function being performed |
| USERID | USERID that is authorized |
| PROCNAME | Process for which function is authorized |
| PACKAGE | Package for which function is authorized - * indicates all |
| LIBTYPE | Lib. filetype for which function is authorized - * indicates all |
| VERSION | Version for which function is authorized - * indicates all |
| LEVEL | Lib. level for which function is authorized - * indicates all |

TABLE 23-continued

PROC_AUTHORITY - Process Authority list

| Column | Description |
| --- | --- |
| FILENAME | Filename for which function is authorized - * indicates all |
| CREATOR | USERID who created entry |
| CDATE | Date entry was created |
| CTIME | Time entry was created |

PROC_AUTHORITY_LOG

TABLE 24

PROC_AUTHORITY_LOG - Authority log

| Column | Description |
| --- | --- |
| REF | Reference number |
| FUNCTION | Function |
| USERID | USERID authorized to perform function |
| PROCNAME | Process for which function is authorized |
| PACKAGE | Package for which function is authorized - * indicates all |
| LIBTYPE | Lib. filetype for which function is authorized - * indicates all |
| VERSION | Version for which function is authorized - * indicates all |
| LEVEL | Lib level for which function is authorized - * indicates all |
| FILENAME | Filename for which function is authorized - * indicates all |
| ACTION | ADD or DEL(ete) |
| INVOKER | USERID who performed action |
| DATE | Date entry was created |
| TIME | Time entry was created |

SURROGATE_LOG

TABLE 25

SURROGATE_LOG - Surrogate log

| Column | Description |
| --- | --- |
| REF | Reference number |
| SURROGATE | USERID that is surrogate |
| WARD | USERID for which s/he is surrogate |
| ACTION | Add or delete |
| INVOKER | USERID who performed action |
| DATE | Date entry was created |
| TIME | Time entry was created |

SURROGATES

TABLE 26

SURROGATES - Surrogate list

| Column | Description |
| --- | --- |
| REF | |
| SURROGATE | USERID that is surrogate |
| WARD | USERID for which s/he is surrogate |
| CREATOR | USERID who created entry |
| CDATE | Date entry was created |
| CTIME | Time entry was created |

USERDATA

TABLE 27

USERDATA - User Demographic information

| Column | Description |
| --- | --- |
| REF | Reference number |
| USERID | Userid where user normally resides |
| INITIALS | User's first and middle initial |
| SURNAME | User's surname |
| PHONE | Phone number n-nnn-nnnn |
| DEPT | User's department |
| BLDG | User's building |
| CUBE | User's cubicle |
| BIN | User's bin |
| NODE | User's current node |
| DIST | User's distribution |
| EMP_NO | Employee Number |
| AIX_IP_ADDR | AIX_IP_ADDR AIX Internet Protocol address |

Figure 75:
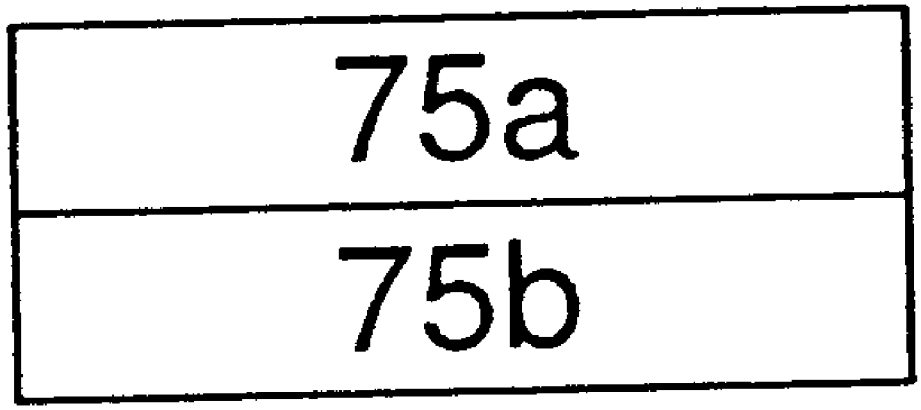
FIG. 75 which comprises FIG. 75a thru 75b, describes the QRAUTCHK Process.
Figure 75A:
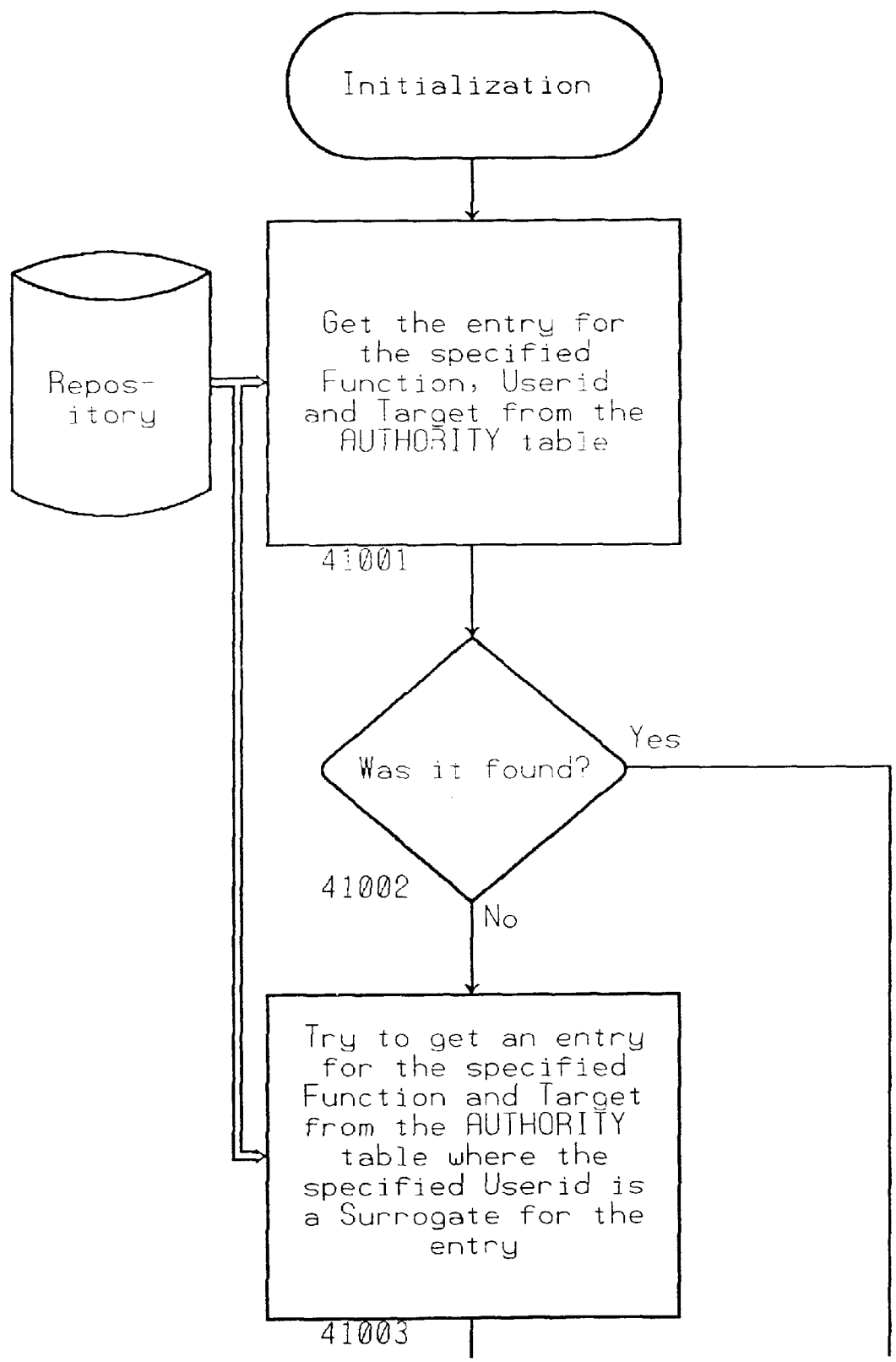
Figure 75B:
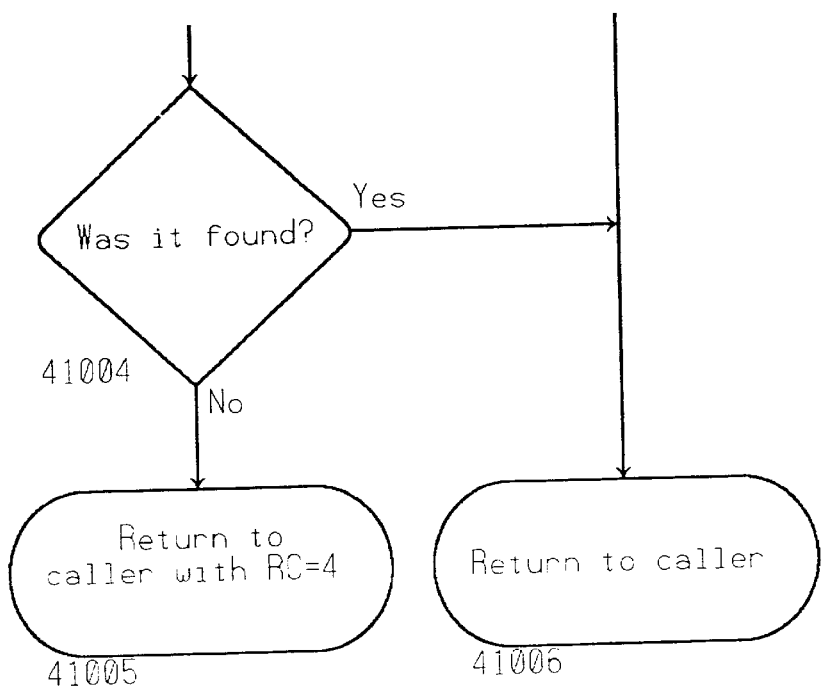

The QRAUTCHK Process FIG. 75: This process is used to check an authorization entry. It will check both the AUTHORITY table and the SURROGATES Table.

After initialization, a query 41001 is made to get the entry for the specified Function, Userid, and target from the AUTHORITY table in the Control Repository. Next, a check 41002 is made to determine if the entry was found. If so, the process returns 41006 to the caller. If not, a query 41003 is made to get an entry for the specified Function, Userid, and target from the AUTHORITY table where the specified Userid is a Surrogate for the entry. Next, a check 41004 is made to determine if an entry was found. If so, the process returns 41006 to the caller. If not, the process returns 41005 to the caller with Return Code=4.

Figure 76:
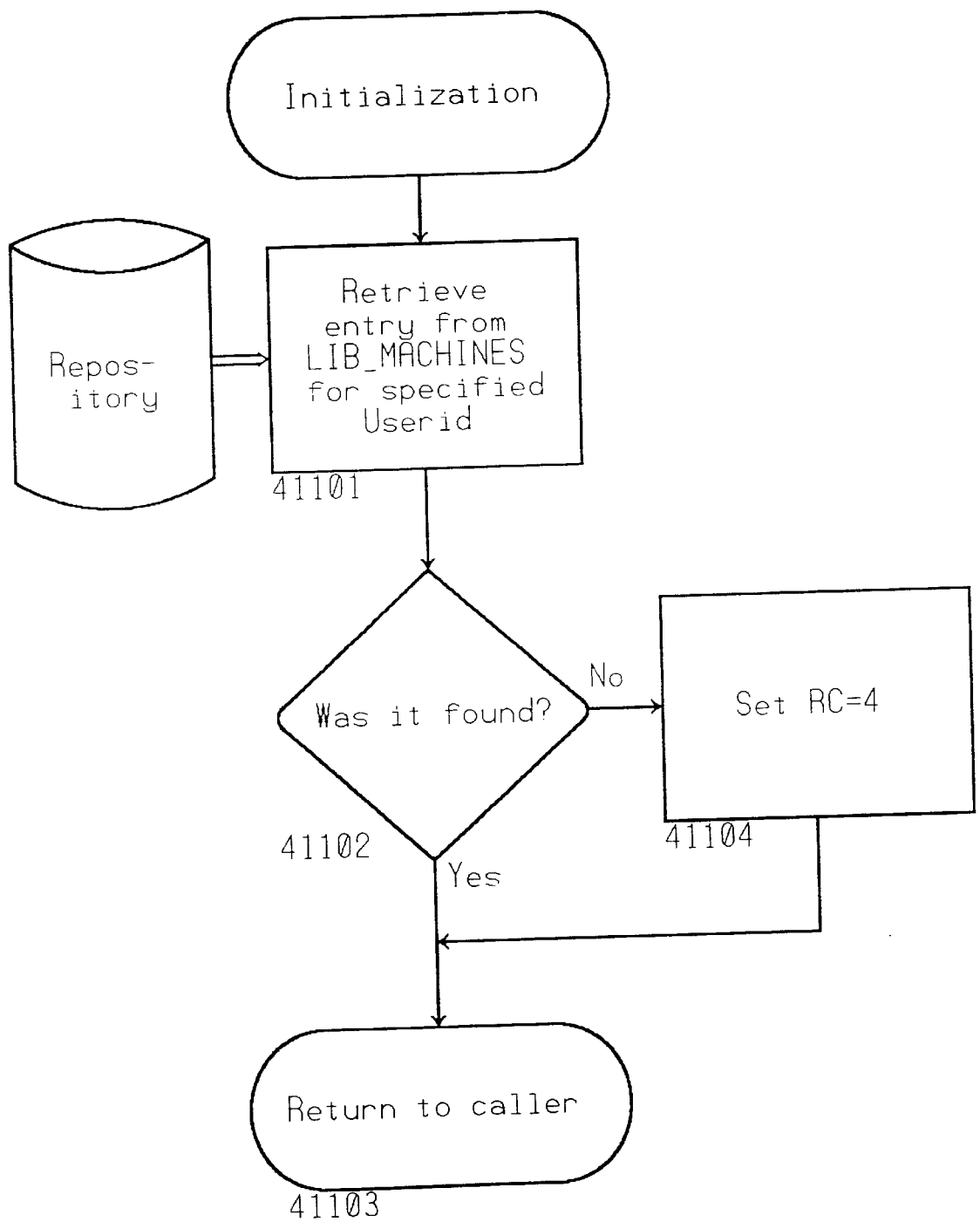
FIG. 76 describes the QRCHKLIB Process.

The QRCHKLIB Process FIG. 76: This process is used to check if the specified Userid is a Library Machine.

After initialization, a query 41101 is made to get an entry from the LIB_MACHINES table in the Control Repository for the specified Userid. Next, a check 41102 is made to determine if a entry wag found. If not, set 41104 the Return Code=4. In either case, the process returns 41103 to the caller.

Figure 77:
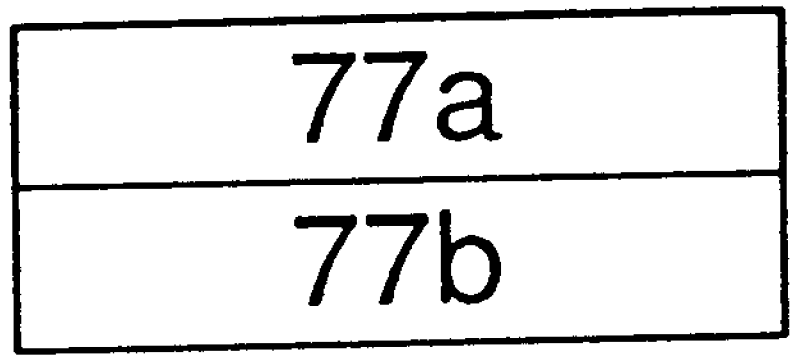
FIG. 77 which comprises FIG. 77a thru 77b, describes the QRCKAFAT Process.
Figure 77A:
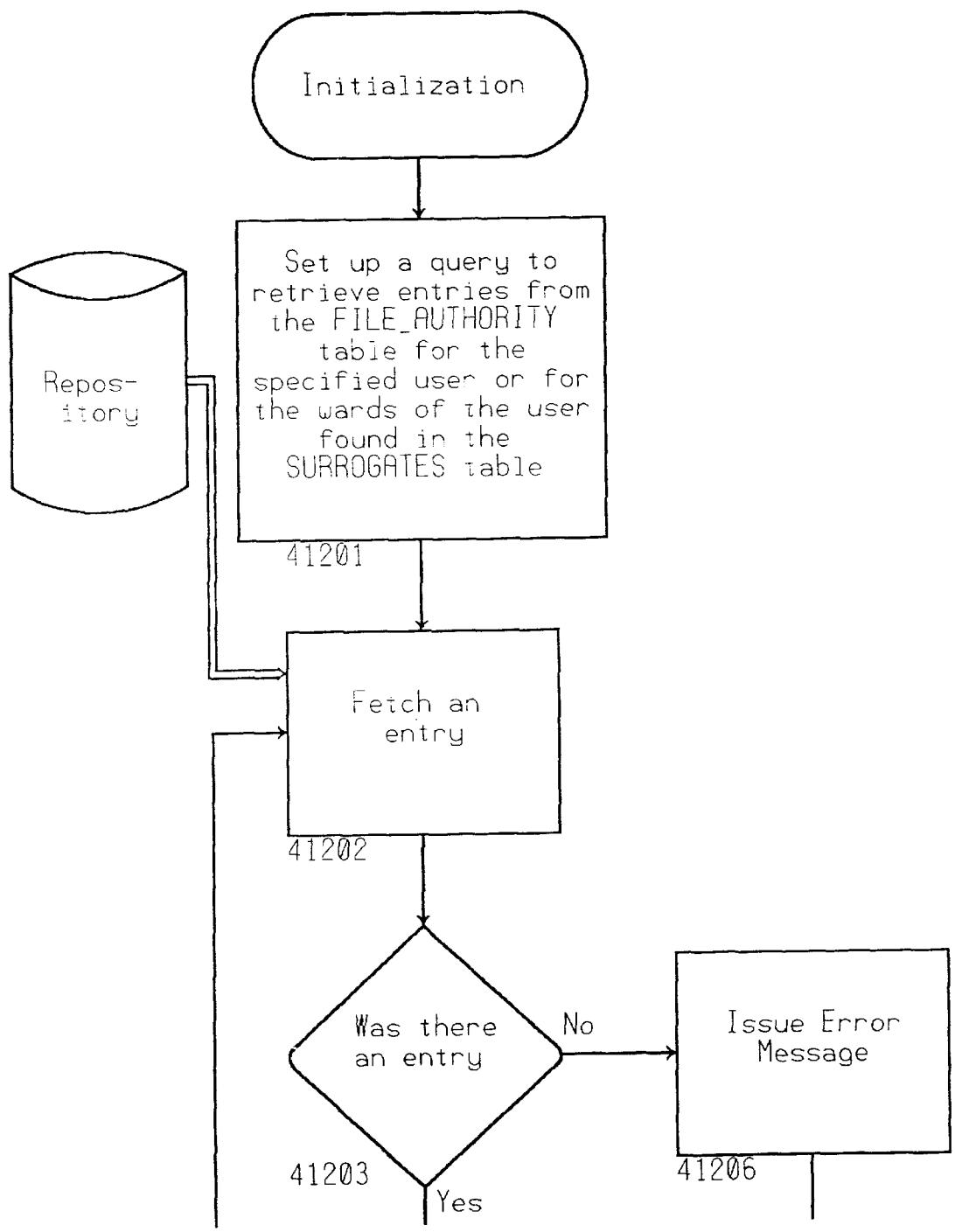
Figure 77B:
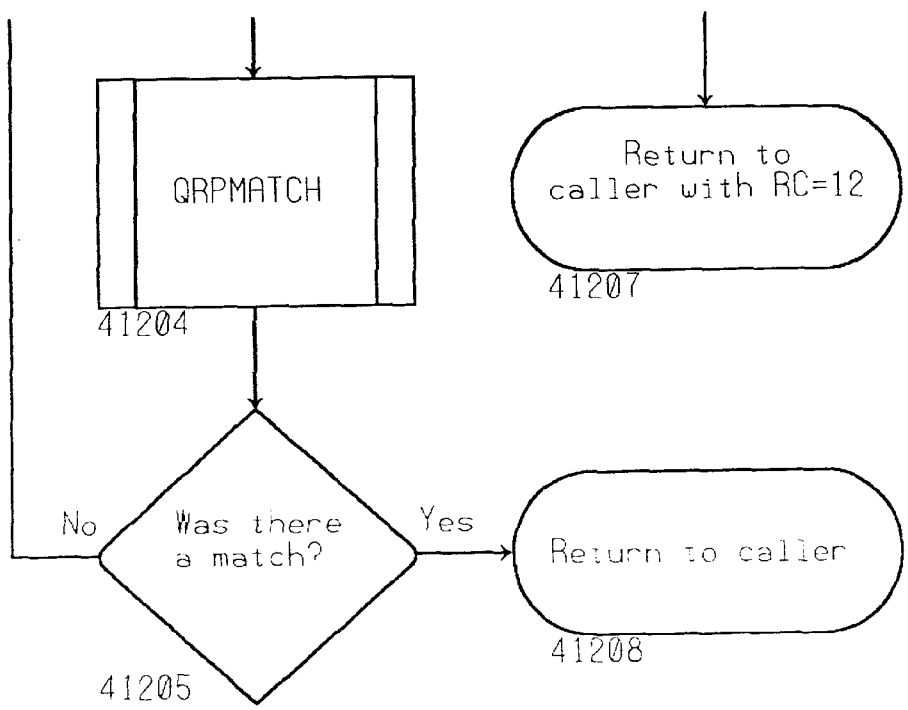

The QRCKAFAT Process FIG. 77: This process is used check File Authority.

Figure 81A:
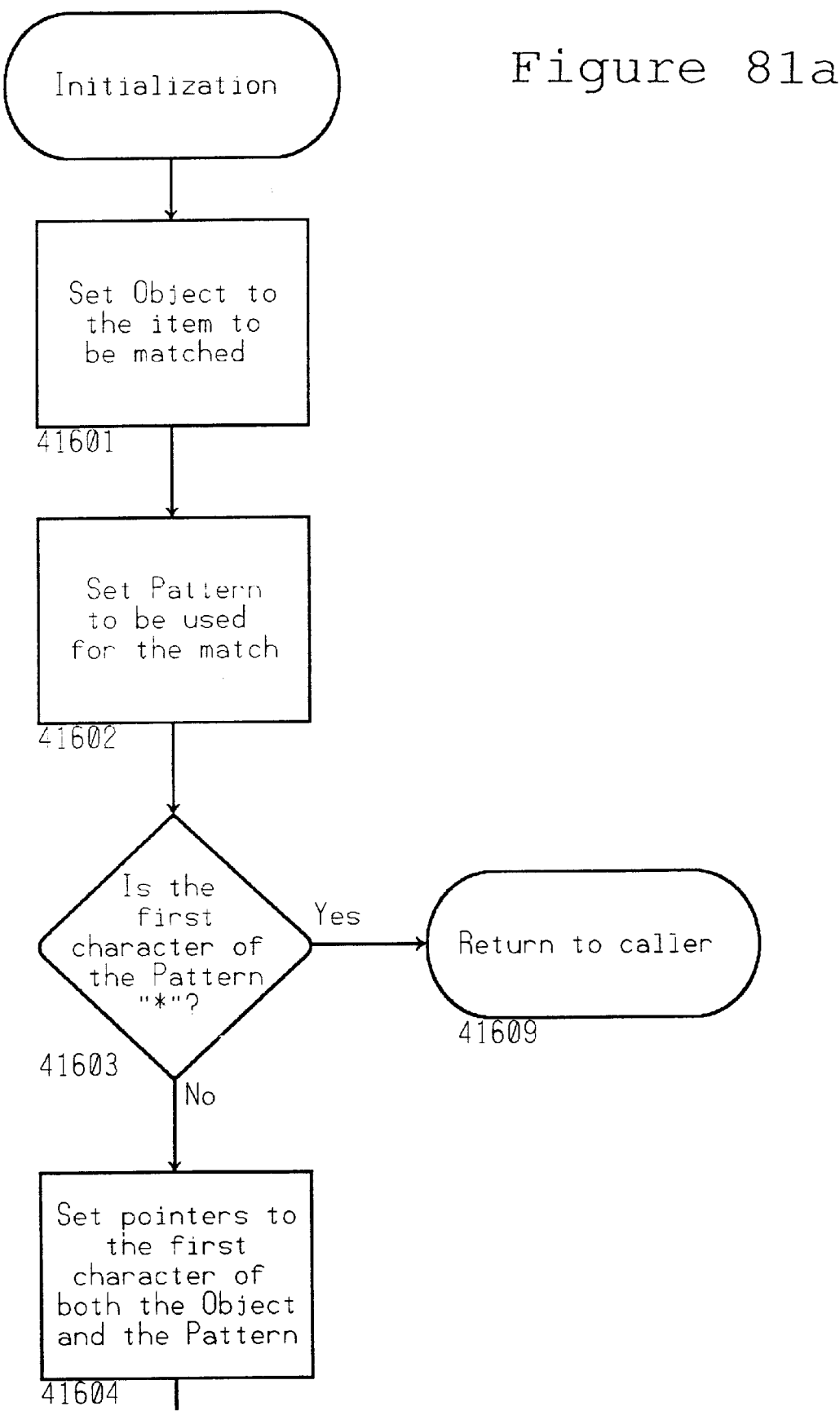
FIG. 81 which comprises FIG. 81a thru 81c, describes the QRPMATCH Process.
Figure 81B:
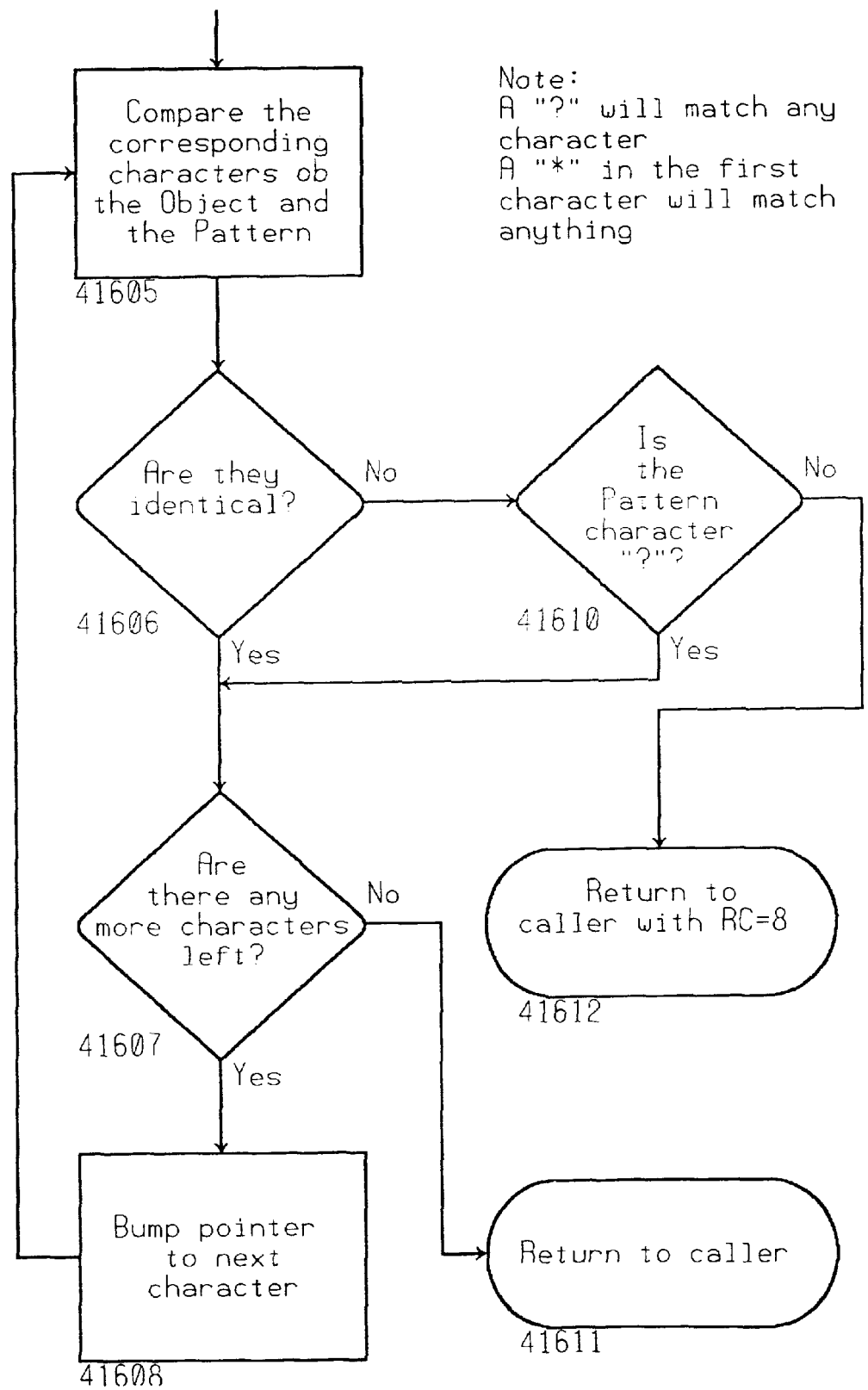

After initialization, set up 41201 a query to retrieve entries from the FILE_AUTHORITY table for the specified Userid or for Wards of the Userid found in the SURROGATES tame in the Control Repository. Next, fetch 41202 an entry. Then, a check 41203 is made to determine if there was an entry found. If not, an error message is issued 41206 and the process returns 41207 to the caller with Return Code=12. If so, the QRPMATCH Process described in FIG. 81 is invoked 41204. Upon return from the above process, a check 41205 is made to determine if there was a match. If so, the process returns 41208 to the caller. If not, the process flows back to 41202.

Figure 78:
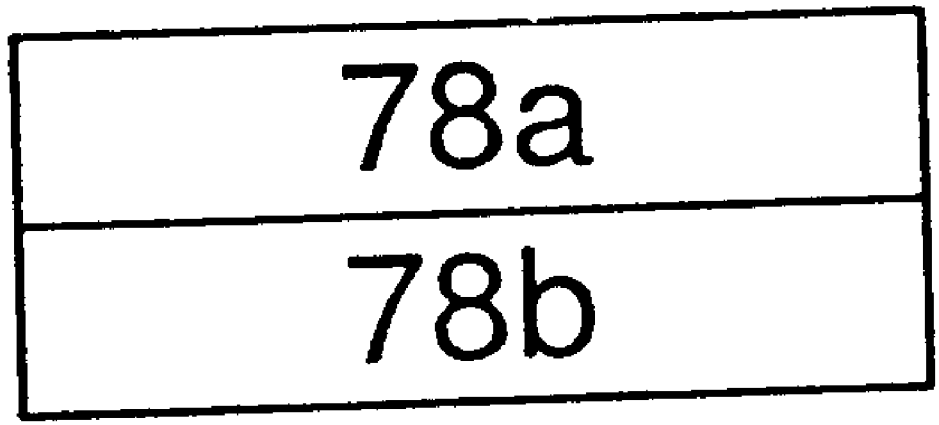
FIG. 78 which comprises FIG. 78a thru 78b, describes the QRCKAPAT Process.
Figure 78A:
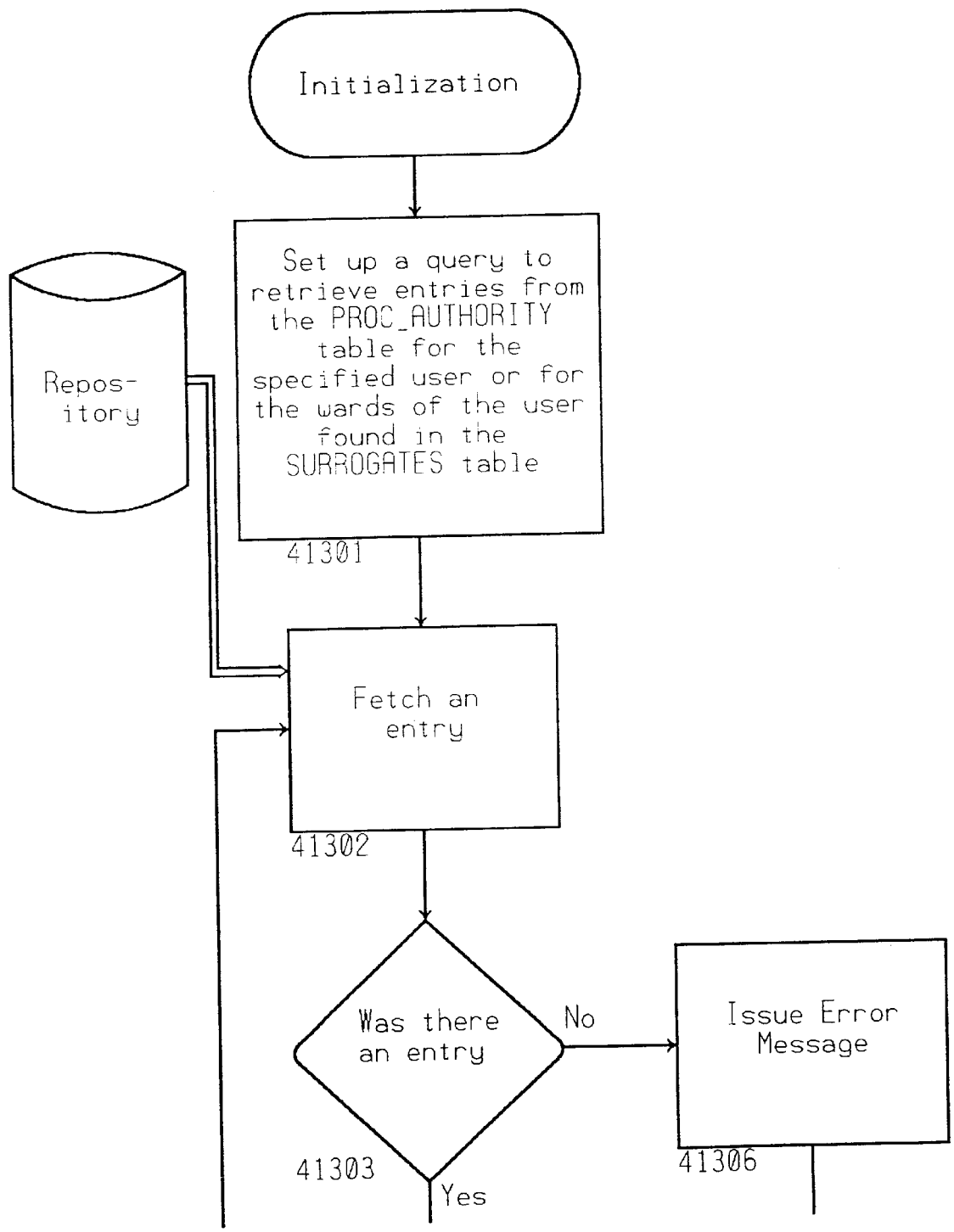
Figure 78B:
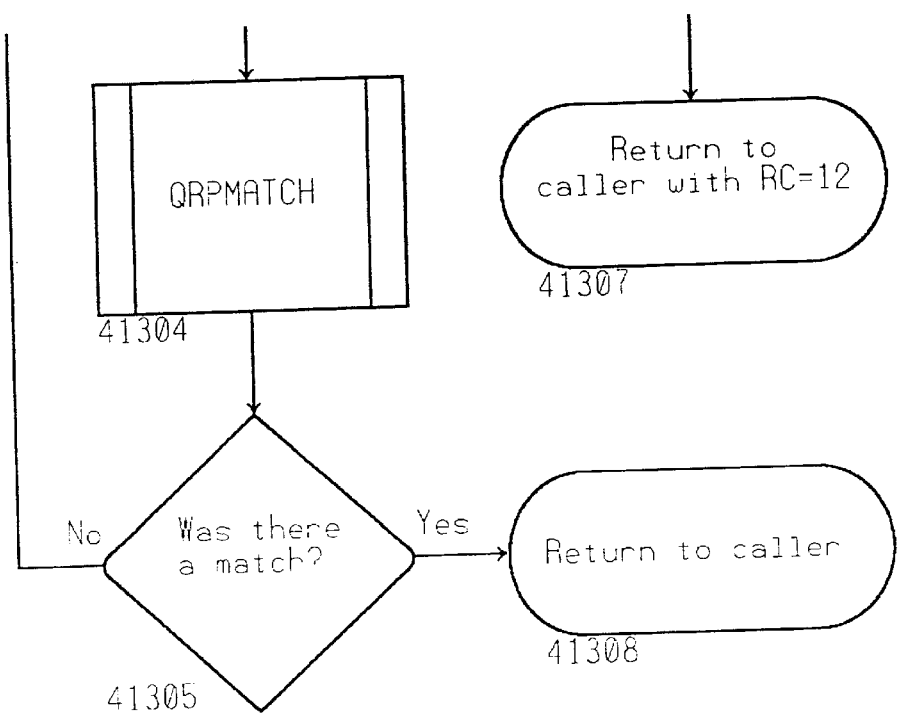

The QRCKAPAT Process FIG. 78: This process is used to check Process Authority.

After initialization, set up 41301 a query to retrieve entries from the PROC_AUTHORITY table for the specified Userid or for Wards of the Userid found in the SURROGATES table in the Control Repository. Next, fetch 41302 an entry. Then, a check 41303 is made to determine if there was an entry found. If not, an error message is issued 41306 and the process returns 41307 to the caller with Return Code=12. If so, the QRPMATCH Process described in FIG. 81 is invoked 41304. Upon return from the above process, a check 41305 is made to determine if there was a match. If so, the process returns 41308 to the caller. If not, the process flows back to 41302.

Figure 79:
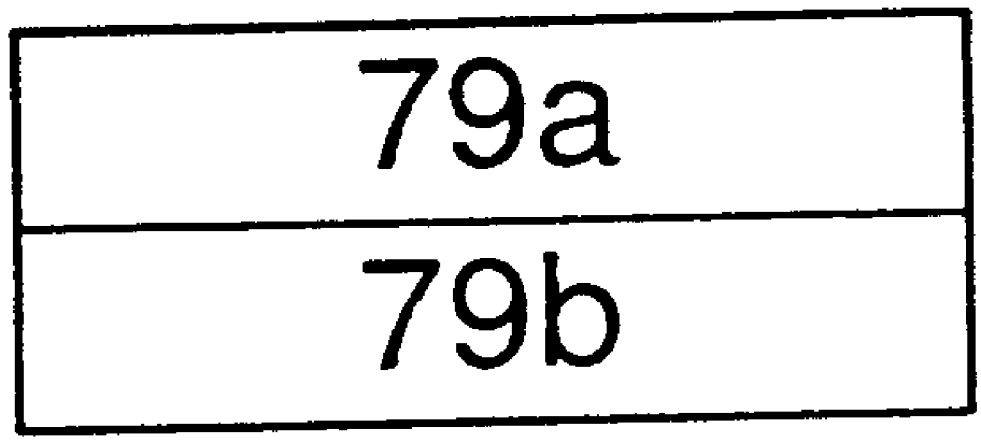
FIG. 79 which comprises FIG. 79a thru 79b, describes the QRMGRCKA Process.
Figure 79A:
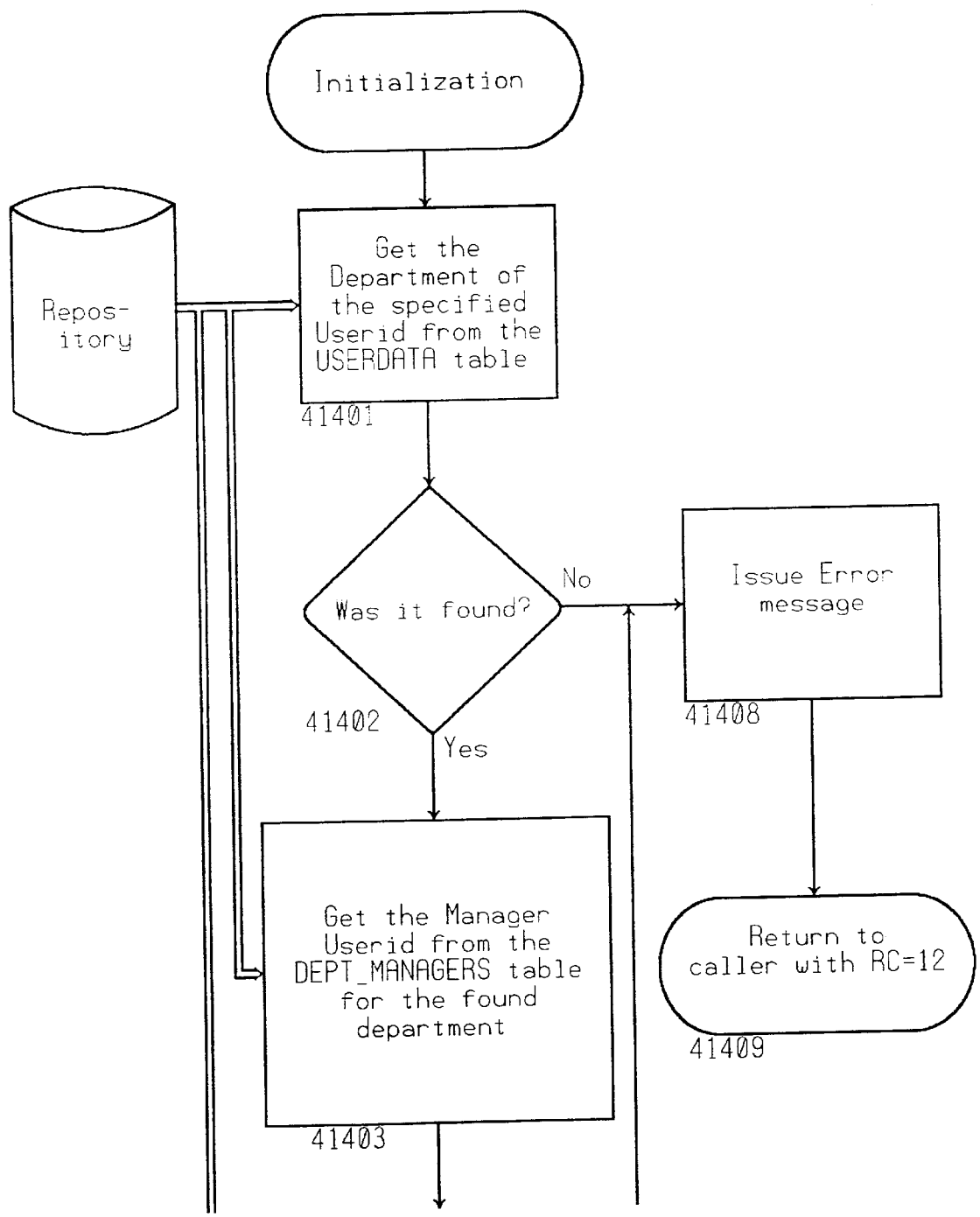
Figure 79B:
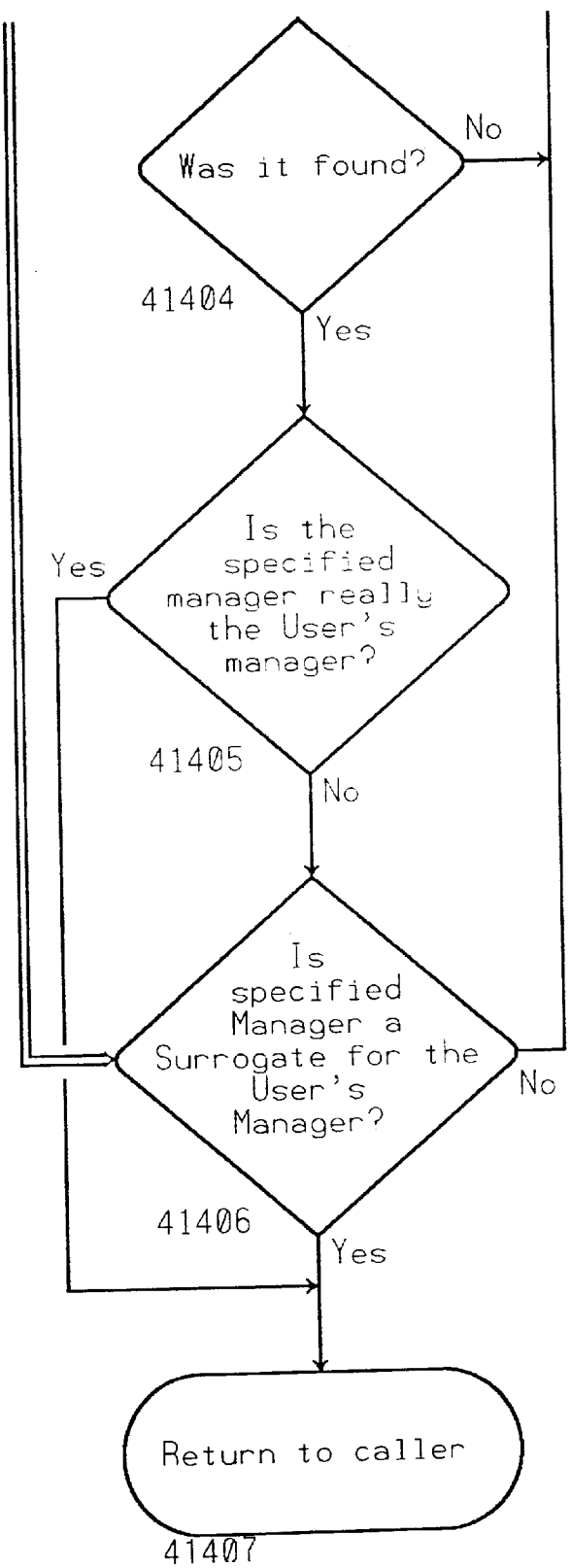

The QRMGRCKA Process FIG. 79: This process is used to check whether a specified Manager is really the manager of the employee owning a specified Userid.

After initialization, a query 41401 is made to get the Department of the specified Userid from the USERDATA table from the Control Repository. Next, a check 41402 is made to determine if the Department was found. If not, an error message is issued 41408 and the process returns 41409 to the caller with Return Code=12. If so, a query 41403 is made to get the Manager Userid from the DEPT_MANAGERS table for the found department Next, a check 41404 is made to determine if it was found. If not, an error message is issued 41408 and the process returns 41409 to the caller with Return Code=12. If so, a check 41405 is made to determine if the specified Manger is really the specified Userid's manager. If not, a check 41406 is made to determine if the specified Manager is a Surrogate for the Userid's Manager. If not, an error message is issued 41408 and the process returns 41409 to the caller with Return Code=12. If the specified Manger is really the specified Userid's manager, or a Surrogate for the Userid's Manager the process returns 41407 to the caller.

Figure 80:
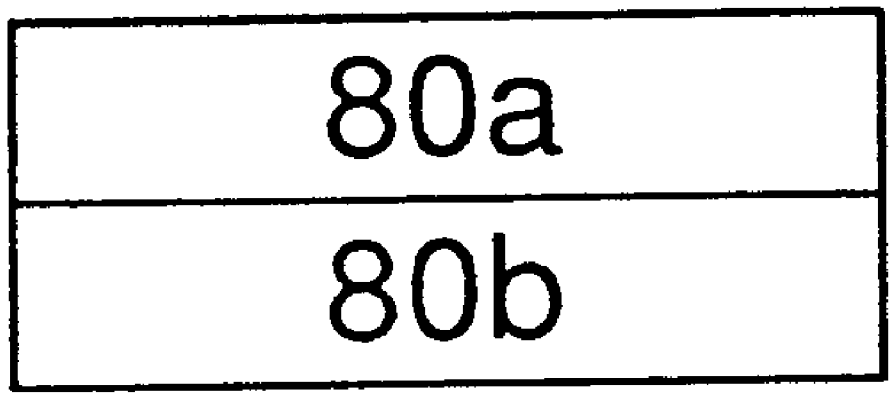
FIG. 80 which comprises FIG. 80a thru 80b, describes the QRPKGCKA Process.
Figure 80A:
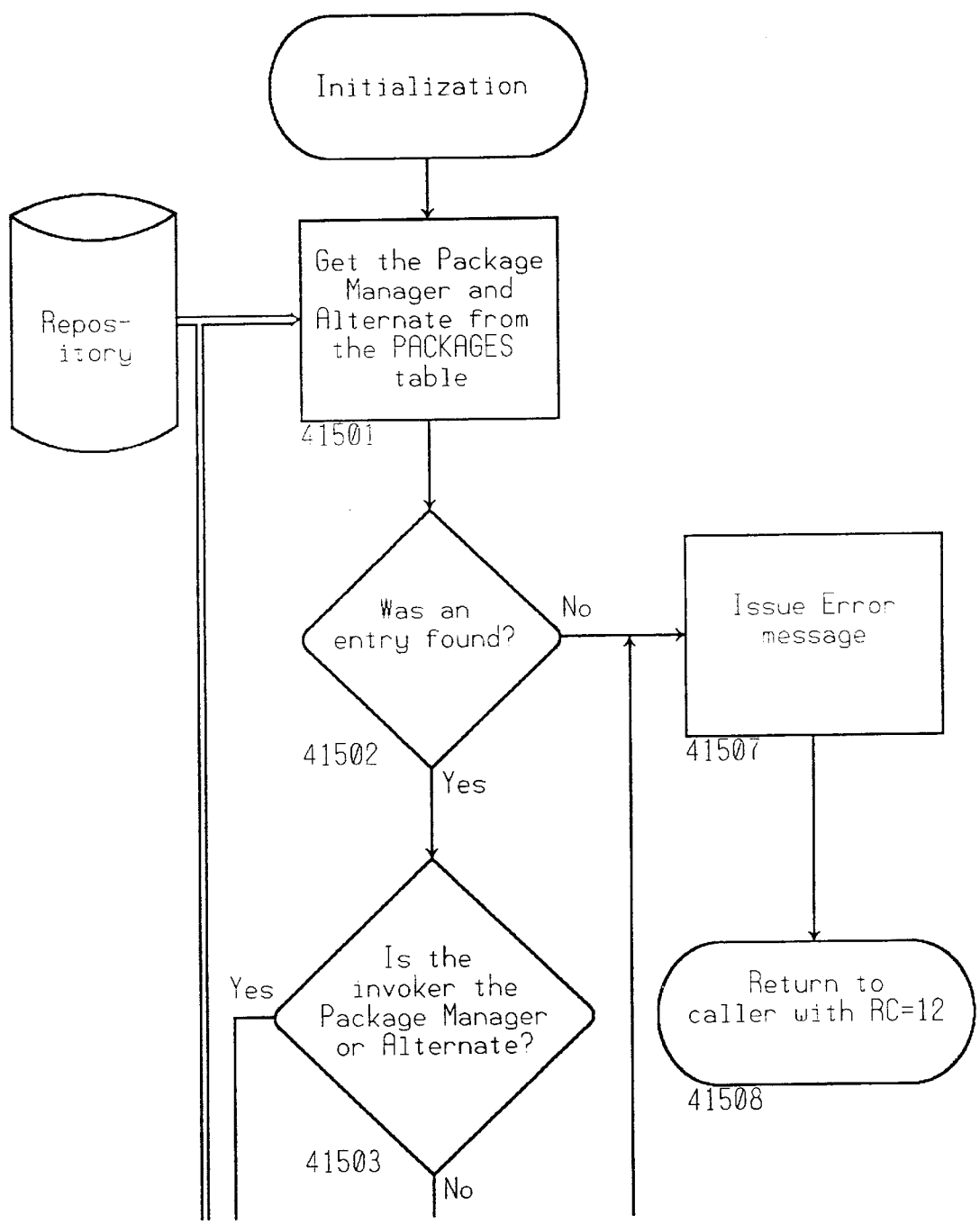
Figure 80B:
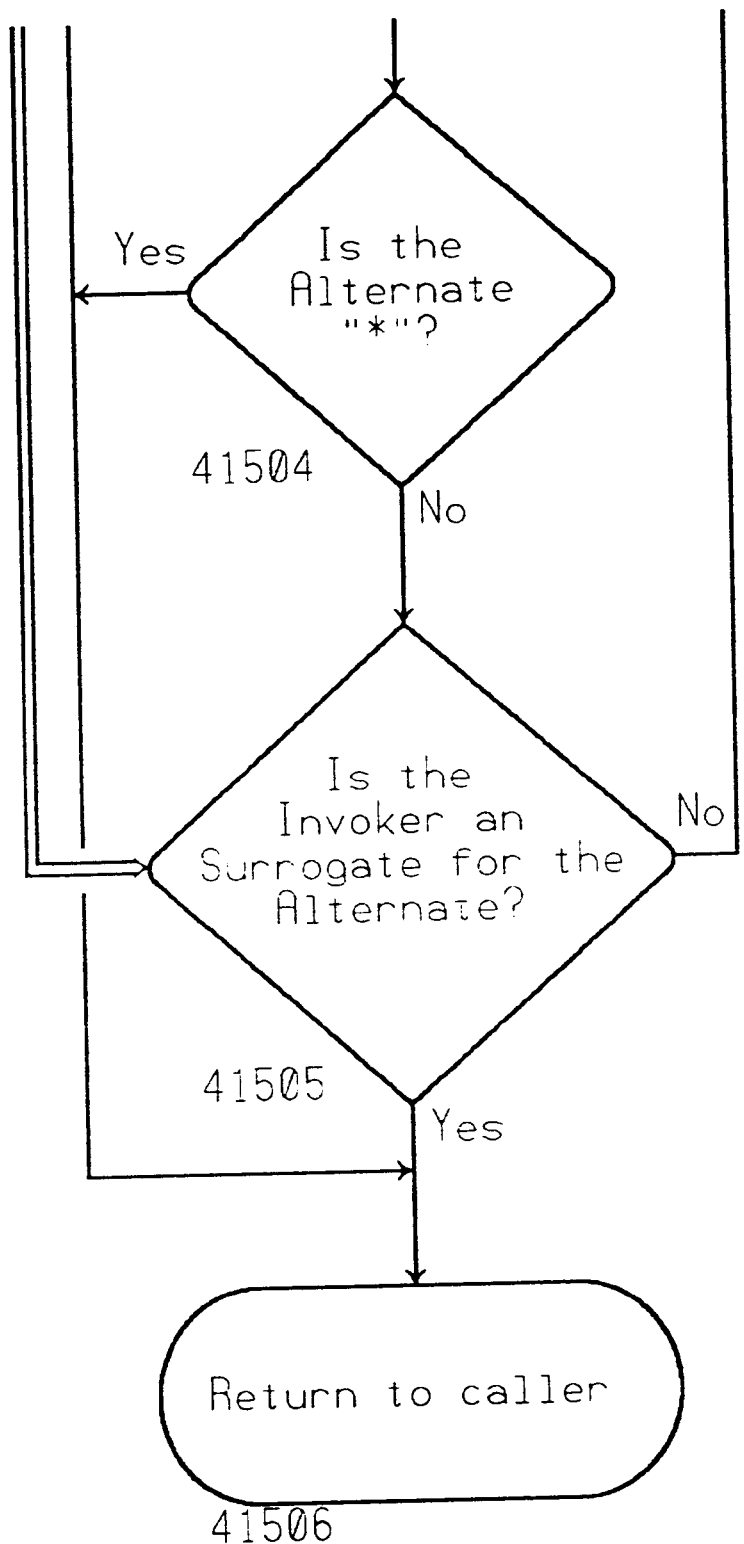

The QRPKGCKA Process FIG. 80: This process is used to determine if the Invoker has Package Manager Authority.

After initialization, a query 41501 is made to get the Package Manager and Alternate Userids from the PACKAGES table in the Control Repository. Then, a check 41502 is made to determine if an entry was found. If not, an error message is issued 41507 and the process returns 41503 to the caller with Return Code=12. If so, a check 41503 is made to determine if the Invoker is the Package Manager or Alternate. If not, a check 41504 is made to determine if the Alternate is "*". If not, a check 41505 is made to determine if the Invoker is a Surrogate for the Alternate. If not, an error message is issued 41507 and the process returns 41508 to the caller with Return Code=12. If the Invoker is the Package Manager or alternate, or the Alternate is "*", or the Invoker is a Surrogate for the Alternate, the process returns 41506 to the caller.

The QRPMATCH Process FIG. 81: This process is used to determine if a specified object matches a specified pattern. A "?" will match any character and a "*" in the first position of the pattern will match anything.

After initialization, the object to be matched is set 41601 to OBJECT and the pattern to be used is set 41602 to Pattern. Then, a check 41603 is made to determine if the first character of the Pattern is a "*". If so, the process returns 41609 to the caller. If not, pointers are set 41604 to the first character of the Object and the first character of the Pattern. Next, compare 41605 the corresponding characters of the Object and Pattern. Then, a check 41606 is made to determine if they are identical. If so, a check 41607 is made to determine if there are any more characters left. If so, bump 41608 the pointers to the next character and the process then flows back to 41605. If the characters are not identical, a check 41610 is made to determine if the pattern character is a "?". If not, the process returns 41612 to the caller with Return Code=8. If so, the process flows back to 41607.

Figure 82:
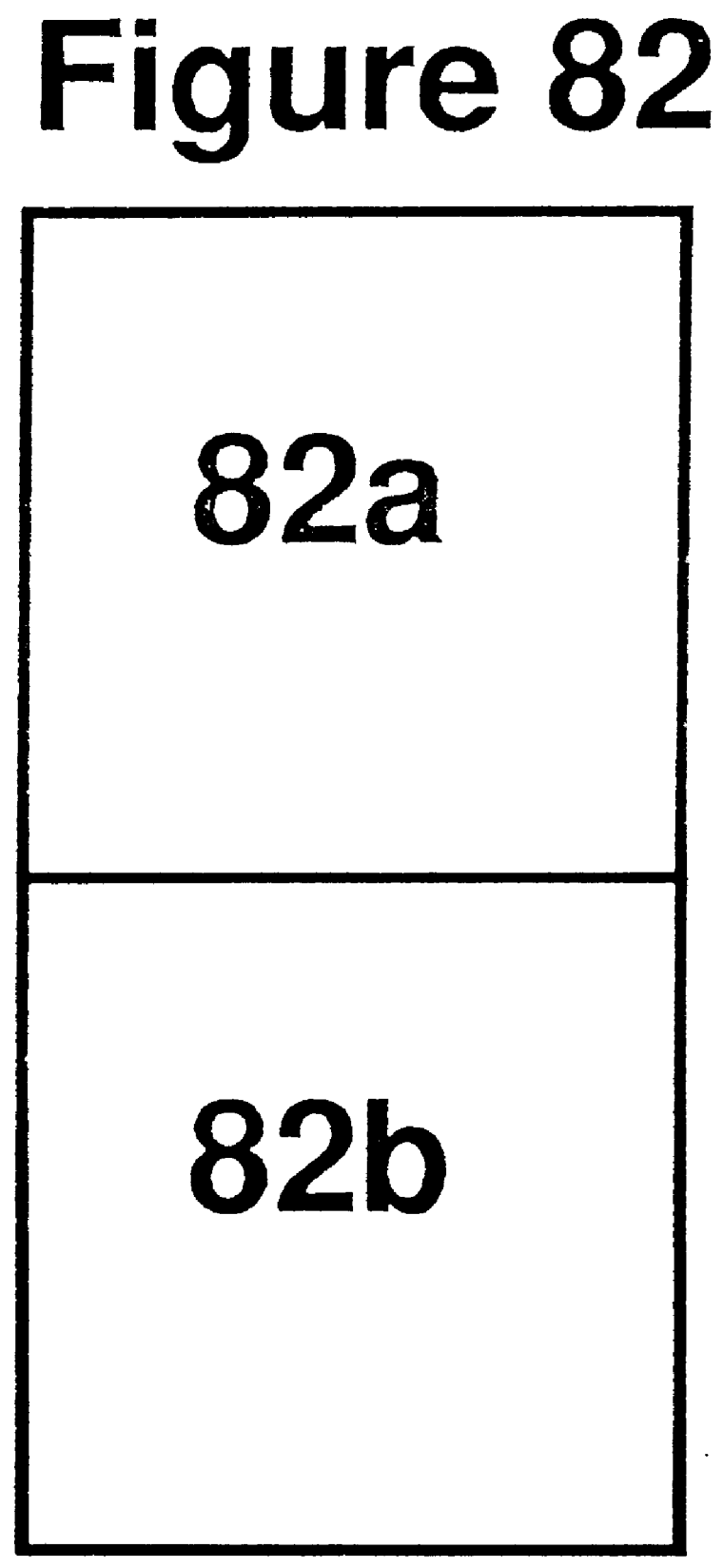
Figure 82A:
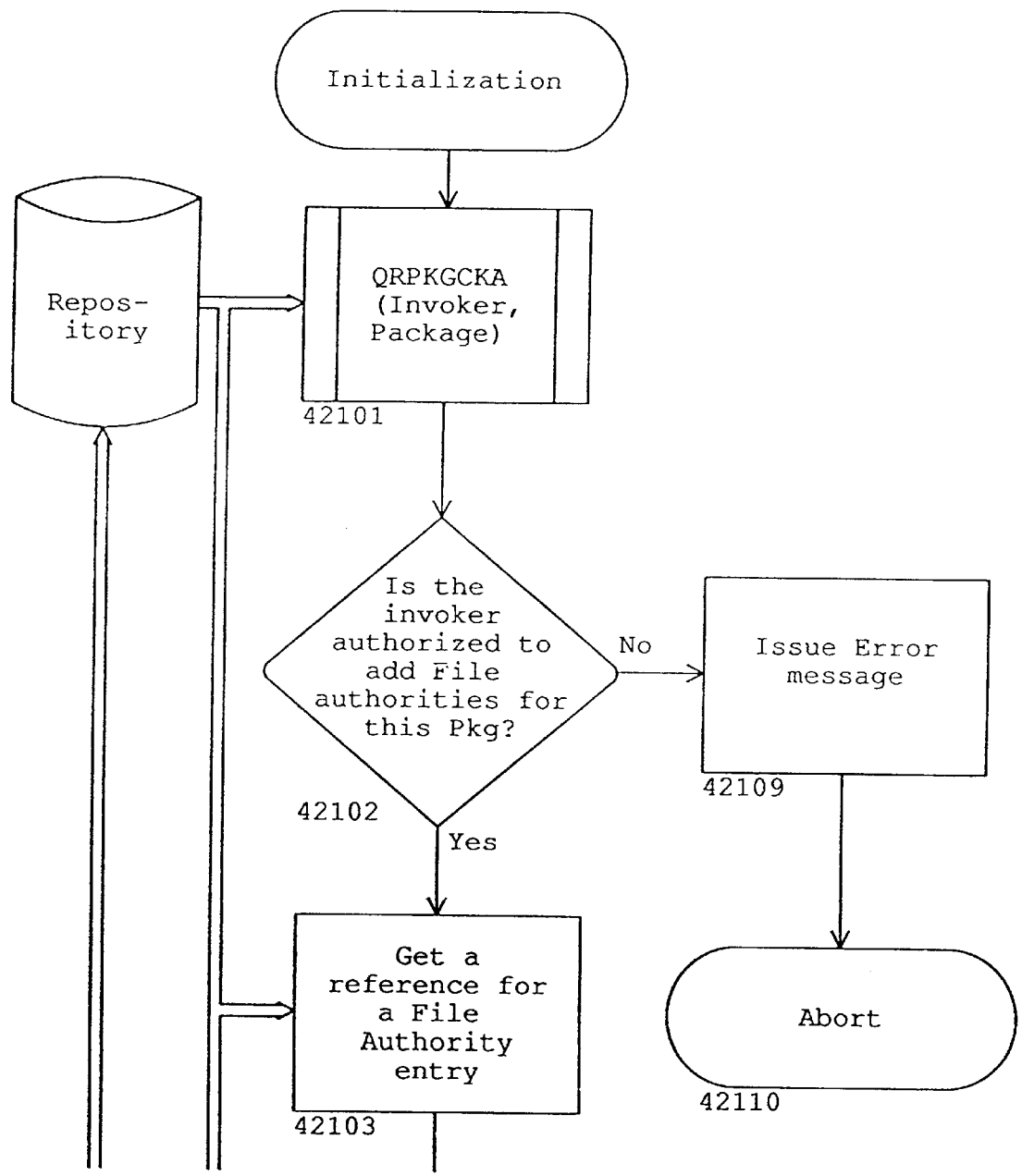
FIG. 82 which comprises FIG. 82a thru 82b, describes the QRFATADD Process.
Figure 82B:
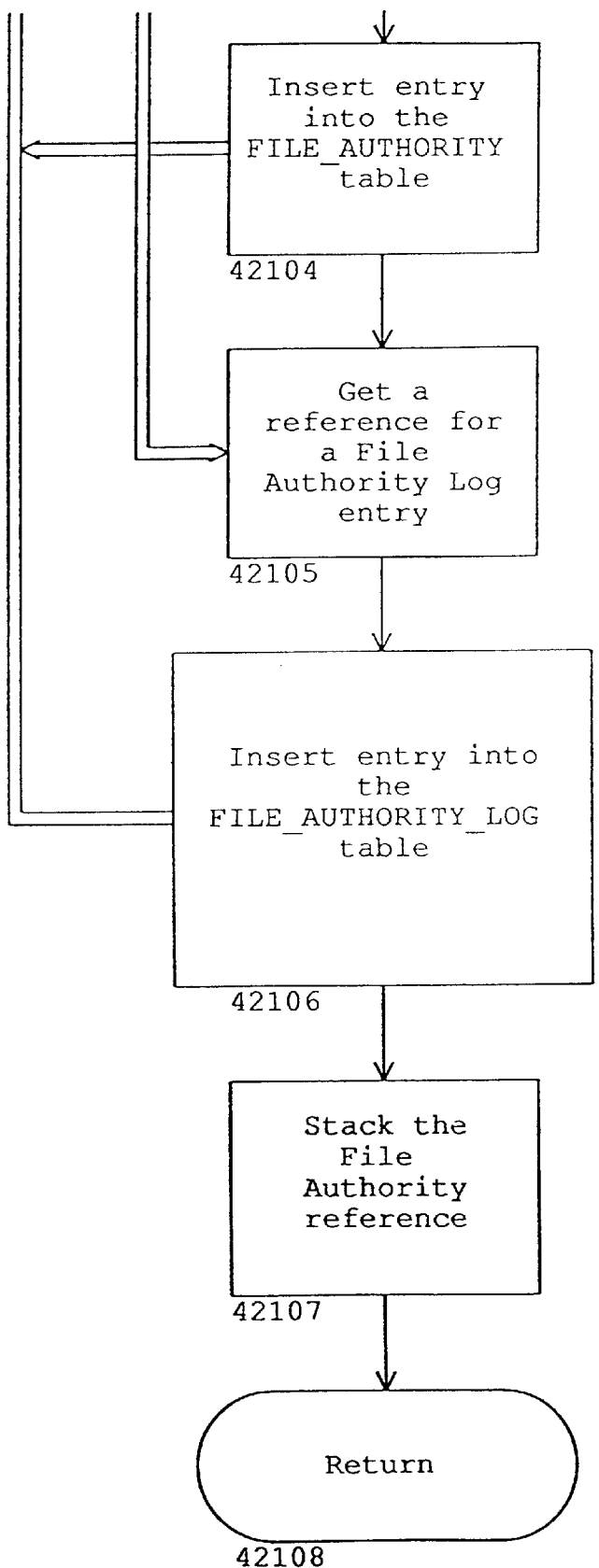

The QRFATADD Process FIG. 82: This process is used to add an entry to the FILE_AUTHORITY table.

After initialization, the QRPKGCKA Process described in FIG. 80 is invoked 42101. Upon return from the above process, a check 42102 is made to determine if the Invoker is authorized to add File Authorities for the Package. If not, an error message is issued 42109 and the process aborted 42110. If so, a query 42103 is made to get a reference number for the File Authority entry. Then, the File Authority entry is inserted 42104 into the FILE_AUTHORITY table in the Control Repository. Next, a query 42105 is made to get a reference number for the File Authority Log entry. Then, the File Authority Log entry is inserted 42106 into the FILE_AUTHORITY_LOG table in the Control Repository. Next, the File Authority reference number is stacked 42107 the process returns 42108.

Figure 83:
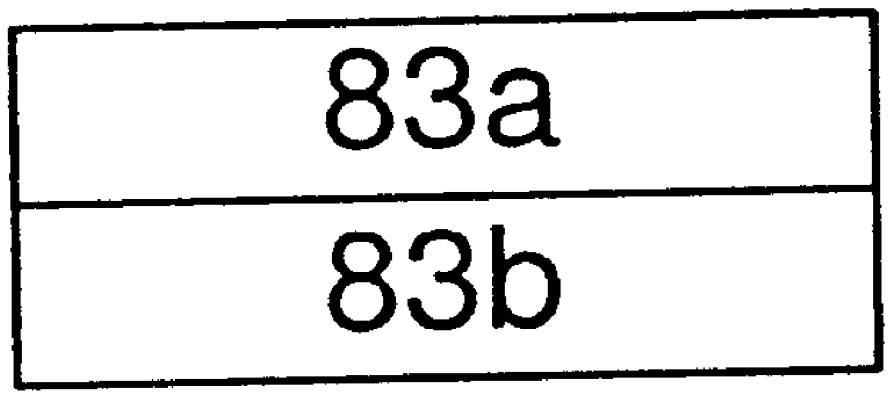
FIG. 83 which comprises FIG. 83a thru 83b, describes the QRFATCHK Process.
Figure 83A:
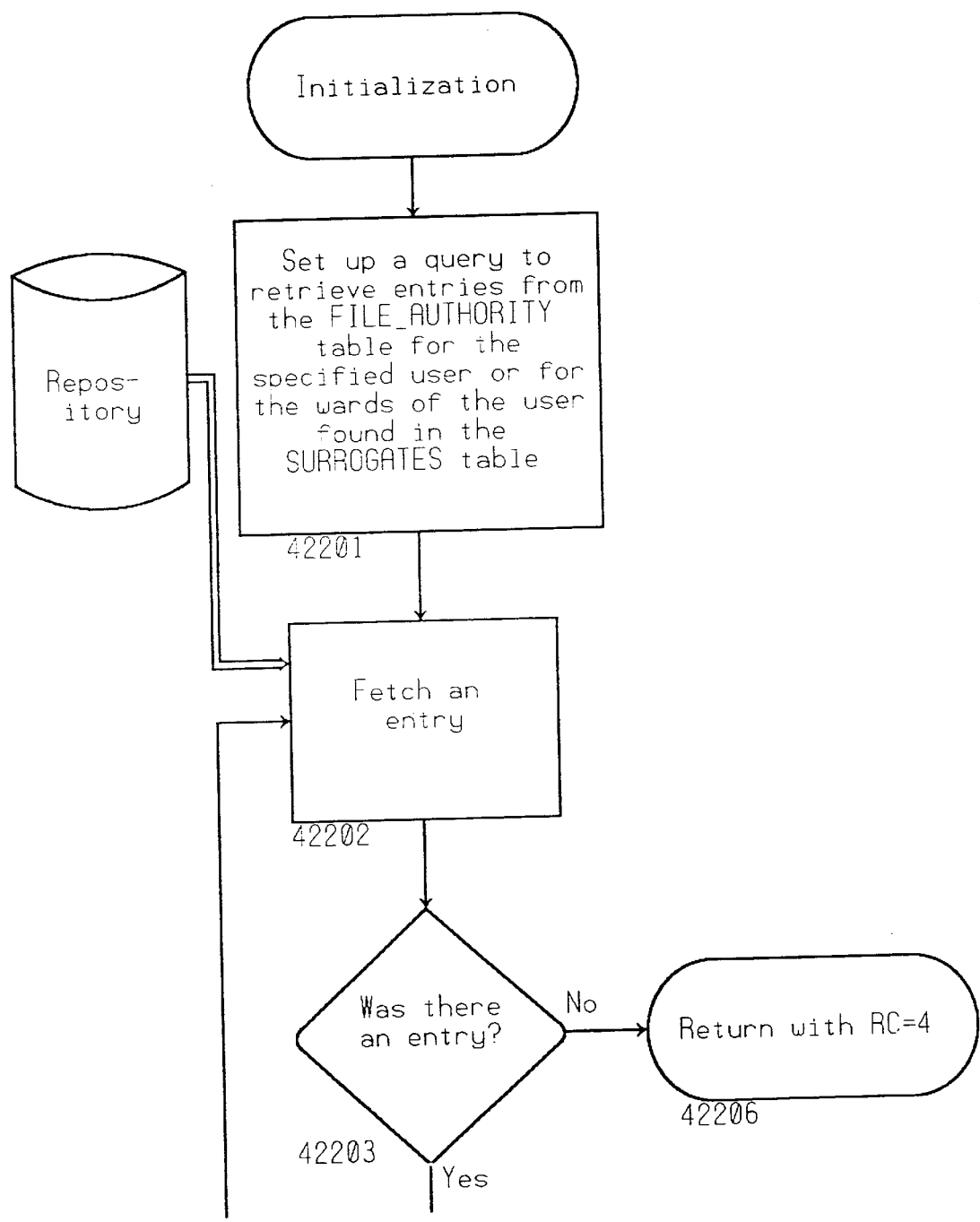
Figure 83B:
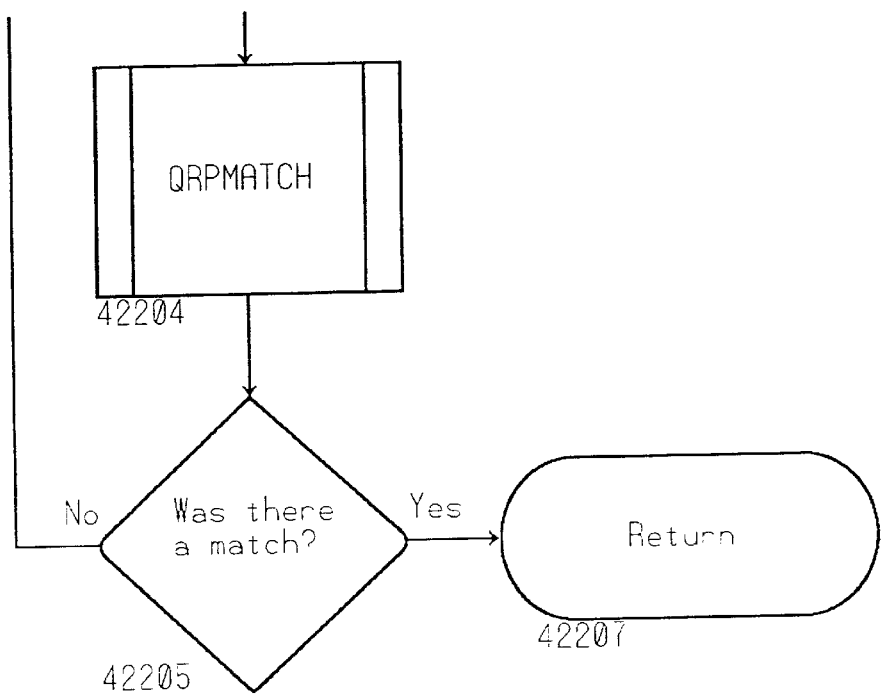
Figure 84A:
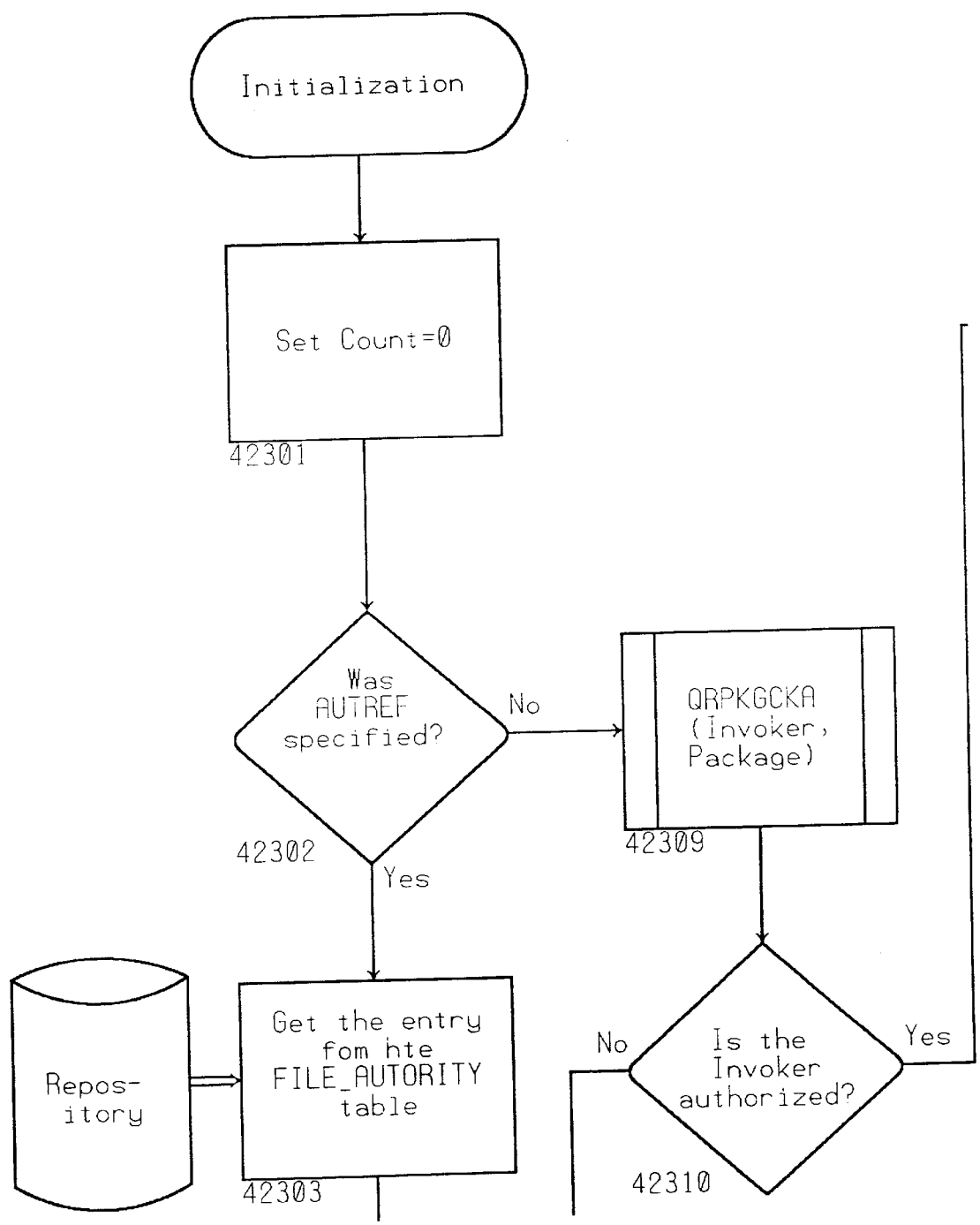
FIG. 84 which comprises FIG. 84a thru 84d, describes the QRFATDEL Process.
Figure 84B:
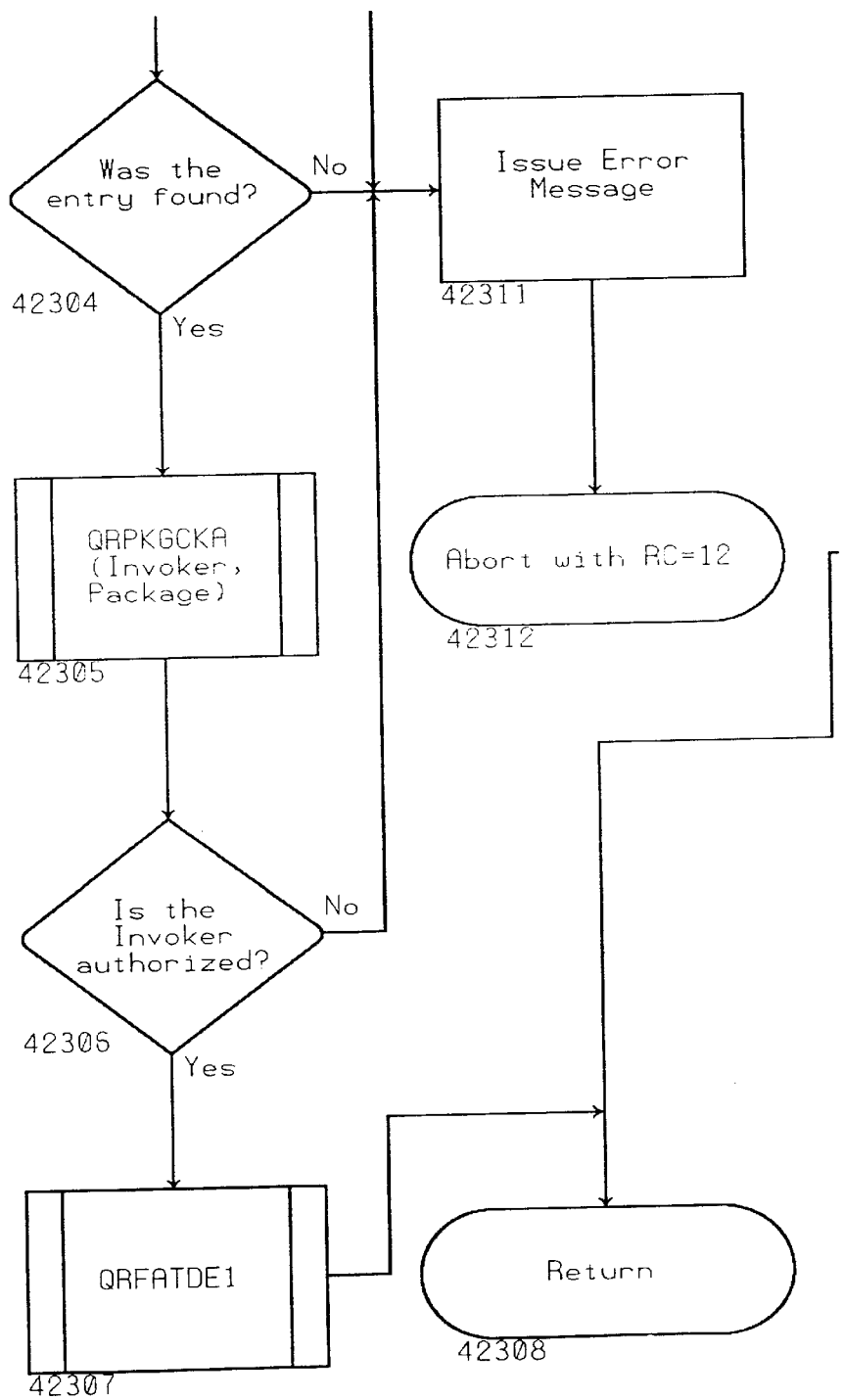
Figure 84C:
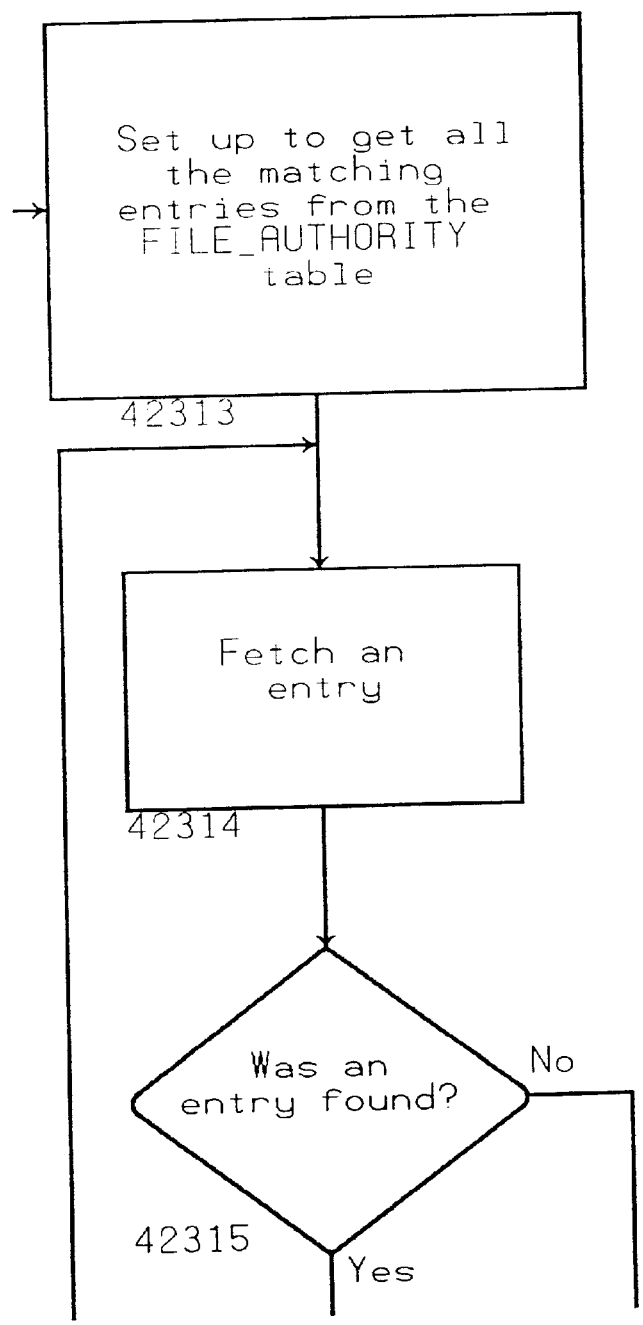
Figure 84D:
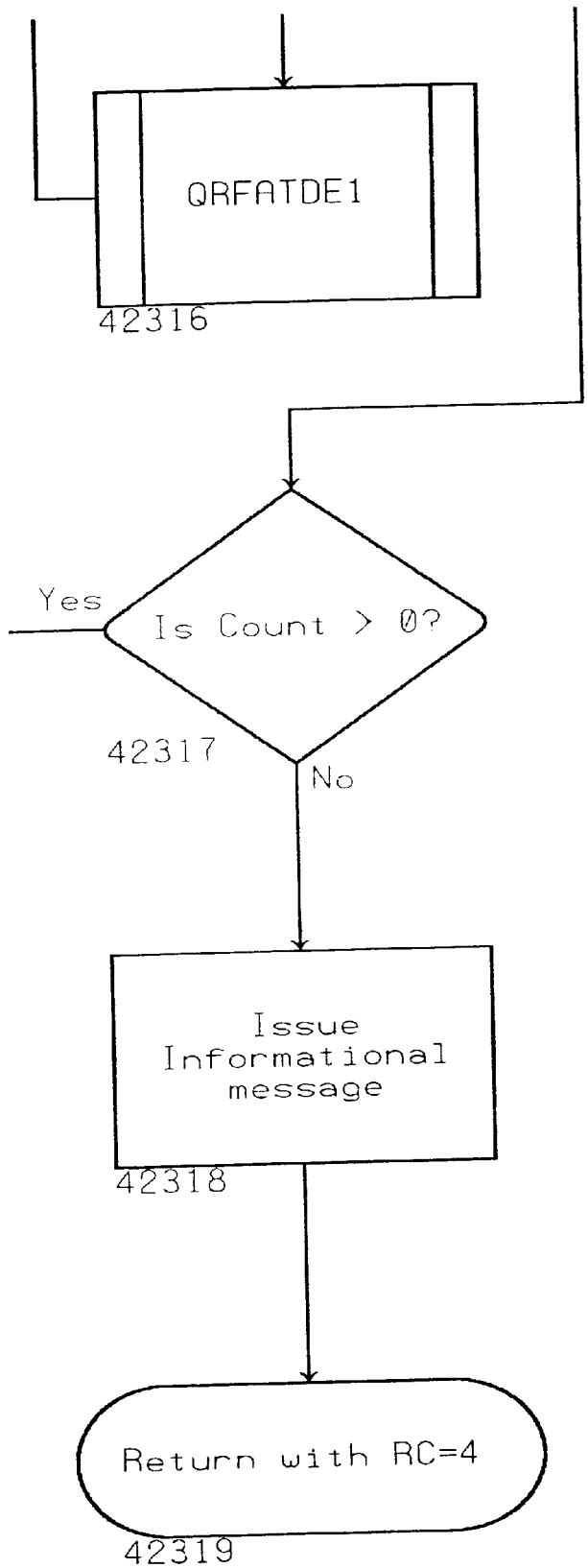

The QRFATCHK Process FIG. 83: This process is used to check to see if a user is authorized to perform a function on a given package, library filetype, version, library level and filename. It will check both the FILE_AUTHORITY table and the SURROGATES table.

After initialization, a query is set up 42201 to retrieve entries from the FILE_AUTHORITY table for the specified user or for wards of the user found in the SURROGATES table in the Control Repository. Then, an entry is fetched 42202 from the Control Repository. Next, a check 42203 is made to determine if there was an entry. If not, the process returns 42206 to the caller with Return Code=4. If so, the QRPMATCH Process described in FIG. 81 is invoked 42204. Upon return from the above process, a check 42205 is made to determine if there was a match. If not, the process flows back to 42202. If so, the process returns 42207 to the caller.

The QRFATDEL Process FIG. 84: This process is used to delete entries from the FILE_AUTHORITY table.

Figure 85:
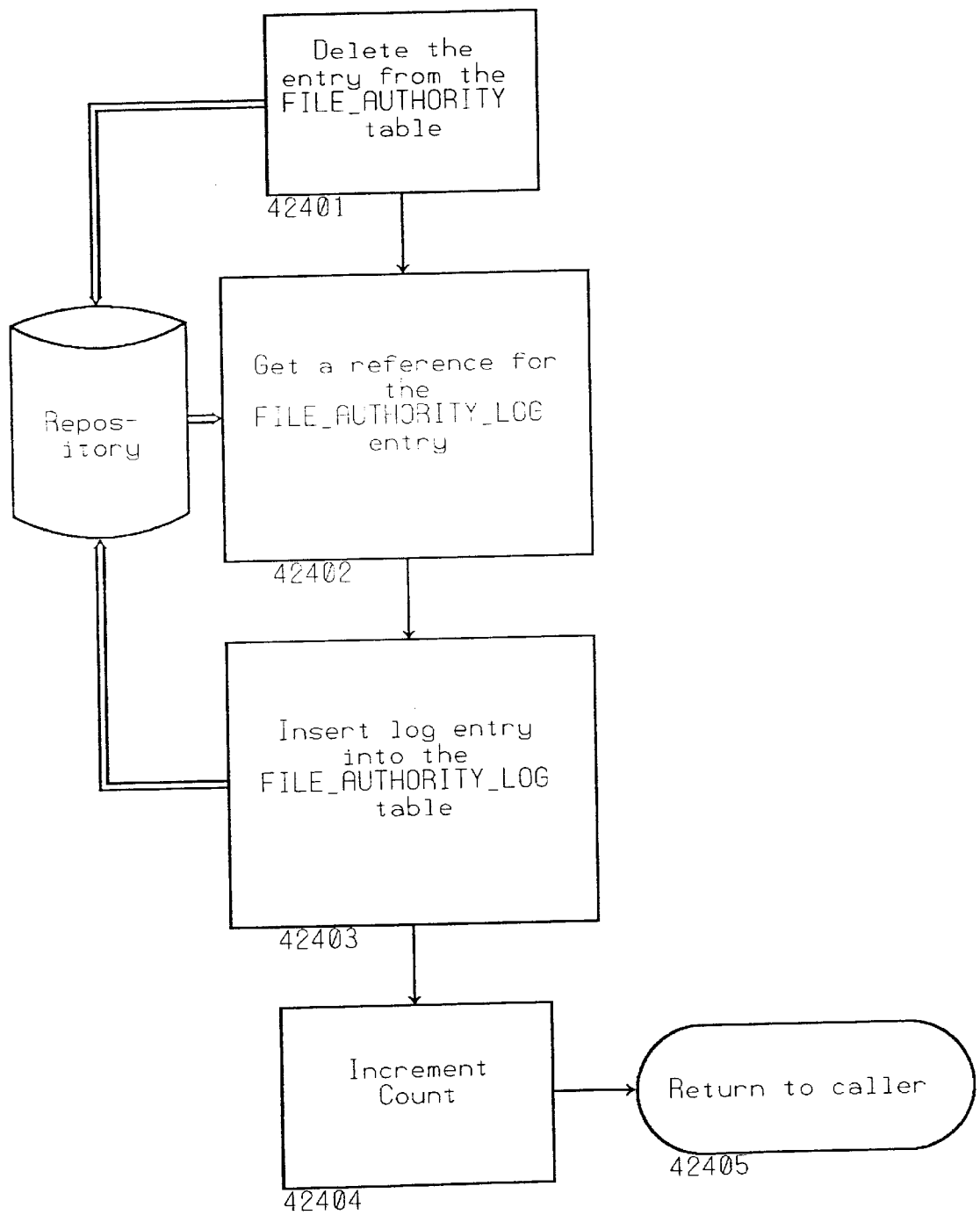
FIG. 85 describes the QRFATDE1 Process.

After initialization, the Count is set 42301 to 0. Next, a check 42302 is made to determine if AUTREF was specified. If so, a query 42303 is made to get the entry from the FILE_AUTHORITY table in the Control Repository. Next, a check 42304 is made to determine if the entry was found. If not, an error message is issued 42311 and the process aborted 42312 with Return Code=12. If so, the QRPKGCKA Process described in FIG. 80 is invoked 42305. Upon return from the above process, a check 42306 is made to determine if the Invoker is authorized. If so, the QRFATDE1 Process described in FIG. 85 is invoked 42307. Upon return from the above process, the process returns 42308. If AUTREF was not specified, the QRPKGCKA Process described in FIG. 80 is invoked 42309. Upon return from the above process, a check 42310 is made to determine if the Invoker is authorized. If not, an error message is issued 42311 and the process aborted 42312 with Return Code=12. If so, a query is set up 42313 to get all the matching entries from the FILE_AUTHORITY table. Then, an entry is fetched 42314. Next, a check 42315 is made to determine if an entry was found. If so, the QRFATDE1 Process described in FIG. 85 is invoked 42316. Upon return from the above process, the process flows back to 42314. If an entry was not found, a check 42317 is made to determine if the Count is greater than 0. If so, the process returns 42308. If not, an informational message is issued 42318 the process returns 42319 to the caller with Return Code=4.

The QRFATDE1 Process FIG. 85: This process is used by the QRFATDEL process to delete the FILE_AUTHORITY entry.

First, the entry is deleted 42401 from the FILE_AUTHORITY table in the Control Repository. Next, a reference for the FILE_AUTHORITY_LOG entry is obtained 42402. Then, the log entry is inserted 42403 into the FILE_AUTHORITY_LOG table in the Control Repository. Then, the Count is incremented 42404 and the process returns 42405 to the caller.

Figure 86:
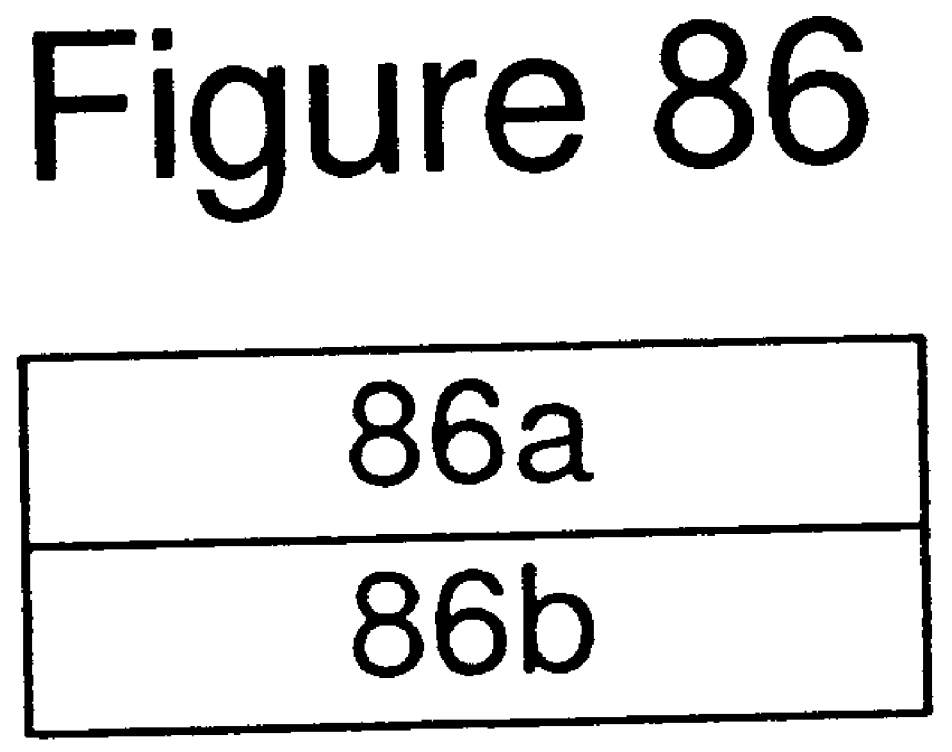
Figure 86A:
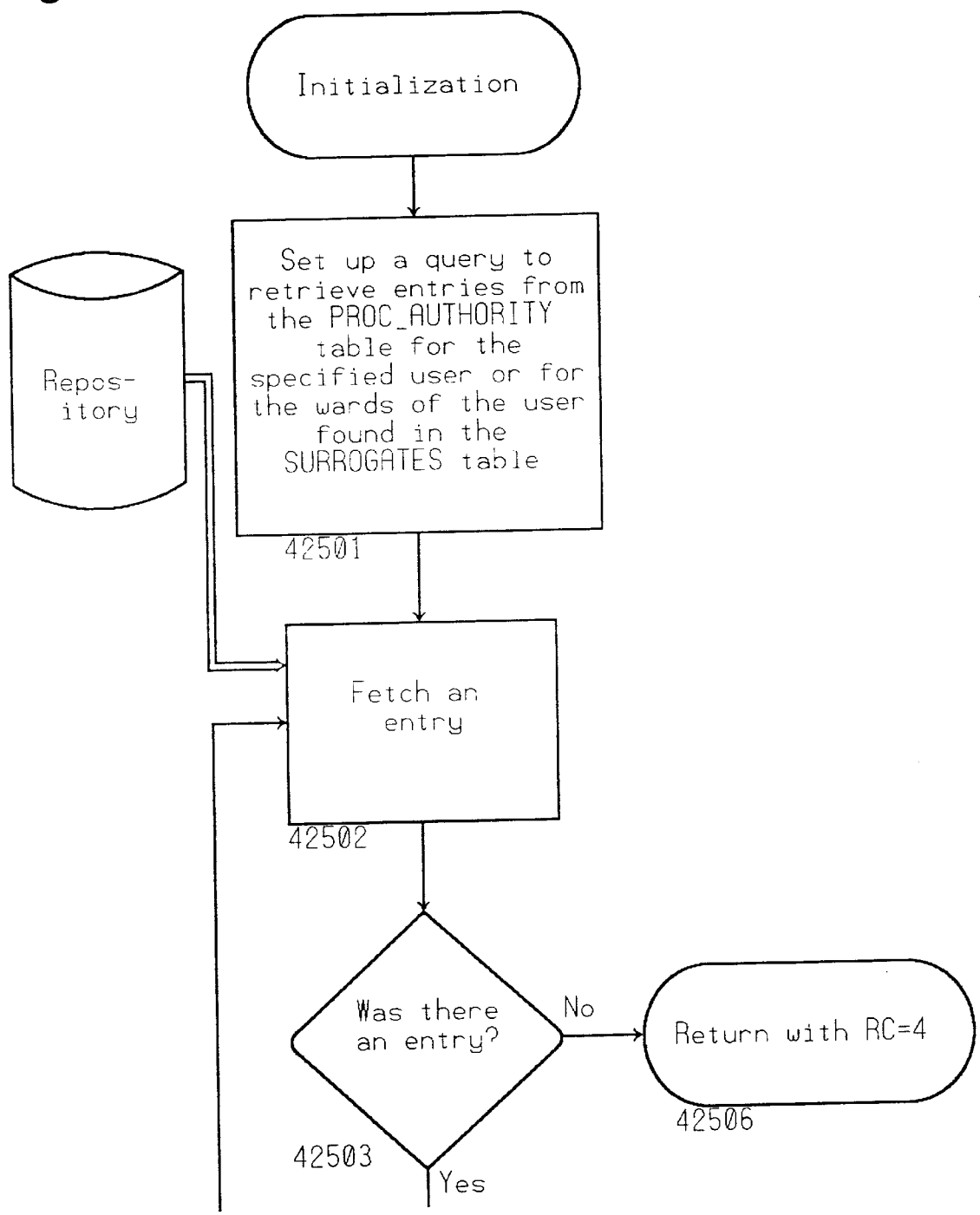
FIG. 86 which comprises FIG. 86a thru 86b, describes the QRPATCHK Process.
Figure 86B:
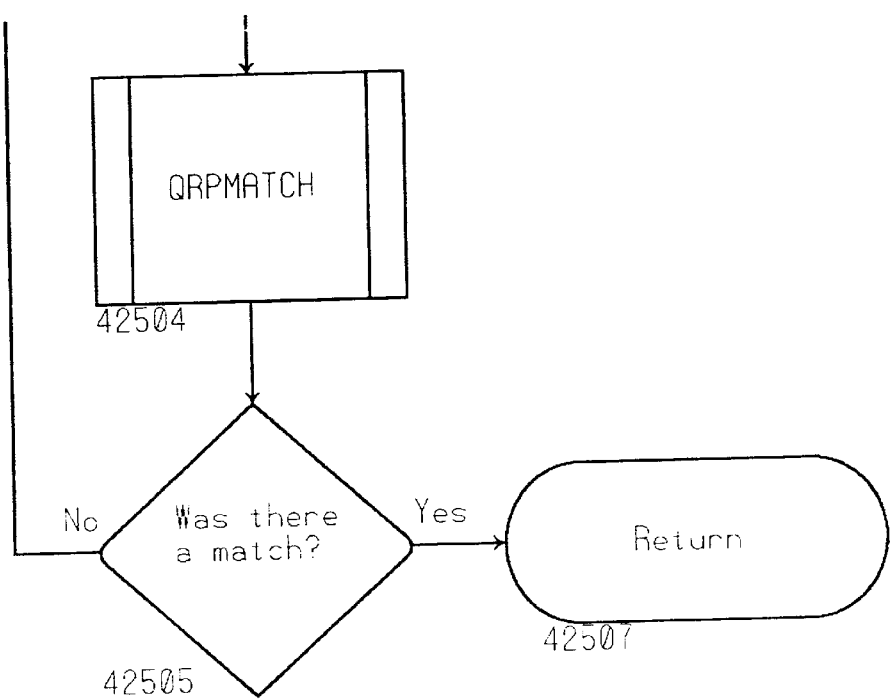

The QRPATCHK Process FIG. 86: This process is used to check to see if a user is authorized to perform a function on a given process, package, library filetype, version, library level and filename. It will check both the PROCESS_AUTHORITY table and the SURROGATES table.

After initialization, a query is set up 42501 to retrieve entries from the PROC_AUTHORITY table for the specified user or for wards of the user found in the SURROGATES table in the Control Repository. Then, an entry is fetched 42502 from the Control Repository. Next, a check 42503 is made to determine if there was an entry. If not, the process returns 42506 to the caller with Return Code=4. If so, the QRPMATCH Process described in FIG. 81 is invoked 42504. Upon return from the above process, a check 42505 is made to determine if there was a match. If not, the process flows back to 42502. If so, the process returns 42507 to the caller.

Figure 87:
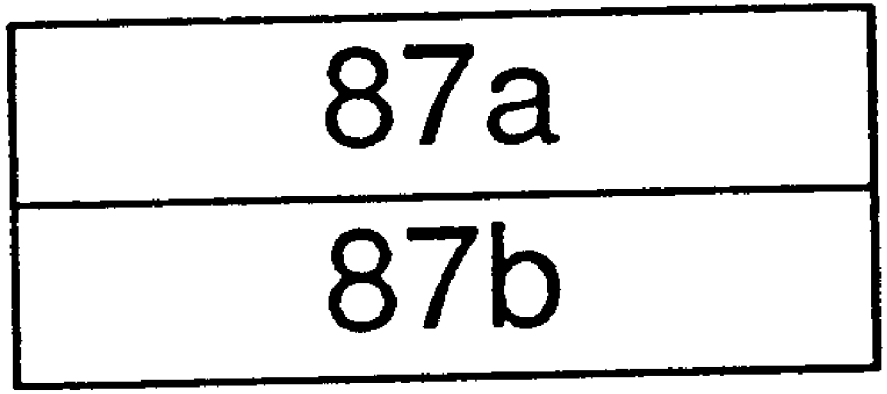
FIG. 87 which comprises FIG. 87a thru 87b, describes the QRSURADD Process.
Figure 87A:
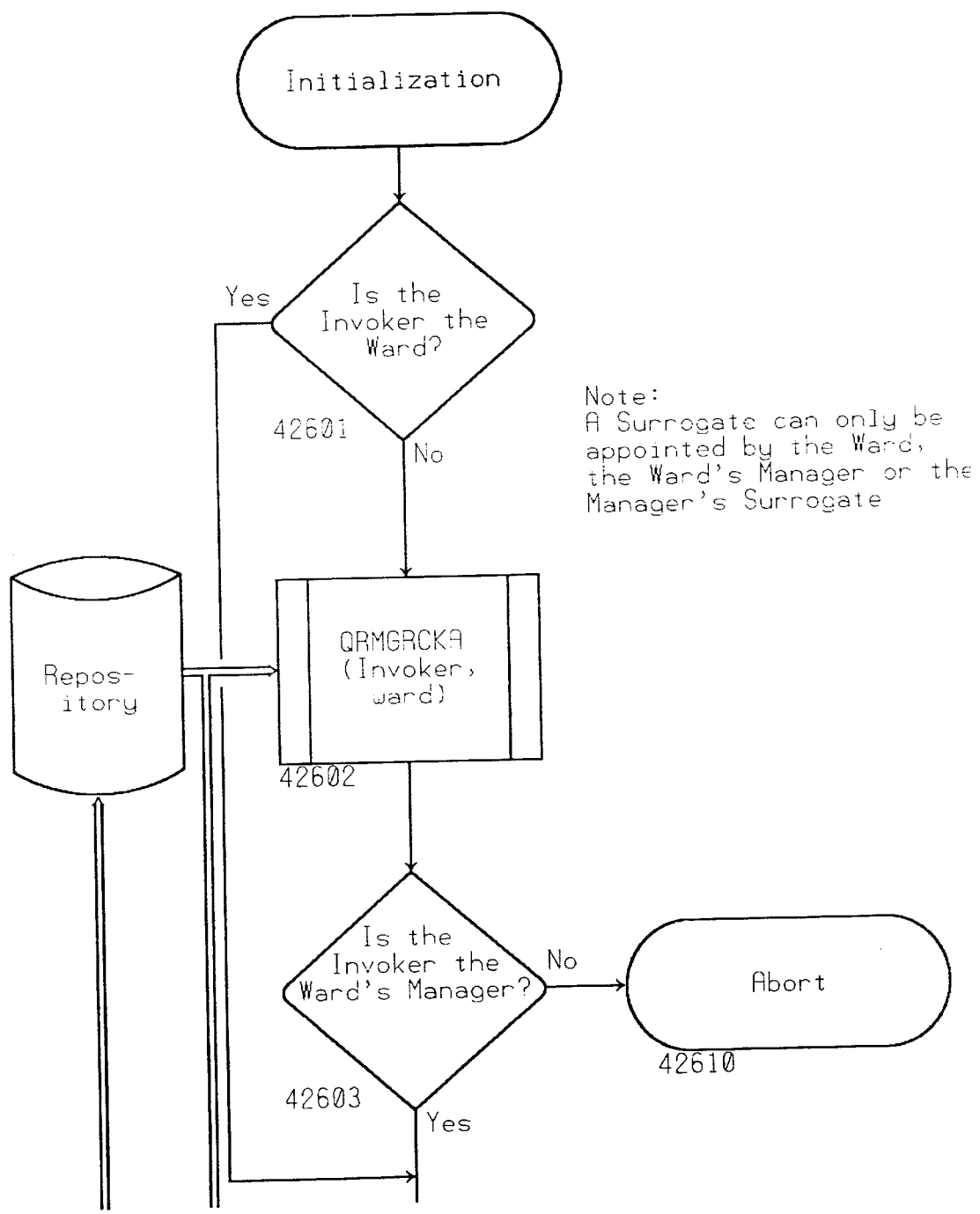
Figure 87B:
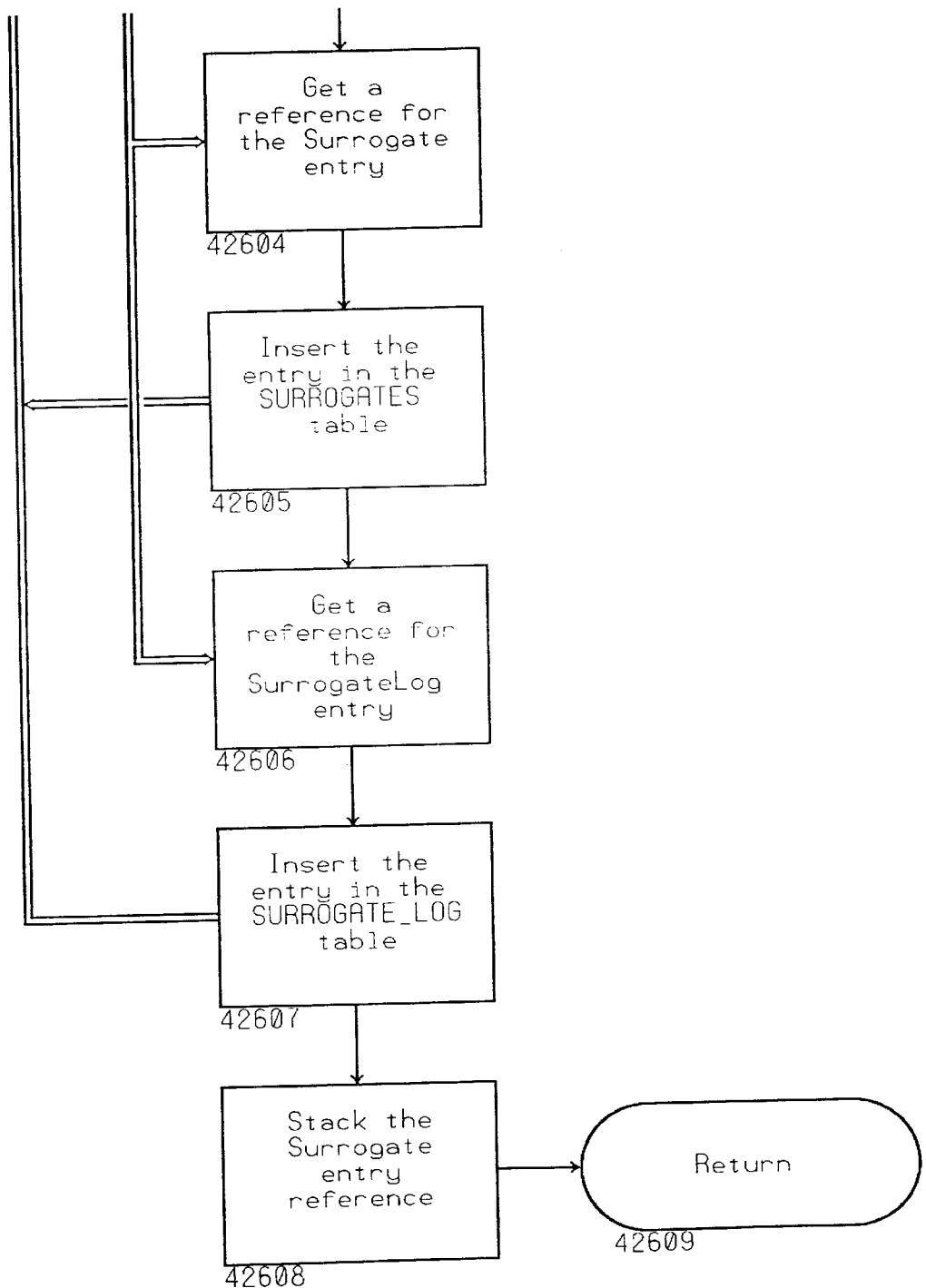

The QRSURADD Process FIG. 87: This process is used to add a Surrogate-Ward entry. Only the ward or his/her manager can add a Surrogate entry.

After initialization, a check 42601 is made to determine if the Invoker is the Ward. If not, the QRMGRCKA Process described in FIG. 79 is invoked 42602. Upon return from the above process, a check 42603 is made to determine if the Invoker is the Ward's Manager. If not, the process aborted 42610. If so, a reference number is obtained 42604 for the Surrogate entry Then, the entry is inserted 42605 into the SURROGATES table in the Control Repository. Next, a reference number is obtained 42606 for the Surrogate Log entry. Then, the log entry is inserted 42607 into the SURROGATE_LOG table in the Control Repository. Next, the Surrogate entry reference number is stacked 42608 and the process returns 42609.

Library Search Engine

Our embodiment contemplates the use of a Library Search Engine to exploit the versatile Package, Filetype, Version, Level (PFVL) structure by permitting users to:

1. Locate and assemble collections of files spread throughout the Library structure.
2. Query the relationship of Levels beginning at a specified point in the Library structure.
3. Query the relationship of Versions beginning at a specified point in the Library structure.

The Search Engine offers a menu driven user interface as well as an Application Program Interface as a means of invocation. FIG. 57100 illustrates the graphical user interface embodied in the present embodiment. Our preferred embodiment presents the user screen in a graphical environment where the user engages pull down menus, pop-up menus, drop-down lists, radio buttons, push buttons, fill-in fields, and mouse interaction. It should be noted, however, that all functions discussed further in the preferred embodiment can be implemented using simple text screens, or more advanced data entry systems such as touch screens, voice commands or 3-D graphics. The preferred embodiment depicts the method most conducive to the Motif(tm), Windows(tm), and OS/2(tm) application environments.

Radio buttons 57101 permit the user to choose the Library Search Type among four possible choices:

File Initiates a Library Search to find files located in the search path.

Sorder Returns the Search Order beginning at a specified point in the structure tree.

Version Returns the Version structure beginning at a specified point in the structure tree.

BOM Initiates a Library Search to find BOMs (Models) located in the search path.

Field 57102 is the File Name data entry field. This field only participates in the File and BOM Search. The user may enter a single file name or leave it blank to indicate all files should be searched. Field 57103 is the Library field. It may be filled in directly, or drop down menu button 57108 may be used to obtain a list of all valid Libraries in the DMS. The field may also be left blank to invoke a dialog box which permits the user to enter the names of multiple Libraries. Field 57104 denotes the Library File Type and works in a similar fashion to Field 57103. A specific File Type may be entered, drop down menu button 57109 can be used to obtain a list of valid LFT in the DMS, or a blank field will initiate a dialog box whereby multiple File Types may be entered.

Field 57105 denotes the Starting Version where the search should begin. Drop down menu button 57110 will display a list of all valid Versions in the DMS. This entry field is required. Field 57106 denotes the Starting Library Level where the search should begin. Drop down menu button 57111 will display a list of all valid Levels in the DMS. Like the Starting Version, this field is also required. These fields may form any combination of Level and Version, and is not restricted to entry points in the Library structure.

Combination field 57112 includes a push button and a data entry field. It permits the user to Include a Private Library in the Library Search. Upon selecting this field, the Search Engine will first look in the specified Private Library before searching the Public Library. The search will traverse from the private Library to the Version and Level specified in fields 57105 and 57106. Drop down menu button 57113 may be used to obtain a list of all Private Libraries in the DMS.

The Use Tables button, 57107, forces the search engine to obtain all information from the Control Repository. The present embodiment permits Library Searches initiated outside of the Library environment (ie. in a user's client environment) to use a cached copy of the structural information to improve reliability and performance. If the Use Tables button is "off", all information will be obtained from the cached structure.

Continuing with the lower section of FIG. 57100, the screen is divided into three options windows. The left window pane, 57114, controls the Search Domain. The upper set of radio buttons defaults to All Levels participating in the search. These buttons can be used to further restrict the search to only the Private Library with the Starting Library Level, or only the Private Library. The lower set of buttons determines whether All Versions will participate in the search or only the Starting Version.

The middle window pane, 57115, sorts the output in the manner specified by the upper set of radio buttons. The preferred embodiment permits the search results to be sorted by Name, Date, File Type, Library, and Version. Additionally, the output can be sorted chronologically by Latest or Oldest age.

Window pane 57116 controls the output disposition. The default action is to Display the Output on the Screen, which is controlled by the push button at the top of the pane. In addition, the output may optionally be written to the File Name specified in the data entry field. This file may be appended to or overwritten by use of the Append push button. The lower set of radio buttons will default to displaying the first of each file located in the search. However, the user may elect to Show All Files which may result in the same file being displayed multiple times. The last button permits the user to receive the search results in the form of a selection list. Those files selected become the final output of the Search Engine.

Upon filling out data entry screen, 57100, the Search Engine algorithm described in FIG. 57200 is invoked. As stated above, his algorithm may also b e employed through the Application Program Interface which permits the calling entity to direct the search using the same features present on the data entry screen. Additional functionally may be exploited through options available only with the API.

The Search Engine algorithm begins with FIG. 57200 which tests the position of the Search Type radio buttons, 57101. Although the preferred embodiment depicts this test with an if then else structure, one skilled in the art would appreciate the use of a case or select structure to accomplish this task. Step 57210 tests to see if it's a File Search. If not Step 57212 tests for a BOM Search. If either is true then the algorithm proceeds with FIG. 57300a. Otherwise, Step 57214 tests for a Search Order. If so, control proceeds to the routine in FIG. 57400. Finally, Step 57216 tests for a Version Search. If it tests positive, then FIG. 57400 is again employed, otherwise the program exits with an error message indicating an unsupported type of search.

The File Search routine begins with Step 57310, in FIG. 57300a. This step establishes a Nested Loop of Library File Types within the Libraries. Since a plurality of LFTs and Libraries may be specified through either the data entry screen in FIG. 57100 or the API, this nested loop is required to process all the LFTs and Libraries. Next, Step 57312 tests to see if the program can Exclude the Public Library from the search. This is permitted under the following conditions:

The user is Including a Private Library in the search

The Show Unique Files option is selected

The user is requesting a search for a single file

The single file exists in the specified Private Library

The current user is not an ALM and the Use Tables option is deselected.

If all the above is true, then the file information is captured from the Private Library and control proceeds directly to the BOM Filter in Step 57314.

If the search requires any of the Public Library Levels, the Control Repository tables, or specifies multiple files, control proceeds to the Structure subroutine in Step 57316. This routine is explained in detail later. Upon return from the Structure subroutine, the Version structure of the current Library is stored in a data structure. Similarly, the Level structure is stored in multiple structures where one denotes the Default Level Structure for all LFTs in this Library. Additionally, there is one pertaining to the current LFT.

Control then proceeds to Step 57318 which Applies any Custom Version information. Our preferred embodiment tests for the existence of a special file which indicates that the Version structure acquired from Step 57316 should be overridden by a customized search order. This allows a user to alter the search path to pick up files that would otherwise be bypassed by the default searching algorithm. Normally the Version data structure contains only the relationship between Versions. However, this customized information adds Level relationships as well. For example, the default structure may indicate that Version B is based on Version A. A customized structure would say that Version B, Level Bravo is based on Version A. A future step in the algorithm will use this information to direct the search specifically to Version B, Level Bravo.

At this point the Search Order subroutine in Step 57320 of FIG. 57300b is employed. This routine assembles the search order from the structure information based on the criteria and options invoked by the user. The output is in the form of a list of tokens indicating the path from the starting point (Version and Level) to a terminator or dead end. Each token contains the next Version Name, Level Name, and physical repository of the Level. This routine is explained in detail later.

Upon return from the Search Order subroutine, the program employs Step 57322 to test the Use Tables and File Reference options. If either is true, then it must Use the Control Repository for file information. If so, then the QRFILLST routine is employed in Step 57324 to extract a the file information from the Control Repository. Otherwise, Step 57326 makes a list of files by Scanning all the Repositories associated with all Versions and Levels in the search order. These repositories are usually directories in a client/server environment, but since our embodiment supports multiple platforms, they could be other forms of media such as VM minidisks.

Eventually, control reaches Step 528 which Applies the Search Order to the list of files previously generated. Only those files residing at a Version and Level in the search order are retained. The file list is ordered in the same manner as the search order. Furthermore, if the Show Unique Files button is selected, then the list is pruned to include only the first file in the search order if the same file exists multiple times.

Next, Step 57314 in FIG. 57300a, tests to see if the current search is a BOM Search. If so, then a BOM Filter is applied to weed out any files which are not anchors to BOMs. The present embodiment interacts with our Aggregation Manager to invoke the QRMDLGET function. At this point control returns to the top of the Nested Loop where Steps 57312 thru 57328 are repeated for each Library File Type and Library. Upon completion of the Nested Loop, Step 57340 is invoked to sort the output list based on the sort option specified by the user. Step 57342 is then employed to test the User Executable option. This option is available through the API and it permits a third party program to invoke a Library Search and immediately use the output file list as input to another program. The program may or may not make further alterations to the file list.

Upon completion of Step 57342, the file list is formatted into the Final Output in Step 57344. If the Present Select List option is specified, the user will be presented with the current file list and will be permitted to select the desired files. Those selected will become the new final output. This output may be displayed on the screen, or written to an output file specified by the user, depending on the Output Options chosen at run-time. The API also offers a Stack option where the final output will be stacked or returned to a calling program. This option can be further controlled with a LIFO and FIFO keyword to specify the order of the returning stacked files. If the File Reference option is passed, the File Reference numbers of each file is also displayed in the output.

Figure 34:
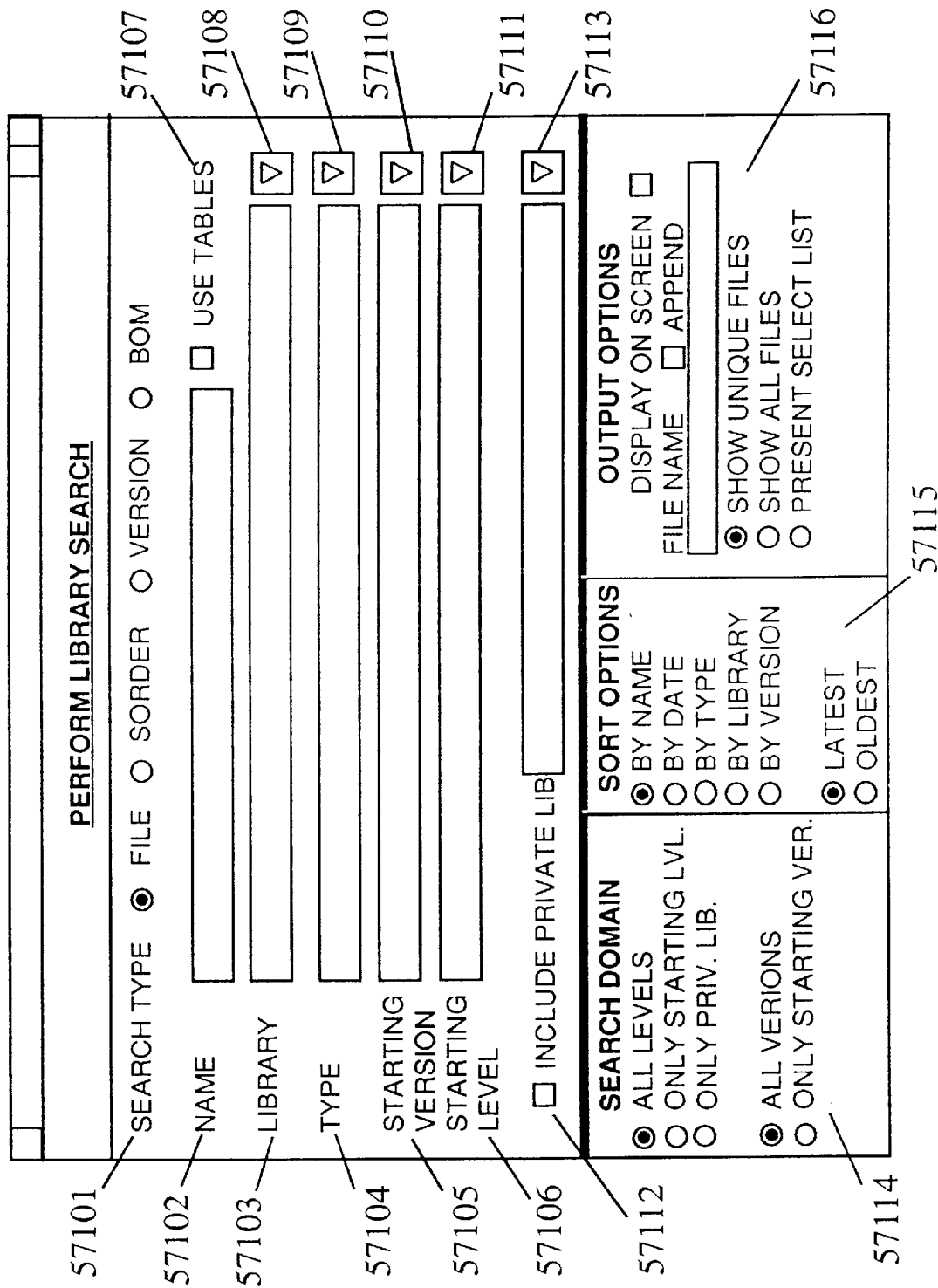
FIG. 34 illustrates the data entry screen for initiating a Library Search.

The Structure routine, in FIG. 34, begins by testing a flag to see whether the current LFT is done. In order to improve efficiency, this routine sets a flag the first time it processes the structure for a particular Library. The routine will process all File Types during the first pass, thereby making the information available for any subsequent LFTs.

Assuming this is the first pass, Step 58112 examines the Use Tables option to see whether the structure must be extracted from the tables in the Control Repository. The API also offers a File Reference option which also forces the code to branch to Step 58118. If neither of the above conditions exist, Step 58114 tests to see if the user id invoking the search is an Automated Library Machine. If so, it must use the Control Repository tables in order to guarantee data integrity. If the current user is not an ALM, then Step 58116 tests to see if a Structure File Exists.

If the Use Tables option is specified, or the current user is an ALM, or no Structure file exists, then Step 58118 is employed to Extract the Control Tables. The entire structure of every Library in the DMS is contained in specially formatted tables, and the QRDFRLST routine described in FIG. 45 is used to query the information.

Otherwise, if the Structure file is permitted to be used, and exists, then Step 58120 will Read the Structure File into a series of data structures. If the user specified the Search Domain to be only Private Library, but desires a search on multiple files, then this step returns a simple list which only contains information about the Private Library. If the user specified a Search Domain of Only Starting Level, then the list includes the Private Library appended to information about the Starting Library Level. If the Starting Library Level exists for multiple LFTs, separate lists are created for each LFT. In either case, a simple Version list is created containing only the Starting Version.

The more frequent scenario involves a full Library Search. Here, one list contains the Version structure which indicates how Versions are based on other Versions. One or two lists contains all the Level information. Each list begins with one of the entry Levels into the Library and forms a chain all the way to the top Level. Each member of the list also contains information about the physical repository of each Level. One of the Level lists is always the Default Level List which shows the default Level structure for the Library. If all LFTs follow this structure, then this is the only list. However, if any LFTs have branches which deviate from the default, then a separate list is made for all the LFTs.

The search routine begins with Step 58210, in FIG. 85*a*, which constructs the Version Search Path based on the information returned from the Structure subroutine. First, it locates the Starting Version in the Version list. Beginning at this starting point it creates a linked list which traces the starting Version back to its base Version. The information in this list may be the default Version structure as defined for the Library, or it may be a customized Version structure specified in Step 57318. Normally this is a simple list indicating the traversal from one Version to the next. However, if customized Version information is required, this list may also contain additional Level information with each Version. Any Levels specified in this list are used to direct the search algorithm as it switches Versions. Once complete, this list becomes the current Version Search Path.

Next, Step 58212 establishes the Default Level Search Path. In a similar fashion to Step 58210, it examines the Default Levels List generated in the Structure subroutine and creates a linked list showing the relationship from one Level to the next. The final list will contain all Levels necessary to traverse from the default Entry Library Level to the highest default Working Level. Step 58214 performs the identical function to the previous step, except it extracts only those records in the Levels list pertaining to the current LFT. Since the LFT may have multiple branches, each with its own entry point, a linked list is created depicting all branches. Some of these branches may intersect or overlap the default branch for the Library.

At this point, the program tests the Include Private Library option. If it's on, then control proceeds to Step 58218 which Adds the Private Library information to the beginning of the search path. This information includes the Starting Version, Starting Library Level and the Private Library repository. The one exception is if the File Reference option is on. This option is supported through the API, and overrides the Include Private Library button since File References can't be identified for files in a Private Library.

Control eventually reaches Step 58220 which tests the Search Domain to see if the Search Only Private Library button is pressed. If so, then the search path only contains the Private Library, and the subroutine exits. If the user mistakenly pushed this button, but left the Include Private Library button depressed, an error message will be displayed since there is no search path to follow. The second possibility asserts that the Search Only Starting Level button is pressed in the Search Domain window. If so, Step 58222 tests positive which results in Step 58224 Adding the Starting Library Level to the search path. If the Include Private Library button was pressed, the Starting Library Level will be appended to the path after the Private Library. At this point the subroutine exits with either a path of Priv Lib+Starting Lib Level or simply Starting Lib Level.

The final and most frequent scenario is for the Search Domain to include All Levels. In this case control proceeds to Step 58226 in FIG. 35*b*. Steps 58226 through 58230 are designed to locate the Starting Library Level (SLL) in the inverted tree structure. The first step is to check for the SLL in the LFT List. Since the specified SLL may be a unique Entry Level or Working Level for this LFT, the linked list holding the LFT branches must be traversed first. If the SLL is located in this list, then the remainder of the linked list is passed to Step 58234. The end of a linked list is denoted by a terminator, (which is represented by *** in our preferred embodiment) or a dead end which means there's no next Level.

If the SLL is not in the LFT linked list, Step 58228 tests for the SLL in the Default Levels List. If the SLL is found in the Default Level List, then Step 58230 must find an Intersection. There are two legal types of intersections. The first case is when the SLL marks a point in the Default Levels branch which lies above the unique LFT branches in the inverted tree. In other words, picking any point in any LFT branch will eventually lead to an intersection with the current Starting Library Level. In this case, all Levels linking the SLL to a terminator (or dead end) in the Default Levels list are passed to Step 58234. The second case is when the SLL does not intersect with any of the LFT branches, but some Level above the SLL is an intersection. In other words, traversing the Default Levels branch will eventually lead to some Level which does intersect with the LFT branches. All Levels from the SLL to this intersection, are excluded since it's not possible for the current LFT to reside at any of these Levels. However, all Levels from the intersection to the terminator (or dead end) are valid and in fact, are passed to Step 58234. If no intersection is found, the program assumes the user entered an incorrect Starting Library Level and it exits with an error message.

Returning to Step 58228, if the SLL can't be found in the Default Levels List, then Step 58232 attempts to Locate a Common Release Level. By definition, the last non-entry and promotable Level in a branch is the first Release Level as long as all Levels above it are non-entry and non-promotable. If the nonentry and promotable Level points to anything other than a non-entry and non-promotable Level or a terminator, then it's not a valid Release Level. In most cases, an LFT has a single branch of Release Levels, but the architecture permits different LFT branches to have different Release Level structures. Step 58232 will look for a common Release Level branch, and if one is located, it will be passed to Step 58234. Otherwise, the program has no recourse but to exit with an error since the user's desires are too ambiguous.

Figure 35:
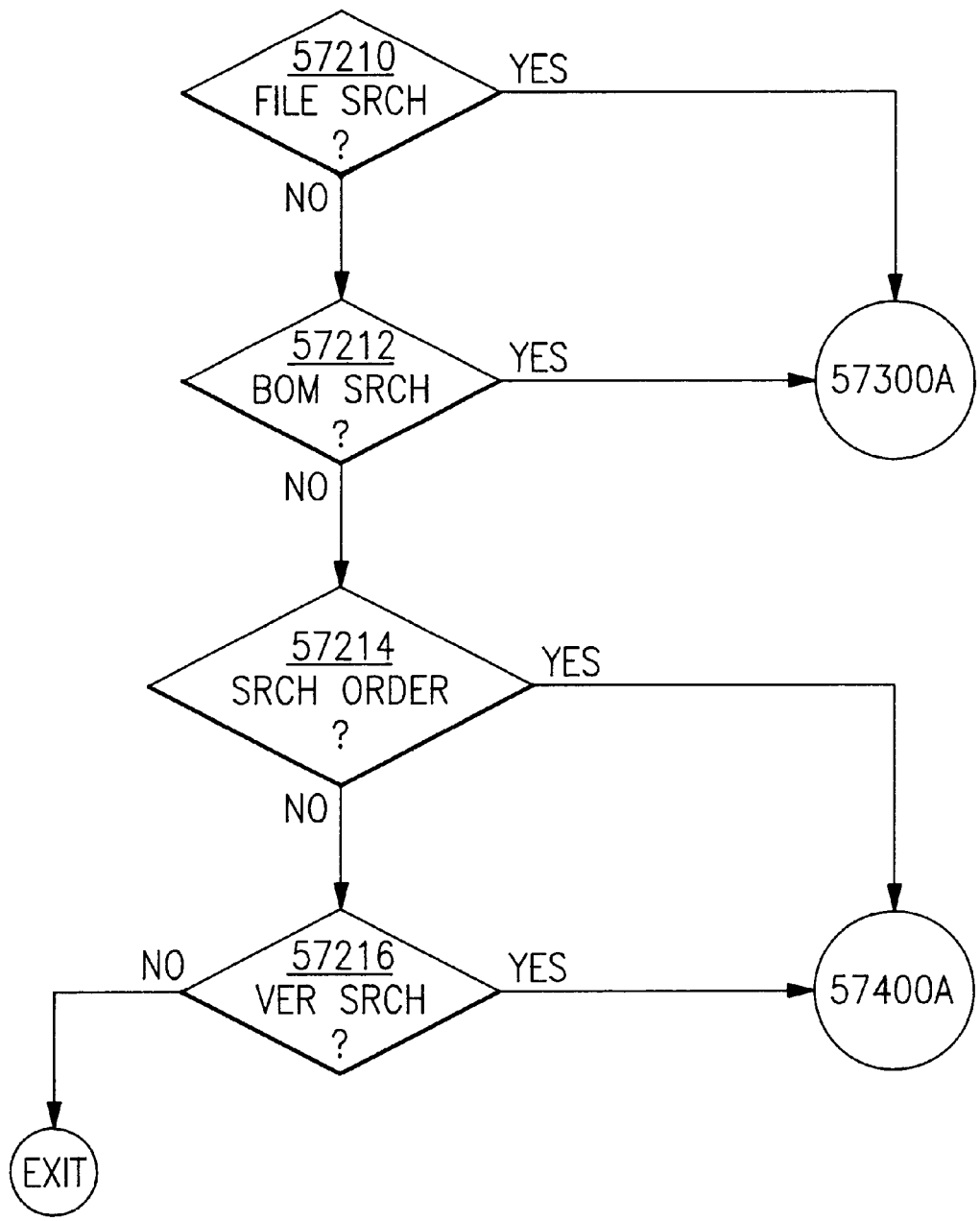
FIG. 35 illustrates the Main Flow Chart of the Search Engine.
Figure 36A:
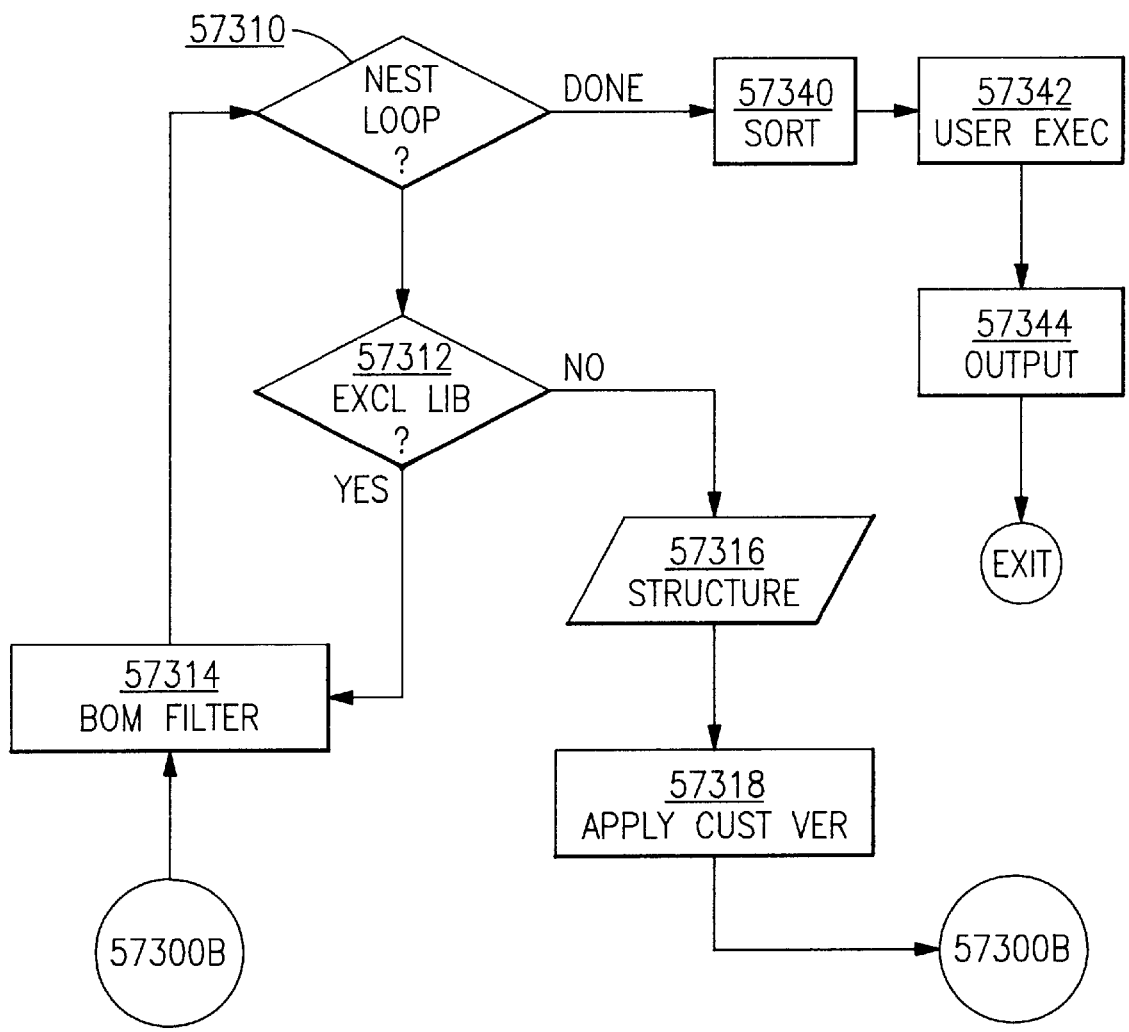
FIG. 36a thru 36b illustrates the algorithm for File Searches.
Figure 36B:
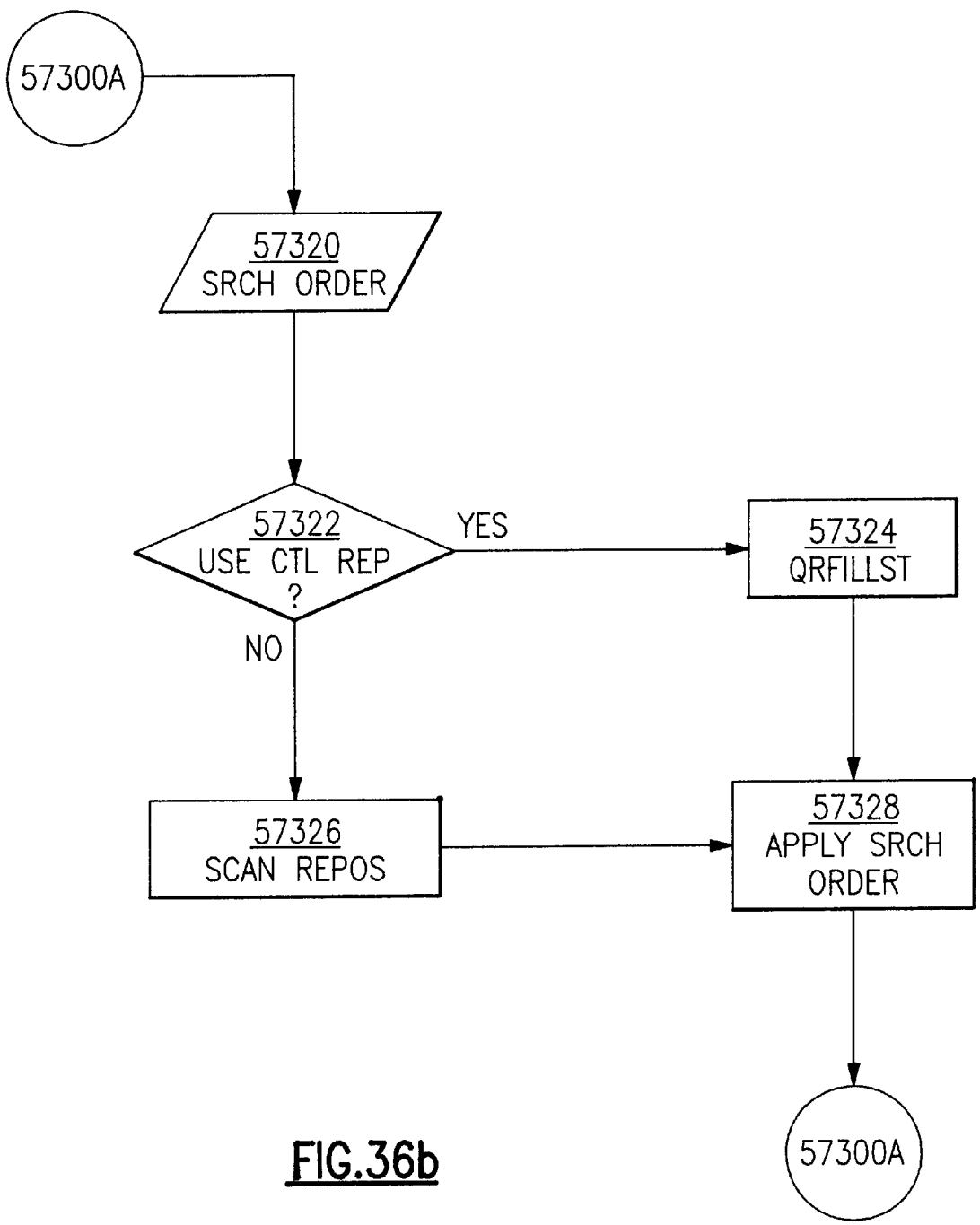
Figure 38:
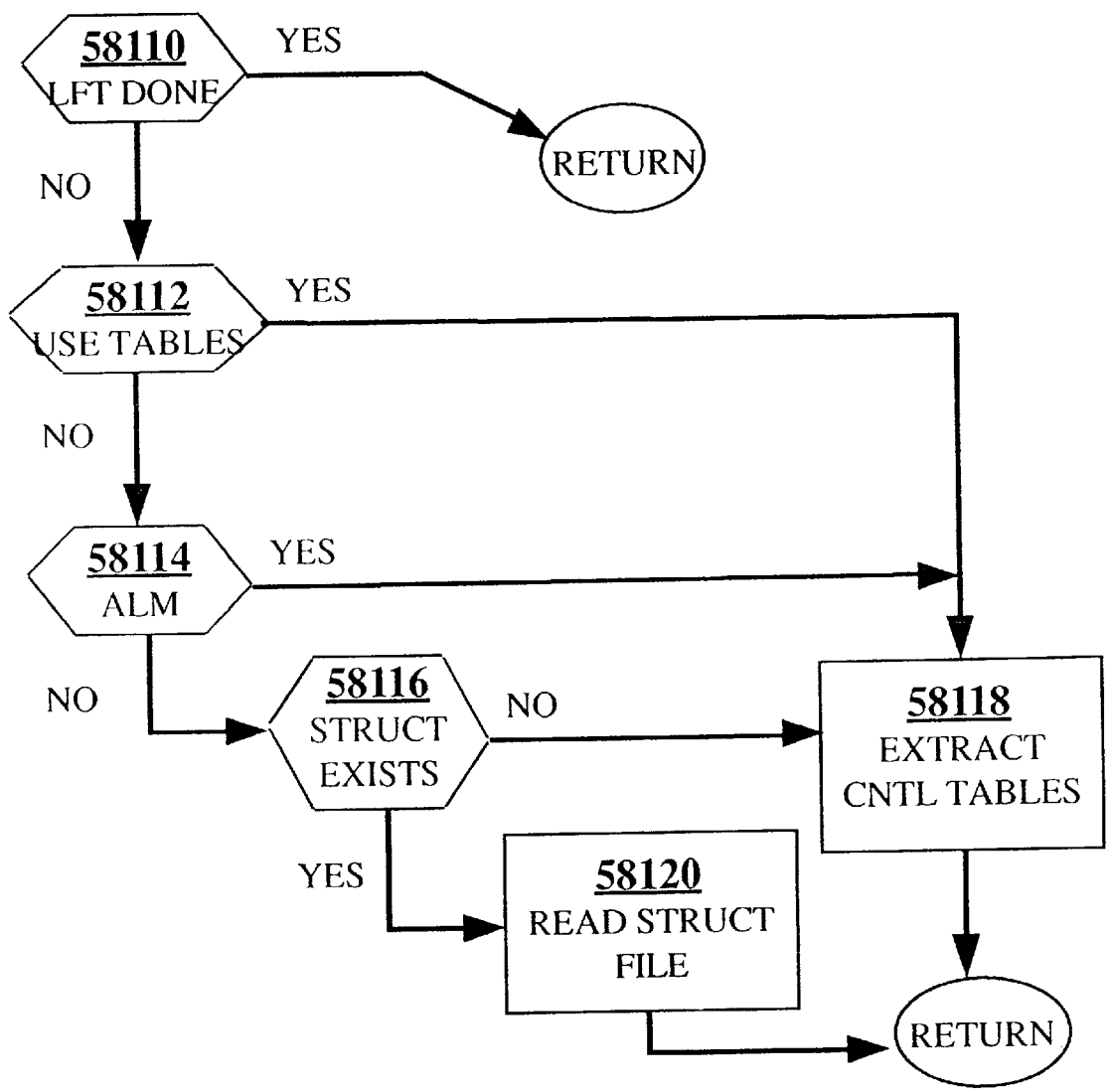
FIG. 38 is the Library Structure Subroutine.
Figure 39A:
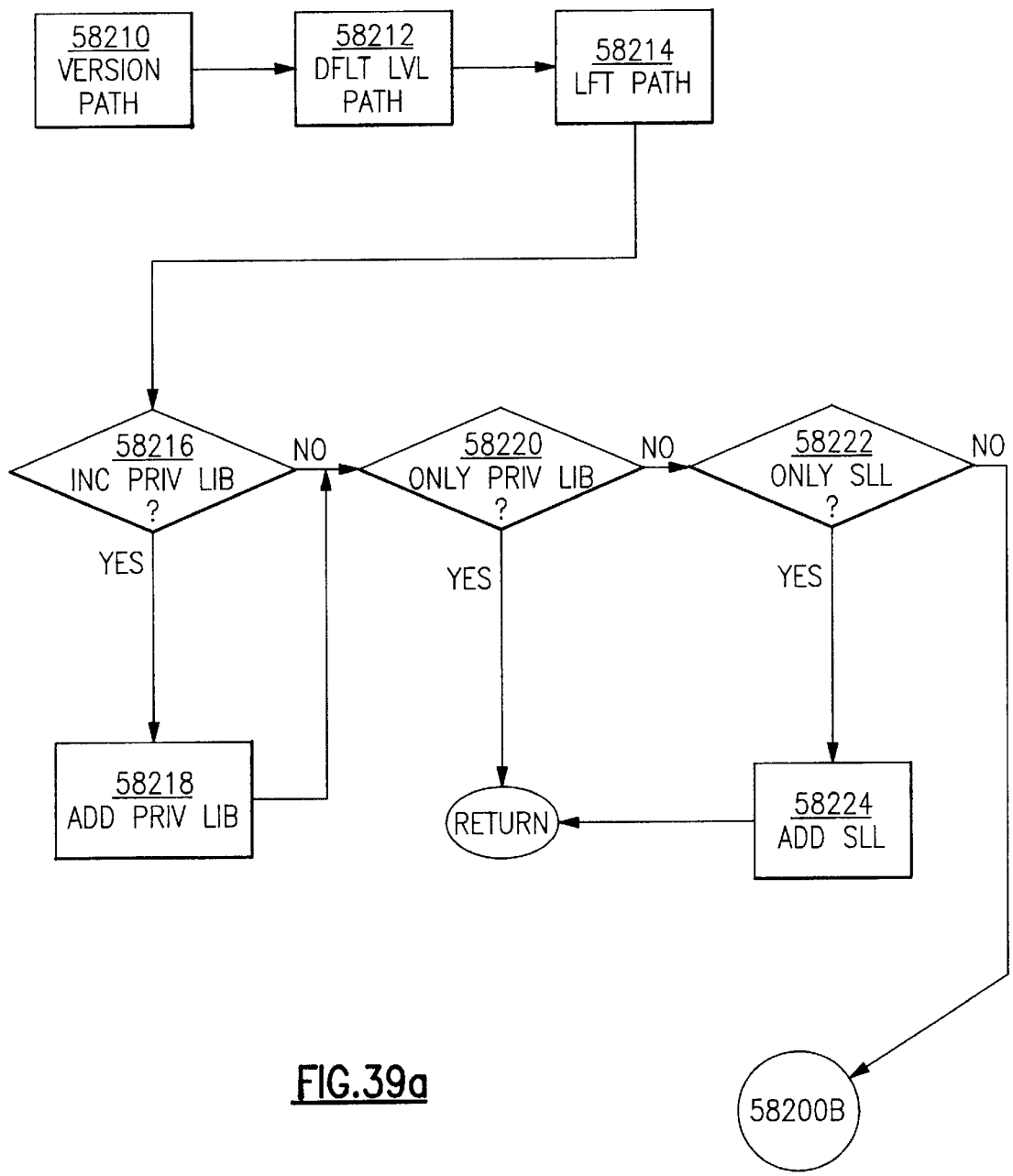
FIG. 39a thru 39c is the Search Order Subroutine.
Figure 39B:
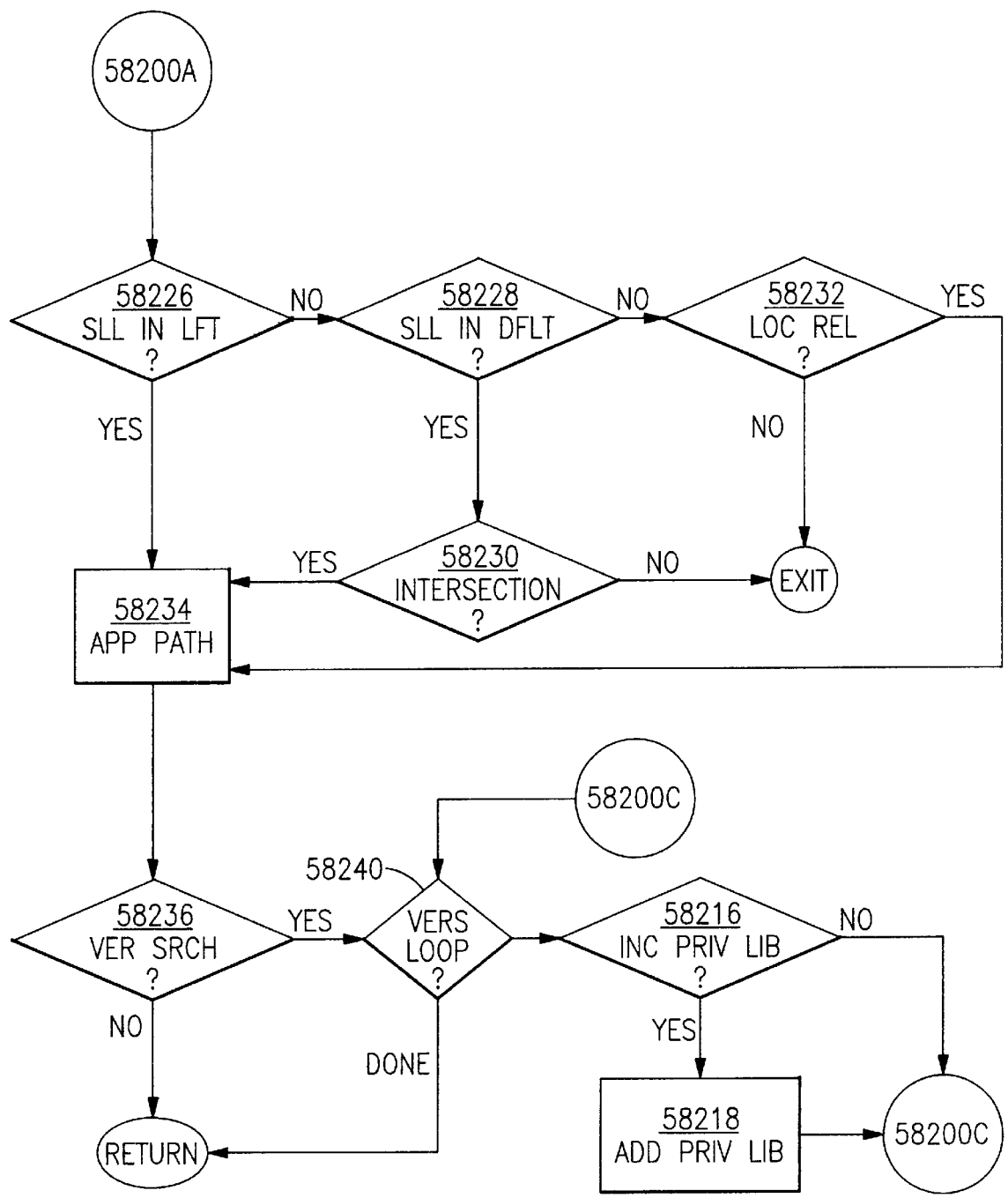
Figure 39C:
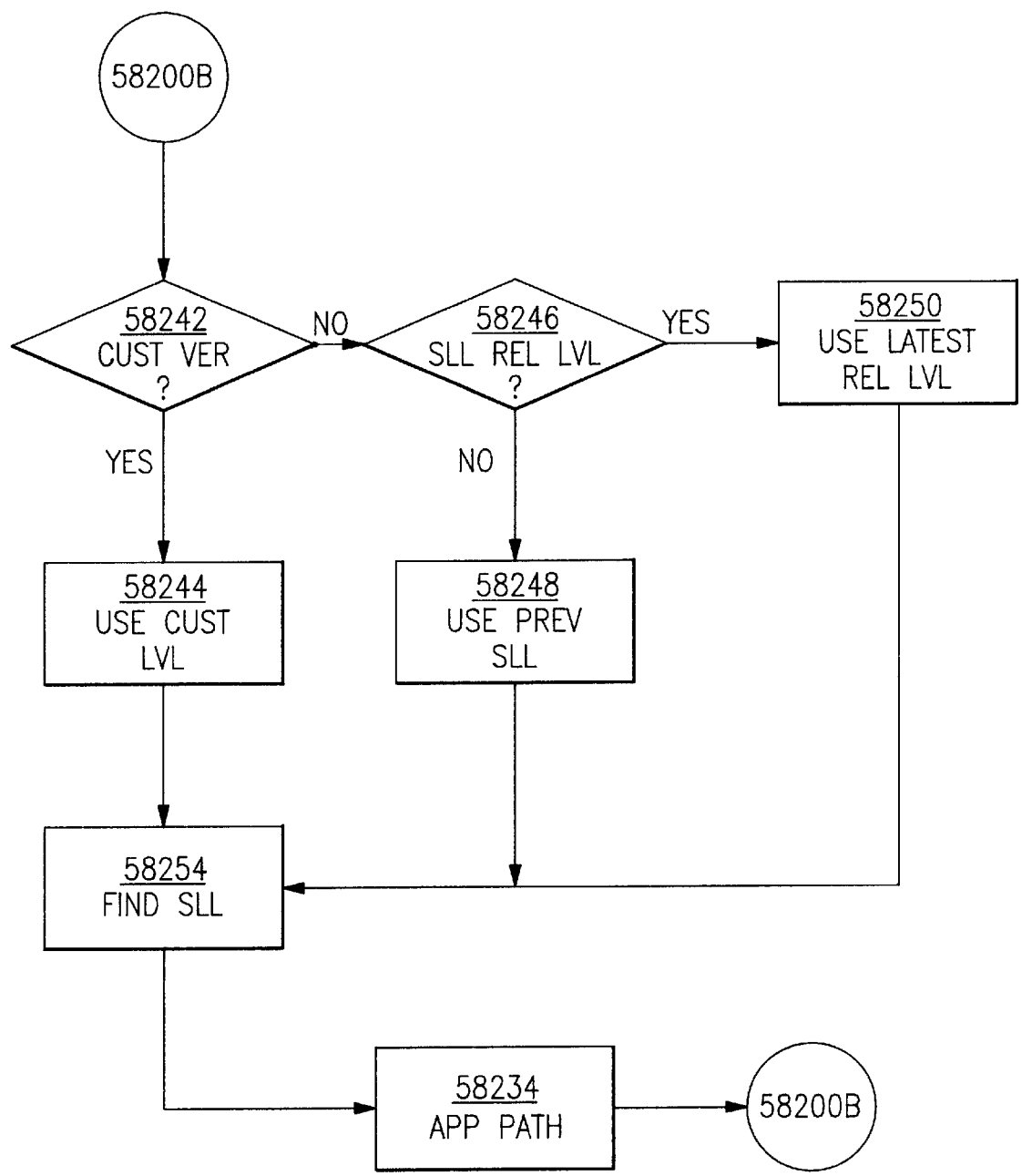

Once the desired search path is obtained, control proceeds to Step 58234 which Appends the Search Path This step simply adds the path found in Steps 58226 thru 58232 to the path assembled in FIG. 35*a*. At this point, Step 58236 is invoked to test the Version buttons in the Search Domain window, 57114. If the Only Starting Version button is pressed, then Step 58236 results in the Subroutine returning the current search path. Otherwise, the All Versions button is pressed, which indicates that a Version Search is desired.

Assuming a Version Search is desired, Step 58420 establishes a Version Loop to work on each remaining Version specified in the Version Linked List created by Step 58210. Next, Step 58216 is again invoked to test the Include Private Library button. If the option is selected, Step 58218 again Adds the Private Library to the end of the search path. This time, it uses the current Version coupled with the Starting Library Level and Private Library repository. Once again, this step is only permitted if the File Reference option was omitted.

Regardless of the setting of the Include Private Library option, control eventually reaches Step 58242, in FIG. 35*c*, which checks to see if a Customized Version order was specified in Step 57318. If so, then Step 58244 Uses the Custom Level associated with the current Version as the New Starting Library Level. The New Starting Library Level is defined as the point in the next Version where the search resumes if it can't locate a file in the current Version. This New Starting Library Level is passed to Step 58254.

Returning to Step 58242, if no Customized Version order exists, then the following default algorithm applies. Step 58246 tests to see if the original Starting Library Level is a Release Level. If so, Step 58250 will locate the Latest Release Level (most recent) for the current Version. This may or may not be the same Latest Release Level as the previous Version. Our embodiment permits an LFT in different Versions to have different Release Level Structures. The Latest Release Level found is the one passed to Step 58254.

Otherwise, if the Starting Library Level is a Working Level, Step 58248 will Use the Previous Starting Library Level as the next starting Library Level, and pass it to Step 58254, Find SLL. If Step 58254 was arrived at from Steps 58248 or Step 58250, then the program simply locates the list which contains the New Starting Library Level and assembles the next portion of the search path. This portion consists of all remaining Levels from the Next Starting Library Level to a valid termination. If this step was arrived at from Step 58244, one additional step must check to ensure the New Starting Library Level is actually a member of one of the Level lists. Since this information came from an external source, it could contain a Version/Level pair which is invalid in the current Library structure.

The results of Step 58254 are passed to Step 58234 which Appends the additional Search Path info to the existing search path. Control returns to the top of the Version Loop in Step 58240 which runs until all Versions in the Version Linked List are exhausted. The subroutine returns the assembled search path in the form of a tokenized list where each token contains a delimited entity indicating the Version, Level and Repository.

Returning to FIG. 57200, if the Type of Search is a search Order or Version Search then control proceeds with Step 5741C in FIG. 57400. Step 57410 checks for Required Parameters which must be passed to the algorithm for these types of searches. The Required Parameters are the Library, Starting Library Level, Starting Version, and one Library File Type. The user may elect to include or exclude a Private Library. In addition, the API supports a subset of the Search Order called a Level Search. To accommodate this, the API offers either an Sorder or Levels option. These options are mutually exclusive.

At this point, the program calls on Subroutine 57316 to create the Structure Lists, and 57318 to Apply any Custom Version information. Step 57420 then tests to see if this is a Version Search. If so, all the information is now contained in the Version Structure List, so control proceeds to Step 57430 which Formats the Version Search Order into user output. This step assembles a simple linked list based on the Version relationships derived from the Version Structure List. The output then displays the Version Search Order beginning with the Starting Version and ending with a Base Version.

Returning to Step 57420, if the type of search is for a Search Order or Level Order, then Subroutine 57320 in employed to create the Search Order linked lists. Control proceeds to Step 57440 which Formats the Search Order output based on the desired result. For a Search Order request, the entire search order is displayed beginning with the Starting Version/Level pair, and showing each subsequent Version/Level pair required to arrive at the oldest Release Level of a Base Version. If a Level Order is requested through the API, then this output is further trimmed to show only the Levels associated with the search path of the current Starting Version/Level pair.

Note: Our embodiment supports writing the output of Step 57430 or 57440 to a user display, external file, or returning it to third party calling programs. All of this is controlled through the Output Options in user screen 57100, or through options in the API.

Search Manager Processes

This section describes the processes that support the Search Manager functions in Data Management Control Utilities. The processes are depicted in FIGS. 88 to 92. To support these processes the Search Manager employs the following tables in the Control Repository.

LEVELS

TABLE 28

LEVELS - Library Levels

| Column | Description |
| --- | --- |
| REF | Reference number |
| LEVEL | Level id |
| PACKAGE | Package id |
| FILETYPE | Library file type |
| VERSION | Version |
| USERID | USERID where level resides |
| CUU | MINIDISK where level resides |
| LABEL | Label of MINIDISK where level resides. |
| NEXTLVL_REF | Pointer to next level |
| PUTABLE | Files can be put to this level |
| PROMOTABLE | File can be promoted from this level |
| LOG_REF | Pointer to log entry |
| AUXDISK | If "Y" then level is on auxiliary disk |
| PLATFORM | Platform where level resides |
| DIRECTORY | DIRECTORY under which level resides |

VERSIONS

TABLE 29

| Column | Description |
| --- | --- |
| VERSIONS - Version | |
| REF | Reference number |
| PACKAGE | Package id |
| FILETYPE | Library file type |
| VERSION | Version |
| BASE_VER | Version on which this version is based |

In addition the Search Manager maintains the following tables in local storage.

LVLS

TABLE 30

| Column | Description |
| --- | --- |
| LVLS - Local Levels | |
| LVLSREF | Reference Number |
| LVLSNAME | Level Name |
| LVLSVER | Version |
| LVLSUSER | Userid |
| LVLSCUU | Minidisk Address |
| LVLSPROM | Promotable Flag |
| LVLSLAB | Minidisk Label |
| LVLSPLAT | Platform |
| LVLSDIR | Directory |
| LVLSNEXT | Next Level Reference |

VERS

TABLE 31

| Column | Description |
| --- | --- |
| VERS - Local VERS | |
| VERSVER | Version |
| VERSBASE | Base Version |

QRLVL

TABLE 32

| Column | Description |
| --- | --- |
| QRLVL - Local Level Search table | |
| LVLREF | Reference Number |
| LVLTYPE | LibType |
| LVLVER | Version |
| LVLNAME | Level Name |
| LVLPACK | Package Id |
| LVLUSER | Userid |
| LVLCUU | Minidisk Address |
| LVLLAB | Minidisk Label |
| LVLPLT | Platfrom |
| LVLDIR | Directory |

Figure 88:
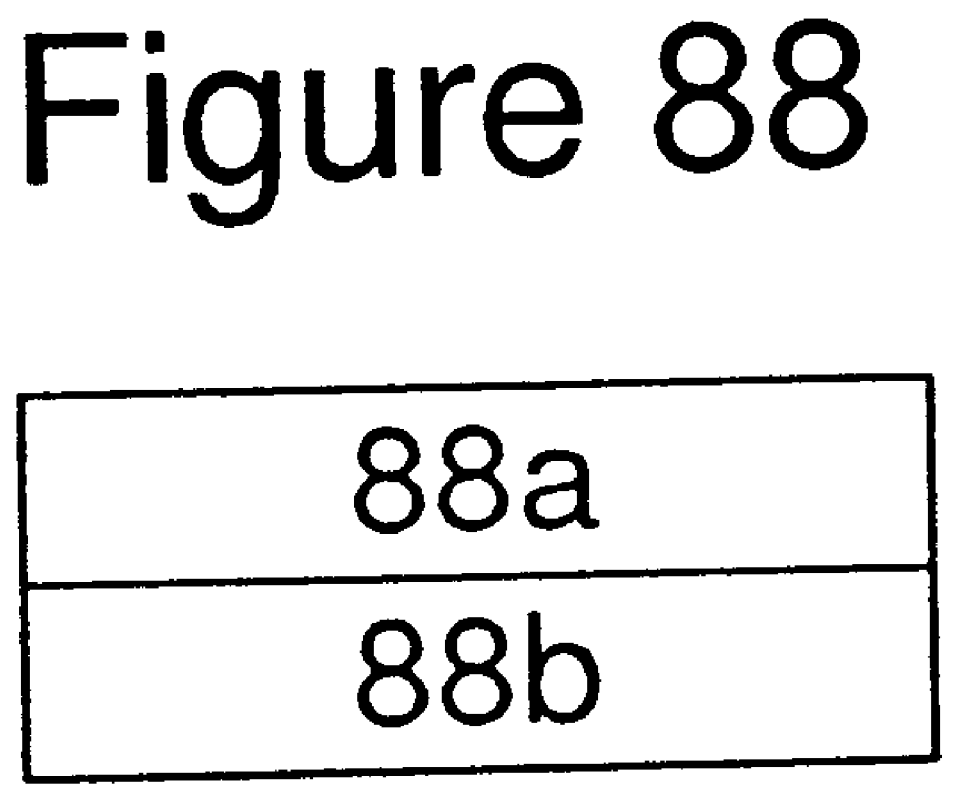
Figure 88A:
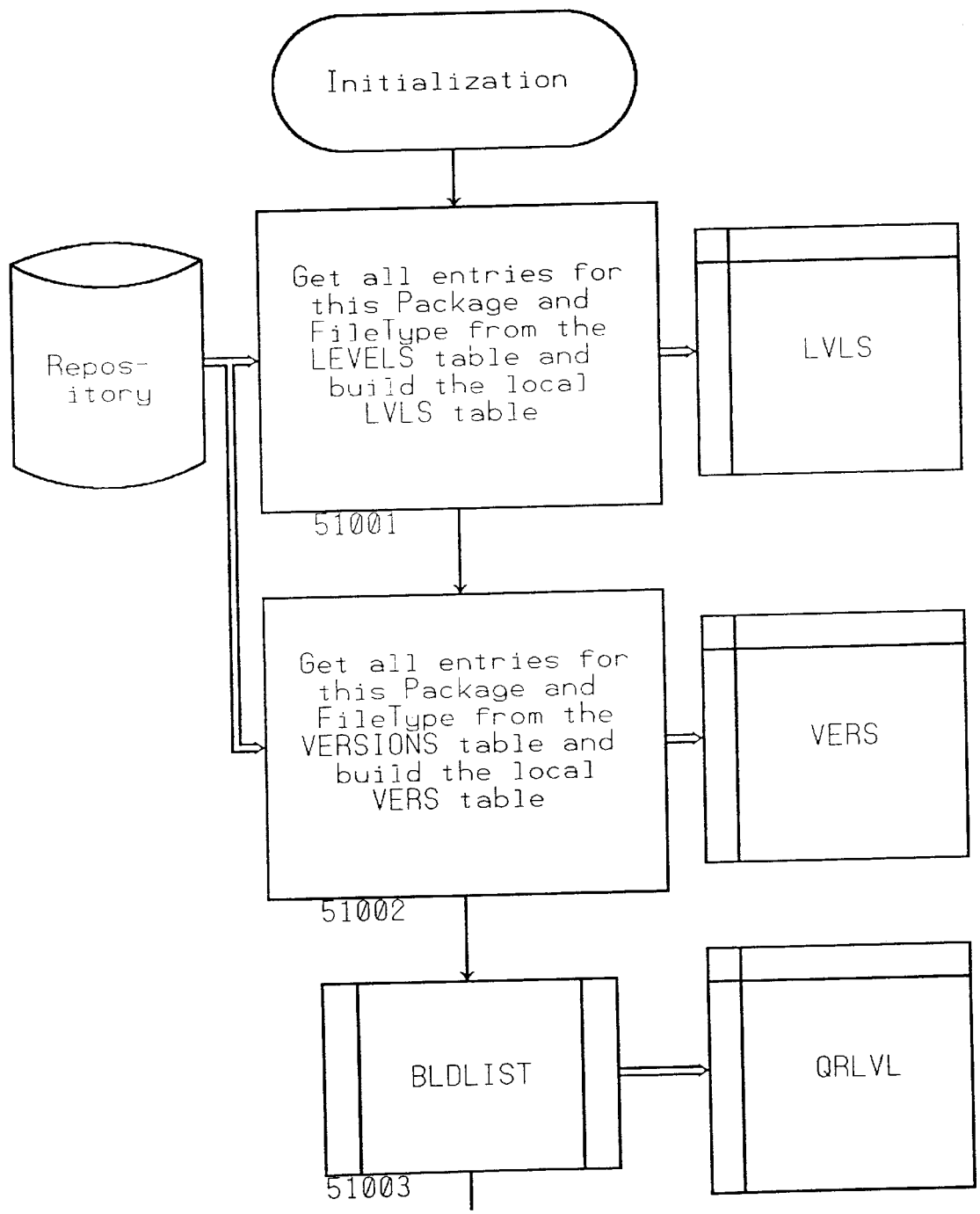
FIG. 88 which comprises FIG. 88a thru 88b describes the QRLSEARC Process.
Figure 88B:
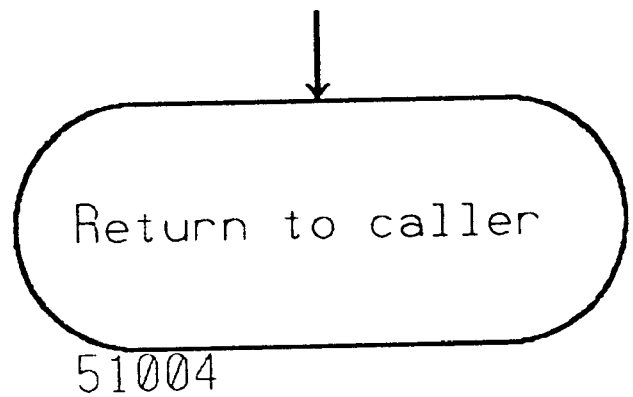
Figure 89A:
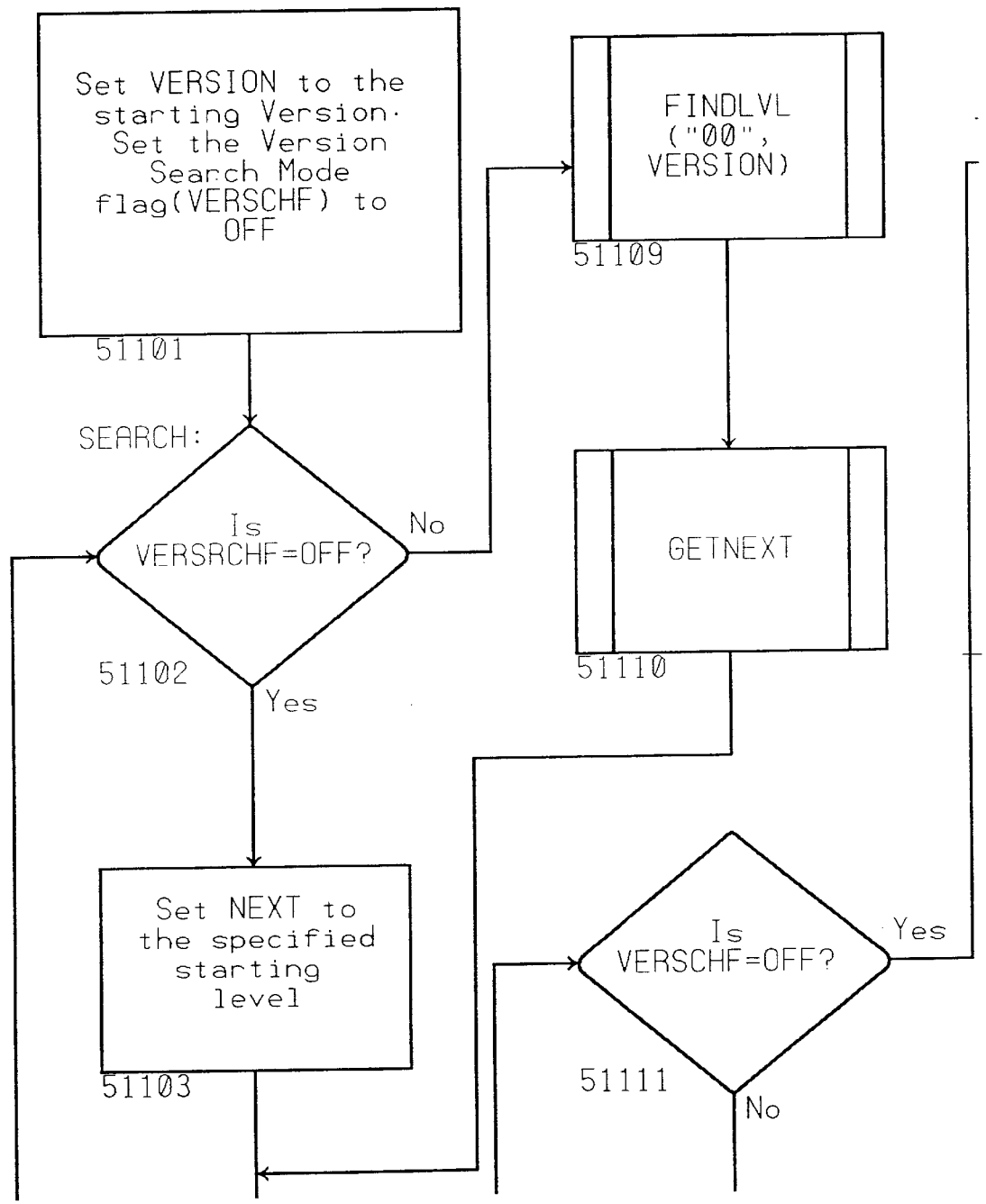
FIG. 89 which comprises FIG. 89a thru 89f, describes the BLDLIST Process.
Figure 89B:
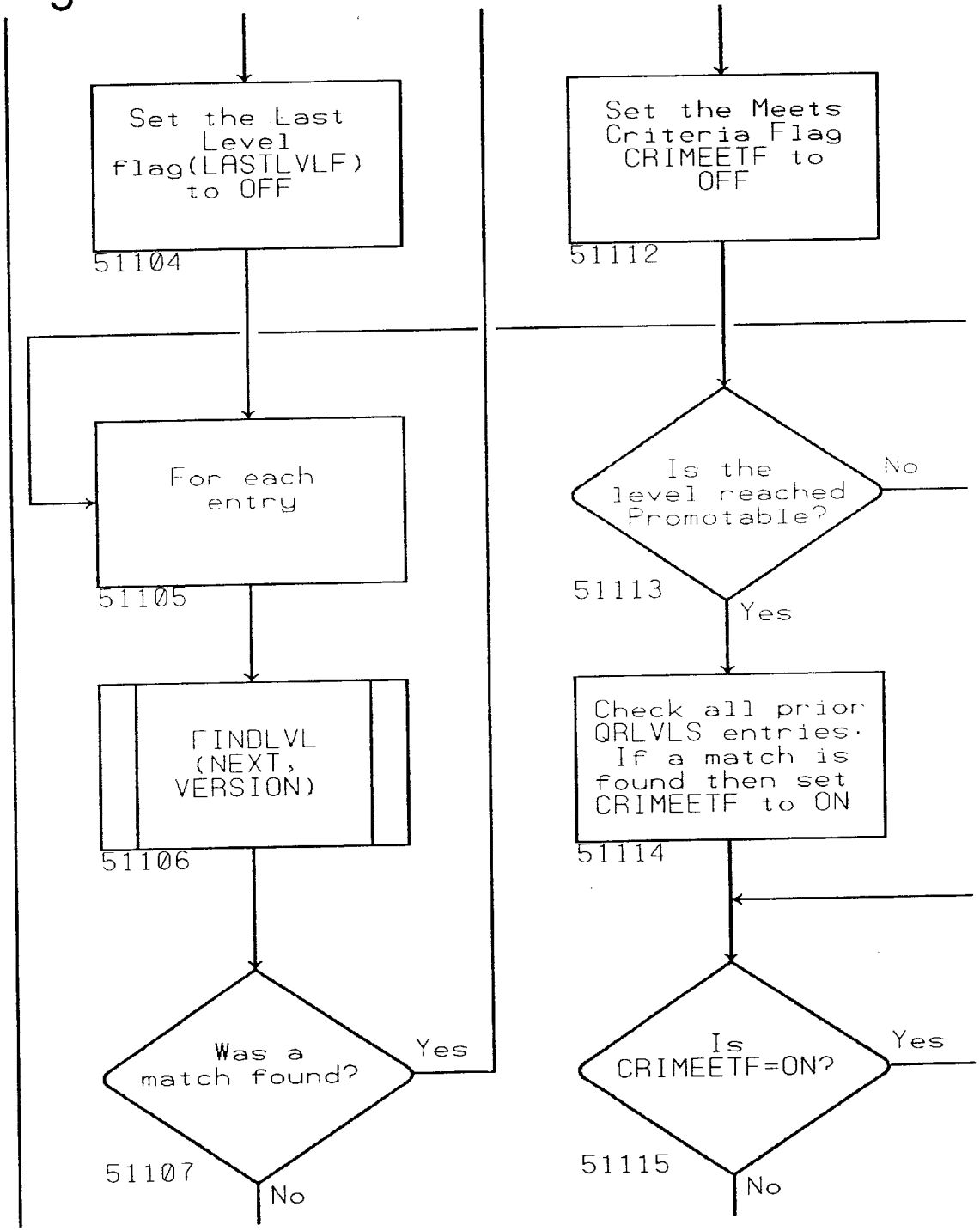
Figure 89C:
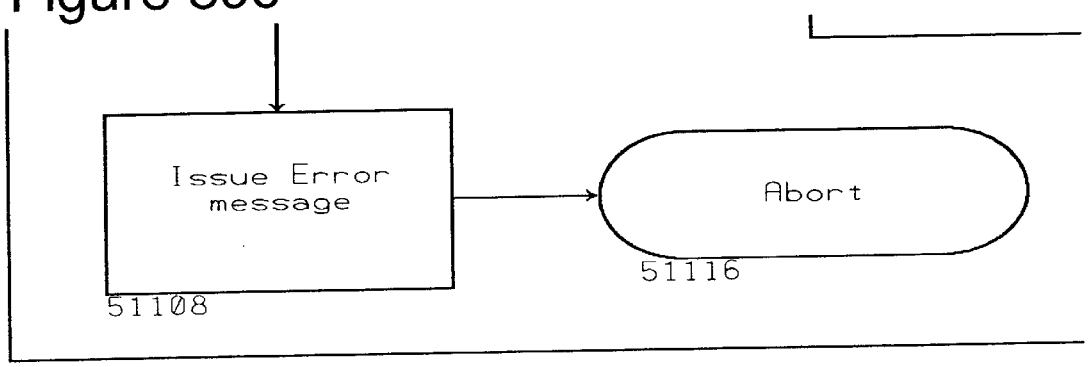
Figure 89D:
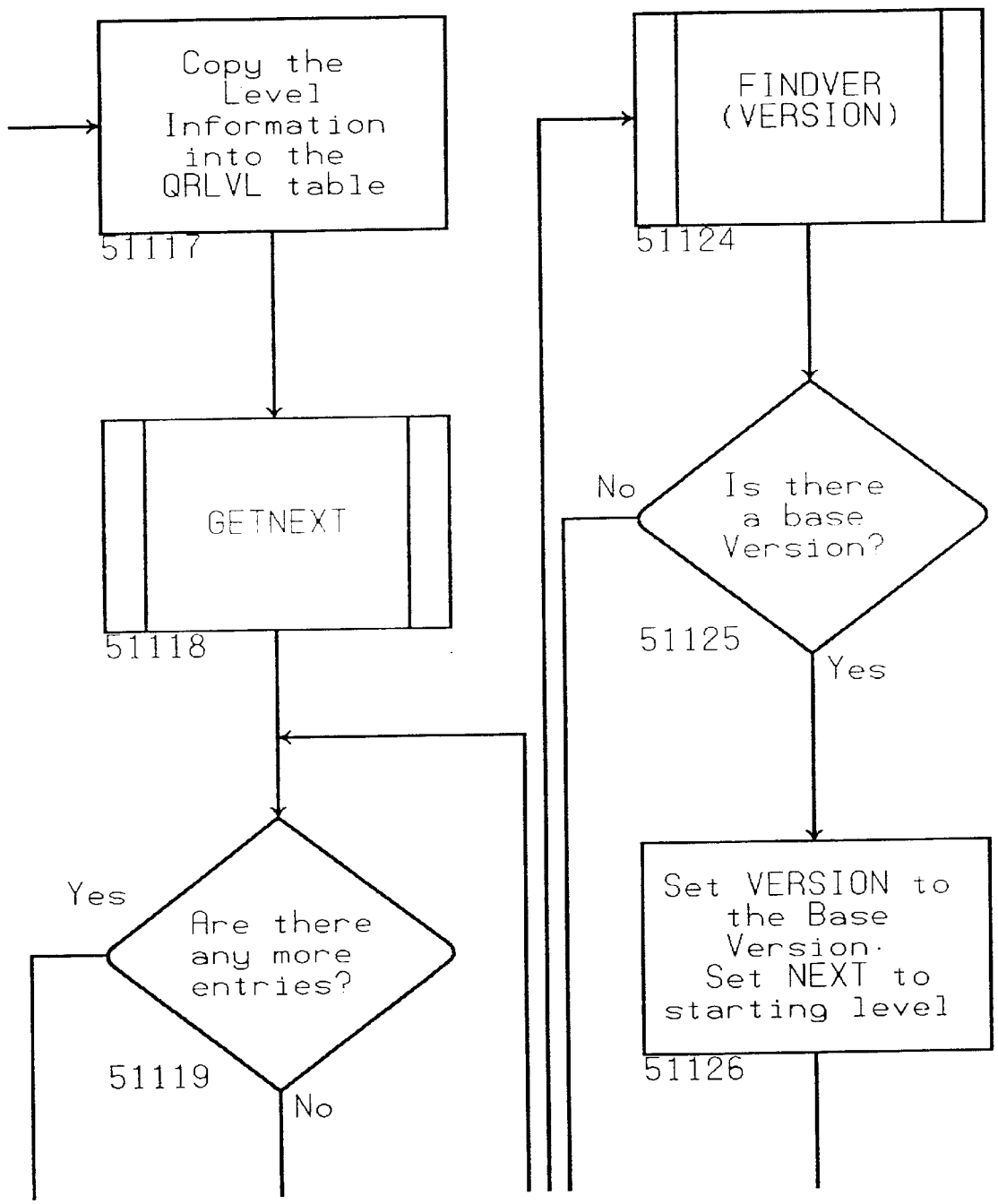
Figure 89E:
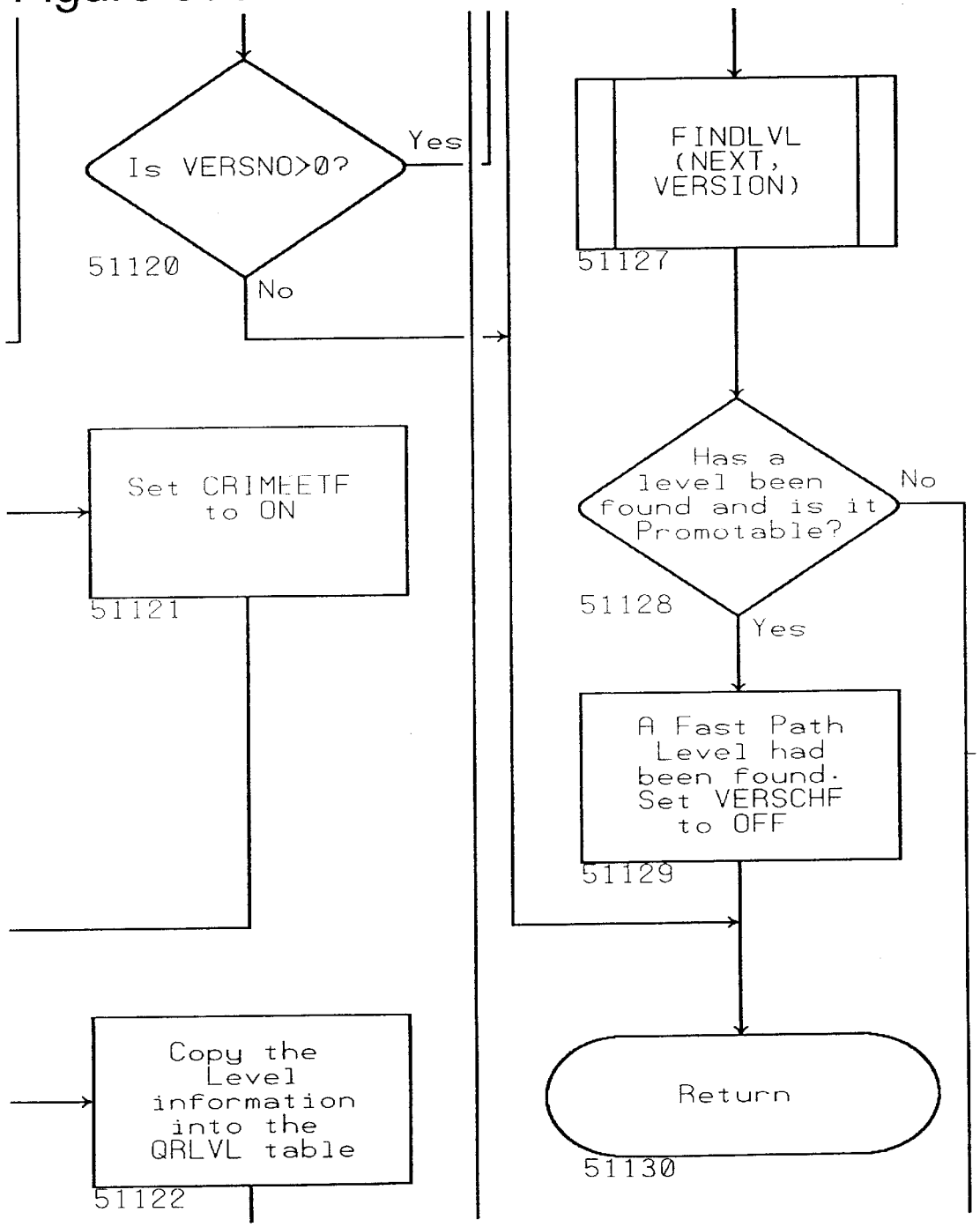
Figure 89F:
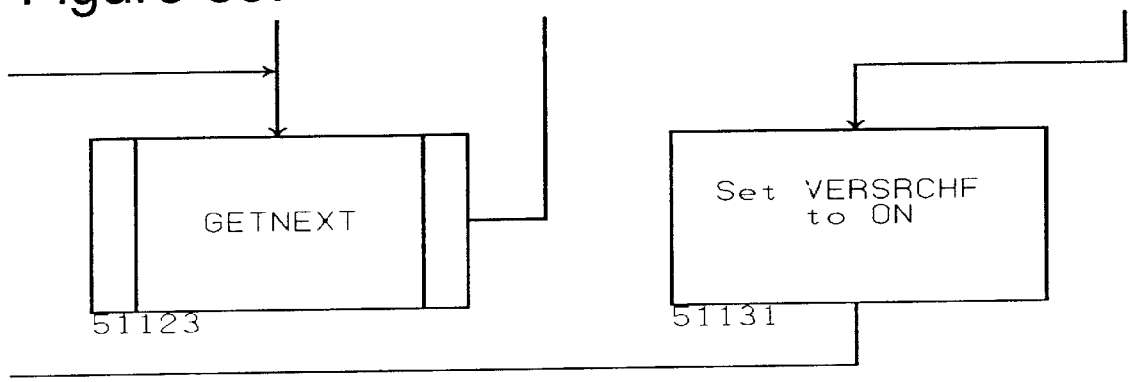
Figure 90A:
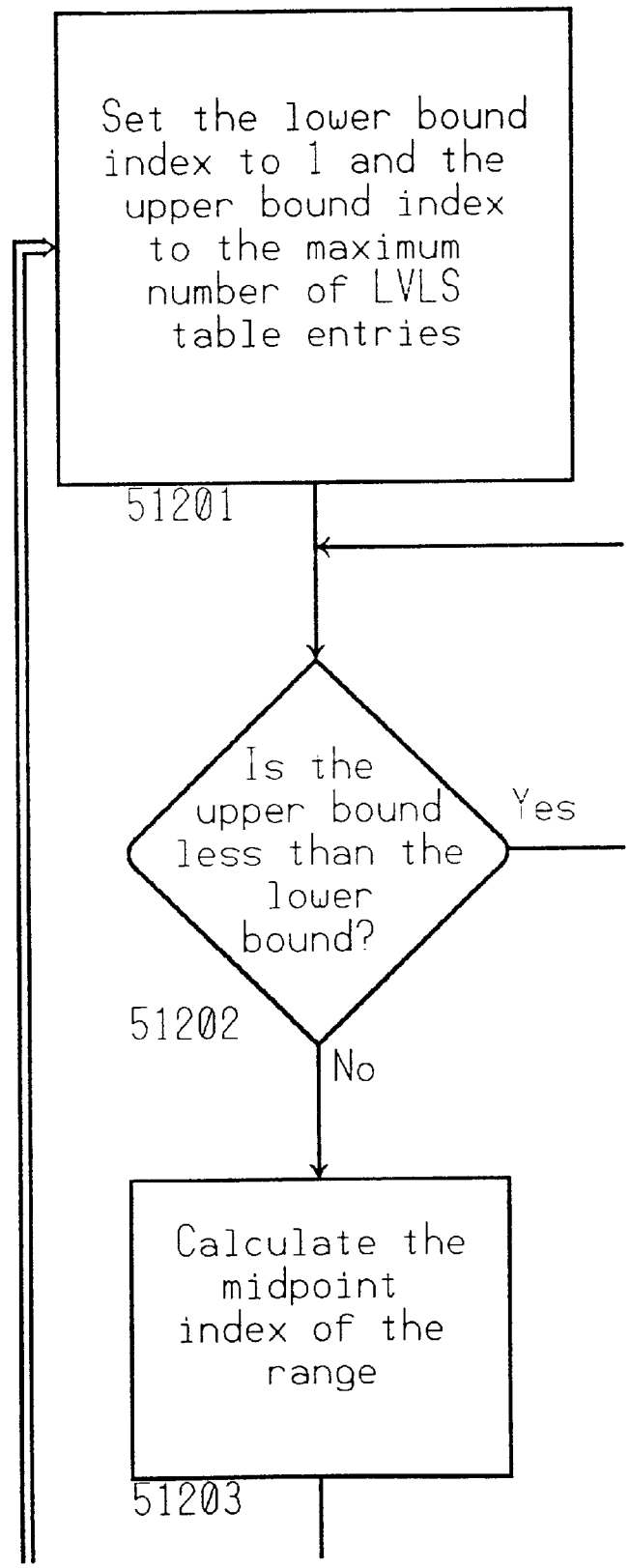
FIG. 90 which comprises FIG. 90a thru 90e, describes the FINDLVL Process.
Figure 90B:
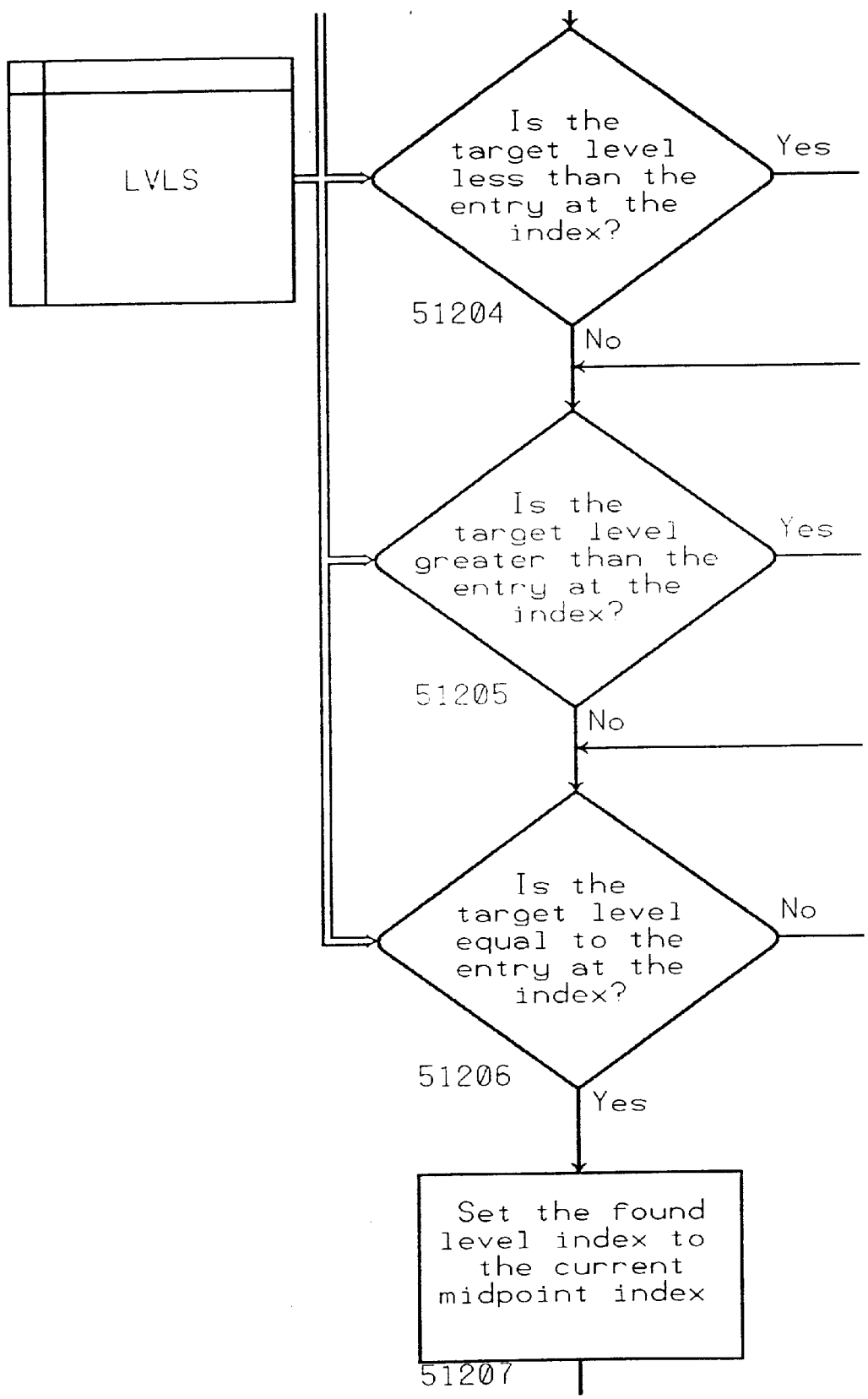
Figure 90C:
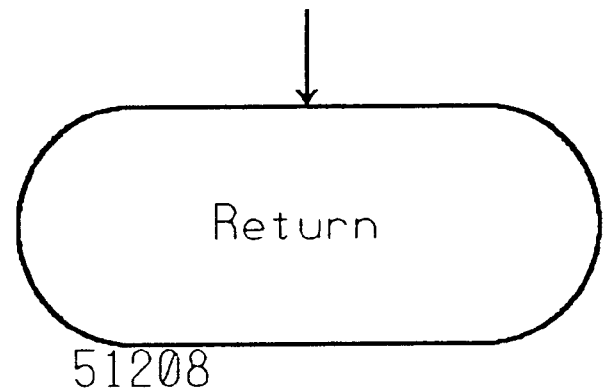
Figure 90D:
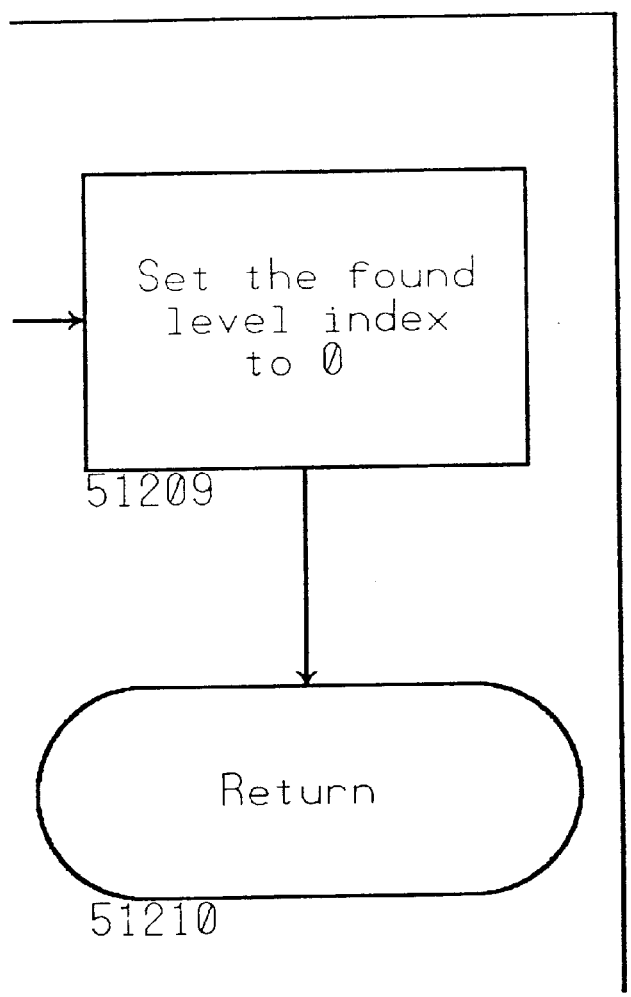
Figure 91A:
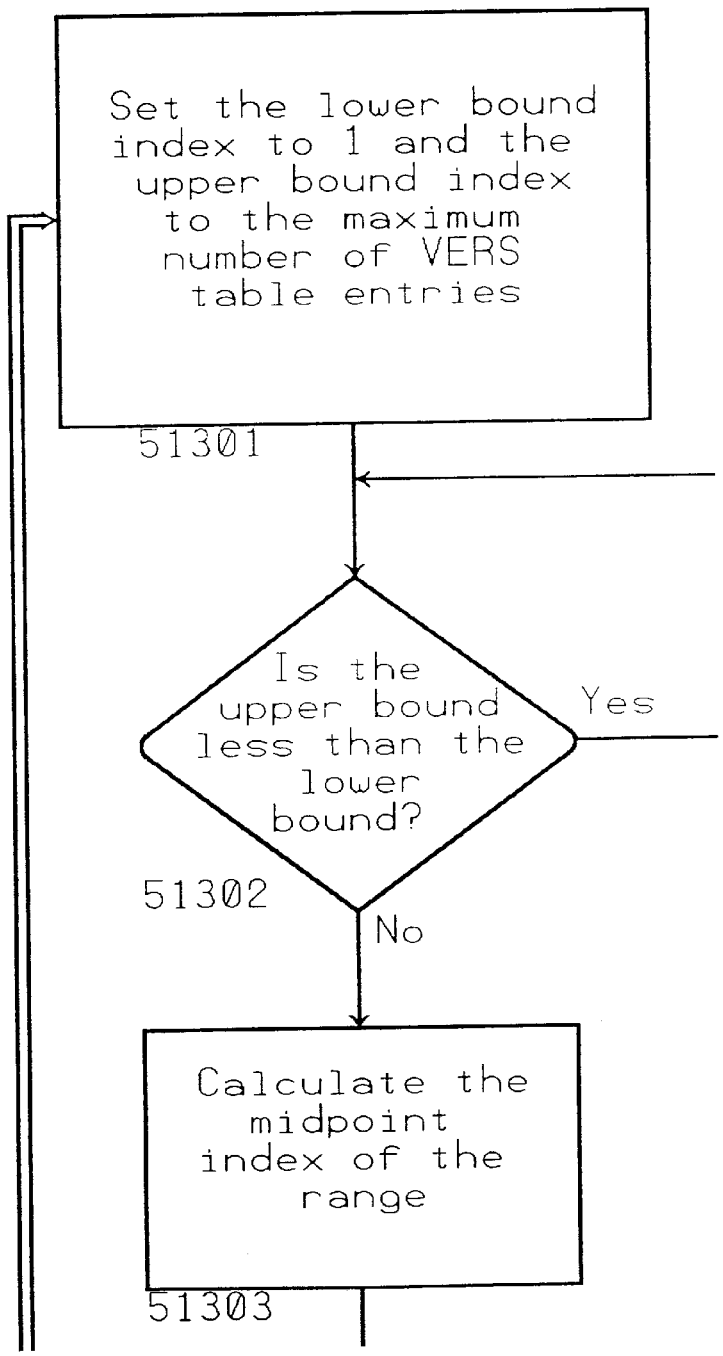
FIG. 91 which comprises FIG. 91a thru 91e, describes the FINDVER Process.
Figure 91B:
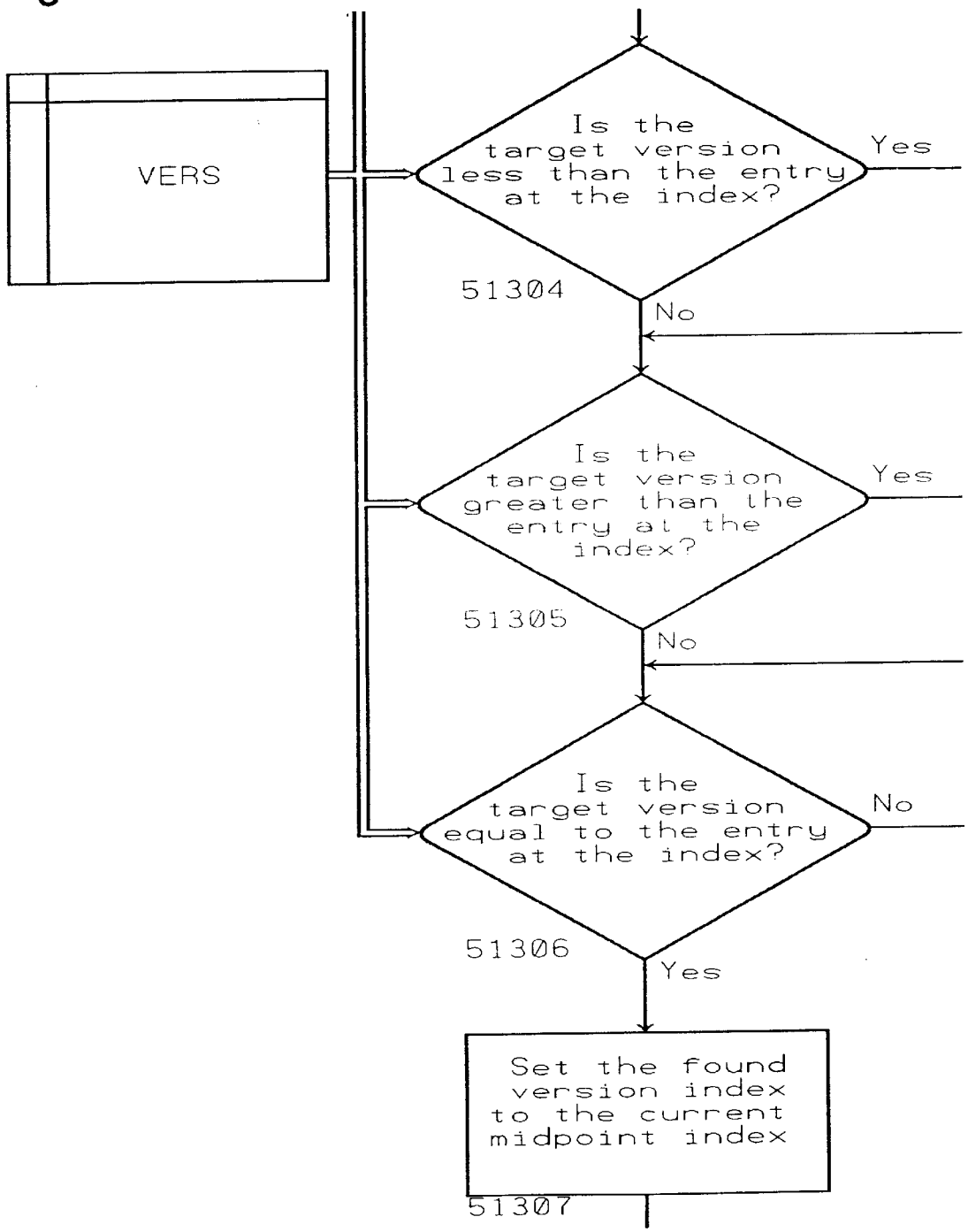
Figure 91C:
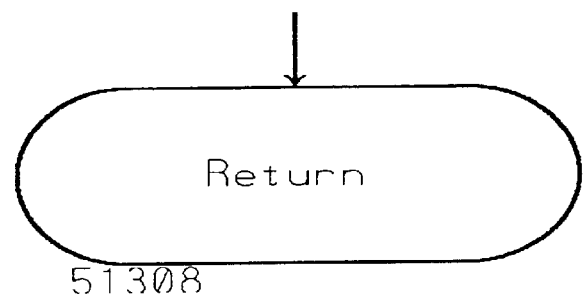
Figure 91D:
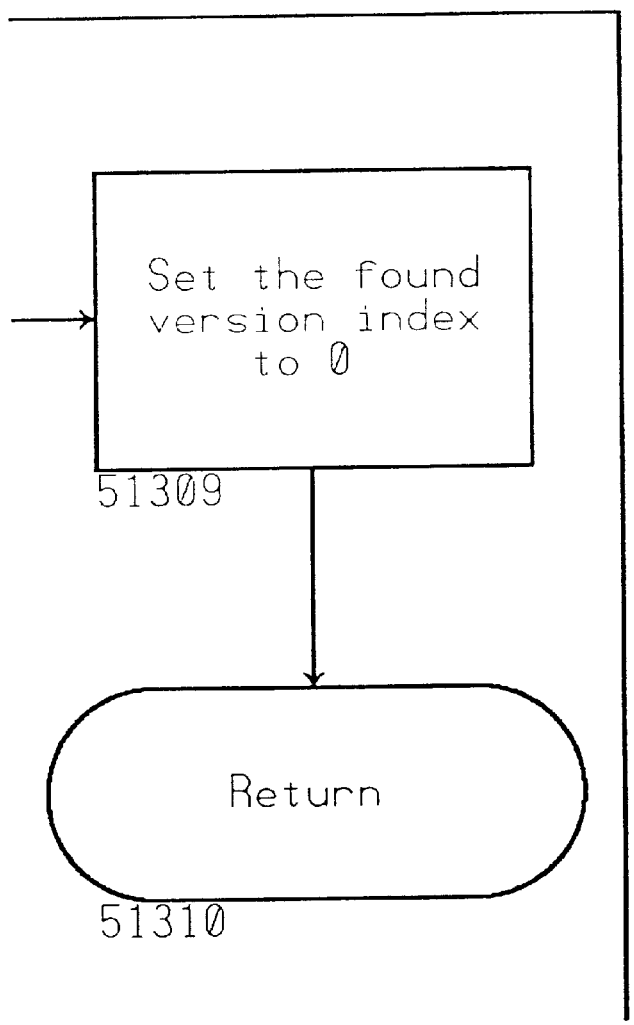
Figure 91E:
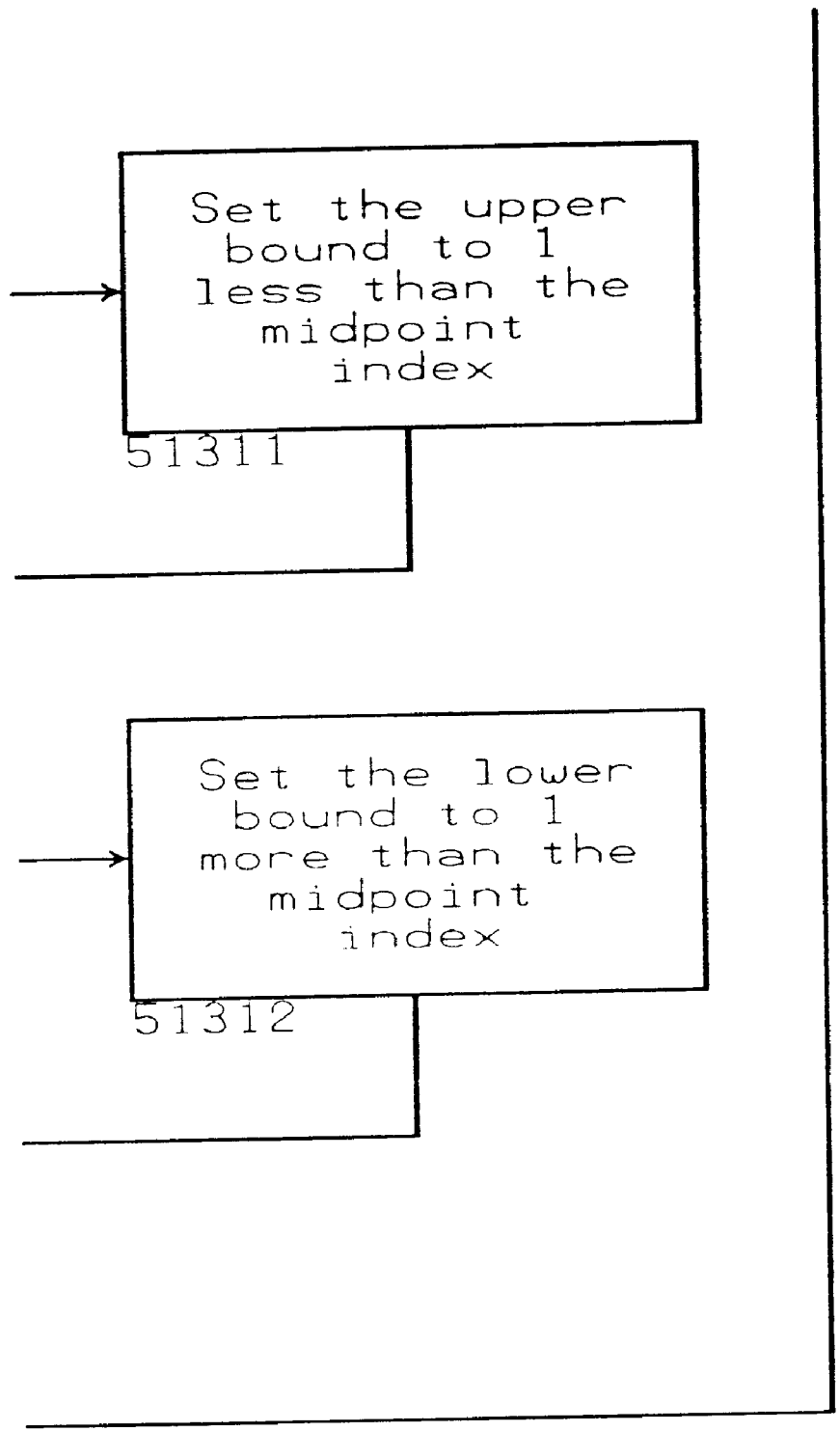

The QRLSEARC Process FIG. 88: This process is used to generate the Level Search table.

After initialization, a query 51001 is made to get all entries for the Package and FileType from the LEVELS table in the Control Repository and build the local LVLS table. Next, a query 51002 is made to get all entries for the Package and FileType from the VERSIONS table in the Control Repository and build the local VERS table. Then, the BLDLIST Process described in FIG. 89 is invoked 51003. Upon return from the above process, the process returns 51004 to the caller.

The BLDLIST Process FIG. 89: This process is used buy the QRLSEARC Process to build the search QRLVL table.

Figure 92:
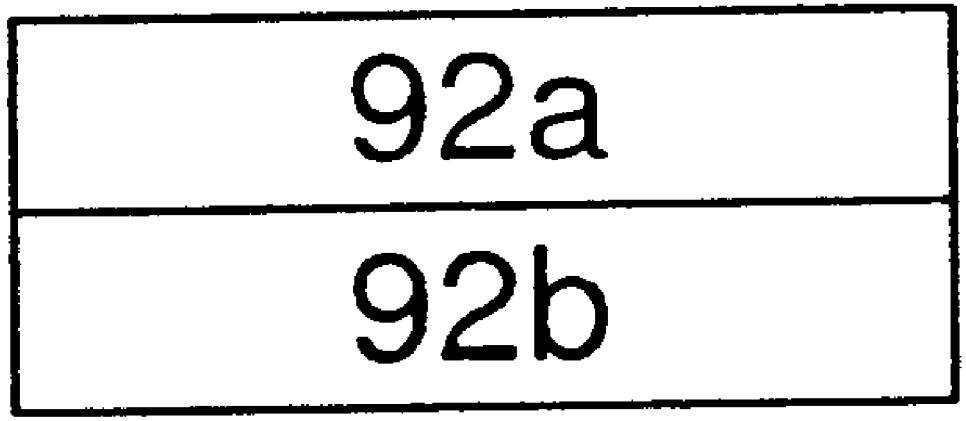
FIG. 92 which comprises FIG. 92a thru 92b, describes the GETNEXT Process.
Figure 92A:
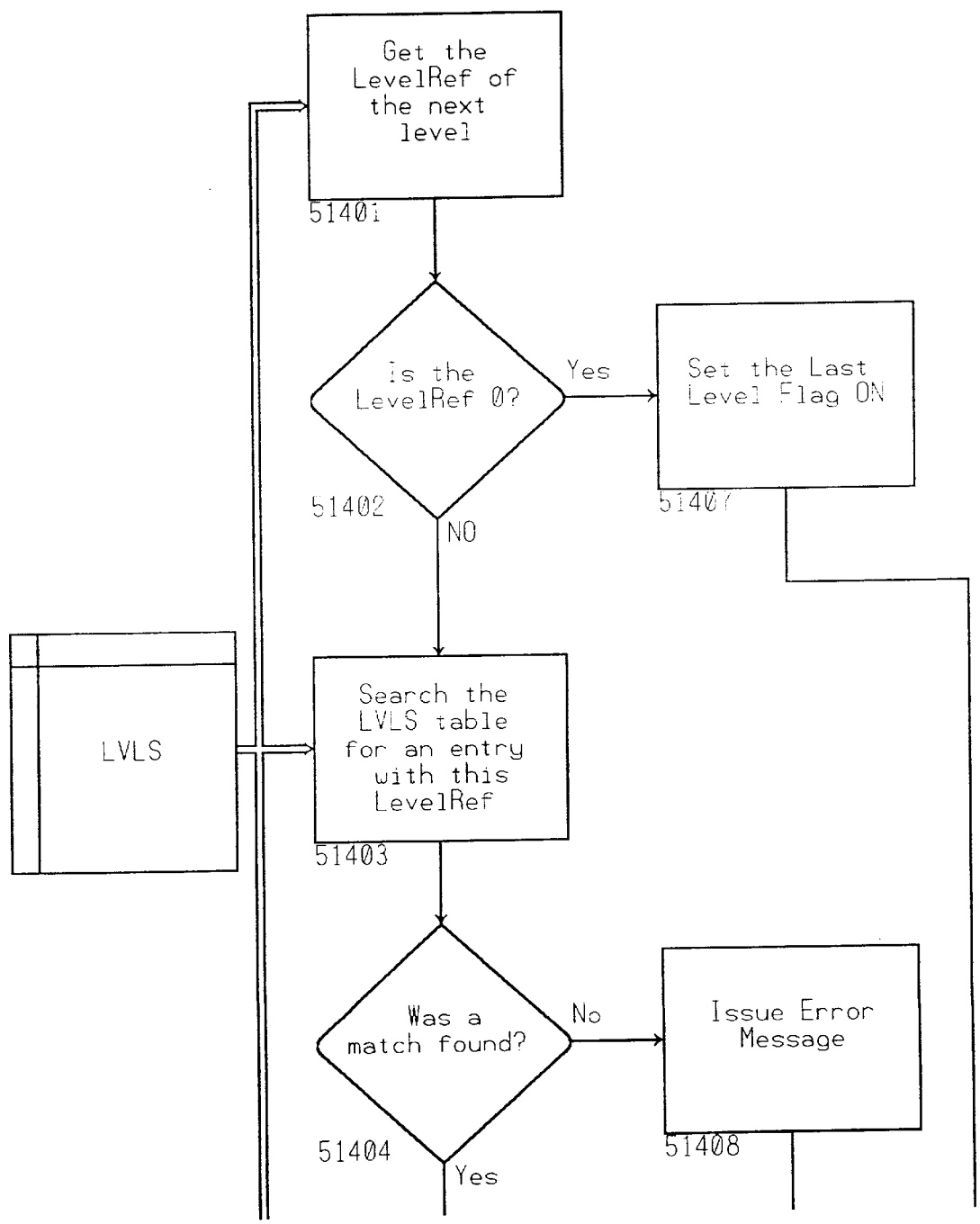
Figure 92B:
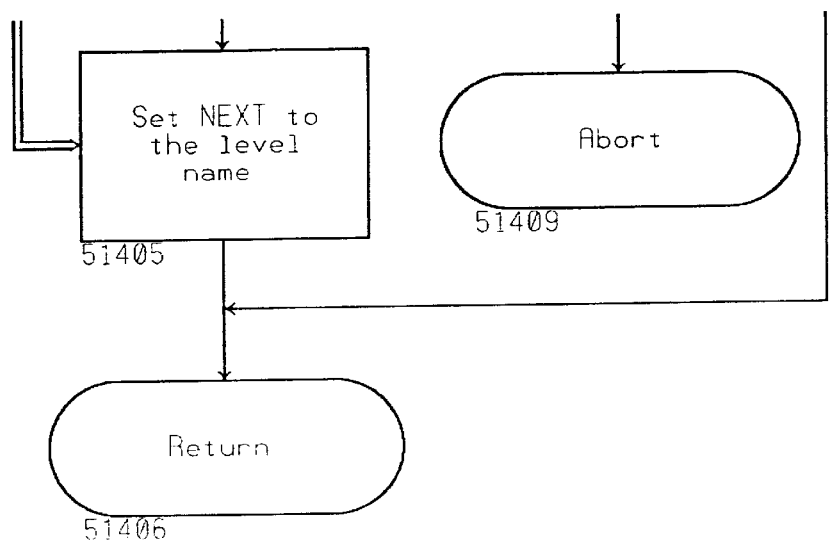
Figure 93A:
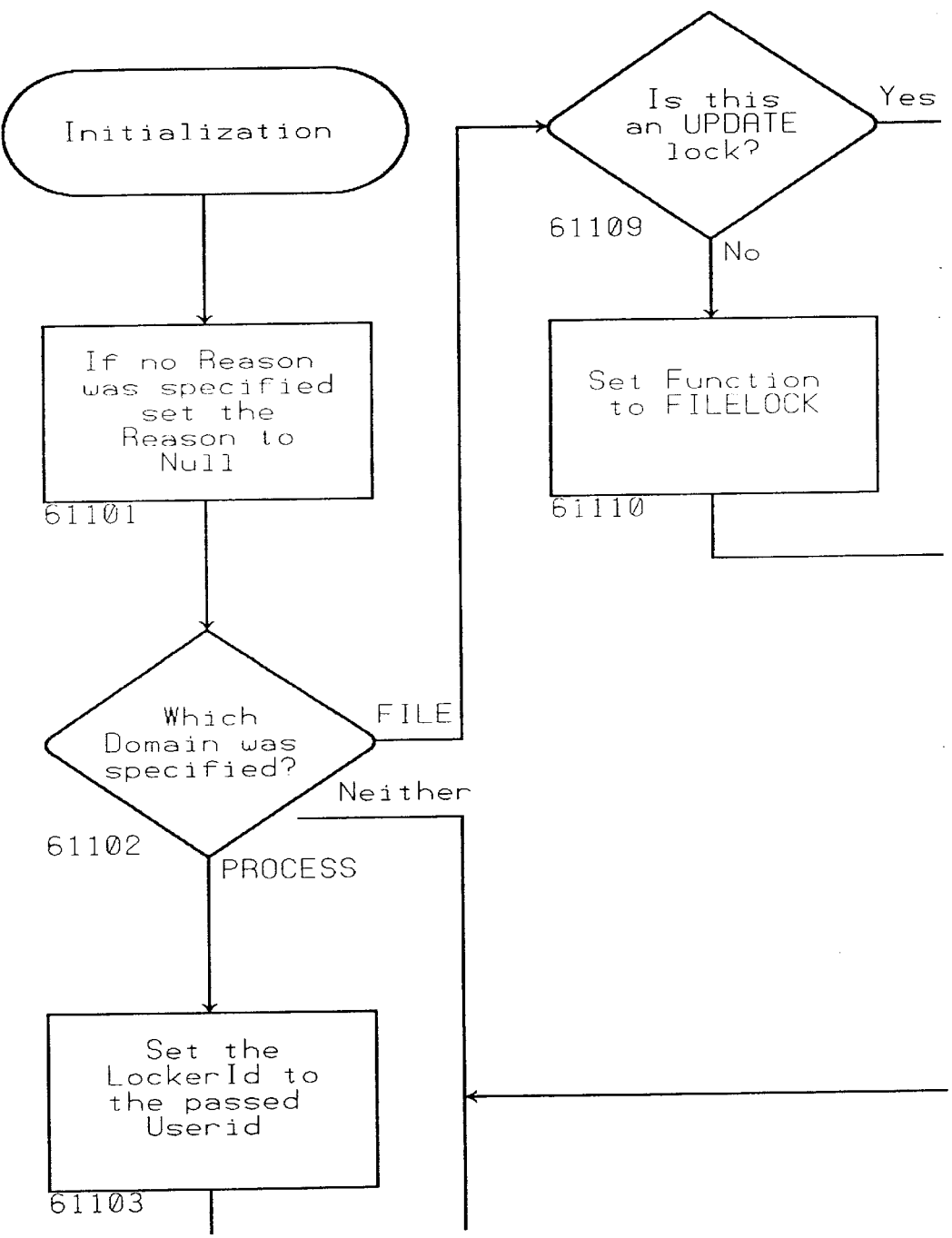
FIG. 93 which comprises FIG. 93a thru 93f, describes the QRLOKSET Process.
Figure 93B:
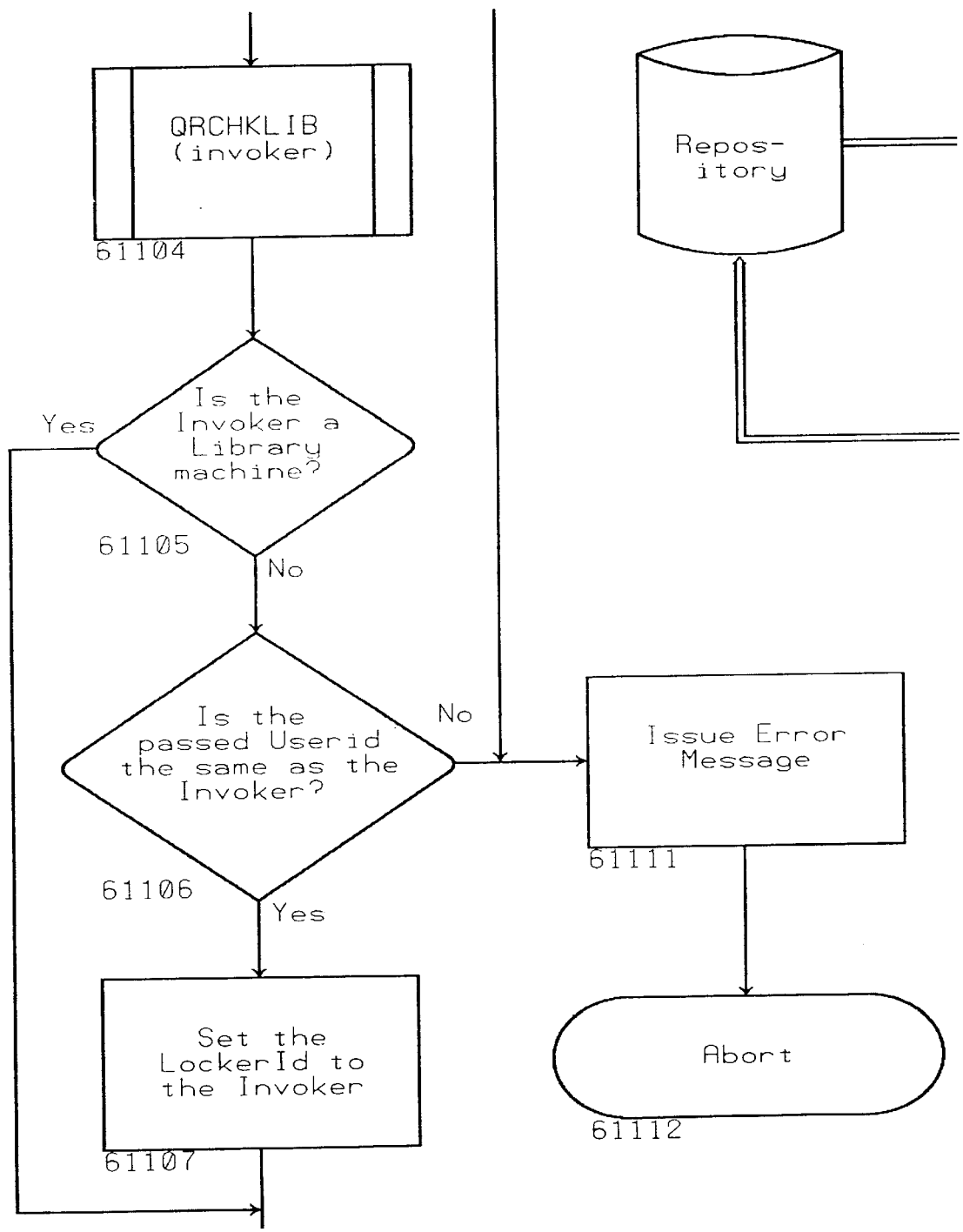
Figure 93C:
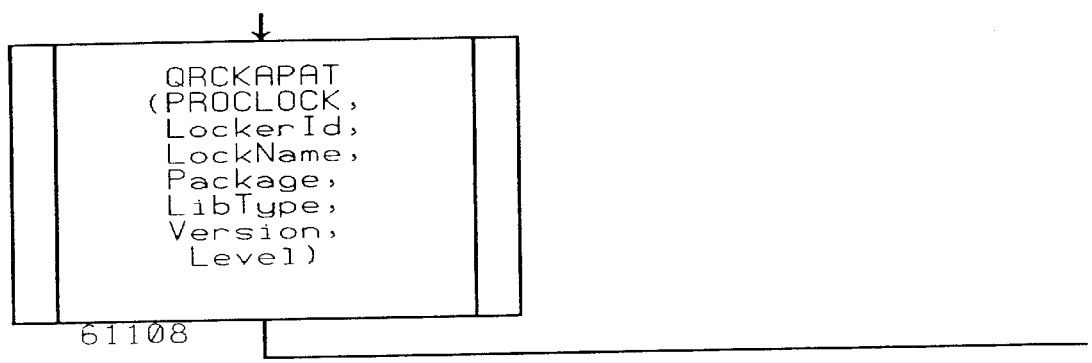
Figure 93D:
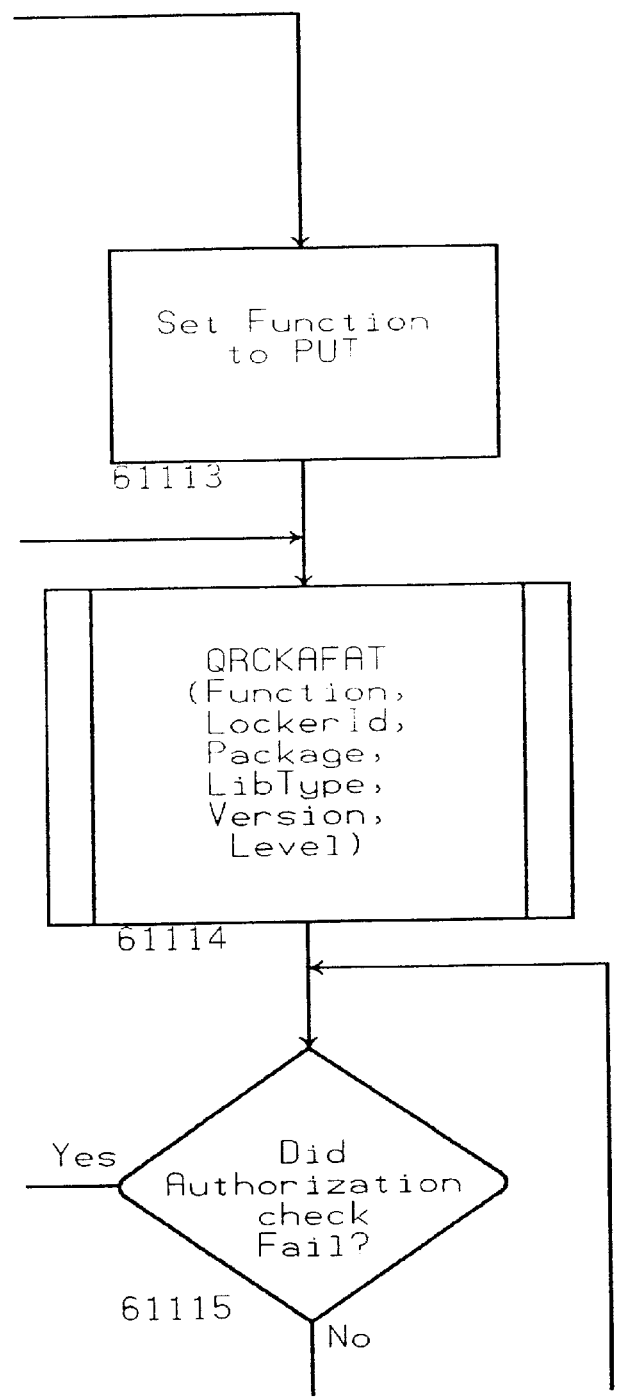
Figure 93E:
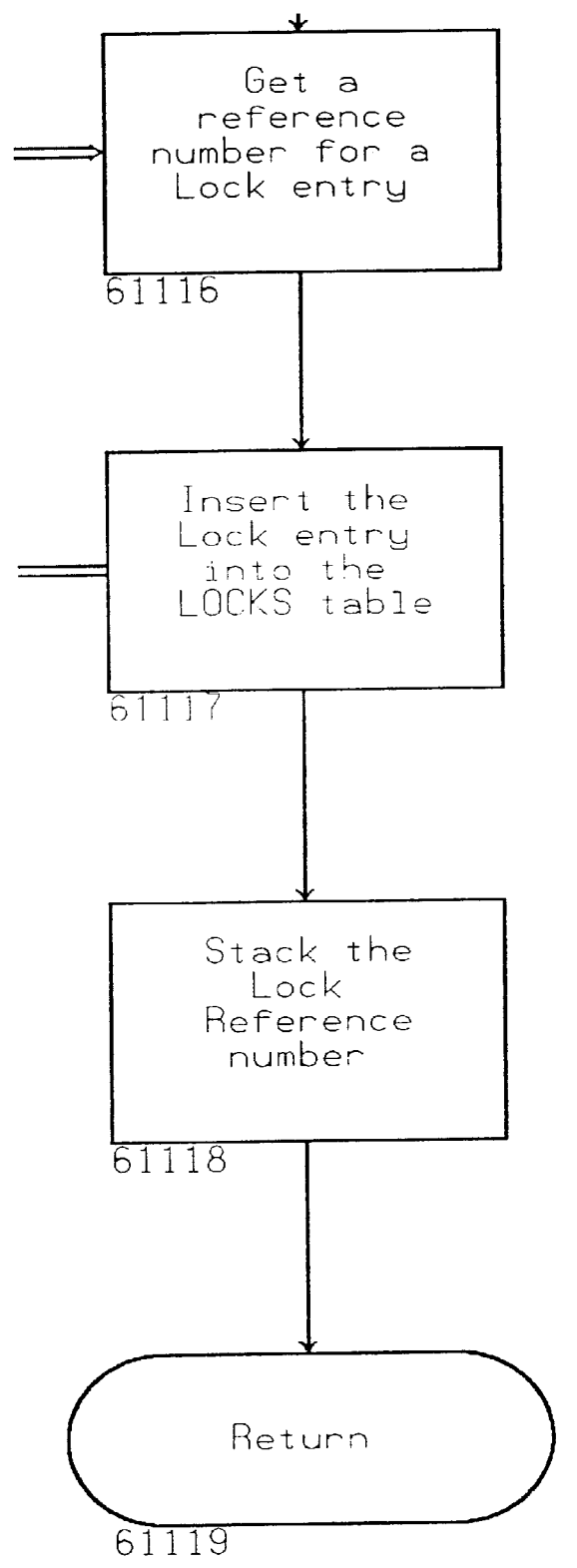
Figure 93F:
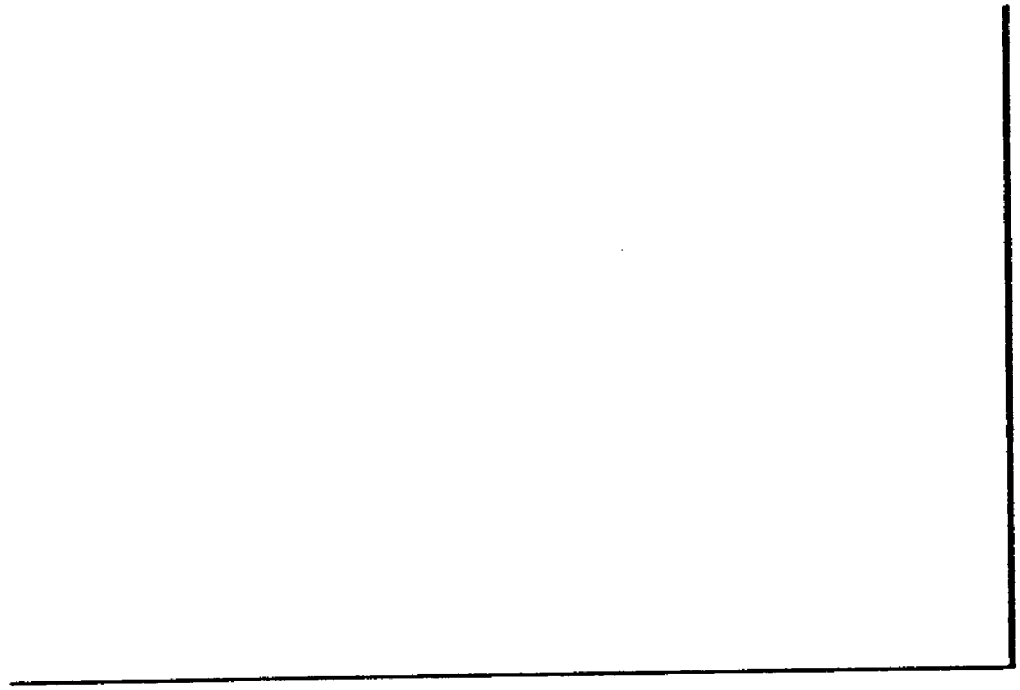
Figure 94A:
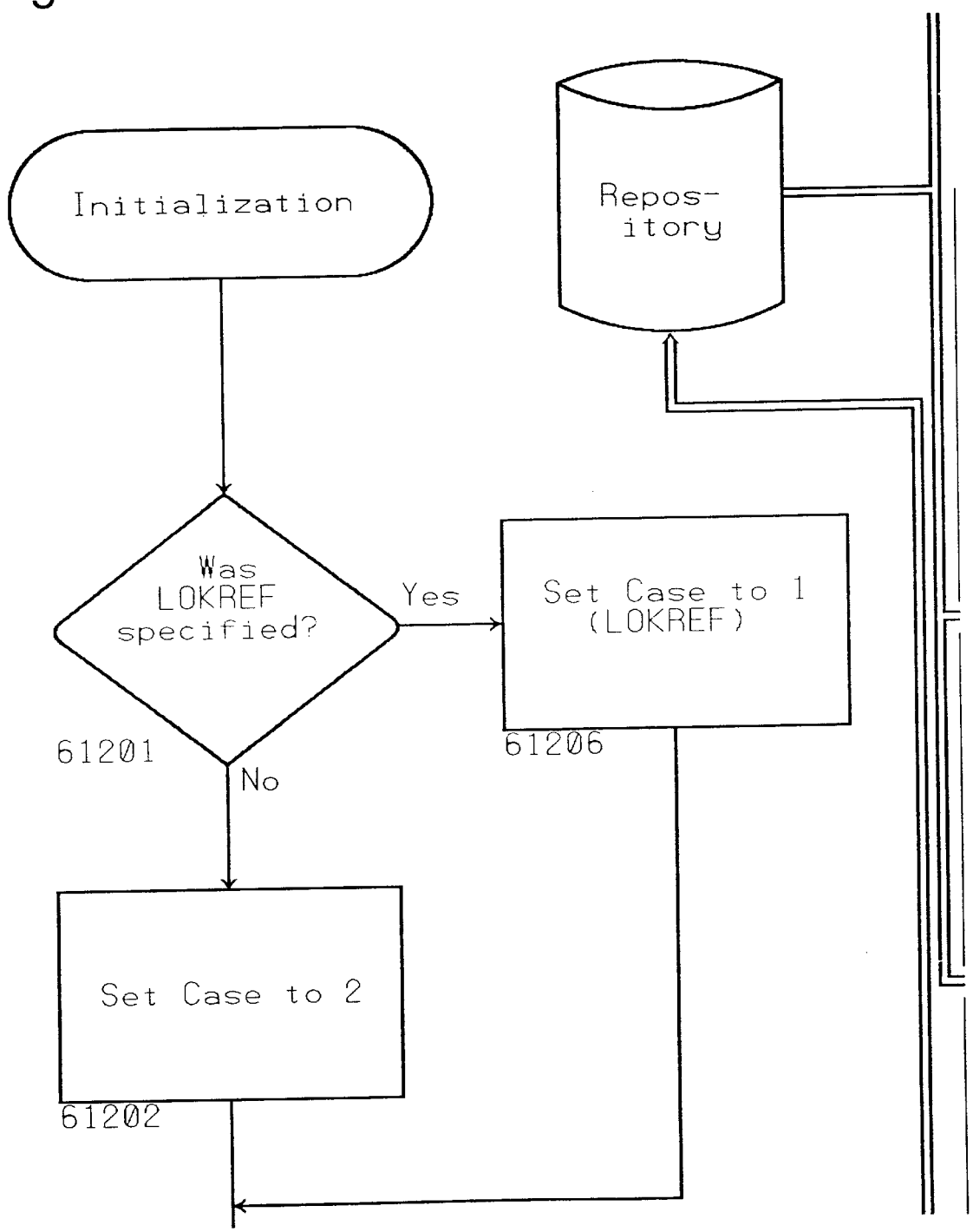
FIG. 94 which comprises FIG. 94a thru 94f, describes the QRLOKRES Process.
Figure 94B:
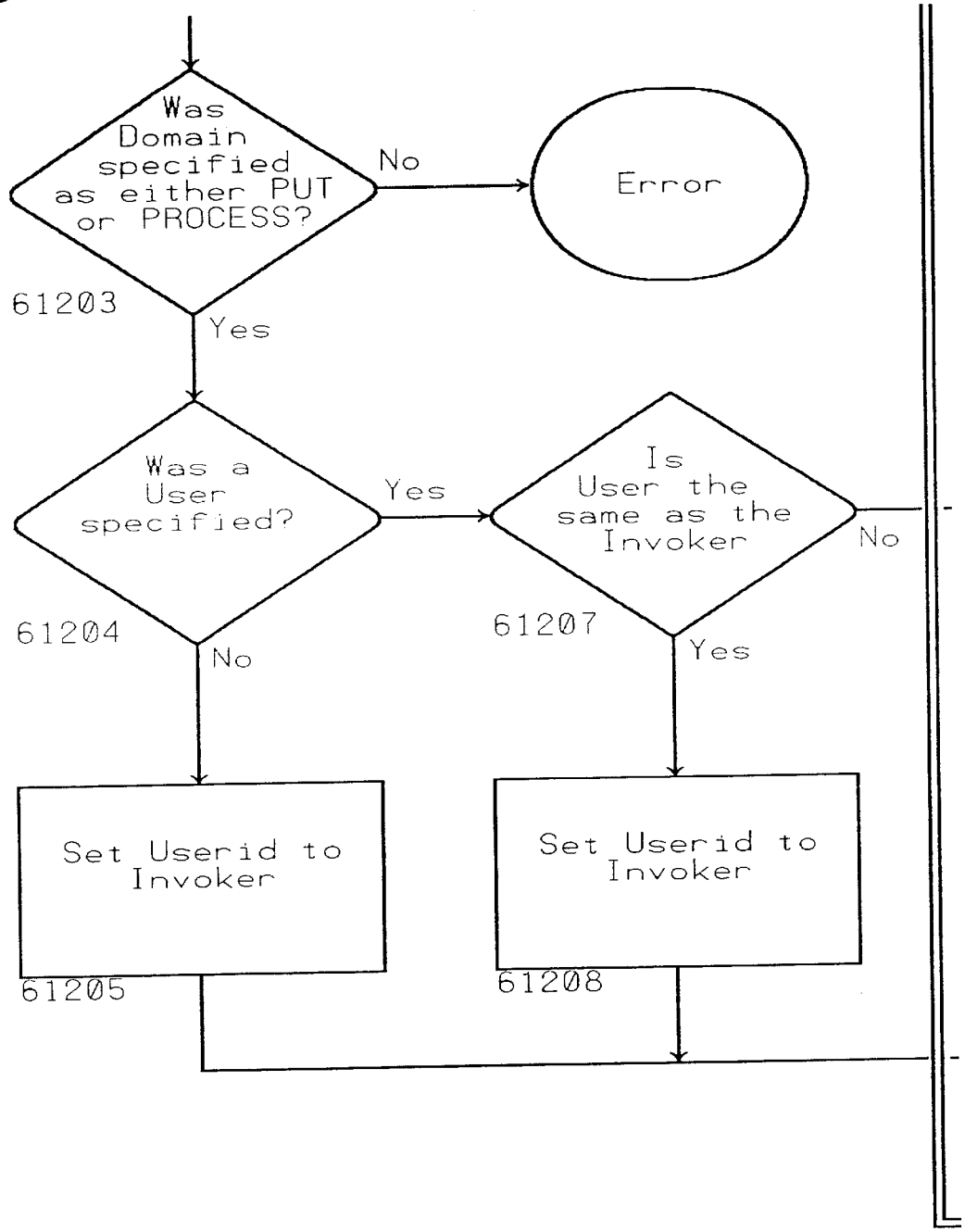
Figure 94D:
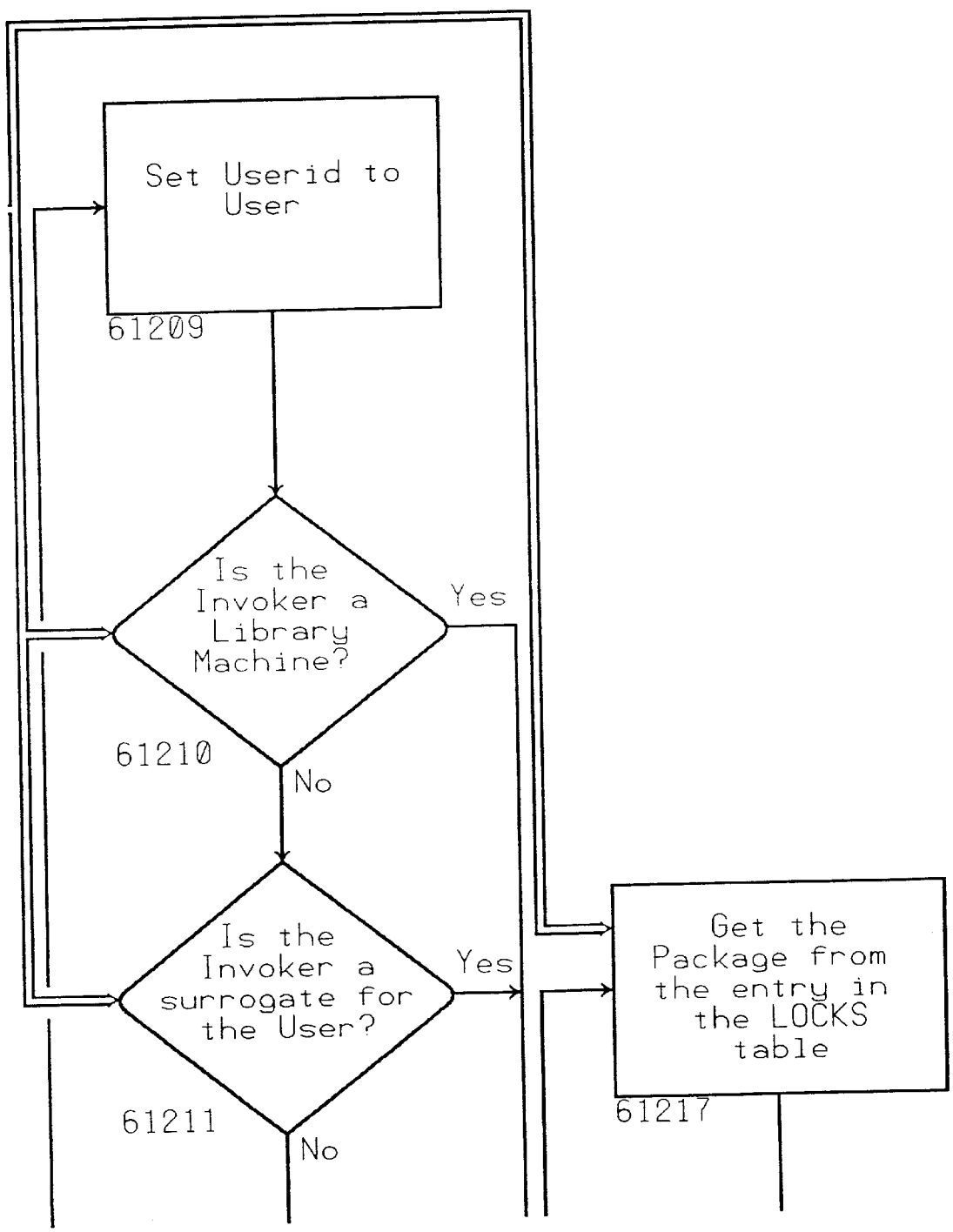
Figure 94E:
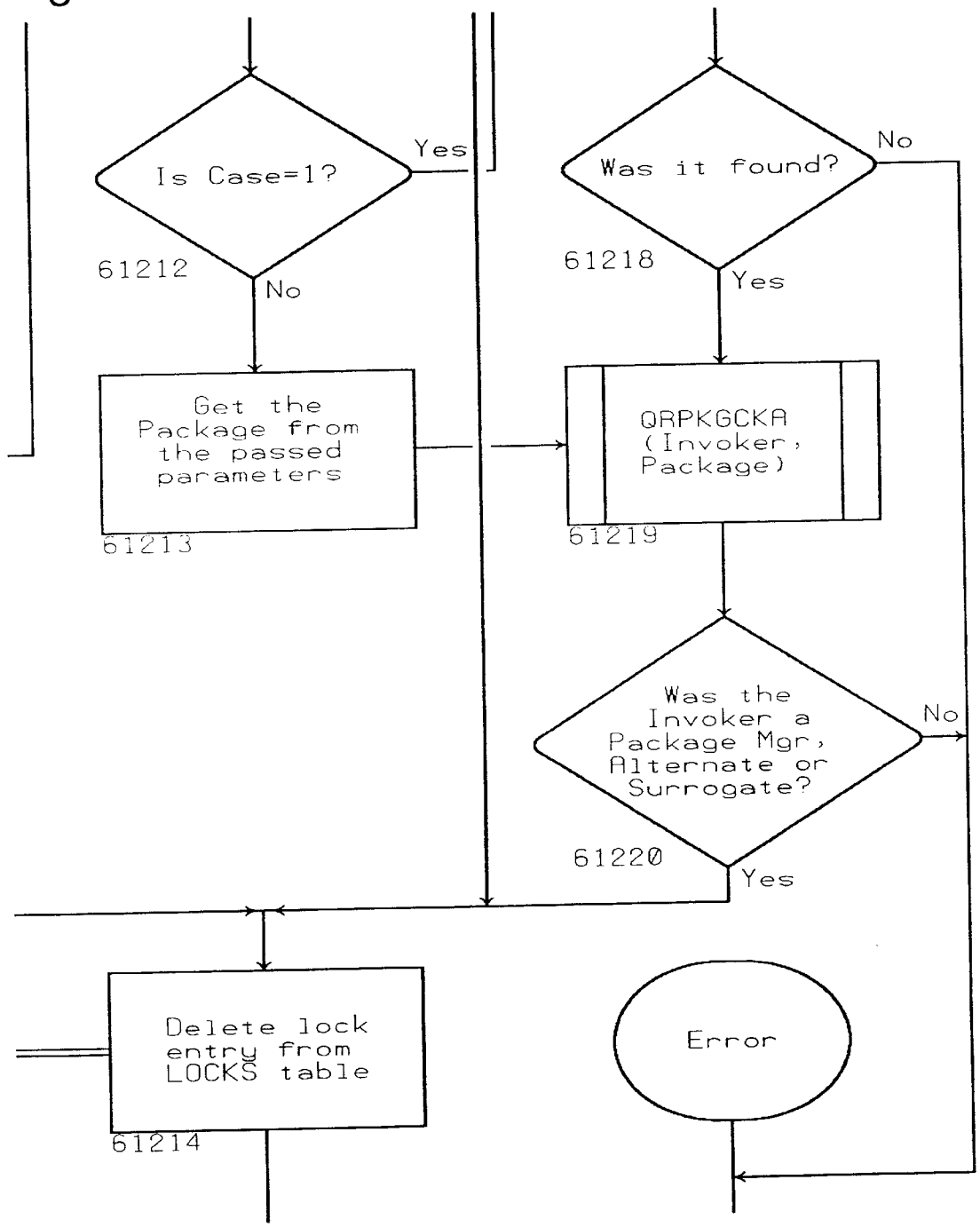
Figure 94F:
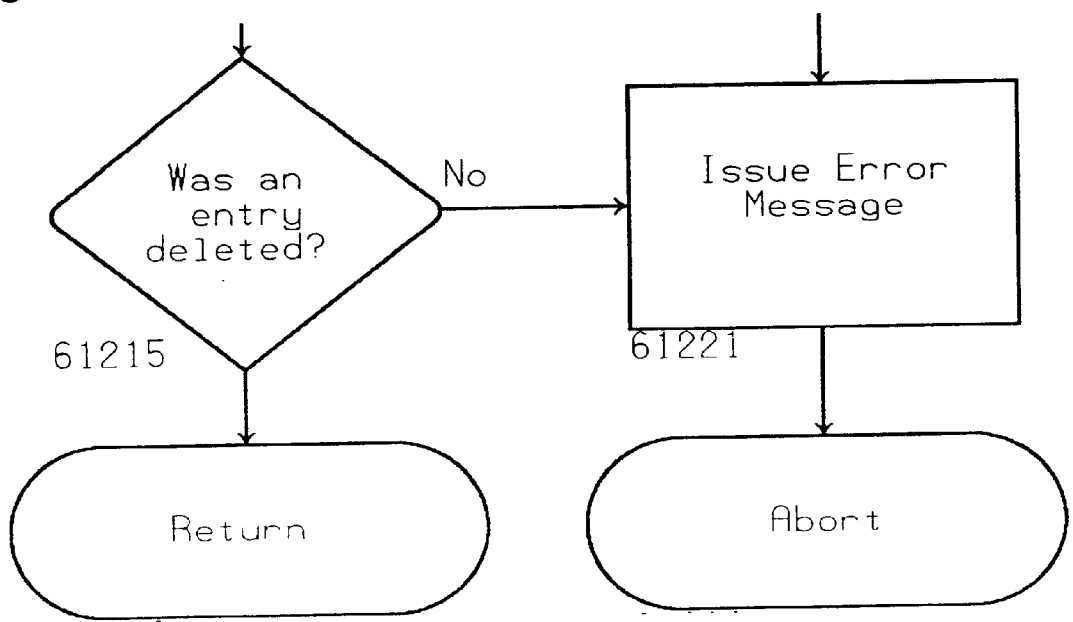

After initialization, set 51101 VERSION to the starting Version and set the Version Search Mode flag (VERSCHF) to OFF. Next, a check 51102 is made to determine if VERSCHF=OFF. If so, set 51103 NEXT to the specified starting level. If not, the FINDLVL Process described In FIG. 90 is invoked 51109. Upon return from the above process, the GETNEXT Process described in FIG. 92 is invoked 51110. In either case, set 51104 the Last Level Flag (LASTLVLF) to OFF.

For each entry 51105, the FINDLVL Process described in FIG. 90 is invoked 51106. Upon return from the above process, a check 51107 is made to determine if a match was found. If not, an error message is issued 51108 and the process aborted 51116. If so, a check 51111 is made to determine if VERSCHF=OFF. If not, set 51112 the Meets Criteria Flag CRIMEETF to OFF. Next, a check 51113 is made to determine if the level reached is Promotable.

If not, set 51121 CRIMEETF to ON. If so, Check 51114 all prior QRLVLS entries. If a match is found the set CRIMEETF to ON. In either case, a check 51115 is made to determine if CRIMEEETF is ON. If so, Copy 51122 the Level information into the QRLVL table. In either case, the GETNEXT Process described in FIG. 92 is invoked 51123. Upon return from the above process, the process flows forward to 51119. If a match was found (51107) and VERSRCHF is OFF (51111), copy 51117 the level information into the QRLVL table. Then, the GETNEXT Process described in FIG. 92 is invoked 51118. Upon return from the above process, a check 51119 is made to determine if there are any more entries. If so, the process flows back to 51105. If not, a check 51120 is made to determine if VERSNO is greater than 0. If not, the process returns 51130 to the caller. If so, the FINDVER Process described in FIG. 91 is invoked 51124. Upon return from the above process, a check 51125 is made to determine if there is a base version. If not, the process returns 51130 to the caller. If so, set 51126 VERSION to the Base Version and set NEXT to the starting level. Then, the FINDLVL Process described in FIG. 90 is invoked 51127. Upon return from the above process, a check 51128 is made to determine if a level nas been found and it is Promotable. If not, set 51131 VERSRCHF to ON. Then, the process flows back to 51102. If so, a Fast path level has been found. Set 51129 VERSRCHF to OFF. Then, the process returns 51130 to the caller.

The FINDLVL Process FIG. 90: This process is used by the BLDLIST Process to find the next level in the LVLS table After initialization, set 51201 the lower bound index to 1 and the upper bound index to the maximum number of LVLS table entries. Next, a check 51202 is made to determine if the upper bound is less than the lower bound. If so, set 51209 the found level index to 0 and, the process returns 51210 to the caller. If not, calculate 51203 the midpoint index of the range. Next, a check 51204 is made to determine if the target level is less than the entry at the index. If so, set 51211 the upper bound to one more than the midpoint index. In either case, a check 51205 is made to determine if the target level is greater than the entry at the index. If so, set 51212 the lower bound to one more that the midpoint index. In either case, a check 51206 is made to determine if the target level is equal to the entry at the index. If not, the process flows back to 51202. If so, set 51207 the found level index to the current midpoint index. Then, the process returns 51208 to the caller.

The FINDVER Process FIG. 91: This process is used by the BLDLIST Process to find the next level in the VERS table After initialization, set 51301 the lower bound index to 1 and the upper bound index to the maximum number of VERS table entries. Next, a check 51302 is made to determine if the upper bound is less than the lower bound. If so, set 51309 the found level index to 0 and the process returns 51310 to the caller. If not, calculate 51303 the midpoint index of the range. Next, a check 51304 is made to determine if the target version is less than the entry at the index. If so, set 51311 the upper bound to one more than the midpoint index. In either case, a check 51305 is made to determine if the target version is greater than the entry at the index. If so, set 51312 the lower bound to one more that the midpoint index. In either case, a check 51306 is made to determine if the target version is equal to the entry at the index. If not, the process flows back to 51302. If so, set 51307 the found version index to the current midpoint index. Then, the process returns 51308 to the caller.

The GETNEXT Process FIG. 92. This process is used by the BLDLIST Process to get the next level in the LVLS table.

After initialization, get 51401 the LevelRef of the next level. Next, a check 51402 is made to determine if the LevelRef is 0. If so, set 51407 the Last Level Flag ON. Then, the process returns 51406 to the caller. If not, search 51403 the LVLS table for an entry with this LevelRef. Next, a check 51404 is made to determine if a match was found. If not, an error message is issued 51408 Then, the process aborts 51409. If so, set 51405 NEXT to the level name. Then, the process returns 51406 to the caller.

Lock Manager

Our embodiment contemplates the use of a Lock Manager to enable authorized users to view, set and reset four types of data locks. The preferred embodiment defines the four types as:

Out for Update Also known as an Update or Ownership lock, this denotes that a user owns a piece of data. Since Out for Update locks are associated with a Package, Filetype, Version and Level (PFVL), our embodiment permits multiple users to share the ownership of the same piece of data. Multiple users can accomplish this by acquiring Out for Update locks at different Library Entry Levels.

Overlay This lock prevents a piece of data residing at one Library Level from being overlaid by the same piece of data at a lower Level. The same piece of data can be under the influence of multiple Overlay locks simultaneously.

Move Almost identical to Overlay locks, the difference is that a Move lock prevents the piece of data from migrating to another Level as well as being replaced by data at a lower Level.

Processing This is a special type of processing lock set by our Process Manager. It is used to prevent a piece of data from being overlaid while it's undergoing Automated Library Processing. Once the processing is complete, the Process Manager automatically resets this lock.

In addition, the Lock Manager also permits users to share data by acting as Surrogates for one another. A Surrogate of a user may acquire ownership of the user's data without requiring intervention on the user's part. If a surrogate takes ownership, notification is automatically sent to the original owner.

The Lock Manager offers three utilities which enable authorized users to set, reset and view any of the aforementioned locks. Additionally, the Lock Manager interacts with our Library Manager to permit users to set Out for Update locks as part of the File Check Out mechanism.

The Lock Manager may interact with our Aggregation Manager to permit Move or Overlay locks to be set on entire Bill of Materials or Models. The Lock Manager also engages the Authority Manager to ensure only authorized users may perform the requested locking operation.

Our preferred embodiment presents the three utilities available for users as separate entities, although one skilled in the art would appreciate that they can be arranged under a common menu structure. The first utility permits users to Set Library Locks against a file. FIG. 40 depicts the user screen which is divided into three main sections.

The user enters the Name of the File, Library, File Type, Version, and Level in fields 68101 thru 68105 respectively. The user may leave the File Name blank to initiate a Library Search based on the information in fields 68102 thru 68105. A subsequent screen enables the user to select any desired files in the search path. Regardless of the number of files selected, all are passed to the underlying algorithm. Drop down menu buttons 68107 thru 68110 can be used to display a list of valid choices for the Library, File Type, Version, and Level respectively.

The second section contains three radio buttons, 68111, where the user selects the type of lock to set against the file. The three choices are Out for Update, Move and Overlay. Our embodiment does not permit users to set Processing Locks.

The lower section of the screen offers push buttons, 68112, where the user may select any of three possible options. They are:

BOM Lock or Model Lock which enables the user to lock an entire Bill of Materials. The file denoted by the information in fields 68101 thru 68105 must be an anchor file.

Return Lock Reference may be used to acquire the Lock Reference number corresponding to the lock being set.

Return BOM Reference may be used to acquire the Model Reference number corresponding to the BOM denoted by the information entered in fields 68101 thru 68105.

Field 68113, BOM Level Filter is an optional field which may be used limit the scope of the locks set on the components of the BOM. Since these components may exist at multiple Levels, the default is to lock each component. However, this field may be used to lock only those components residing at the desired Level. Drop down menu button 68110 may be used to assist the user in selecting a valid Level.

FIG. 41 illustrates the algorithm used to Set a Library Lock. Although data entry screen 40 may be used to interact with the user and initiate this algorithm, it can also be invoked directly from the command environment or through a third party tool. It begins with Step 68210, in FIG. 41a, which tests to see if the desired type of lock is an Out for Update Lock.

If the test is positive, control proceeds to Step 68212 which sets up a File Loop. If the algorithm is invoked with a single file (or the user entered a single file in FIG. 40), this loop will be exercised once. However, if the user requested a Library Search, and selected multiple files, the loop is exercised for each file.

Control then proceeds to Step 68214 where the program queries the Control Repository to see whether the user has Put Authority for the requested file at the desired Level. Since, an Out for Update lock implies the user wishes to modify the file and store it back into the DMS, Put Authority is usually desired. Step 68214 warns the user if they do not have the proper authority, but since this is not a File Check Out operation, the program proceeds. Step 68216 Gets all existing Out for Update locks from the Control Repository. All locks returned are displayed for the user. In our preferred embodiment, Steps 68214 and 68216 are done with two separate queries, although one skilled in the art would appreciate the opportunity to package it into a single query.

Next, Step 68218 establishes a Lock Loop to loop through all the Out for Update Locks returned by Step 68216 for the current file. Beginning with Step 68220 in FIG. 41*b*, the program checks to see if the User Owns the current lock, and it matches the requested Level and Version. If so, Step 68224 Removes the File from the File List. Otherwise control proceeds to Step 68222. Here, the algorithm checks for a Conflict, which means the lock matches the requested Level and Version, but is owned by another user. In this case the current user may not set an Out for Update lock, so Step 68226 displays an Error Message to the user. Additionally, Step 68224 Removes the File from the File List. The user may only acquire an Out for Update Lock via our File Check Out utility.

Otherwise, the lock exists at another Level and is owned by the current user or another user. In this case, Step 68228 allows the user to Confirm the operation. This gives the user the opportunity to abort the operation in the event of unexpected ownership by another user.

Assuming the user confirms the operation, or Step 68224 is invoked, then control proceeds to the top of the Lock Loop until all locks for the current file are examined. Upon completion of the Lock Loop, control returns to Step 68212 until all files in the current File List are finished.

Figure 41A:
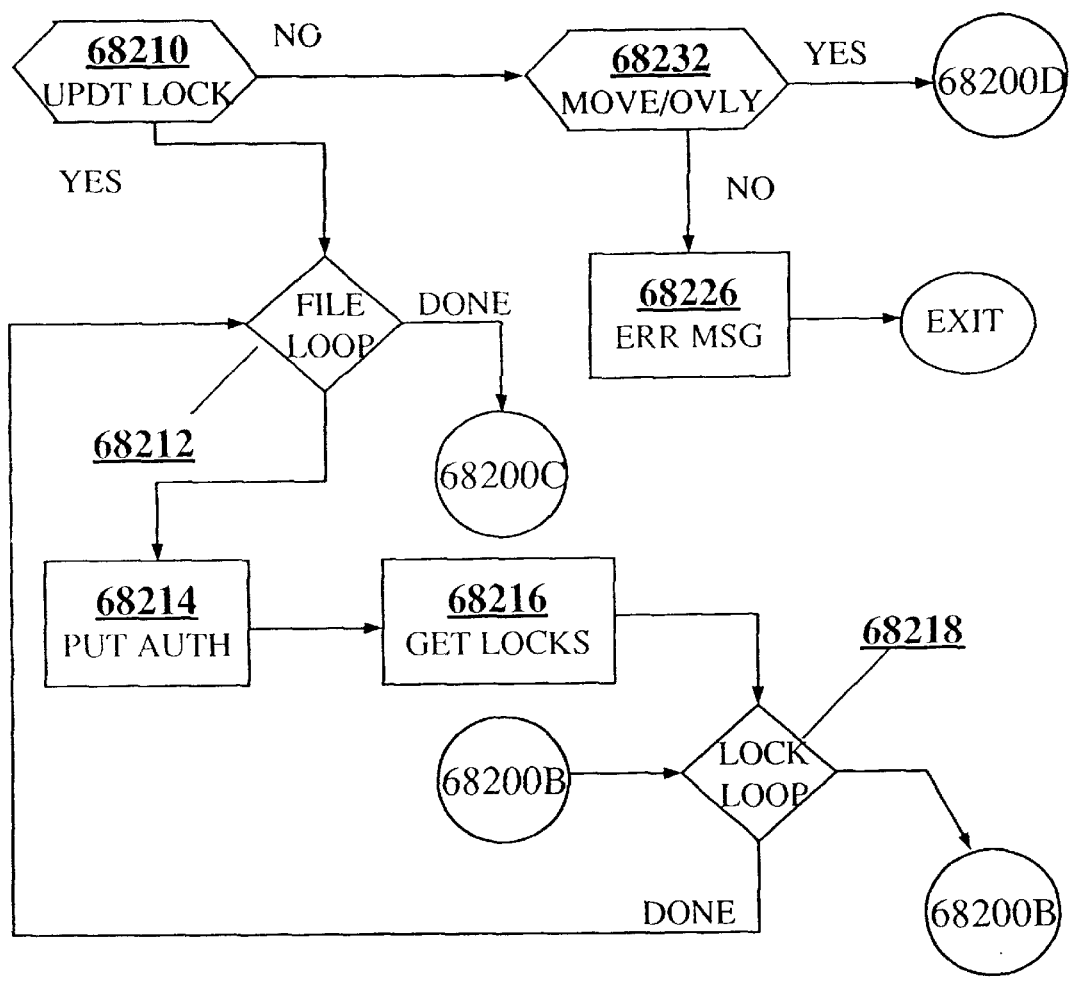
FIG. 41a thru 41d describes the Lock Setting algorithm.
Figure 41B:
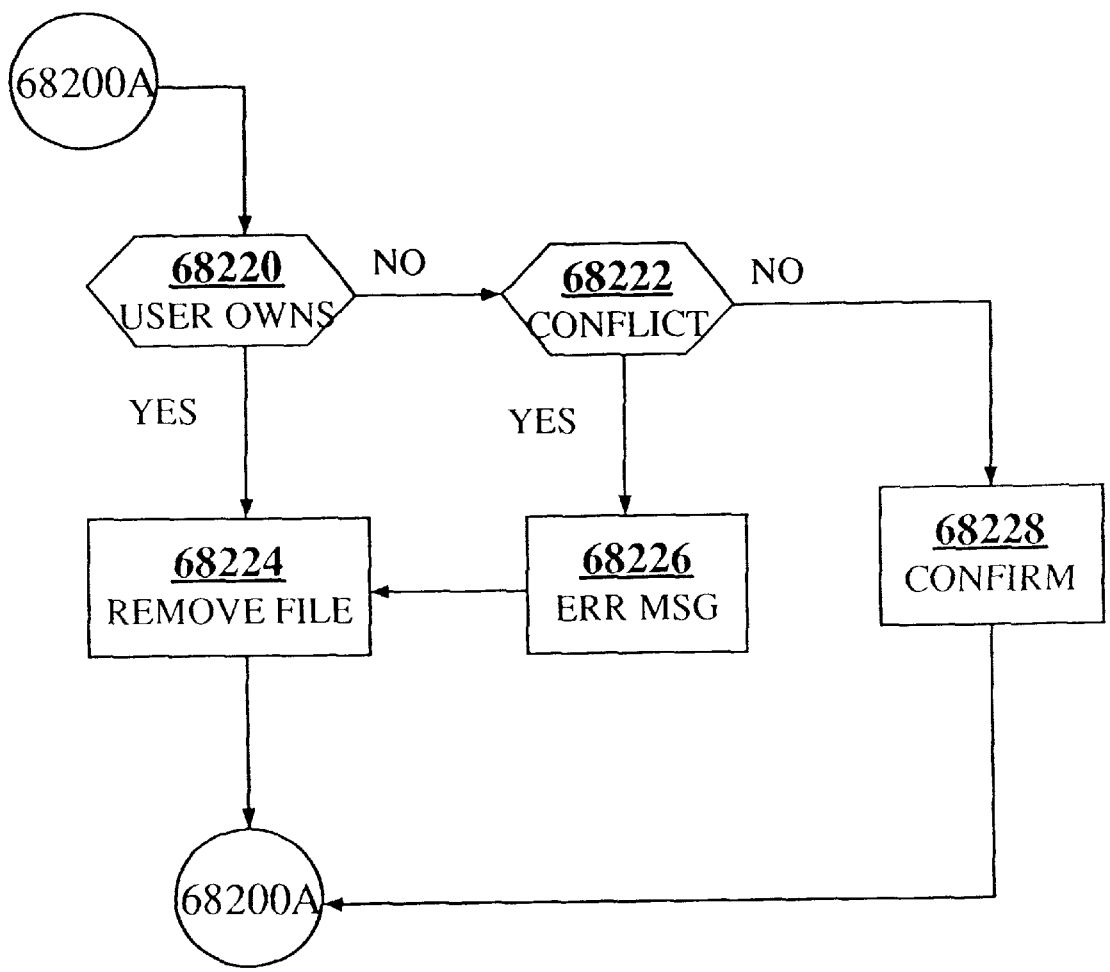
Figure 41C:
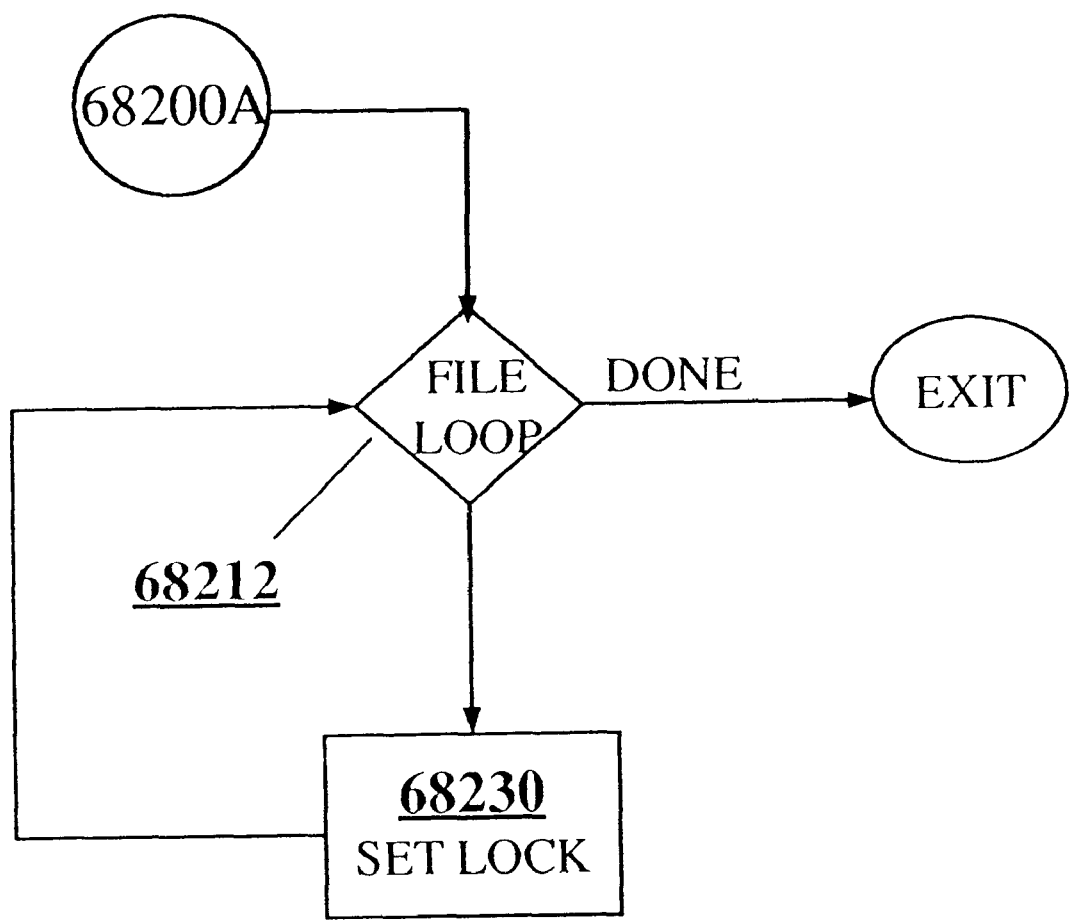

Upon completion of the current File Loop, the program establishes a new File Loop, in FIG. 41*c*, using the updated File List. For each file in the list, Step 68230 Sets the Lock. The program invokes the QRLOKSET routine described in FIG. 93 to update the lock tables in the Control Repository. Once Step 68230 has been repeated for all files in the loop, the program exits.

Returning to Step 68210, in FIG. 41*a*, if the type of lock is not an Out for Update, then control proceeds to Step 68232 which tests the lock to see if it's either a Move or Overlay lock. If the algorithm is invoked from the user screen in FIG. 40, then this decision will definitely test positive. However, since this algorithm can be initiated by other means, an invalid lock type could be passed. This would result in a false test, where Step 68226 is employed to display or return an Error Message and exit the program. It would also be obvious to one skilled in the art that Steps 68210 and 68232 can be implemented with a case or select structure.

Figure 41D:
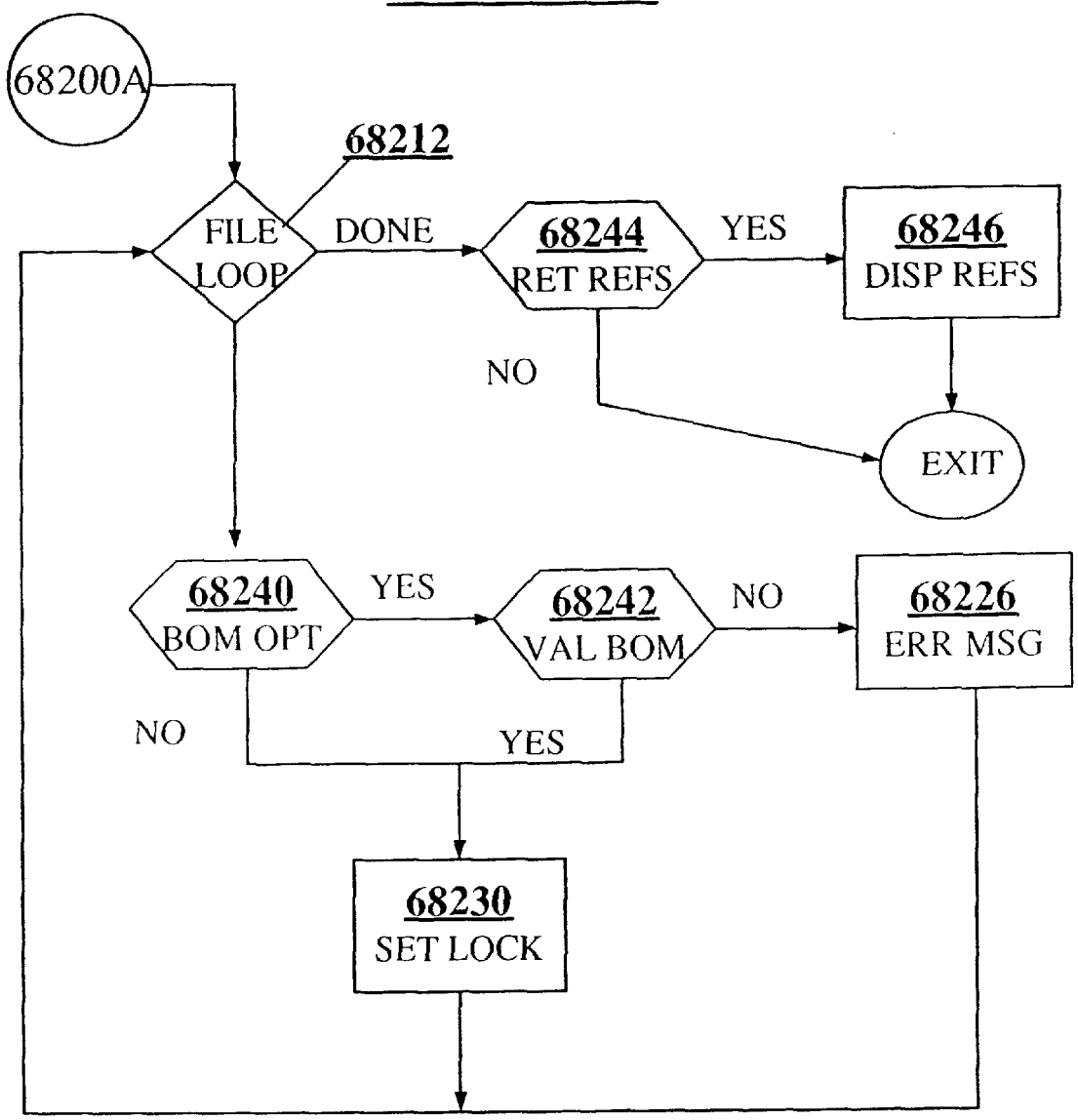

Assuming Step 68232 tests positive, control proceeds to FIG. 41*d* where Step 68212 is again employed to establish a File Loop. First, Step 68240 checks whether the BOM Option is selected. If so, then Step 68242 tests to ensure the current file is the anchor to a Valid BOM. This is done via the QRMDLCHK function provided by our Aggregation Manager. If not, then Step 68226 is employed to display or return an Error Message. However, if the current file is not a BOM, or the BOM is valid, then Step 68230 Sets the Lock. This is done via the QRLOKSET routine which accepts parameters to indicate the type of lock and whether the lock should be set for a single file or an entire BOM. In the case of a BOM lock, the BOM Level Filter, indicated by field 68113, can be used to limit the locking to only components residing at that Level.

Once all files in the loop have been processed, control proceeds to 68244 where the Lock Reference and BOM Reference options are checked. If either is on, then the caller is requesting the appropriate reference number to be returned. This results in Step 68246 Displaying or Returning the Requested Reference number. The BOM Reference number is returned by the QRMDLCHK function exercised in Step 68242, and the Lock Reference is returned by the QRLOKSET function invoked in Step 68230. At this point, the program exits.

Our embodiment also provides a utility to view and reset existing Out for Update, Move and Overlay locks in the Data Management System. In a similar fashion to the lock setting utility, this one can also be invoked through an interactive user interface, directly from the command line, or through the use of a third party tool.

FIG. 42 describes the data entry screen for the user interface. Field 68301 is a three-way data entry field whose definition is controlled by radio buttons 68302. The three possibilities are:

By File in which field 68301, Lock ID represents the name of a single file or the Anchor file of a Bill of Materials. (BOM)

By User where field 68301 denotes a user id whose locks the current user wishes to view or reset. Any of the fields 68102 thru 68105 can optionally be used to limit the scope of the locks. A blank field results in all locks meeting that criteria being acquired.

By Lock Reference # where field 68301 denotes a Lock Reference Number. In this case, fields 68102 thru 68105 are "grayed out" and have no effect.

Fields 68102 thru 68105, with supporting drop down menu buttons 68107 thru 68110, are identical to those in the Lock Setting utility. Field 68311 is the Current Owner which only has meaning when the By File radio button, 68302, is active. In this case, it can be used to limit the scope of the locks acquired to only those owned by the entry in this field. Such a field is useful when one user wants to view or reset a lock that is known to be owned by some other specific user. All of these fields are optional with their absence denoting an implied "ALL".

The lower portion of the screen contains radio buttons 68312 which are used to select the type of lock. They are almost identical to those in the Lock Setting utility except a fourth button allows ALL three types of locks to be viewed or reset.

At the bottom of the screen exists push button 68112 which can be used to indicate that the user wishes to view or reset BOM Locks. In this case, if field 68301 is a file name, it must denote the Anchor of a valid BOM in the DMS. Additionally, when this option is selected, field 68113 is activated to permit the user to enter a BOM Level Filter. This field is identical to the one in the Lock Set utility. Drop down menu button 68110 also exists to display a selection list of valid Levels.

Figure 43A:
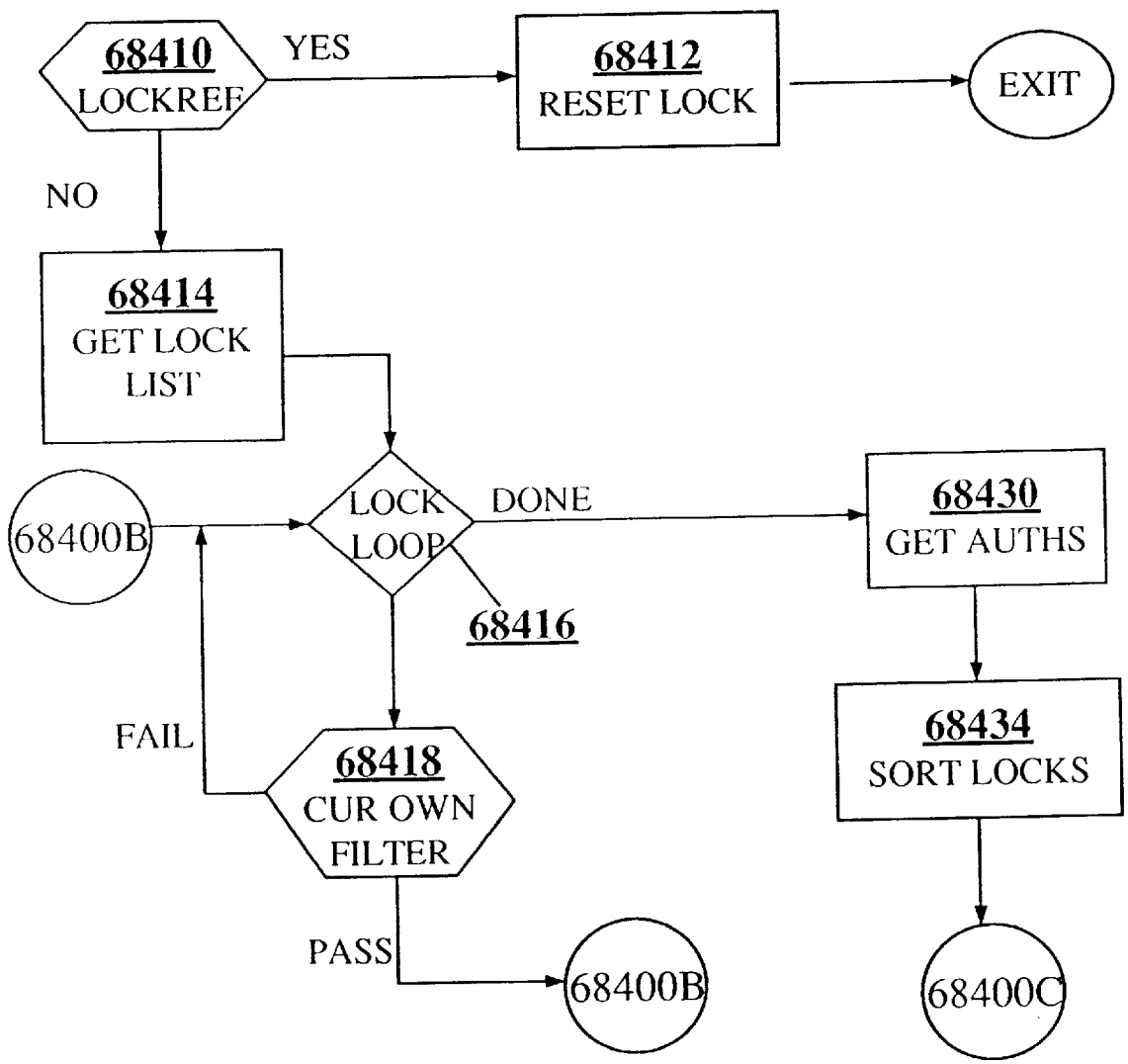
FIG. 43a thru 43c describes the Lock Resetting algorithm.

The algorithm for viewing and resetting locks is described in FIG. 43. As stated above, it is usually invoked through the user interface described by FIG. 42, but may also be initiated through a command line or third party tool. The program begins with Step 68410 in FIG. 43*a*. This step checks to see if the Lock Reference Number button is pushed in field 68302 of FIG. 42. If so, then field 68301 denotes Lock Reference number, and this is used in Step 68412 to Reset the Lock. The program then exits.

Otherwise, if one of the other buttons is pushed in field 68302, then control proceeds to Step 68414 which Gets the Lock List. The preferred embodiment uses the QRLOKLST routine which returns information from the Locks Table. This routine allows the user to extract various combinations of subset data from the table in a variety of output formats. Since this query is capable of a very broad or narrow scope, the PFVL information in fields 68102 through 68105 of FIG. 42 is combined with the type of lock, to control the scope of the query. Any blank field will result in all locks pertaining to that field being returned.

Since more than one lock may exist on a file, Step 68416 establishes a Lock Loop. Next, Step 68418 checks to see if the Current Owner field 68311 is empty. If not, the user id entered in that field is used to filter the results returned from 68414. If the current lock doesn't match the Current Owner Filter, control returns to the top of the Lock Loop.

Figure 43B:
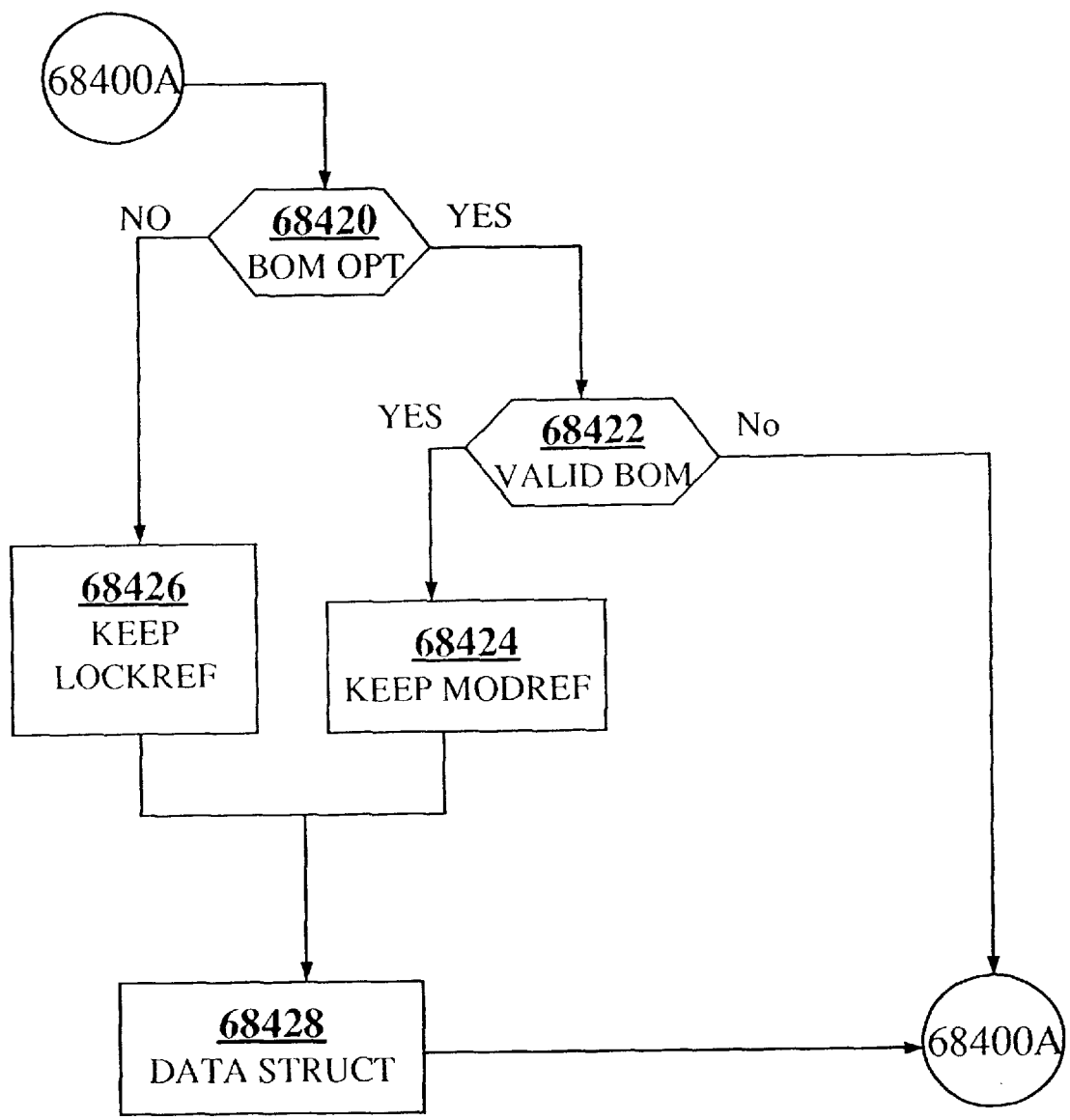

If the current lock passes the filter in Step 68418, control proceeds to Step 68420 in FIG. 43*b*. Here, the BOM option, which corresponds to the BOM Lock button in field 68112 of FIG. 42, is examined. If it's on, the user wants to work with BOMs as opposed to regular files, so control proceeds to Step 68422.

In Step 68422, the program interacts with our Aggregation Manager to test if the file controlled by the current lock is a Valid BOM. If not then control returns to the top of the Lock Loop in FIG. 43*a*. Assuming it is a Valid BOM, Step 68422 returns a Model Reference Number Step 68424 Keeps the Model Reference in the Reference column of a data structure which is subsequently used to reset the lock.

Returning to Step 68420, if the BOM Option is not set, then Step 68426 Keeps the Lock Reference number in the Reference column of the data structure. The Lock Reference is returned by the Control Repository in Step 68414.

As long as the current lock pertains to a regular file or a valid BOM, control eventually reaches Step 68428 which stores the remaining PFVL information returned by the Control Repository into the same data structure mentioned in Steps 68424 and 68426. Control then returns to the top of the Lock Loop and repeats Steps 68418 thru 68428 until all locks are exhausted.

Once the Lock Loop in FIG. 43*a* completes, Step 68430 Gets the User's Authorization. This consists of querying the Control Repository for all users for whom the current user is a Surrogate It also entails querying the Control Repository to see whether the user is an authorized Data Manager for any of the Libraries associated with any of the locks.

Next, Step 68434 is employed to Sort the Locks into those which can be reset by the current user and those which can't be reset. This is accomplished by looping through the data structure created in Step 68428 and examining the current owner of each lock. If the current user:

is the current owner
   is a surrogate of the current owner
   is an authorized Data Manager for the Library associated with the lock then the user may reset the Level. As each lock the user can only view the lock.

Figure 43C:
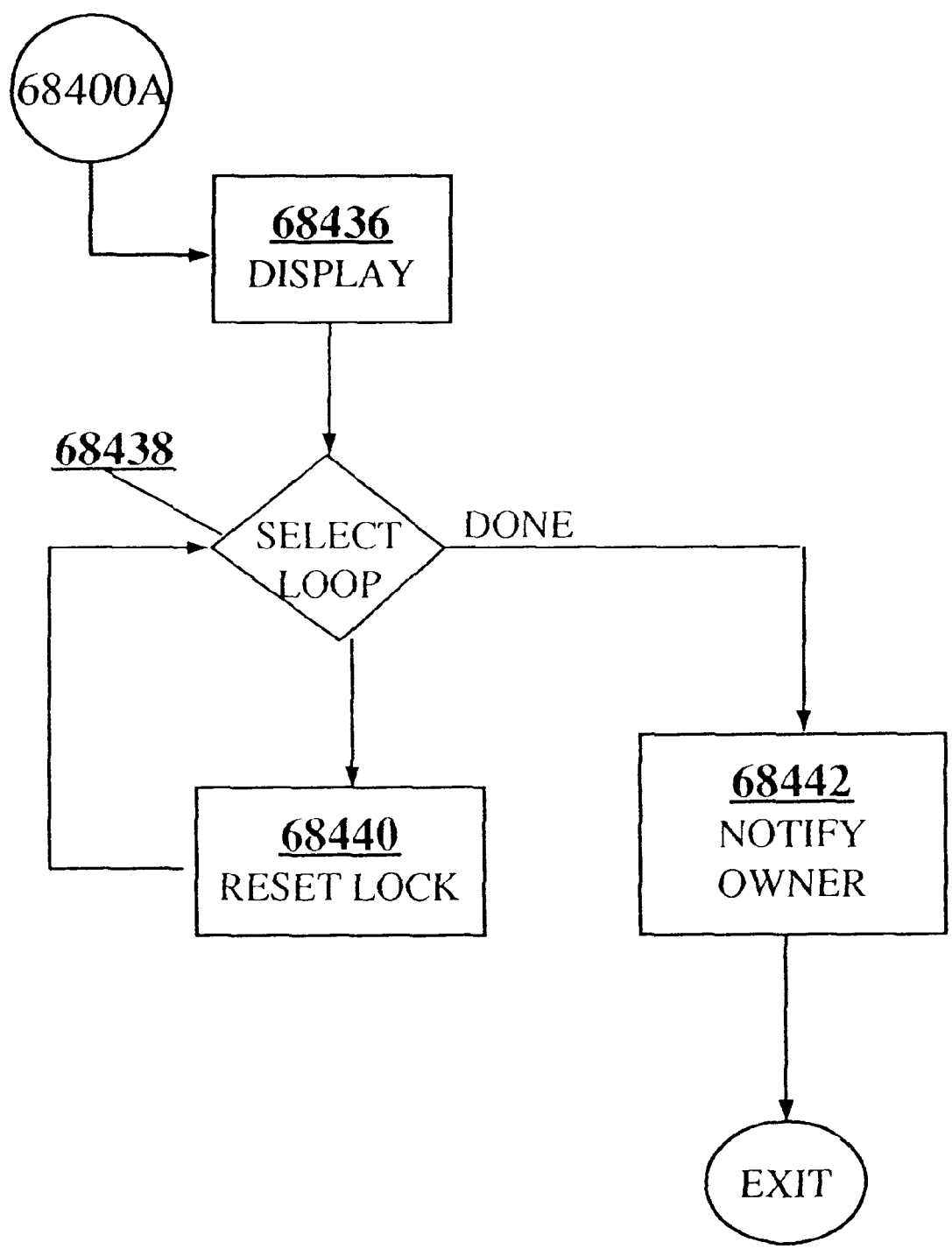
Figure 44A:
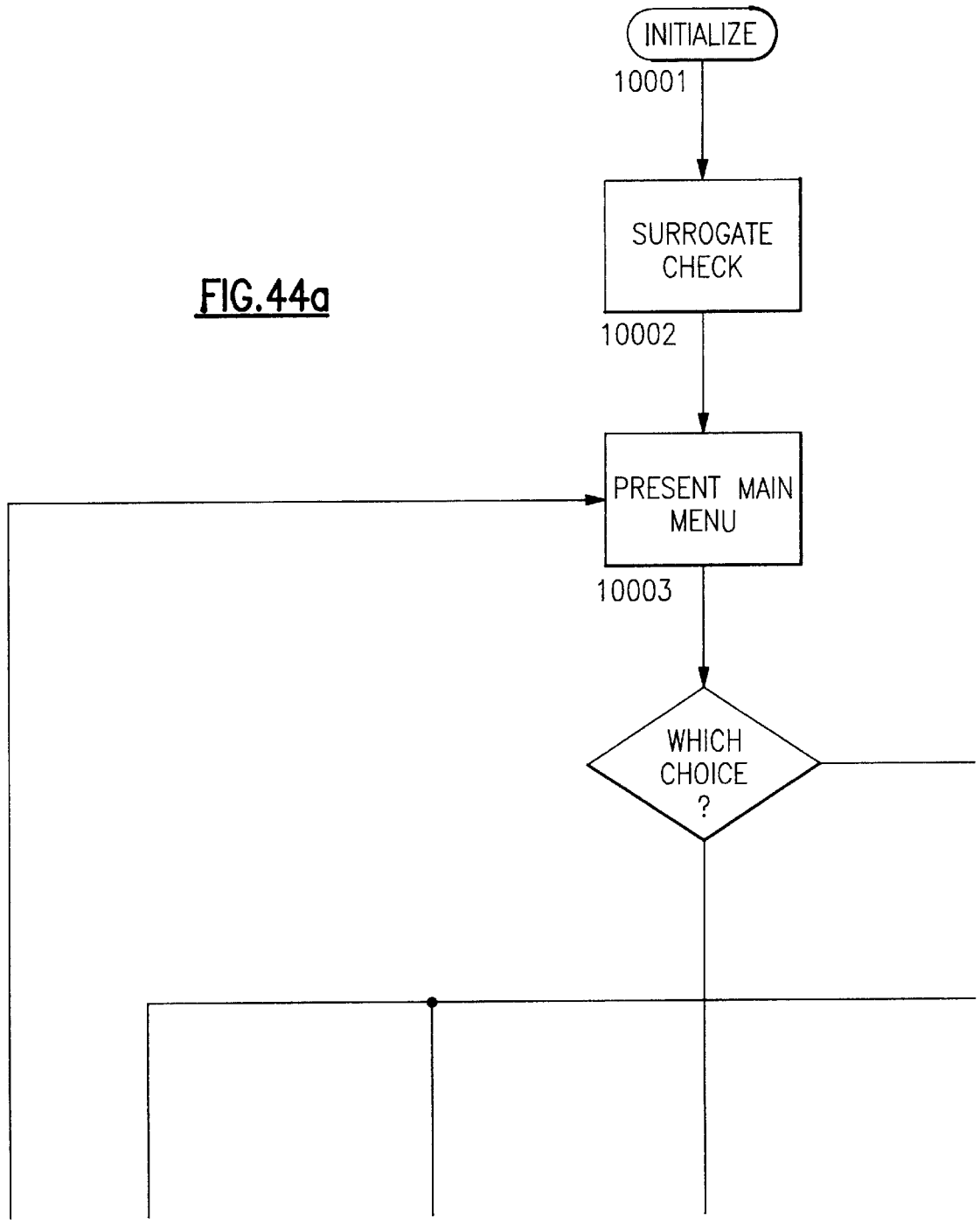
FIG. 44, which comprises FIGS. 44a thru 44d, describes the DLPACMAN Process.
Figure 44B:
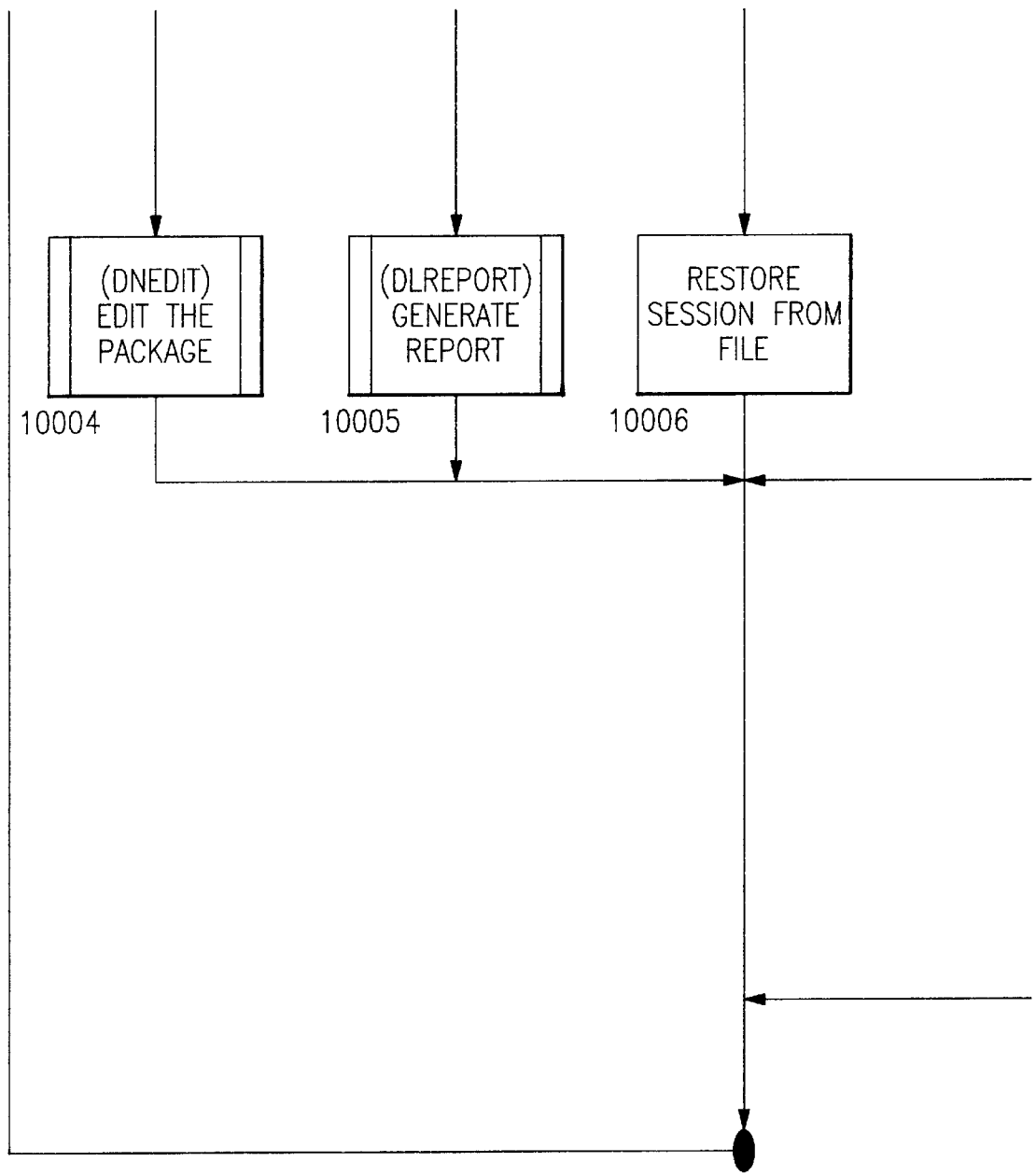
Figure 44C:
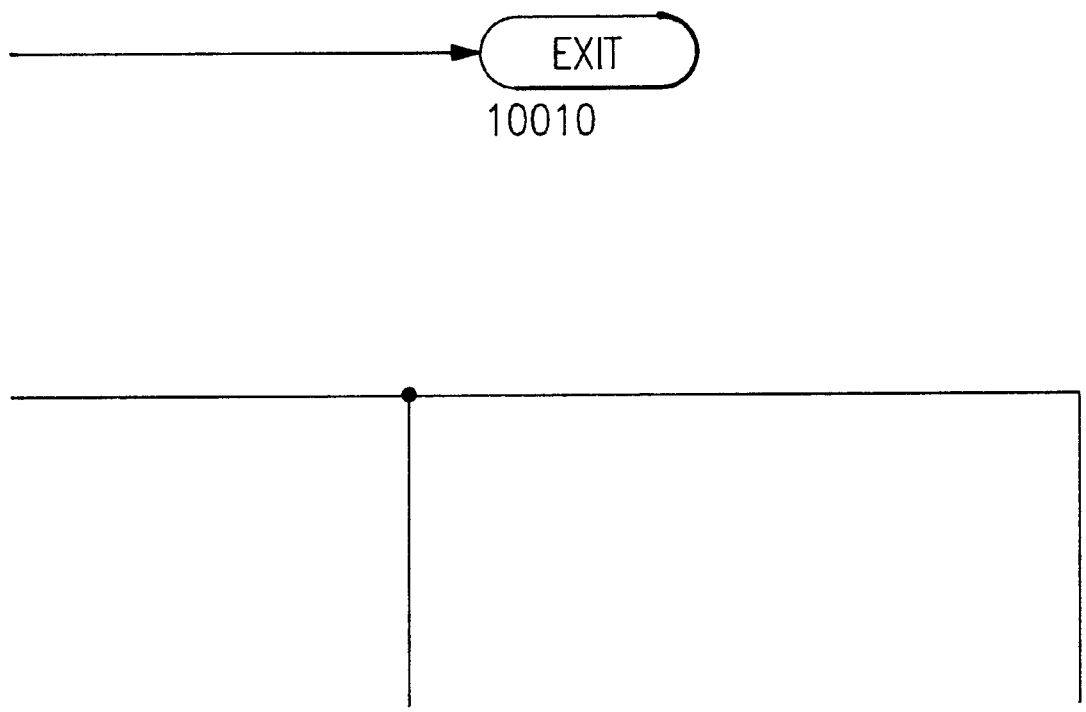
Figure 44D:
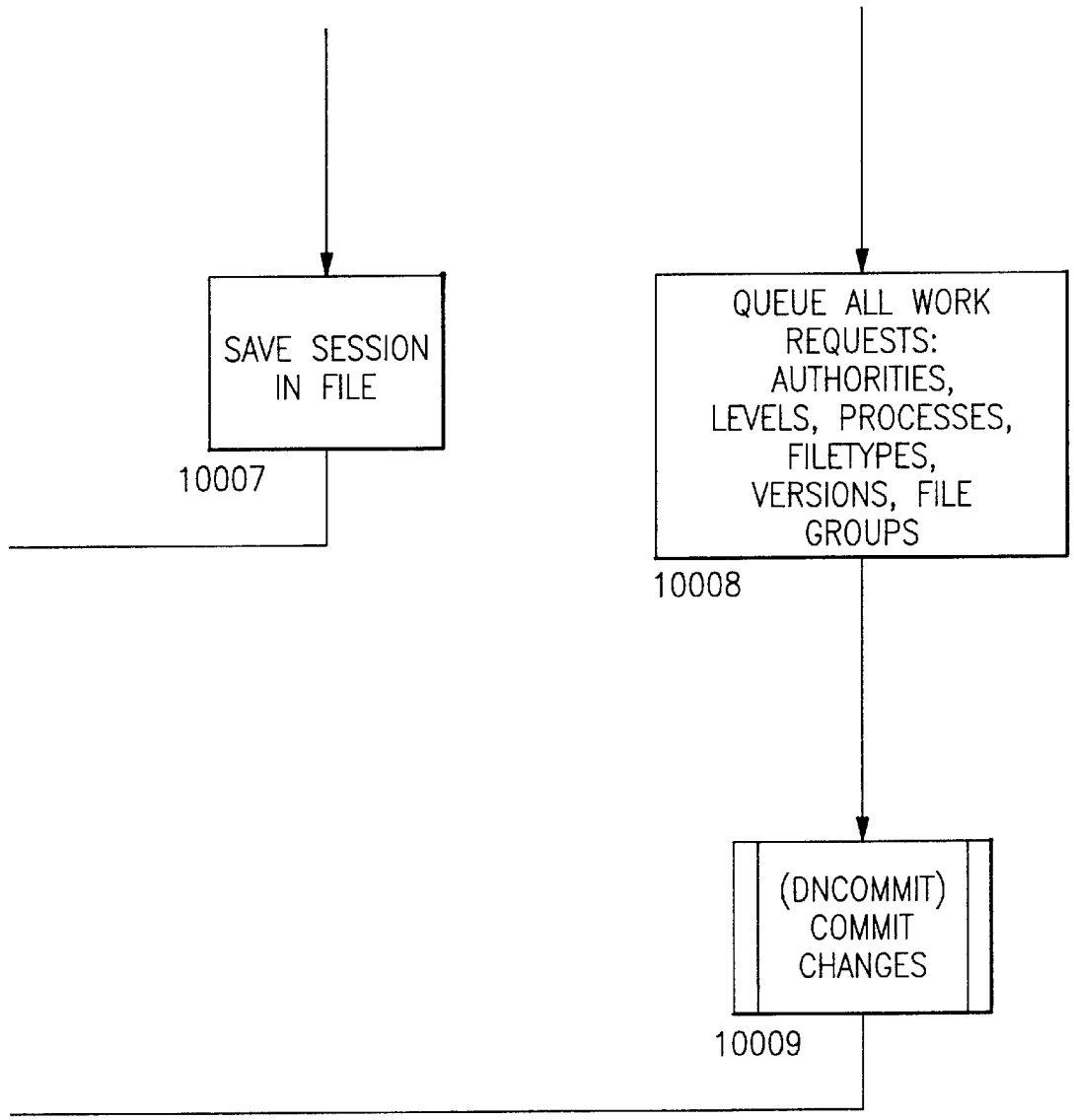
Figure 45A:
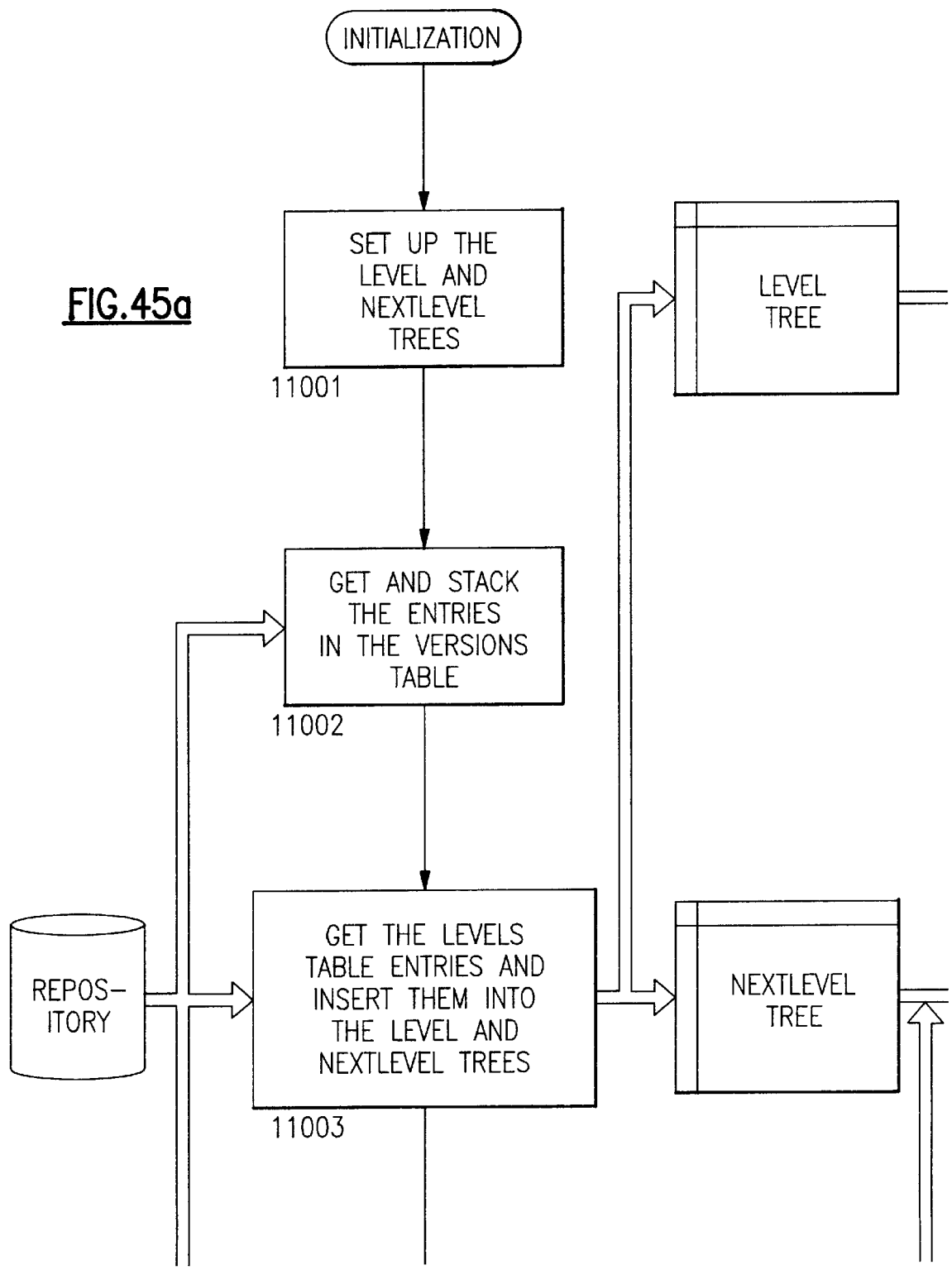
FIG. 45, which comprises FIGS. 45a thru 45d, describes the QRDFRLST Process.
Figure 45B:
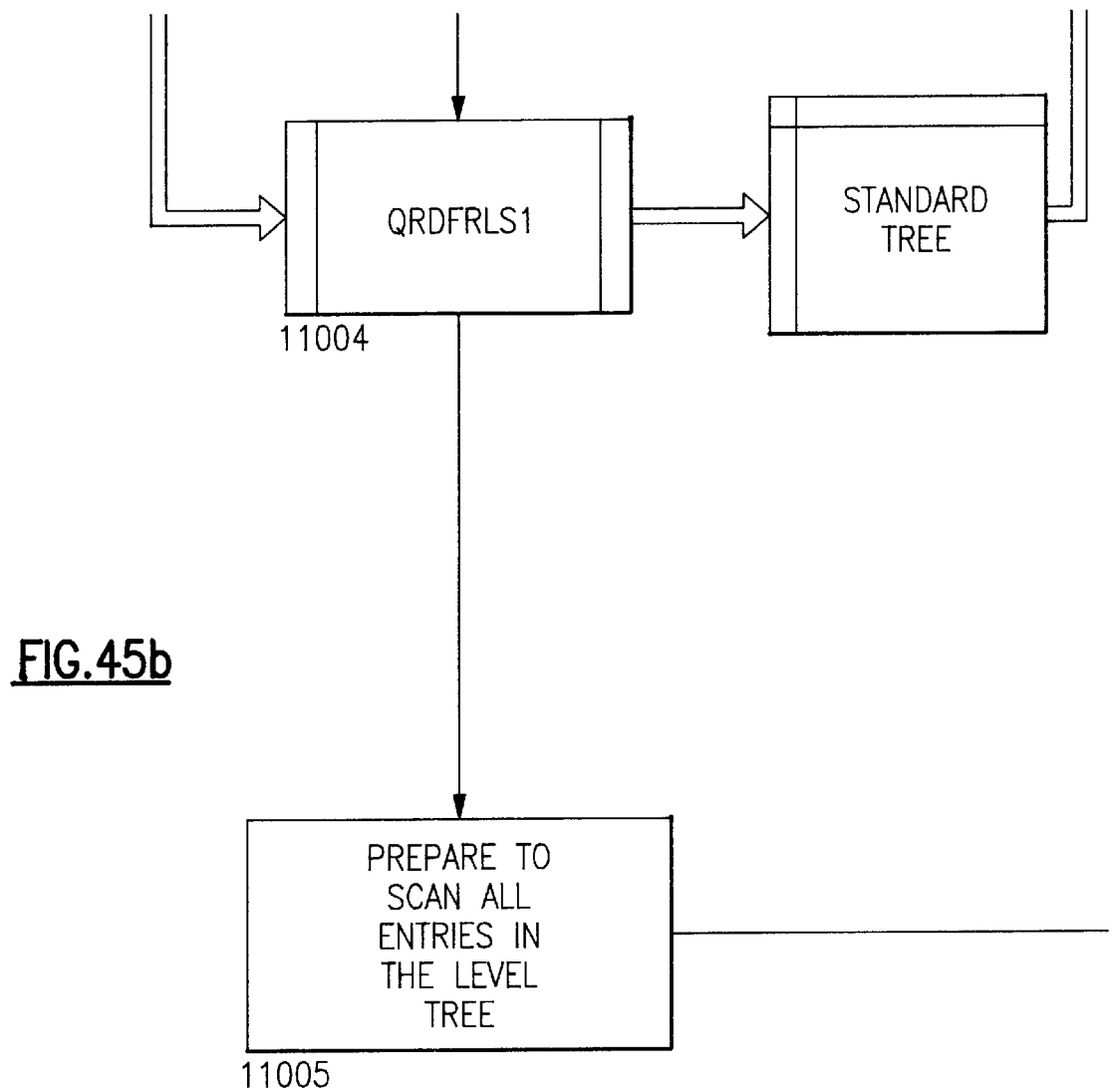
Figure 45C:
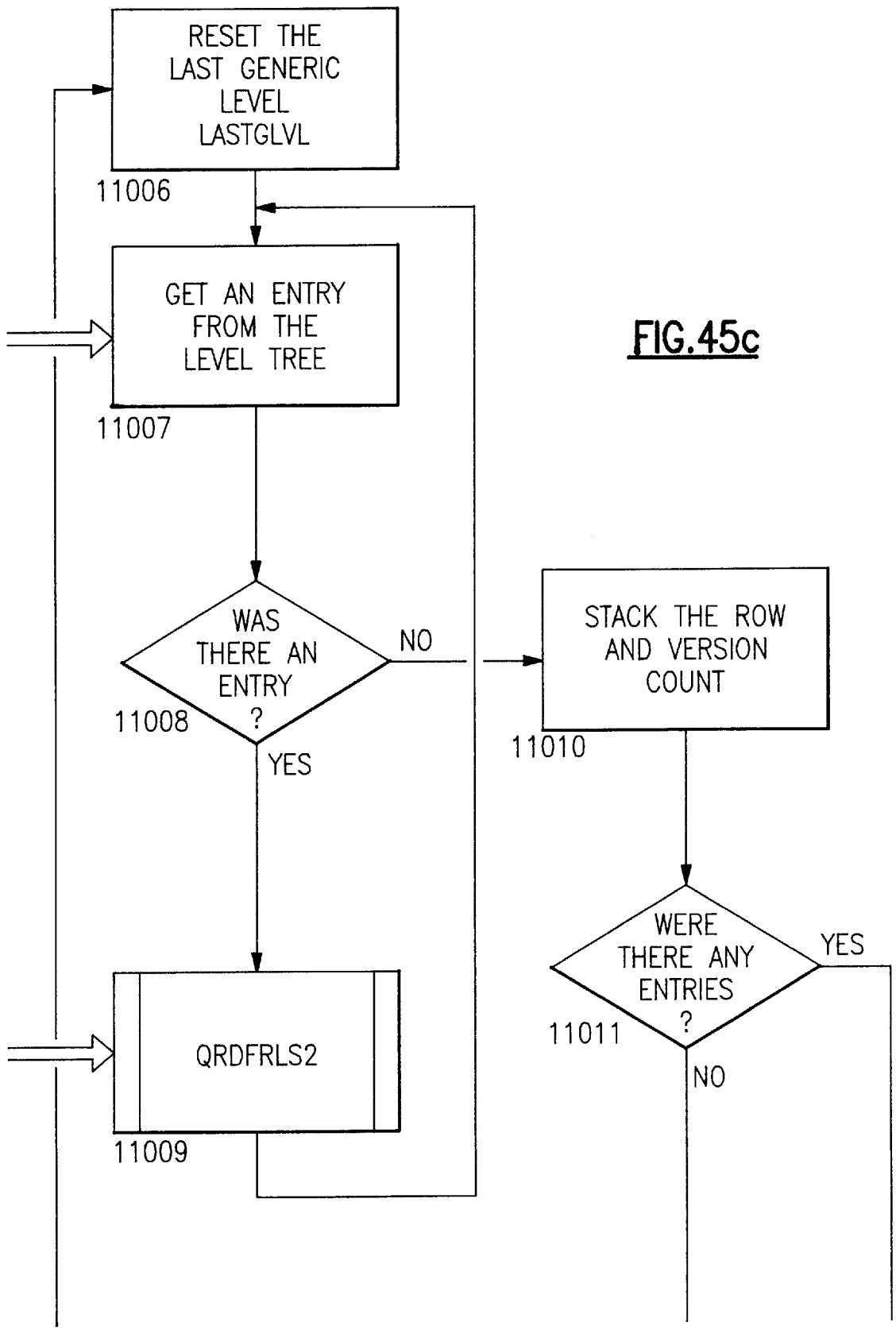
Figure 45D:
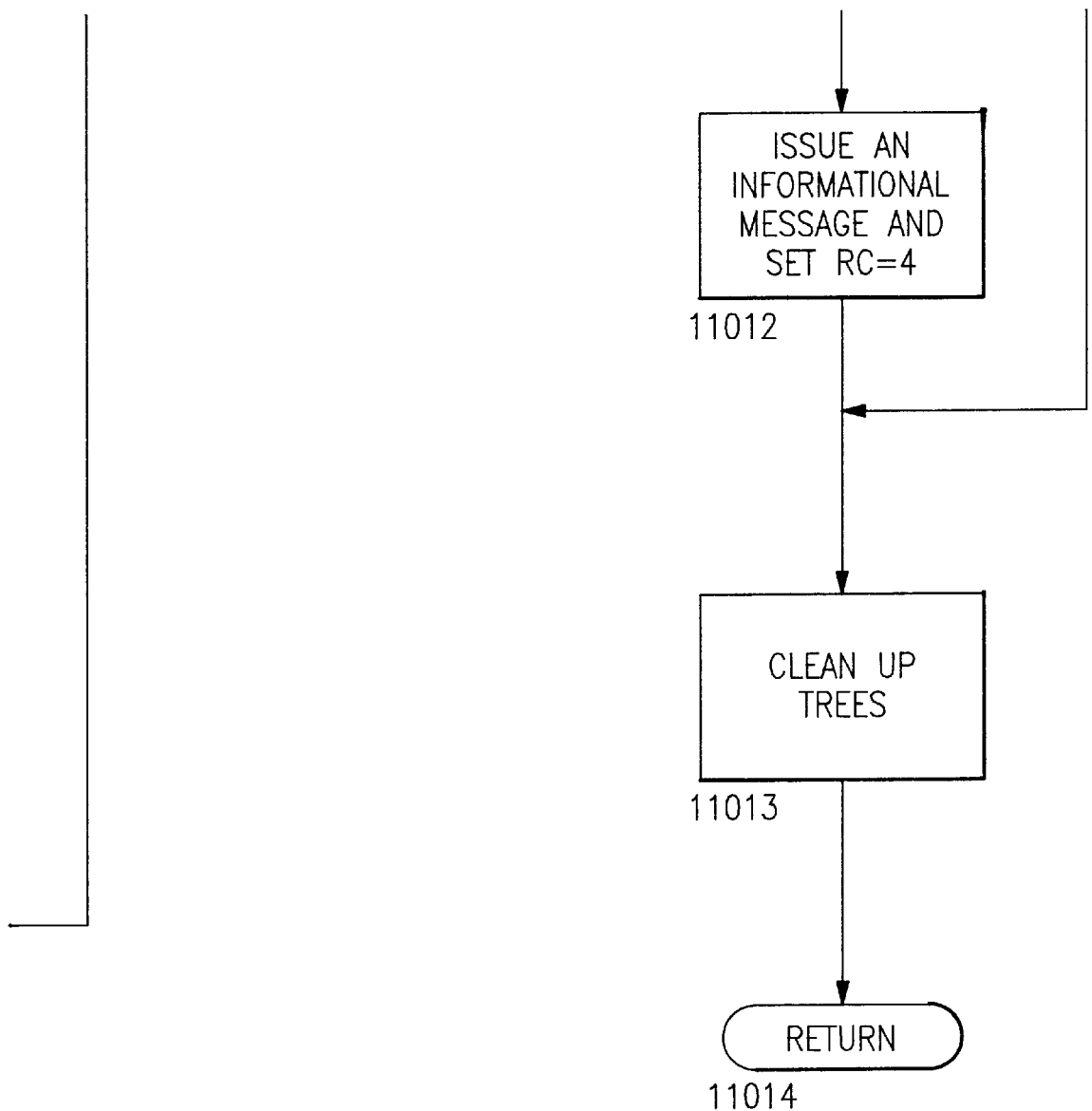
Figure 46A:
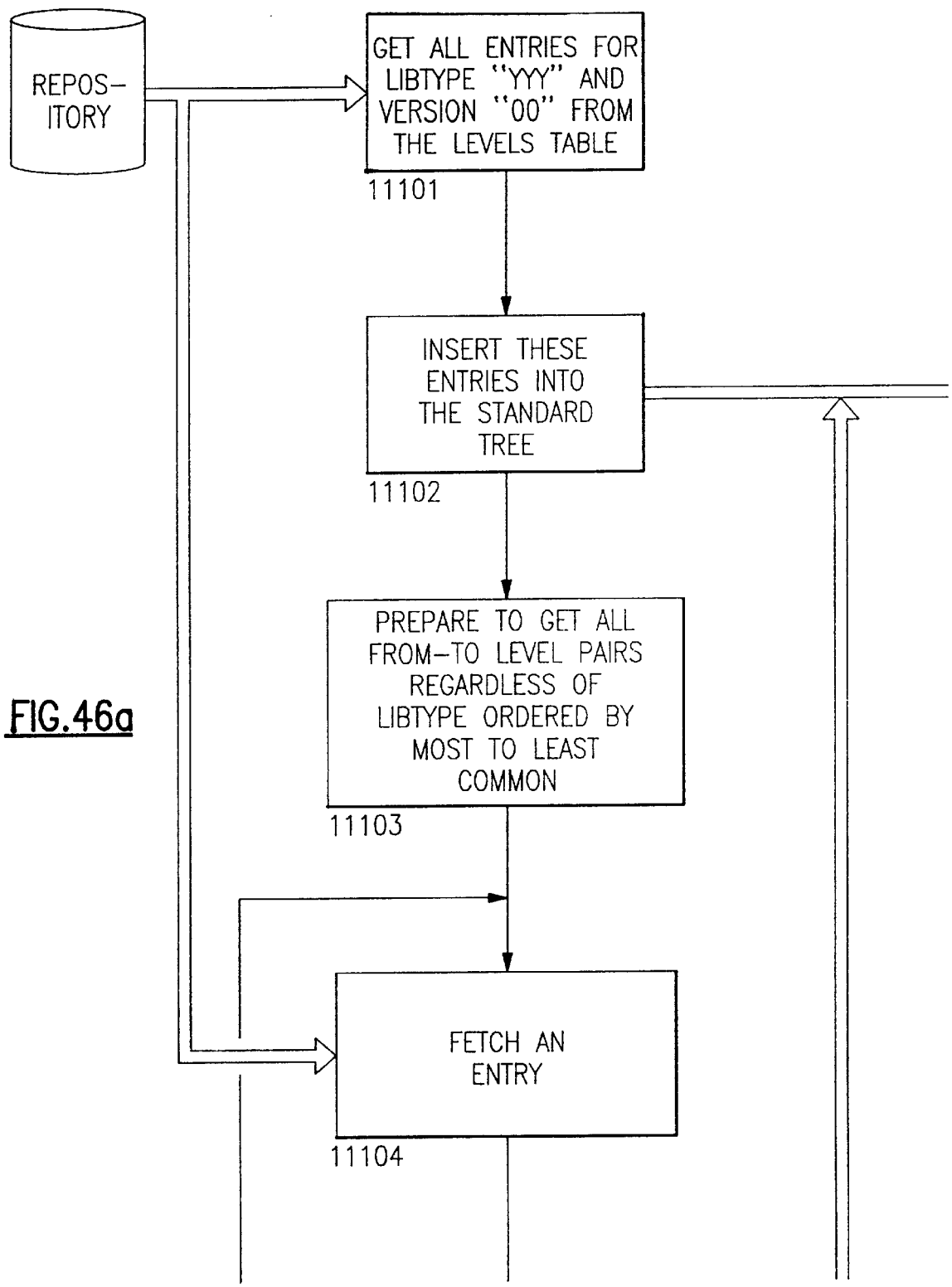
FIG. 46, which comprises FIGS. 46a thru 46d, describes the QRDFRLS1 Process.
Figure 46B:
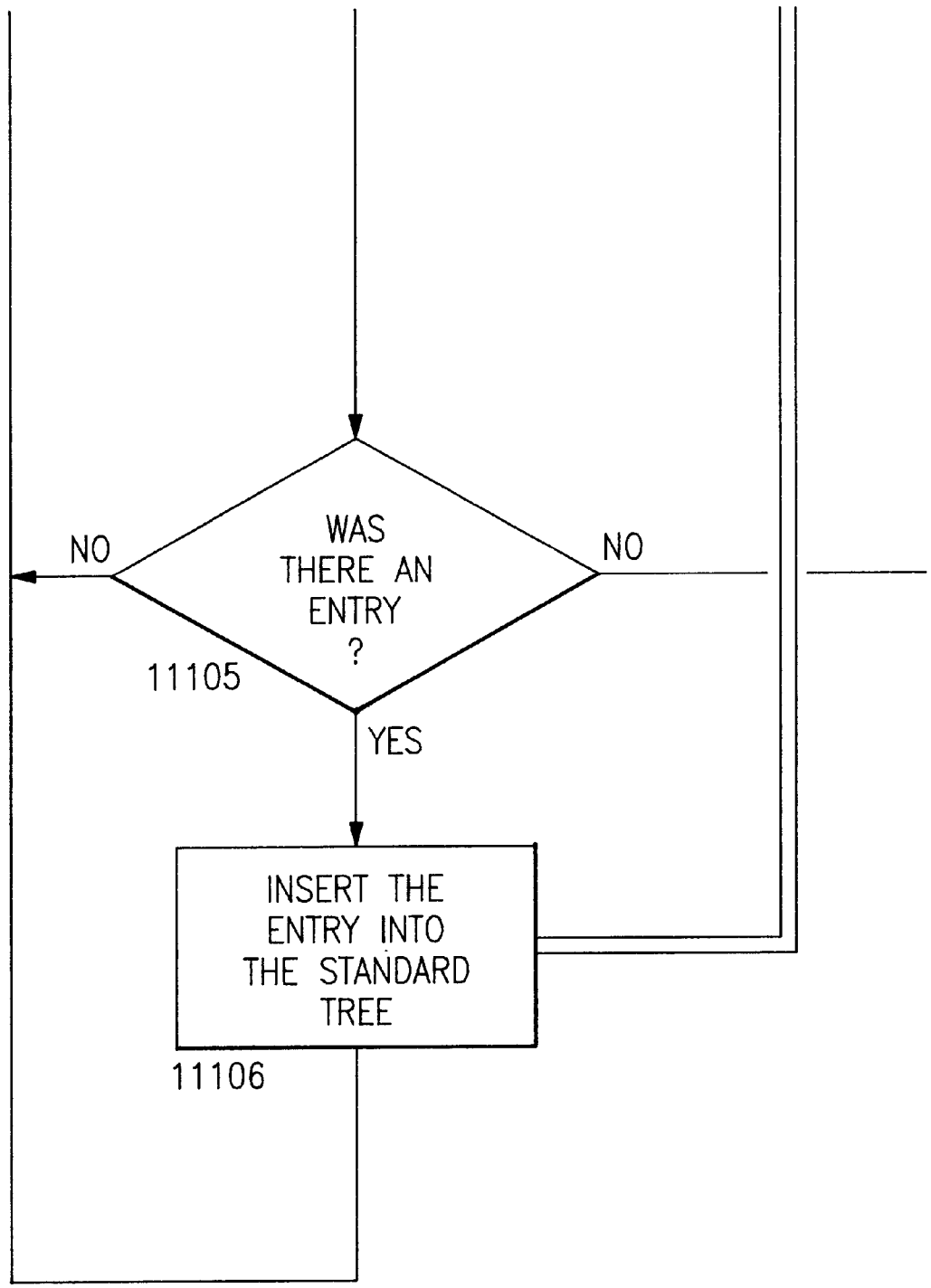
Figure 46C:
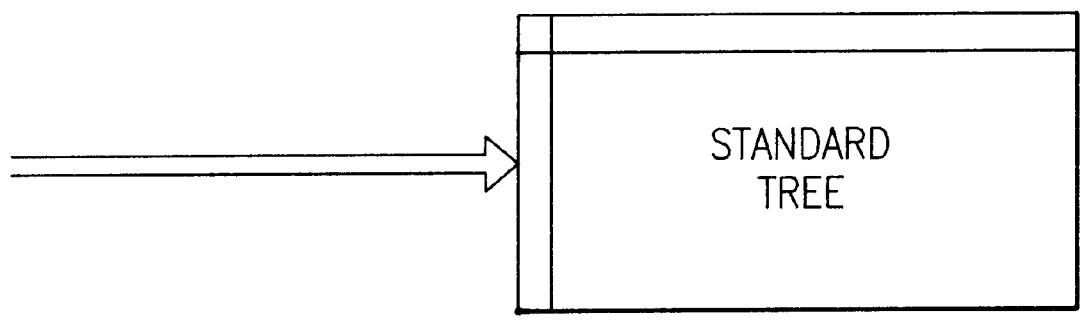
Figure 46D:
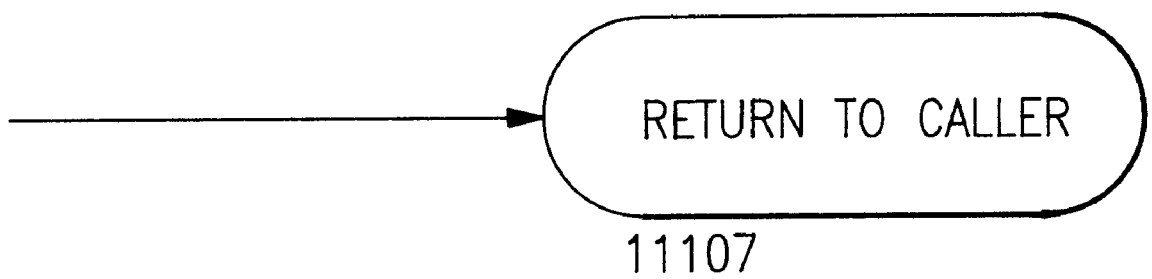
Figure 47A:
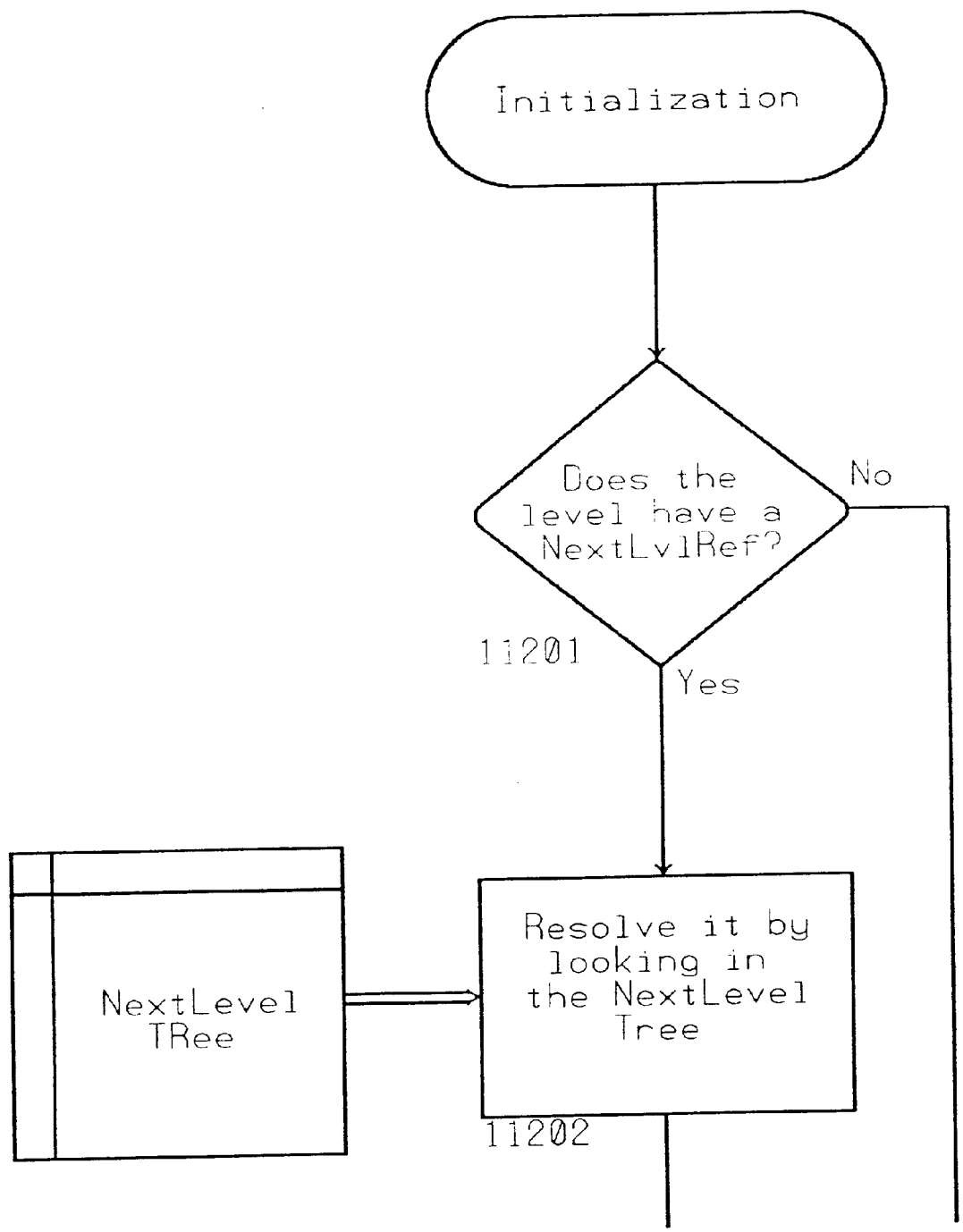
FIG. 47, which comprises FIGS. 47a thru 47i, describes the QRDFRLS2 Process.
Figure 47B:
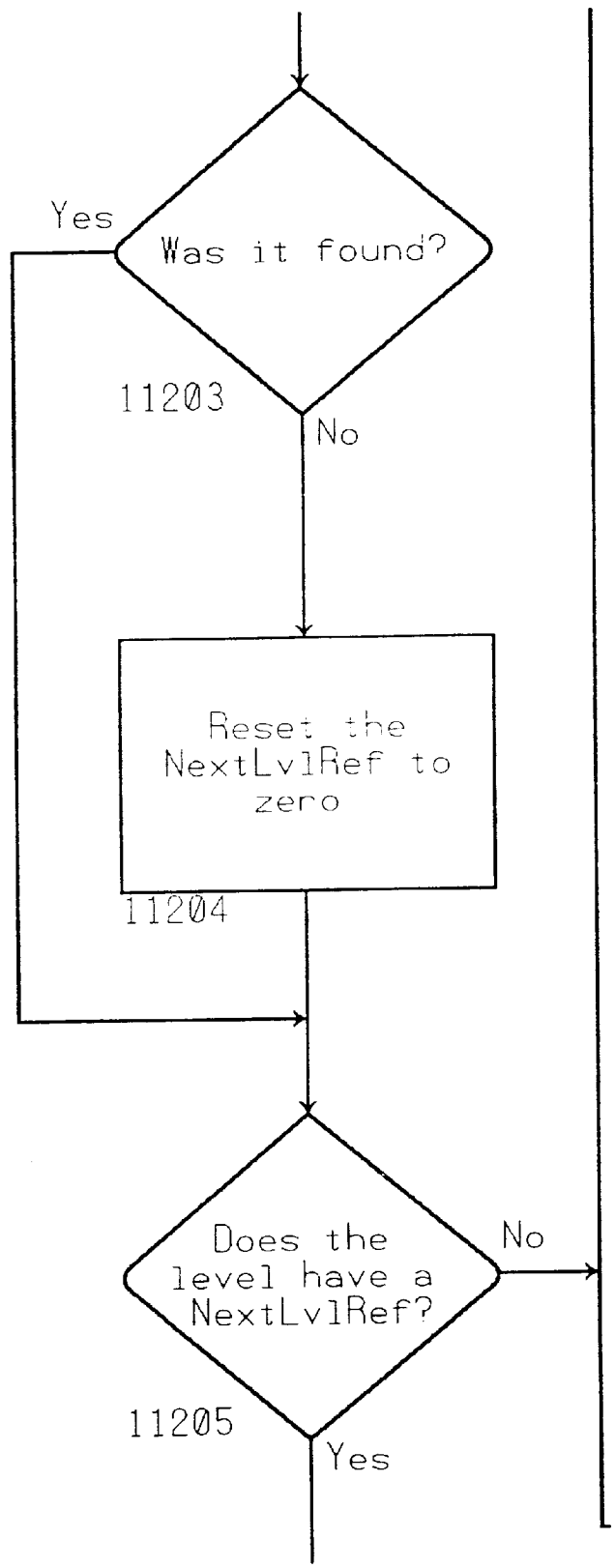
Figure 47C:
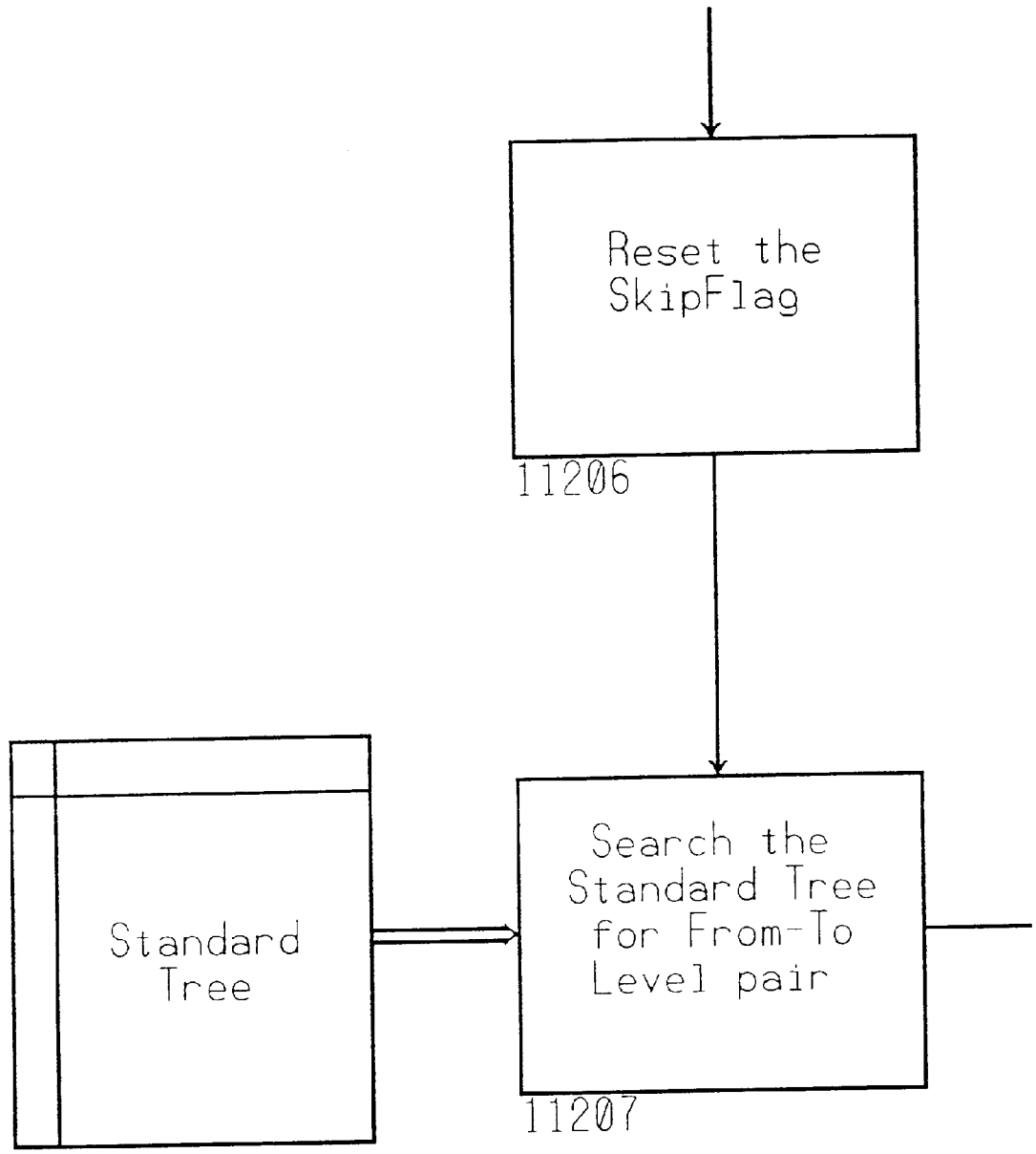
Figure 47D:
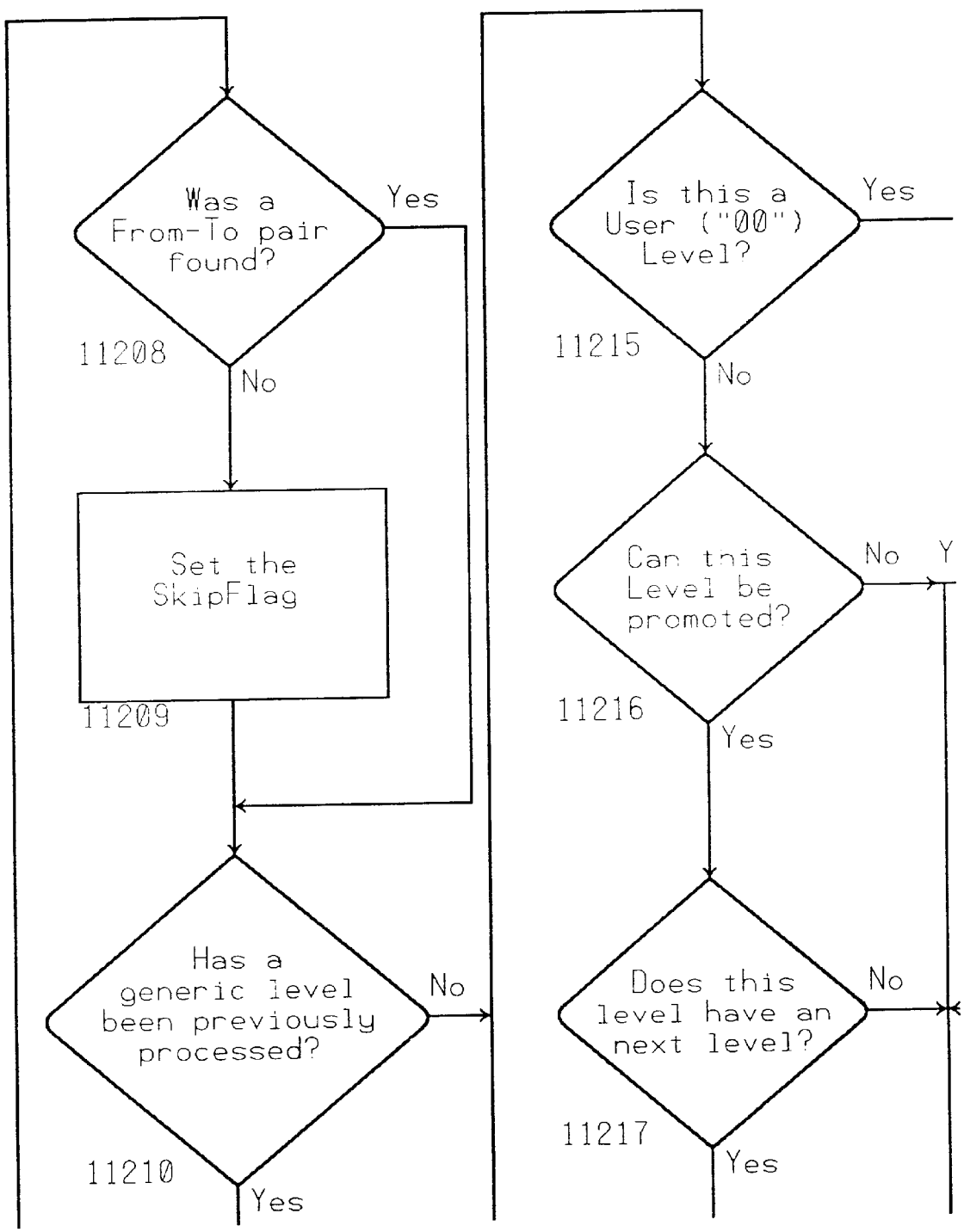
Figure 47E:
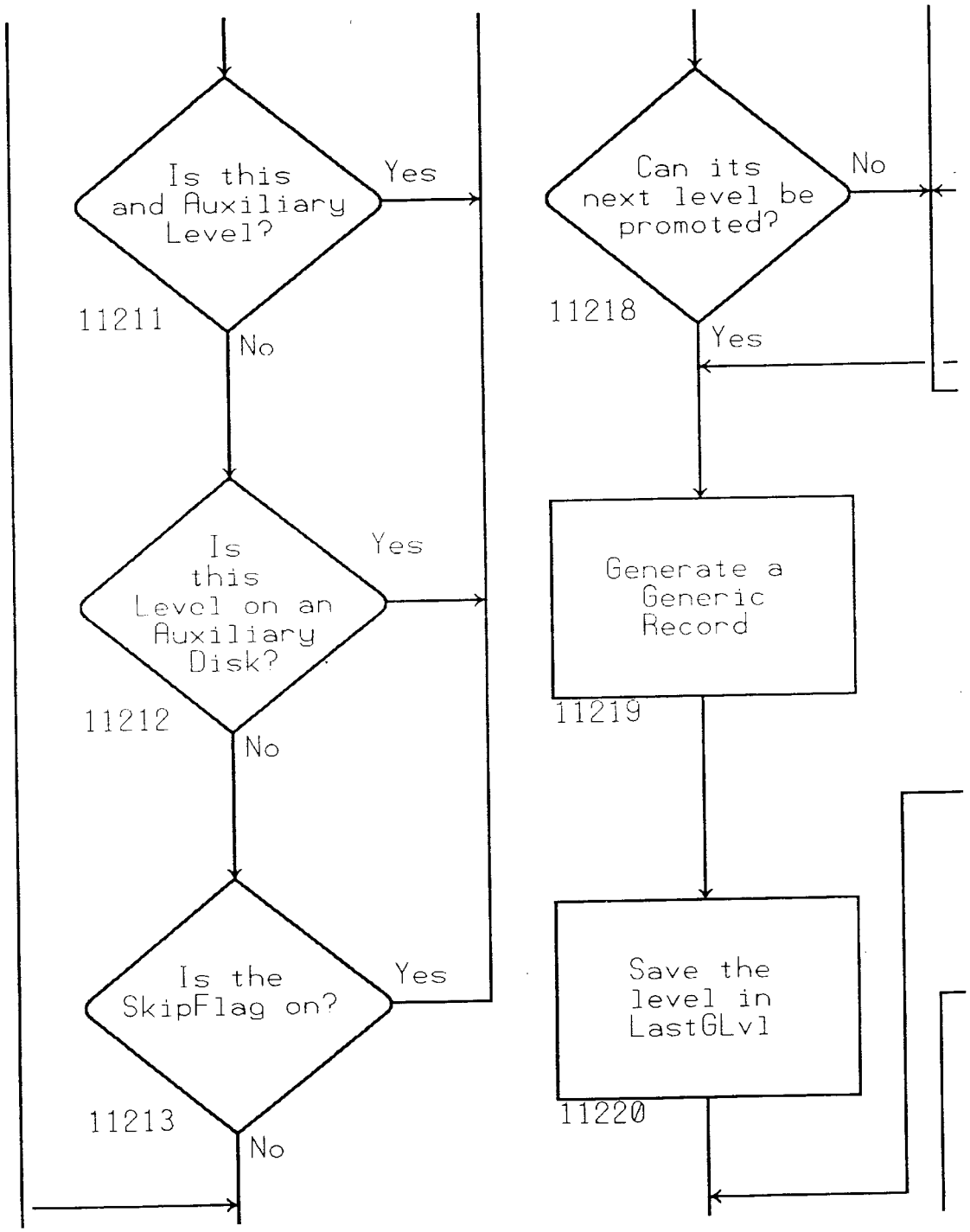
Figure 47F:
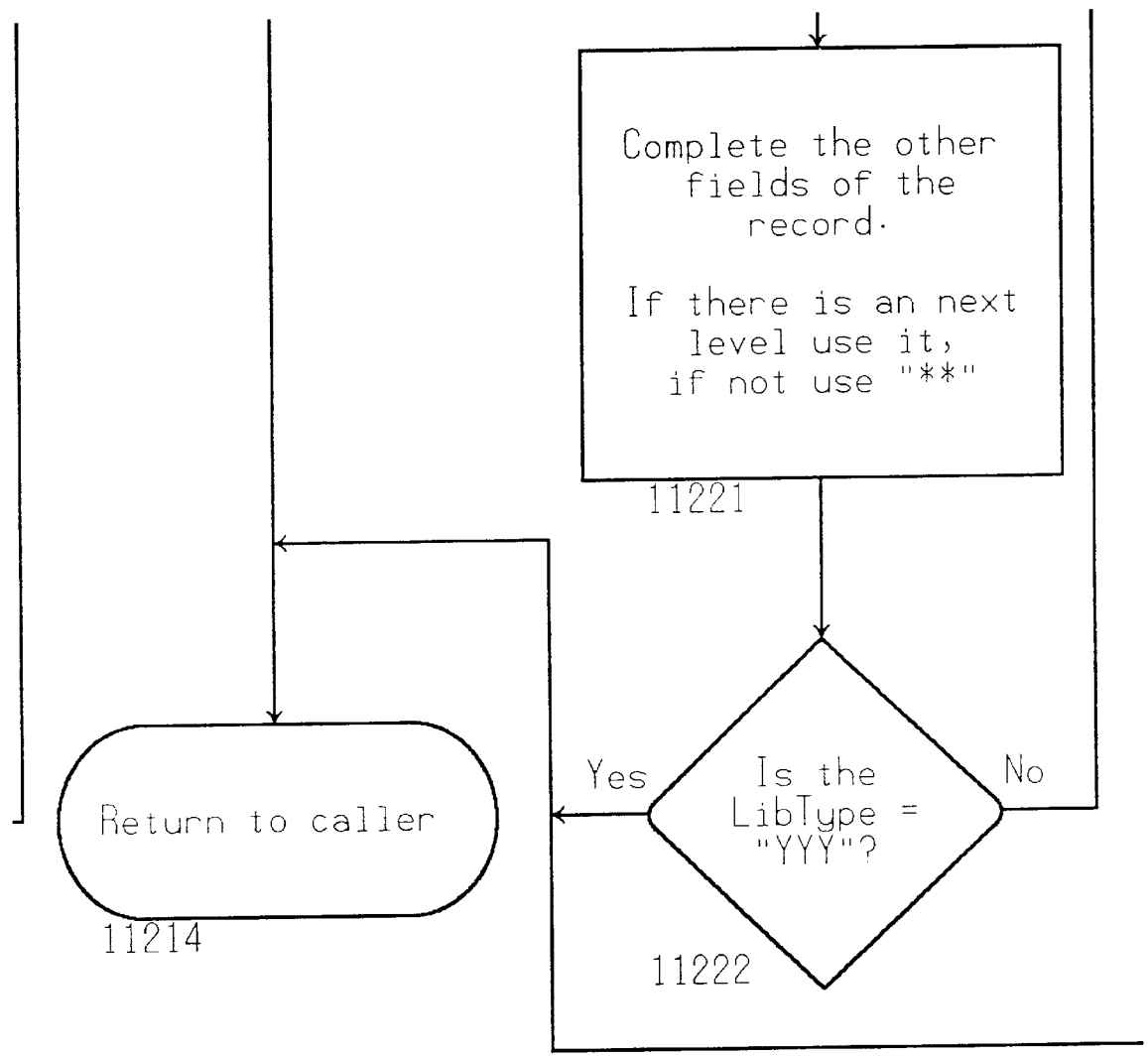
Figure 47G:
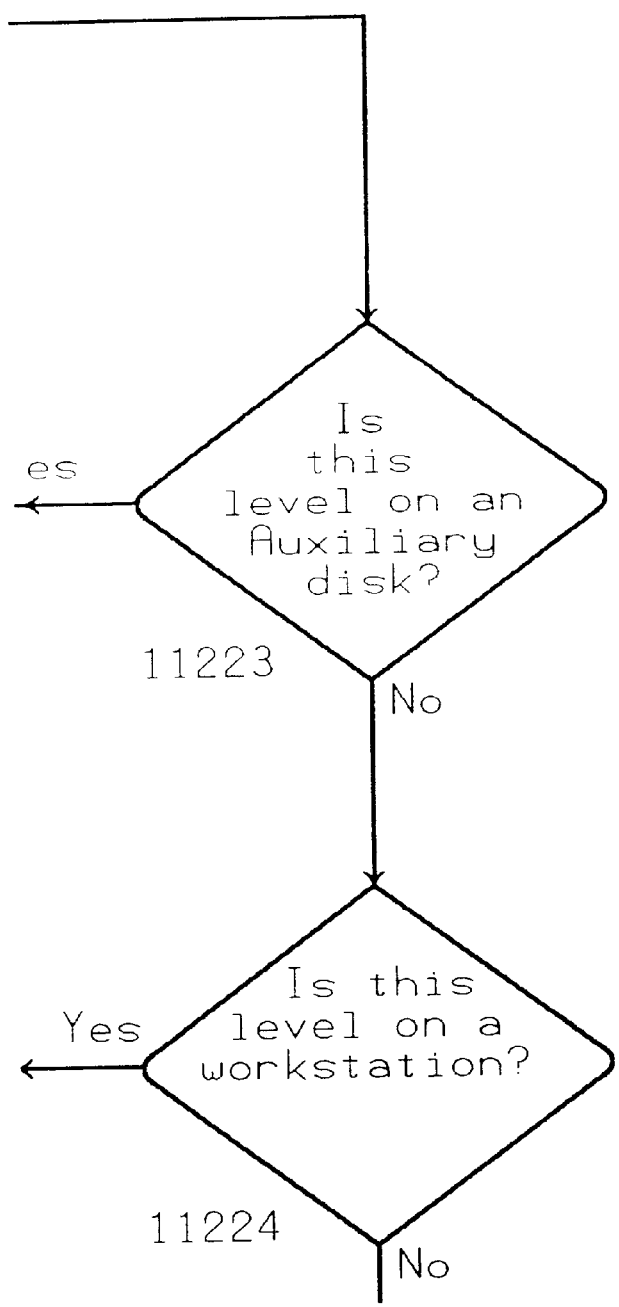
Figure 47I:
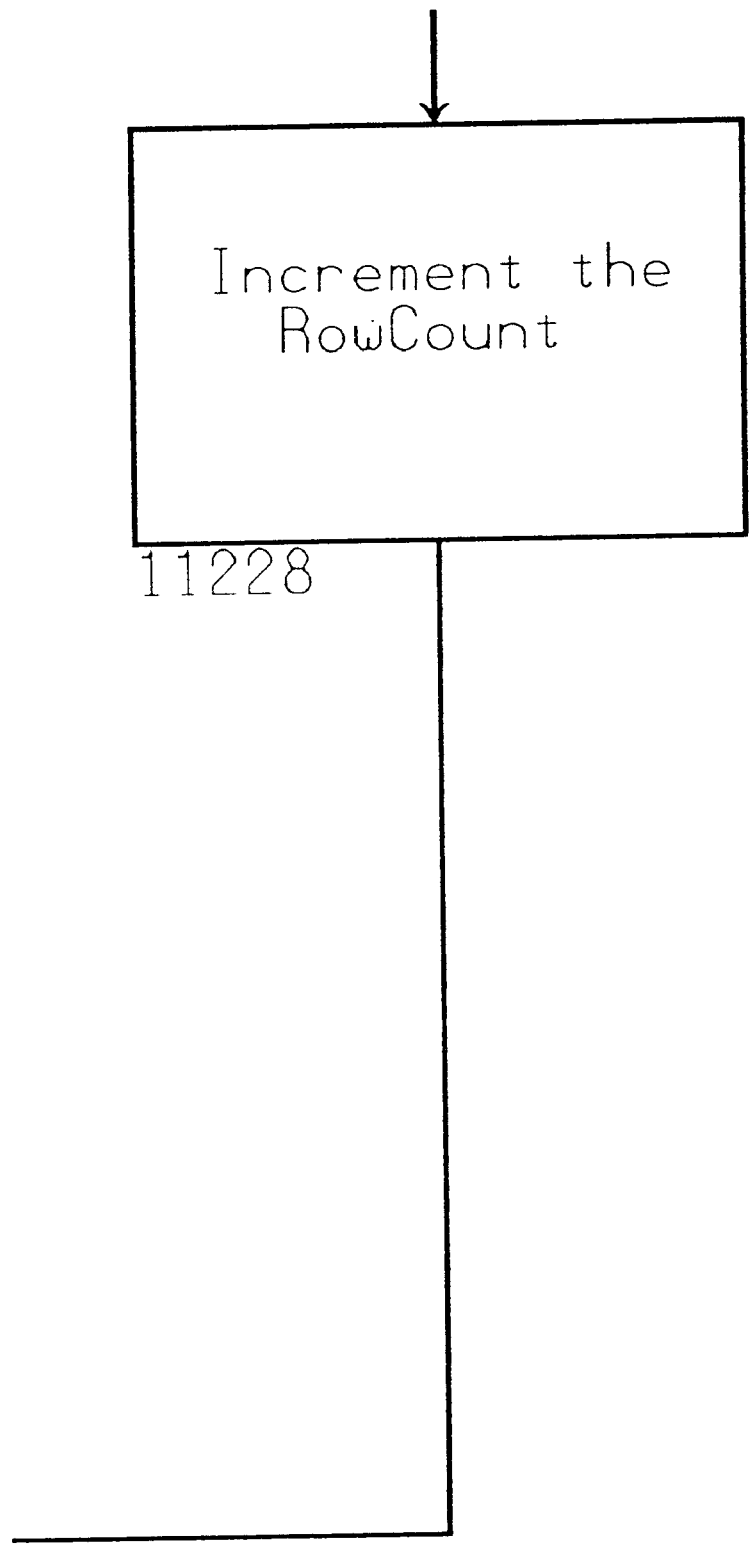
Figure 48A:
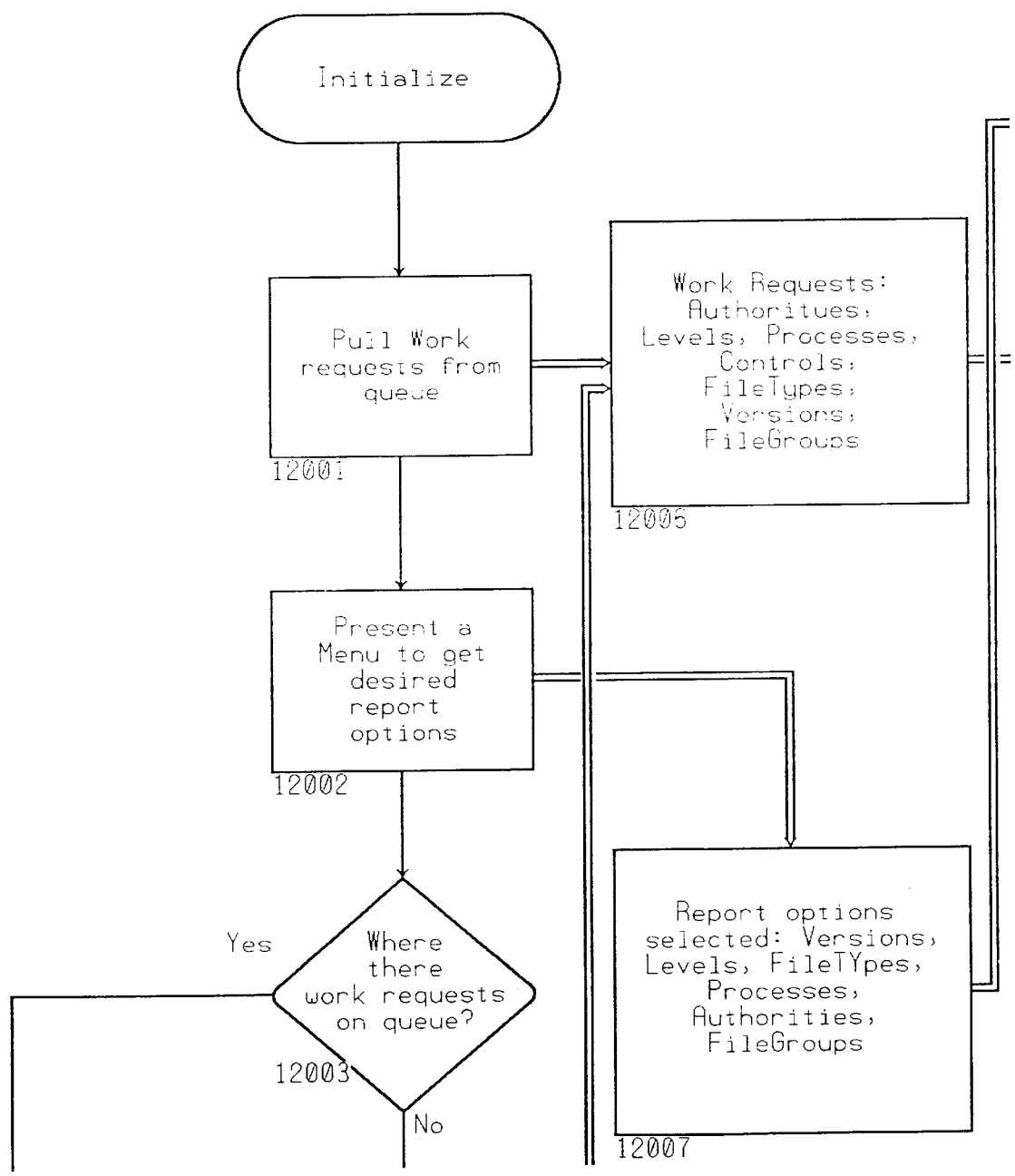
FIG. 48, which comprises FIGS. 48a thru 48d, describes the DLREPORT Process.
Figure 48B:
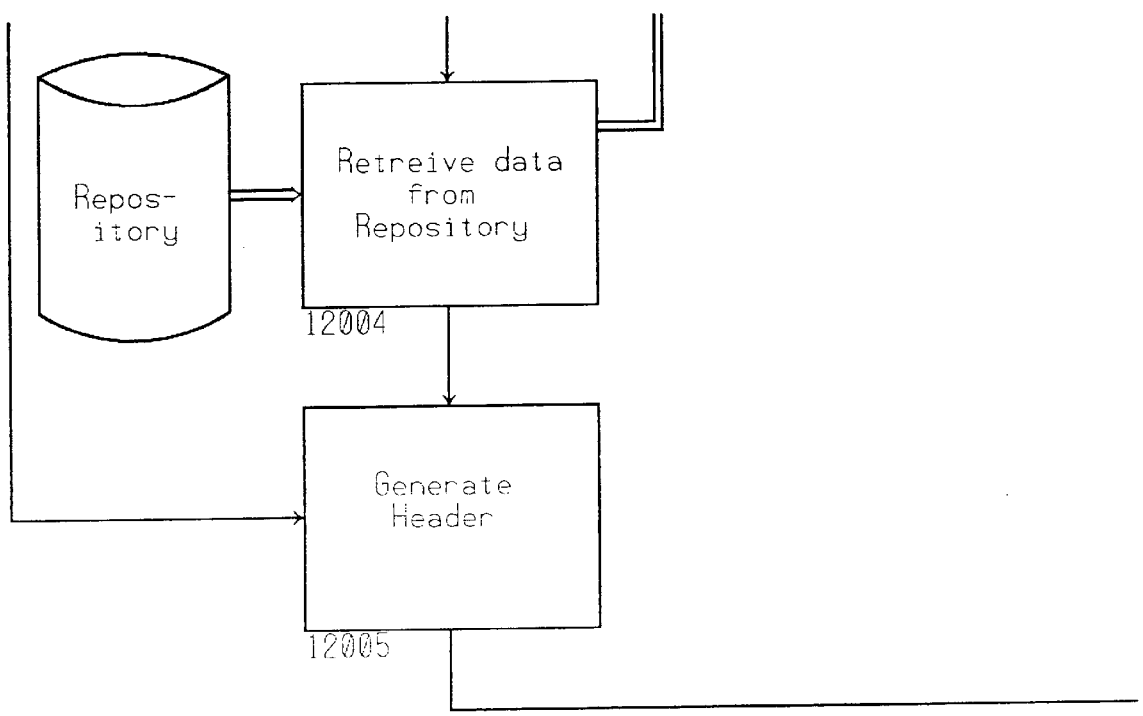
Figure 48C:
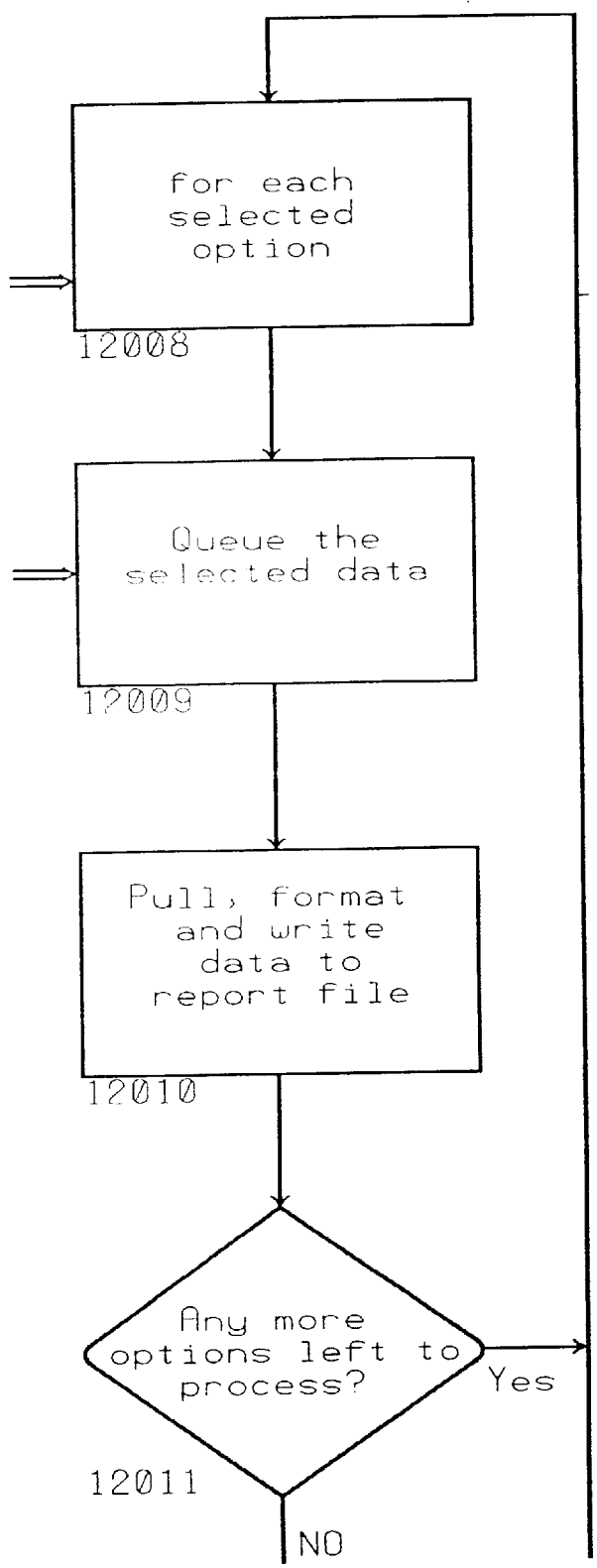
Figure 48D:
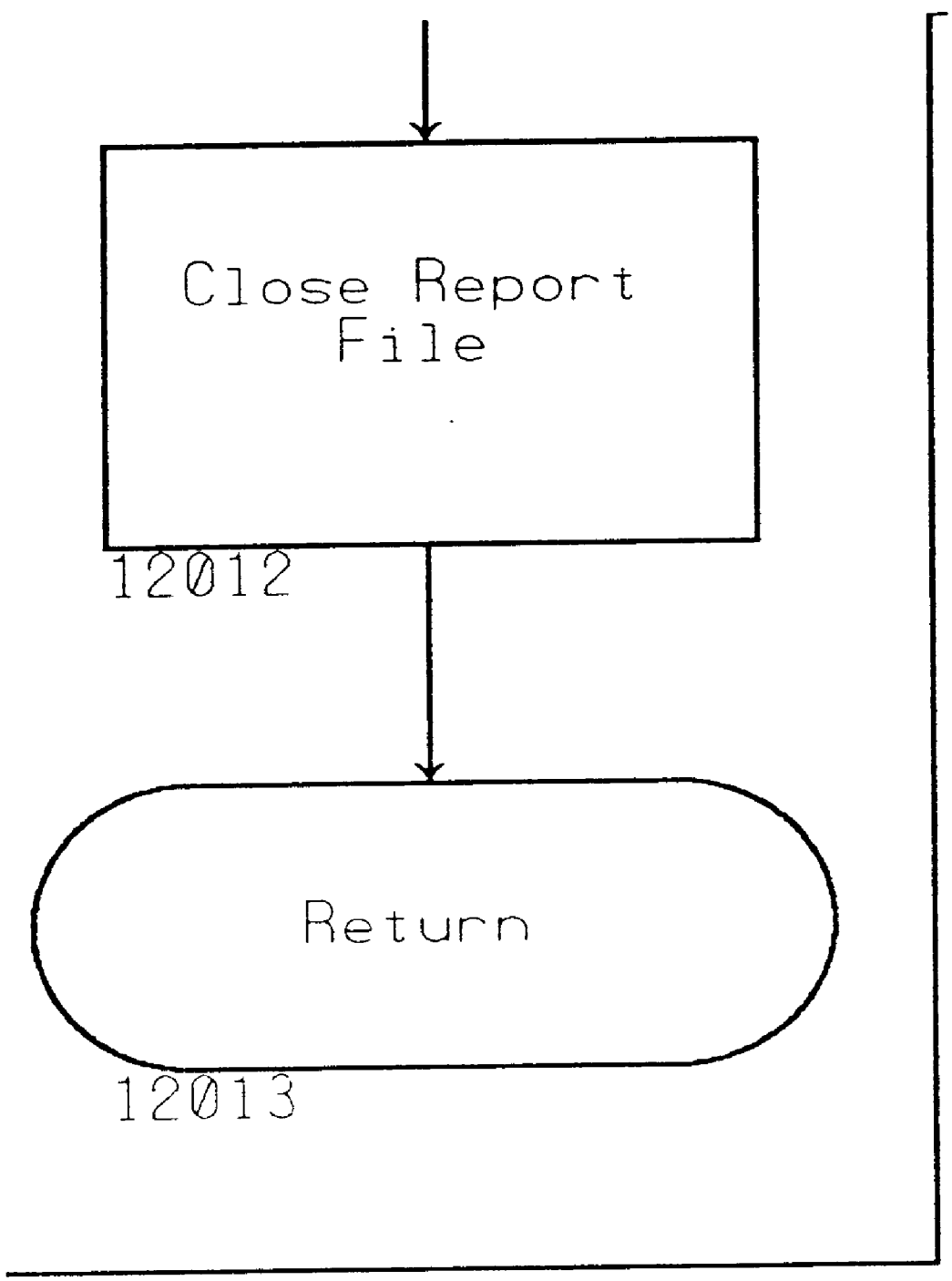
Figure 49A:
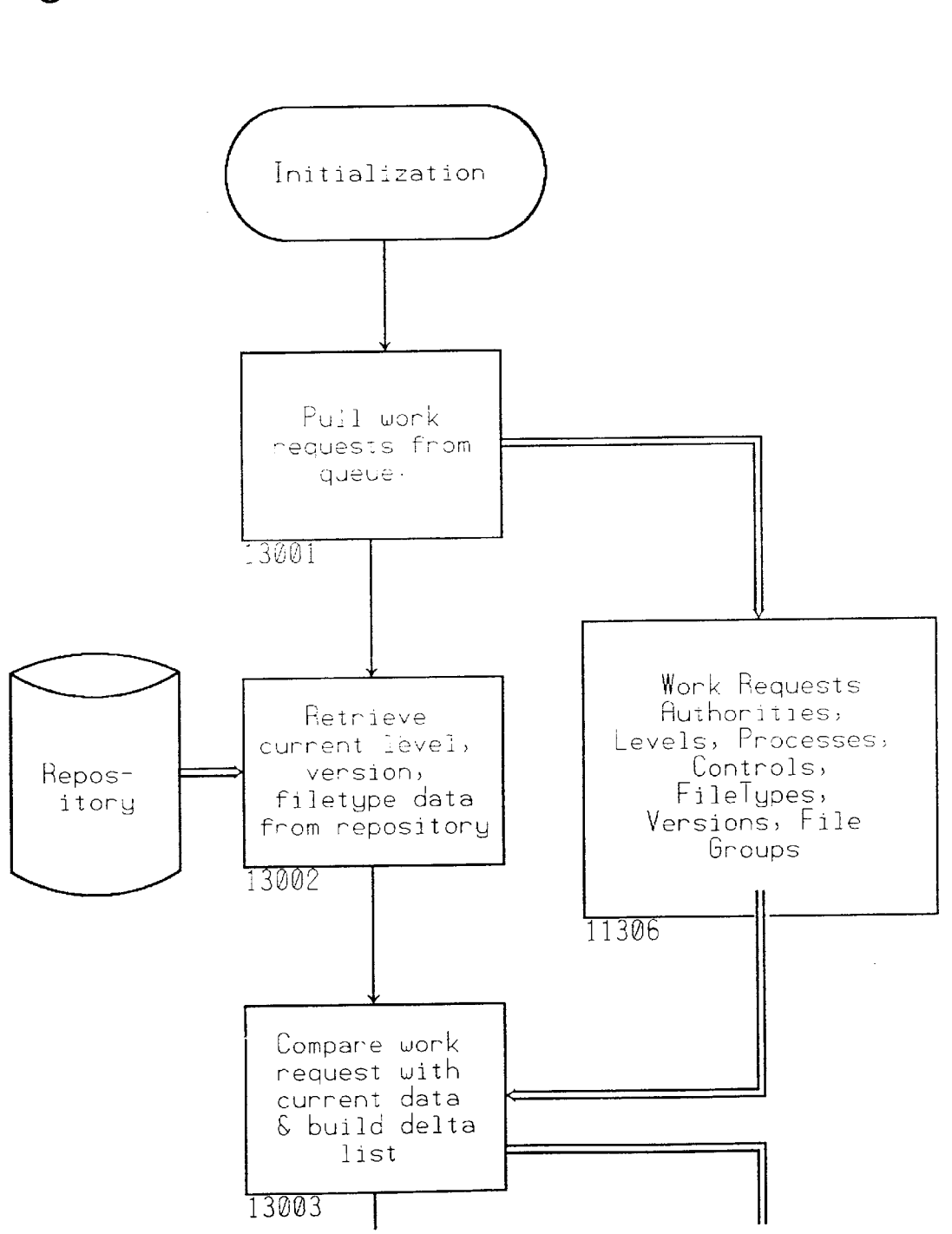
FIG. 49 which comprises FIGS. 49a thru 49e, describes the DNCOMMIT Process.
Figure 49B:
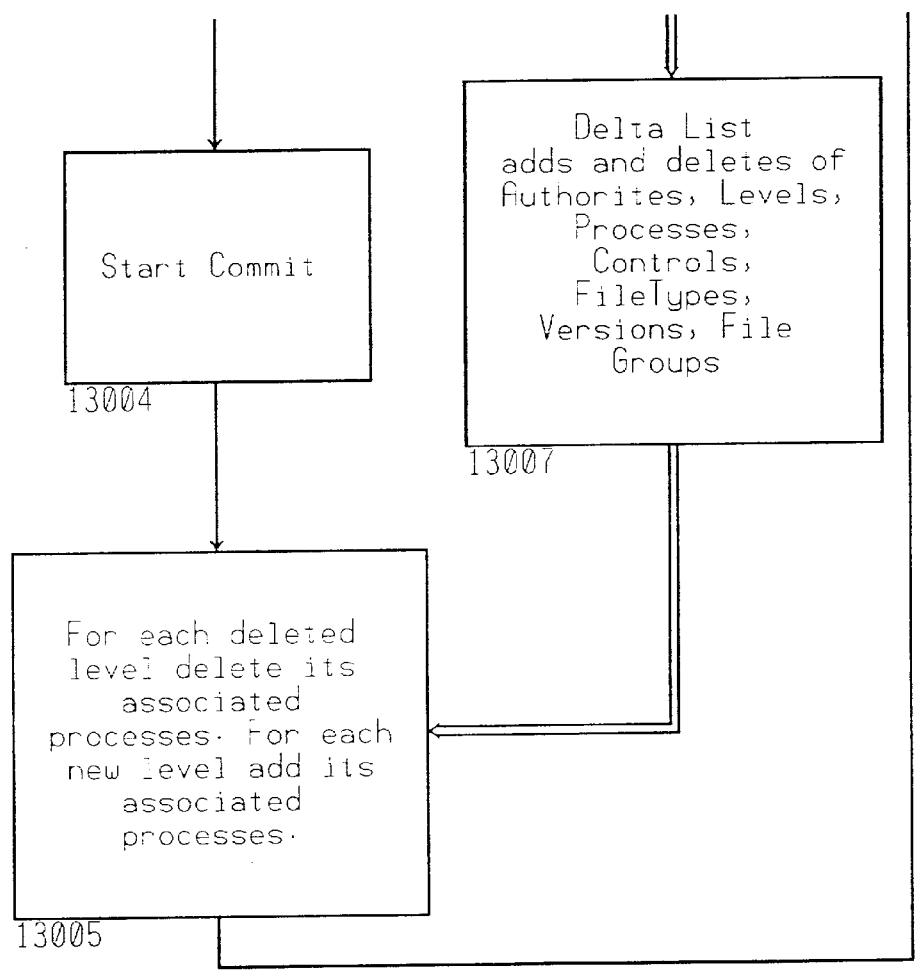
Figure 49C:
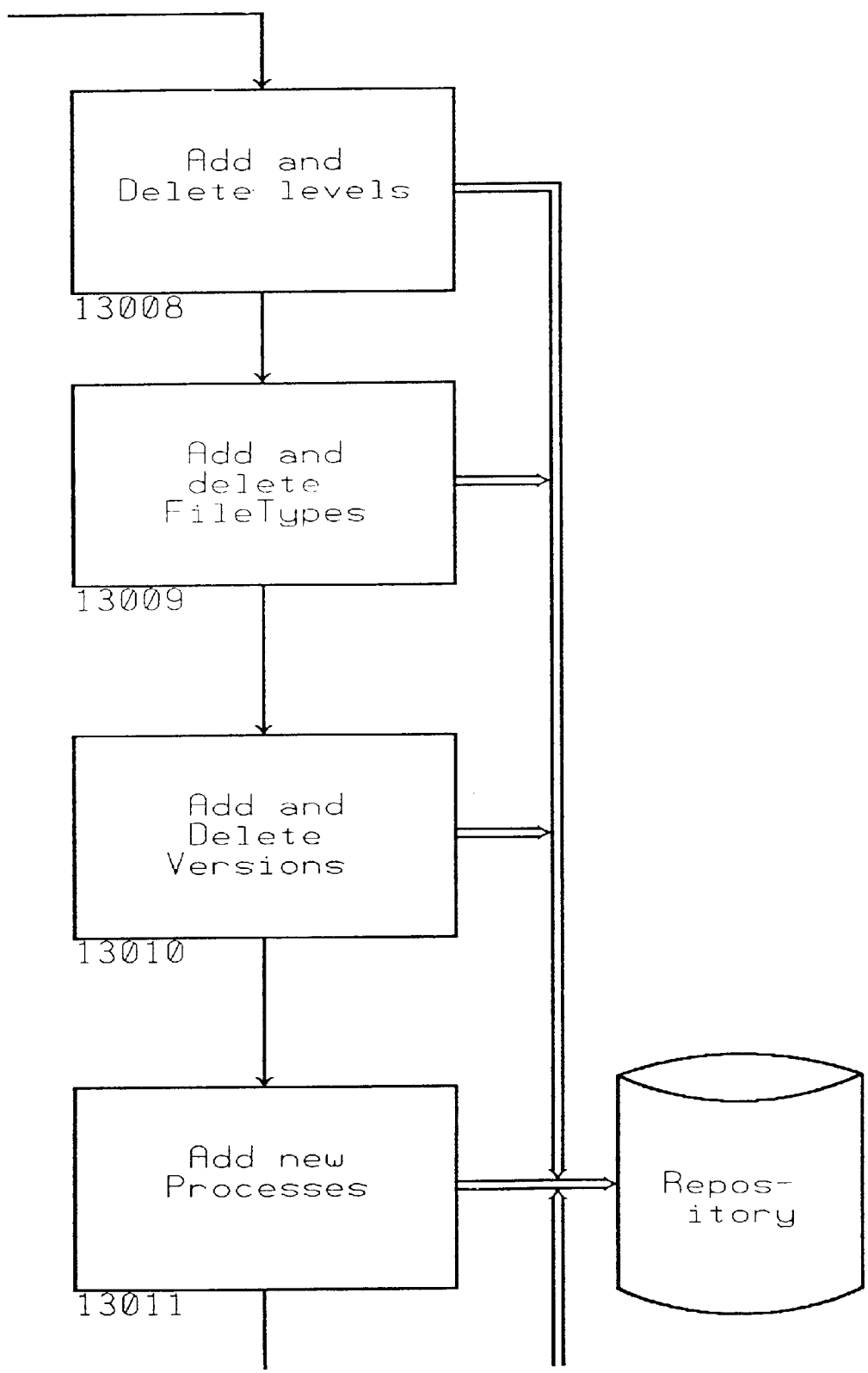
Figure 49D:
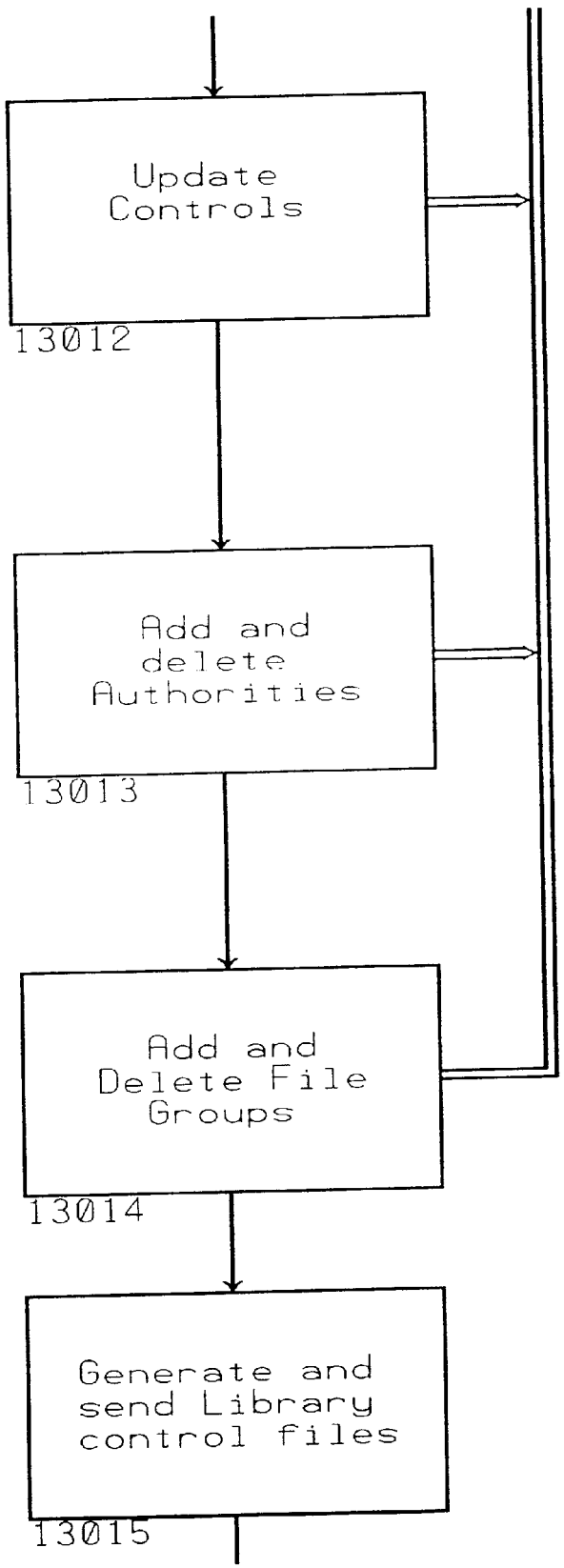
Figure 49E:
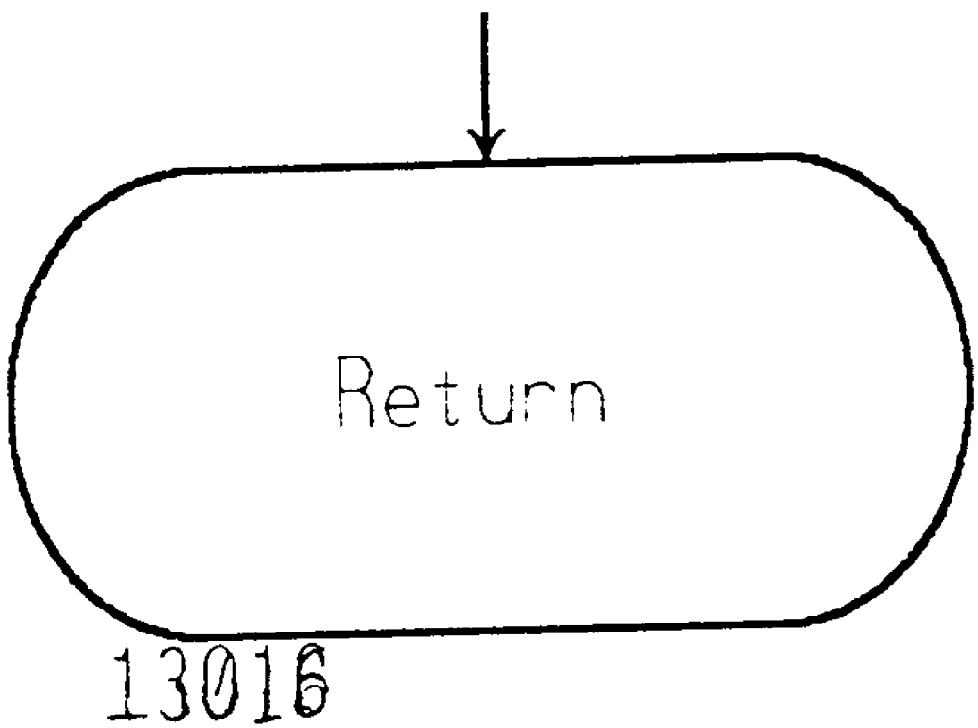
Figure 50A:
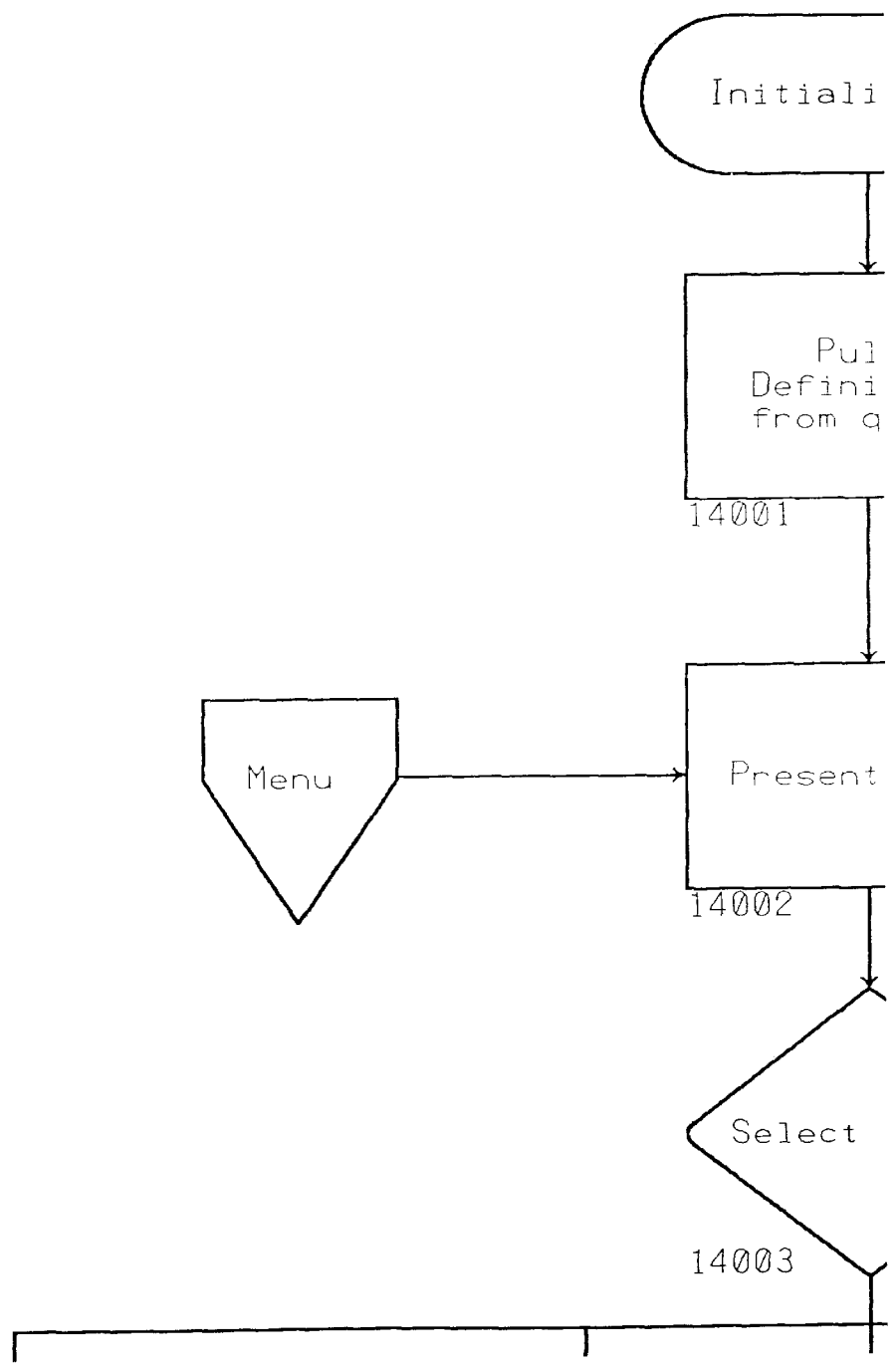
FIG. 50 which comprises FIGS. 50a thru 50d, describes the DNEDIT Process.
Figure 50B:
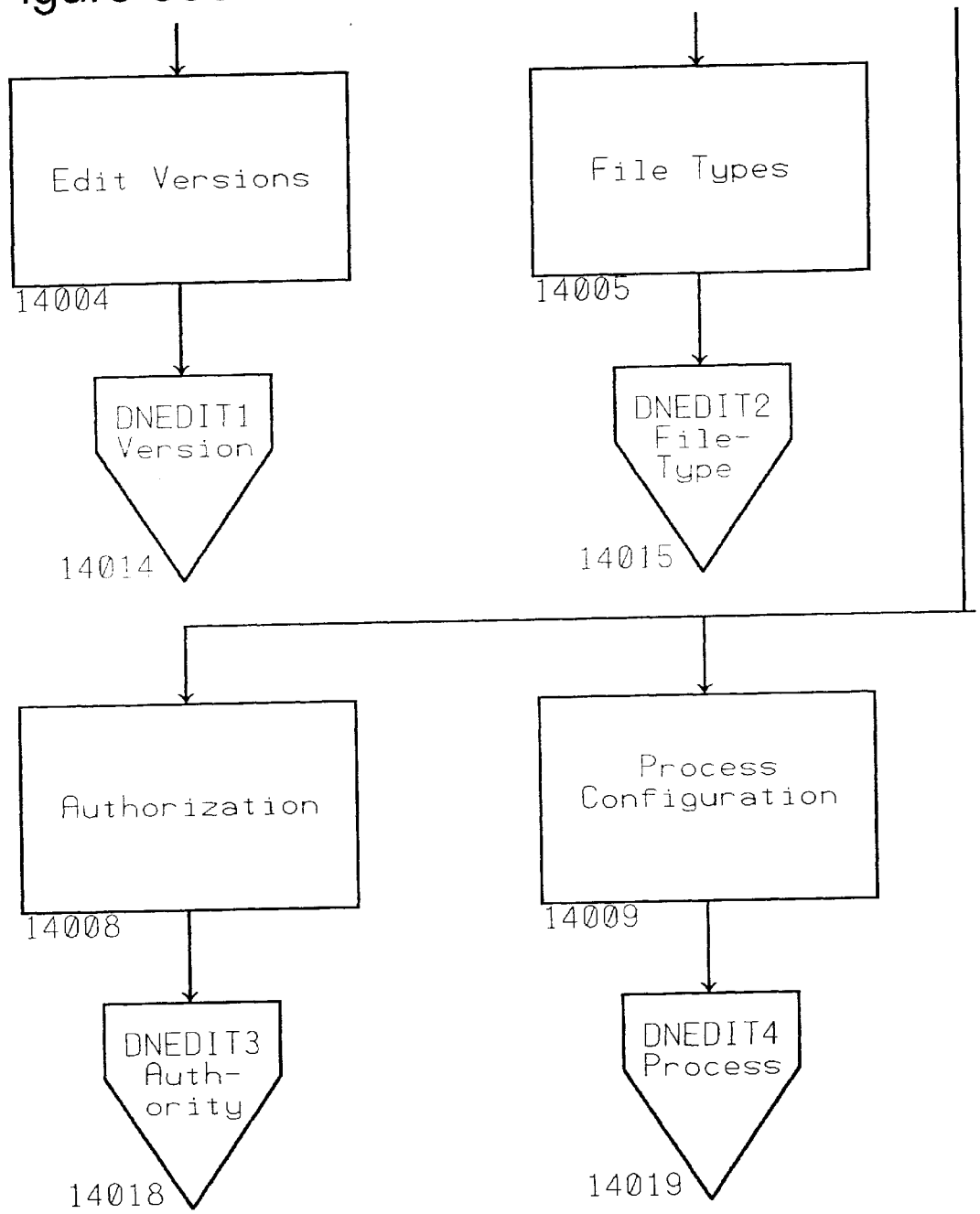
Figure 50C:
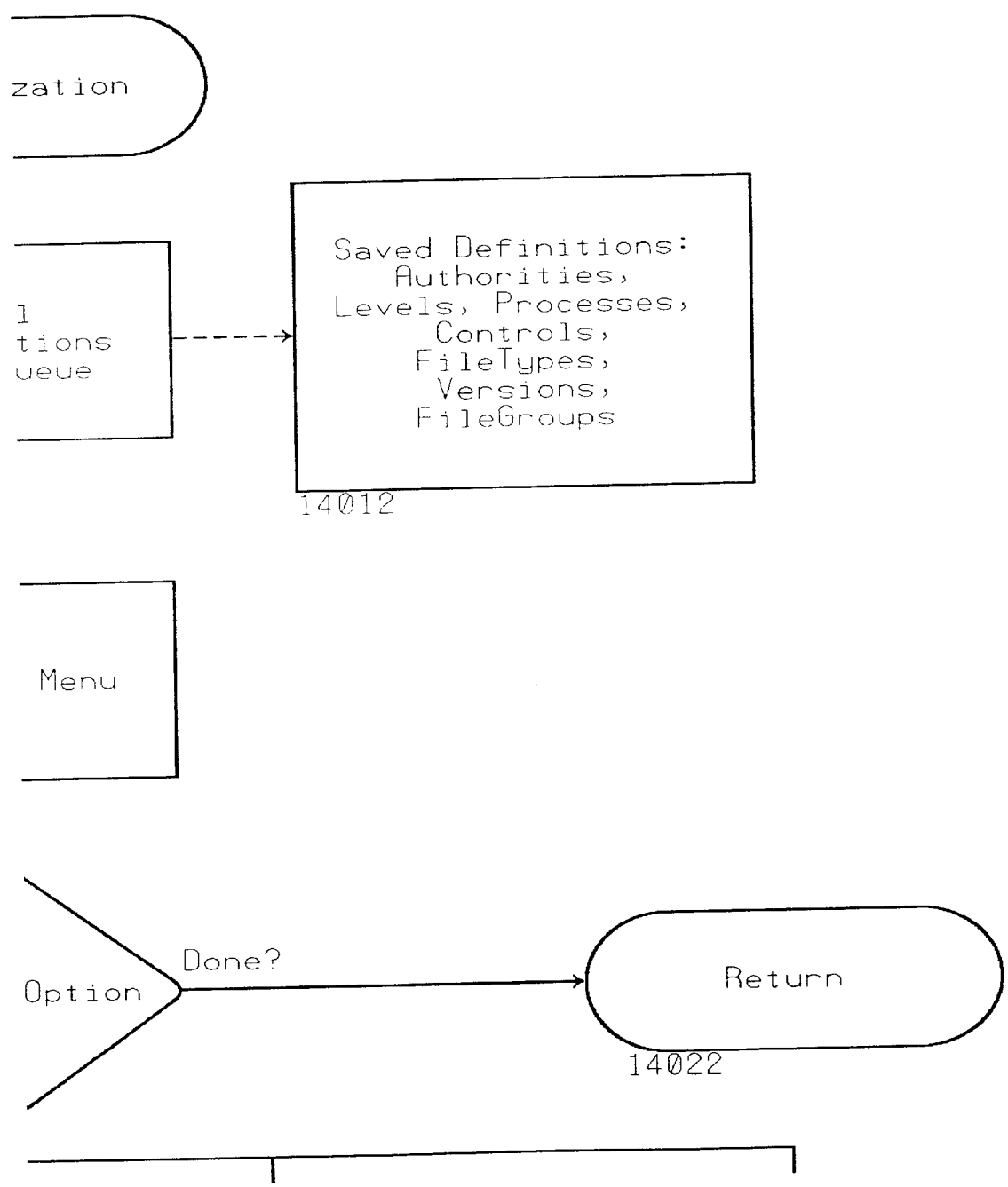
Figure 50D:
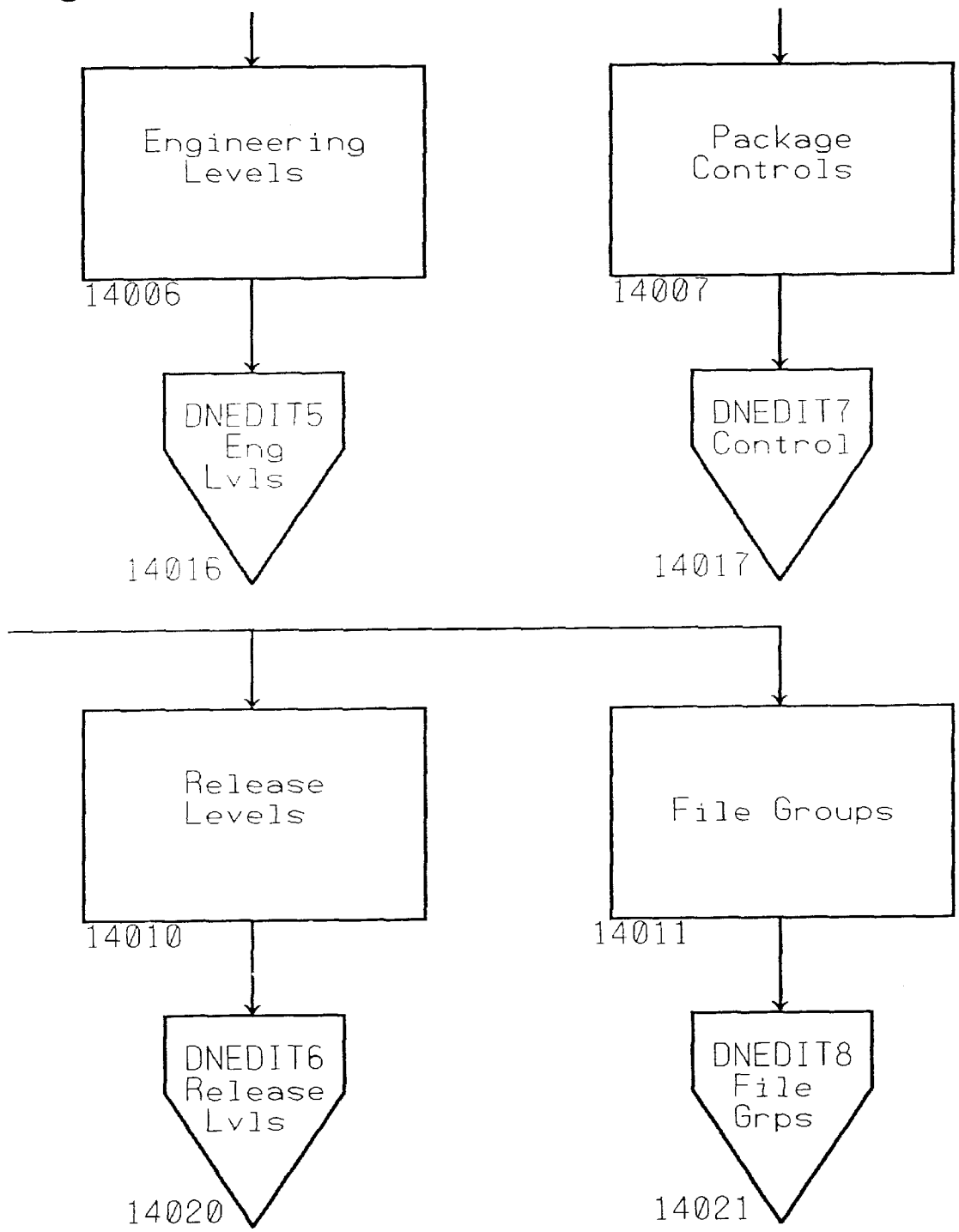

At this point, control proceeds to Step 68436 in FIG. 43*c*. Here, the program Displays all the lock information in two windows. The upper window shows all locks which the current user may reset, and the lower window shows all those locks which can't be reset by the user. Both windows show the following information displayed in formatted columns:

Reference number (Lock or Model depending on the BOM option)
   Type of Lock
   File Name
   Library (Package)
   File Type
   Level
   Version
   Data Lock Set
   Current Lock Owner
   Reason for Lock The user may sort the display windows by any of the above fields.

The user may simply view the locks and exit or select any of the locks in the upper window to reset. Upon selecting one or more locks to reset, Step 68438 in FIG. 43*c* sets up a Selection Loop. For each lock selected, Step 68440 is employed to reset the lock. Our preferred embodiment uses the QRLOKRES routine, described in FIG. 94, to reset locks on any regular files, while it uses the QRMDLRES function described in the Aggregation Manager to reset BOM locks. In addition, the QRMDLRES function permits the entry in the BOM Level Filter to limit the reset operation to those components residing at that Level. As each lock is reset, the current owner is compared against the current user. If the owner is not the user, the owner's user id and electronic address is saved into a data structure.

Upon completion of the Select Loop, Step 68442 Notifies all Owners listed in Step 68440's data structure that their locks have been reset by the current user. The notice clearly indicates the file and lock information along with a time stamp. This concludes the View and Reset Lock algorithm.

Our embodiment also incorporates a third utility which permits Data Managers and their authorized alternates to view and reset processing locks set by the Process Manager.

This utility is very simple in nature. The user interface is a simple command or menu with the only required parameter being the Library name. The underlying algorithm simply queries the Control Repository to ensure the user is the Data Manager or an authorized surrogate for the requested Library. If so, the program invokes the QRLOKLST function to return all the Overlay locks for the Library. Next, the program loops through all the locks looking for a special keyword in the Reason field. This keyword indicates that the Process Manager set the lock during Automated Library Processing. Once found, these locks are displayed in a selection list. The user may select any of the displayed locks for resetting. Resetting is done with the same QRLOKRES function used for other Overlay locks.

Lock Manager Processes

This section describes the processes that support the Lock Manager functions in Data Management Control Utilities. The processes are depicted in FIGS. 93 to 94. To support these processes the Lock Manager maintains the following tables in the Control Repository.

LOCKS

TABLE 33

LOCKS
LOCKS - Locks

| Column | Description |
|---|---|
| REF | Reference number |
| DOMAIN | Lock domain - FILE or PROCESS |

TABLE 33-continued

LOCKS
LOCKS - Locks

| Column | Description |
| --- | --- |
| PACKAGE | Package for which the lock is set - * = all, % = none |
| LIBTYPE | Lib. filetype for which the lock is set - * = all, % = none |
| VERSION | Version for which the lock is set - * = all, % = none |
| LEVEL | Lib. level for which the lock is set - * = all, % = none |
| FILENAME | Filename for which the lock is set - * = all, % = none |
| LOCKNAME | Lock name - UPDATE, OVERLAY, MOVE for FILE, Process name for PROCESS |
| LOCKER_ID | USERID that set the lock |
| DATE | pate when the lock was set |
| TIME | Time when the lock was set |
| REASON | Reason for lock |

The QRLOKSET Process FIG. 93: This process is used to set a given lock.

After initialization, set 61101 Reason to null if no reason was specified. Next, a check 61102 is made to determine which domain was specified. If PROCESS was specified, set 61103 the LockerId to the passed Userid. Next, the QRCHKLIB Process described in FIG. 76 is invoked 61104. Upon return from the above process, a check 61105 is made to determine if the Invoker is a Library Machine. If not, a check 61106 is made to determine if the passed Userid is the same as the invoker. If not, an error message is issued 61111 and the process aborted 61112. If so, set 61107 the LockerId to the Invoker. Next, the QRCKAPAT Process described in FIG. 78 is invoked 61108. Upon return from the above process, a check 61115 is made to determine if the authorization check failed. If so, an error message is issued 61111 and the process aborted 61112. If not, get 61116 a reference number for the lock entry. Then, insert 61117 the lock entry into the LOCKS table in the Control Repository. Next, stack 61118 the lock reference number and the process returns 61118.

If the Domain was specified as FILE, a check 61109 is made to determine if this is an UPDATE lock. If not, set 61110 Function to FILELOCK. If so, set 61113 Function to PUT. In either case, the QRCKAPAT Process described in FIG. 78 is invoked 61114. Upon return from the above process, the process flows back to 61115.

The QRLOKRES Process FIG. 94: This process is used to reset a given lock.

After initialization, a check 61201 is made to determine if LOCKREF was specified. If so, set 61206 Case=1. If not, set 61202 Case=2. Next, a check 61203 is made to determine if the Domain was specified as either PUT or PROCESS. If neither, an error message is issued 61221 and the process aborted 61222. If so, a check 61204 is made to determine if a User was specified. If not, set 61205 Userid to Invoker. Then, delete 61214 the lock entry from the LOCKS table in the Control Repository. Next, a check 61215 is made to determine if an entry was deleted. If so, the process returns 61216. If not, an error message is issued 61221 and the process aborted 61222. If a User was specified, a check 61207 is made to determine if the User is the same as the Invoker. If so, set 61208 Userid to Invoker. Then, the process flows back to 61214. If the user is not the same as the Invoker, set 61209 Userid to User. Next, a query 61210 is made to determine if the Invoker is a Library Machine. If not, a query 61211 is made to determine if the Invoker is a Surrogate for the User. If not, a check 61212 is made to determine if Case=1. If not, get 61213 the Package from the passed parameters. Then, the process flows back to 61219. If Case is not 1, a query 61217 is made to get the Package from the entry in the LOCKS table. Then, the process flows back to 61218. If the Invoker is a Library Machine or a Surrogate for the User the process flows back to 61214.

Communications Manager

The Communications Manager provides a common access interface, the Query-Report Interface (QRI), between applications and the Control Repository. In addition, it provides inter-machine services for data movement within the Data Repository.

Figure 95:
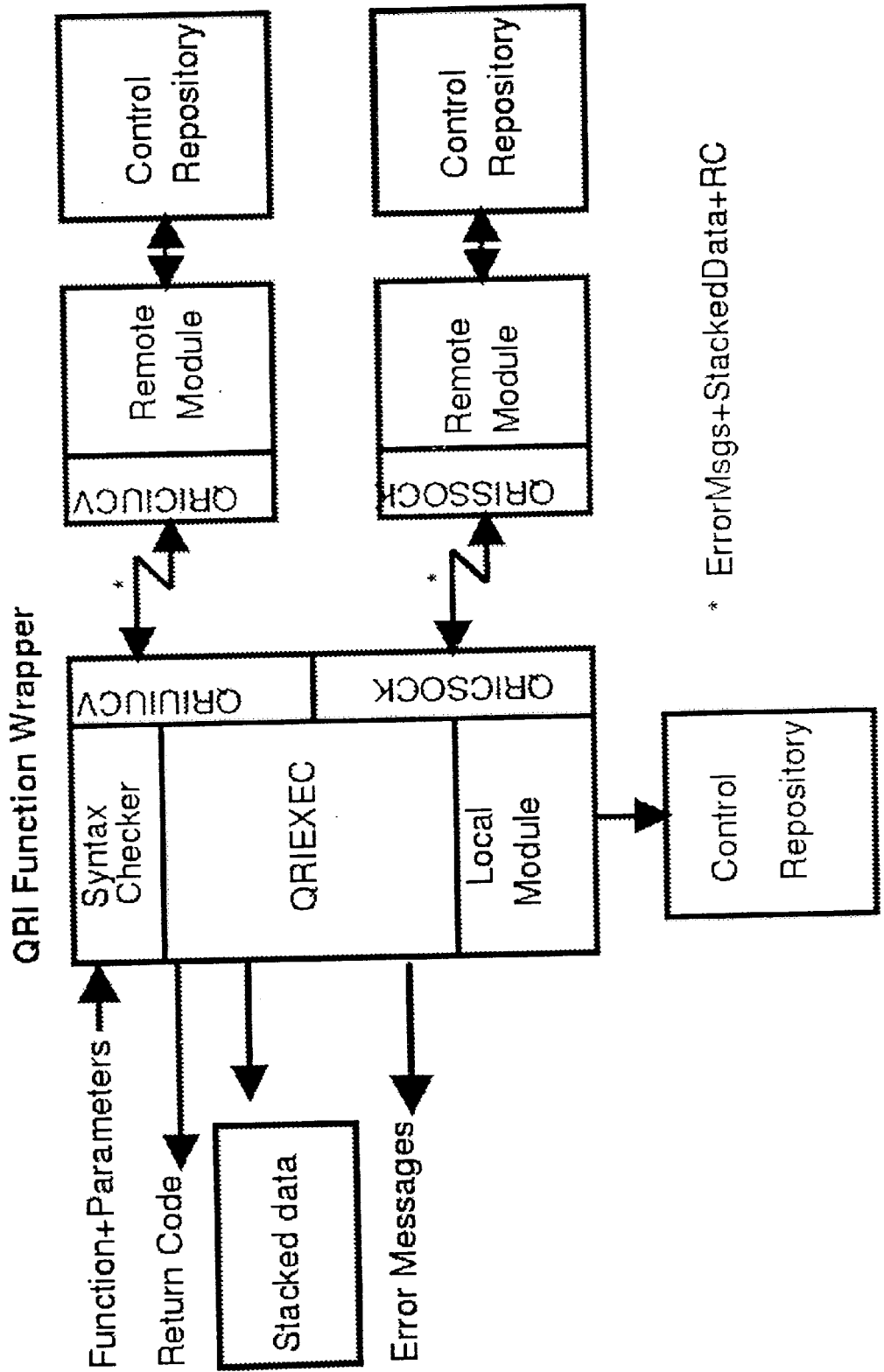
FIG. 95 depicts the QRI Common Architecture

The Query-Report Interface (QRI): consists of a set of atomic functions that query or update the Control Repository. These functions return their results on the program stack. There is a standard architecture for these QRI functions that isolate them from the details of which type of Control Repository is being used and where it is located. Remote Control Repository access is provided by PVM-IUCV or TCP/IP socket communications. In support of these protocols the Communications Manager supplies the software interfaces and a suite of servers co-located with the Control Repository QRI Common Architecture FIG. 95: All QRI functions share a common structural and interface architecture. They are invoked by issuing the function name followed by all the parameters. There are no reads issued to get input data. Output returned is pushed into the program stack with the number of items pushed last. Error and informational messages are issued either to the console or if a Global Variable is set, to a file for subsequent processing by the function invoker. There is a standard set of return codes:

RC Meaning

0 Normal return.

4 Informational message issued

8 Syntax error

12 Process error, Control Repository updates rolled back.

16 Operating system error, Control Repository updates rolled back.

20 Control Repository error, Control Repository updates rolled back.

24 Deadlock Occurred, retry the function.

Each function is composed of a Syntax checking wrapper and a core module that is invoked by the wrapper via the QRIEXEC interface. The QRIEXEC interface (See FIG. 99) is responsible for determining the location of the Control Repository, selecting and interfacing with the appropriate communications processes. It passes the parsed and syntax checked commandparameter stream to the module if the Control Repository is co-located or to the appropriate communication process which invokes the module on the node where the Control Repository is available.

At the remote node, an environment is established to allow the communication server to act as a proxy for the original invoker. The stacked module output, the informational and error messages and module return code are captured and formatted into a message that is returned to the client side where it is parsed and presented to the invoker just as if it the module had been executed locally.

Function Classes The QRI function are divided into four classes (Super, High, Medium and Low) by average response time. The communications servers are divided into four pools, with one pool for each class. The rationale is to prevent shorter queries from waiting behind longer queries. The servers are single-thread. When a remote function is to be executed, a list of servers for the corresponding pool is created and one is picked at random. If it is busy, the next server in turn is picked. If all servers are busy, the list will be reused until the maximum retry count is exceeded.

Figure 96:
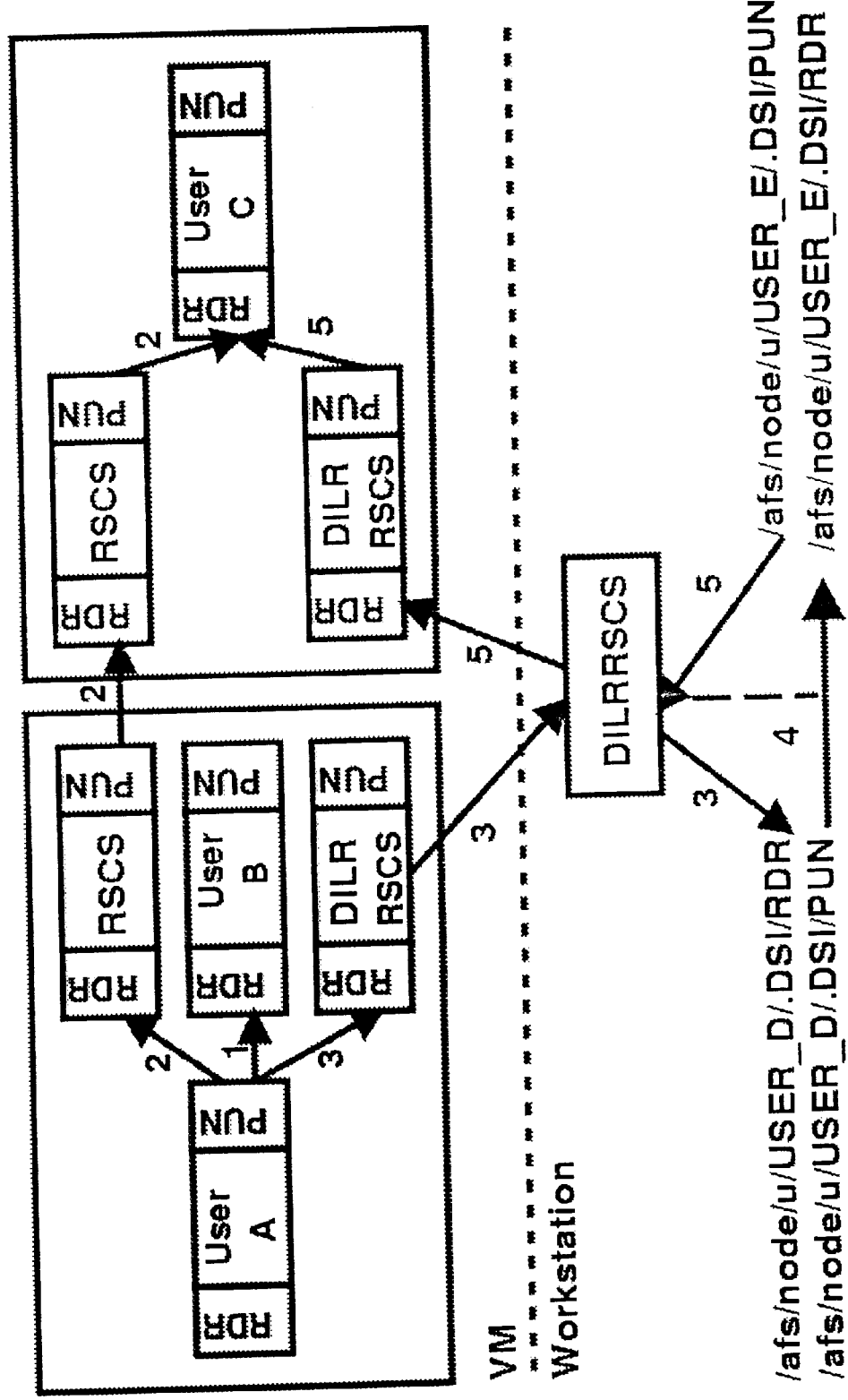
FIG. 96 depicts the DILRRSCS Inter-Machine Service

DILRRSCS Inter-Machine Service FIG. 96: As described in P0996-0010 Method for Managing Shared Libraries, the Data Repository is maintained and updated by a collection of Library Machines. These machines may reside on one or more mainframe nodes (e.g. VM) and/or one or more workstation nodes.

On VM, the intra-nodal movement of files is accomplished via the sender building a transfer file in its PUNCH and transferring it to the READER of the receiving userid (Path 1). Inter-nodal of files is accomplished via the RSCS and VNET. The sender still builds a transfer file in its PUNCH, tags it with the destination userid and node and finally transfers it to the READER of the RSCS userid on the local node. The sending RSCS userid forwards the file to the RSCS userid on the receiving node. Once there, the receiving RSCS machine transfers the file to the READER of the destination userid (Path 2).

On workstations, movement of files is accomplished via the DILRRSCS userid. Each Library or Designer userid has a standard subdirectory/.DSI, attached to it Home directory. This/.DSI directory has two standard subdirectories/RDR and/PUN which are analogs to the VM READER and PUNCH.

The DILRRSCS userid has read/write privileges to all the/.DSI subdirectories. The movement of files is accomplished via the sender building a transfer subdirectory, containing the files to be transferred in its/.DSI/PUN directory. Tagging information is encoded in the subdirectory name. The DILRRSCS userid is then notified of the requested transfer. It will move the transfer directory from the sender's/.DSI/PUN to the receiver's/.DSI/RDR directory (Path 4).

For inter-platform transfers a companion DILRRSCS userid is established on each mainframe node. For a VM-to-workstation transfer, the sender prepares the transfer file in its PUNCH and tags it with the destination and then transfers the file to the local DILRRSCS READER. The DILRRSCS userid communicates with its workstation counterpart and transfers the file via FTP. The workstation DILRRSCS userid builds a transfer subdirectory in the receiver's/.DSI/PUN (Path 3).

For a workstation-to-VM transfer, the sender build a transfer subdirectory, containing the files to be transferred, in its/.DSI/PUN directory. Tagging information is encoded in the subdirectory name. The DILRRSCS userid is then notified of the requested transfer. The DILRRSCS userid communicates with its counterpart on the receiver's VM node which, in turn, transfers the file via FTP to its PUNCH, which is then transferred to the receiver's READER (Path 5).

The DILRRSCS mechanism provides a seamless approach to intra-nodal, inter-nodal and inter-platform file transfers with in the Data Repository.

Communications Manager Processes

This section describes the processes that support the Communications Manager functions in Data Management Control Utilities. The processes are depicted in FIGS. 97 to 101.

Figure 97:
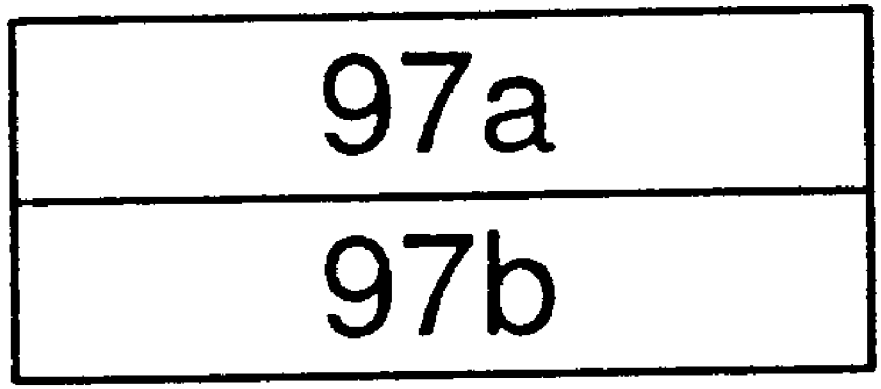
FIG. 97 which comprises FIG. 97a thru 97b describes the QRICIUCV Process.
Figure 97A:
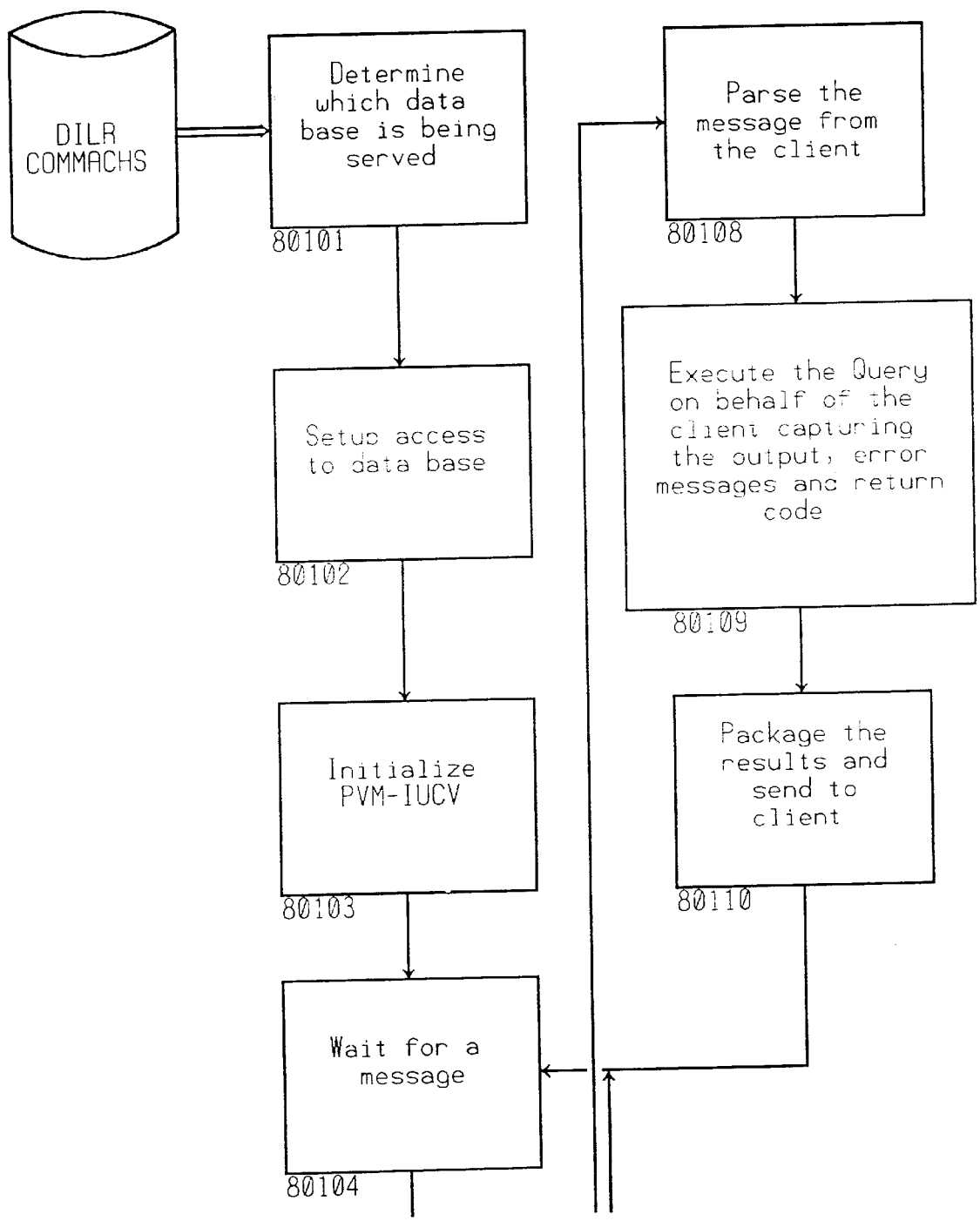
Figure 97B:
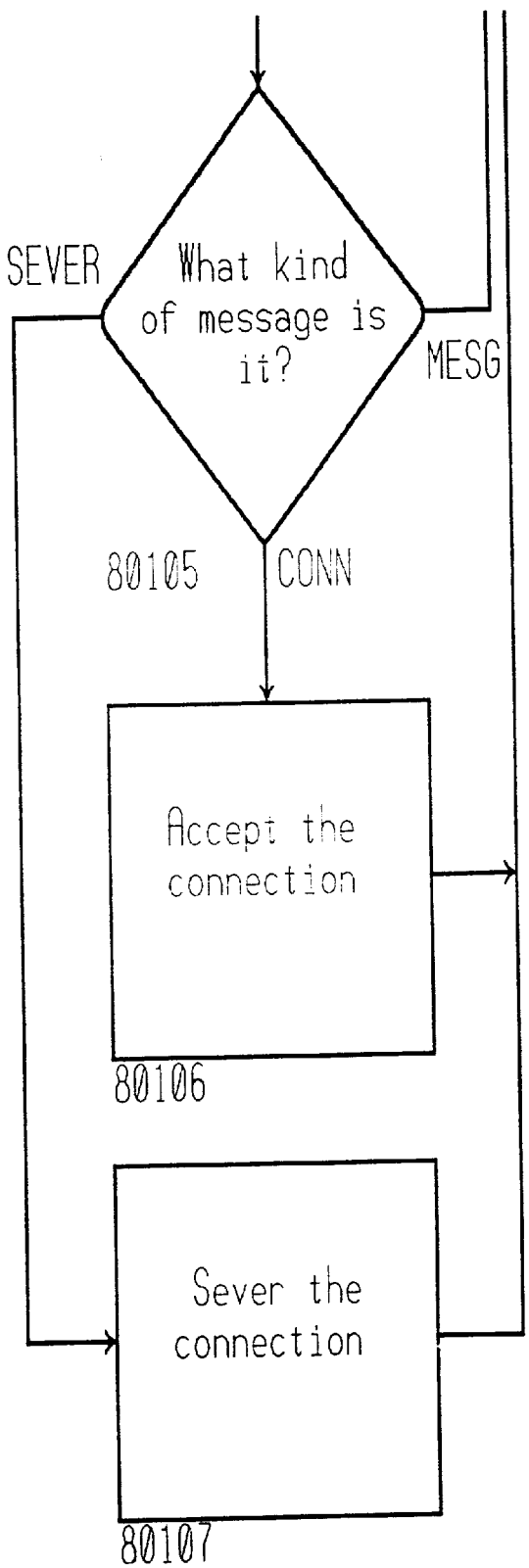
Figure 98A:
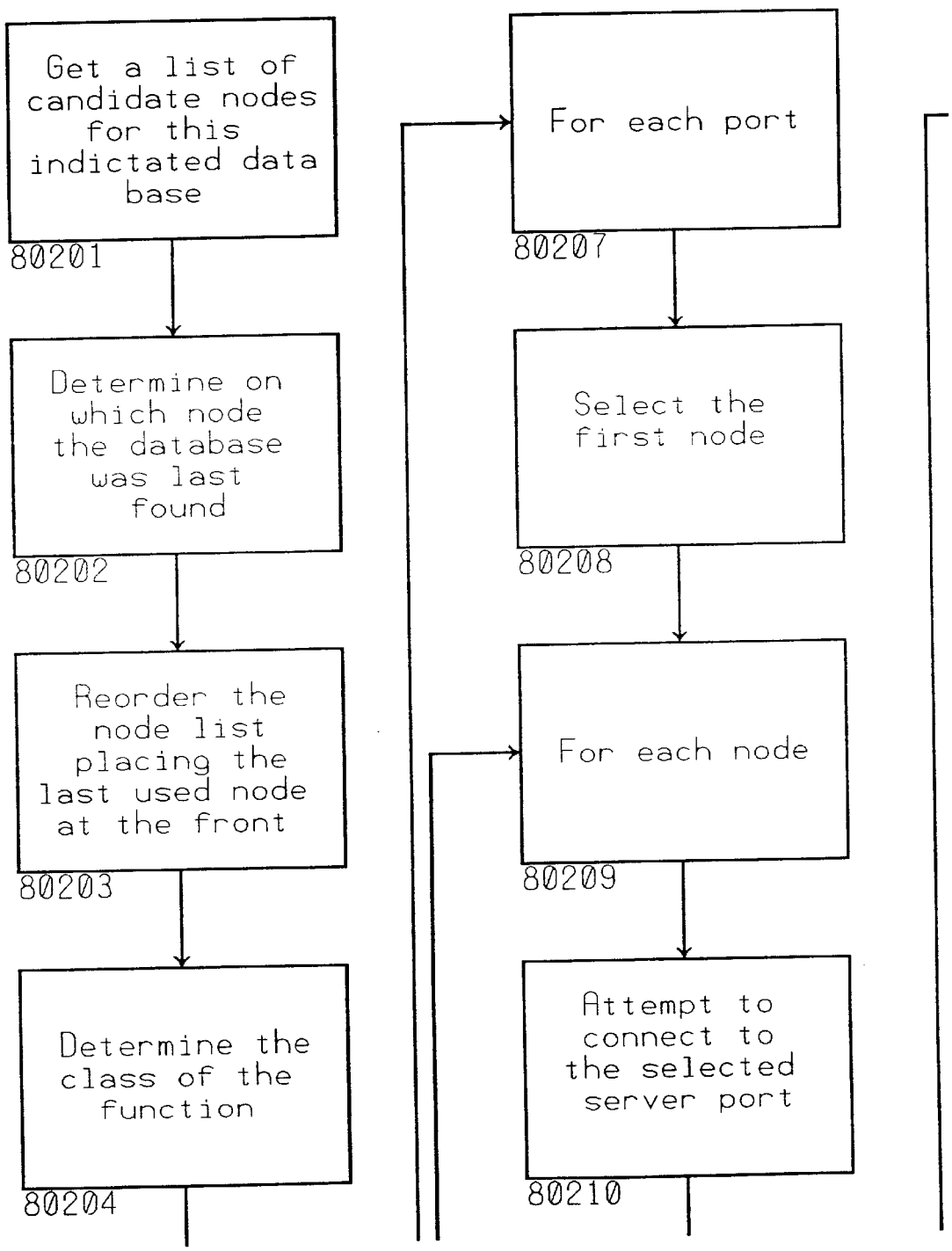
FIG. 98 which comprises FIG. 98a thru 98d, describes the QRICSOCK Process.
Figure 98B:
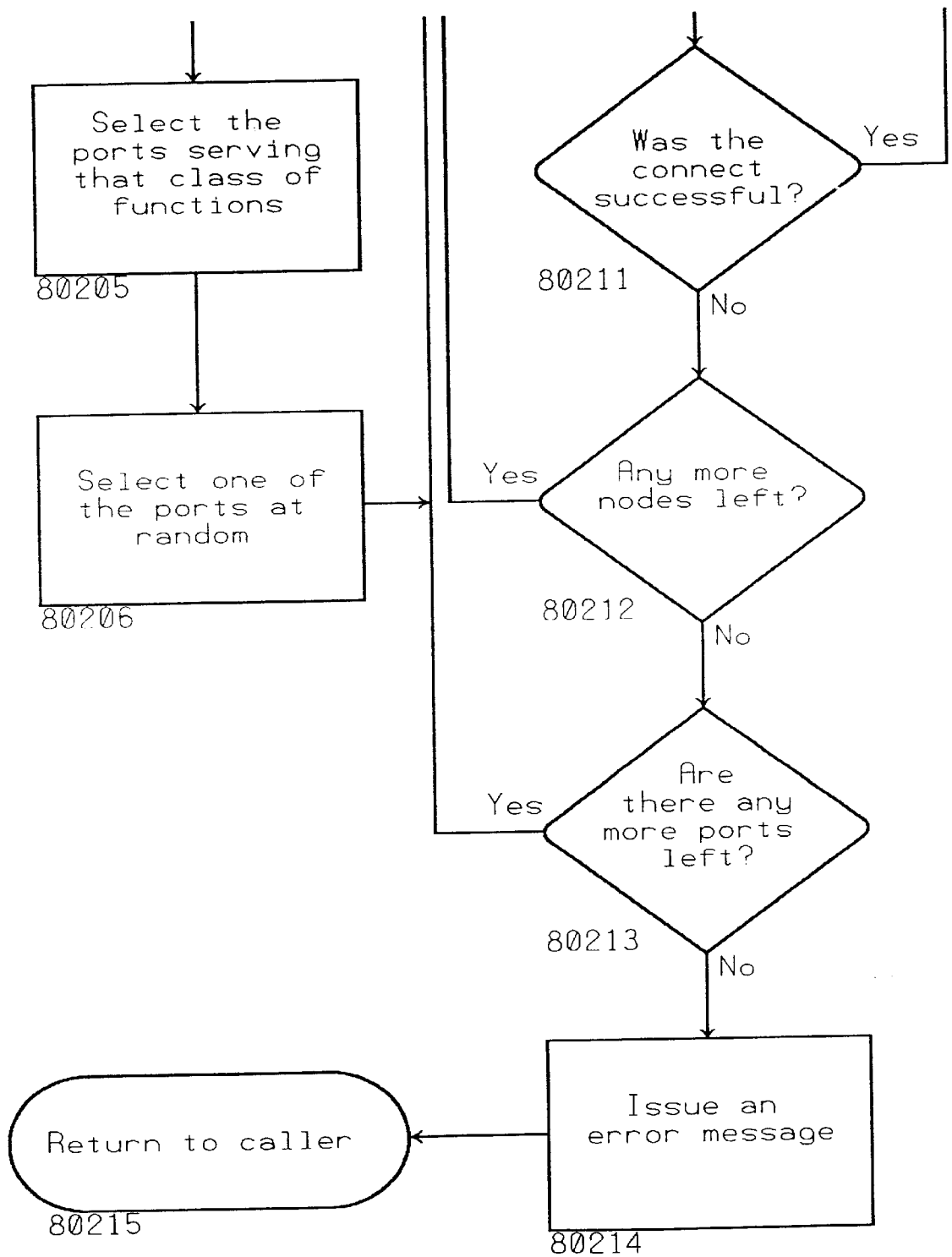
Figure 98C:
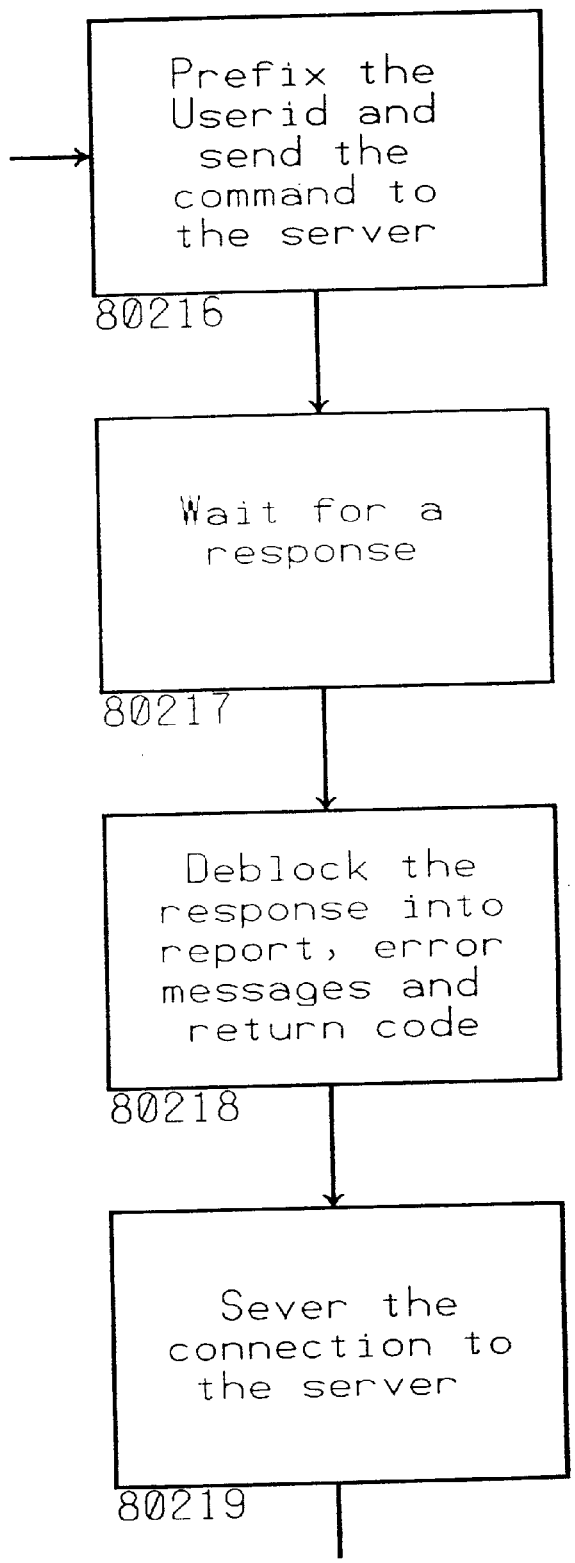
Figure 98D:
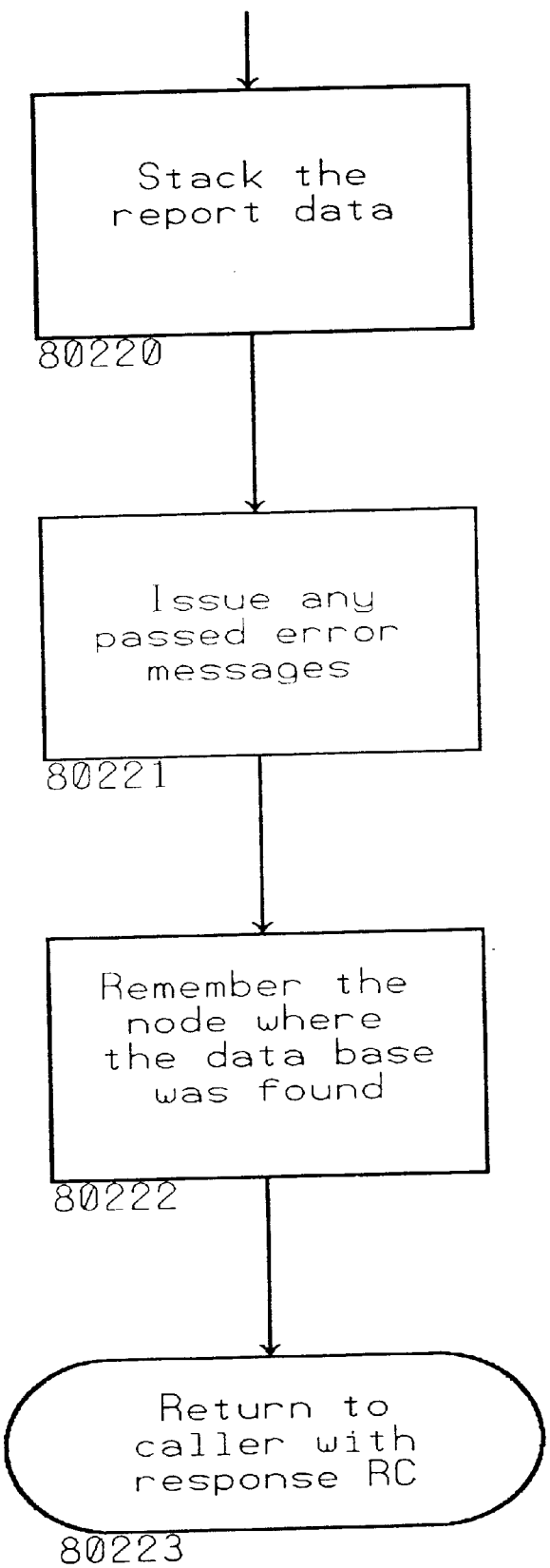

The QRICIUCV Process FIG. 97: This process is used by the VM based Communication Server machines. Once started, this process does not terminate.

First, the name of the data base being served is determined 80101. Next, set up 80102 the access to the data base. Then, initialize 80103 PVM-IUCV. Then, wait 80104 for a message. Next, a check 80105 is made to determine what kind of message it was. If a CONN, accept 80106 the connection. Then the process flows back to 80104. If a SEVER, sever 80107 the connection. Then, the process flows back to 80104. If a MESG, parse 80108 the message from the client. Then execute 80109 the Query on behalf of the client, capturing the output, error messages and return code. Then, package 80110 the results and send to the client. Then, the process flows back to 80104.

The QRICSOCK Process FIG. 98: This process is used by the QRIEXEC process for remote cross platform Control Repositorys.

First, get 80201 a list of candidate nodes for the indicated data base. Then, determine 80202 on which node the data base was last found. Next, reorder 80203 the node list placing the last used node at the front. Next, determine 80204 the class of the function. Then, select 80205 the ports serving that class of function. Next, select 80206 one of the ports at random.

For each port 80207, select 80208 the first node.

For each node 80209, attempt to connect 80210 to the selected server port. Next, a check 80211 is made to determine if the connect was successful. If not, a check 80212 is made to determine if there are any more nodes left. If so, the process flows back to 80209.: If not, a check 802130 is made to determine if there are any more ports left. If not, an error message is issued 80214 and the process returns 80215 to the caller. If so, the process flows back to 80207.

If the connect was successful, prefix 80216 the Userid and send the command to the server. Then, wait 80217 for a response. Next, deblock 80218 the response into report, error messages and return code. Then, sever 80219 the connection to the server. Next, stack 80220 the report data. Then, issue 80221 any error messages. Next, remember 80222 the node where the data base was found. Then, the process returns 80223 to the caller with the response Return Code.

Figure 99:
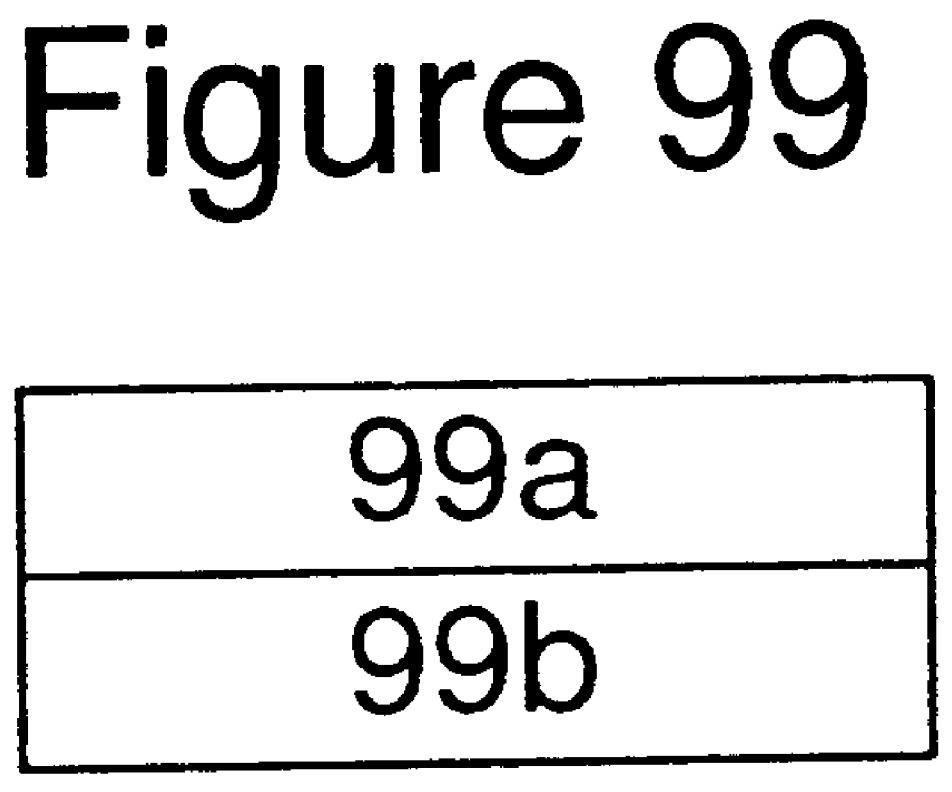
Figure 99A:
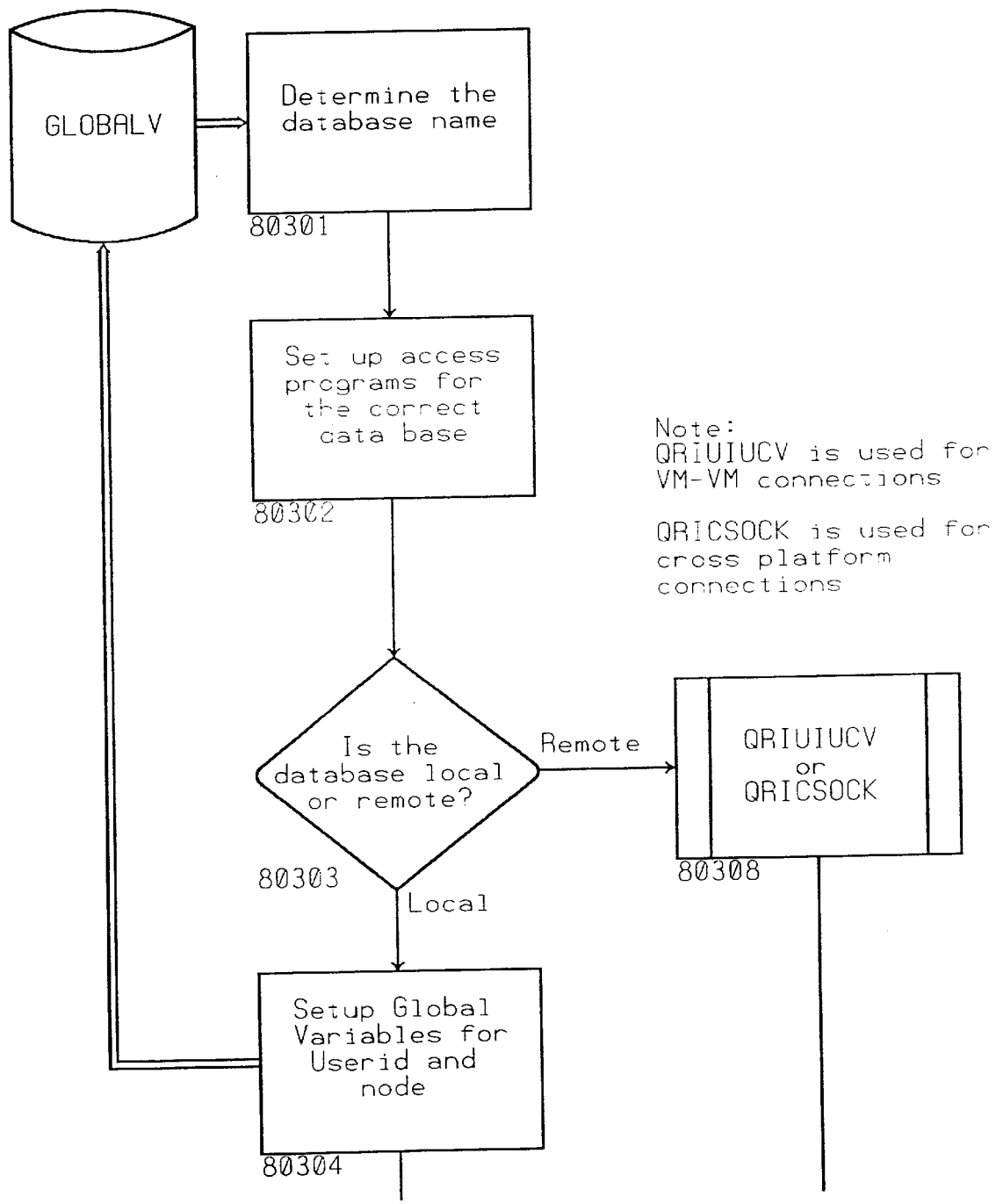
FIG. 99 which comprises FIG. 99a thru 99b, describes the QRIEXEC Process.
Figure 99B:
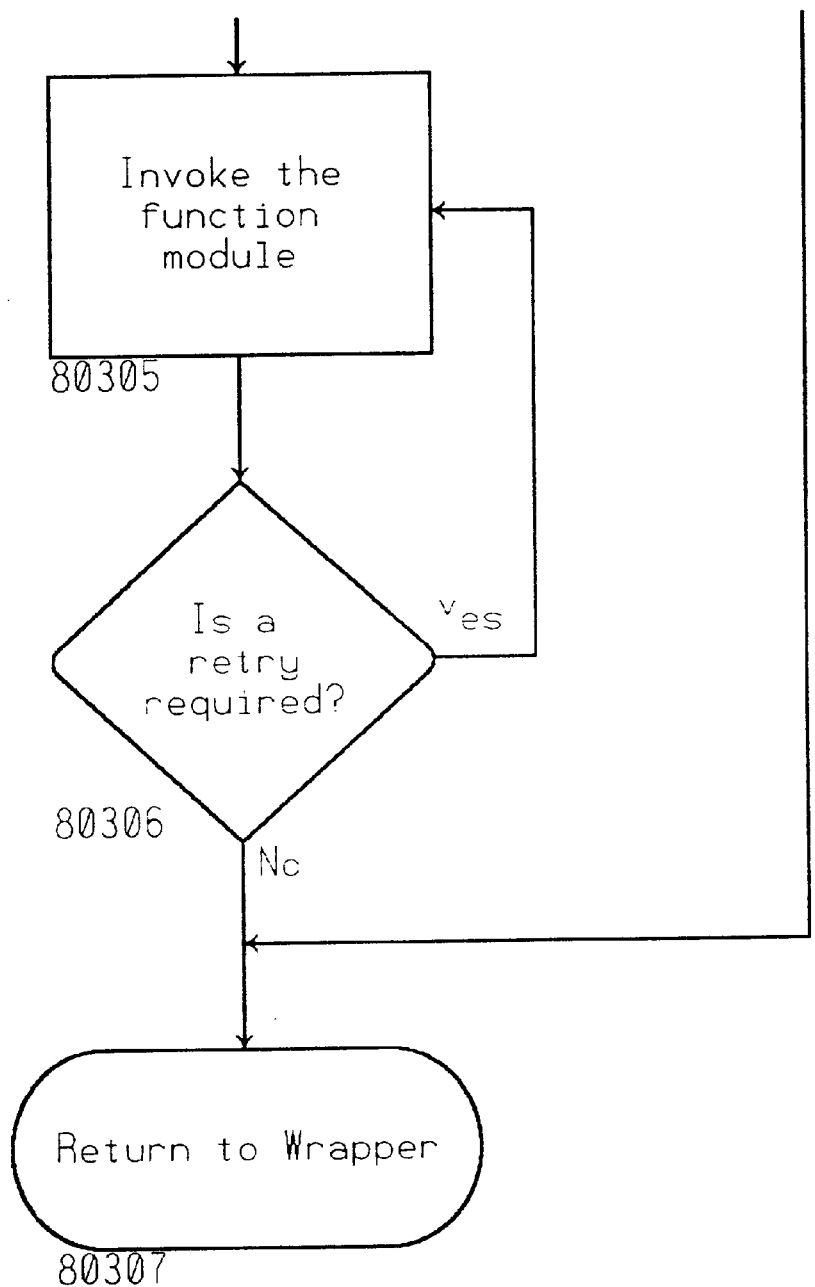

The QRIEXEC Process FIG. 99: This process is used by the Client function wrappers.

First, determine 80301 the name of the data base. Next, setup 80302 access programs for the correct data base. Then, a check 80303 is made to determine if the data base is local or-remote. If remote, invoke 80308 either the QRIUIUCV Process FIG. 101 for VM client to VM Control Repository connections, or the QRICSOCK Process FIG. 98 for cross-platform client to Control Repository connections. Upon return from the above processes, the process returns 80307 to the wrapper. If local, setup 80304 global variables for the Userid and Node. Next, invoke 80305 the function module. Next, a check 80306 is made to determine in a retry is required. If so, the process flows back to 80305. If not, the process returns 80307 to the wrapper.

Figure 100:
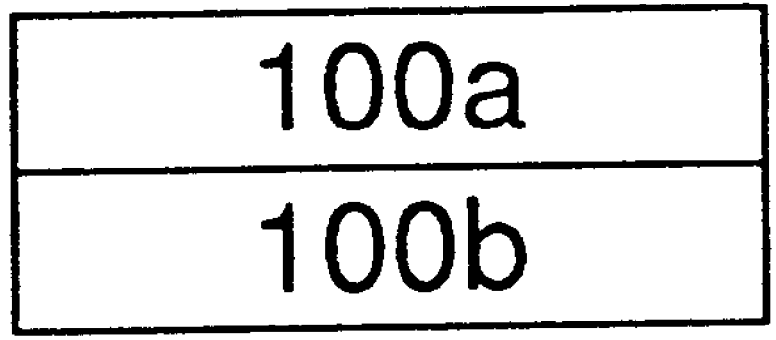
FIG. 100 which comprises FIG. 100a thru 100b, describes the QRISSOCK Process.
Figure 100A:
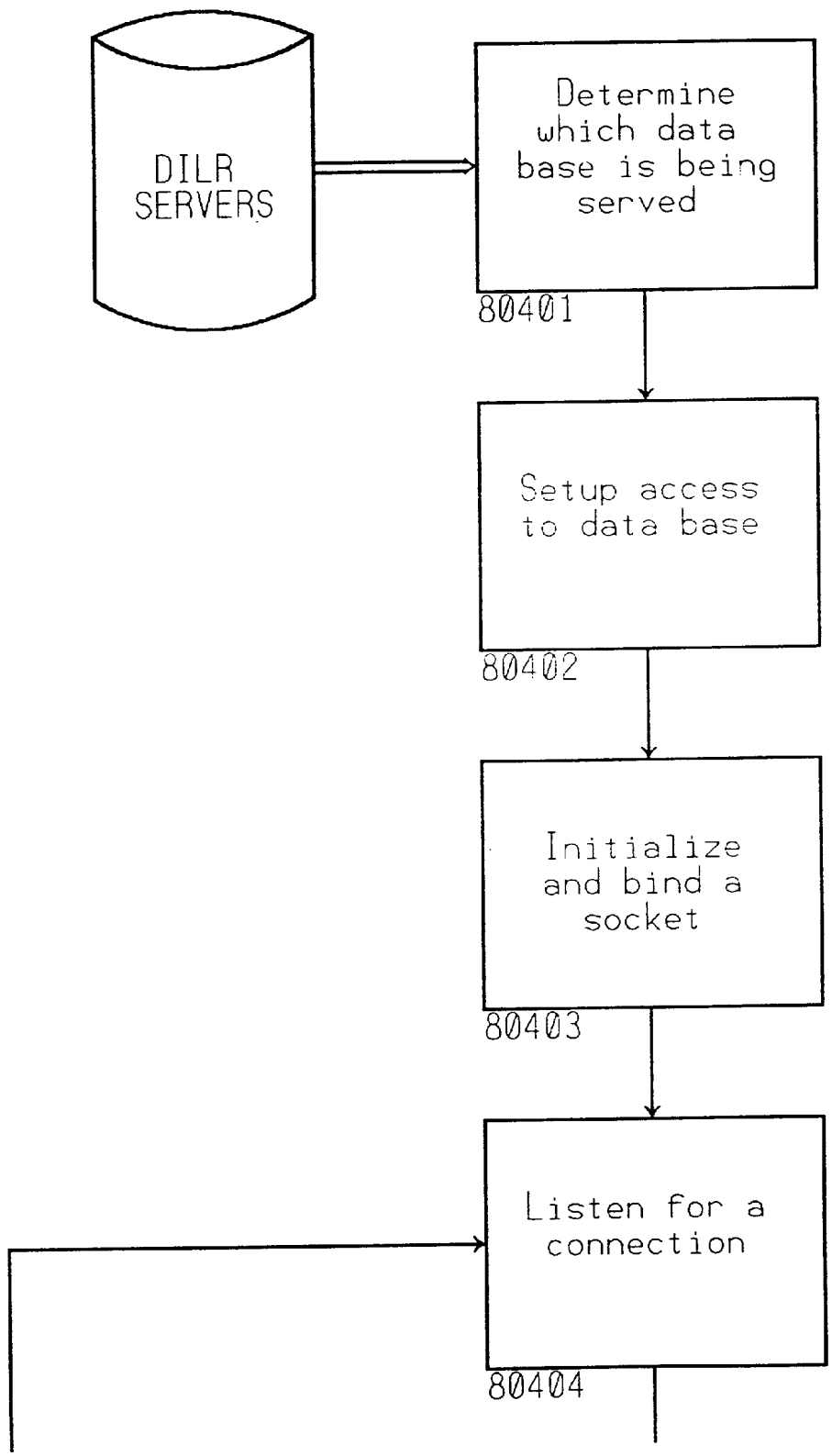
Figure 100B:
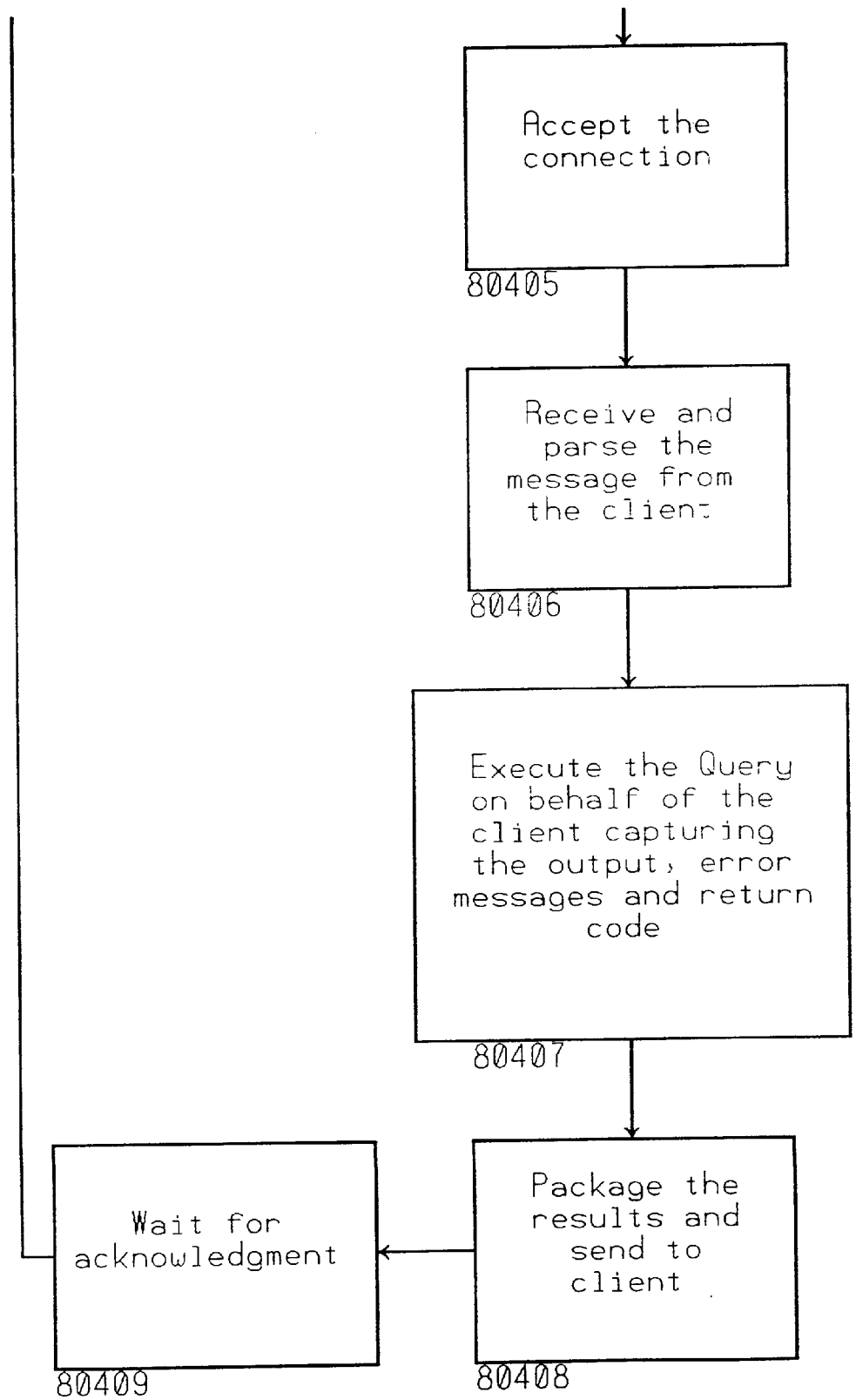
Figure 101A:
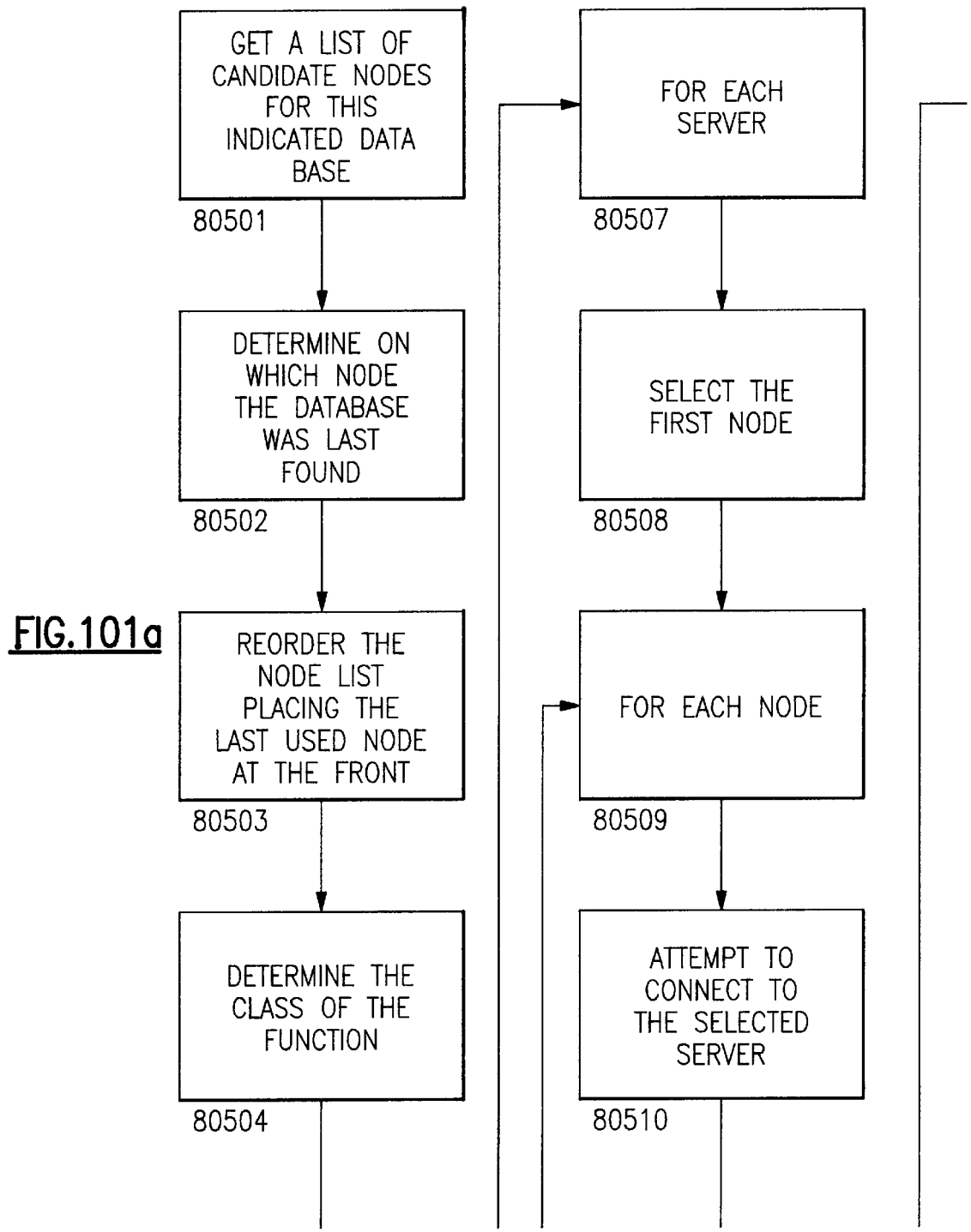
FIG. 101 which comprises FIG. 101a thru 101d, describes the QRIUIUCV Process.
Figure 101B:
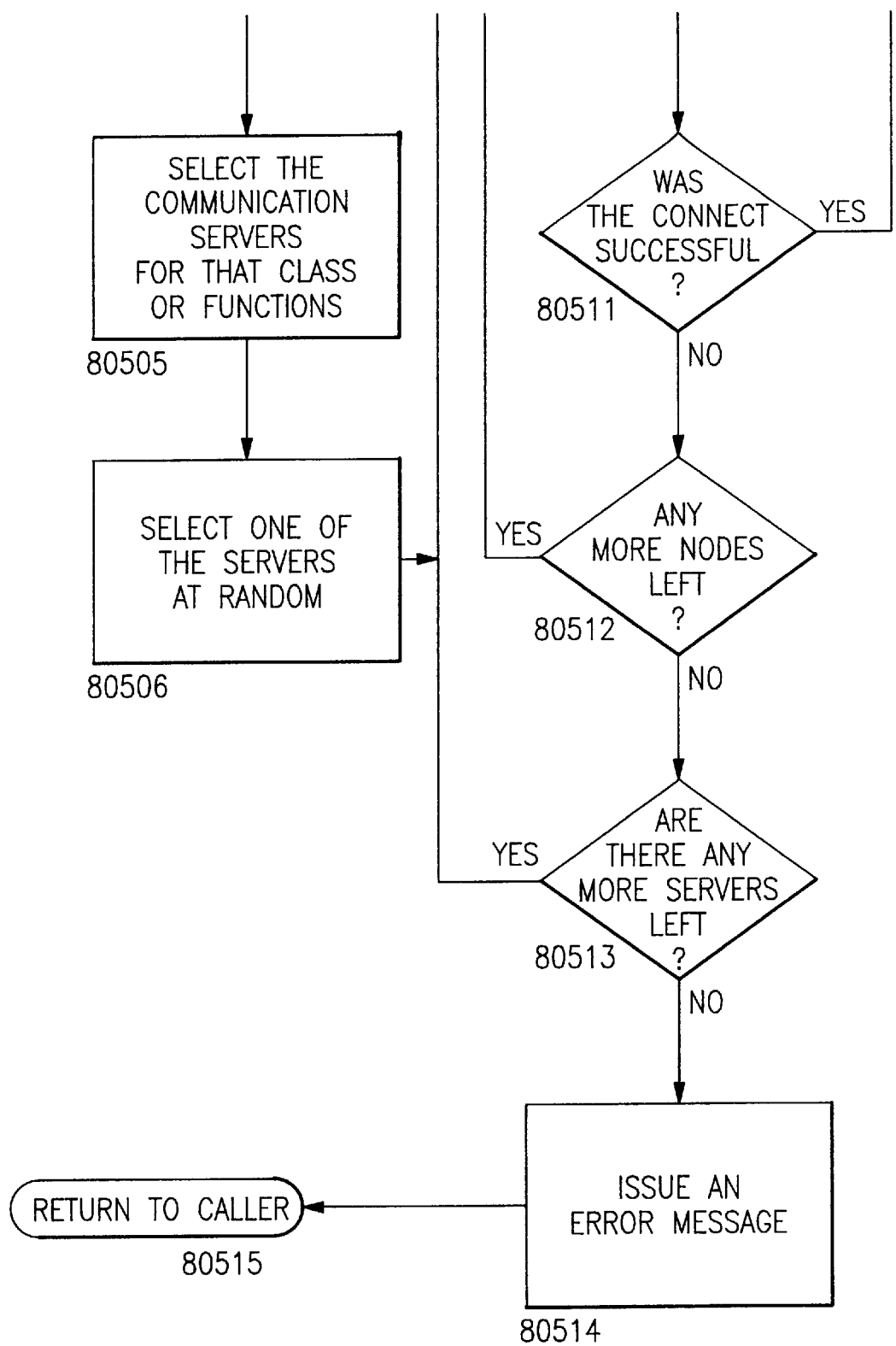
Figure 101C:
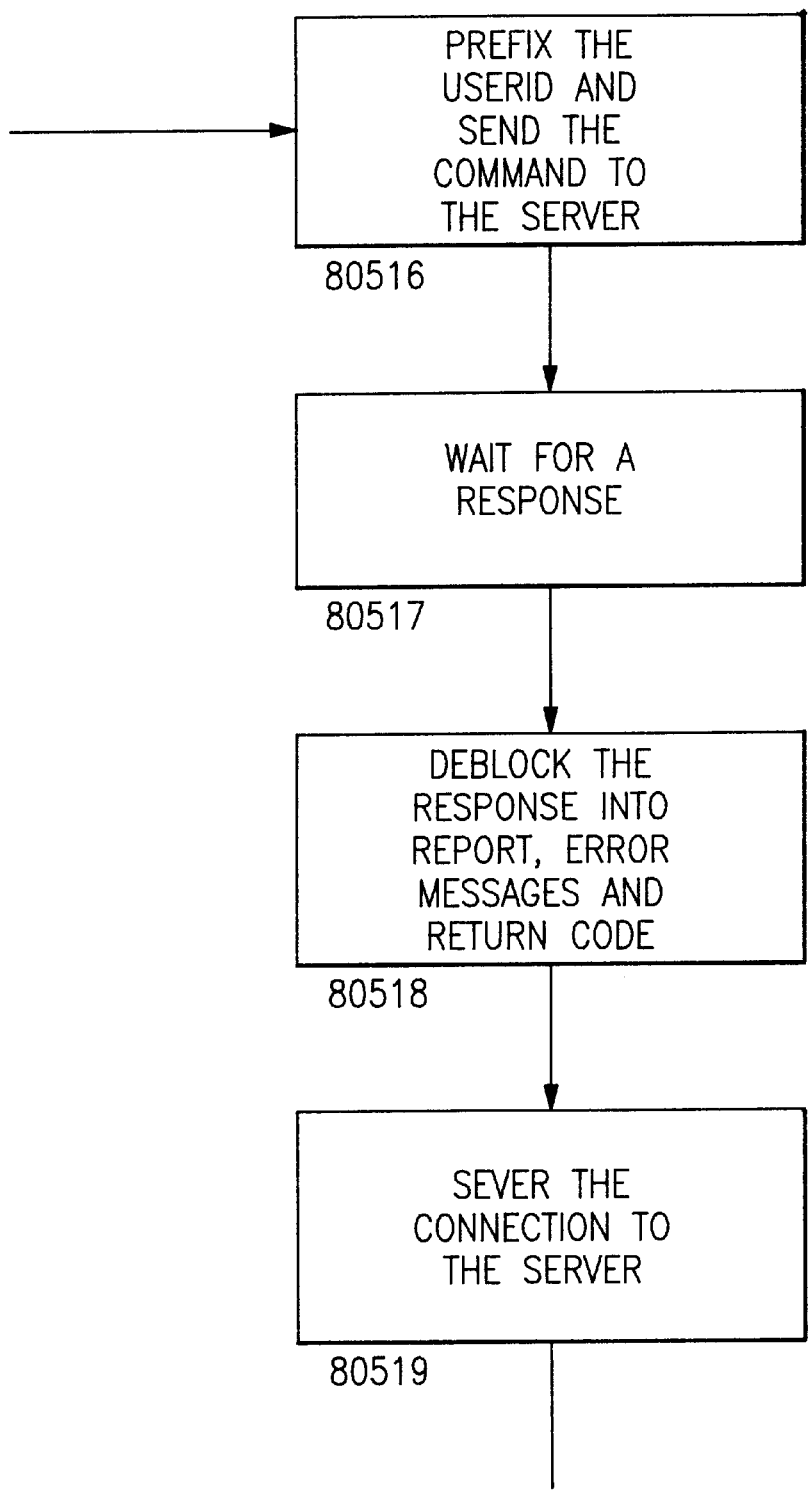
Figure 101D:
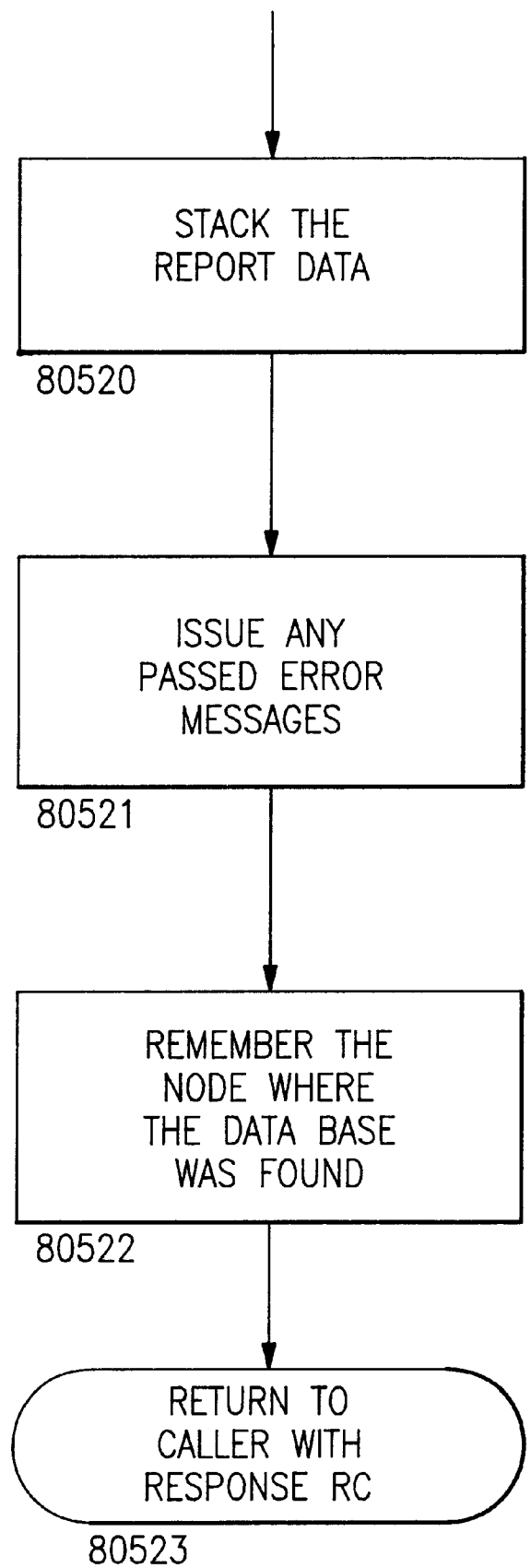

The QRISSOCK Process FIG. 100: This process is used by the cross platform Servers. Once started, this process does not terminate.

First, the name of the data base being served is determined 80401. Next, set up 80402 the access to the data base. Then, initialize 80403 and bind a socket. Then, listen 80404 for a connection. Next, accept 80405 the connection. Then receive 80406 and parse the message from the client. Then execute 80407 the Query on behalf of the client, capturing the output, error messages and return code. Then, package 80408 the results and send to the client. Then, the process flows back to 80404.

The QRIUIUCV Process FIG. 101: This process is used by the QRIEXEC process for remote VM based Control Repositorys.

First, get 80501 a list of candidate nodes for the indicated data base. Then, determine 80502 on which node the data base was last found. Next, reorder 80503 the node list placing the last used node at the front. Next, determine 80204 the class of the function. Then, select 80505 the communications servers for that class of function. Next, select 80206 one of the servers at random.

For each server 80507, select 80508 the first node.

For each node 80509, attempt to connect 80510 to the selected server. Next, a check 80511 is made to determine if the connect was successful. If not, a check 80212 is made to determine if there are any more nodes left. If so, the process flows back to 80509. If not, a check 805130 is made to determine if there are any more servers left. If not, an error message is issued 80514 and the process returns 80515 to the caller. If so, the process flows back to 80507.

If the connect was successful, prefix 80516 the Userid and send the command to the server. Then, wait 80517 for a response. Next, deblock 80518 the response into report, error messages and return code. Then, sever 80519 the connection to the server. Next, stack 80520 the report data. Then, issue 80521 any error messages. Next remember 80522 the node where the data base was found. Then, the process returns 80523 to the caller with the response Return Code. While we have described our preferred embodiments of our inventions it will be understood that those skilled in the art, both now and in the future, may make various improvements and enhancements which fall within the scope of the claims which follow. These claims should be construed to maintain the proper protection for the inventions disclosed.

What is claimed is:

1. A data management system for file and database management useful in concurrent engineering processes, comprising:

a data management control system for managing a plurality of projects, each project having a data repository for data records and a control repository comprising a common access interface utility for a user of said data management system, proclaimed as the Data Manager, to perform tasks, which managers can be combined to support an environment for suitable for multiple users of a user community; and wherein said data management control system has a data management model structure capable of tracking a plurality of data objects governed under similar or disparate processes, and wherein all objects are classified as part of a library; and said library is a grouping of objects which all have common characteristics causing them to belong to the same library grouping, and wherein within a library, having one or more types, each type having one or more versions, and each version having one or more levels; and, wherein versions allow parallel evolution of the same component data element to coexist in the same library enabling multiple versions of a component data element to be developed in tandem while using the same object name and residing in the same library and at the same level simultaneously, and wherein said tasks of the user's data manager include defining or copying Automated File Groups consisting of a Master and one or more Subordinate files, each of which may be required or optional, and each of which includes a flag to designate the desire to erase the file at the target promotion level prior to commencement of a file group promote.

2. A data management system according to claim 1 wherein said tasks of the user's data manager include defining and altering the structure of the library which includes the library levels and versions, types of files to be tracked, and specifying the file type which will be tracked at which levels, and the physical repositories for said levels, versions and types of files.

3. A data management system according to claim 1 wherein said tasks of the user's data manager include defining an Release, Engineering, and Sideways Release Levels for a library and acquiring information about their state, defining the types of files to be stored at each Release and Sideways Release Level, defining an optional EC number for each Release Level, and establishing the migration paths between Engineering Levels and the Release Level within a given version of said library.

4. A data management system according to claim 1 wherein said tasks of the user's data manager include defining the Package Control Data for a library which includes the identities of the Data Managers, a Fix Management Control Mode, Default Problem Fix and Engineering Change numbers for said library, and Part Number and Engineering Change Control Levels for said library.

5. A data management system according to claim 1 wherein said tasks of the user's data manager include defining which types of files will participate in Part Number and Problem Fix Tracking.

6. A data management system according to claim 1 wherein said tasks of the user's data manager include defining various types of authorities using either simple data entry screens or authority profiles for actions such as file promotion, file check out, creating BOMs, setting locks, and setting process results.

7. A data management system according to claim 1 wherein said tasks of the user's data manager include creating or copying Automated Library Process Definitions which include all the information required for the Library Process Manager to initiate, manage and complete a Library Process.

8. A data management system according to claim 1 wherein said tasks of the user's data manager include defining the relationships and dependencies between multiple Library Processes which exist at the same Version, Level and File Type within a given Library.

9. A data management system according to claim 7 wherein said tasks of the user's data manager include using Process Groups to install one or more previously defined Library Processes defined by said creating or copying Automated Library Process Definitions without the need to manually enter all the required information, and wherein these process groups also permit the Data Manager to install the same Library Processes across multiple libraries in an identical fashion.

10. A data management system according to claim 1 wherein said tasks of the user's data manager include defining one or more Automated Library Machines to perform work for said Library, including the type of Automated Library Machine and various workload balancing and monitoring facilities to aid in distribution and assignment of jobs across the library enterprise.

11. A data management system according to claim 1 wherein said tasks of the user's data manager include
creating one or more reports to query and display the multitude of characteristics and properties defined within a Library, including Versions, Levels, file types, Authorities, Library Processes, Automated File Groups, Library Process Definitions, and Package Control Data.

12. A data management system according to claim 1 wherein said tasks of the user's data manager include
deleting any or all of the properties defined within a Library, including Versions, Levels, file types, Authorities, Library Processes, Automated File Groups, Library Process Definitions, and Package Control Data at a time after they've been defined within a given Library.

13. A data management system according to claim 1 wherein a process includes gathering the information entered by the Data Manager for purposes of defining the plurality of attributes and characteristics necessary to manage a Library, and performing comparisons with the existing configuration information within the Control Repository such that only changed information needs to be committed to the Control Repository, thus resulting in more efficient use of the Control Repository tables and a minimized number of queries.

14. A date management system according to claim 1 wherein a process incorporates
an Authority Manager to oversee which users may perform tasks such as file check out and check in, file promotion, setting locks, installing files into the DMS, creating and promoting BOMs, setting process results and performing data management functions.

15. A data management system for file and database management useful in concurrent engineering processes, comprising:
a data management control system for managing a plurality of projects,
each project having a data repository for data records and a control repository comprising a common access interface and utility for a user of said data management system, proclaimed as the Data Manager, to perform tasks, which managers can be combined to support an environment for suitable for multiple users of a user community; and wherein
said data management control system has a data management model structure capable of tracking a plurality of data objects governed under similar or disparate processes, and
wherein all objects are classified as part of a library; and
said library is a grouping of objects which all have common characteristics causing them to belong to the same library grouping, and wherein within a library, having one or more types, each type having one or more versions, and each version having one or more levels; and,
wherein versions allow parallel evolution of the same component data elements coexist in the same library enabling multiple versions of a component data element to be developed in tandem while using the same object name and residing in the same library and at the same level simultaneously, wherein a process permits the use of Authority Profiles along with a method for installing the information contained within the profiles into the Control Repository,
and said method allows the user to create external files containing the detailed authority information for a particular type of user, and
said method then permits the Data Manager to associate each profile with one or more users in an automated fashion without the need to manually enter the detailed authority information, and
said method incorporates a utility to update the Control Repository with the authority information contained within the profiles, and
wherein the said utility permits two modes of operation:
delta mode in which any new authorities are added, but any existing authorities are retained in the control repository, and a
full mode which completely synchronizes the authority information in the profiles with the authority tables in the control repository including deleting existing authorities which are no longer defined in the profiles, as well as adding new authorities.

16. A data management system according to claim 1 wherein owners of the data residing in the data management system may define Surrogates to act on their behalf with the power to take ownership of the user's data, and upon taking ownership notification is sent to the user indicating that the surrogate has taken ownership, and
Managers may designate surrogates for any users with whom they associate.

17. A data management system for file and database management useful in concurrent engineering processes, comprising:
a data management control system for managing a plurality of projects,
each project having a data repository for data records and a control repository comprising a common access interface and utility for a user of said data management system, proclaimed as the Data Manager, to perform tasks, which managers can be combined to support an environment for suitable for multiple users of a user community; and wherein
said data management control system has a data management model structure capable of tracking a plurality of data objects governed under similar or disparate processes, and wherein all objects are classified as part of a library; and
said library is a grouping of objects which all have common characteristics causing them to belong to the same library grouping, and wherein within a library, having one or more types, each type having one or more versions, and each version having one or more levels; and,
wherein versions allow parallel evolution of the same component data element to coexist in the same library enabling multiple versions of a component data element to be developed in tandem while using the same object name and residing in the same library and at the same level simultaneously,
and wherein said system includes
a Lock Manager to permit the following four types of locks to exist against any object residing in the DMS:
Out-for-Update: to indicate ownership of an object whereby multiple users may possess Out-for- Update locks for the same object at different levels and versions;

Move: to prevent data from being overlaid or promoted out of a given level;

Overlay: to prevent data from being overlaid, but permits it to be promoted to higher levels; and, Processing: to lock data while undergoing Library Processing.

18. A data management system according to claim 1 including

Lock Management Utilities which permit users to set, view and reset Out-for-Update, Move and Overlay Locks.

* * * * *